US011542912B2

(12) United States Patent
Moffat et al.

(10) Patent No.: US 11,542,912 B2
(45) Date of Patent: Jan. 3, 2023

(54) WAVE-ENERGIZED DIODE PUMP

(71) Applicant: LONE GULL HOLDINGS, LTD., Portland, OR (US)

(72) Inventors: Brian Lee Moffat, Portland, OR (US); Garth Alexander Sheldon-Coulson, Portland, OR (US)

(73) Assignee: LONE GULL HOLDINGS, LTD., Portland, OR (US)

( * ) Notice: Subject to any disclaimer, the term of this patent is extended or adjusted under 35 U.S.C. 154(b) by 0 days.

(21) Appl. No.: 17/403,748

(22) Filed: Aug. 16, 2021

(65) Prior Publication Data

US 2022/0065215 A1 Mar. 3, 2022

Related U.S. Application Data

(60) Provisional application No. 63/070,256, filed on Aug. 25, 2020.

(51) Int. Cl.
*F03B 13/20* (2006.01)
*F03B 13/22* (2006.01)

(52) U.S. Cl.
CPC .............. *F03B 13/20* (2013.01); *F03B 13/22* (2013.01); *F05B 2240/931* (2013.01)

(58) Field of Classification Search
CPC ..... F03B 13/20; F03B 13/22; F05B 2240/931
See application file for complete search history.

(56) References Cited

U.S. PATENT DOCUMENTS

2007/0257491 A1* 11/2007 Kornbluh ............ F03B 13/1845 290/53
2012/0013126 A1* 1/2012 Molloy ..................... F03D 9/32 290/53
2019/0016419 A1* 1/2019 Sheldon-Coulson ... F03B 13/20

FOREIGN PATENT DOCUMENTS

WO WO-2016177858 A1 * 11/2016 .............. F03B 13/20

* cited by examiner

*Primary Examiner* — Viet P Nguyen
(74) *Attorney, Agent, or Firm* — Fulwider Patton LLP

(57) ABSTRACT

An apparatus that floats at the surface of a body of water over which waves pass, causing a nominally vertical axis of the apparatus to tilt away from an axis normal to the resting surface of the body of water. Tilting allows a fluid to flow through a channel that in an un-tilted apparatus would require the gravitational potential energy of the fluid to increase (i.e., to flow uphill), but, because of the tilt allows the fluid to flow through the channel in a downhill direction. Successive wave-driven tilts of the apparatus incrementally raise water to a head from which a portion of its gravitational potential energy can be converted to electrical power by causing the water to return to a lower level by flowing through a water turbine, or through some other apparatus that performs a useful function when supplied with a flow of high-pressure water.

7 Claims, 153 Drawing Sheets

WAVE-ENERGIZED DIODE PUMP

CROSS-REFERENCES TO RELATED APPLICATIONS

This application claims priority from U.S. Provisional Patent Application No. 63/070,256, filed Aug. 25, 2020, the content of which is incorporated by reference herein in its entirety.

BACKGROUND OF THE INVENTION

Disclosed is an apparatus that floats at the surface of a body of water over which waves pass. Passing waves cause a nominally vertical axis of the apparatus to tilt away from an axis normal to the resting surface of the body of water. Tilting of sufficient magnitude and duration allows a fluid to flow through a channel that in an un-tilted apparatus would require the gravitational potential energy of the fluid to increase (i.e., to flow uphill), but, because of the tilt allows the fluid to flow through the channel in a downhill direction. Flowing water is trapped at a plurality of levels which in an un-tilted apparatus are higher than the respective levels from which the fluid has flowed. A subsequent tilt of the apparatus in a sufficiently different direction, and of a sufficient magnitude and duration, causes the trapped water to flow to new, yet higher levels. Successive wave-driven tilts of the apparatus incrementally raise water to a height and/or head from which a portion of its gravitational potential energy can be released, and/or converted to electrical power, by causing the water to return to a lower level by flowing through a water turbine thereby energizing an operationally connected generator, or through some other apparatus that performs a useful function when supplied with a flow of high-pressure water.

BACKGROUND

Extracting energy from ocean waves has proven to be a difficult endeavor. Complex devices are expensive and tend to be fragile. And devices with articulating elements are prone to damage during storms. In fact, devices with moving parts tend to require frequent maintenance and repair and therefore produce power that tends to be prohibitively expensive.

What has been needed is a wave-energy conversion technology, apparatus, and/or technology that is simple, has a minimum number of moving parts, and has no articulating elements. What has been needed is a wave-energy conversion technology, apparatus, and/or technology that requires little, if any, maintenance or repair over a reasonable (e.g. 30-year) lifetime and produces electrical power at a cost lower than that produced through the burning of fossil fuels.

SUMMARY OF THE INVENTION

Disclosed is a mechanism, apparatus, system, and method which permits rich, and currently under-utilized, natural and renewable marine energy resources to be efficiently harvested and put to good purpose, offsetting and potentially supplanting a portion of the electrical power generated on land and/or through the burning of fossil fuels. The foregoing is achieved by an object floating at the surface of the ocean that will tend to be moved by passing waves. Floating objects may rise and fall. They may move back and forth. However, they also tend to tilt about a vertical axis (i.e. to pitch and/or roll).

When tilted, a first position on a floating object that would (in the absence of waves and the resulting tilting of the object) be below a second position on the object, may, during at least a portion of the tilt, e.g., the most angularly extreme portion, and/or the portion of greatest tilt, be above the second position. Thus, whereas a fluid might not flow from the first position to the second position in a resting object, i.e. an object free from waves and tilt, during a tilt of sufficient angularity and duration fluid would indeed flow from the first to the second position. And, when such a tilt has ended, perhaps through a manifestation of a new tilt in a different direction, a fluid that flowed from the first to the second position would find itself higher and with greater gravitational potential energy than before it flowed from the first to the second position.

By repeating such a pattern of nominally "uphill" flows, e.g. from one side of the object to another side, the height of a fluid might be raised to a substantial degree, e.g., by 50 meters, above the mean level of the resting body of water, and the resulting significant increase in the gravitational potential energy of that fluid might then be converted into electrical power by passing that fluid through a water turbine. Alternately, its increased head pressure might be used to desalinate water or facilitate the extraction of minerals (or other chemicals or compounds) from seawater, e.g. by passing the water through an adsorbent substance or a membrane.

Disclosed is an apparatus that utilizes the tilting motion imparted to it by passing waves to incrementally raise water (or another liquid) above the level of the resting surface of the body of water on which the apparatus floats. The disclosed tilt-induced raising of water may be accomplished by and/or with a variety of embodiments, designs, architectures, and/or components. The embodiments, designs, architectures, and/or components, disclosed herein are offered as examples and are not exhaustive nor limiting. The scope of the present invention includes all embodiments which utilize a wave-induced tilting of the embodiment in order to raise any kind of fluid above a resting and/or original level. The scope of the present invention includes all embodiments which utilize at least a portion of the fluid raised in response to its tilting for any useful purpose, including, but not limited to, the generation of electrical power, and the pressure-induced transmission of a fluid through a membrane for the purpose of desalination and/or mineral extraction.

The scope of the present invention includes, but is not limited to, embodiments that raise any fluid from an initial height to a greater height, and/or raise any fluid above the resting level of the body of fluid (e.g., the body of water on which an embodiment floats) from which the raised fluid originated. The scope of the present invention includes, but is not limited to, embodiments in which the fluid raised is water, seawater, liquid ammonia, liquid hydrogen, liquid air, ethanol, methanol, oil, any compound, chemical, or fluid containing an atom of carbon, liquid nitrogen, or liquid oxygen.

For convenience, any reference to an embodiment that uses water as its working fluid should be understood to represent additional embodiment's that use any other type, variety, and/or kind of working fluid.

The scope of the present invention includes, but is not limited to, embodiments that raise any fluid in the presence of, and/or through, any gas including, but not limited to: air, nitrogen, hydrogen, oxygen, methane, and ethane.

For convenience, any reference to an embodiment that uses air as the gas through which its working fluid flows should be understood to represent additional embodiment's that use any other type, variety, and/or kind of gas in place of, or in addition to, air.)

The scope of the present invention includes, but is not limited to, embodiments in which water is pooled, trapped, contained, held, deposited, and/or enclosed, in any type, design, shape, size, volume, and/or manner of enclosure, chamber, pocket, pool, basin, vessel, canister, valley, crevice, depression, and/or bowl. Some embodiments hold water within enclosures that are connected to other enclosures by means of pipes. These types of embodiments and/or enclosures may be fully enclosed with the exception of their connections to pipes. Some embodiments hold water within basins that are connected to other basins by means of ramps. These types of embodiments and/or enclosures may be fully enclosed with the exception of apertures connecting to ramps that carry water away or into the respective basins. Some embodiments hold water within enclosures that are connected to other enclosures by means of one-way valves. These types of embodiments and/or enclosures are typically adjacent to one another and share at least one wall with another enclosure. These types of embodiments and/or enclosures may be fully enclosed with the exception of their connections to one-way valves.

Some embodiments that hold water within enclosures also include holes, apertures, one-way valves, and/or other ventilating connections to gases outside the enclosures. Such holes, apertures, one-way valves, and/or other ventilating connections are useful in preventing the development of suctions that may inhibit the flow of water between enclosures.

Some embodiments in which water flows over, through, and/or by means of, ramps may include holes, apertures, one-way valves, and/or other ventilating connections to gases outside the spaces above and/or around the ramps, within the side walls guiding the flow of the water. Such holes, apertures, one-way valves, and/or other ventilating connections are useful in preventing the development of suctions that may inhibit the flow of water between enclosures.

The scope of the present invention includes, but is not limited to, embodiments in which water-holding chambers, enclosures, pockets, pools, basins, vessels, canisters, valleys, crevices, depressions, bowls, and/or ramps are arranged in any position, design, distribution, geometry, architecture, and/or placement, whether relative or absolute. Embodiments of the present disclosure include, but are not limited to: those in which enclosures are arranged in stacked rows at opposite sides of the embodiments; those in which enclosures are arranged in a single stacked circular row about a center of each embodiment; those in which enclosures are arranged in inner and outer stacked circular rows about a center of each embodiment (in which the outer circular stacked row is concentric with the inner circular stacked row); those in which enclosures are arranged in a plurality of concentric stacked circular rows about a center of each embodiment; and those in which enclosures are arranged in a radial fashion about a vertical longitudinal axis of each embodiment causing water to flow in a spiral fashion.

The scope of the present invention includes, but is not limited to, embodiments containing any number of chambers, enclosures, pockets, pools, basins, vessels, canisters, valleys, crevices, depressions, bowls, and/or ramps. The scope of the present invention includes embodiments containing any number of levels, and/or mean enclosure heights (e.g. above each embodiment's mean waterline), of their respective chambers, enclosures, pockets, pools, basins, vessels, canisters, valleys, crevices, depressions, bowls, and/or ramps. The scope of the present invention includes embodiments that raise water to any level, distance, height, and/or elevation, relative to the level of the raised water's origin.

The scope of the present invention includes, but is not limited to, embodiments in which water tends to flow within and/or parallel to a vertical plane. The scope of the present invention includes, but is not limited to, embodiments in which water tends to flow in a radial pattern that when projected onto a horizontal plane of each embodiment (e.g. normal to a vertical longitudinal axis of each embodiment), tends to travel from one side of the embodiment to another side while passing through or near the center of the embodiment. The scope of the present invention includes, but is not limited to, embodiments in which water tends to flow in a radial pattern that when projected onto a horizontal plane of each embodiment (e.g. normal to a vertical longitudinal axis of each embodiment), tends to travel from a position near an outer perimeter of the embodiment toward and/or to a position near the center of the embodiment, and then from a position near the center of the embodiment to a position near an outer perimeter of the embodiment. The scope of the present invention includes, but is not limited to, embodiments in which water tends to flow in a circumferential pattern that when projected onto a horizontal plane of each embodiment (e.g. normal to a vertical longitudinal axis of each embodiment), tends to travel in circular paths approximately concentric with the center of the embodiment and/or a vertical longitudinal axis thereof. The scope of the present invention includes, but is not limited to, embodiments in which water tends to flow in a spiral pattern that rises about a vertical longitudinal axis in a screw-like pattern.

The scope of the present invention includes, but is not limited to, embodiments in which at least one enclosure allows water to flow to only one other enclosure. The scope of the present invention includes embodiments in which at least one enclosure allows water to flow to two other enclosures. The scope of the present invention includes embodiments in which at least one enclosure allows water to flow to three or more other enclosures.

The scope of the present invention includes, but is not limited to, embodiments in which the water-holding chambers, enclosures, pockets, pools, basins, vessels, canisters, valleys, crevices, depressions, bowls, and/or ramps, are separated from the fluidly connected other water-holding chambers, enclosures, pockets, pools, basins, vessels, canisters, valleys, crevices, depressions, bowls, and/or ramps, to which their water flows, by any distance. In other words, the scope of the present invention includes embodiments in which water flows by any horizontal distance, any vertical distance, and any total distance, during any single tilt of the embodiments.

Embodiments of the present disclosure include, but are not limited to, those in which water flows a horizontal distance of 5 meters, 10 meters, 20 meters, 30 meters, and 50 meters. Embodiments of the present disclosure include, but are not limited to, those in which water flows a vertical distance of 10 cm, 20 cm, 50 cm, 1 meter, 2 meters, 3 meters, and 4 meters.

The scope of the present invention includes, but is not limited to, embodiments in which fluid flows through any type of pipe, conduit, channel, or valve. The scope of the present invention includes embodiments in which fluid flows through a channel of any length, any cross-sectional shape, any cross-sectional area. The scope of the present invention includes embodiments in which fluid flows through a channel incorporating any type of valve, and type of anti-suction aperture, valve, or mechanism.

The scope of the present invention includes, but is not limited to, embodiments in which any angle of tilt, i.e., tilt of any zenith angle, within any vertical plane, must be reached or exceeded before water flows between at least one pair of water-holding enclosures. The scope of the present invention includes, but is not limited to, embodiments in which the angle of tilt, within any vertical plane, that must be reached or exceeded before water flows between at least one pair of water-holding enclosures is 3 degrees, 5 degrees, 7 degrees, 10 degrees, 15 degrees, 20 degrees, and 30 degrees.

The scope of the present invention includes, but is not limited to, embodiments in which the azimuthal angle of tilt, i.e., relative to an orientation of the embodiment, determines which subset of an embodiment's plurality of water-flow channels are characterized by active flows of water, and which are characterized by no flow. The scope of the present invention includes, but is not limited to, embodiments in which the repeated tilting of the embodiments at a variety of azimuthal angles of tilt, e.g., at approximately opposite azimuthal angles of tilt, results in a series of azimuthal-angle-of-tilt-specific water flows that act in series to raise a fluid from a lower elevation to a higher elevation.

With respect to any particular embodiment, the amount of tilt that must be reached or exceeded before water flows between at least one pair of water-holding enclosures tends to be correlated with the incremental vertical distance that must be travelled in order for water to move from one enclosure to another (e.g., the average height of the enclosures and/or their relative vertical offsets between levels).

With respect to any particular embodiment, the amount of tilt that must be reached or exceeded before water flows between at least one pair of water-holding enclosures tends to be inversely correlated with the horizontal distance that must be travelled in order for water to move from one enclosure to another (e.g. the average length of the pipes or ramps through which water flows between enclosures).

The scope of the present invention includes, but is not limited to, embodiments in which a fluid flow through a relatively long channel leading from a relatively lower elevation and/or height within the embodiment to a relatively higher elevation and/or height within the embodiment is achieved through a series of consecutive constituent fluid flows through relatively short channels—each relatively short channel leading from an preceding intermediate fluid repository to a succeeding fluid repository.

Fluid flow from lower-level intermediate fluid repository to a succeeding fluid repository is all or nothing, i.e., if the fluid fails to flow into the succeeding fluid repository then it will tend to flow back into the lower-level intermediate fluid repository. Fluid within an intermediate fluid repository will tend to remain trapped within that intermediate fluid repository unless and until the embodiment of which it is a part experiences and/or is subjected to a "sufficient and/or favorable tilt," i.e., a tile characterized by a specific and sufficient azimuthal angle (with respect to the embodiment), a sufficient zenithal angle (with respect to the embodiment's nominal vertical orientation), and a sufficient duration (providing enough time for fluid to flow from a particular intermediate fluid repository to a succeeding fluid repository).

An otherwise favorable tilt of insufficient duration may see a fluid flow out of an intermediate fluid repository, toward a succeeding intermediate fluid repository, only to stop flowing prior to entering the succeeding intermediate fluid repository, and then flowing back into the intermediate fluid repository from which it originated, e.g., when the zenithal angle of tilt falls below the minimum zenithal angle of tilt required for flow before the incremental flow has been completed.

However, with respect to a flow channel fluidly connecting preceding and succeeding intermediate fluid repositories, the combination of the flow channel and either of its adjacent fluidly connected fluid repositories may be likened to a fluid diode in the sense that in response to a favorable tilt gravity will draw the fluid in one intermediate fluid repository through a connecting fluid channel and deposit it in a succeeding intermediate fluid repository. However, in response to unfavorable tilts of the respective embodiment, fluid remains trapped within an intermediate fluid repository. Thus, an intermediate fluid repository, in conjunction with an inter-repository fluid channel is analogous to, and/or constitutes, a fluid diode in which a fluid flows primarily if not entirely in a single direction within the larger, complete, and/or composite, fluid channel of which it is a part.

A particular constituent fluid diode, within an embodiment's complete, comprehensive, and/or composite, fluid channel will typically permit, facilitate, and/or manifest, a gravitationally-induced fluid flow in response to tilts of the embodiment occurring within a relatively narrow range of azimuthal angles, i.e., the fluid diode's active, responsive, and/or enabled, azimuthal angles. However, by adapting and/or configuring an embodiment's composite fluid channel such that the individual composite fluid diodes of which it is comprised have overlapping, complementary, and/or different active azimuthal angles, the azimuthal tilt angles to which an embodiment might be expected to experience, e.g., when mounted on a platform or buoy floating adjacent to an upper surface of a body of water over which waves pass, will tend to result in an incremental but steady flow of fluid from the inlet of the embodiment's fluid channel to its outlet.

The reason that an individual fluid diode of the present disclosure manifests fluid flow (in the preferred direction of flow, from lower to higher elevations) is because the fluid diode incorporates, utilizes, and/or includes, an inclined fluid channel, an elevating fluid conduit, an inclined fluid ramp, etc., that connects a preceding intermediate fluid repository and a succeeding intermediate fluid repository. And, an angularly favorable tilt is one whose azimuthal angle, and zenithal angle, are sufficient to change a nominally inclined fluid channel (i.e., inclined with respect to an embodiment-specific frame of reference) connecting a serially adjacent pair of intermediate fluid repositories into a fluid channel that is, because of the azimuthal and zenithal angles of the tilt, effectively, and/or with respect to gravity, a descending and/or downhill fluid channel through which gravity draws fluids to flow from the preceding to the succeeding intermediate fluid repositories. And, if such an angularly favorable tilt lasts long enough, the fluid contents of a preceding intermediate fluid repository may be entirely transferred by a gravitationally-induced flow through a connecting fluid channel to a succeeding intermediate fluid repository.

In the description of the present disclosure, the fluid channels fluidly connecting serially adjacent, and/or sequential, intermediate fluid repositories, may be referred to as a variety of terms, including, but not limited to: inclined channel, elevator conduit, elevator ramp, and ascending channel, or any variation thereof. In the description of the present disclosure, the intermediate fluid repositories which hold, trap, and/or capture, fluid between favorable tilts, may be referred to as a variety of terms, including, but not limited to: fluid repositories, and catchment basins. In the description of the present disclosure, the points, planes, apertures, and/or seams, at which inclined channels are fluidly connected to respective (i.e., preceding or succeeding) intermediate fluid repositories, and/or at which fluid diodes are interconnected, utilize terminology that is relative to the context of the reference, e.g., a fluid channel carrying fluid to an intermediate fluid repository may be referred to as an inlet channel, an inlet aperture, a source conduit, etc.; and, a fluid channel carrying fluid from an intermediate fluid repository may be referred to as an outlet channel, an outlet aperture, a receiving conduit, etc. Therefore, depending upon the context of a discussion and/or description, a particular fluid channel might be referred to as both an inlet channel and an outlet channel. Similarly, depending upon the context of a discussion and/or description, a particular intermediate fluid repository might be referred to as both a source fluid repository and a receiving fluid repository. Similarly, planes through which fluid flows within and/or between intermediate fluid repositories, fluid channels, and/or fluid diodes, might be referred to as apertures, e.g., inlet apertures and outlet apertures (depending upon the context of a discussion and/or description).

An embodiment's fluid channel is intended to raise fluid from a relatively lower height to a relatively greater height in response to tilting of the embodiment in response to external, e.g., environmental, buffeting of the embodiment. Therefore, the individual fluid diodes of which an embodiment's fluid channel is comprised tend to be oriented such that at least a range of approximately opposite azimuthal tilt angles will tend to move fluid from one intermediate fluid repository to another in response to a tilt of a first azimuthal angle, and then move it from that receiving intermediate fluid repository to another in response to a tilt of a second azimuthal angle, where the first and second azimuthal angles are approximately opposite, and/or different by approximately 180 degrees.

An embodiment of the present disclosure tends to elevate fluid through its serially and fluidly connected fluid diodic channels in response to tilting characterized by favorable azimuthal angles that differ by approximately 180 degrees. Another embodiment of the present disclosure tends to elevate fluid through its serially and fluidly connected fluid diodic channels in response to tilting characterized by favorable azimuthal angles that differ by approximately 120 degrees. Other embodiments of the present disclosure tend to elevate fluid through their respective serially and fluidly connected fluid diodic channels in response to tilting characterized by favorable azimuthal angles that differ by angles, including, but not limited to: 90 degrees, 60 degrees, 45 degrees, 30 degrees, 20 degrees, and 15 degrees. An embodiment of the present disclosure tends to elevate fluid through its serially and fluidly connected fluid diodic channels in response to tilting characterized by favorable azimuthal angles of any degree, and/or tilting characterized by any azimuthal angle.

An embodiment of the present disclosure utilizes intermediate inclined channels to fluidly connect intermediate fluid repositories such that a source of tilting action at the embodiment (e.g., wave action) will periodically, incrementally, sequentially, and/or approximately continuously, cause its constituent intermediate inclined channels to become reoriented with respect to gravity such that gravity causes fluid to flow from an intermediate fluid repository of a first elevation and/or height (relative to the embodiment) to another intermediate fluid repository of a second elevation and/or height (relative to the embodiment), wherein the second elevation is greater than the first. In this way, the embodiment incrementally, sequentially, step-wise, and/or impulsively, elevates fluid within its fluid channel from a relatively lower elevation to a relatively higher elevation, thereby imparting to the fluid gravitational potential energy and/or head pressure that may be used to energize a fluid turbine and/or for some other useful purpose.

Because a particular fluidic diode of the present disclosure manifests fluid flow within its respective nominally-inclined fluid channel in response to a tilt of a particular azimuthal direction, and only while that tilt is also of at least a threshold zenithal angle, a fluidic diode of the present disclosure behaves in a periodic manner, akin to a gated or digital circuit. And, because tilting of an embodiment will, depending upon its configuration and the environment in which it operates, tend to be cyclic with the tilting in one azimuthal direction being following by an approximate return to a vertical orientation prior to again being tilted in a different azimuthal (e.g., in an approximately opposite) direction, the environmental and/or ambient source tending to tilt an embodiment of the present disclosure, the ambient source of an embodiment's tilting tends to act as a clocking and/or gating signal to the embodiment. From this perspective, an embodiment of the present disclosure might be seen as analogous to a digital circuit that moves data from an input register, to another register, and to another, and to another, and so on . . . until that data is presented at an output register—where embodiments of the present disclosure move fluid instead of data, and the clock signals and energy which gate and drive the movements are provided by the external source of the embodiment's tilting.

With respect to an embodiment of the present disclosure that is mounted to, and/or incorporates, a buoyant structure, waves acting at the embodiment and causing it to tilt, e.g., in one azimuthal direction of tilt when approaching a wave crest, and in an approximately opposite azimuthal direction of tilt when approaching a wave trough, provide the embodiment's fluid channel, and the fluid diodes of which it is comprised, with a gating, timing, and/or clocking signal which regulates the flow of fluid through the embodiment's fluid diodes. Those wave-induced tilts of the embodiment then periodically allow gravity, and a tilt-induced gravitational potential energy with respect to individual fluid diodes, to move fluid within the embodiment's fluid channel from one or more fluid diodes to respective succeeding fluid diodes. The fluid diodes of which the embodiment's fluid channel is comprised allow fluid to move higher within the embodiment, and with respect to the embodiment's frame of reference, when the embodiment experiences tilts favorable to each respective fluid diode. Those fluid diodes prevent the water within them from flowing backward within the embodiment's fluid channel when the embodiment's tilt is not favorable to its forward flow. Thus, in response to tilting of an embodiment, fluid flows incrementally from fluid diode to fluid diode in a pattern that eventually elevates fluid to an elevated outlet from which its wave-derived gravitational potential energy may be efficiently harvested.

Because of their dependence upon gravity to cause fluid to flow within and/or through them, the fluid diodes of which an embodiment of the present disclosure may be comprised may be referred to as gravitational fluidic diodes. And, the fluid channel of an embodiment might be described as a fluidly connected concatenation of gravitational fluidic diodes.

The scope of the present invention includes, but is not limited to, embodiments in which any duration of tilt (i.e.

duration of tilt that reaches or exceeds a requisite minimum tilt angle), is required for the complete contents of one enclosure to flow into another enclosure. The scope of the present invention includes, but is not limited to, embodiments in which the duration of tilt that must be reached or exceeded before the complete contents of one enclosure is able to flow into a fluidly connected enclosure is 1 second, 3 seconds, 5 seconds, 7 seconds, 9 seconds, 11 seconds, 13 seconds, and 15 seconds.

The scope of the present invention includes, but is not limited to, embodiments in which flotation adjacent to the surface of a body of water is achieved by means of a buoy or buoyant structure of any shape, size, and/or volume. The scope of the present invention includes, but is not limited to, embodiments in which the buoy is in the shape of a short broad cylinder in which an axis of radial symmetry is vertical (i.e. a buoy shaped like a "puck). The scope of the present invention includes, but is not limited to, embodiments in which the buoy is in the shape of a "teardrop" in which an axis of radial symmetry is vertical, and the bulbous end is at a relatively great depth while the pointy end is at or above the surface. The scope of the present invention includes, but is not limited to, embodiments in which the buoy is in spherical in shape. The scope of the present invention includes, but is not limited to, embodiments in which the buoy is cylindrical in shape, with a nominally vertical radial axis of symmetry, in which the length of the cylinder is approximately equal to, or greater than, the diameter of the cylinder. And, the scope of the present invention includes, but is not limited to, embodiments in which the buoy is cylindrical in shape, with a nominally horizontal radial axis of symmetry, in which the length of the cylinder is greater than the diameter of the cylinder.

The scope of the present invention includes, but is not limited to, embodiments, and/or their respective buoys, of any size, diameter, width, height, draft, freeboard, waterplane area, displacement, and/or volume.

The scope of the present invention includes, but is not limited to, embodiments in which a width of the embodiment, and/or its respective buoy, is 3 meters, 5 meters, 10 meters, 20 meters, 30 meters, 50 meters, 75 meters, 100 meters, and 150 meters.

The scope of the present invention includes, but is not limited to, embodiments characterized by any nominal and/or average rate of water flow to an uppermost height, level, elevation, and/or head. The scope of the present invention includes, but is not limited to, embodiments, characterized by a nominal and/or average rate of water flow to an uppermost height, level, elevation, and/or head that is approximately 1 liter per second, 10 liters per second, 100 liters per second, 1,000 liters per second, 10,000 liters per second, 100,000 liters per second, and 1 million liters per second.

The scope of the present invention includes, but is not limited to, embodiments, characterized by a nominal flow of water from a point, pool, and/or body of origin, to an uppermost height, level, elevation, and/or head, that is separated from the respective point, pool, and/or body of origin, of approximately 5 meters, 10 meters, 15 meters, 20 meters, 25 meters, 40 meters, 50 meters, 60 meters, 80 meters, 100 meters, 150 meters, and 200 meters.

The scope of the present invention includes, but is not limited to, embodiments in which the water raised to a higher level, elevation, or head, is drawn, at least in part, from the body of water on which the embodiment floats. The scope of the present invention includes, but is not limited to, embodiments in which the water raised to a higher level, elevation, or head, is drawn, at least in part, from an enclosed reservoir of water to which the raised water is returned after its passage through a generator, desalination membrane, mineral absorption pad, or other water pressure processing mechanism, apparatus, component, material, and/or system.

The scope of the present invention includes, but is not limited to, embodiments which incorporate a mechanism, design feature, apparatus, and/or valve, that permits rising water to be utilized (e.g., to be sent through a water turbine) at a height, level, elevation, and/or head, less than the maximum possible height, level, elevation, and/or head. Such a reduction in the height, level, elevation, and/or head to which water is permitted to rise before its gravitational potential energy and/or head pressure is utilized may allow the efficiency, performance, and/or output of the embodiments to be increased when the energy of the waves buffeting the embodiments is less than the nominal level for which the embodiments were optimized.

The scope of the present invention includes, but is not limited to, embodiments which incorporate a mechanism, design feature, apparatus, and/or valve, that permits rising water to "spill over", and/or bypass a water turbine or other flow restrictor, and thereby escape the water-lifting power takeoff, and/or directly return to the body of water from which it originated. Such a bypass of water provides a useful adaptation and/or option to avoid damage during periods of operation characterized by waves of excessive energy.

The scope of the present invention includes, but is not limited to, embodiments which utilize water raised therein to generate electrical power. Some of these types of embodiments may use at least a portion of the electrical power so generated to power computers, and/or computing circuits, in order to perform calculations and complete computing tasks downloaded to the embodiments via direct network connections (e.g. via subsea data cables) and/or via radio communications (e.g. received from satellites), and to subsequently return computational results to one or more remote computers and/or computing stations or networks via direct network connections (e.g. via subsea data cables) and/or via radio communications (e.g. transmitted to and/or via satellites). Some of these types of embodiments may use at least a portion of the electrical power so generated to electrolyze water (or seawater) and produce hydrogen.

The scope of the present invention includes, but is not limited to, embodiments which utilize water raised therein to desalinate water. The scope of the present invention includes, but is not limited to, embodiments which utilize water raised therein to extract minerals from seawater.

The scope of the present invention includes embodiments constructed, fabricated, incorporating, and/or made of, any material. The scope of the present invention includes, but is not limited to, embodiments fabricated, at least in part, of steel, aluminum, another metal, concrete, another cementitious material, fibrous materials (e.g., bamboo, or cellulose), or plastic.

Disclosed is an improved energy harvesting system that is capable of utilizing at least a portion of the energy which it generates in order to perform an energy-intensive task. The scope of the present invention includes embodiments in which any or all of the energy harvested by the respective embodiments is utilized by any device-specific, and/or embodiment-specific, application, process, transformation, mechanism, device, synthesis, conversion, activity, harvesting (e.g., of an element, a chemical, a substance), and/or any other task that results in the production, creation, collection, and/or accumulation, of any material, substance, solid, liquid, gas, information, and/or product that has a value, benefit, and/or utility with respect to any consumer, person, animal, environment, and/or place.

The scope of the present invention includes, but is not limited to, embodiments which are moored to a solid substrate lying beneath the body of water on which the embodiments float. For instance, the scope of the present invention includes, but is not limited to, embodiments which are moored to a seafloor near a land mass and/or coastline. Such embodiments may transmit at least a portion of the electrical power, computational results, desalinated water, hydrogen, or other useful product, that they produce to a land mass via a cable, tube, channel, wire, and/or other transmission conduit.

The scope of the present invention includes, but is not limited to, embodiments which are free-floating and/or self-propelled. Such embodiments may operate adjacent to the surface of portions of the sea that are very deep (e.g. deeper than one mile). Such embodiments may operate very far from a shore and/or land mass. Such embodiments may generate electrical power and utilize at least a portion of that power to perform computational tasks received via radio transmission and/or satellite. Such embodiments may generate electrical power and utilize at least a portion of that power to refine metals (such as aluminum). Such embodiments may generate electrical power and utilize at least a portion of that power and/or pressure to generate desalinated water.

The scope of the present invention includes, but is not limited to, embodiments which propel themselves by means of a variety of methods, systems, nodes, techniques, mechanisms, machines, modules, and/or technologies, in order to generate the thrust to propel themselves across the surface of the body of water on which they operate. These mechanisms may include, but are not limited to: rigid sails, flexible sails, electrically-powered motor-driven propellers, chemically-powered engine-driven propellers, electrically- and/or chemically-powered ducted fans, directed exhausts from oscillating water columns, water jets, Flettner rotors, sea anchors and/or drogues deployed to relatively shallow depths (e.g., 30 meters), sea anchors and/or drogues deployed to relatively great depths (e.g., 1,000 meters), and structural appendages, columns, etc., that extend down into the water column.

The scope of the present invention includes, but is not limited to, embodiments which convert at least a portion of the energy of incident waves into electrical power, at least a portion of which is used to power computers that perform computational tasks they receive from remote computers, networks, and/or stations, e.g., via transmissions from satellites, and which is used to return computational results to remote computers, networks, and/or stations, e.g., via transmissions to satellites.

Each such embodiment of the current disclosure incorporates, includes, and/or utilizes a plurality of electronic computational nodes, computers, mechanisms, modules, systems, assemblages, circuits, processors, and/or machines, of types and/or categories including, but not limited to, the following:

1. computational components such as:

CPUs, CPU-cores, inter-connected logic gates, ASICs, RAM, flash drives, SSDs, hard disks, GPUs, quantum chips, optoelectronic circuits, analog computing circuits, encryption circuits, and/or decryption circuits 2. computational circuits capable of processing tasks, including, but not limited to:

machine learning, neural networks, cryptocurrency mining, graphics processing, image object recognition and/or classification, image rendering, quantum computing, financial analysis and/or prediction, and/or artificial intelligence.

3. computational circuits characterized by architectures typical of:

"blade servers," "rack-mounted computers and/or servers," and/or supercomputers.

The computing tasks executed, performed, and/or completed by such embodiments of the current disclosure may be of an arbitrary nature. Moreover, such embodiments may incorporate and/or utilize specialized circuits, networks, architectures, and/or peripherals that facilitate their execution of specific types of computing tasks. Each such embodiment's receipt of a computational task, and its return of a computational result, may be accomplished through the transmission of data across satellite links, fiber optic cables, LAN cables, radio (e.g., device-to-shore, device-to-device, device-to-drone-to-device, etc.), modulated light, microwaves, and/or any other channel, link, connection, and/or network.

Such embodiments may dissipate at least a portion of the heat generated by the computational nodes therein by transmitting that heat (e.g. passively and/or conductively) to the water on which the device floats, and/or to the air around it.

An embodiment of the current disclosure includes, incorporates, and/or utilizes, machines, systems, modules, apparati, processors, and/or nodes, that are energized, at least in part, by power generated by the embodiment in response to, and/or as a consequence of, waves moving across and/or through that body of water on which it floats, and which use at least a portion of that energy to generate, synthesize, extract, capture, and/or accumulate, a chemical (e.g., hydrogen gas).

An embodiment of the current disclosure utilizes at least a portion of the power that it extracts from ambient waves to electrolyze seawater and generate hydrogen gas, which it then compresses, and/or liquefies, and stores within a compartment and/or chamber.

This disclosure, as well as the discussion regarding same, is made in reference to wave energy converters on, at, or adjacent to, the surface of an ocean. However, the scope of this disclosure applies with equal force and equal benefit to wave energy converters and/or other devices on, at, or adjacent to, the surface of an inland sea, a lake, and/or any other body of water or fluid.

The scope of the present invention includes, but is not limited to, embodiments which communicate with other embodiments; communicate with planes; communicate with shore stations; communicate with satellites; and/or communicate with networks.

The scope of the present invention includes, but is not limited to, embodiments which communicate by means of radios, lasers, quantum-encoded channels, and/or other communication modalities.

The scope of the present invention includes, but is not limited to, embodiments which include, incorporate, and/or utilize a variety of navigational equipment, nodes, technologies (e.g., radars, sonars, LIDARS).

The scope of the present invention includes, but is not limited to, embodiments which include, incorporate, and/or utilize a variety of sensors (e.g., cameras, radars, sonars, LIDARS, echo locators, magnetic).

The scope of the present invention includes, but is not limited to, embodiments which include, incorporate, and/or utilize sensors that measure, characterize, and/or evaluate:

winds, waves, currents, atmospheric pressures, relative humidities, and/or other environmental factors;

potential hazards, e.g., ships, ice bergs, floating debris, oil slicks, water depths, subsurface topographies, shore lines, reefs, etc.;

ecological objects of interest, e.g., whales, turtles, fish, birds, plankton, etc.; and/or, environmental and/or ecological degradations, e.g., pollutants, illegal fishing, illegal dumping, etc.

All derivative embodiments, combinations of embodiments, and variations thereof, are included within the scope of this disclosure.

An embodiment of the present disclosure is propelled by means of a flexibly connected autonomous surface vessel (ASV), e.g., an automated boat or tug. Embodiments of the present disclosure need not be propelled by means of modules, systems, mechanisms, and/or machines, incorporated within them, nor fixedly attached to them. Propulsion may be provided by any means, devices, vessels, and/or other external energy-consuming machines, regardless of the manner, method, and/or type of connection by which and/or through which their propulsive forces are transmitted to their respective embodiment(s).

BRIEF DESCRIPTION OF THE DRAWINGS

FIG. 122 is a side view of the embodiment of FIG. 120;

FIG. 123 is an elevated sectional view of the embodiment of FIG. 120;

FIG. 124 is a top sectional view of the embodiment of FIG. 123;

FIG. 125 is a cross sectional view of the embodiment of FIG. 124;

FIG. 126 is a side cross sectional view of the embodiment of FIG. 124;

FIG. 127 is an elevated sectional view of the embodiment of FIG. 124

FIG. 128 is another sectional view of the embodiment of FIG. 124;

FIG. 129 is a top sectional view of the embodiment of FIG. 124;

FIG. 130 is a upward looking sectional view of the embodiment of FIG. 124;

FIG. 131 is a downward looking sectional view of the embodiment of FIG. 124;

FIG. 132 is another downward looking sectional view of the embodiment of FIG. 124;

FIG. 133 is an elevated, perspective sectional view of the embodiment of FIG. 124;

Figure 124:
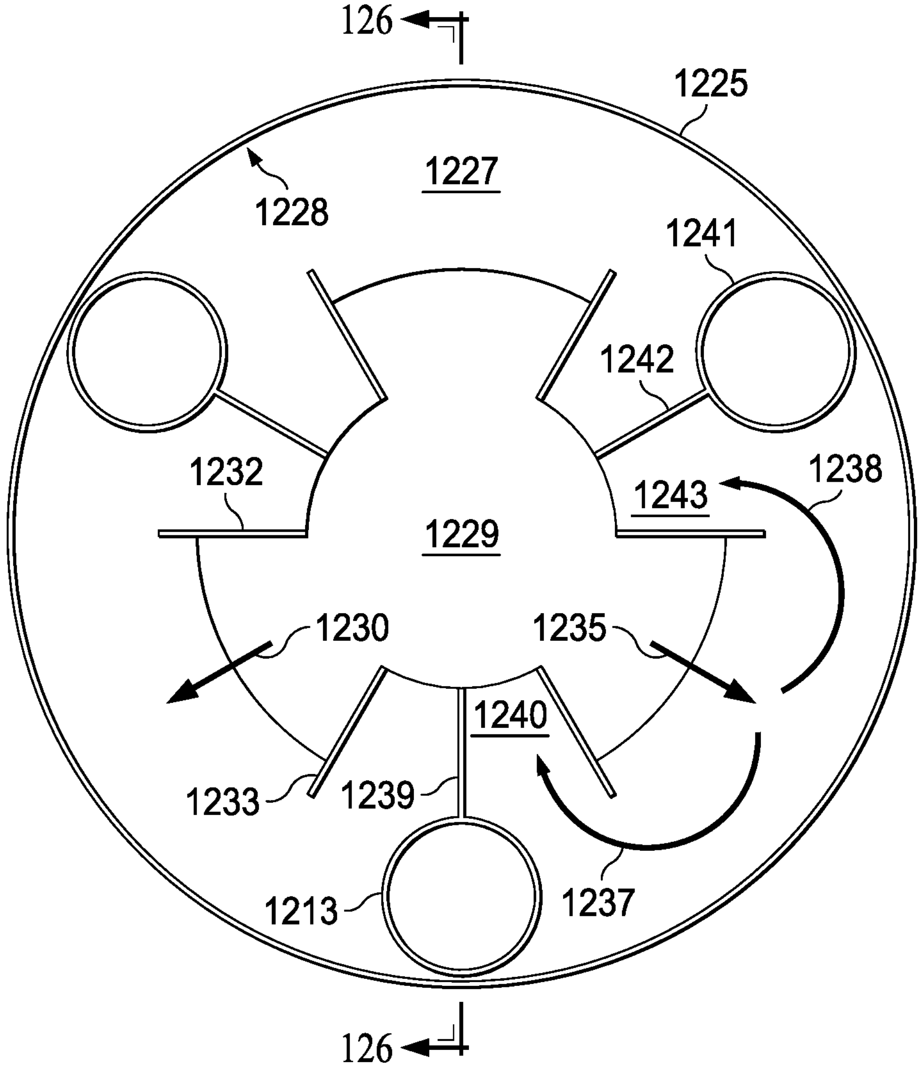
Figure 134:
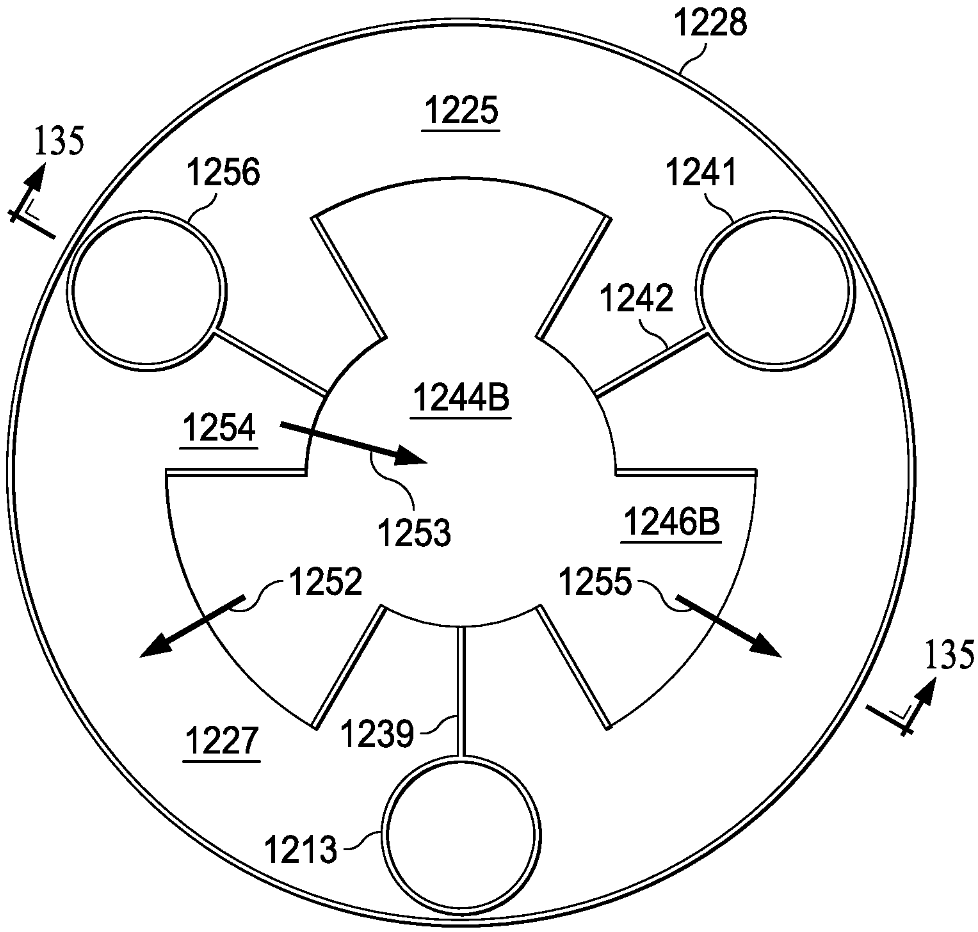
Figure 135:
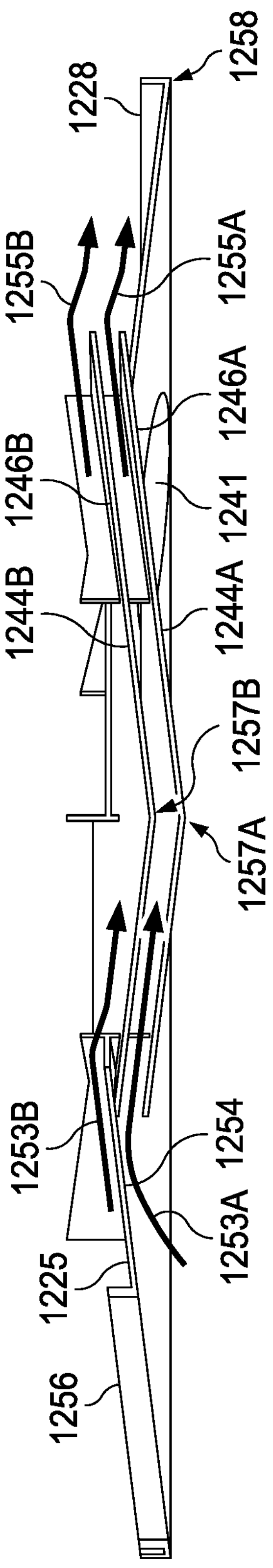
Figure 136:
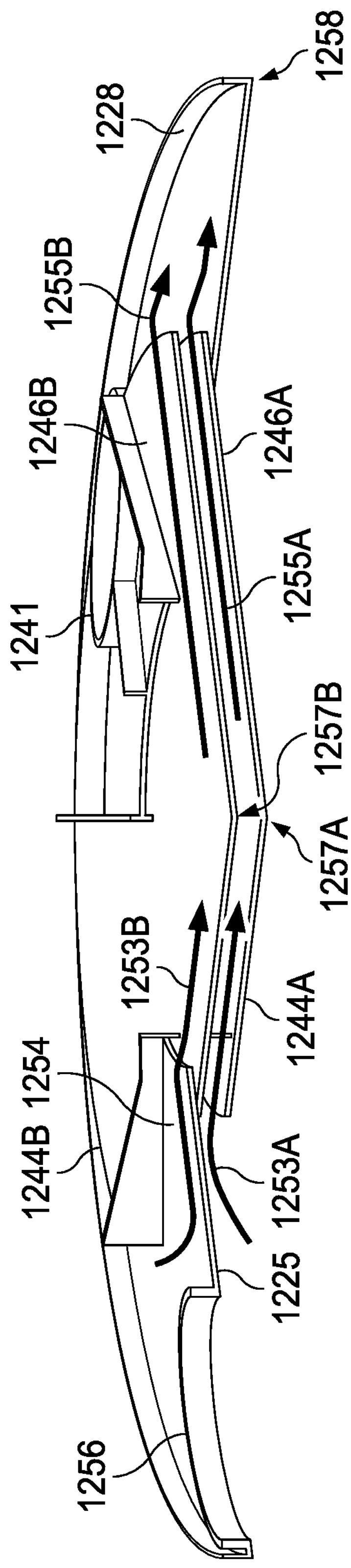
Figure 137:
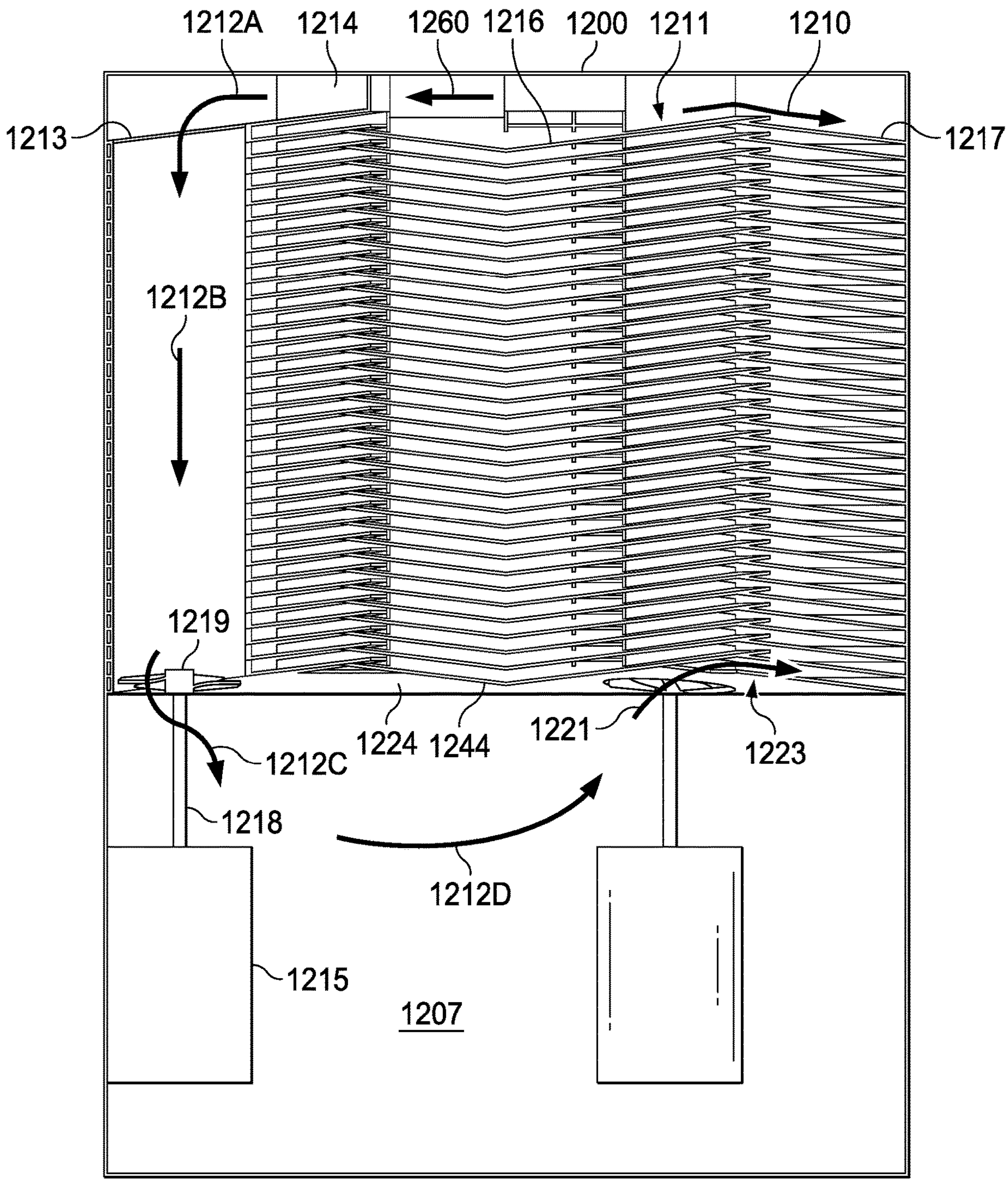
Figure 138:
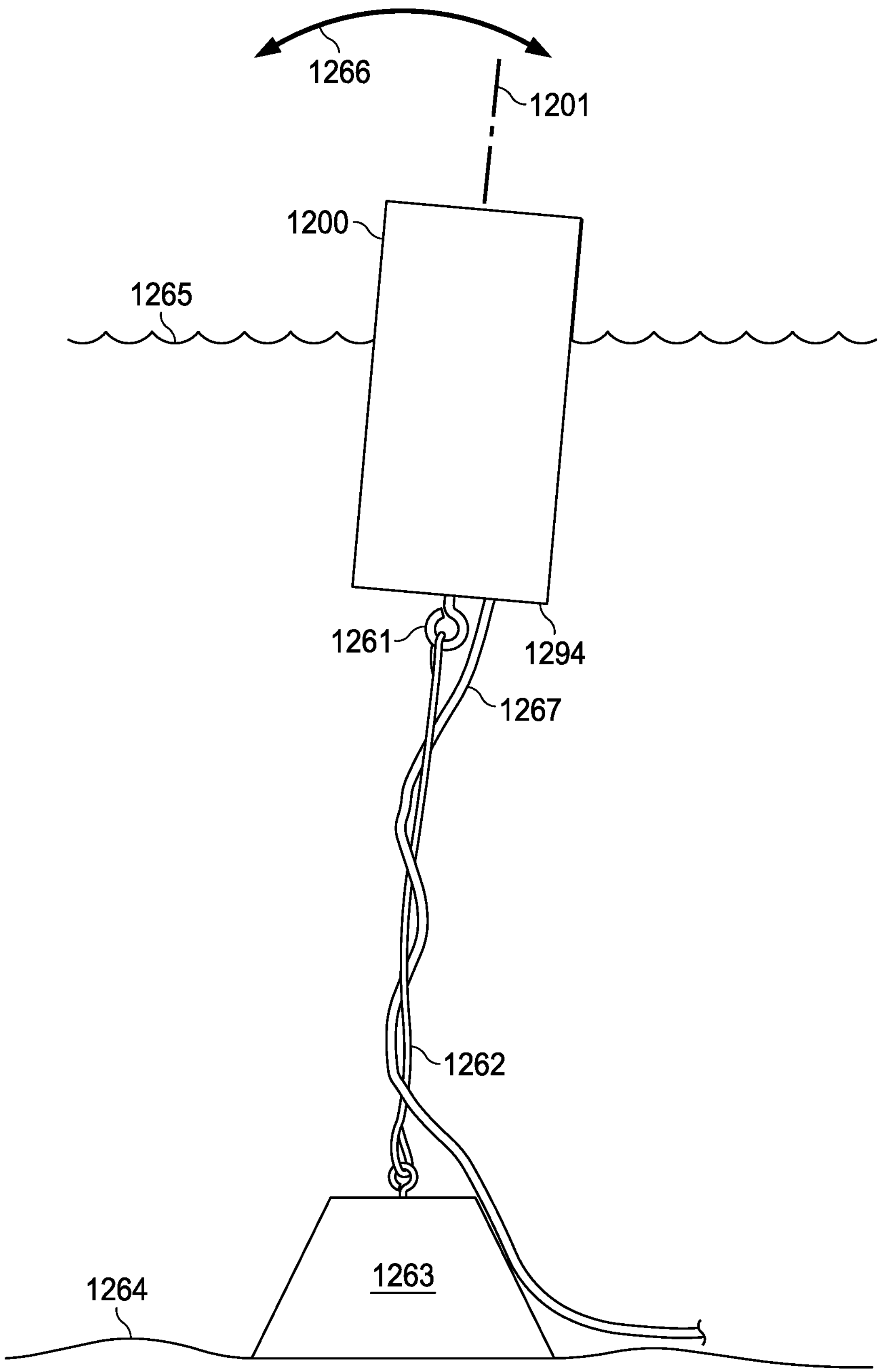
Figure 139:
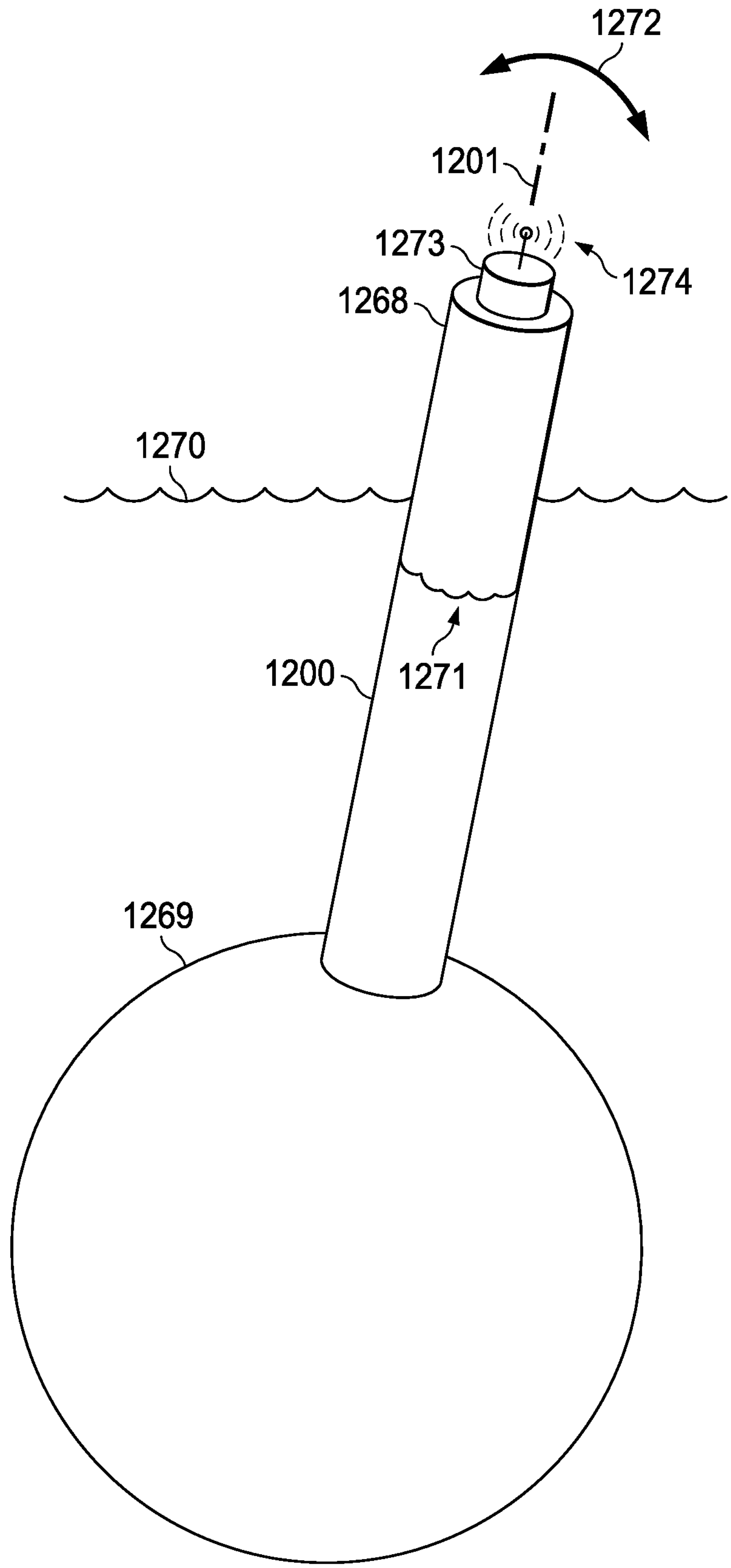
Figure 140:
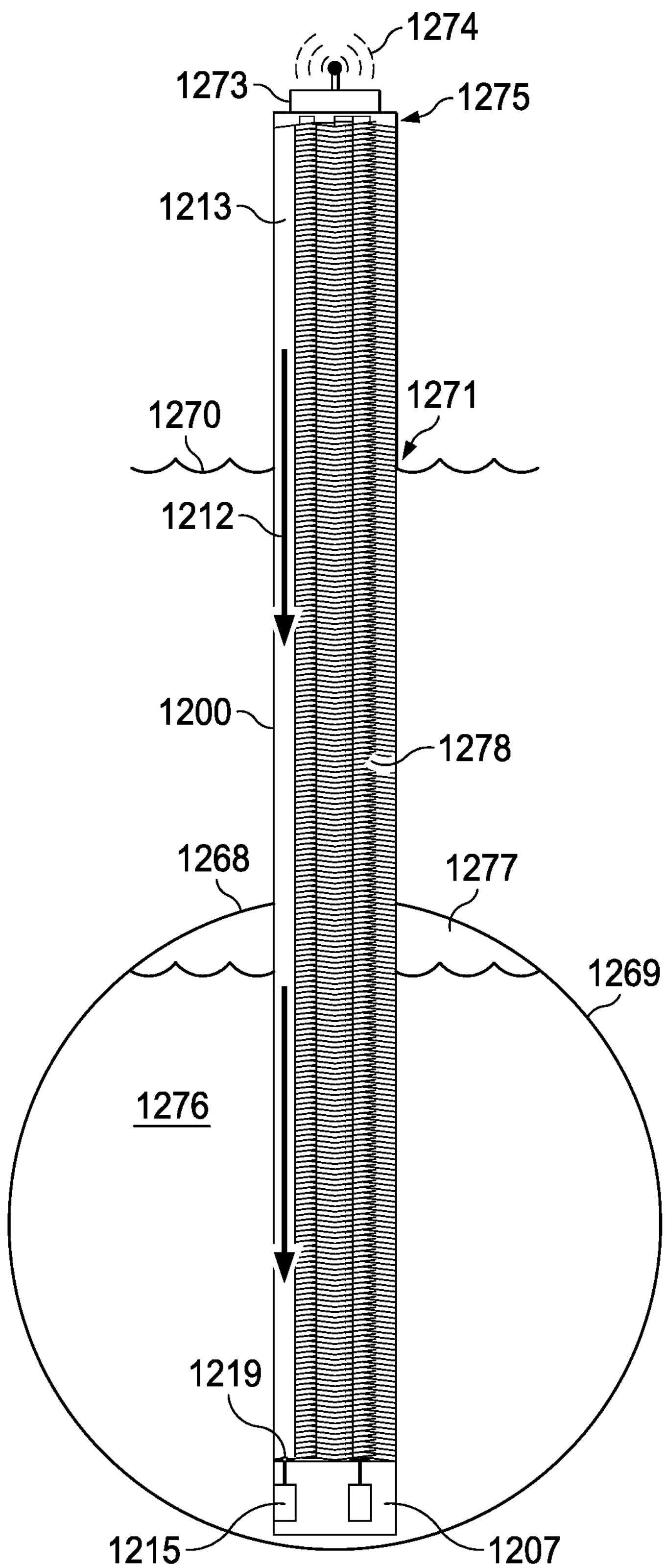
Figure 141:
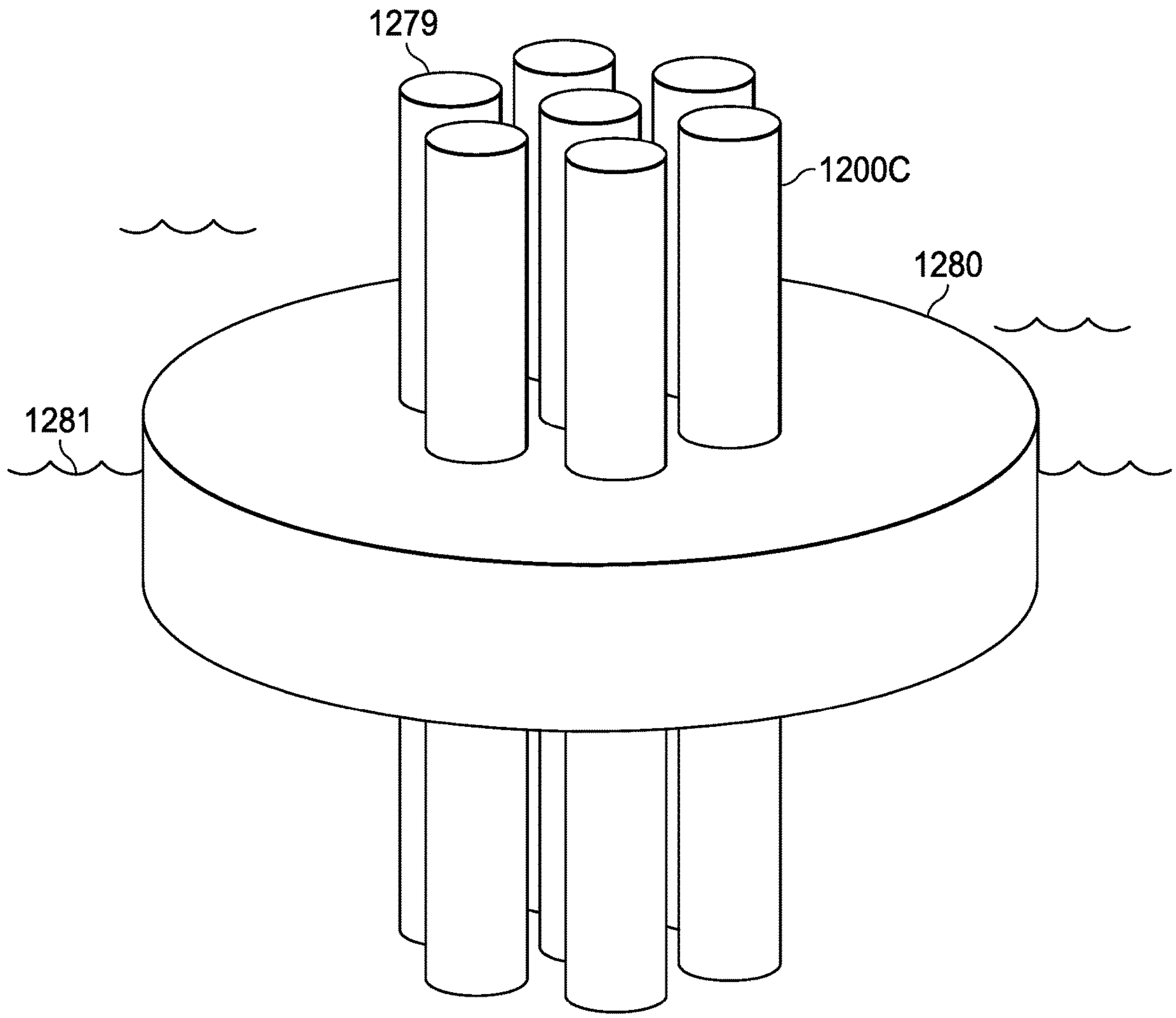
Figure 142:
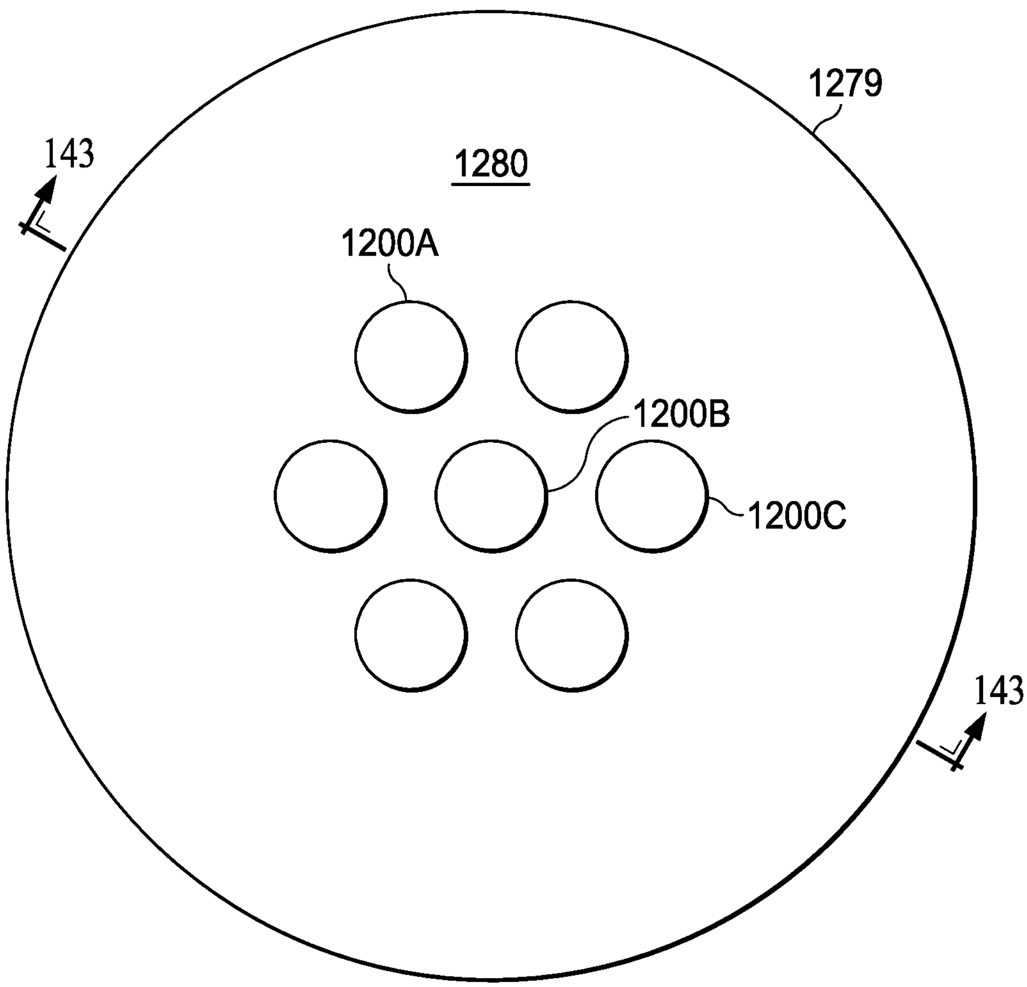
Figure 143:
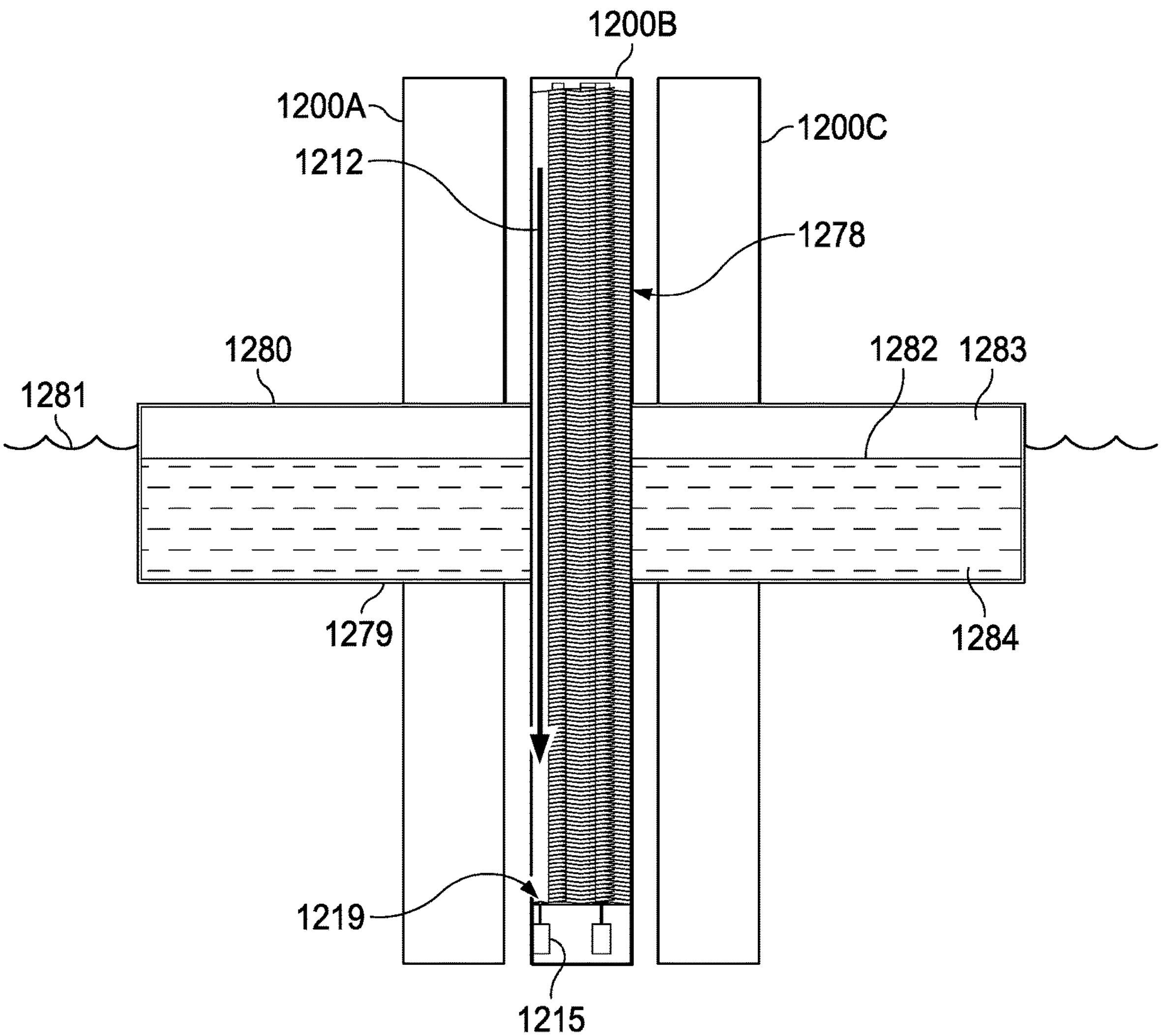
Figure 144:
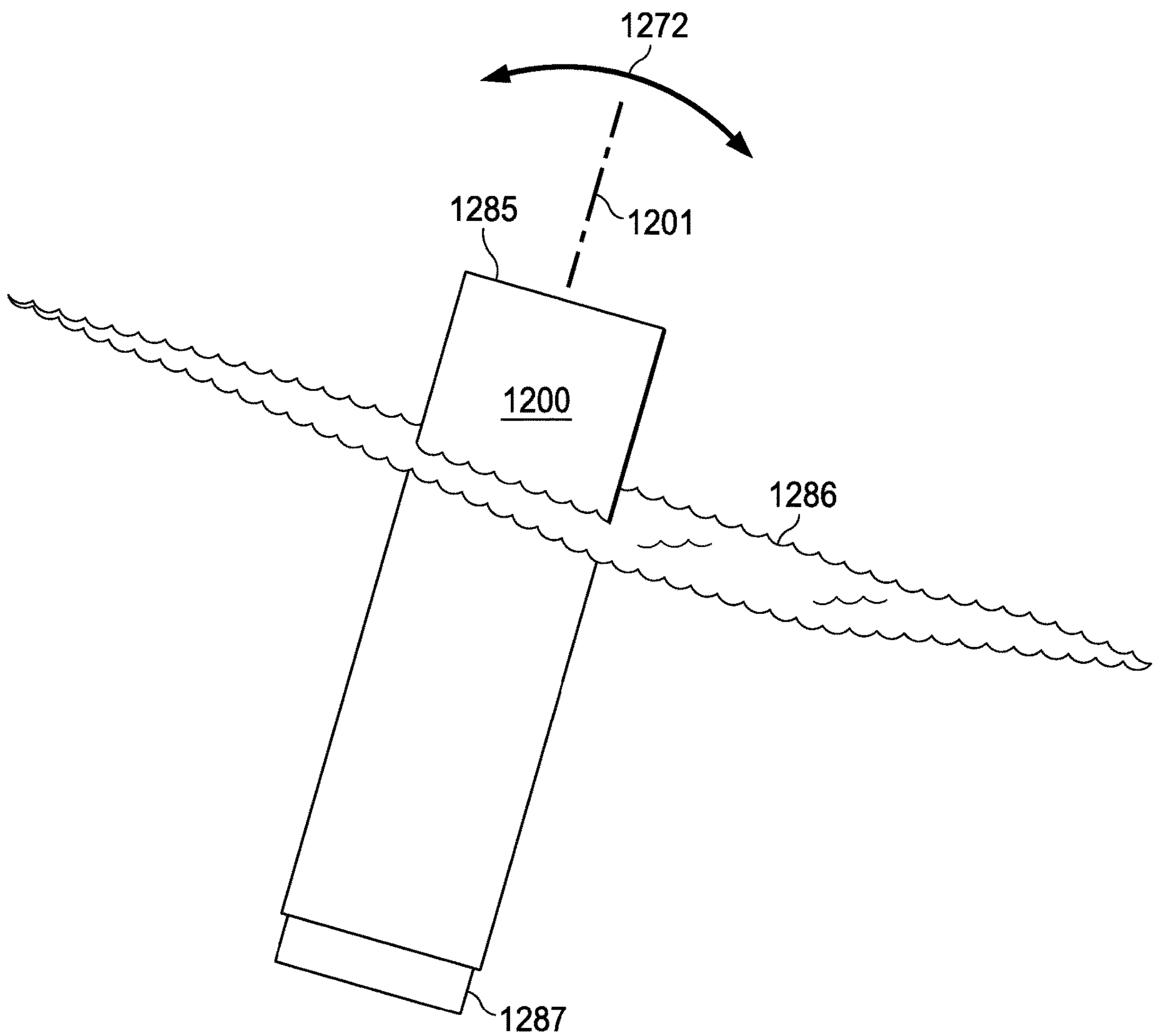

FIG. 134 is a top sectional view of the embodiment of FIG. 124;

FIG. 135 is an upward looking perspective sectional view of the embodiment of FIG. 124;

FIG. 136 is a downward looking perspective sectional view of the embodiment of FIG. 124;

FIG. 137 is a partial cross sectional view of the embodiment of FIG. 124;

FIG. 138 is a schematic view of an embodiment of present invention;

FIG. 139 is a schematic view of another embodiment of present invention;

FIG. 140 is a side sectional view of the embodiment of FIG. 139;

FIG. 141 is an elevated, perspective view of another embodiment of present invention;

FIG. 142 is a top view of the embodiment of FIG. 141;

FIG. 143 is a cross sectional view of the embodiment FIG. 141;

FIG. 144 is a schematic view of an embodiment of present invention

Figure 145:
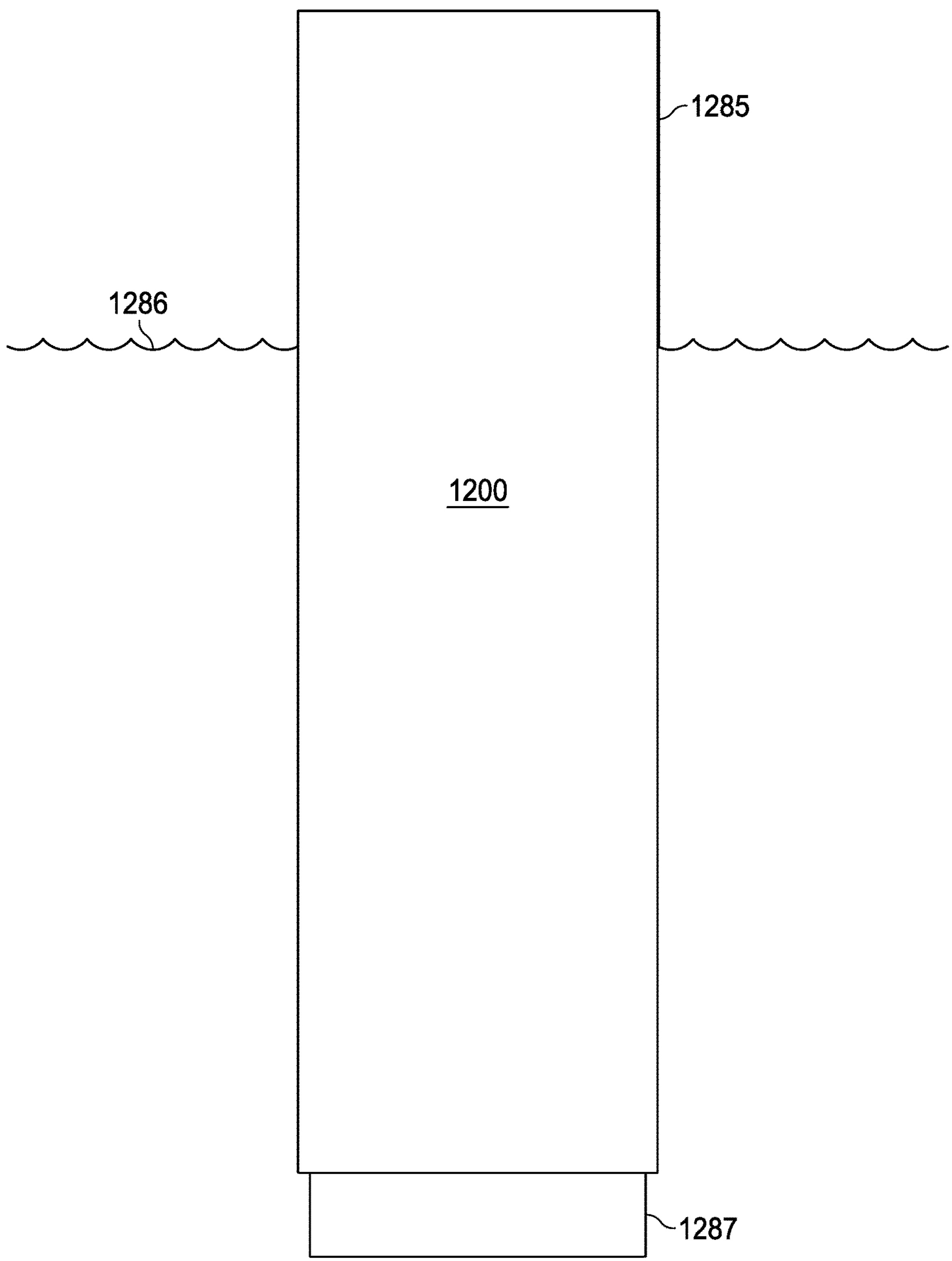
Figure 146:
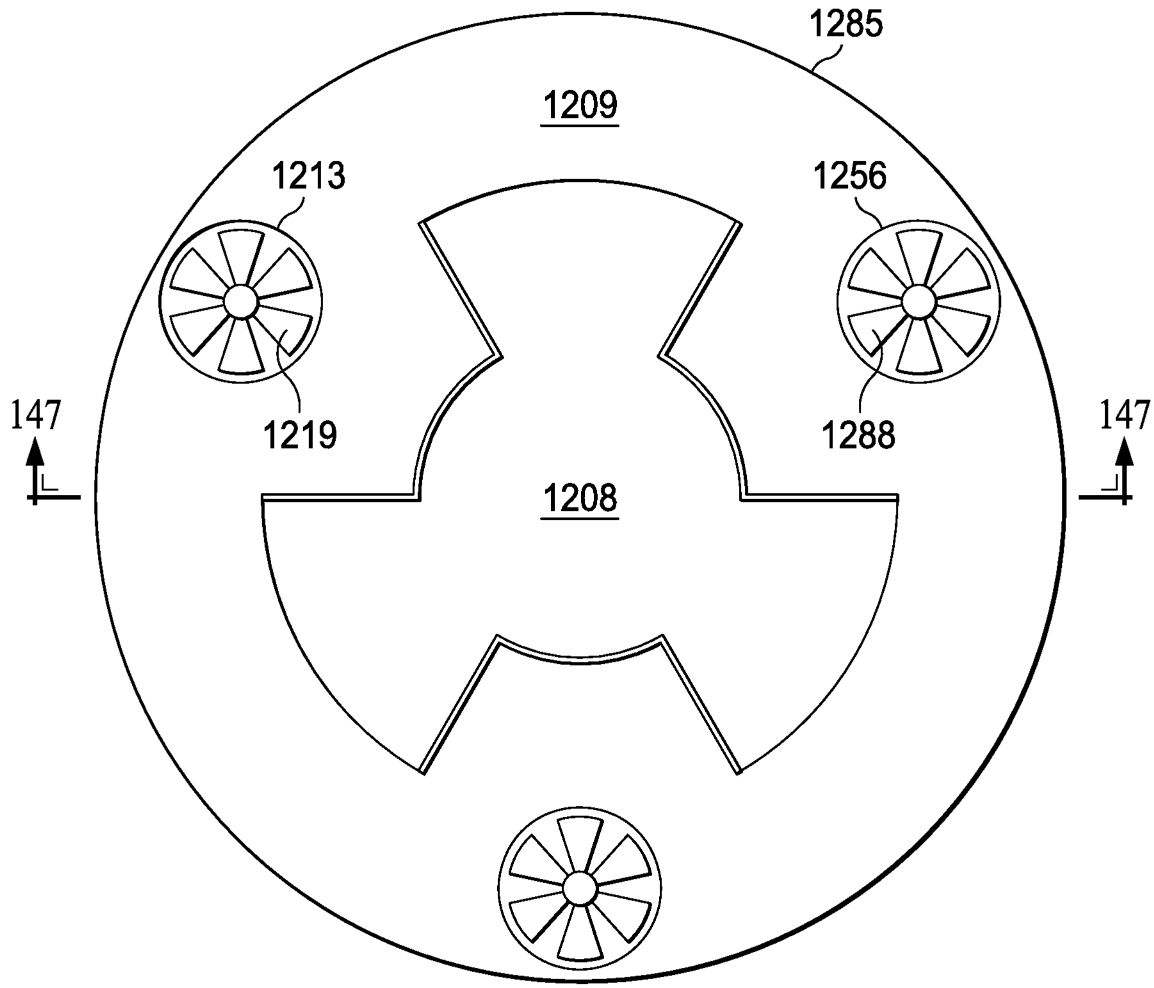
Figure 147:
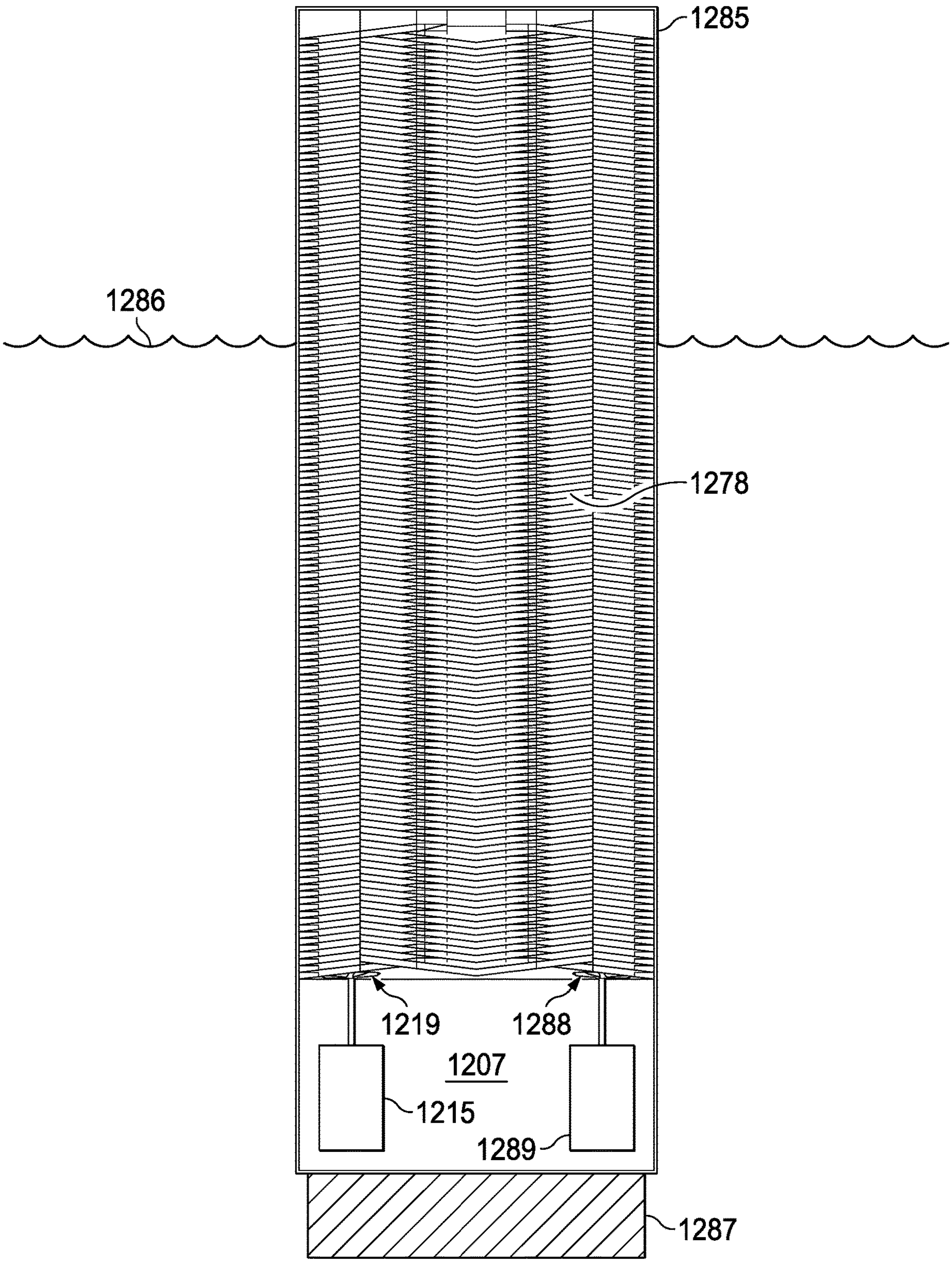
Figure 148:
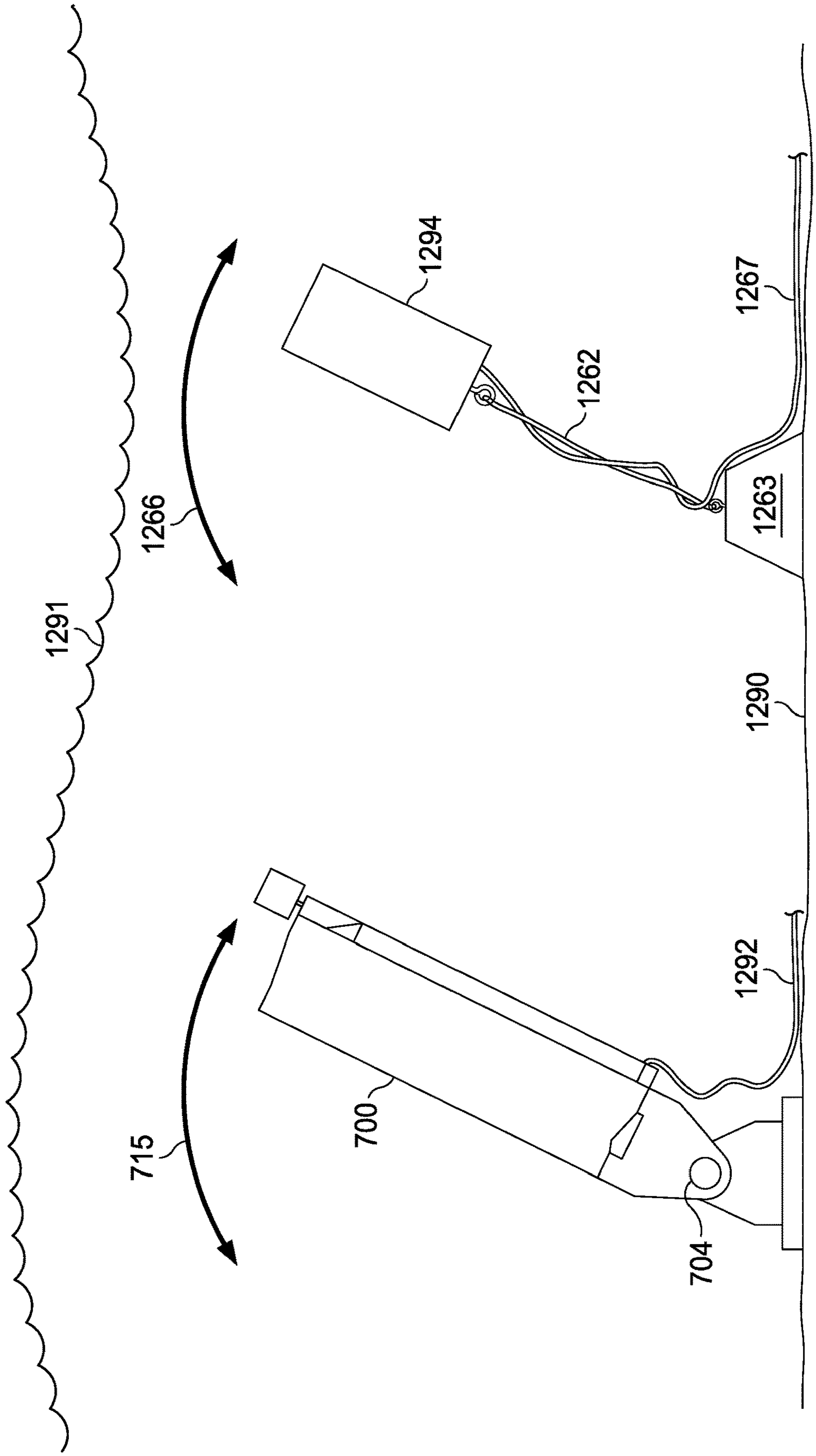
Figure 149:
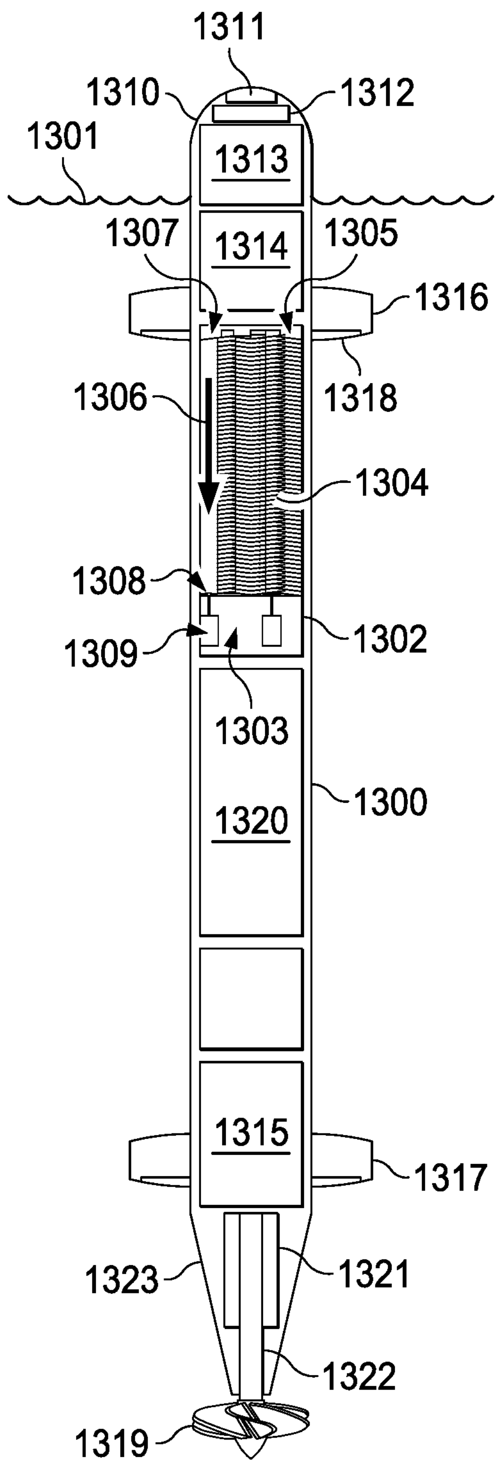
Figure 150:
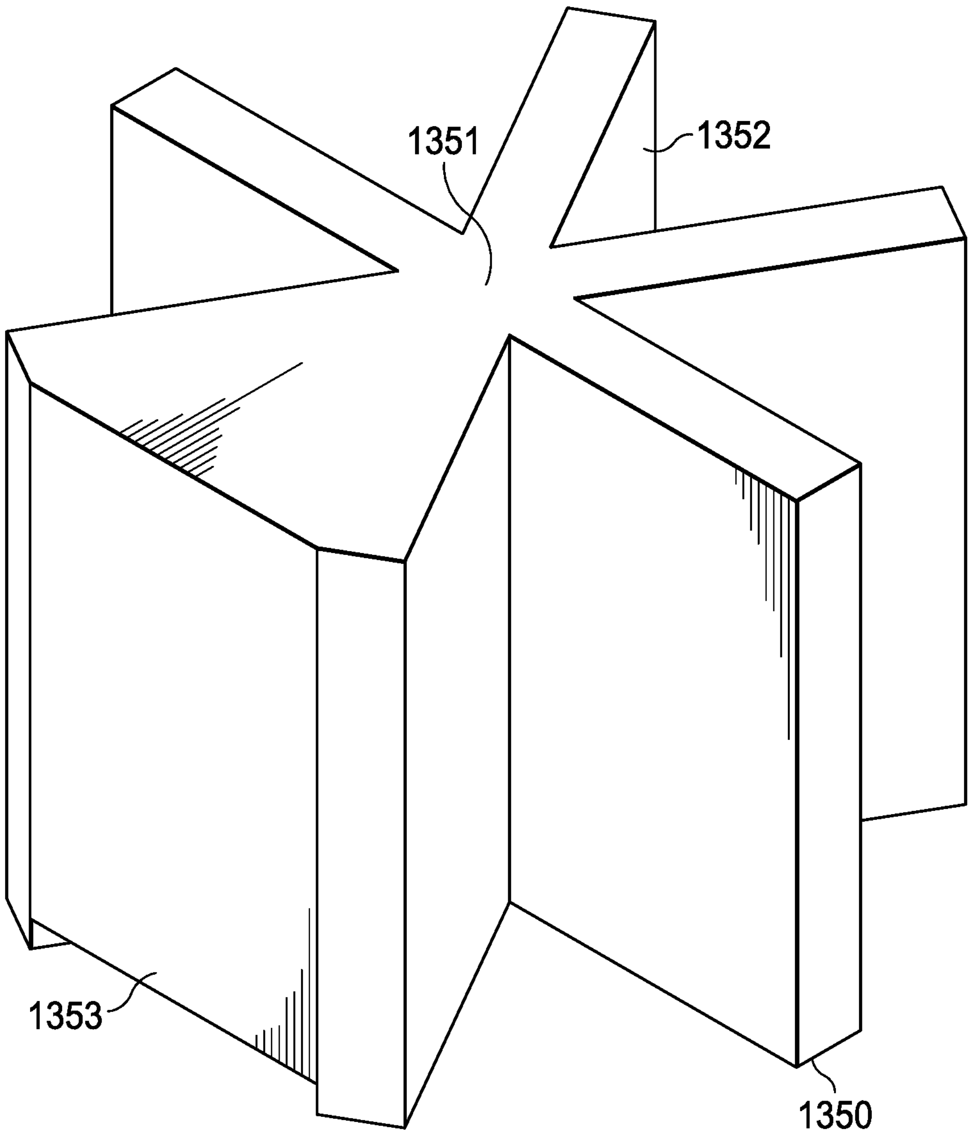
Figure 151:
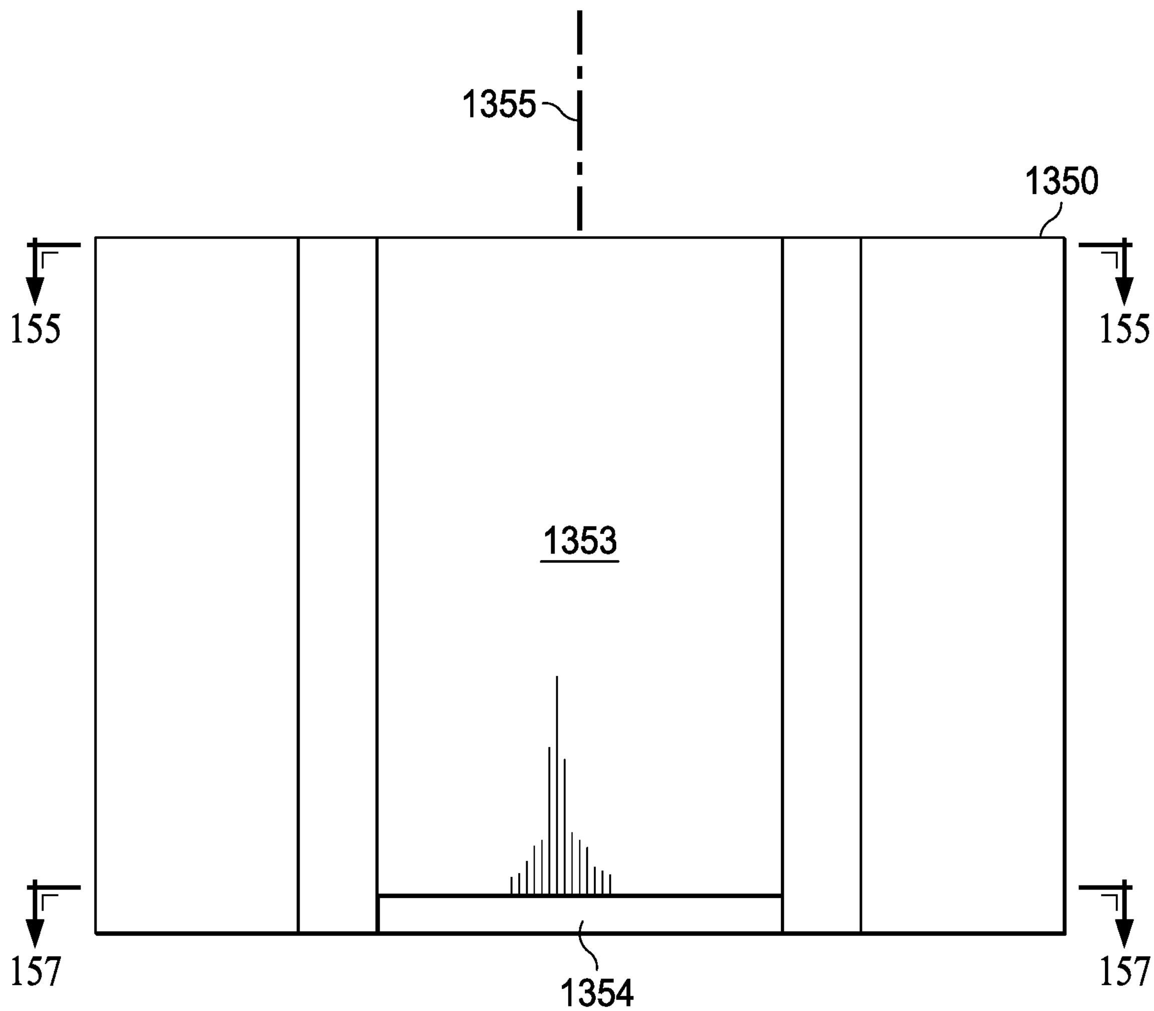
Figure 152:
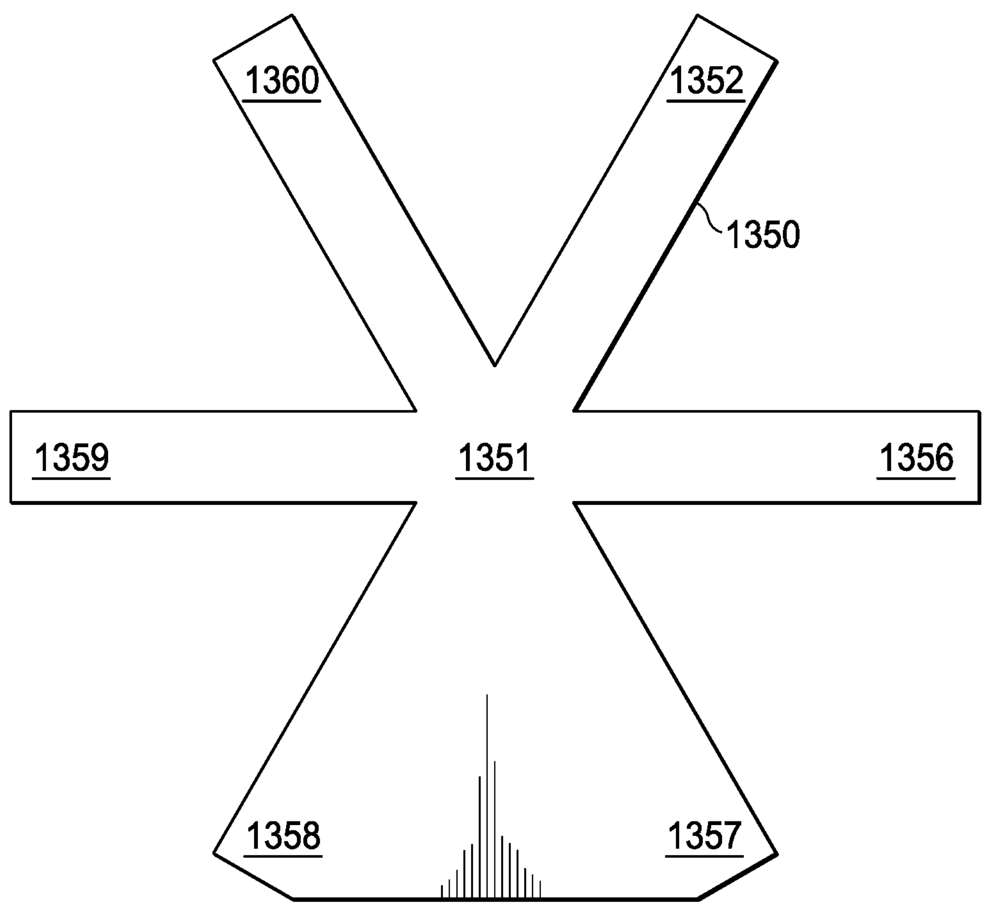
Figure 153:
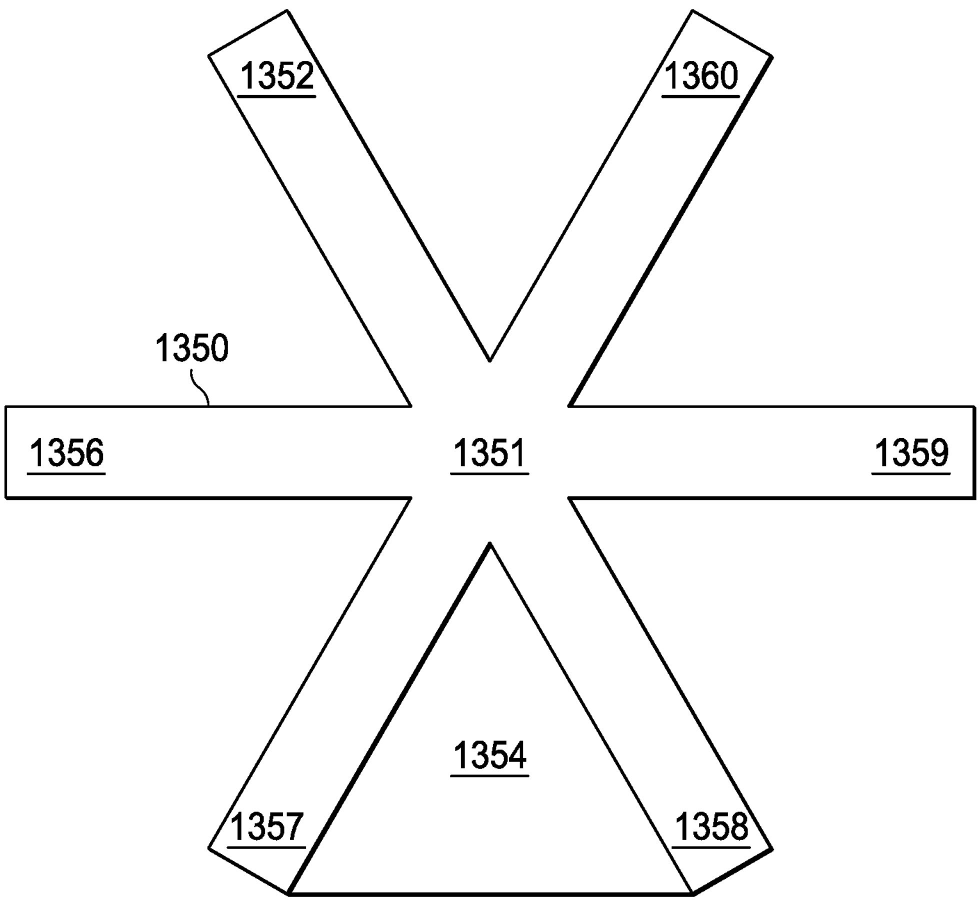
Figure 154:
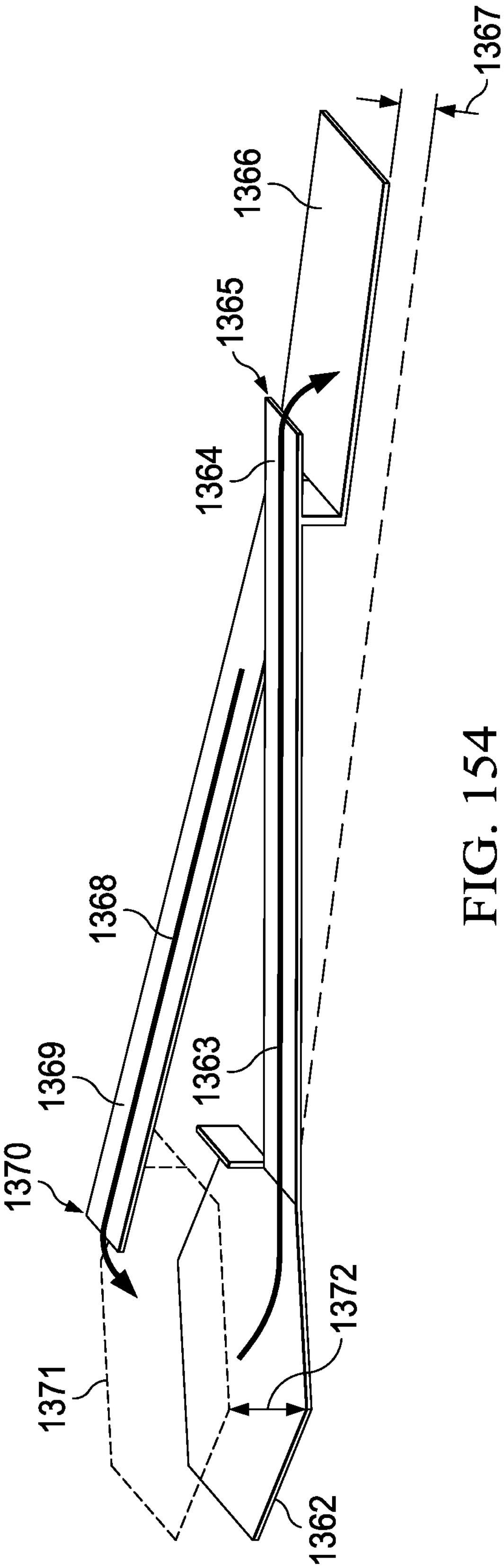
Figure 155:
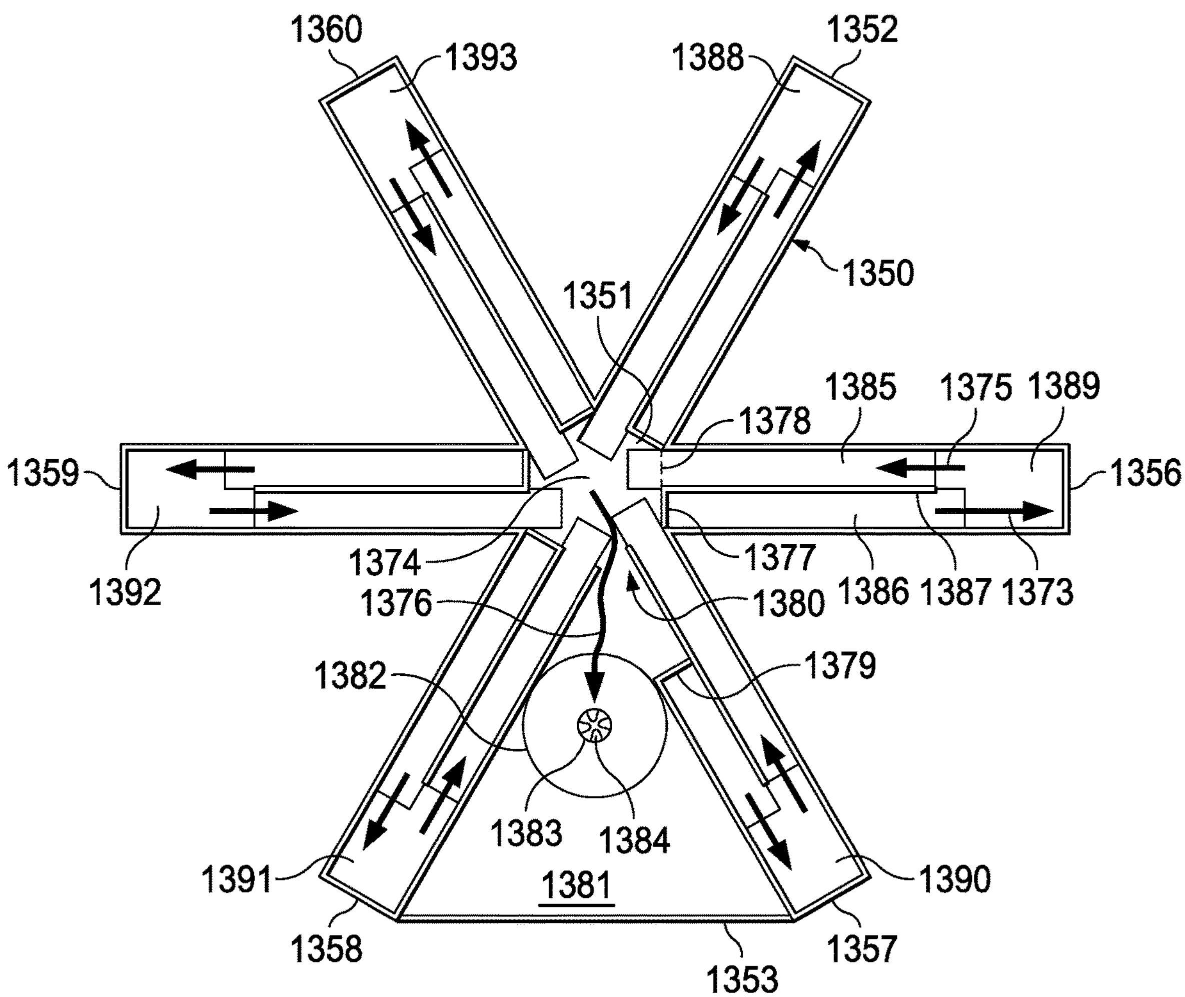
Figure 156:
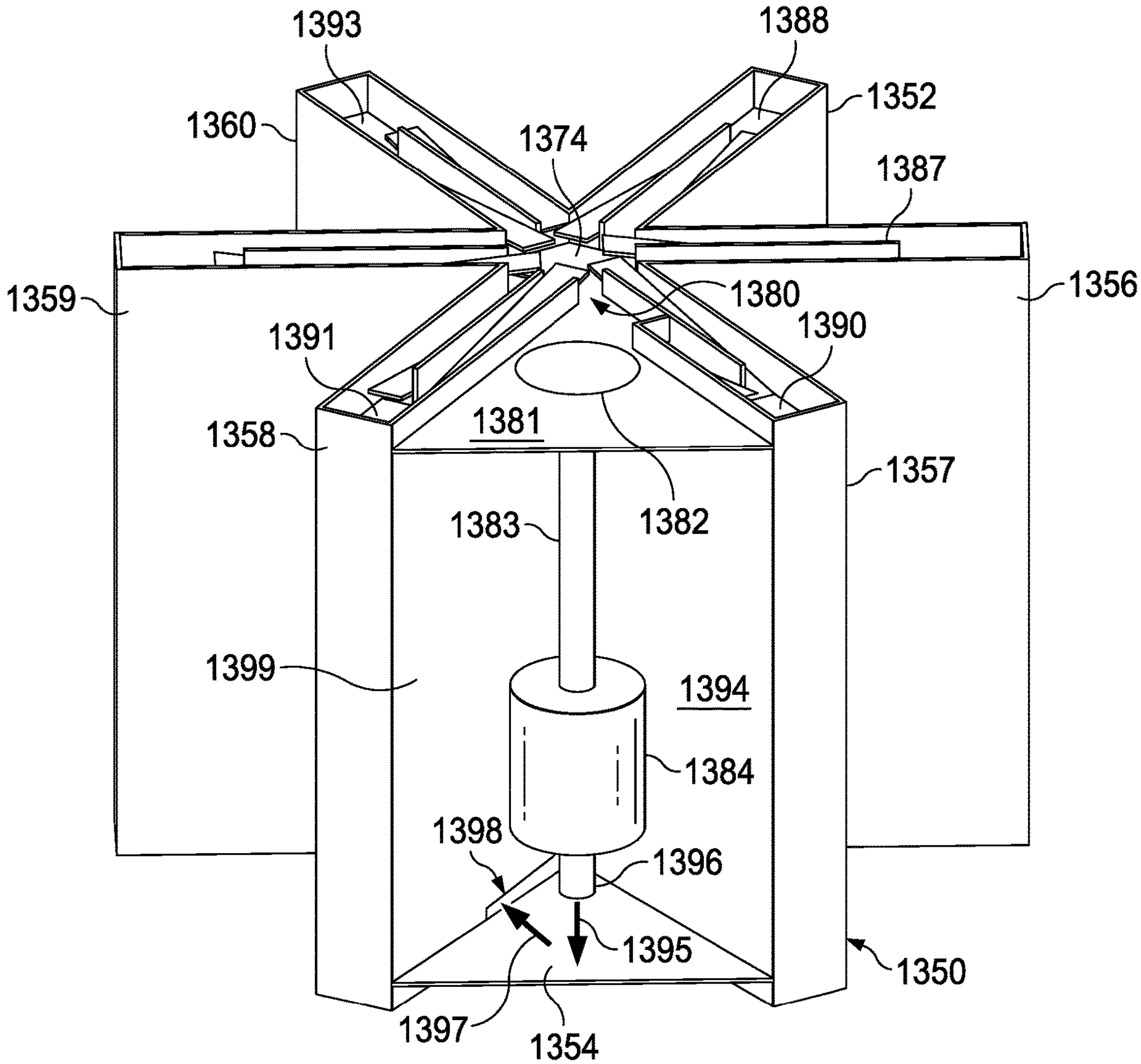
Figure 157:
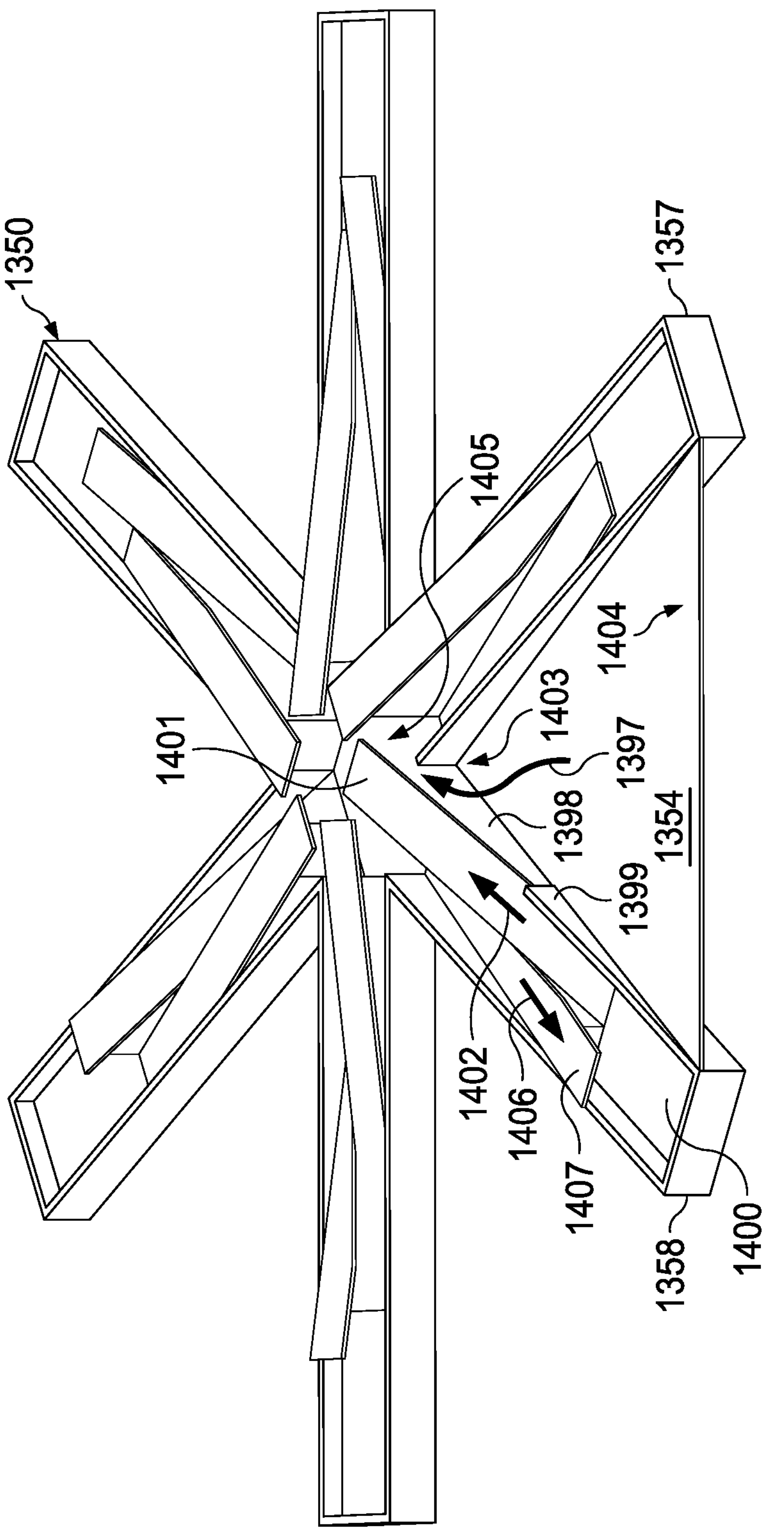
Figure 158:
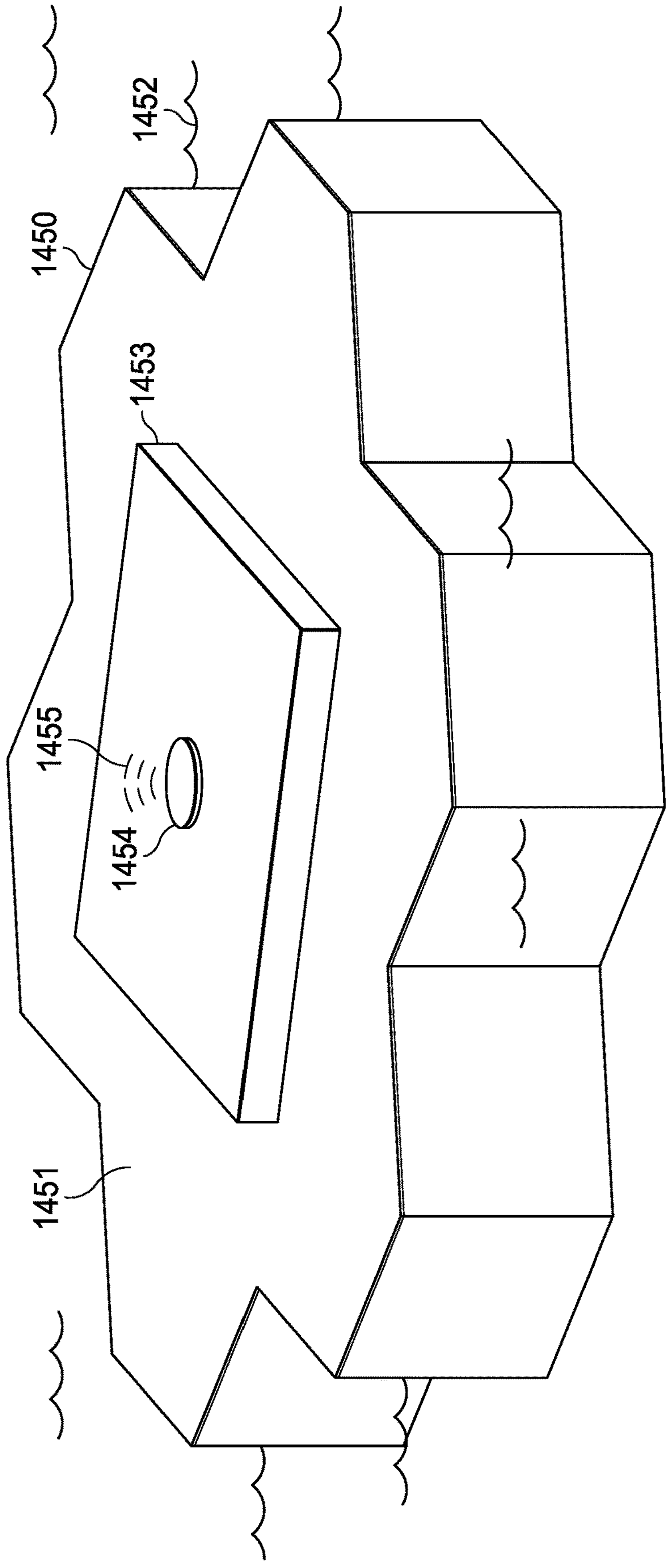
Figure 159:
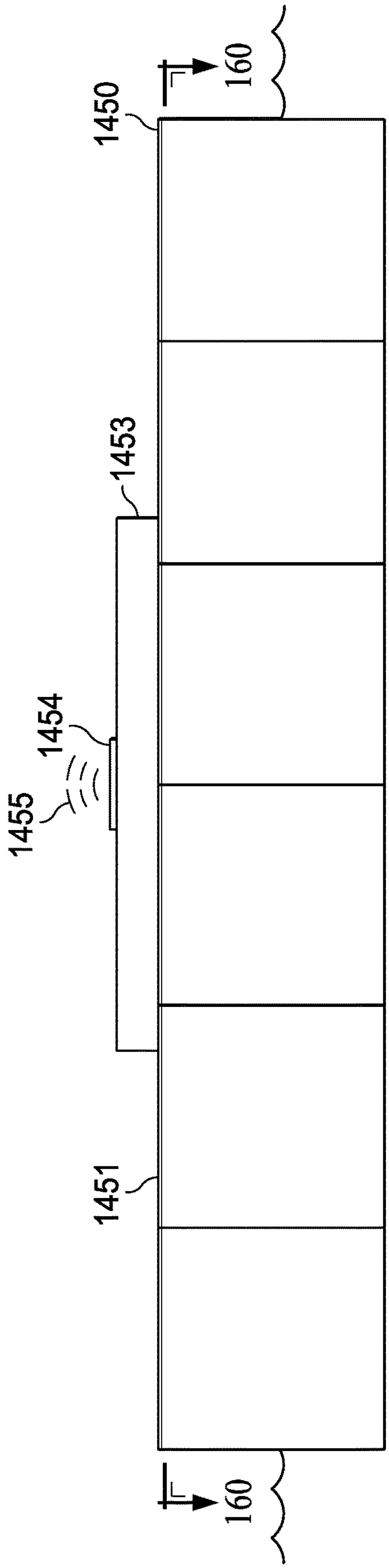
Figure 160:
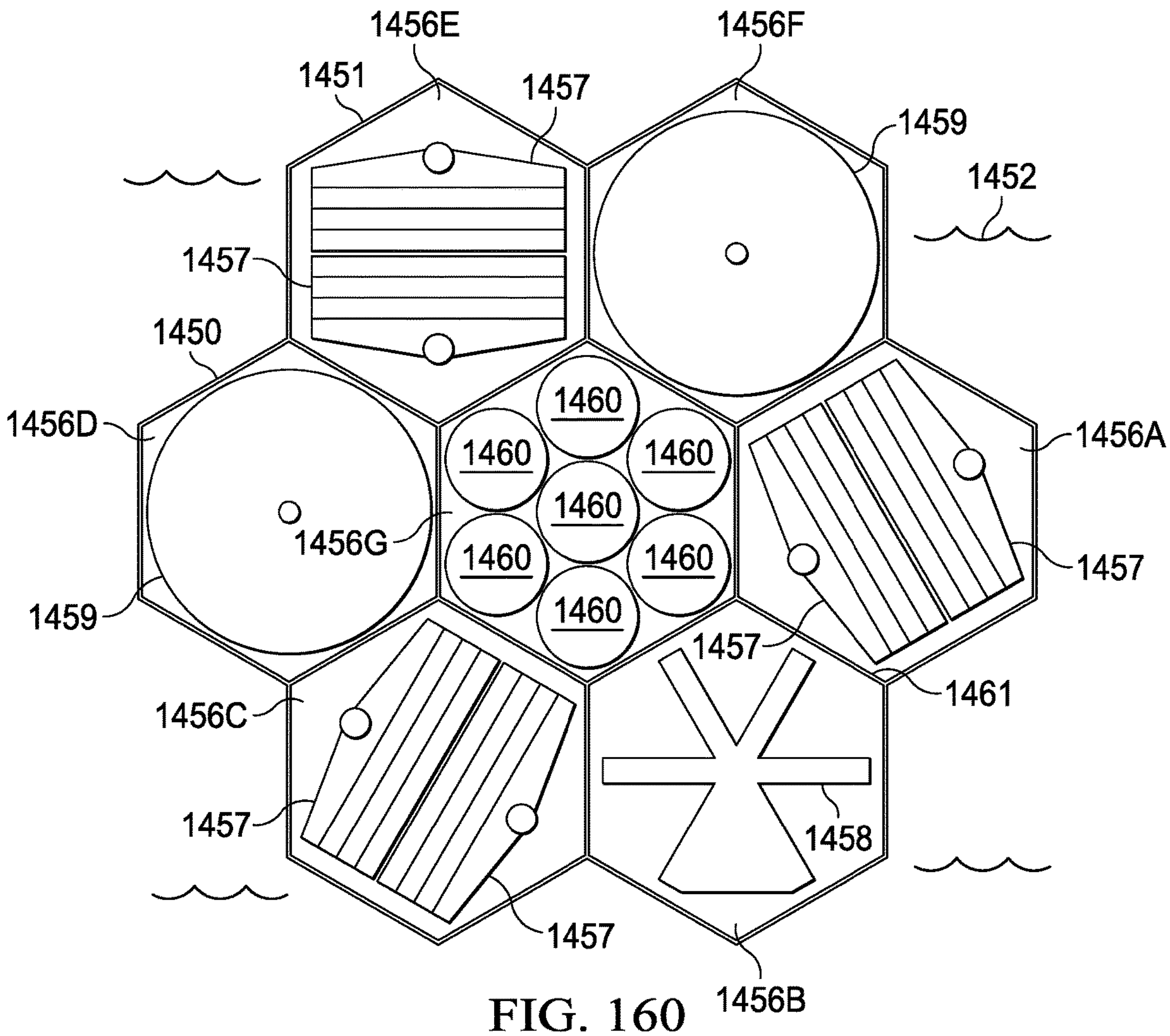
Figure 161:
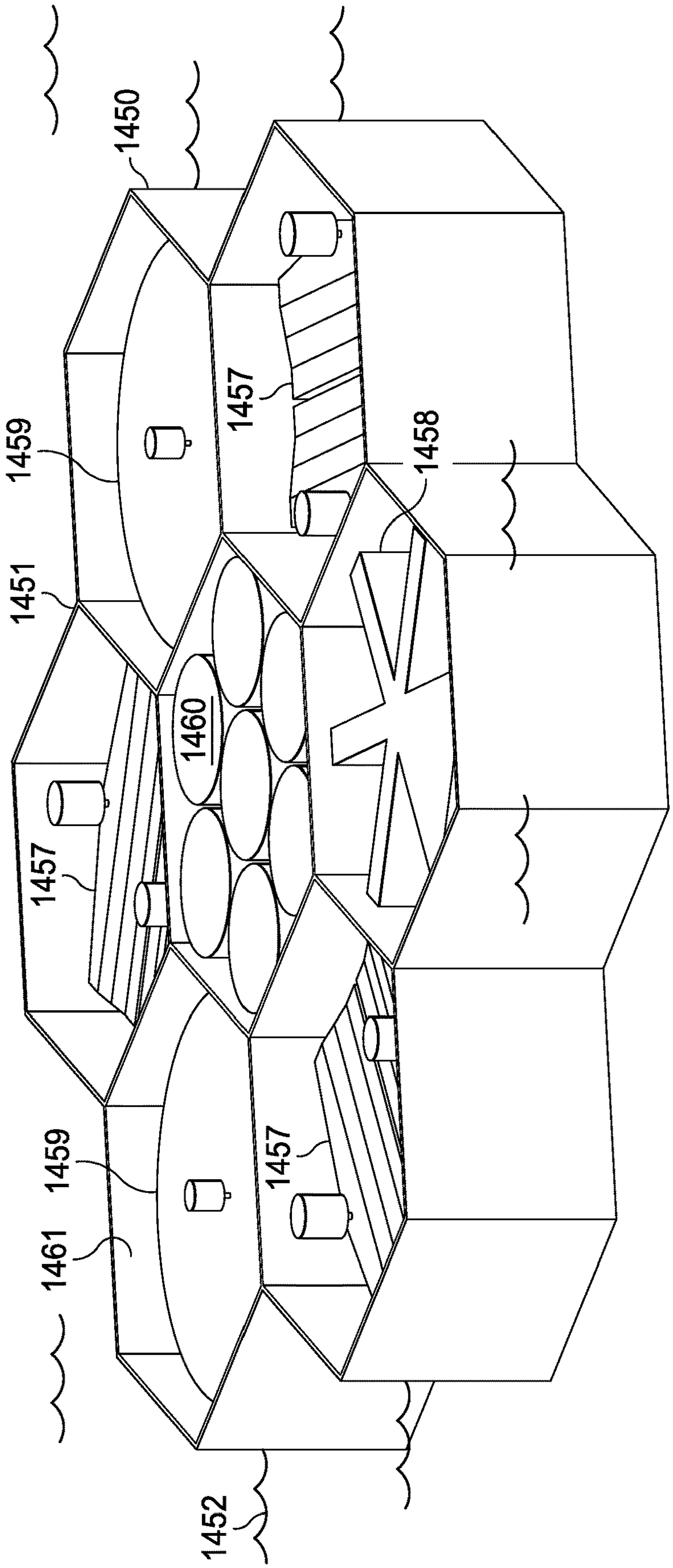
Figure 162:
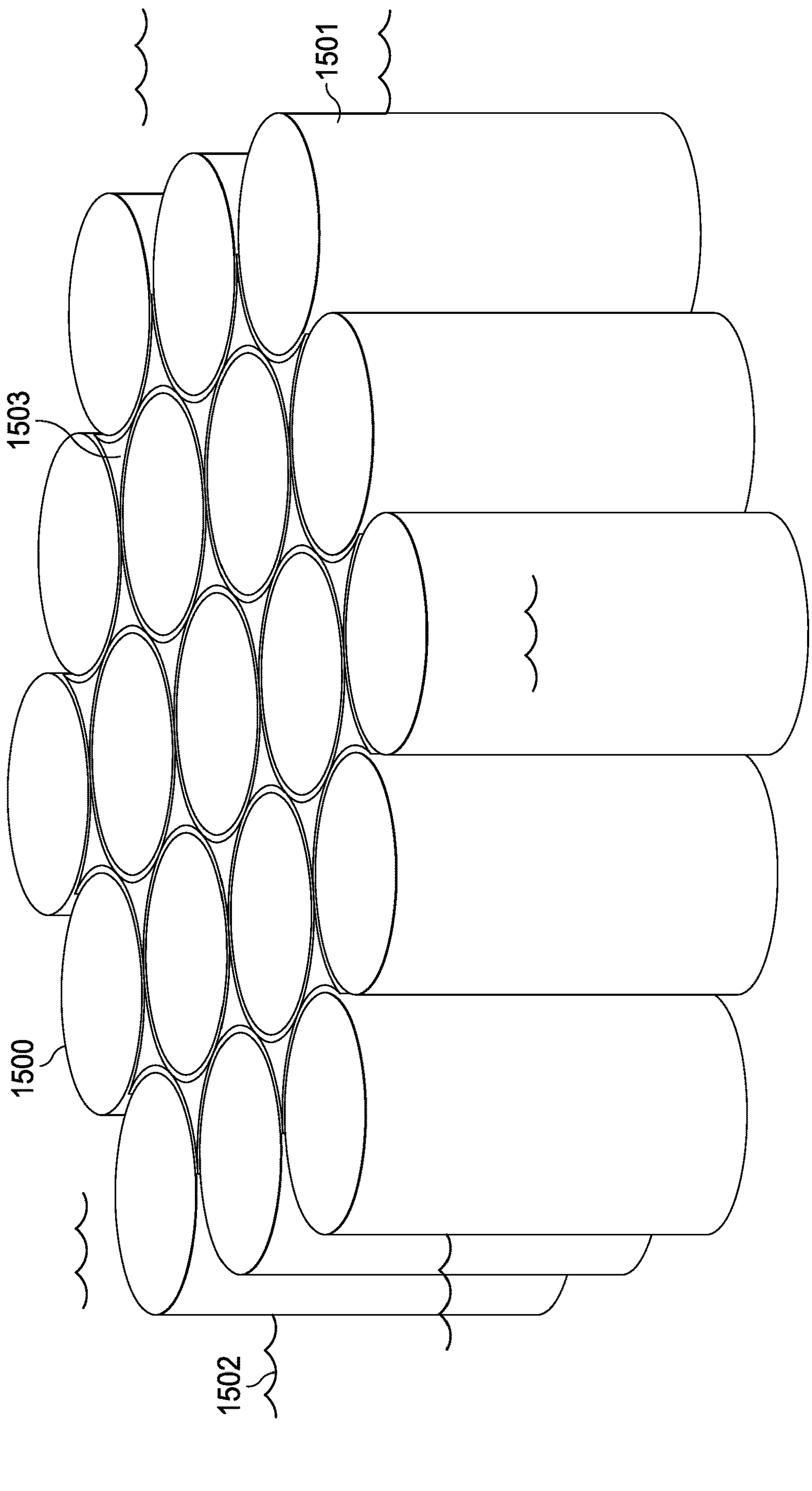
Figure 163:
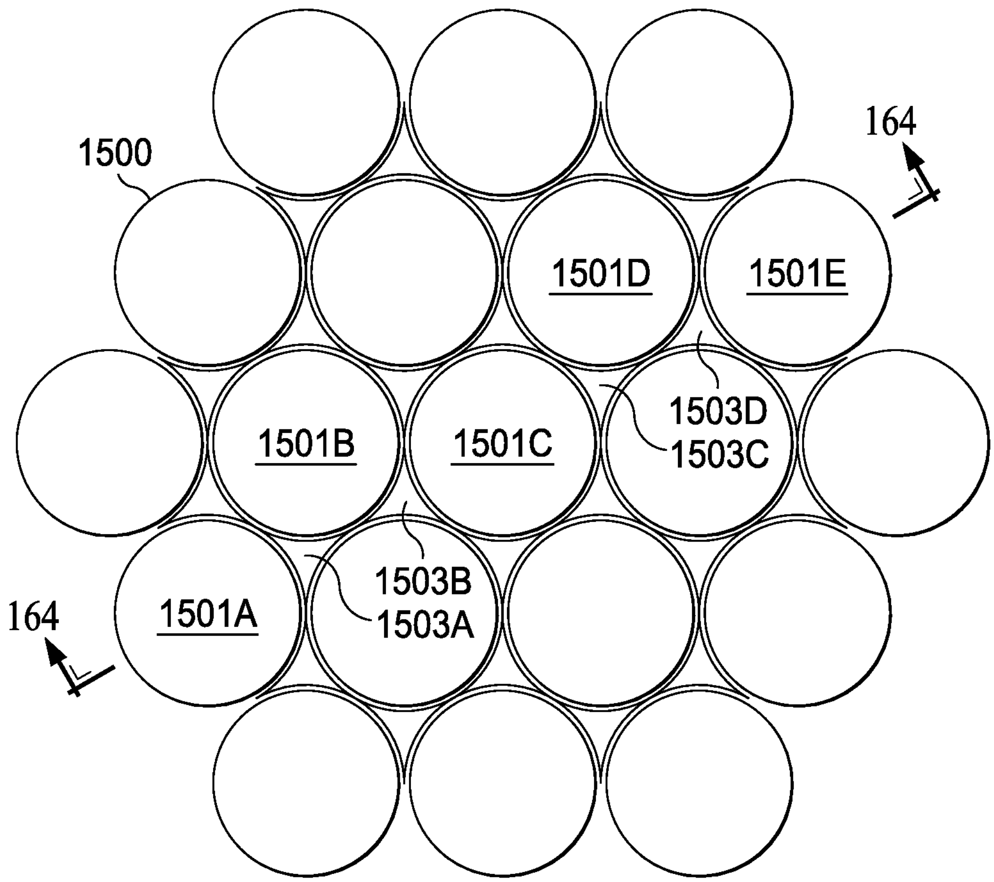
Figure 164:
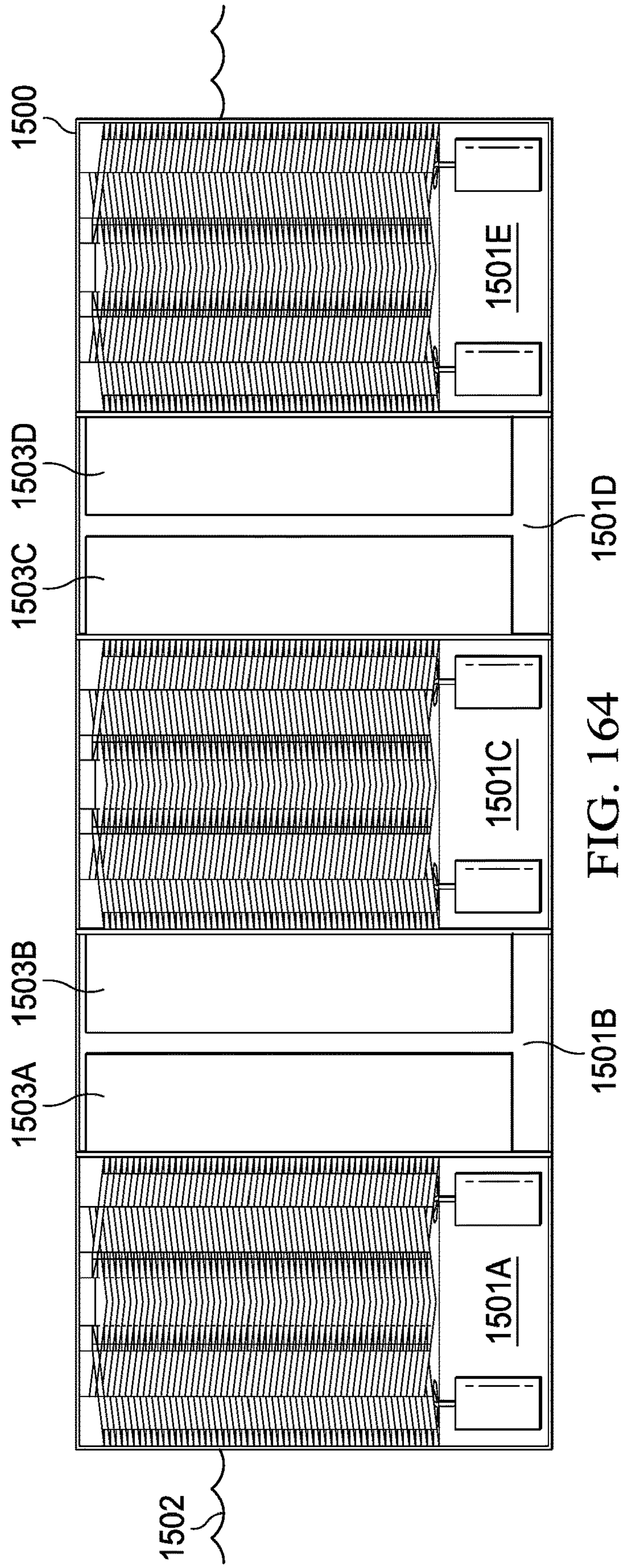
Figure 165:
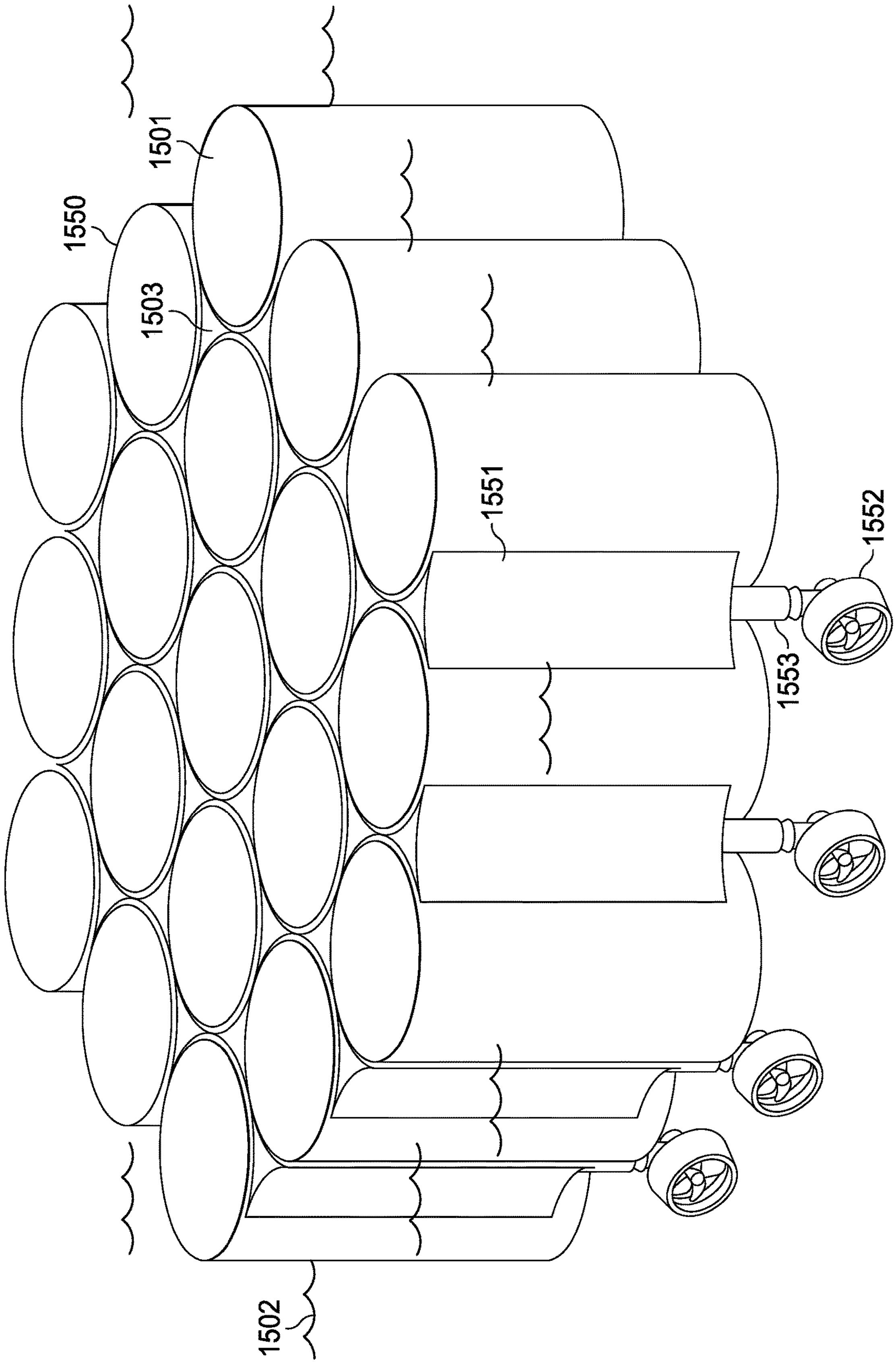
Figure 166:
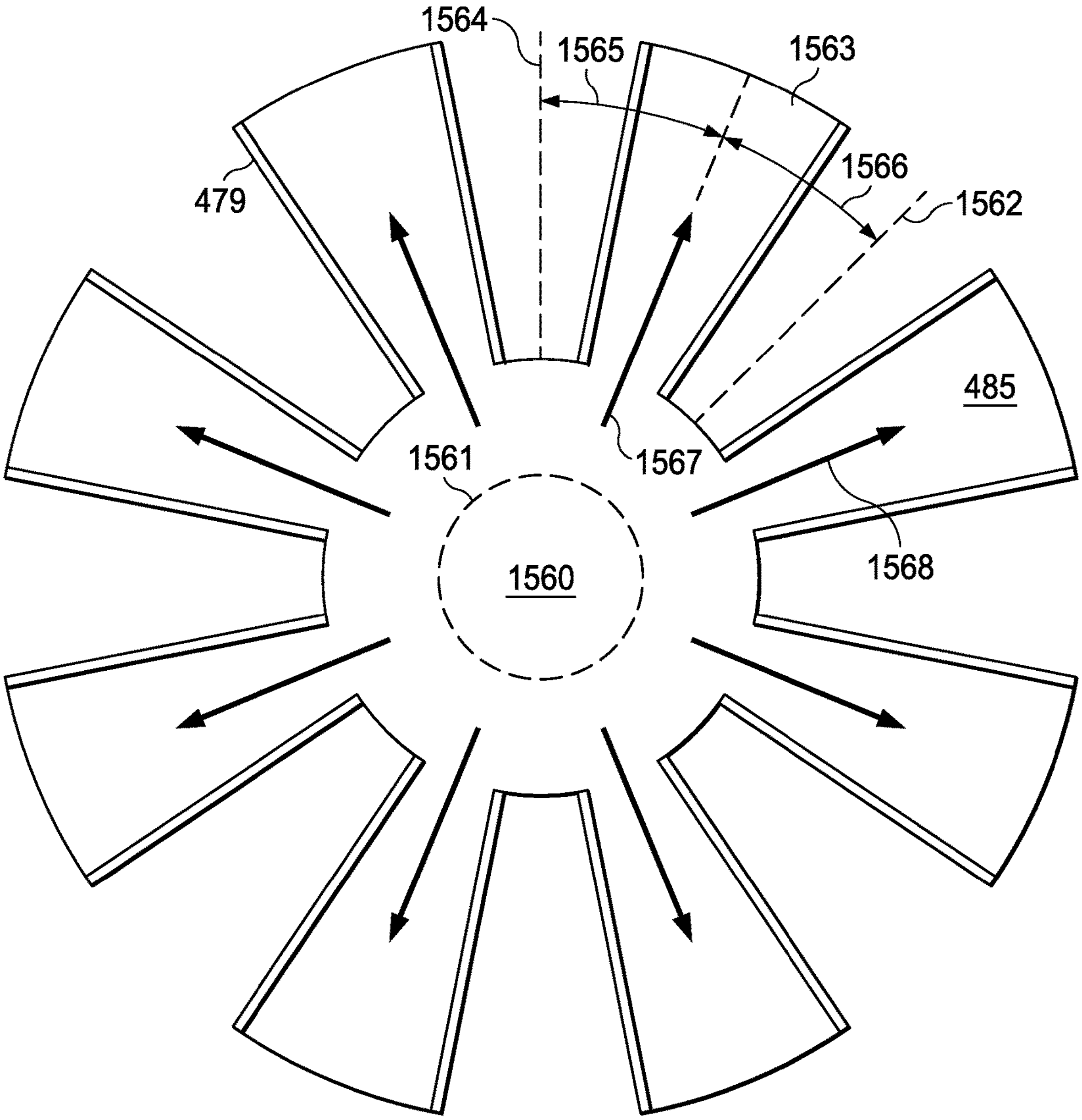
Figure 167:
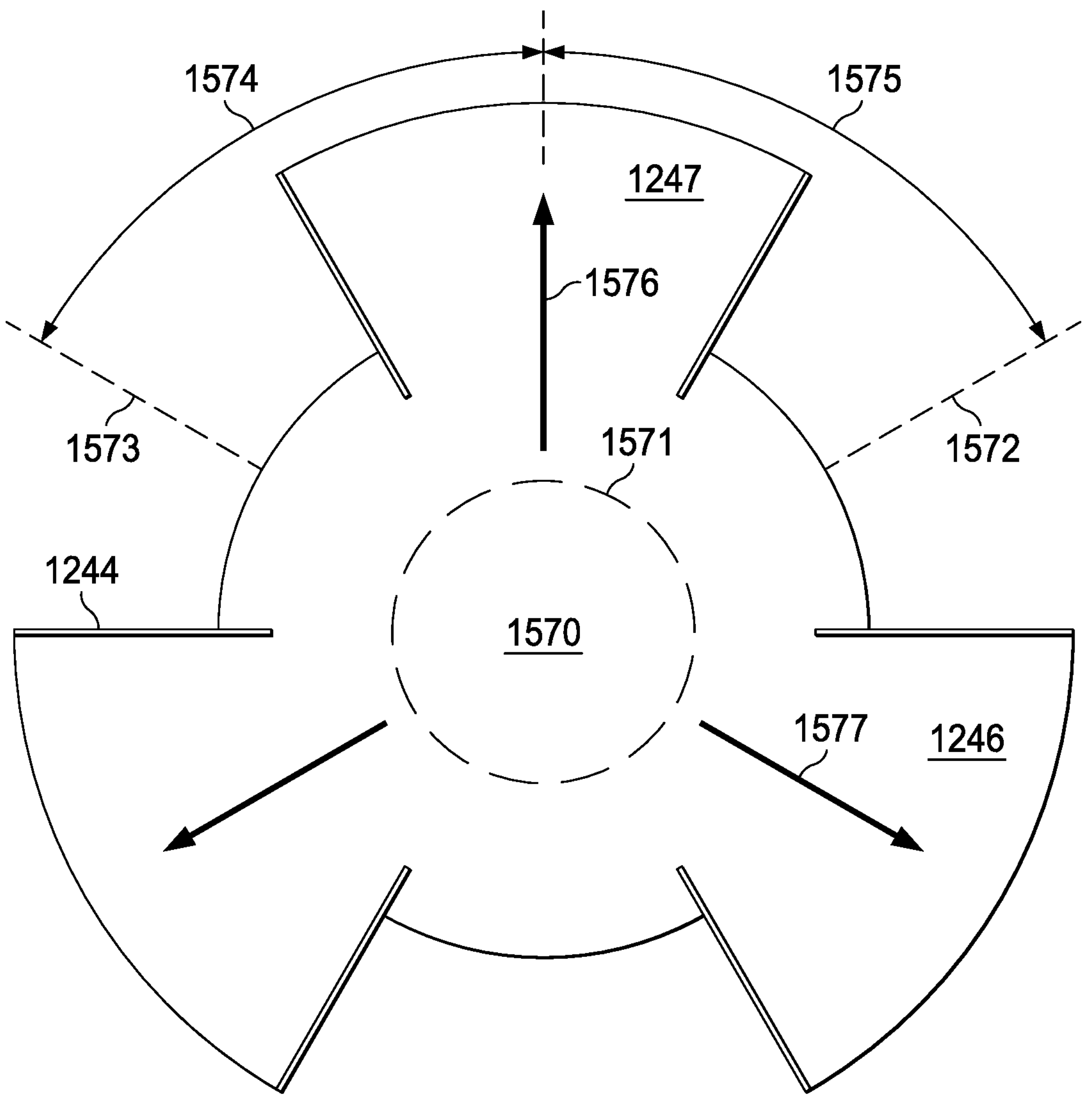
Figure 168:
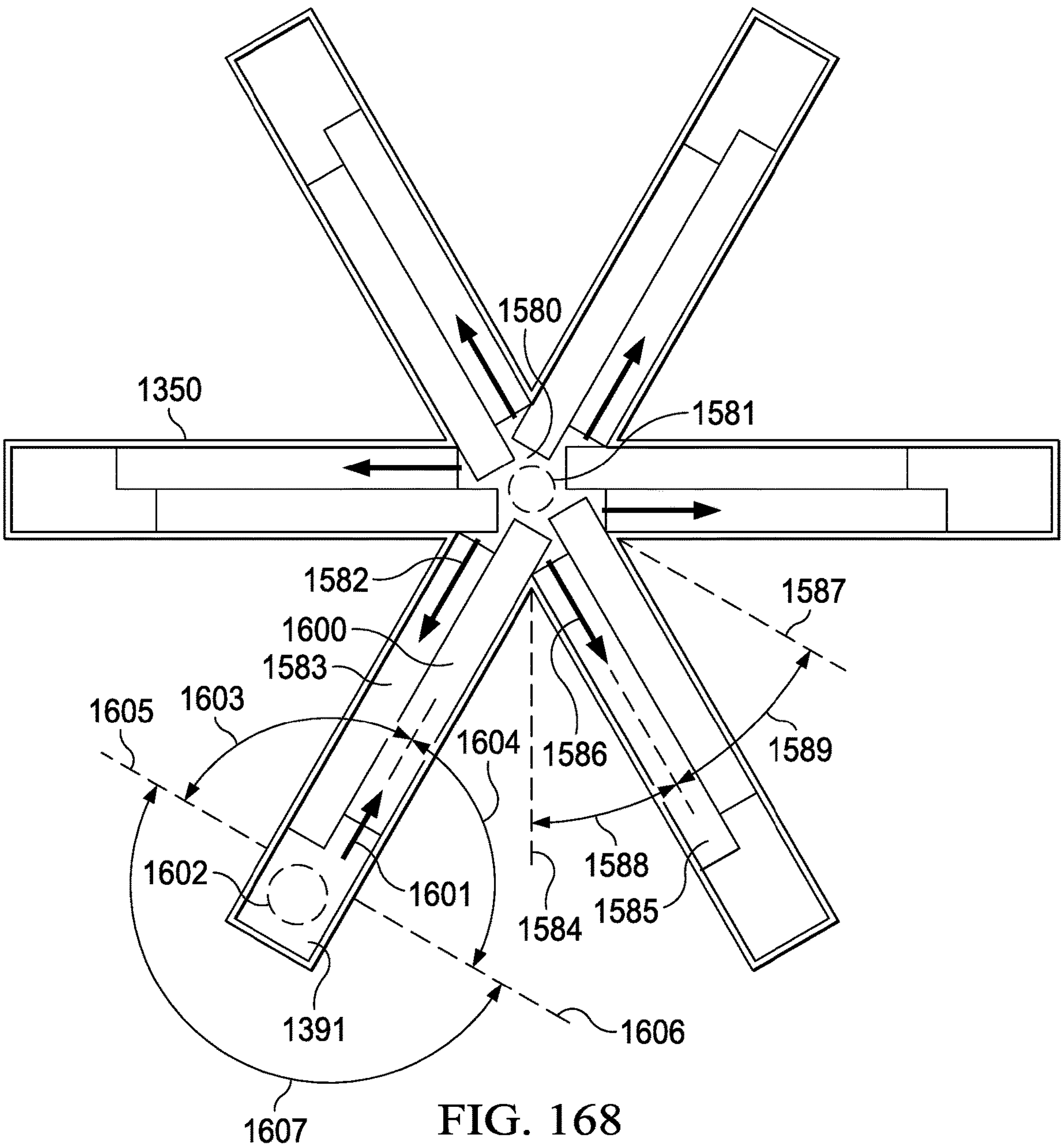
Figure 169:
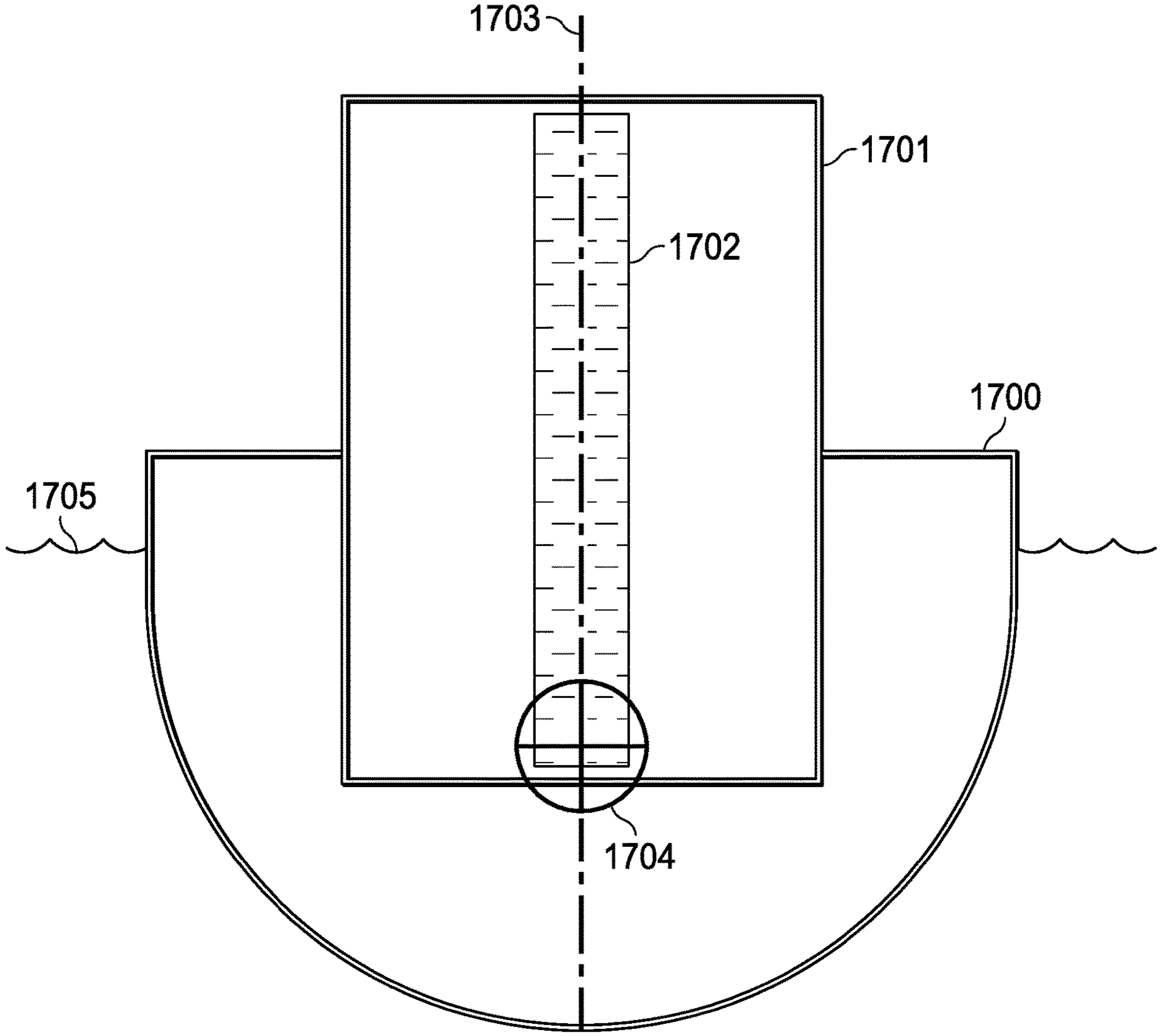
Figure 170:
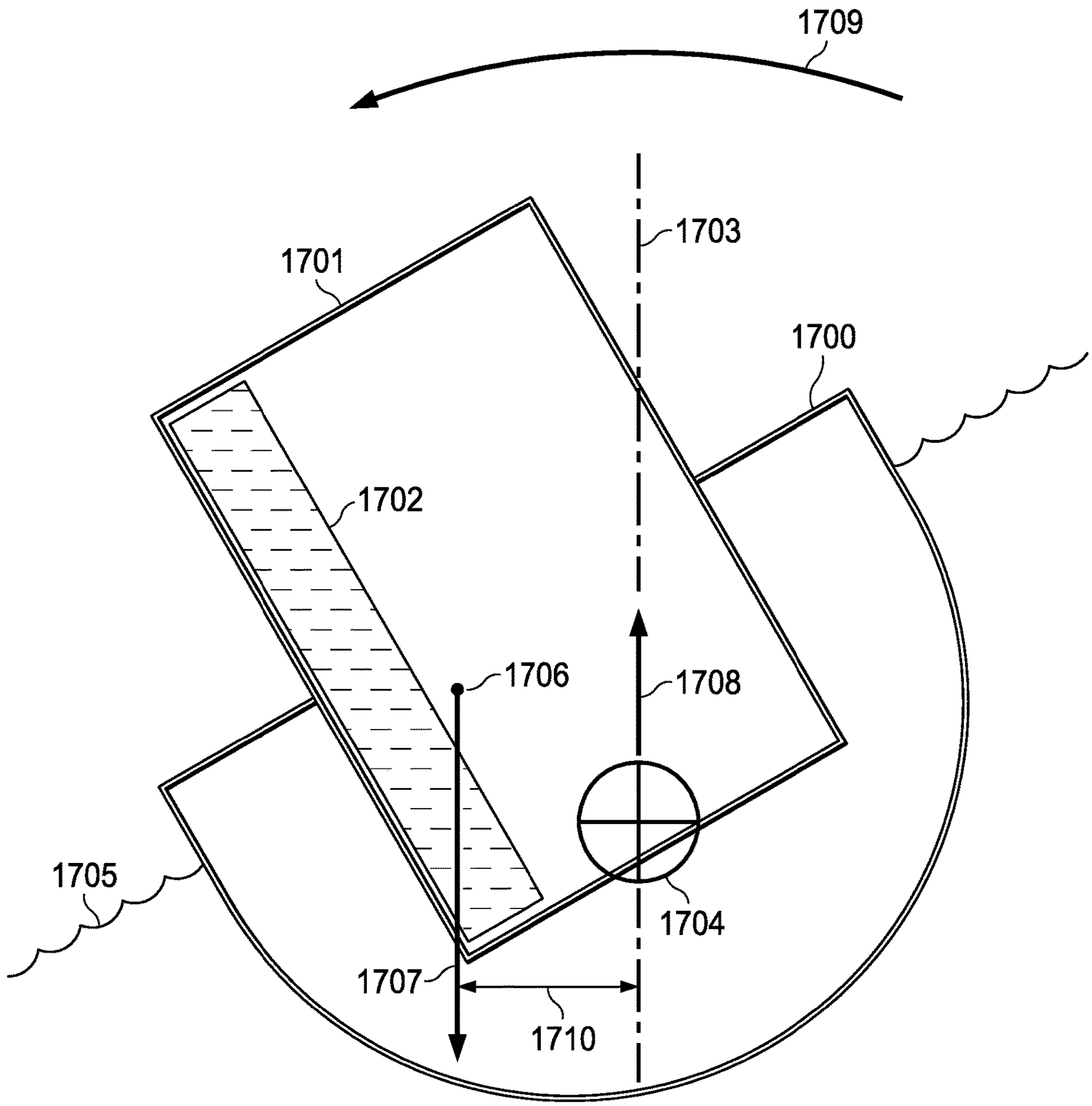
Figure 171:
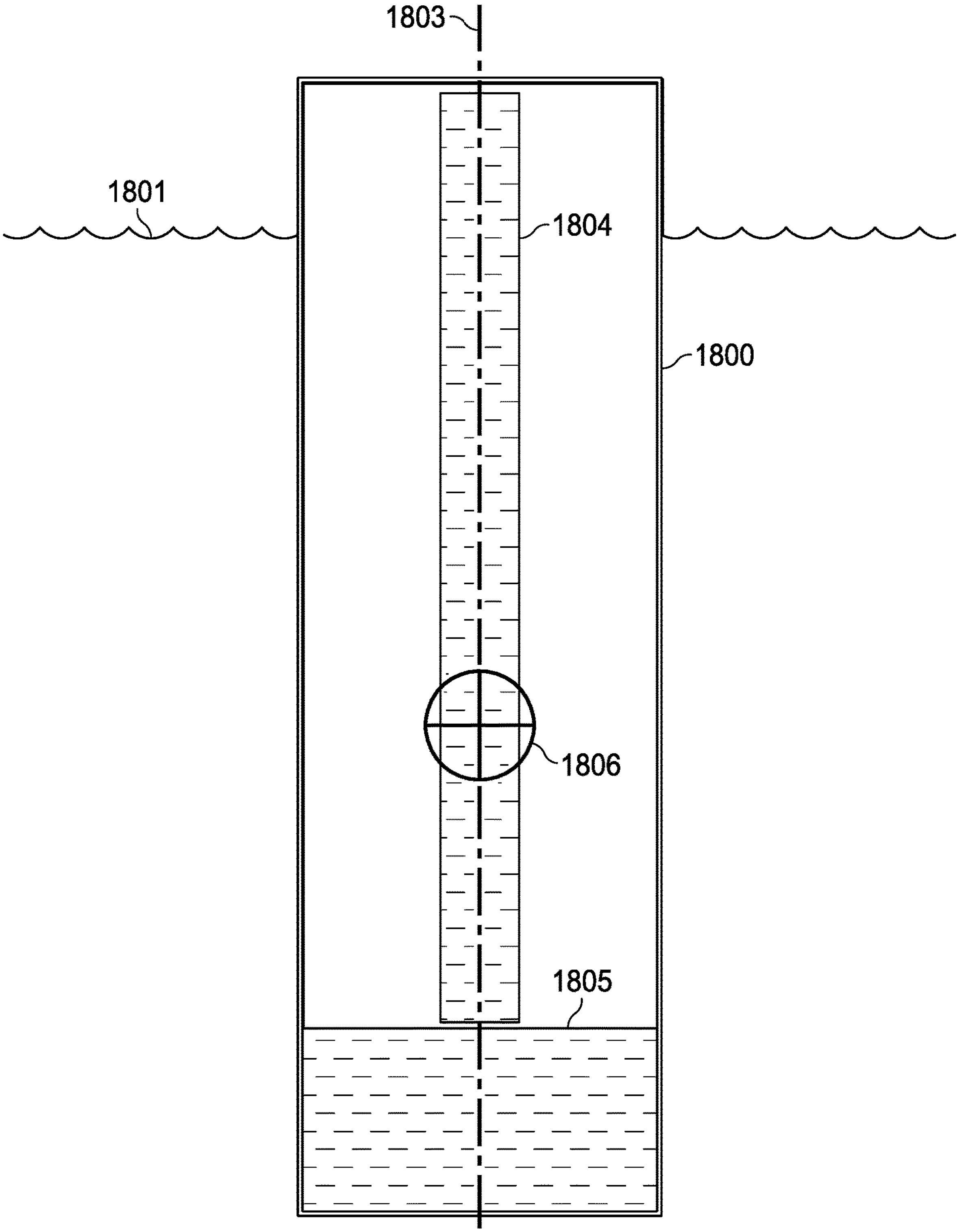
Figure 172:
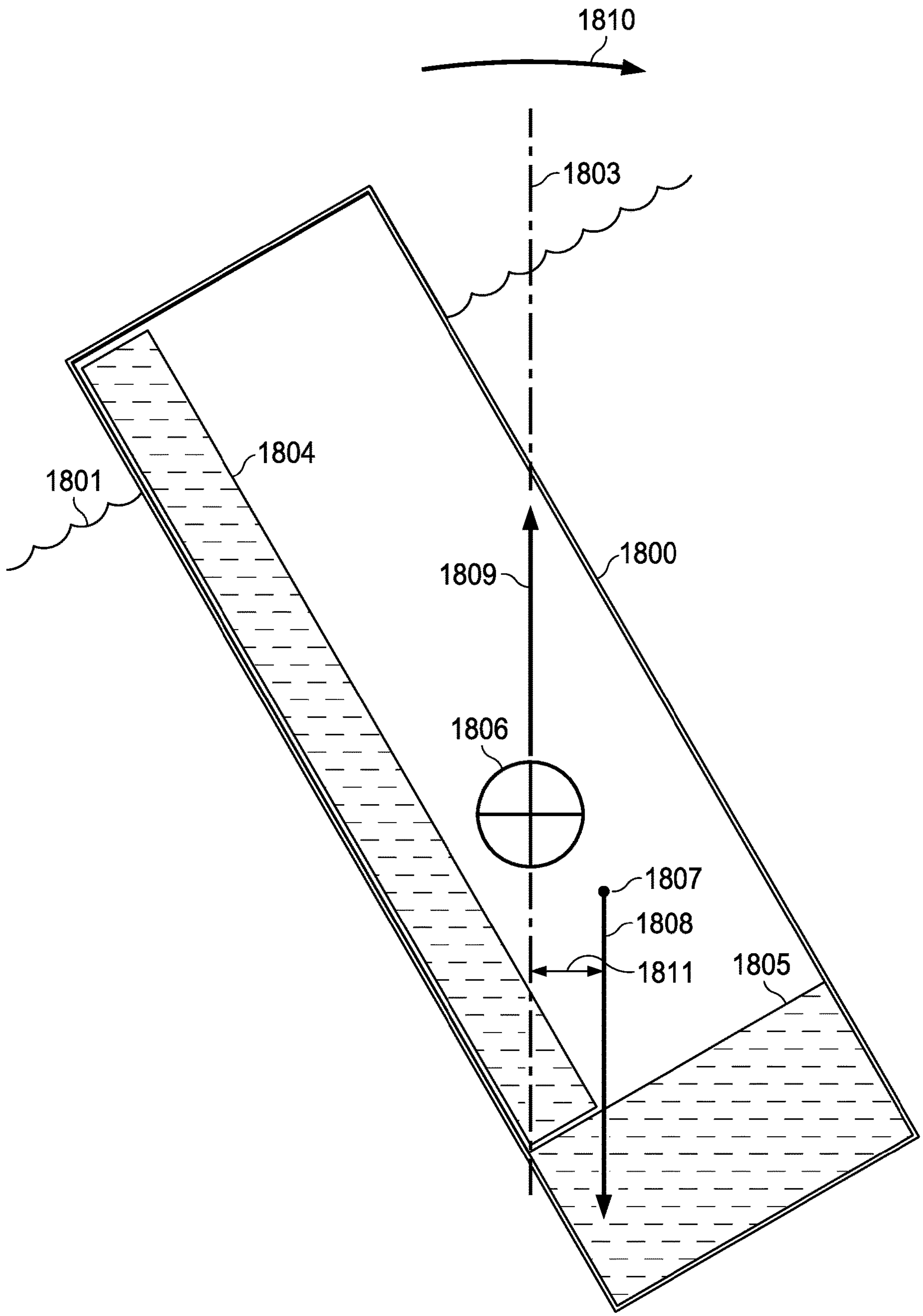

FIG. 145 is a side view of the embodiment of FIG. 144;

FIG. 146 is a top down cross sectional view of the embodiment of FIG. 144;

FIG. 147 is a side cross sectional view of the embodiment of FIG. 144;

FIG. 148 is a schematic view of another embodiment of present invention;

FIG. 149 is a sectional view of another embodiment of present invention;

FIG. 150 is an elevated, perspective view of another embodiment of present invention;

FIG. 151 is a side view of the embodiment of FIG. 150;

FIG. 152 is a top view of the embodiment of FIG. 150;

FIG. 153 is a bottom view of the embodiment of FIG. 150;

FIG. 154 is a sectional view, partially in shadow, of the embodiment of FIG. 150;

FIG. 155 is a top sectional view of the embodiment of FIG. 150;

FIG. 156 is an elevated, perspective sectional view of the embodiment of FIG. 150;

FIG. 157 is another elevated, perspective sectional view of the embodiment of FIG. 150;

FIG. 158 is an elevated, perspective view of another embodiment of present invention;

FIG. 159 is a side view of the embodiment of FIG. 158;

FIG. 160 is a top down sectional view of the embodiment of FIG. 158;

FIG. 161 is an elevated, perspective sectional view of the embodiment of FIG. 158;

FIG. 162 is an elevated, perspective view of another embodiment of present invention;

FIG. 163 is a top view of the embodiment of FIG. 162;

FIG. 164 is a cross sectional view of the embodiment of FIG. 162;

FIG. 165 is an elevated, perspective view of another embodiment of present invention;

FIG. 166 is a top down sectional view of the embodiment of FIG. 165;

FIG. 167 is another top down sectional view of the embodiment of FIG. 165;

FIG. 168 is another top down sectional view of the embodiment of FIG. 165;

FIG. 169 is a cross sectional side view of another embodiment of present invention;

FIG. 170 is another cross sectional side view of the embodiment of FIG. 169;

FIG. 171 is a cross sectional side view of another embodiment of present invention; and FIG. 172 is a cross sectional side view of the embodiment of FIG. 171 tilted at an angle.

DETAILED DESCRIPTION OF THE PREFERRED EMBODIMENTS

Figure 1:
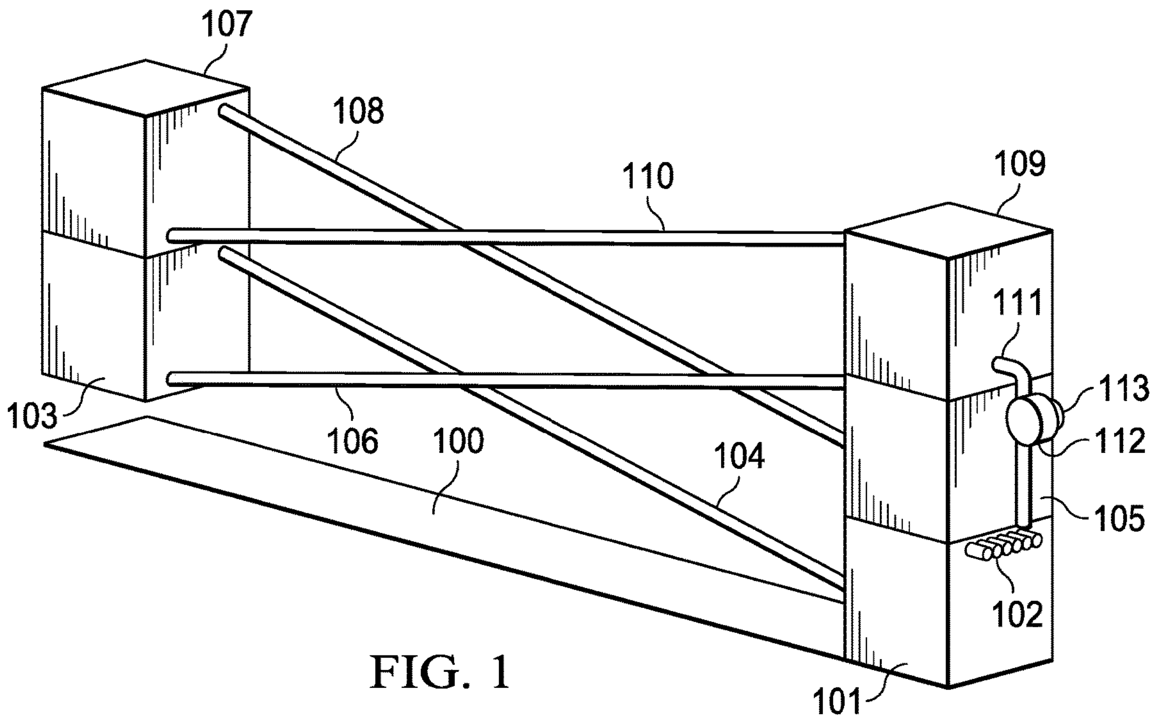
FIG. 1 is an elevated, perspective view of a first embodiment of the present invention.

FIG. 1 shows a perspective side view of a power takeoff (PTO) representative of an embodiment of the present disclosure, provided mainly for illustration of concepts. The full embodiment of which the illustrated PTO is a part can include a flotation platform (not shown) to which the illustrated PTO is attached and the embodiment floats adjacent to an upper surface of a body of water over which waves pass. The illustration in FIG. 1 includes a rectangular plane 100 (i.e. a "deck") beneath the PTO that is nominally parallel to the resting surface of the body of water on which the embodiment of which the PTO is a part floats, and is provided to assist the reader in evaluating the relative heights of the water-holding chambers on the left and right sides of the PTO.

A water-holding chamber (i.e. "chamber") 101 is fluidly connected to a plurality of inlet pipes and/or apertures 102 through which water may enter the chamber 101. Chamber 101 is fluidly connected to chamber 103 by a pipe, tube, and/or conduit, 104. Pipe 104 originates at a lower portion and/or position on chamber 101 and connects to a relatively high portion and/or position of chamber 103. Thus, when the PTO is tilted by a sufficient degree within a vertical plane passing through chambers 101 and 103, water will tend to pass from chamber 101, through pipe 104, and into chamber 103. Furthermore, when such a tilt is completed and/or over, the water that has passed from chamber 101 to 103 will tend to be trapped within chamber 103 (since the input to pipe 104 with respect to chamber 103 is relatively high and will tend to remain above the upper surface of the water trapped within chamber 103).

A lower portion and/or position of chamber 103 is fluidly connected to an upper portion and/or position of chamber 105 by pipe 106. Thus, when the PTO is tilted by a sufficient magnitude and/or degree within a vertical plane passing through chambers 103 and 105, water will tend to pass from chamber 103, through pipe 106, and into chamber 105.

A tilt of sufficient degree that tends to raise chamber 101 and lower chamber 103 will tend to result in water flowing through pipe 104 from chamber 101 to chamber 103. And, an opposing tilt (i.e. a tilt in the opposite direction) of sufficient degree that tends to raise chamber 103 and lower chamber 105 will tend to result in water flowing through pipe 106 from chamber 103 to chamber 105. Thus, relative to the illustration in FIG. 1, a first counter-clockwise tilt will tend to move water from chamber 101 to chamber 103, thereby moving the water from a relatively lower chamber to a relatively higher chamber and leaving it trapped there. And, a second clockwise tilt will tend to move water from chamber 103 to chamber 105, thereby again moving the water from a relatively lower chamber to a relatively higher chamber and leaving it trapped there. Through a single cycle of tilting within a vertical plane passing through the opposing chambers 101/105 and 103, water that originated in chamber 101 is raised by a full chamber height (i.e., the height of chamber 101) and remains trapped there.

In response to a counter-clockwise tilt of sufficient magnitude, water trapped within chamber 105 will tend to flow into chamber 107 through pipe 108. And, in response to a clockwise tilt of sufficient magnitude, water trapped within chamber 107 will tend to flow into chamber 109 through pipe 110.

A series of sufficiently great tilting motions of alternating directions (e.g., clockwise and counter-clockwise) of the illustrated PTO will tend to take water introduced to the interior of chamber 101 through input pipes 102 and incrementally raise the height of that water through successive passages from chamber 101 to chambers 103, 105, 107, and 109. Water deposited into chamber 109 then flows out of that chamber through pipe 111 and through water turbine 112, which tends to rotate the operationally connected rotor of generator 113, thereby producing electrical power.

The PTO illustrated in FIG. 1 uses a wave-driven tilting of its respective embodiment to raise water from a relatively lower level and/or height, to a relatively higher level and/or height. It then converts the increased gravitational potential, and/or head pressure, of that raised water to cause a water turbine to rotate and to thereby generate electrical power.

Figure 2:
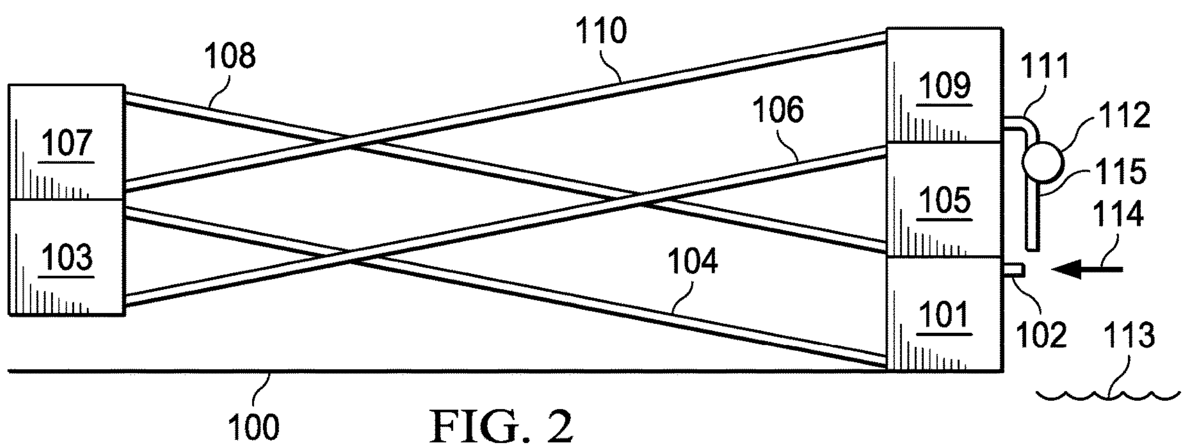
FIG. 2 is a front view of the embodiment of FIG. 1.

FIG. 2 shows a side view of the same power takeoff (PTO) illustrated in FIG. 1. In FIG. 2, the PTO is configured in a horizontal orientation. In this orientation, water trapped in any particular water-holding chamber 101, 103, 105, 107, and/or 109, of the PTO would tend to remain within that chamber. In this orientation, water will not tend to flow through any of the pipes 104, 106, 108, and/or 110, because to do so the water would have to flow to height higher than the level of water within the chamber from which it would originate.

When the PTO is tilted in a clockwise direction to a sufficient degree, water from the body of water 113 on which the PTO's associated embodiment (not shown) floats will tend to flow 114 into the inlet pipes 102, after which successive tilts within a vertical plane passing through the opposing stacks of chambers, i.e. stack 103/107 and stack 101/105, 109, and of sufficient magnitude will (if the requisite degree of tilting is maintained for a sufficient period time) tend to flow into successively higher chambers, i.e., from 101 to 103 to 105 to 107 and to 109. Water deposited into uppermost chamber 109 is then able to flow out of the chamber through pipe 111 and thereafter through water turbine 112 and thereafter out of the PTO through pipe 115. Water flowing out of the mouth at the lower end of pipe 115 will return to the body of water 113 on which the PTO's associated embodiment (not shown) floats.

Figure 3:
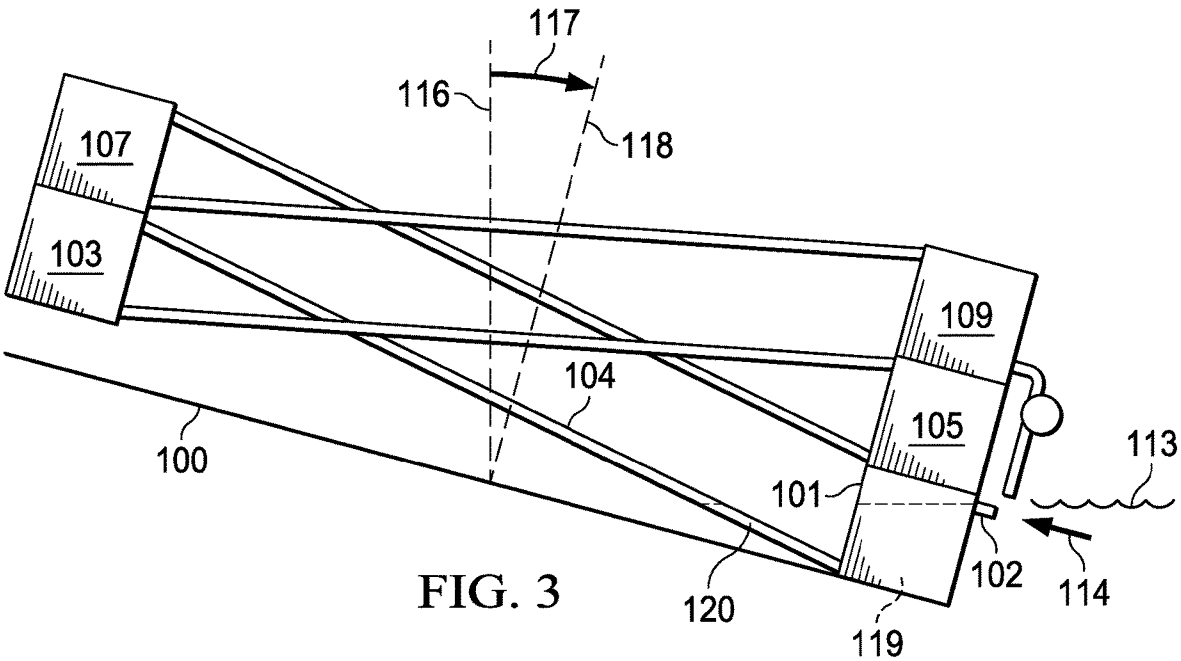
FIG. 3 is a front view of the embodiment of FIG. 1 in a first tilt orientation.

FIG. 3 shows a side sectional view of the same power takeoff (PTO) illustrated in FIGS. 1 and 2. For the purpose of illustration, the chamber walls nearest the reader in FIGS. 3-8 have been removed to permit the presence, volumes, and upper surfaces, of water (if any) contained within each chamber to be visible. FIGS. 3 to 8 are sectional views in which the section plane is immediately inside the chamber walls parallel to the illustration page and nearest the reader.

In FIG. 3, the PTO is configured in a tilted and/or rotated orientation. In FIGS. 1 and 2, a vector normal to the PTO's deck was oriented vertically as shown by line 116. The PTO configuration illustrated in FIG. 3 has resulted from a clockwise rotation of the PTO within the plane of the illustration that has rotated 117 the deck normal vector from the neutral orientation 116 of a horizontal PTO to a new orientation of 118.

The clockwise rotated configuration of the PTO has placed the inlet pipes 102 below the surface 113 of the body of water on which the PTO's associated embodiment (not shown) floats. As a consequence of the submergence of the inlet pipes 102, water flows 114 into chamber 101 and a volume of water 119 is momentarily trapped within that chamber. A portion 120 of the trapped water 119 extends into pipe 104 but is unable to flow uphill through pipe 104.

Figure 4:
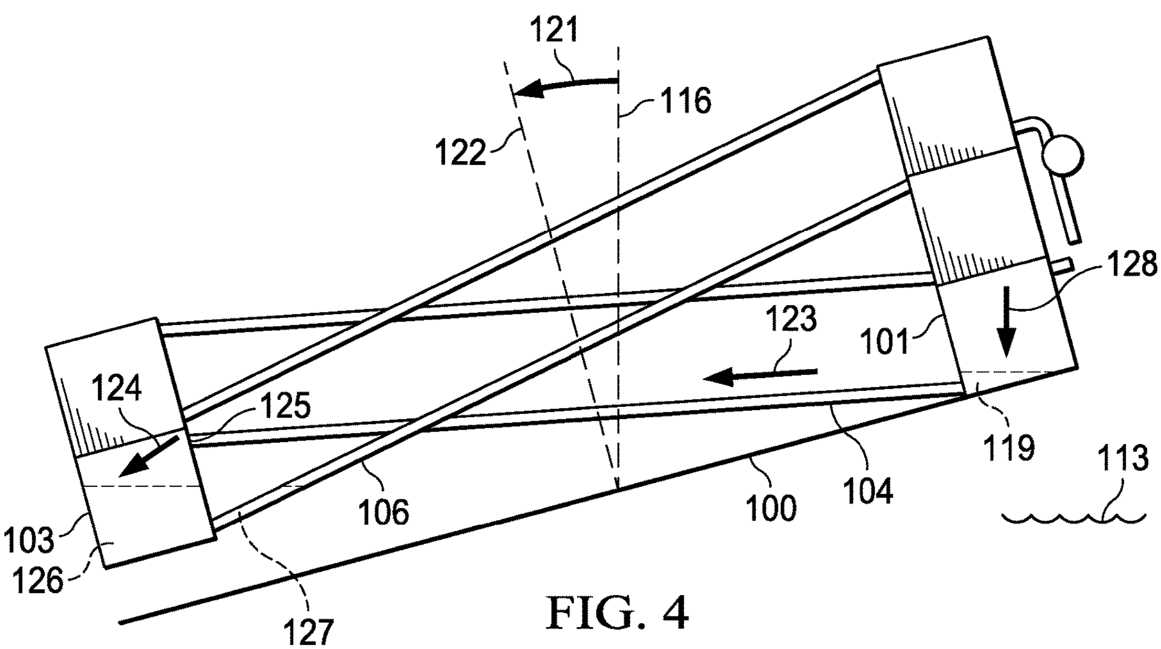
FIG. 4 is a front view of the embodiment of FIG. 1 in a second tilt orientation.

FIG. 4 shows a side view of the same power takeoff (PTO) illustrated in FIGS. 1-3. In FIG. 4, the PTO is configured in a tilted and/or rotated orientation that is counter to the rotation characterizing the orientation illustrated in FIG. 3. In FIGS. 1 and 2, a vector normal to the PTO's deck was oriented vertically as shown by line 116. The PTO configuration illustrated in FIG. 4 has resulted from a counter-clockwise rotation of the PTO within the plane of the illustration that has rotated 121 the deck normal vector from the orientation 118 characteristic of the PTO orientation illustrated in FIG. 3, and from the neutral orientation 116 of a horizontal PTO to a new orientation of 122.

The counter-clockwise rotated configuration of the PTO has raised the inlet pipes 102 above the surface thereby preventing any further inflow of water into chamber 101. Furthermore, the rotation has changed the angular orientation of pipe 104 such that water that was trapped within chamber 101 is now free to flow 123 "downhill" and to thereafter flow 124 into chamber 103 through the aperture 125 that fluidly connects the chamber 103 to pipe 104. The water that flows 124 into chamber 103 becomes trapped as a pool 126 at the bottom of that chamber. A portion 127 of the trapped water 126 extends into pipe 106 but is unable to flow uphill through pipe 106.

As a consequence of the water 119 that flows out of chamber 101, and flows 123 through pipe 104, and into 124 chamber 103, the level of the water within chamber 101 is reduced 128.

Figure 5:
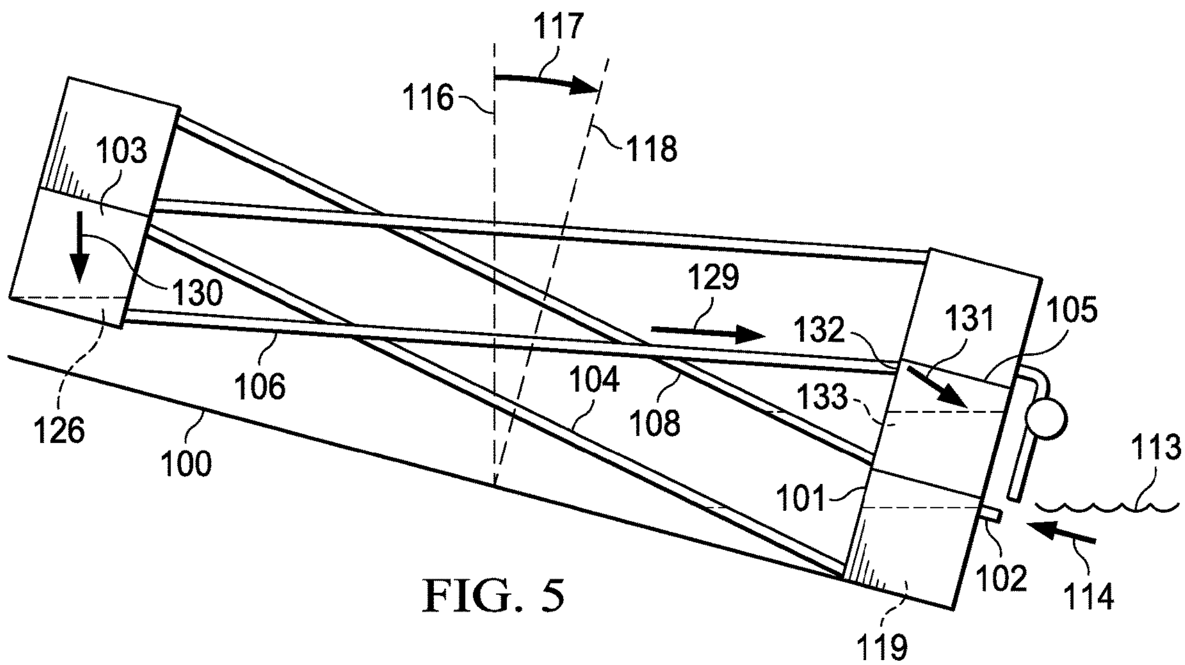
FIG. 5 is a front view of the embodiment of FIG. 1 in the first tilt orientation.

FIG. 5 shows a side view of the same power takeoff (PTO) illustrated in FIGS. 1-4. In FIG. 5, the PTO is configured in a tilted and/or rotated orientation that is counter to the rotations characterizing the orientations illustrated in FIG. 4, and similar to the rotation characterizing the orientation illustrated in FIG. 3. As was the case with the orientation illustrated in FIG. 3, water from body of water 113 on which the PTO's associated embodiment (not shown) flows 114 into water-holding chamber 101 and accumulates 119 therein.

The water 126 that accumulated within chamber 103 as a result of the counter-clockwise rotation illustrated in FIG. 4, now tends to flow 129 from chamber 103 to chamber 105 through pipe 106, thereby lowering 130 the level of the water 126 within chamber 103. Water flowing 131 into chamber 105 through aperture 132 tends to become trapped forming a pool 133 of water within the chamber.

Figure 6:
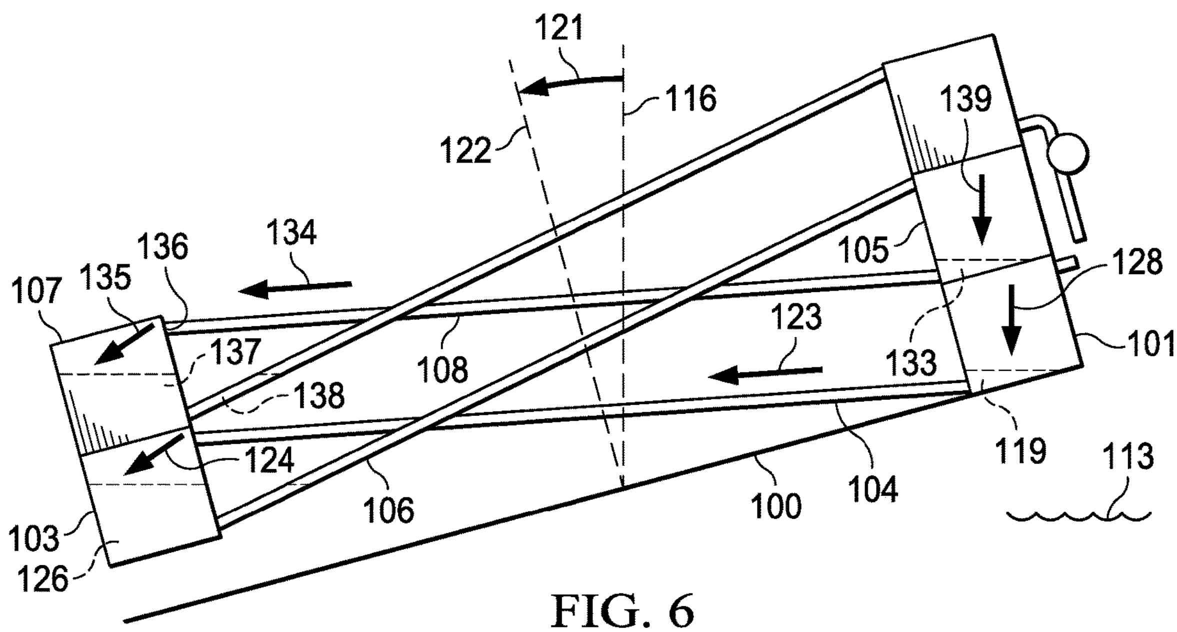
FIG. 6 is a front view of the embodiment of FIG. 1 in the second tilt orientation.

FIG. 6 shows a side view of the same power takeoff (PTO) illustrated in FIGS. 1-5. In FIG. 6, the PTO is configured in a tilted and/or rotated orientation that is counter to the rotation characterizing the orientation illustrated in FIGS. 3 and 5. The PTO configuration illustrated in FIG. 6 has resulted from a counter-clockwise rotation of the PTO within the plane of the illustration that has rotated 121 the deck normal vector from the orientation 118 characteristic of the PTO orientation illustrated in FIGS. 3 and 5, and from the neutral orientation 116 of a horizontal PTO to the same orientation of 122 that characterizes the orientation illustrated in FIG. 4.

The counter-clockwise rotated configuration of the PTO has changed the angular orientation of pipe 104 such that water that was trapped within chamber 101 is now free to flow 123 "downhill" and to thereafter flow 124 into chamber 103. The water that flows 124 into chamber 103 becomes trapped as a pool 126 at the bottom of that chamber. Similarly, water that was trapped within chamber 105 as a result of the rotation of FIG. 5 is now free to flow 134 "downhill" and to thereafter flow 135 into chamber 103 through the aperture 136 that fluidly connects the chamber 107 to pipe 108. The water that flows 135 into chamber 107 becomes trapped as a pool 137 at the bottom of that chamber. A portion 138 of the trapped water 137 extends into pipe 108 but is unable to flow uphill through pipe 110.

As a consequence of the water 133 that flows out of chamber 105, and flows 134 through pipe 108, and into 135 chamber 107, the level of the water within chamber 105 is reduced 139.

Figure 7:
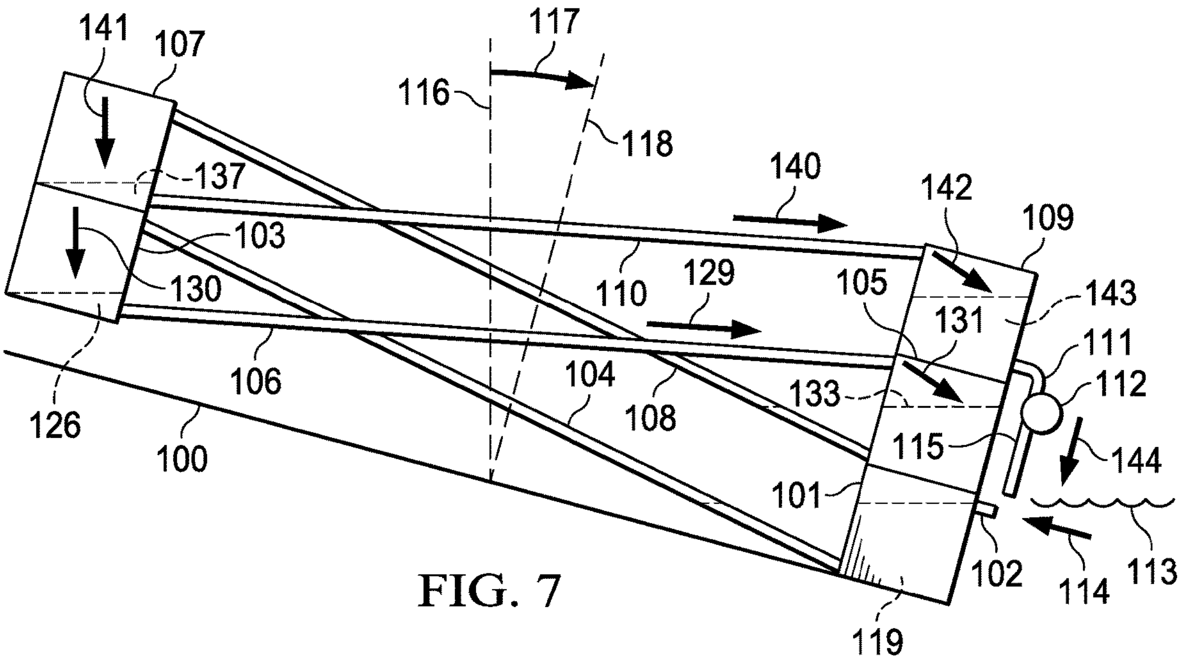
FIG. 7 is a front view of the embodiment of FIG. 1 in the second tilt orientation.

FIG. 7 shows a side view of the same power takeoff (PTO) illustrated in FIGS. 1-6. In FIG. 7, the PTO is configured in a tilted and/or rotated orientation that is counter to the rotations characterizing the orientations illustrated in FIGS. 4 and 6, and similar to the rotation characterizing the orientation illustrated in FIGS. 3 and 5. As was the case with the orientations illustrated in FIGS. 3 and 5, water from body of water 113 on which the PTO's associated embodiment (not shown) flows 114 into water-holding chamber 101 and accumulates 119 therein.

The water 126 that accumulated within chamber 103 as a result of the counter-clockwise rotations illustrated in FIGS. 4 and 6, now tends to flow 129 from chamber 103 to chamber 105 through pipe 106, thereby lowering 130 the level of the water 126 within chamber 103. Water flowing 131 into chamber 105 tends to become trapped forming a pool 133 of water within the chamber. Likewise, the water 137 that accumulated within chamber 107 as a result of the counter-clockwise rotations illustrated in FIG. 4, now tends to flow 140 from chamber 107 to chamber 109 through pipe 110, thereby lowering 141 the level of the water 137 within chamber 107. Water flowing 142 into chamber 109 tends to become trapped forming a pool 143 of water within the chamber.

Water 143 within chamber 109 tends to flow out of the chamber through pipe 111 and therethrough water turbine 112, after which it flows 144 through and out of pipe 115 thereby returning to the body of water 113 from which it originated.

Figure 8:
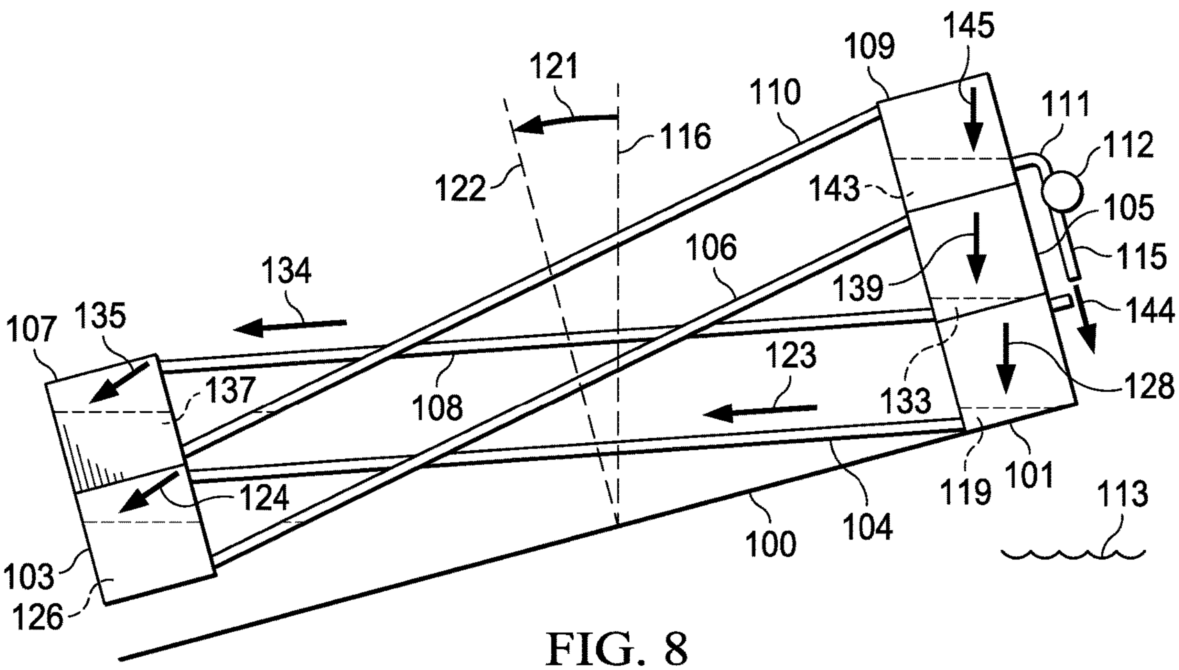
FIG. 8 is a front view of the embodiment of FIG. 1 in the second tilt orientation.

FIG. 8 shows a side view of the same power takeoff (PTO) illustrated in FIGS. 1-7. In FIG. 8, the PTO is configured in a tilted and/or rotated orientation that is counter to the rotation characterizing the orientation illustrated in FIGS. 3, 5 and 7. The PTO configuration illustrated in FIG. 8 has resulted from a counter-clockwise rotation of the PTO within the plane of the illustration that has rotated 121 the deck normal vector from the orientation 118 characteristic of the PTO orientations illustrated in FIGS. 3, 5 and 7, and from the neutral orientation 116 of a horizontal PTO to the same orientation of 122 that characterizes the orientation illustrated in FIGS. 4 and 6.

The counter-clockwise rotated configuration of the PTO has changed the angular orientation of pipes 104 and 108 such that water that was trapped within respective chambers 101 and 105 is now free to flow 123 and 134 "downhill" and to thereafter flow 124 and 135 into respective chambers 103 and 107 where it is trapped in pools 126 and 137.

As a consequence of the water 119 and 133 that flows out of chambers 101 and 105, the level of the water within chambers 103 and 105 are reduced 128 and 139.

Because the water deposited in chamber 109 flows out through pipe 111 and energizes water turbine 112, the level of the water within chamber 109 is reduced 145.

Through a wave-driven repeated and/or oscillatory tilting and/or rotation of the PTO, and its associated embodiment (not shown), the orientations illustrated in FIGS. 7 and 8 may be repeated many times, and the result of that oscillatory tilting is the continuous transfer of water from one stack of chambers (e.g., 101/105/109) to the other stack of chambers (e.g., 103/107) and back again. When tilted within a vertical plane passing through the chambers 101, 103, 105, 107, and 109 (or tilted such that a component of the tilting is within such a vertical plane) to a sufficient degree and for a sufficiently long period of time (i.e., long enough for water to flow from one chamber to another), the PTO illustrated in FIGS. 1-8 will incrementally, serially, and ongoingly, raise water from the body of water 113 on which the embodiment floats up to chamber 109 where its resulting gravitational potential energy and/or head pressure pushes it through water turbine 112 thereby imparting rotational energy to the rotor of operationally connected generator (113 in FIG. 1).

The PTO illustrated in FIGS. 1-8 converts a portion of the energy of ocean waves into gravitational potential energy, and thereafter uses a portion of that potential energy to do useful work, such as to generate electrical power. Another embodiment uses the gravitational potential energy of the water deposited in chamber 109 to desalinate water. And another embodiment uses that potential energy to extract minerals from seawater (e.g. by pushing the water through an adsorbent substance, filter, or membrane). The scope of the present invention includes embodiments that utilize the gravitational potential energy of the raised water to do any and every kind of useful work.

The scope of the present invention includes any number, shape, size, and/or volume of water-holding chambers. The scope of the present invention includes any arrangement: horizontal, vertical, and/or spatial, of water-holding chambers, including, but not limited to, the distances between chambers, vertically, horizontally, and/or spatially. The scope of the present invention includes any number, shape, cross-sectional area, diameter, size, length, and/or volume of inter-chamber pipes, within the PTO and/or fluidly connecting any two chambers. The scope of the present invention includes any means, mechanism, device, and/or component, by which the flow of water through the inter-chamber pipes is directed, regulated, adjusted, and/or modified, including, but not limited to, any and every means, mechanism, device, and/or component, by which water is compelled to flow in only a single direction, and/or only toward a respective receiving chamber. The scope of the present invention includes any means, mechanism, device, channel, conduit, pipe, aperture, and/or component, by which water is permitted to flow into an initial chamber (e.g., chamber 101 in FIG. 1), including inlet pipes and/or apertures that incorporate one-way valves to prevent water from flowing out of such an initial chamber after having flowed in. The scope of the present invention includes any means, mechanism, device, pipe, aperture, and/or component, by which raised water is directed into, and/or permitted to enter, a water turbine. The scope of the present invention includes any type, design, variety, size, and/or volume, of water turbine. The scope of the present invention includes any type, design, variety, size, and/or rated power, of generator and/or alternator, including permanent magnet generators, induction generators, and self-excited synchronous generators. The scope of the present invention includes any means, mechanism, device, system, module, and/or component, by which generated electrical power is stored, including batteries, capacitors, and flywheels.

Figure 9:
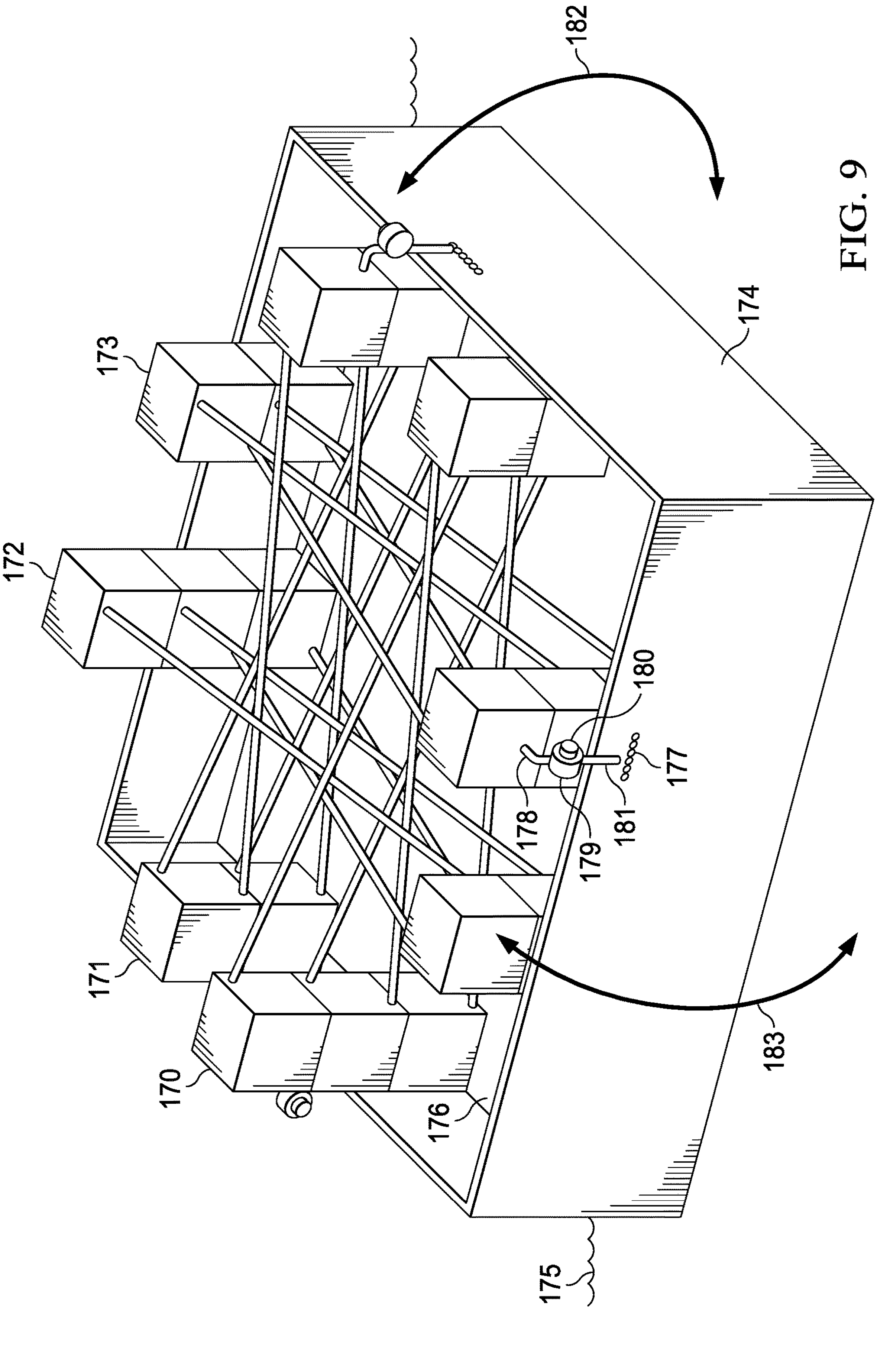
FIG. 9 is an elevated, perspective view of a second embodiment of the present invention.

FIG. 9 shows a perspective side view of an embodiment of the present disclosure. The embodiment incorporates four 170-173 of the same power takeoffs (PTOs) illustrated in FIGS. 1-8. The embodiment incorporates a buoyant platform and partial enclosure 174 that floats adjacent to the surface 175 of a body of water over which waves pass. The embodiment's four 170-173 PTOs are attached to a deck 176 which was represented in FIGS. 1-8 as 100.

As illustrated and explained in FIGS. 1-8, each PTO includes a set of inflow pipes 177 which penetrate a side wall of the embodiment's buoy 174 and were denoted as 102 in FIGS. 1-8. And, as illustrated and explained in FIGS. 1-8, each PTO includes a pipe 178 (denoted as 111 in FIGS. 1-8) that directs water raised by the PTO into a water turbine 179 (denoted as 112 in FIGS. 1-8), which energizes an operably connected generator 180 (denoted as 113 in FIG. 1), and includes a pipe 181 that guides effluent from the water turbine 179 back to the body of water 175 on which the embodiment floats.

When the embodiment tilts 182, fully or partially, within a vertical plane passing through the water-holding chambers of PTOs 170 and/or 171, then a tilt in one direction (clockwise with respect to the embodiment orientation illustrated in FIG. 9) then water will tend to flow into the lowest chamber of PTO 171. And, when the embodiment tilts 182 in the opposite direction (counter-clockwise with respect to the embodiment orientation illustrated in FIG. 9) then water will tend to flow into the lowest chamber of PTO 170. And, water will tend to continuously run through and energize the water turbines of each PTO 170 and 171.

When the embodiment tilts 183, fully or partially, within a vertical plane passing through the water-holding chambers of PTOs 172 and/or 173, then a tilt in one direction (clockwise with respect to the embodiment orientation illustrated in FIG. 9) then water will tend to flow into the lowest chamber of PTO 172. And, when the embodiment tilts 183 in the opposite direction (counter-clockwise with respect to the embodiment orientation illustrated in FIG. 9) then water will tend to flow into the lowest chamber of PTO 173 (i.e. into input pipes 177). And, water will tend to continuously run through and energize the water turbines of each PTO 172 and 173.

Since most, if not all, directions of wave-induced tilting of the embodiment will tend to involve a component tilt in both of the embodiment's orthogonal vertical planes (passing through chambers of each of the four PTOs), i.e. in the planes exemplified by tilt arrows 182 and 183, most tilting of sufficient degree and/or magnitude, and of sufficient duration, will tend to cause all four PTOs to lift water and generate electrical power.

The buoyant platform 174 is square in horizontal cross-section and has a flat bottom.

Figure 10:
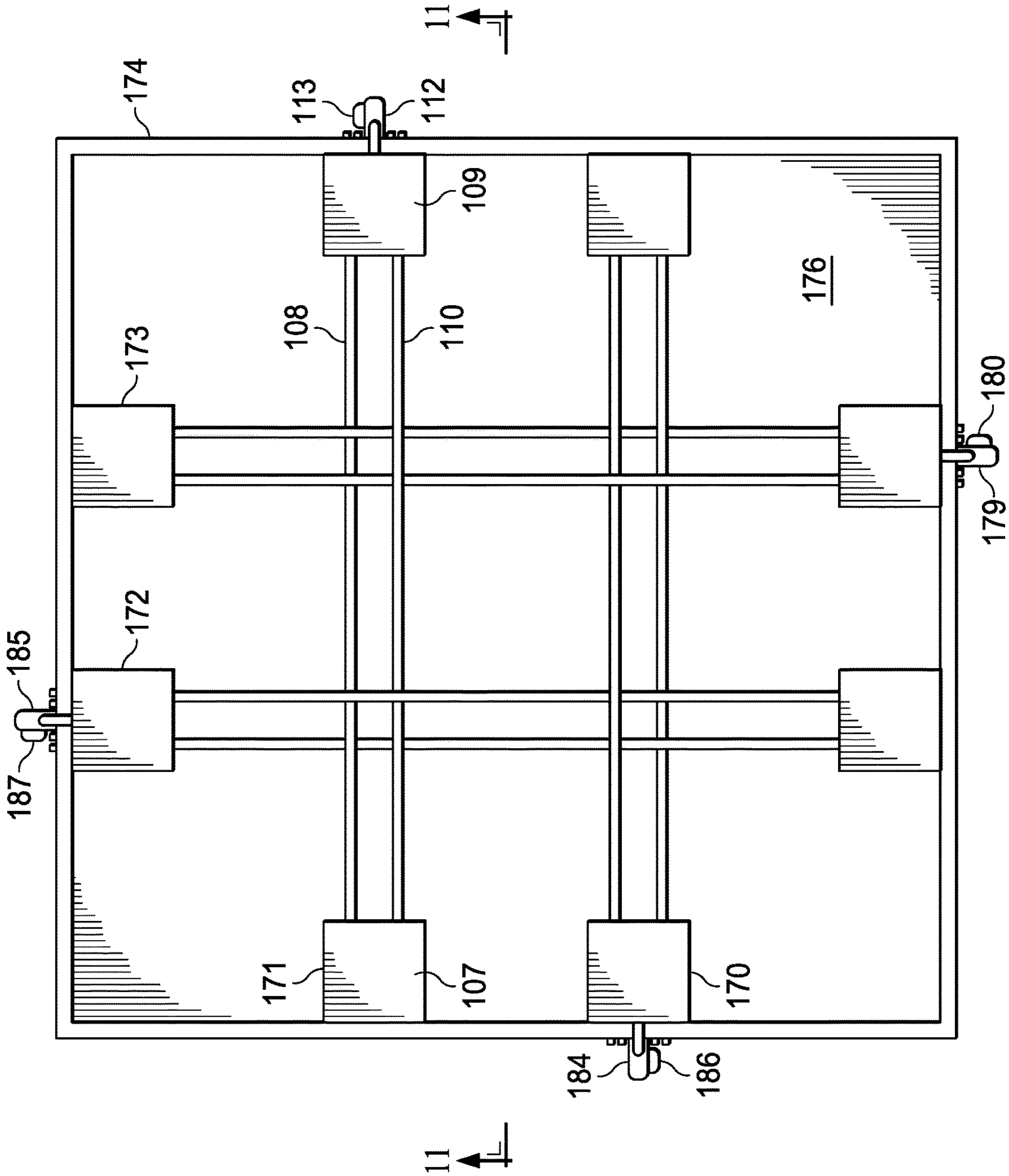
FIG. 10 is a top view of the embodiment of FIG. 9.

FIG. 10 shows a top-down view of the same embodiment of the present disclosure that is illustrated in FIG. 9. The embodiment includes a buoyant platform 174 and a deck 176 to which four power takeoffs (PTOs) 170-173 of the kind illustrated in FIGS. 1-8 are attached. Each PTO includes a water turbine 112, 179, 184 and 185, respectively. Each water turbine is operably connected to a generator 113, 180, 186 and 187, respectively. The PTO 171, like each of the other PTOs, includes the same components, connections, and operational behaviors, as were described and explained in relation to FIGS. 1-8.

Figure 11:
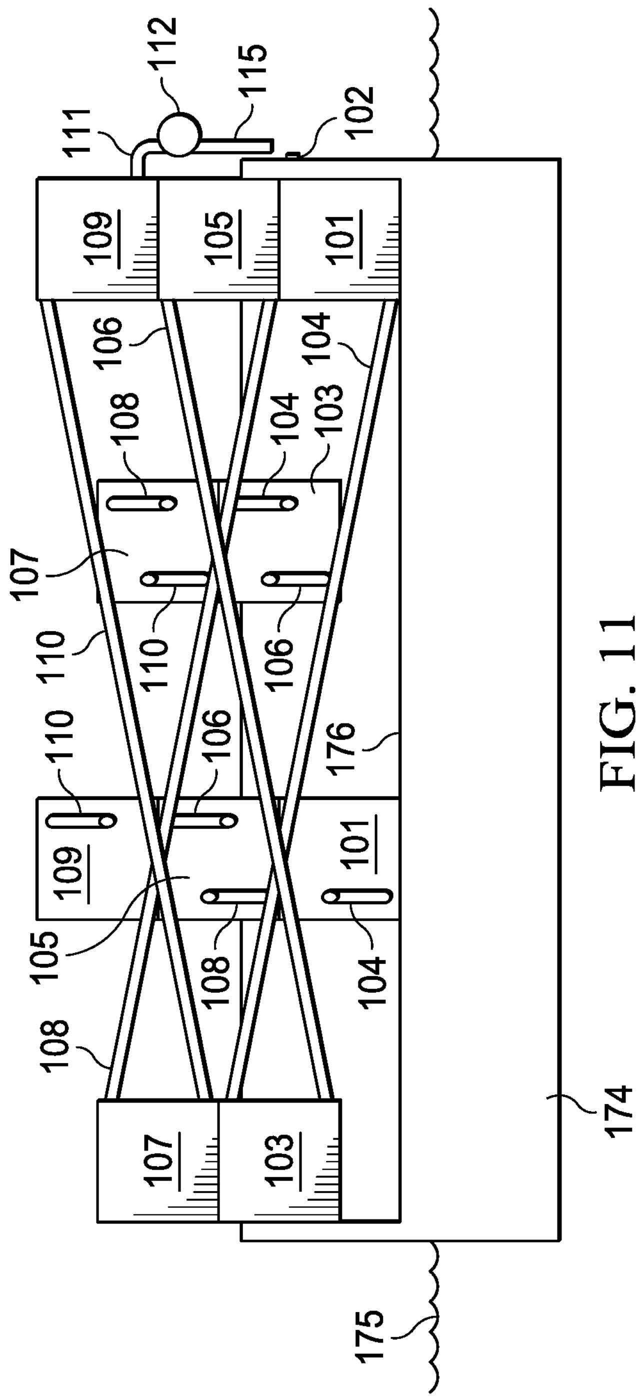
FIG. 11 is a front view of the embodiment of FIG. 9.

FIG. 11 shows a side sectional view of the same embodiment of the present disclosure that is illustrated in FIGS. 9 and 10 wherein the vertical section plane is specified in FIG. 10 and the section is taken across line 11-11. Each full and sectioned power takeoff (PTO) illustrated in FIG. 11 is labelled consistently with the exemplary PTO illustrated in FIGS. 1-8.

The scope of the present invention includes any number, shape, size, and/or volume of water-holding chambers. The scope of the present invention includes any arrangement: horizontal, vertical, and/or spatial, of water-holding chambers, including, but not limited to, the distances between chambers, vertically, horizontally, and/or spatially. The scope of the present invention includes any number, shape, cross-sectional area, diameter, size, length, and/or volume of inter-chamber pipes, within the PTO and/or fluidly connecting any two chambers. The scope of the present invention includes any means, mechanism, device, and/or component, by which the flow of water through the inter-chamber pipes is directed, regulated, adjusted, and/or modified, including, but not limited to, any and every means, mechanism, device, and/or component, by which water is compelled to flow in only a single direction, and/or only toward a respective receiving chamber. The scope of the present invention includes any means, mechanism, device, pipe, aperture, and/or component, by which water is permitted to flow into an initial lowermost chamber, including inlet pipes and/or apertures that incorporate one-way valves to prevent water from flowing out of such an initial chamber after having flowed in. The scope of the present invention includes any means, mechanism, device, pipe, aperture, and/or component, by which raised water is directed into, and/or permitted to enter, a water turbine. The scope of the present invention includes any type, design, variety, size, and/or volume, of water turbine. The scope of the present invention includes any type, design, variety, size, and/or rated power, of generator and/or alternator. The scope of the present invention includes any means, mechanism, device, system, module, and/or component, by which generated electrical power is stored.

Figure 12:
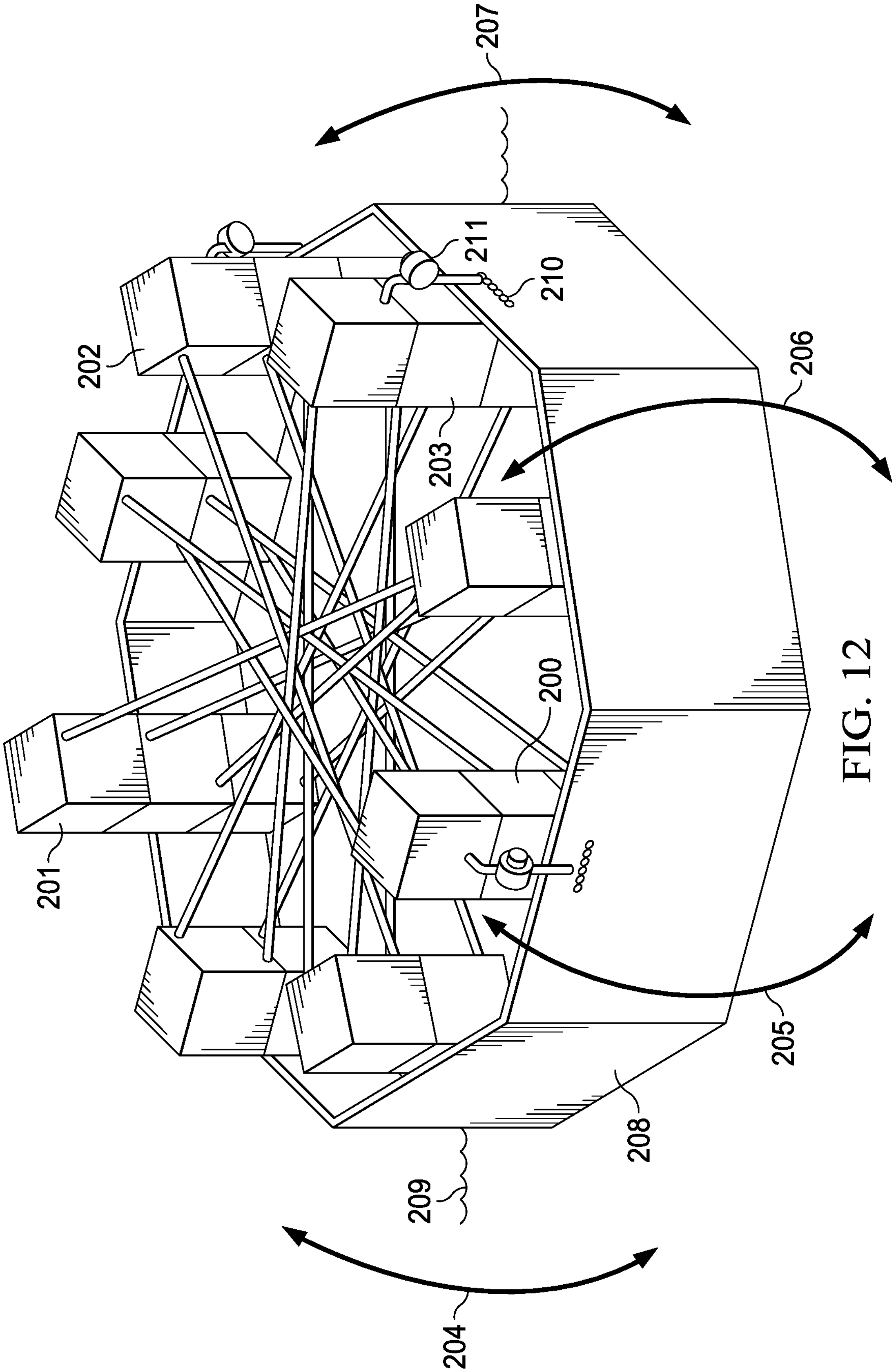
FIG. 12 is an elevated, perspective view of a third embodiment of the present invention.

FIG. 12 shows a perspective side view of an embodiment of the present disclosure. The embodiment incorporates four 200-203 of the same power takeoffs (PTOs) illustrated in FIGS. 1-8. The illustrated embodiment is similar to the embodiment illustrated in FIGS. 9-11. However, whereas the embodiment illustrated in FIGS. 9-11 raised water in response to tilting occurring with two orthogonal vertical planes, the embodiment illustrated in FIG. 12 raises water in response to tilting occurring with four vertical planes 204-207 each passing through a vertical longitudinal axis of the embodiment and in which each plane is offset from its neighboring planes by approximately 45 degrees.

The embodiment illustrated in FIG. 12 incorporates a buoyant platform 208 and partial enclosure that floats adjacent to the surface 209 of a body of water over which waves pass. Each of the embodiment's four PTOs 200-203 include a set of inlet pipes, e.g., 210, and a water turbine, e.g., 211.

The buoyant platform 208 is hexagonal in horizontal cross-section and has a flat bottom.

Figure 13:
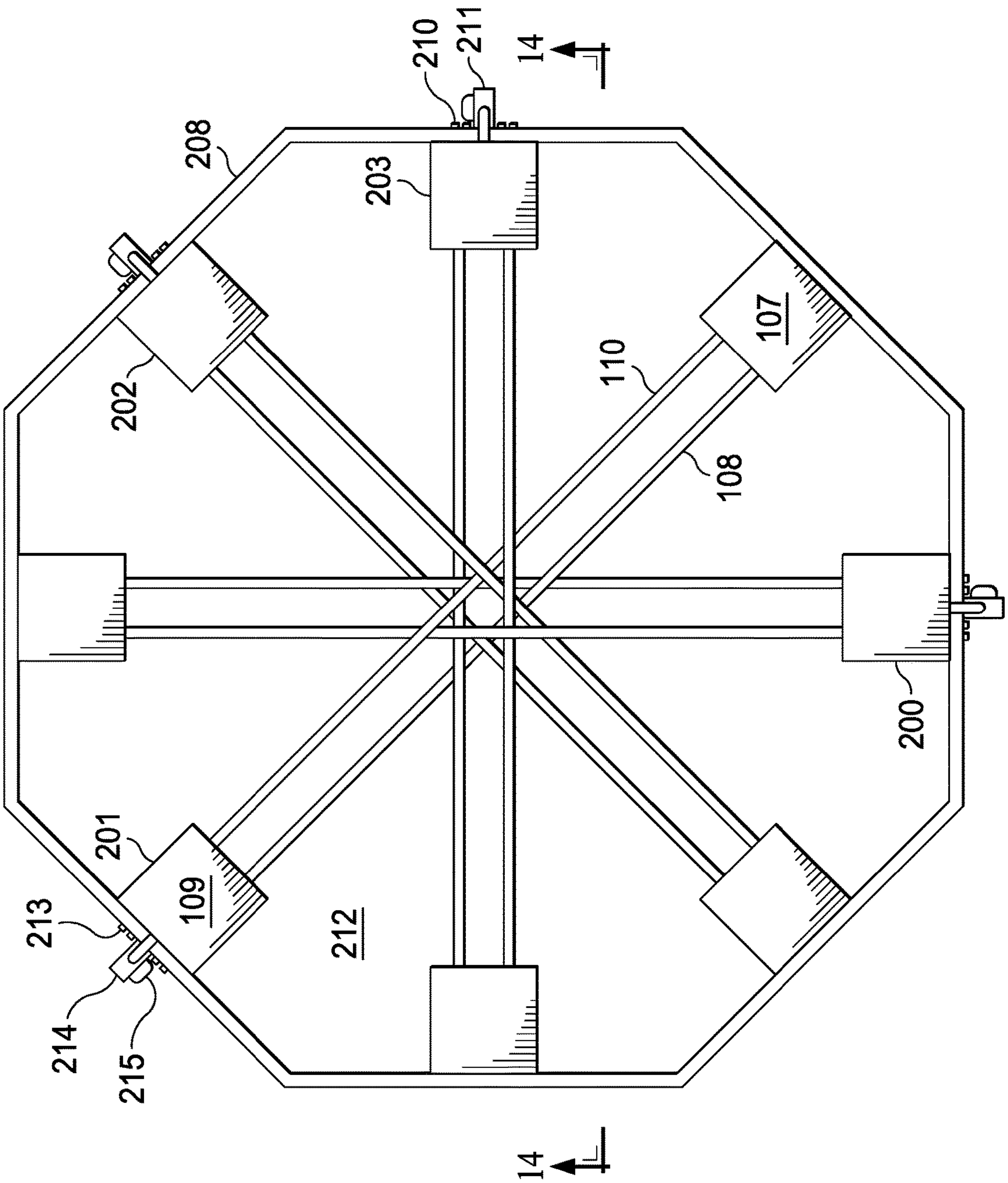
FIG. 13 is a top view of the embodiment of FIG. 12.

FIG. 13 shows a top-down view of the same embodiment of the present disclosure that is illustrated in FIG. 12. The embodiment includes a buoyant platform 208 and a deck 212 to which four power takeoffs (PTOs) 200-203 of the kind illustrated in FIGS. 1-8 are attached. Each PTO includes a set of water inlet pipes, e.g., 210 and 213, and a water turbine, e.g., 211 and 214. Each water turbine is operably connected to a generator, e.g., 215. The PTO 201, like each of the other PTOs, includes the same components, connections, and operational behaviors, as were described and explained in relation to FIGS. 1-8.

Figure 14:
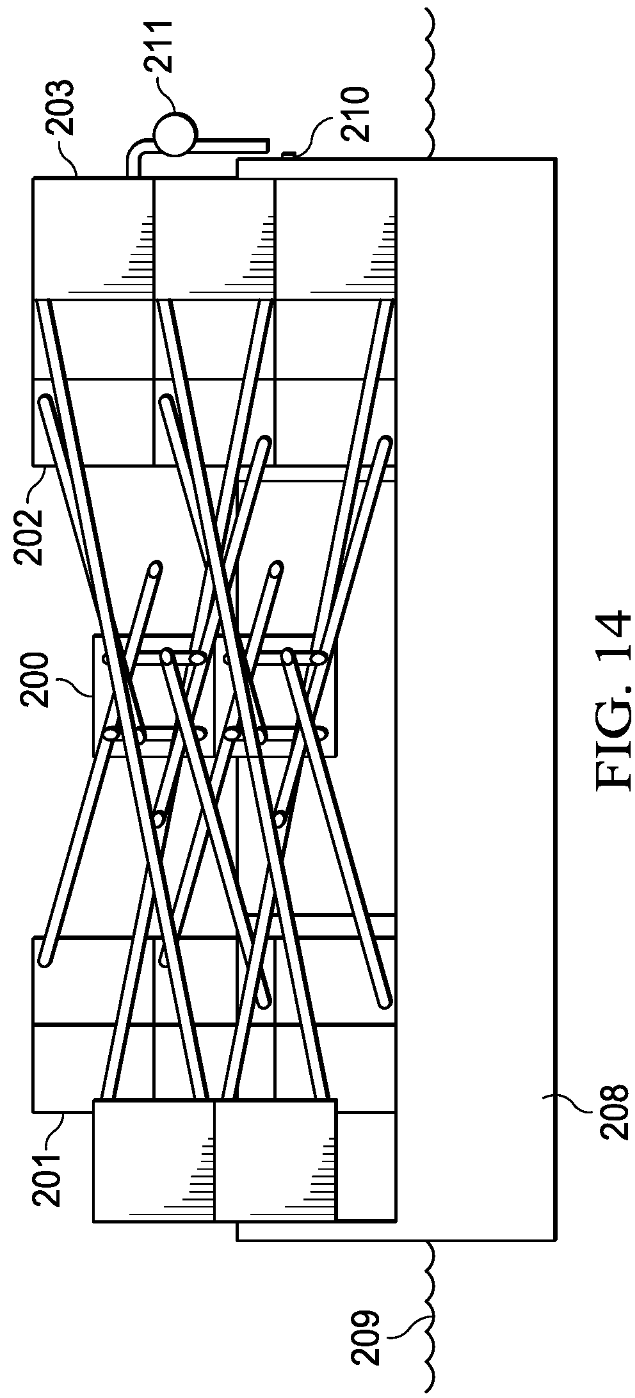
FIG. 14 is a front view of the embodiment of FIG. 12.

FIG. 14 shows a side sectional view of the same embodiment of the present disclosure that is illustrated in FIGS. 12 and 13 wherein the vertical section plane is specified in FIG. 13 and the section is taken across line 14-14.

The scope of the present invention includes any number, shape, size, and/or volume of water-holding chambers. The scope of the present invention includes any arrangement: horizontal, vertical, and/or spatial, of water-holding chambers, including, but not limited to, the distances between chambers, vertically, horizontally, and/or spatially. The scope of the present invention includes any number, shape, cross-sectional area, diameter, size, length, and/or volume of inter-chamber pipes, within the PTO and/or fluidly connecting any two chambers. The scope of the present invention includes any means, mechanism, device, and/or component, by which the flow of water through the inter-chamber pipes is directed, regulated, adjusted, and/or modified, including, but not limited to, any and every means, mechanism, device, and/or component, by which water is compelled to flow in only a single direction, and/or only toward a respective receiving chamber. The scope of the present invention includes any means, mechanism, device, pipe, aperture, and/or component, by which water is permitted to flow into an initial lowermost chamber, including inlet pipes and/or apertures that incorporate one-way valves to prevent water from flowing out of such an initial chamber after having flowed in. The scope of the present invention includes any means, mechanism, device, pipe, aperture, and/or component, by which raised water is directed into, and/or permitted to enter, a water turbine. The scope of the present invention includes any type, design, variety, size, and/or volume, of water turbine. The scope of the present invention includes any type, design, variety, size, and/or rated power, of generator and/or alternator. The scope of the present invention includes any means, mechanism, device, system, module, and/or component, by which generated electrical power is stored.

Figure 15:
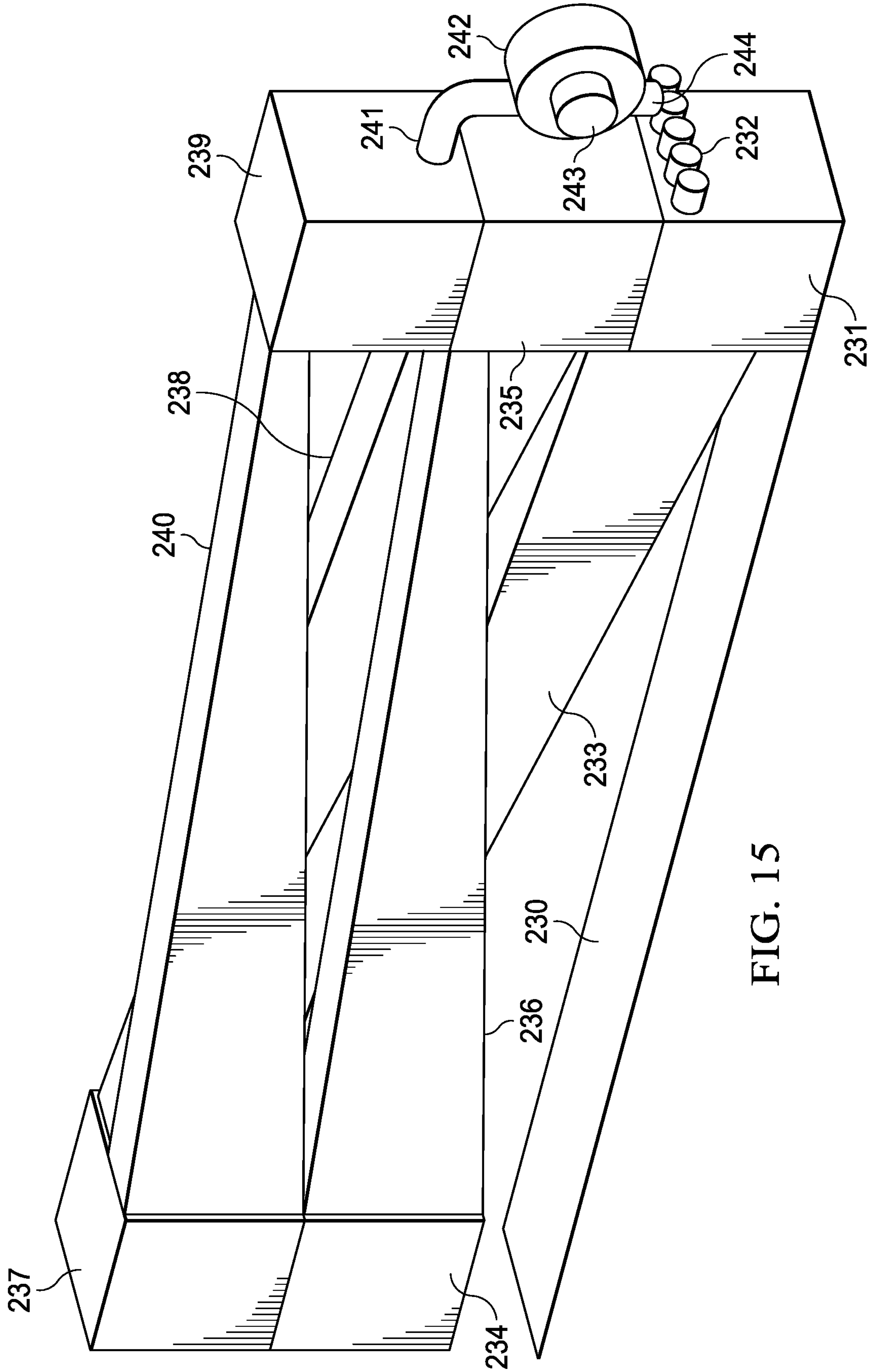
FIG. 15 is an elevated, perspective view of a fourth embodiment of the present invention.

FIG. 15 shows a perspective side view of a power takeoff (PTO) characteristic of an embodiment of the present disclosure. The PTO illustrated in FIG. 15 is identical to the PTO illustrated in FIGS. 1-8 except that whereas the PTO of FIGS. 1-8 communicated water from one water-holding chamber to another through pipes, the PTO of FIG. 15 communicates water from one water-holding chamber to another through "ramps", funnels, and/or constricting channels.

The full embodiment of which the illustrated PTO is a part includes a flotation platform (not shown) to which the illustrated PTO is attached and the embodiment floats adjacent to an upper surface of a body of water over which waves pass. The illustration in FIG. 15 includes a rectangular plane 230 (i.e. a "deck") beneath the PTO that is nominally parallel to the resting surface of the body of water on which the embodiment of which the PTO is a part floats, and is provided to assist the reader in evaluating the relative heights of the water-holding chambers on the left and right sides of the PTO.

A water-holding chamber (i.e. "chamber") 231 is fluidly connected to a plurality of inlet pipes and/or apertures 232 through which water may enter the chamber 231. Chamber 231 is fluidly connected to chamber 232 by a ramp, funnel, and/or constricting channel 233 to another chamber 234. Chamber 234 is higher than chamber 231 relative to the deck 230. And water within chamber 231 would not tend to travel from that chamber to chamber 234 through ramp 233, if the embodiment to which the PTO was attached was at rest and in a nominal orientation at the surface of a body of water, since the water would be required to flow uphill in order to do so. However, when a wave or other disturbance causes the embodiment to which the PTO is attached to tilt in a favorable direction, and for an adequate duration, then the tilting of ramp 233 allows water to flow from chamber 231 to chamber 234 in a gravitationally favored downhill manner. When the tilt facilitating the flow of water from chamber 231 to chamber 234 ends, then water deposited within chamber 234 tends to be trapped therein.

Chamber 234 is fluidly connected to chamber 235 by ramp 236. During periods of favorable tilt, water will tend to flow through ramp 236 and thereafter to be deposited and/or trapped within chamber 235. Chamber 235 is fluidly connected to chamber 237 by ramp 238. During periods of favorable tilt, water will tend to flow through ramp 238 and thereafter to be deposited and/or trapped within chamber 237. Likewise, chamber 237 is fluidly connected to chamber 239 by ramp 240. During periods of favorable tilt, water will tend to flow through ramp 240 and thereafter to be deposited and/or trapped within chamber 239.

Water deposited and/or trapped within chamber 239 then flows out of the chamber through outflow pipe 241 and into and through water turbine 242 thereby rotating the water turbine and the operably connected generator 243 rotor, and thereby generating electrical power. After passing through the water turbine 242, the water flowing out of chamber 239 is released back to the environment around the embodiment through effluent pipe 244.

Through successive, serial, and/or periodic, tilting in an appropriate and/or favorable direction, and for a sufficient duration, the PTO illustrated in FIG. 15 will take water from the body of water on which its associated embodiment and/or buoyant platform floats and raise and/or elevate it through successive incremental steps and/or distances until it achieves a height, gravitational potential energy, and/or head pressure, defined by the height of chamber 239 above the body of water on which the embodiment floats, and/or above the water turbine 242. After lifting the water to a desirable height, gravitational potential energy, and/or head pressure, the PTO illustrated in FIG. 15 passes at least a portion of that water through a water turbine thereby causing a generator operably connected to the water turbine to generate electrical power. Other PTOs, incorporated within other embodiments, use the resulting height, gravitational potential energy, and/or head pressure, of the lifted water to perform other useful kinds of work, including, but not limited to: desalinating water, and extracting minerals from seawater.

Figure 16:
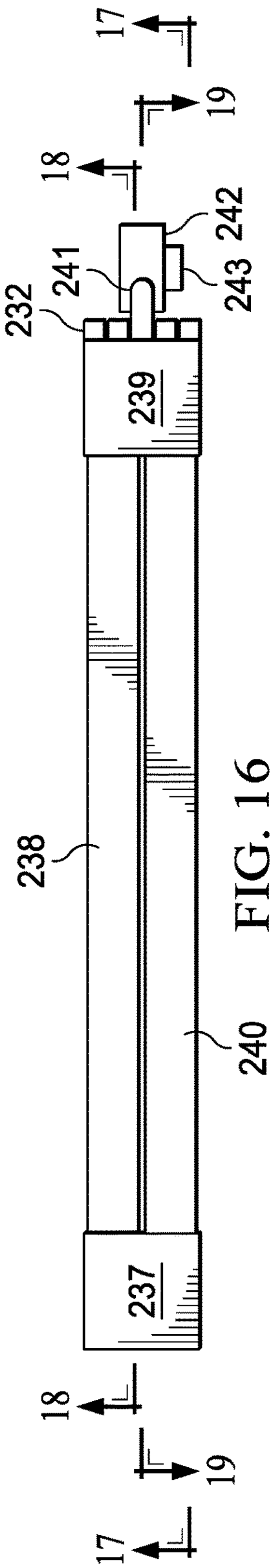
FIG. 16 is a top view of the embodiment of FIG. 15.

FIG. 16 shows a top-down view of the same embodiment of the present disclosure that is illustrated in FIG. 15.

Figure 17:
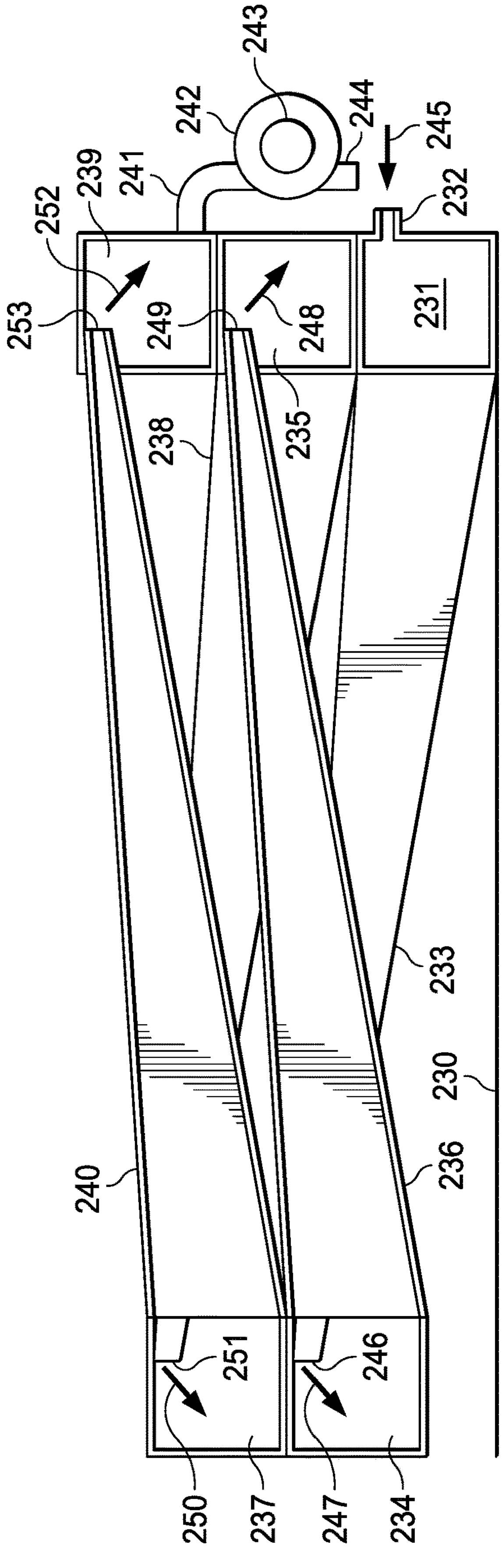
FIG. 17 is a front view of the embodiment of FIG. 15.

FIG. 17 shows a side sectional view of the same embodiment of the present disclosure that is illustrated in FIGS. 15 and 16 wherein the vertical section plane is specified in FIG. 16 and the section is taken across line 17-17.

When subjected to a tilt of appropriate direction (clockwise with respect to the PTO orientation illustrated in FIG. 17), magnitude, and duration, water may enter 245 the water-holding chamber 231 through inlet pipes 232. When subjected to a tilt of a contrary direction (counter-clockwise with respect to the PTO orientation illustrated in FIG. 17), magnitude, and duration, water may flow from chamber 231, through constricted channel, and/or over ramp, 233, and into chamber 234. Water exiting ramp 233 does so from the mouth 246 of a distal ramp end (distal with respect to chamber 231) from which the water falls 247 into the receiving chamber 234.

With respect to any degree of tilting, regardless of direction, that might reasonably be expected to be imparted to the PTO and its associated buoyant embodiment (not shown) by passing waves, the water that falls out of the distal end of the ramp 233 and into chamber 234 is thereafter unable to return to that ramp 233 and therethrough to chamber 231. Such water is, with respect to any normal operational mode or motion unable to flow back down to the lower chamber from which it originated.

When subjected to a tilt of appropriate direction (clockwise with respect to the PTO orientation illustrated in FIG. 17), magnitude, and duration, water held within chamber 234 may travel through ramp 236 and thereafter flow 248 out of the mouth 249 at the distal end of that ramp, thereby falling into, and being trapped within, chamber 235.

When subjected to a tilt of appropriate direction (counter-clockwise with respect to the PTO orientation illustrated in FIG. 17), magnitude, and duration, water held within chamber 235 may travel through ramp 238 and thereafter flow 250 out of the mouth 251 at the distal end of that ramp, thereby falling into, and being trapped within, chamber 237.

When subjected to a tilt of appropriate direction (clockwise with respect to the PTO orientation illustrated in FIG. 17), magnitude, and duration, water held within chamber 237 may travel through ramp 240 and thereafter flow 252 out of the mouth 253 at the distal end of that ramp, thereby falling into, and being trapped within, chamber 239.

Water deposited within chamber 239 flows out of the chamber through pipe 241 and therethrough into and/or through water turbine 242. Water flowing through water turbine 242 causes the operably connected generator 243 to generate electrical power. After flowing through water turbine 242, the water flows through and out of effluent pipe 244 from which it returns to the body of water from which it originated, perhaps to again enter chamber 231 through inlet pipes 232.

The scope of the present invention includes any number, shape, size, and/or volume of water-holding chambers. The scope of the present invention includes any arrangement: horizontal, vertical, and/or spatial, of water-holding chambers, including, but not limited to, the distances between chambers, vertically, horizontally, and/or spatially. The scope of the present invention includes any number, shape, cross-sectional area, diameter, size, length, and/or volume of inter-chamber pipes, within the PTO and/or fluidly connecting any two chambers. The scope of the present invention includes any means, mechanism, device, and/or component, by which the flow of water through the inter-chamber pipes is directed, regulated, adjusted, and/or modified, including, but not limited to, any and every means, mechanism, device, and/or component, by which water is compelled to flow in only a single direction, and/or only toward a respective receiving chamber. The scope of the present invention includes any means, mechanism, device, pipe, aperture, and/or component, by which water is permitted to flow into an initial chamber (e.g., chamber 231 in FIG. 17), including inlet pipes and/or apertures that incorporate one-way valves to prevent water from flowing out of such an initial chamber after having flowed in. The scope of the present invention includes any means, mechanism, device, pipe, aperture, and/or component, by which raised water is directed into, and/or permitted to enter, a water turbine. The scope of the present invention includes any type, design, variety, size, and/or volume, of water turbine. The scope of the present invention includes any type, design, variety, size, and/or rated power, of generator and/or alternator. The scope of the present invention includes any means, mechanism, device, system, module, and/or component, by which generated electrical power is stored.

Figure 18:
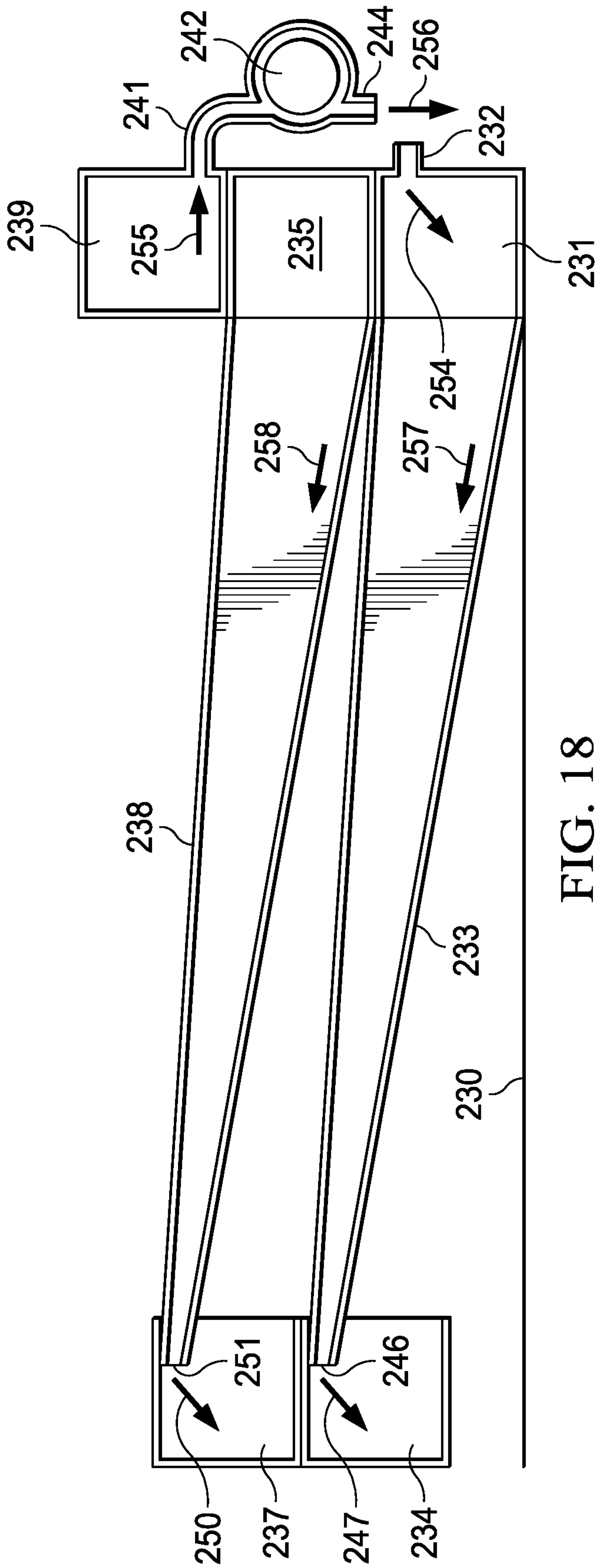
FIG. 18 is another a front view of the embodiment of FIG. 15.

FIG. 18 shows a side sectional view of the same embodiment of the present disclosure that is illustrated in FIGS. 15-17 wherein the vertical section plane is specified in FIG. 16 and the section is taken across line 18-18.

In response to appropriate directions, magnitudes, and durations of tilting of the PTO (and its associated buoyant embodiment, not shown):

Water that flows 254 and/or enters chamber 231 through inlet pipes 232 becomes trapped within that chamber due to the height of the inlet pipes 232 relative to the bottom of the chamber 231.

Water trapped within chamber 231 flows 257 "up" (which is "down" during periods of appropriate tilting) ramp 233 and thereafter flows 247 out of the mouth 246 at the distal end of the ramp 233, thereby becoming trapped within chamber 234 due to the height of the inlet ramp's 233 mouth 246 relative to the bottom of the chamber 234.

Water trapped within chamber 235 flows 258 "up" (which is "down" during periods of appropriate tilting) ramp 238 and thereafter flows 250 out of the mouth 251 at the distal end of the ramp 238, thereby becoming trapped within chamber 237 due to the height of the inlet ramp's 238 mouth 251 relative to the bottom of the chamber 237.

Water deposited and/or trapped (i.e. unable to flow backward) within chamber 239 flows 255 into and through pipe 241, thereafter flowing into and through water turbine 242, and thereafter flowing into, and through; and finally flowing 256 out of, effluent pipe 244.

Figure 19:
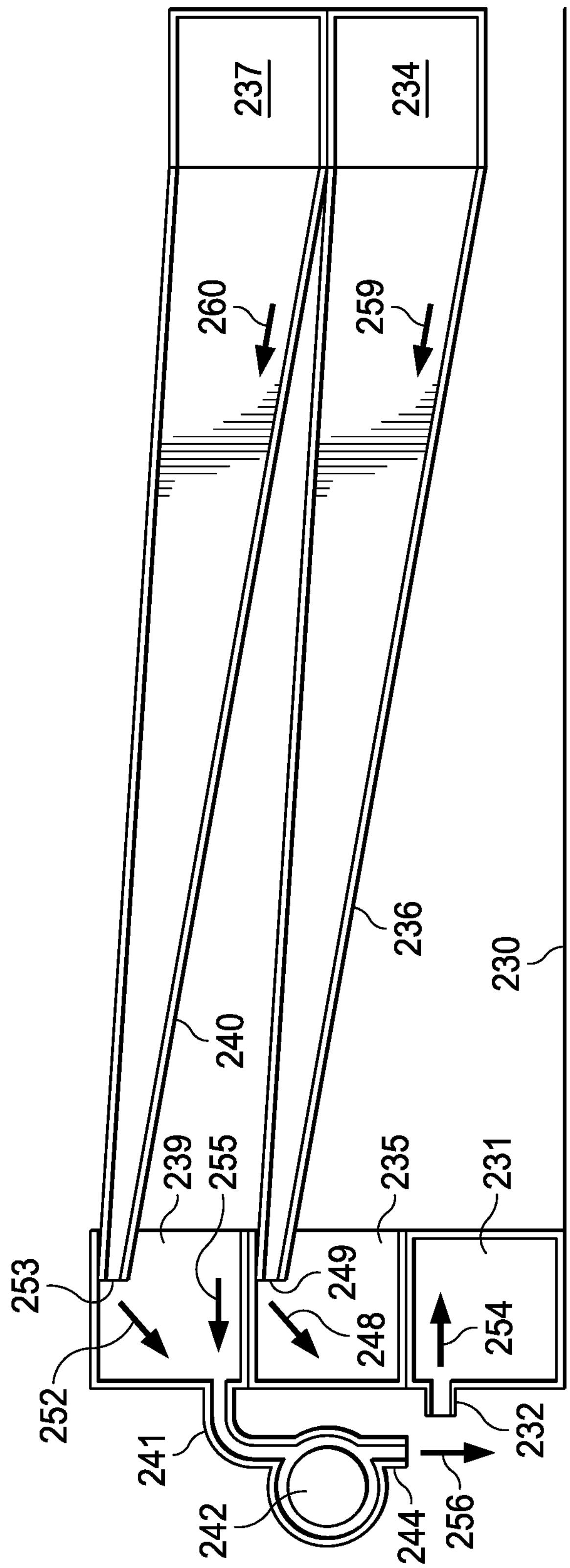
FIG. 19 is another a front view of the embodiment of FIG. 15.

FIG. 19 shows a side sectional view of the same embodiment of the present disclosure that is illustrated in FIGS. 15-18 wherein the vertical section plane is specified in FIG. 16 and the section is taken across line 19-19.

In response to appropriate directions, magnitudes, and durations of tilting of the PTO (and its associated buoyant embodiment, not shown):

Water that flows 254 and/or enters chamber 231 through inlet pipes 232 becomes trapped within that chamber due to the height of the inlet pipes 232 relative to the bottom of the chamber 231.

Water trapped within chamber 234 flows 259 "up" (which is "down" during periods of appropriate tilting) ramp 236 and thereafter flows 248 out of the mouth 249 at the distal end of the ramp 236, thereby becoming trapped within chamber 235 due to the height of the inlet ramp's 236 mouth 249 relative to the bottom of the chamber 235.

Water trapped within chamber 237 flows 260 "up" (which is "down" during periods of appropriate tilting) ramp 240 and thereafter flows 252 out of the mouth 253 at the distal end of the ramp 240, thereby becoming trapped within chamber 239 due to the height of the inlet ramp's 240 mouth 253 relative to the bottom of the chamber 239.

Water deposited and/or trapped (i.e. unable to flow backward) within chamber 239 flows 255 into and through pipe 241, thereafter flowing into and through water turbine 242, and thereafter flowing into, and through; and finally flowing 256 out of, effluent pipe 244.

Through successive tilts of a favorable magnitude and duration, and an alternating approximately contrary direction (e.g., alternating tilts of clockwise and counter-clockwise directions relative to the PTO orientation illustrated in FIGS. 15 and 17) water is incrementally raised to chambers of successively greater heights above the first chamber, and/or the surface of the body of water from which the raised water originates, until it reaches a height from which its increased height, gravitational potential energy, and/or head pressure, permits its passage through a water turbine to energize a generator operably connected to the water turbine, thereby indirectly converting the energy of the waves that tilt the PTO, and its associated embodiment (not shown), into a reservoir of water of increased gravitational potential energy, and thereafter into a rotational kinetic energy of a water turbine, and thereafter into electrical energy.

Because water raised to any particular chamber, height, and/or level, is unable to flow back into the chamber, and/or to the height or level from which it originated, the PTO extracts energy from wave-induced tilts when they are available and/or occur, and the potential energy of any partially raised water is preserved during any periods during which the wave climate is inadequate to achieve the angle, magnitude, and/or duration, of tilting required to further raise water.

Figure 20:
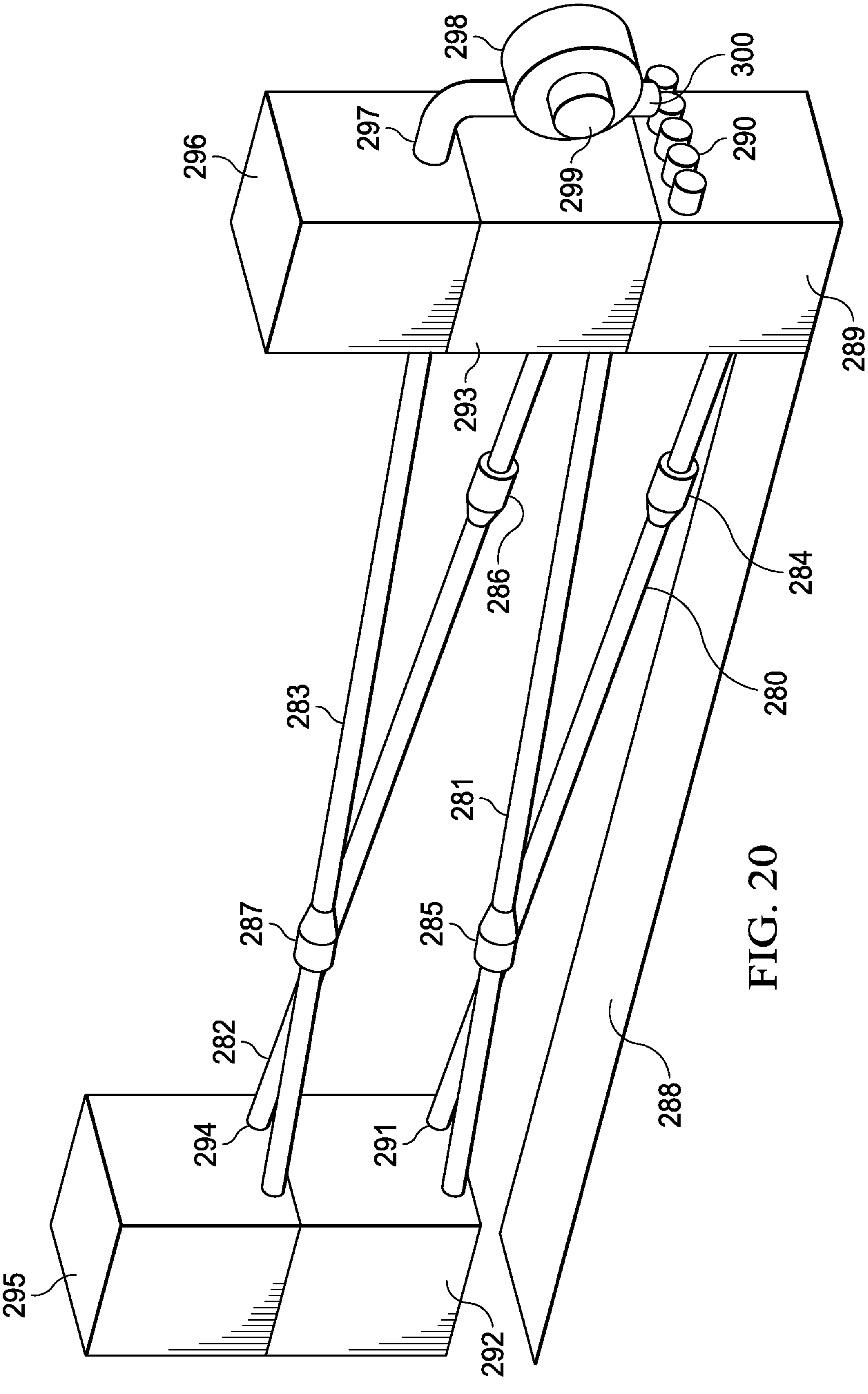
FIG. 20 is an elevated, perspective view of a fifth embodiment of the present invention.

FIG. 20 shows a perspective side view of a power takeoff (PTO) characteristic of an embodiment of the present disclosure. The full embodiment of which the illustrated PTO is a part includes a flotation platform (not shown) to which the illustrated PTO is attached and the embodiment floats adjacent to an upper surface of a body of water over which waves pass.

The illustrated PTO is similar to the PTO illustrated in FIGS. 1-8. However, whereas the inter-chamber pipes (104, 106, 108 and 110) of the PTO illustrated in FIGS. 1-8 were open, unthrottled, and without valves, each inter-chamber pipe 280-283 of the PTO illustrated in FIG. 20 includes a one-way valve 284-287, respectively, that permits water to flow in only a single direction (i.e. toward the respective receiving chamber). As a consequence of its incorporation of one-way valves, the inter-chamber pipes 280-283 of the PTO illustrated in FIG. 20 need not connect to a receiving chamber at an elevated, raised, and/or relatively high, position relative to the bottom of the receiving chamber. (Each inter-chamber pipe of the PTO illustrated in FIGS. 1-8 connected to its respective receiving chamber at a position near the top of the receiving chamber, and/or at an approximately maximal height above the bottom of the receiving chamber, so as to inhibit or prevent water from flowing backward from the receiving chamber to the originating chamber.)

The illustration in FIG. 20 includes a rectangular plane 288 (i.e. a "deck") beneath the PTO that is nominally parallel to the resting surface of the body of water on which the embodiment of which the PTO is a part floats, and is provided to assist the reader in evaluating the relative heights of the water-holding chambers on the left and right sides of the PTO.

In response to appropriate directions, magnitudes, and durations of tilting of the PTO illustrated in FIG. 20 (and its associated buoyant embodiment, not shown):

Water flows into and/or enters chamber 289 through inlet pipes 290 and thereafter becomes trapped within that chamber due to the height of the inlet pipes 290 relative to the bottom of the chamber 289.

Water trapped within chamber 289 flows "up" (which is "down" during periods of appropriate tilting) through one-way valve 284 and through inter-chamber pipe 280. The distal (i.e. far from the originating chamber 289) end 291 of inter-chamber pipe 280 enters receiving chamber 292 and the water flowing through that pipe flows into chamber 292 at a position near the bottom of the chamber. Because of the one-way valve 284, the water within chamber 292 is effectively trapped therein and unable to flow backward into chamber 289.

Water trapped within chamber 292 flows "up" (which is "down" during periods of appropriate tilting) through one-way valve 285 and through inter-chamber pipe 281. The distal (i.e. far from the originating chamber 292) end (not visible) of inter-chamber pipe 281 enters receiving chamber 293 and the water flowing through that pipe flows into chamber 293 at a position near the bottom of the chamber. Because of the one-way valve 285, the water within chamber 293 is effectively trapped therein and unable to flow backward into chamber 292.

Water trapped within chamber 293 flows "up" (which is "down" during periods of appropriate tilting) through one-way valve 286 and through inter-chamber pipe 282. The distal (i.e. far from the originating chamber 293) end 294 of inter-chamber pipe 282 enters receiving chamber 295 and the water flowing through that pipe flows into chamber 295 at a position near the bottom of the chamber. Because of the one-way valve 286, the water within chamber 295 is effectively trapped therein and unable to flow backward into chamber 293.

Water trapped within chamber 295 flows "up" (which is "down" during periods of appropriate tilting) through one-way valve 287 and through inter-chamber pipe 283. The distal (i.e. far from the originating chamber 295) end (not visible) of inter-chamber pipe 283 enters receiving chamber 296 and the water flowing through that pipe flows into chamber 296 at a position near the bottom of the chamber. Because of the one-way valve 287, the water within chamber 296 is effectively trapped therein and unable to flow backward into chamber 295.

Water trapped within chamber 296 is at a significantly raised height, elevation, and/or level, than the water that entered chamber 289 through inlet ports 290. It therefore has a significantly greater gravitational potential energy and/or head pressure than when it began its progressive journey to chamber 296. Water trapped within chamber 296 flows out of the chamber through pipe 297 and into and through water turbine 298. The water flowing through water turbine 298 imparts energy to the generator 299 operably connected to the water turbine, thereby generating electrical power. After passing through the water turbine 298, the water that flowed out of chamber 296 flows into and out of effluent pipe 300, thereby returning to the body of water from which it originated, perhaps to again flow into chamber 289 and to again be raised to chamber 296.

The scope of the present invention includes any number, shape, size, and/or volume of water-holding chambers. The scope of the present invention includes any arrangement: horizontal, vertical, and/or spatial, of water-holding chambers, including, but not limited to, the distances between chambers, vertically, horizontally, and/or spatially. The scope of the present invention includes any number, shape, cross-sectional area, diameter, size, length, and/or volume of inter-chamber pipes, within the PTO and/or fluidly connecting any two chambers. The scope of the present invention includes any means, mechanism, device, and/or component, by which the flow of water through the inter-chamber pipes is directed, regulated, adjusted, and/or modified, including, but not limited to, any and every means, mechanism, device, and/or component, by which water is compelled to flow in only a single direction, and/or only toward a respective receiving chamber. The scope of the present invention includes any means, mechanism, device, pipe, aperture, and/or component, by which water is permitted to flow into an initial chamber (e.g., chamber 289 in FIG. 20), including inlet pipes and/or apertures that incorporate one-way valves to prevent water from flowing out of such an initial chamber after having flowed in. The scope of the present invention includes any means, mechanism, device, pipe, aperture, and/or component, by which raised water is directed into, and/or permitted to enter, a water turbine. The scope of the present invention includes any type, design, variety, size, and/or volume, of water turbine. The scope of the present invention includes any type, design, variety, size, and/or rated power, of generator and/or alternator. The scope of the present invention includes any means, mechanism, device, system, module, and/or component, by which generated electrical power is stored.

Figure 21:
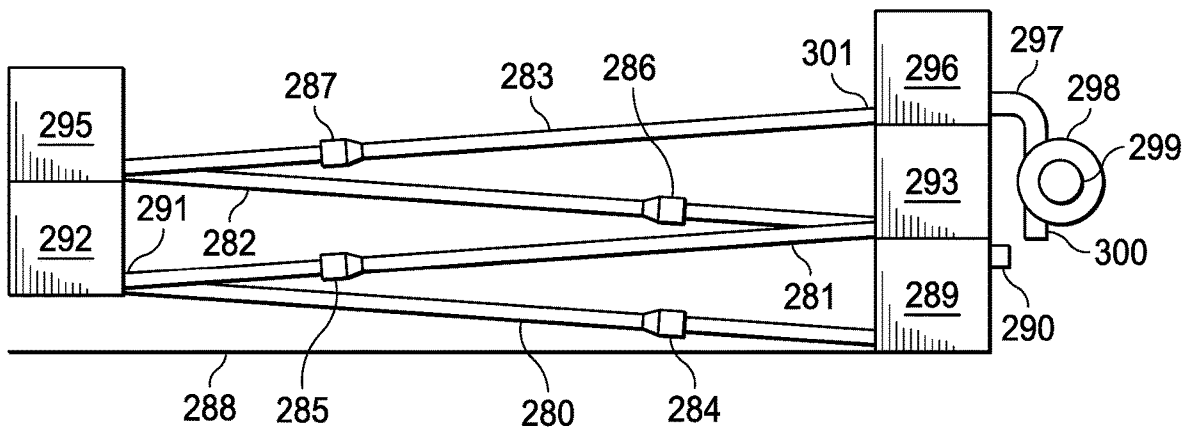
FIG. 21 is a front view of the embodiment of FIG. 20.

FIG. 21 shows a side view of the same power takeoff (PTO) illustrated in FIG. 20. Whereas the inter-chamber pipes, e.g. pipe 108, of the PTO illustrated in FIG. 2 are seen to connect with, and/or enter, their respective receiving chambers, e.g. chamber 107, at an elevated position (relatively high above the bottom of the respective receiving chambers), the corresponding inter-chamber pipes, e.g., pipe 282, of the PTO illustrated in FIGS. 20 and 21 are seen to connect with, and/or enter, their respective receiving chambers, e.g. chamber 295, at a relatively low position, e.g., 294, (relatively near the bottom of the respective receiving chambers). The reduced relative heights above the bottom of the receiving chambers at which the inter-chamber pipes of the PTO illustrated in FIGS. 20 and 21 connect with those respective receiving chambers offers the advantage that a smaller tilt angle can cause water to flow from the originating chamber, e.g., 293, to the relatively higher receiving chamber, e.g., 295, than the tilt angle required of the PTO illustrated in FIGS. 1-8.

Figure 22:
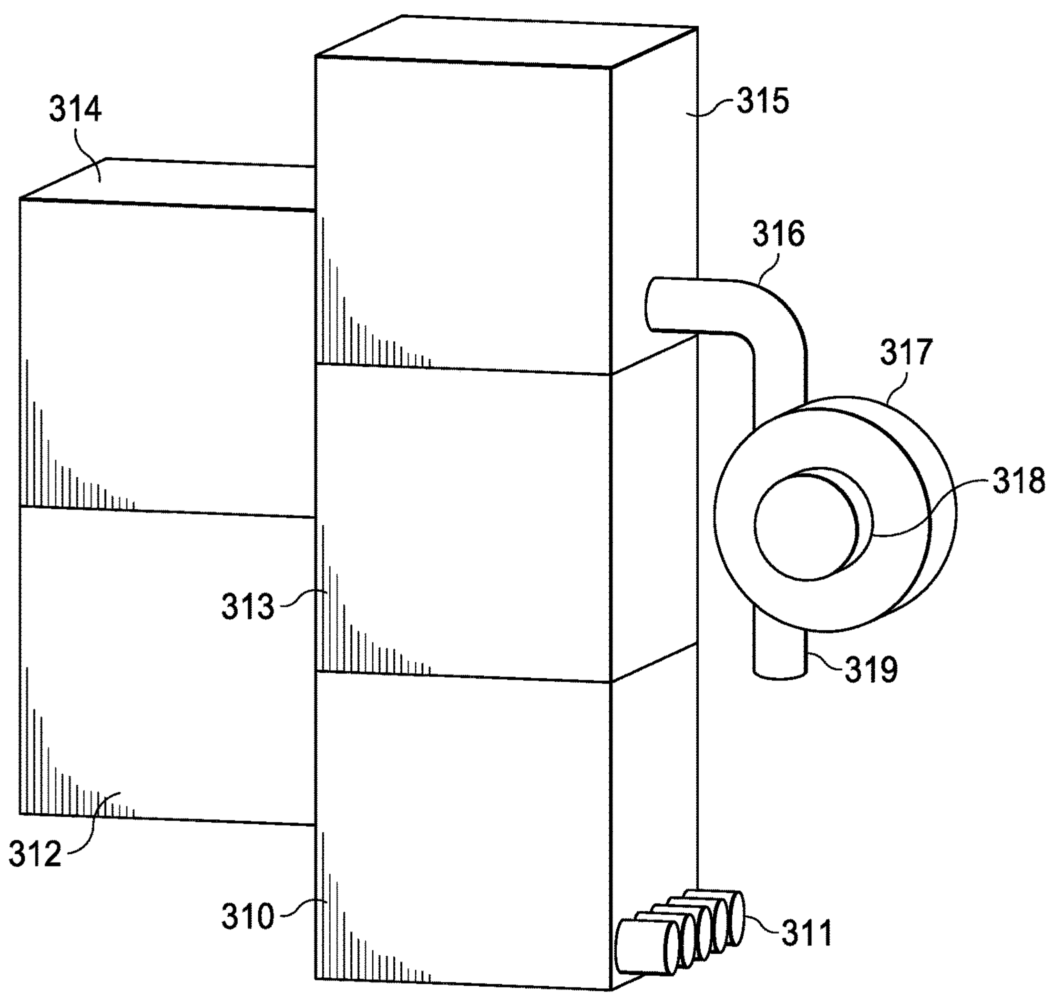
FIG. 22 is an elevated, perspective view of another embodiment of the present invention.

FIG. 22 shows a perspective side view of a power takeoff (PTO) characteristic of an embodiment of the present disclosure. The full embodiment of which the illustrated PTO is a part includes a flotation platform (not shown) to which the illustrated PTO is attached and the embodiment floats adjacent to an upper surface of a body of water over which waves pass. Unlike the PTOs illustrated in FIGS. 1-8, FIGS. 9-11, FIGS. 12-14, FIGS. 15-19, and FIGS. 20-21, the water-holding chambers of the PTO illustrated in FIG. 22 are adjacent to one another without any significant distance separating them from one another. An advantage of this PTO is that a tilts of favorable angles and sufficient magnitudes may achieve an uphill flow of water during a significantly shorter period of time, and the tilts that give rise to the uphill flow of water may therefore be of significantly shorter duration than those of the embodiments illustrated in the earlier figures.

In response to appropriate directions, magnitudes, and durations of tilting of the PTO illustrated in FIG. 22 (and its associated buoyant embodiment, not shown):

Water flows into and/or enters chamber 310 through inlet pipes 311. Unlike the inlet pipes of the PTOs illustrated in the earlier figures, the inlet pipes of the PTO illustrated in FIG. 22 include one-way valves which allow water to enter chamber 310 but do not allow it to leave that chamber. Because of the one-way valves that prevent backflow through the inlet pipes, water that enters chamber 310 through the inlet pipes tends to become trapped within that chamber.

Water trapped within chamber 310 flows into chamber 312 through one-way valves that span the wall(s) separating those chambers, the water thereby becoming trapped within chamber 312, and therefore become trapped at an increased height, level, and/or elevation.

Water trapped within chamber 312 flows into chamber 313 through one-way valves that span the wall(s) separating those chambers, the water thereby becoming trapped within chamber 313, and therefore become trapped at an increased height, level, and/or elevation.

Water trapped within chamber 313 flows into chamber 314 through one-way valves that span the wall(s) separating those chambers, the water thereby becoming trapped within chamber 314, and therefore become trapped at an increased height, level, and/or elevation.

Water trapped within chamber 314 flows into chamber 315 through one-way valves that span the wall(s) separating those chambers, the water thereby becoming trapped within chamber 315, and therefore become trapped at an increased height, level, and/or elevation.

And, water trapped within chamber 315 flows out of that chamber and into pipe 316, and therethrough flows into and through water turbine 317, thereby causing the generator 318 operably connected to water turbine 317 to generate electrical power. After engaging and flowing through the water turbine, the water flows into and out of effluent pipe 319 thereby escaping the PTO and nominally returning to body of water from which it originated, perhaps to re-enter chamber 310 through inlets 311 and repeat the wave-to-electrical power conversion cycle again.

Figure 23:
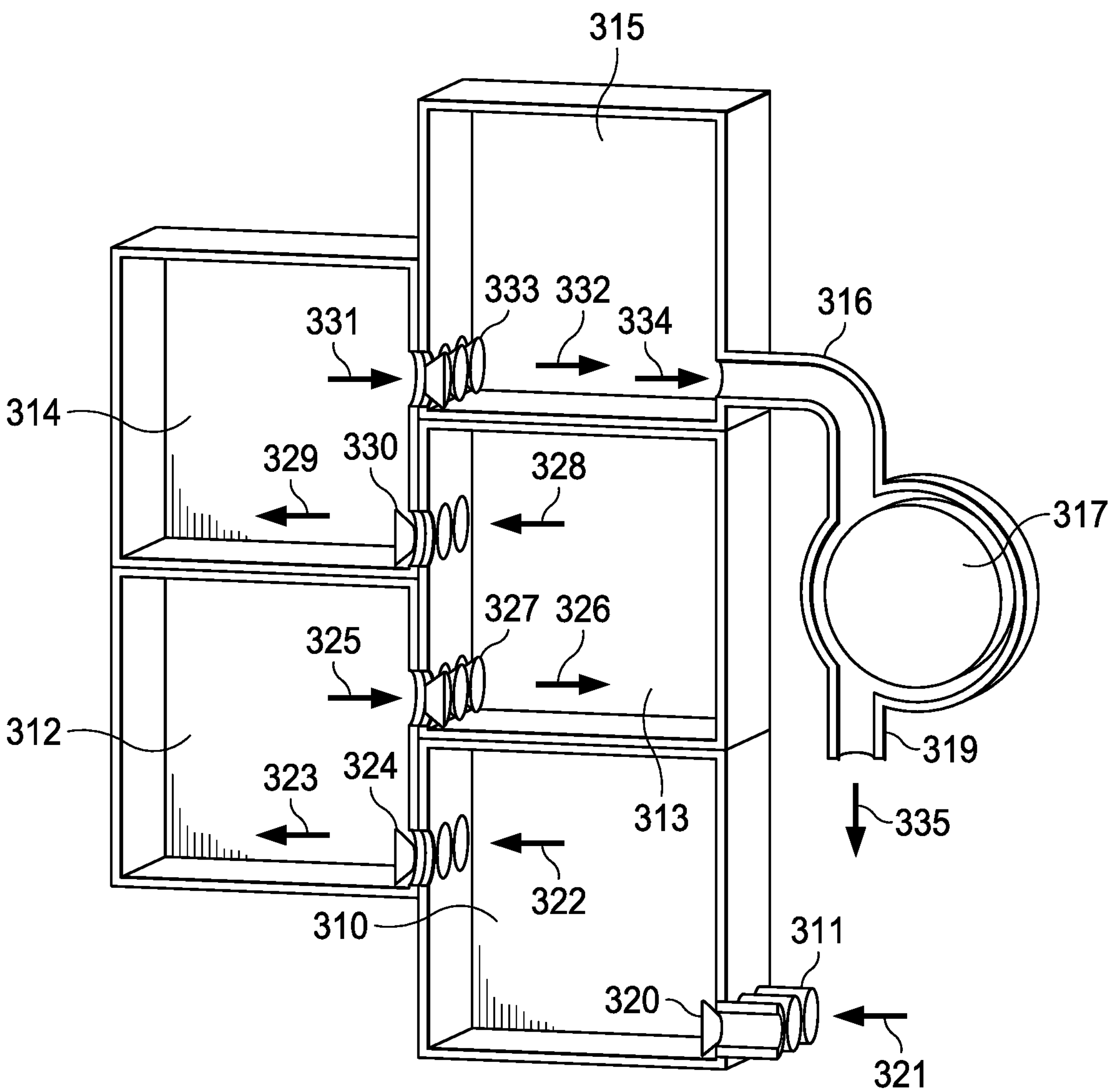
FIG. 23 is a cross sectional view of the embodiment of FIG. 22.

FIG. 23 shows a perspective side sectional view of the same power takeoff (PTO) illustrated in FIG. 22 plane wherein the vertical section plane passes through the center of each water-holding chamber and the water turbine.

When the surface of the body of water impinging upon the one-way inlet pipes 311 and valves 320 is higher than the surface of the water within chamber 310, water flows 321 through the one-way inlet pipes 311 and valves 320, enters chamber 310 and, as a consequence of the one-way valves preventing an out flow of water from the chamber, becomes trapped therein.

In response to a tilt of a favorable angle, e.g., within the section plane and in a counter-clockwise direction relative to the PTO orientation illustrated in FIG. 23, a sufficient magnitude, i.e. a sufficient angle within the section plane, and of sufficient duration, i.e. long enough for water to flow, water flows 322 from chamber 310 and flows 323 into chamber 312 by passing through one-way valves 324.

In response to a tilt of a favorable angle, e.g., within the section plane and in a clockwise direction relative to the PTO orientation illustrated in FIG. 23, a sufficient magnitude, i.e. a sufficient angle within the section plane, and of sufficient duration, i.e. long enough for water to flow, water flows 325 from chamber 312 and flows 326 into chamber 313 by passing through one-way valves 327.

In response to a tilt of a favorable angle, e.g., within the section plane and in a counter-clockwise direction relative to the PTO orientation illustrated in FIG. 23, a sufficient magnitude, i.e. a sufficient angle within the section plane, and of sufficient duration, i.e. long enough for water to flow, water flows 328 from chamber 313 and flows 329 into chamber 314 by passing through one-way valves 330.

In response to a tilt of a favorable angle, e.g., within the section plane and in a clockwise direction relative to the PTO orientation illustrated in FIG. 23, a sufficient magnitude, i.e. a sufficient angle within the section plane, and of sufficient duration, i.e. long enough for water to flow, water flows 331 from chamber 314 and flows 332 into chamber 315 by passing through one-way valves 333.

Water deposited within chamber 315 flows 334 into pipe 316 and therethrough into and through water turbine 317. Water flowing out of the water turbine 317 flows into effluent pipe 319, and thereafter flows 335 out of the lower mouth 319 of the effluent pipe, and thereby flows out of the PTO. In one embodiment, the effluent 335 flows back into the body of water on which the buoyant embodiment floats. In another embodiment, the effluent 335 flows into a tank, pool, and/or reservoir, from which the water that flows 321 into the inlet pipes 311 and chamber 310 is drawn. In another embodiment the chambers are separated from those chambers above (if any) and/or below (if any) by a gap and/or space. In another embodiment, the effluent pipe 319 connects directly to chamber 310 thereby depositing the effluent water into that chamber from which it will repeat, and/or begin again, the pattern of incremental lateral and upward flows that will again deposit it within chamber 315.

The scope of the present invention includes any number, shape, size, and/or volume of water-holding chambers. The scope of the present invention includes any arrangement: horizontal, vertical, and/or spatial, of water-holding chambers, including, but not limited to, the distances between chambers, vertically, horizontally, and/or spatially. The scope of the present invention includes any number, shape, cross-sectional area, diameter, and/or size, of inter-chamber apertures and/or one-way valves, within the PTO, its walls, and/or fluidly connecting any two chambers. The scope of the present invention includes any means, mechanism, device, and/or component, by which the flow of water through the inter-chamber pipes is directed, regulated, adjusted, and/or modified, including, but not limited to, any and every means, mechanism, device, and/or component, by which water is compelled to flow in only a single direction, and/or only toward a respective receiving chamber. The scope of the present invention includes any means, mechanism, device, pipe, aperture, and/or component, by which water is permitted to flow into an initial chamber (e.g., chamber 289 in FIG. 20), including inlet pipes and/or apertures that incorporate one-way valves to prevent water from flowing out of such an initial chamber after having flowed in. The scope of the present invention includes any means, mechanism, device, pipe, aperture, and/or component, by which raised water is directed into, and/or permitted to enter, a water turbine. The scope of the present invention includes any type, design, variety, size, and/or volume, of water turbine. The scope of the present invention includes any type, design, variety, size, and/or rated power, of generator and/or alternator. The scope of the present invention includes any means, mechanism, device, system, module, and/or component, by which generated electrical power is stored.

Figure 24:
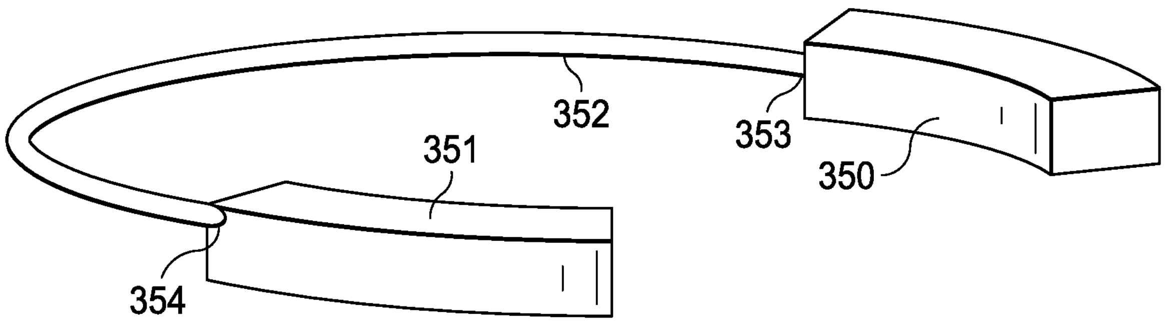
FIG. 24 is an elevated, perspective view of another embodiment of the present invention.

FIG. 24 shows a perspective side view of a pair of water-holding chambers 350 and 351 that constitute an element of a power takeoff (PTO) characteristic of an embodiment of the present disclosure. The PTO of which the illustrated element is a part would typically be mounted to a buoyant platform and when floating adjacent to an upper surface of a body of water and that buoyant platform, and the PTO attached to it, would respond to waves passing beneath the embodiment by tilting.

Water-holding chamber 350 is at a lower height within the PTO of which it is a part. In a resting embodiment that is not moving, chamber 350 is at a lesser height above the surface of the body of water on which the embodiment floats, and/or is at a greater depth below that surface, than is chamber 351. Water will not spontaneously flow from chamber 350 to chamber 351 except in response to a tilt of a favorable direction, i.e. a tilt that raises chamber 350 and/or lowers chamber 351, sufficient magnitude, i.e. a tilt big enough to cause chamber 351 to be partially or fully below chamber 350 relative to their heights above the mean height of the surface of the body of water, and of sufficient duration, i.e. long enough to allow water to flow over the distance that separates chambers 350 and 351.

Chamber 350 is fluidly connected to chamber 351 by inter-chamber pipe 352. Inter-chamber pipe 352 connects to chamber 350 near its lowermost chamber wall. Inter-chamber pipe 352 connects to chamber 351 near its uppermost chamber wall. Because of the low connection point of inter-chamber pipe 352 to chamber 350, water from within chamber 350 will tend to immediately flow into that pipe with the chamber and pipe are subjected to a favorable tilt. Because of the high connection point of inter-chamber pipe 352 to chamber 351, water that flows into chamber 351 from chamber 350 will tend to be trapped within chamber 351 and unable to flow back into pipe 352 and back to chamber 350.

Inter-chamber pipe 352 follows a circumferential path from an outer wall (a wall furthest from the center about which chambers 350 and 351 are arrayed) of chamber 350 to an outer wall of chamber 351.

Figure 25:
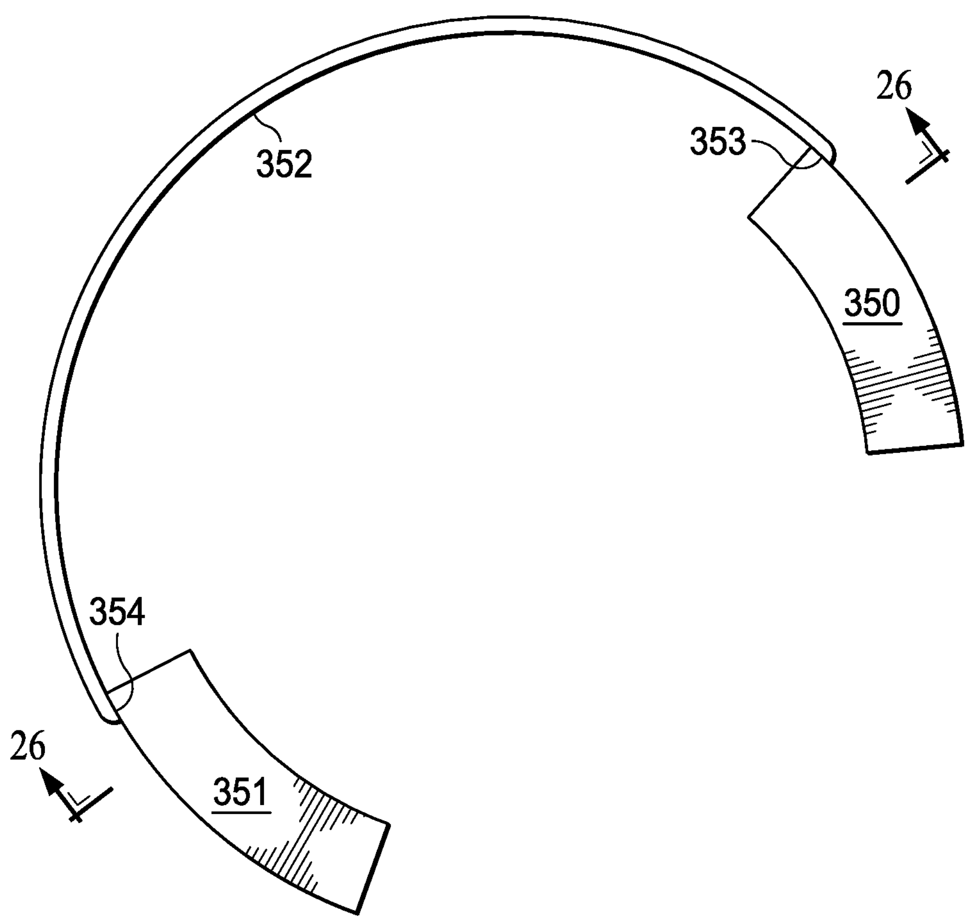
FIG. 25 is a top view of the embodiment of FIG. 24.

FIG. 25 shows a top-down view of the same pair of water-holding chambers 350 and 351 illustrated in FIG. 24.

Figure 26:
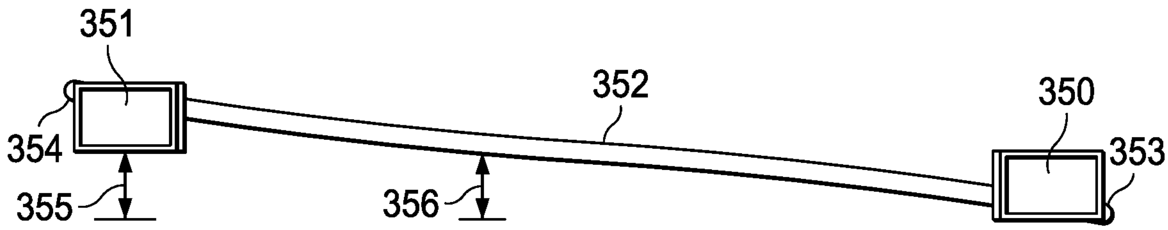
FIG. 26 is a cross sectional view of the embodiment of FIG. 24.

FIG. 26 shows a side sectional view of the same pair of water-holding chambers 350 and 351 illustrated in FIGS. 24 and 25 wherein the vertical section plane is specified in FIG. 25 and the section is taken across line 26-26.

Relative to a resting, and/or nominally oriented embodiment and PTO, chamber 351 is positioned at a greater height 355 than is chamber 350. And, inter-chamber pipe 352 connects to chamber 350 at a relatively bottom-most position 353 while connecting to chamber 351 at a relatively upper-most position 354. When the PTO of which the illustrated pair of water-holding chambers are a part must tilt to an angle 356 then, if there is water within chamber 350 and there is room to accommodate additional water within chamber 351, water to flow from chamber 350 to chamber 351 through pipe 352. However, water will also flow if, when, and for as long as, the tilt of the associated PTO and embodiment reaches or exceeds the lesser angle characteristic of a line intersecting an upper surface of the water within chamber 350 and the aperture 354 through which inter-chamber pipe 352 connects with chamber 351.

Figure 27:
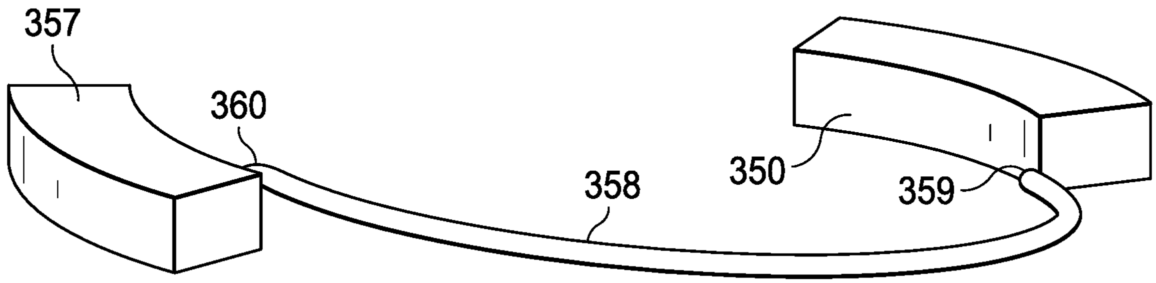
FIG. 27 is an elevated, perspective view of another embodiment of the present invention.

FIG. 27 shows a perspective side view of a pair of water-holding chambers 350 and 357 that constitute an element of a power takeoff (PTO) characteristic of an embodiment of the present disclosure. The PTO of which the illustrated element is a part would typically be mounted to a buoyant platform and when floating adjacent to an upper surface of a body of water and that buoyant platform, and the PTO attached to it, would respond to waves passing beneath the embodiment by tilting.

Whereas chamber 350 was fluidly connected to chamber 351 by an inter-chamber pipe 352 that followed a circumferential path outside and adjacent to a circular boundary that passes through the outer walls of chambers 350 and 351, the water-holding chambers 350 and 357 are fluidly connected to one another by an inter-chamber pipe 358 that follows a circumferential path inside and adjacent to a circular boundary that passes through the inner walls of chambers 350 and 357. As was the case for the inter-chamber pipe 352 that permits water to flow from chamber 350 to chamber 351, the inter-chamber pipe 358 is connected to chamber 350 at a low position 359, adjacent to a lower and/or bottom wall of chamber 350; and it is connected to chamber 357 at a high position 360, adjacent to an upper and/or top wall of chamber 357—thus water that has flowed from chamber 350 into chamber 357 will be unlikely or unable to flow back into inter-chamber pipe 358 and therethrough back to chamber 350.

Figure 28:
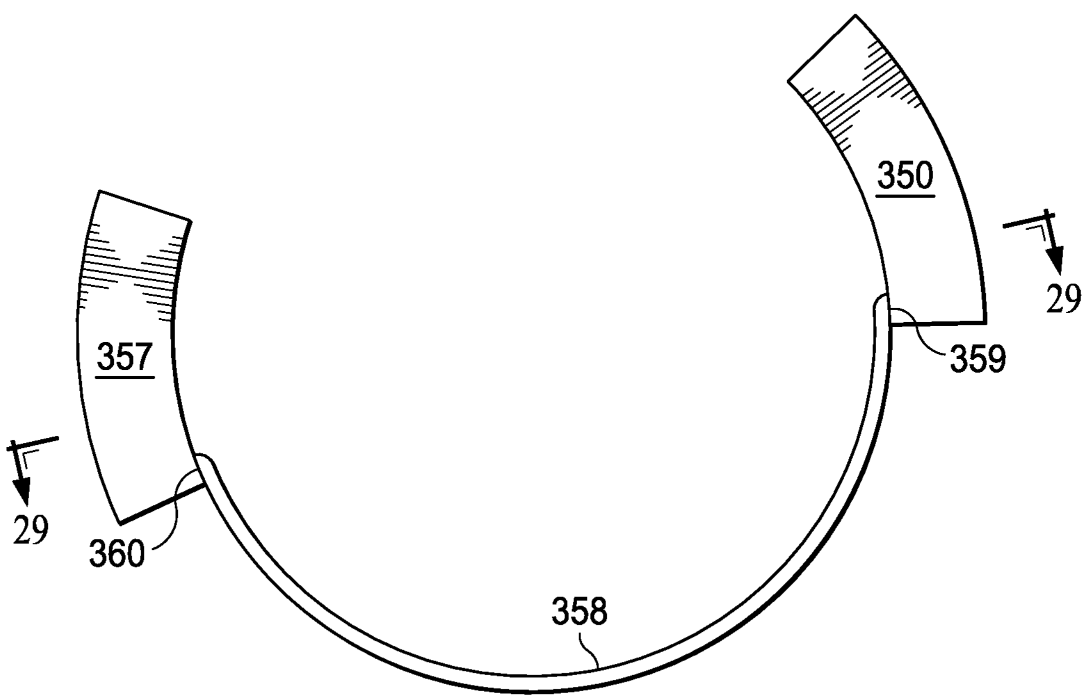
FIG. 28 is a top view of the embodiment of FIG. 27.

FIG. 28 shows a top-down view of the same pair of water-holding chambers 350 and 357 illustrated in FIG. 27.

Figure 29:
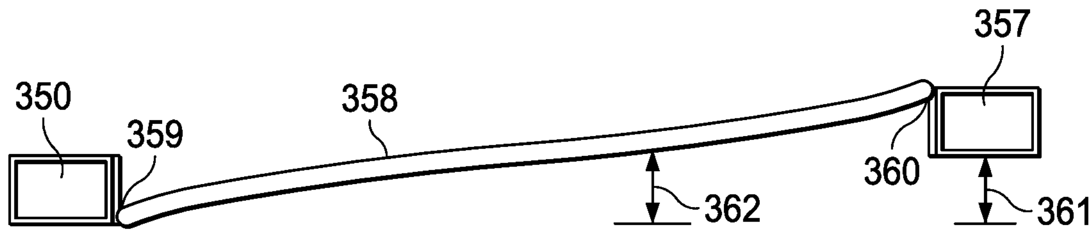
FIG. 29 is a cross sectional view of the embodiment of FIG. 27.

FIG. 29 shows a side sectional view of the same pair of water-holding chambers 350 and 357 illustrated in FIGS. 27 and 28 wherein the vertical section plane is specified in FIG. 28 and the section is taken across line 29-29.

Relative to a resting, and/or nominally oriented embodiment and PTO, chamber 357 is positioned at a greater height 361 than is chamber 350. And, inter-chamber pipe 358 connects to chamber 350 at a relatively bottom-most position 359 while connecting to chamber 357 at a relatively upper-most position 360. When the PTO of which the illustrated pair of water-holding chambers are a part must tilt to an angle 362 then, if there is water within chamber 350 and there is room to accommodate additional water within chamber 357, water to flow from chamber 350 to chamber 357 through pipe 358. However, water will also flow if, when, and for as long as, the tilt of the associated PTO and embodiment reaches or exceeds the lesser angle characteristic of a line intersecting an upper surface of the water within chamber 350 and the aperture 360 through which inter-chamber pipe 358 connects with chamber 357.

Figure 30:
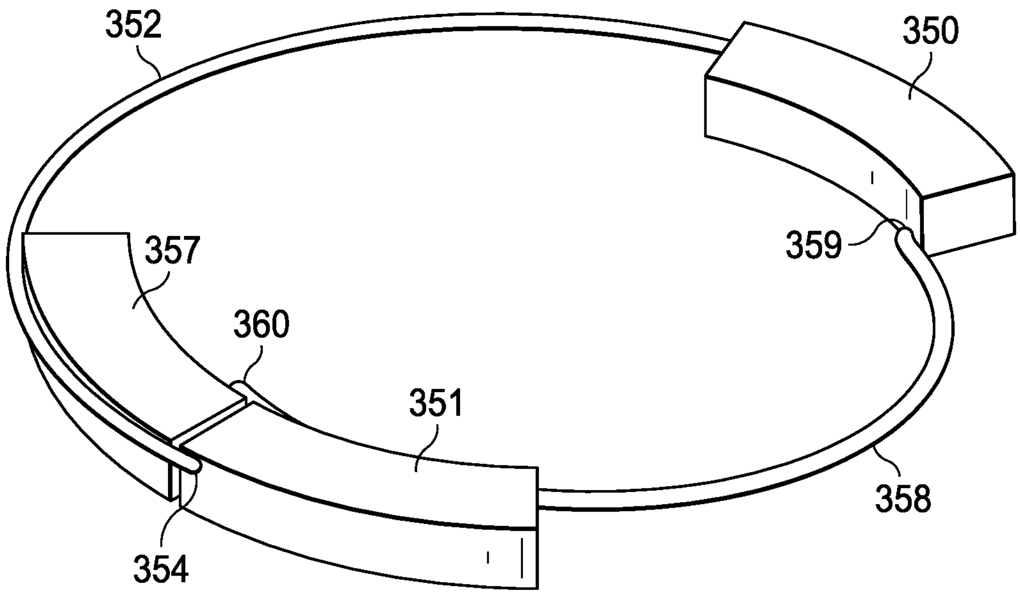
FIG. 30 is an elevated, perspective view of another embodiment of the present invention.

FIG. 30 shows a perspective side view of the same three inter-connected water-holding chambers 350, 351, and 357, that are illustrated as separate pairs of chambers in FIGS. 24-26 and FIGS. 27-29. The three inter-connected chambers and their respective inter-chamber pipes constitute an element of a power takeoff (PTO) characteristic of an embodiment of the present disclosure. The PTO of which the illustrated element is a part would typically be mounted to a buoyant platform and when floating adjacent to an upper surface of a body of water and that buoyant platform, and the PTO attached to it, would respond to waves passing beneath the embodiment by tilting.

Upper chambers 351 and 357 are at approximately the same height above, and/or vertical distance from, lower chamber 350. In response to a wave-induced tilting of the PTO configuration illustrated in FIG. 30 of favorable direction, magnitude, and duration, water will tend to flow from chamber 350 to chamber 351 through inter-chamber pipe 352, and simultaneously flow from chamber 350 to chamber 357 through inter-chamber pipe 358.

Figure 31:
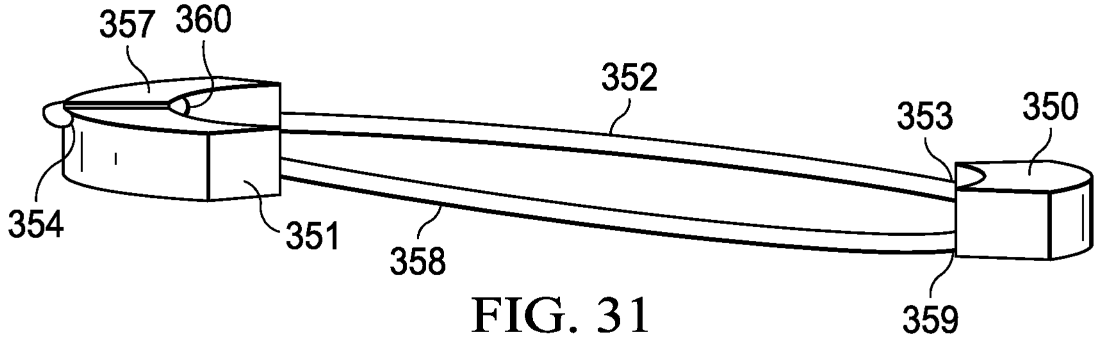
FIG. 31 is another elevated, perspective view of the embodiment of FIG. 30.

FIG. 31 shows a perspective side view of the same three inter-connected water-holding chambers 350, 351, and 357, that are illustrated in FIG. 30. Note that chambers 351 and 357 are at a greater height and/or elevation than is chamber 350. And, because of this, water will only tend to flow from chamber 350 to chambers 351 and 357 in response to a wave-induced tilt of the PTO of a favorable angle, sufficient magnitude, and sufficient duration.

Figure 32:
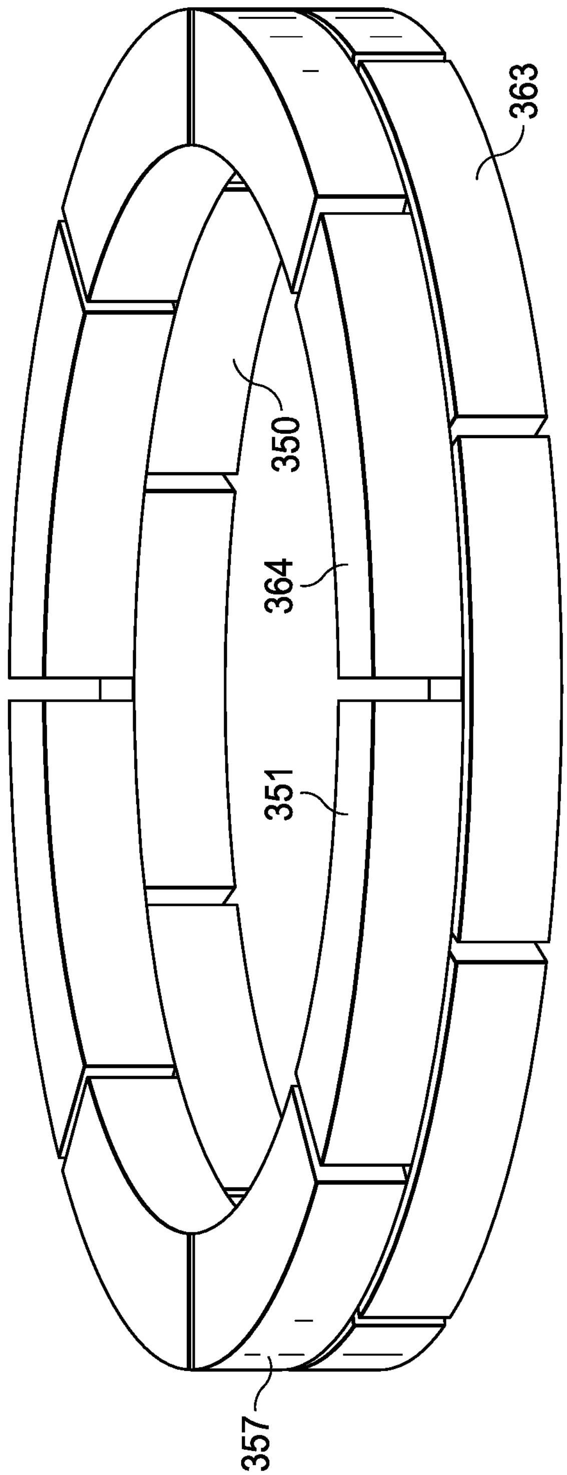
FIG. 32 is an elevated, perspective view of another embodiment of the present invention.

FIG. 32 shows a perspective side view of two levels of water-holding chambers arrayed in concentric circular patterns about a common vertical longitudinal axis. Eight chambers, e.g., 350 and 363, on the lower level, i.e. the level that would be characterized by the least height (the least positive height or the greatest negative height) relative to the resting surface of a body of water on which a power takeoff (PTO) comprised in part of the chambers and an attached buoyant platform might float, are rotationally and/or angularly offset by approximately one-half the width of a chamber from eight chambers, e.g., 351, 357, and 364, on an upper that would be characterized by a greater height than those of the lower level. Chamber 350 of the lower level, and chambers 351 and 357 of the upper level, have the same relative spatial orientations, placements, separation distances, and positions, as illustrated in FIGS. 24-31.

Figure 33:
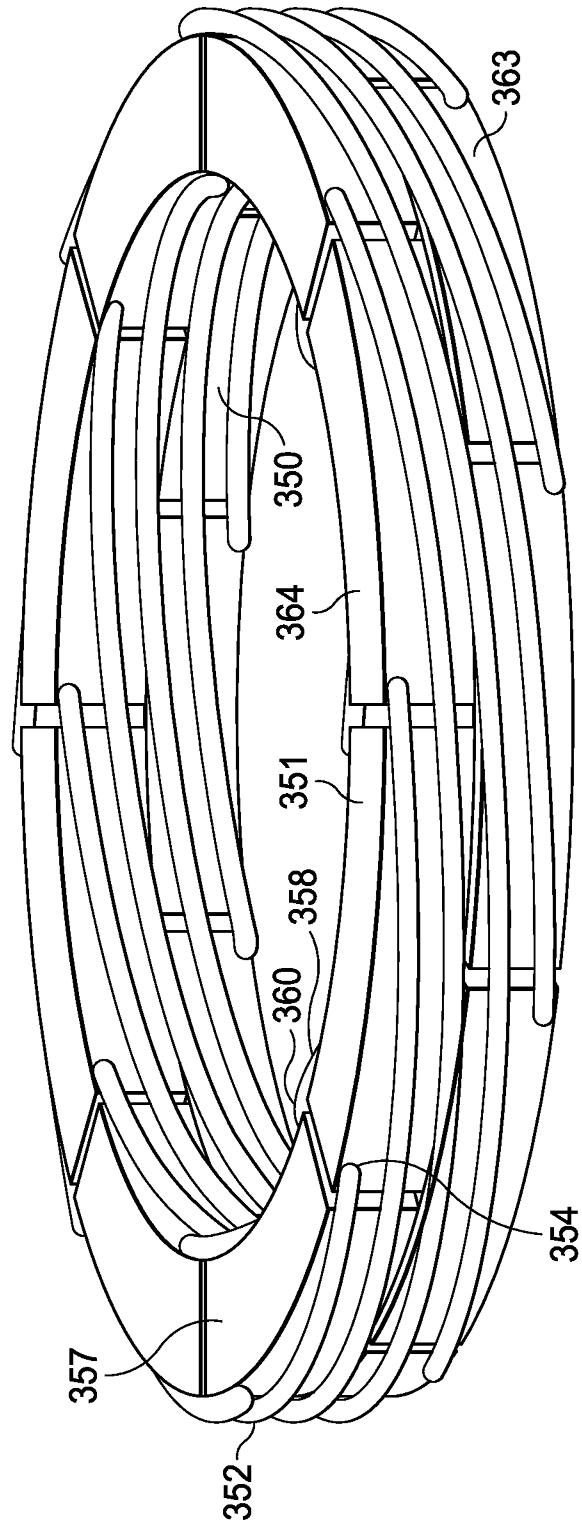
FIG. 33 is another elevated, perspective view of the embodiment of FIG. 32.

FIG. 33 shows a perspective side view of the same two levels of water-holding chambers illustrated in FIG. 32. However, in FIG. 33, those chambers have been interconnected in the manner illustrated in FIGS. 24-31.

Each of the eight chambers, e.g. chamber 350, on the lower level is connected to a pair of adjacent chambers, e.g., chambers 351 and 357 respectively, on the upper level. One connection of each chamber on the lower level, e.g., chamber 350, is established through an outer circumferential inter-chamber pipe, e.g., pipe 352. And, the other connection of each chamber on the lower level, e.g., chamber 350, is by way of an inner circumferential inter-chamber pipe, e.g., pipe 358.

Figure 34:
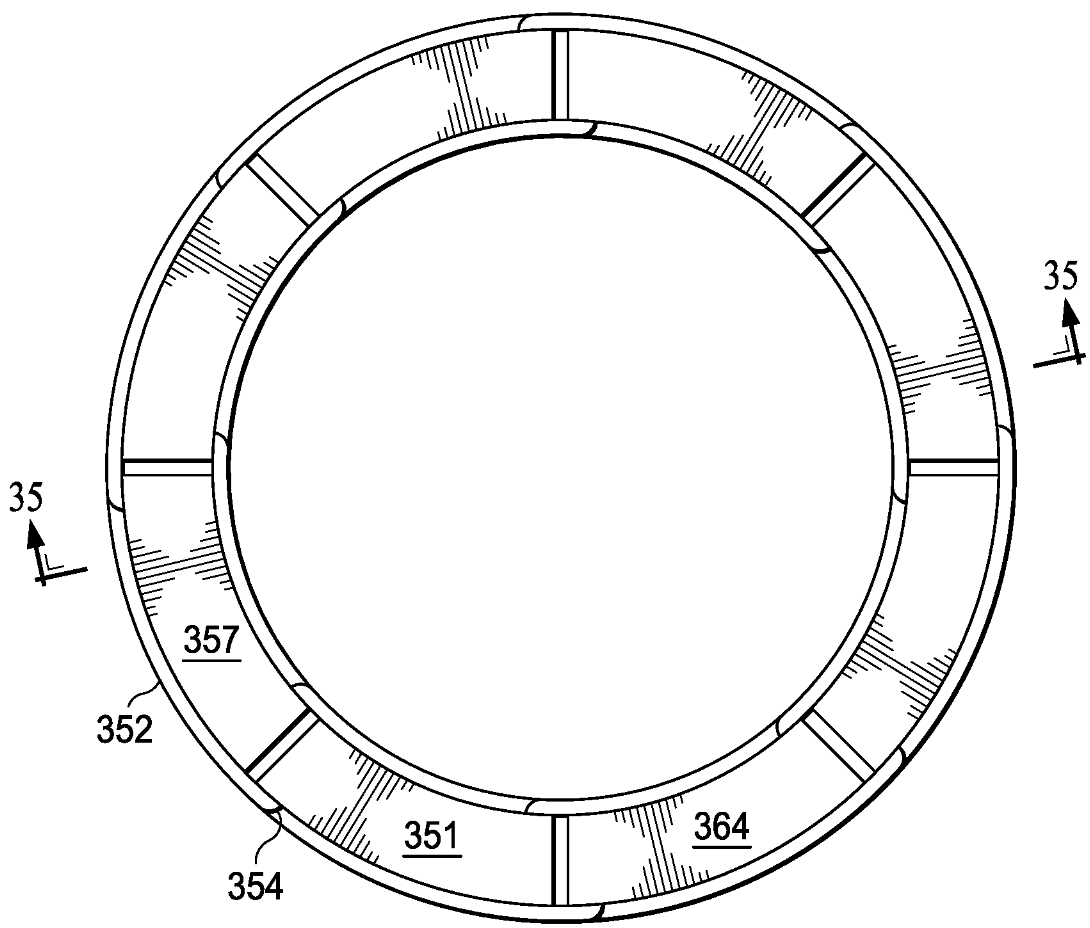
FIG. 34 is a top view of the embodiment of FIG. 32.

FIG. 34 shows a top-down view of the same two levels of inter-connected water-holding chambers illustrated in FIG. 33.

Figure 35:
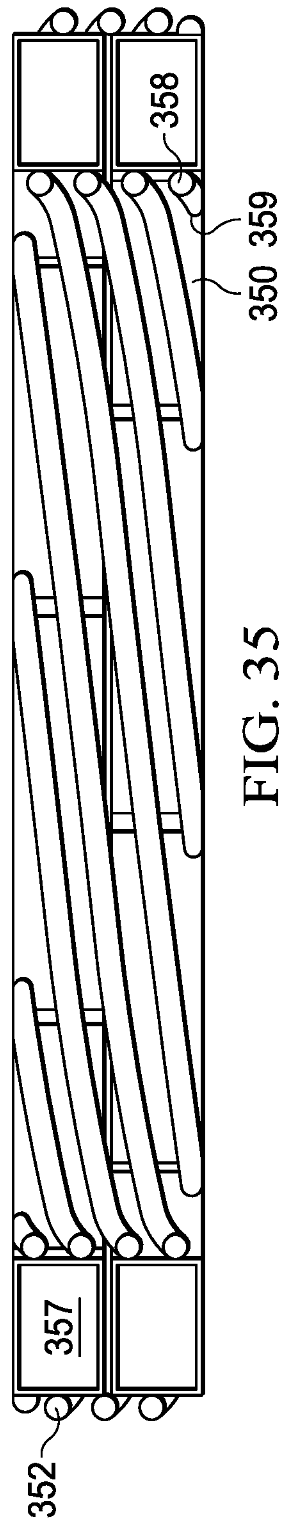
FIG. 35 is a cross sectional view of the embodiment of FIG. 32.

FIG. 35 shows a side sectional view of the same two levels of inter-connected water-holding chambers illustrated in FIGS. 33 and 34, wherein the vertical section plane is specified in FIG. 34 and the section is taken across line 35-35.

Figure 36:
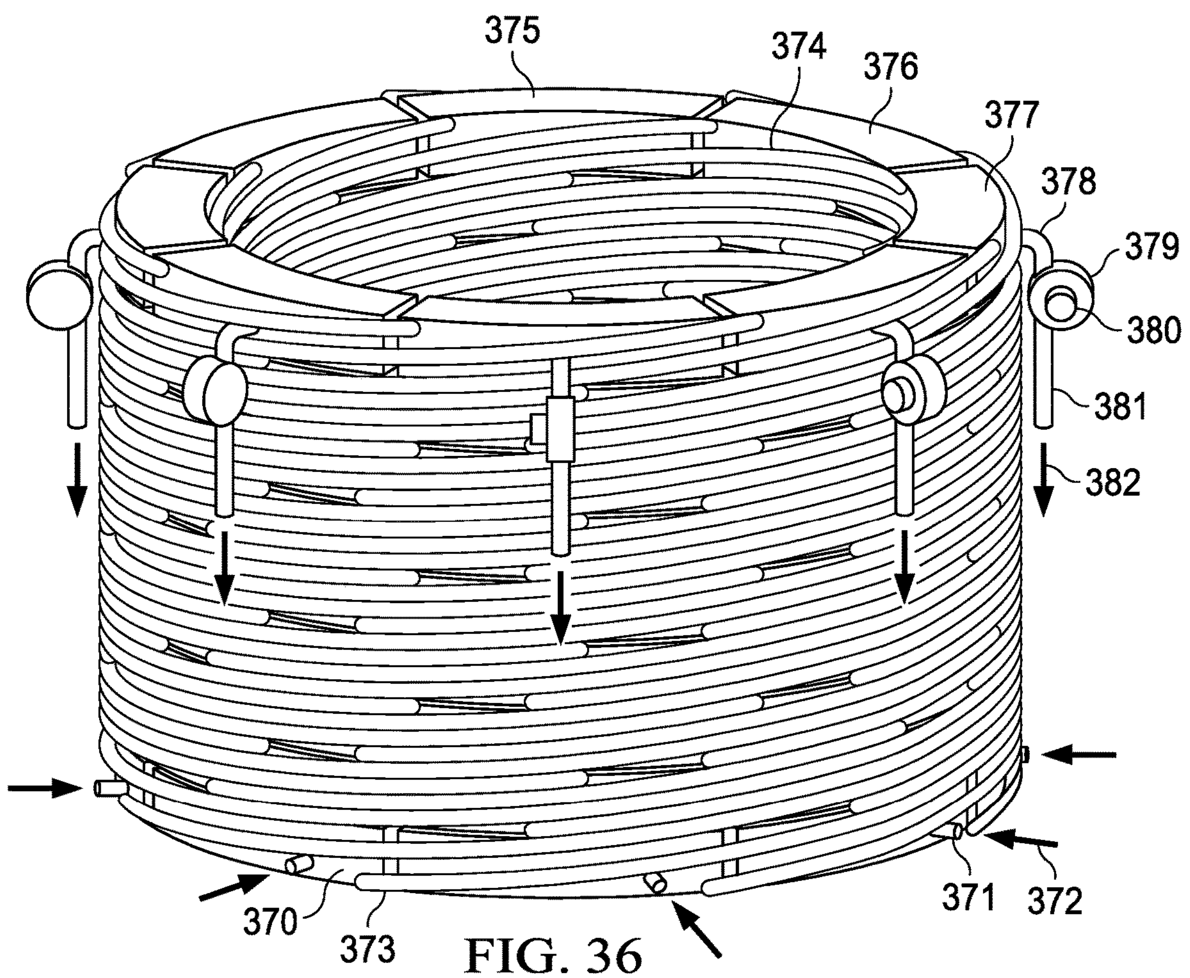
FIG. 36 is an elevated, perspective view of another embodiment of the present invention.

FIG. 36 shows a perspective side view of a power takeoff (PTO) characteristic of an embodiment of the present disclosure. The full embodiment of which the illustrated PTO is a part includes a flotation platform (not shown) to which the illustrated PTO is attached and the embodiment floats adjacent to an upper surface of a body of water over which waves pass.

The PTO illustrated in FIG. 36 is comprised of nine levels of water-holding chambers similar to the two levels of water-holding chambers illustrated in FIGS. 32-35. Each chamber on the first and/or lowest eight levels is fluidly connected to two chambers on the next highest level radially positioned approximately opposite each respective lower-level chamber. Each chamber on the first and/or lowest eight levels is fluidly connected to a first of two radially-opposing chambers on the next highest level by a circumferential inter-chamber pipe positioned outside the concentric levels of radially-positioned chambers. And, each chamber on the first and/or lowest eight levels is fluidly connected to a second of two radially-opposing chambers on the next highest level by a circumferential inter-chamber pipe positioned inside the concentric levels of radially-positioned chambers.

The relationship of each chamber on each of the first and/or lowest eight levels of the PTO to the chambers on the respective next highest levels, and the inter-connections between the chambers on each level of the PTO to the chambers on the adjacent levels of the PTO is the same as illustrated in FIGS. 33 and 35.

Each water-holding chamber, e.g., 370, in the lowest-level of the PTO, includes an inlet pipe, e.g., 371, through which water may flow 372 into each respective lowest-level chamber, from which a succession of favorable tilts, of adequate magnitude and duration, may raise that water from chamber to chamber, and from level to level, through the circumferential array of inter-chamber pipes, some wrapping around the outside the cylindrical array of chambers, e.g., 373, and some wrapping around the inside of the cylindrical array of chambers, e.g., 374, that connect each chamber within the PTO to at least one other chamber on a different level, until the water is deposited within a chamber in the uppermost level of the PTO, e.g. 375-377.

Each water-holding chamber, e.g., 375-377, at the uppermost level of the PTO, includes a pipe, e.g., 378, through which water may flow out of the respective upper chamber and therethrough flow into and through a water turbine, e.g., 379, thereby imparting energy to a respective operably connected generator, e.g., 380. Water flowing out of each water turbine id directed into a respective effluent pipe, e.g., 381, through and from which it flows 382 out of the PTO. In one embodiment, the water flowing out of the embodiment's PTO flows back into the body of water on which the embodiment floats and from which the water entering the chambers on the lowest level of the PTO is drawn. In another embodiment, the water flowing out of the embodiment's PTO flows into a reservoir and thereafter tends to reenter a chamber on the lowest level of the PTO and repeat the cycle of flows that will again raise it to the upper level and again deposit it into a chamber on the upper level from which it will again energize a water turbine and an operably connected generator.

While the PTO illustrated in FIG. 36 contains nine levels of chambers, the scope of the present invention includes PTOs with any number of levels. And, while the chambers of each level within the PTO illustrated in FIG. 36 are concentric about a common vertical longitudinal axis of the PTO, and are positioned at the same relative height with respect to the base of the PTO, the scope of the present invention includes PTOs with any positional arrangement of chambers within a level, and with any vertical offsets of chambers within any particular level. The scope of the present invention includes PTOs with any number of chambers in a level, any number of levels of chambers, any radial separation of the chambers within a level, any spatial orientation, spacing, separations, and/or arrangement, of chambers within a level and/or within a PTO. The scope of the present invention includes PTOs with chambers of any size, chambers of differing sizes, chambers of any volume, and chambers of differing volumes. The scope of the present invention includes PTOs with chambers inter-connecting with any number of other chambers on different levels of the PTO and/or on the same level of the PTO. The scope of the present invention includes PTOs in which any particular chamber within the PTO is connected to any other chamber on the same or a different level by any number of pipes. The scope of the present invention includes PTOs in which any particular chamber within the PTO is connected to any other chamber on the same or a different level by one or more pipes containing, incorporating, and/or utilizing, any mechanism, manner, means, device, and/or valve, to regulate, control, adjust, direct, and/or alter, the pattern of flow within the pipe(s), including, but not limited to, the creation of one-way flows.

The scope of the present invention includes PTOs with any arrangement of inter-chamber pipes, any number of such pipes, any pipe diameters, any pipe cross-sectional areas, any pipe lengths, any pipe shapes, and any pipe couplings.

Figure 37:
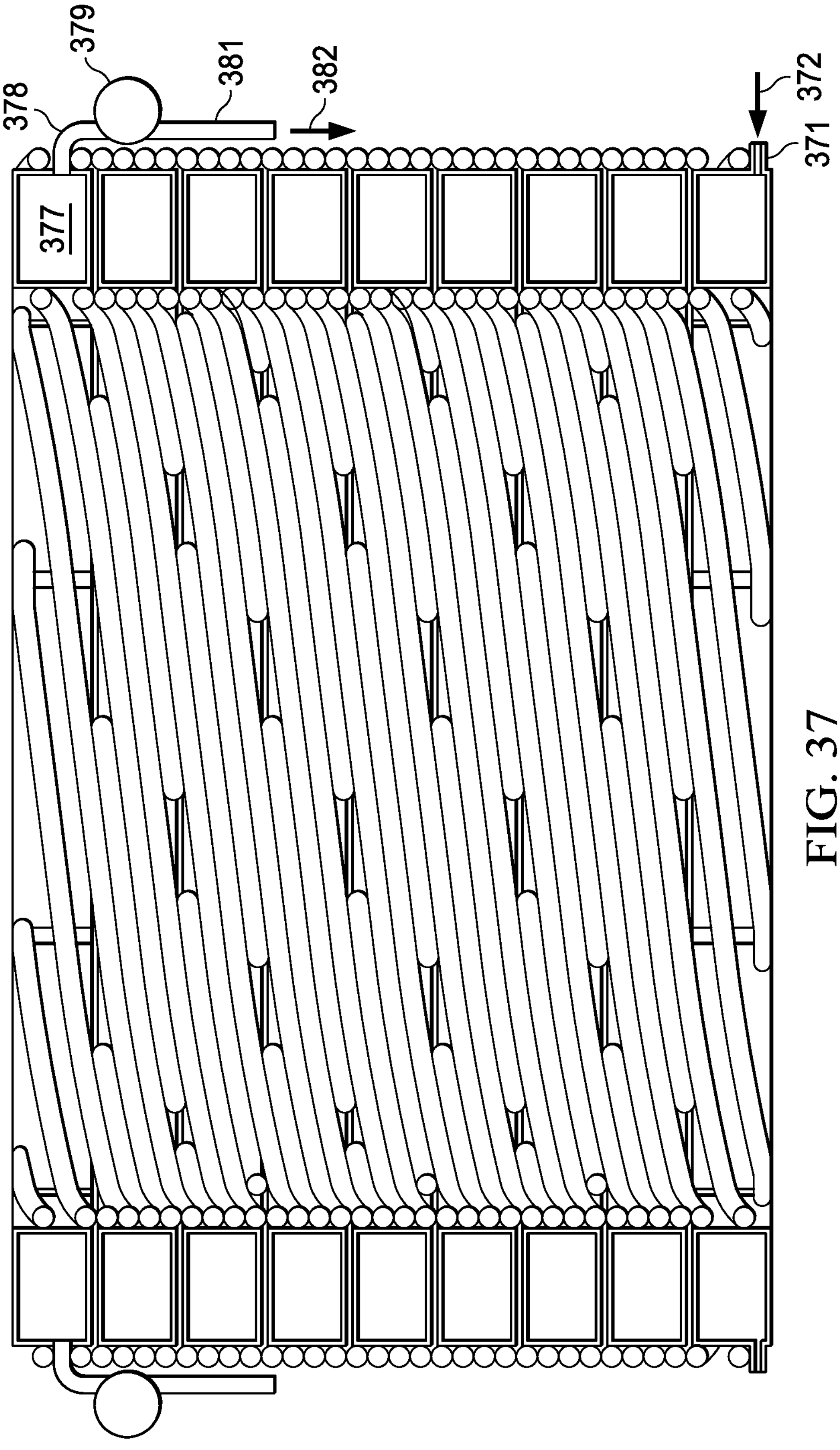
FIG. 37 is a cross sectional view of the embodiment of FIG. 36.

FIG. 37 shows a side sectional view of the same power takeoff (PTO) illustrated in FIG. 36, wherein the vertical section plane passes through a central vertical longitudinal axis of approximate radial symmetry.

Figure 38:
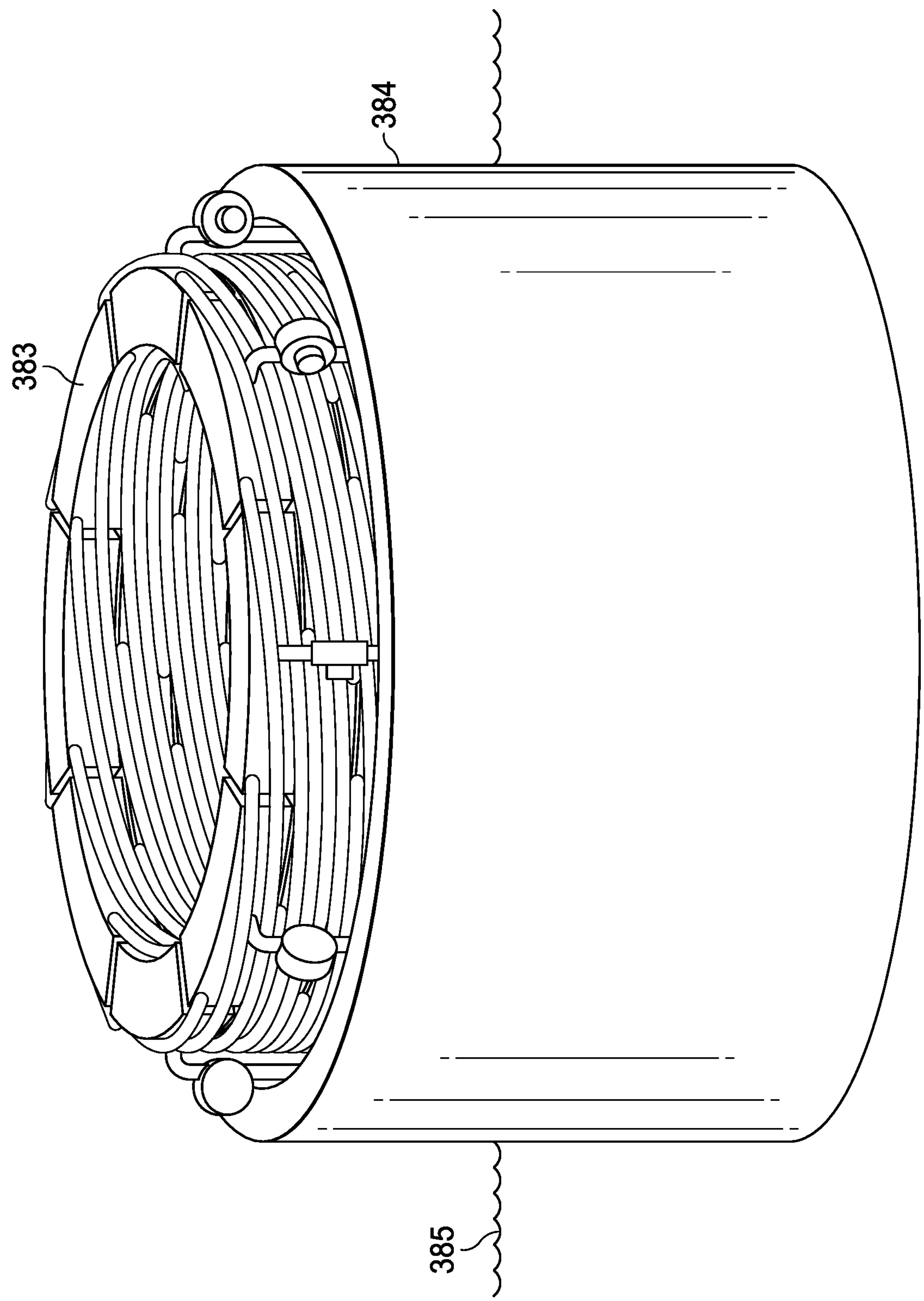
FIG. 38 is an elevated, perspective view of another embodiment of the present invention.

FIG. 38 shows a perspective side view of an embodiment of the present disclosure that incorporates the power takeoff (PTO) illustrated in FIGS. 36 and 37.

The approximately cylindrical PTO 383 is positioned within, and attached to, an approximately cylindrical buoy 384, buoyant structure, flotation module, vessel, and/or float. The embodiment incorporating the PTO 383 floats adjacent to an upper surface 385 of a body of water over which waves tend to pass. The waves buffet the embodiment, thereby causing the PTO 383 within the embodiment to tilt in a variety of directions, for a variety of durations, and thereby tending to cause the water within the PTO to be progressively and/or incrementally lifted until it spills out and through the PTO's water turbines, thereby generating electrical power.

Figure 39:
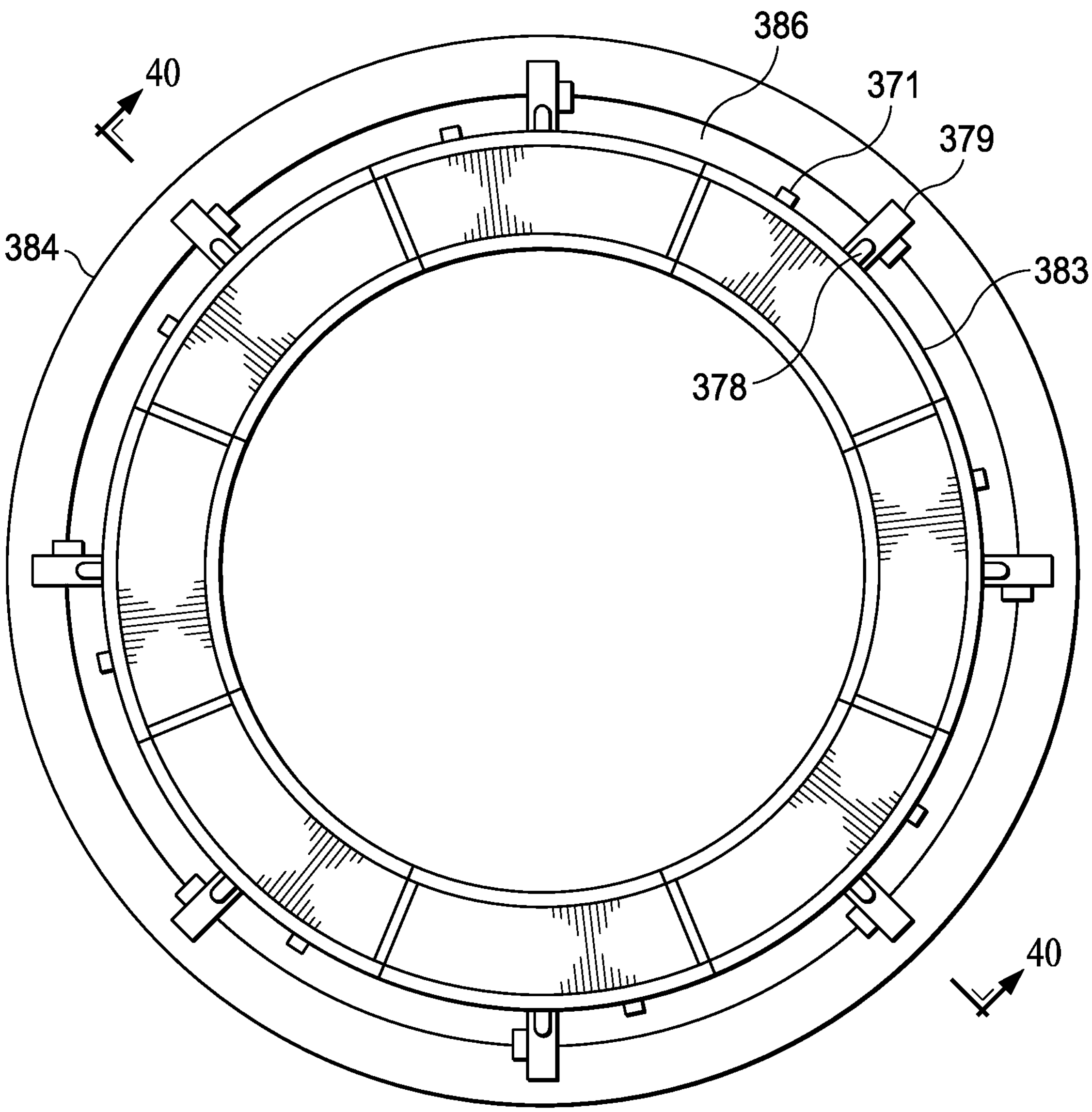
FIG. 39 is a top view of the embodiment of FIG. 38.

FIG. 39 shows a top-down view of the same embodiment of the present disclosure that is illustrated in FIG. 38.

Water that flows into the water turbines through pipes, e.g., 378, and flows through the respective water turbines, e.g., 379, is subsequently discharged from the effluent pipes of those water turbines and deposited into a water reservoir 386 between the exterior of the power takeoff (PTO) 383 and the inner wall of the cavity within the buoy 384 within which the PTO is positioned. Water within the reservoir 386 flows into the PTO's inlet apertures, e.g., 371, and is again lifted through the PTO's water-holding chambers, in response to wave-induced tilting, until it is again released from the PTO's upper level and directed through one of the PTO's water turbines to again generate electrical power.

The water (or other fluid) that flows through the PTO is repeatedly deposited into the embodiment's water reservoir 386 and therefrom repeatedly recycled and/or recirculated through the PTO.

Figure 40:
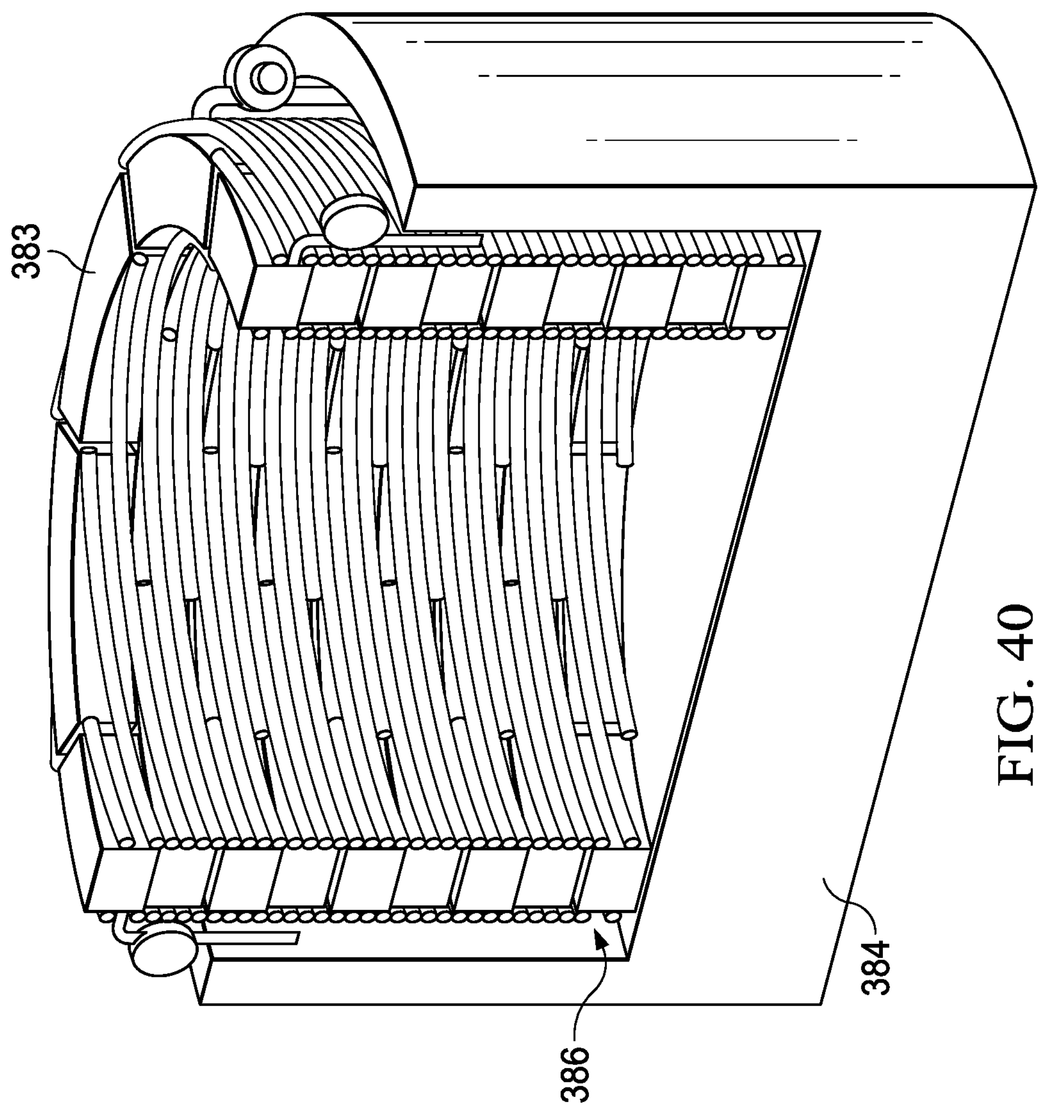
FIG. 40 is a cross sectional view of the embodiment of FIG. 38.

FIG. 40 shows a side perspective sectional view of the same embodiment of the present disclosure that is illustrated in FIGS. 38 and 39 wherein the vertical section plane is specified in FIG. 39 and the section is taken across line 40-40. After its discharge (382 in FIG. 37) from a water turbine's effluent tube (381 in FIG. 37), water accumulates and is stored in the embodiment's water reservoir 386, until it again enters (372 in FIG. 37) an inlet aperture (371 in FIG. 37), is again lifted within the PTO, and is again discharged from a water turbine's effluent tube.

Figure 41:
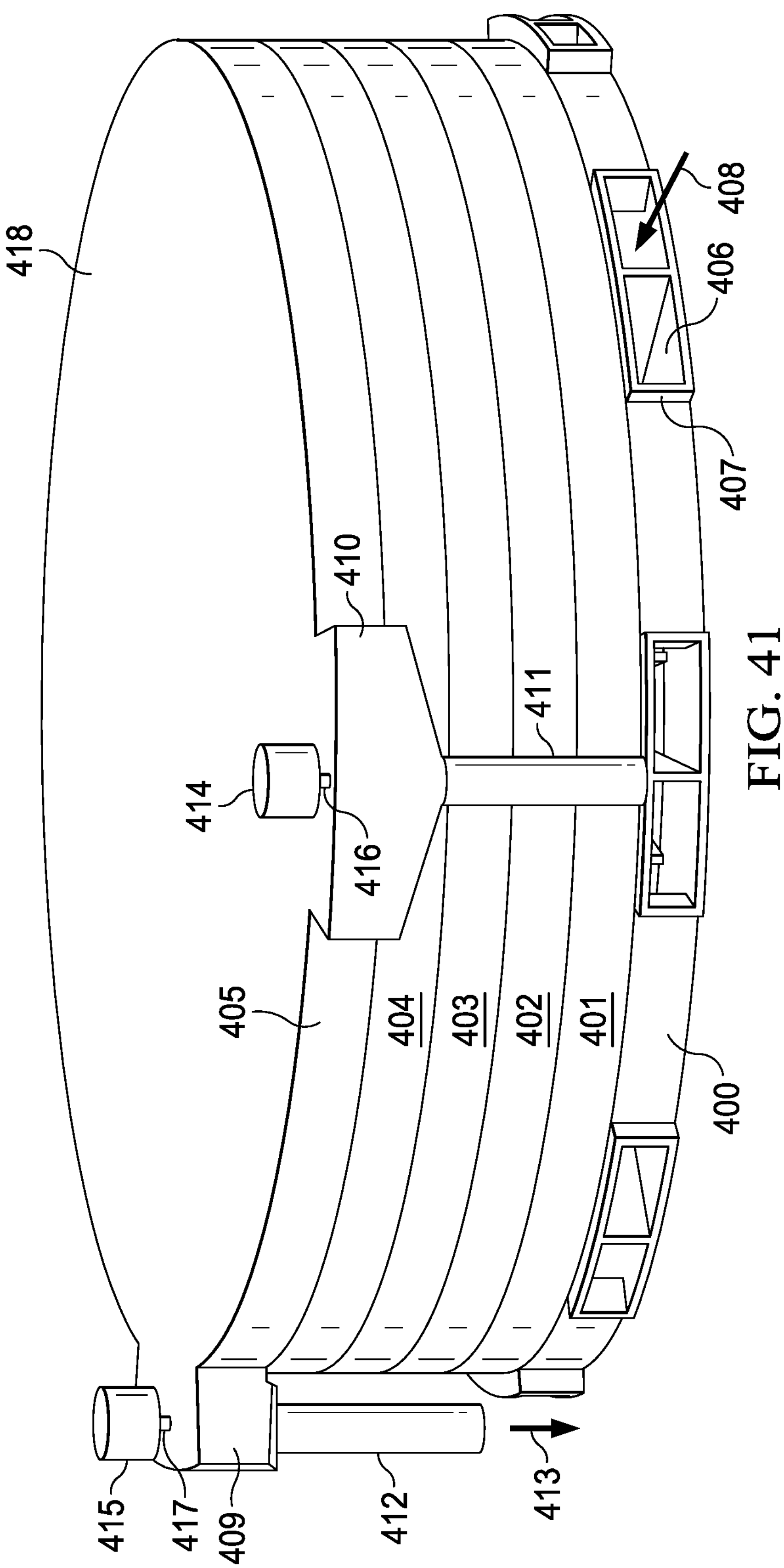
FIG. 41 an elevated, perspective view of another embodiment of the present invention.

FIG. 41 shows a perspective side view of a power takeoff (PTO) characteristic of an embodiment of the present disclosure. The full embodiment of which the illustrated PTO is a part includes a flotation platform (not shown) to which the illustrated PTO is attached and floats adjacent to an upper surface of a body of water over which waves pass.

Although not required for its manufacture or operation, the PTO illustrated in FIG. 41 is comprised of a number of interleaved outer and inner layers. The six outer layers 400-405 are stacked with adjacent upper and lower surfaces. They are arrayed so as to be coaxial about a common vertical longitudinal axis, that is also an axis of approximate radial symmetry. Between each pair of adjacent outer layers is interleaved an inner layer (not visible) which is also positioned so as to be coaxial about the same common vertical longitudinal axis about which the outer layers are arrayed.

The bottommost outer layer 400 includes eight inlet apertures, e.g., 406, each of which is defined by a respective structural frame, e.g., 407, through which water flows 408 into an annular reservoir (not visible) of the bottommost layer.

A tilting motion of the PTO, and the embodiment to which it is attached, of favorable direction, and sufficient magnitude and duration, causes a portion of the water in the annular reservoir of the bottommost outer layer 400 to flow into a reservoir at the center of the adjacent and bottommost inner layer (not visible) that is positioned between outer layers 400 and 401. Successive tilting motions of the PTO, and the embodiment to which it is attached, of favorable direction, and sufficient magnitude and duration, cause water to rise by flowing from annular reservoirs (in outer layers) to central reservoirs (in interleaved inner layers), and then from central reservoirs to annular reservoirs.

After a sufficient number of sufficient tilting motions, water reaches the annular reservoir of the uppermost layer 405 from which it flows into one of two turbine reservoirs 409 and 410, and therefrom into and through two effluent pipes 411 and 412. In one embodiment, water exiting the effluent pipes, e.g., 413, flows back into the body of water on which the embodiment floats, and from which water flows, e.g., 408, into the PTO. In another embodiment, water exiting the effluent pipes, e.g., 413, flows into a reservoir of water external to the PTO, but internal to the embodiment of which it is a part, and water flowing, e.g., 408, into the PTO is drawn from that same reservoir, thereby making the PTO, with respect to its water, a closed and/or recirculating system.

Within each effluent tube 411 and 412 is a respective water turbine (not visible) that is operably connected to a respective generator 414 and 415 by a respective shaft 416 and 417. The interleaved arrays of outer and inner layers, and their respective annular and central reservoirs, are covered by an upper surface 418 that, at least partially, e.g., from above, separates the PTO's internal reservoirs from the atmosphere and/or from the rest of the embodiment. The bottommost outer layer 400 contains inlet apertures, e.g., 406, but is otherwise also, at least partially, separated from the ambient environment and/or from the rest of the embodiment. In one embodiment, water enters, e.g., 408, the PTO through an inlet aperture, e.g., 406, and leaves, e.g., 413, through an effluent tube 411 and 412, but is otherwise trapped within the PTO.

The scope of the present invention includes embodiments, and included PTOs, in which the PTOs are similar to the one illustrated in FIG. 41 and are comprised of any number of outer layers (including a single outer layer), and for which the number of inner layers is approximately equal to the number of outer layers.

The scope of the present invention includes embodiments, and included PTOs, in which the PTOs are similar to the one illustrated in FIG. 41, and are of any shape, size, width, diameter, horizontal cross-sectional shape and/or area, height, vertical cross-sectional shape and/or area, internal total volume, average annular reservoir volume, total annular reservoir volume, average central reservoir volume, and/or total central reservoir volume.

The scope of the present invention includes embodiments, and included PTOs, in which the PTOs are similar to the one illustrated in FIG. 41, and are fabricated, in whole or in part, of any material, including, but not limited to: steel, aluminum, titanium, cement, any cementitious material, plastic, fiberglass, carbon fiber, and/or any fibrous material.

The scope of the present invention includes embodiments, and included PTOs, in which the PTOs are similar to the one illustrated in FIG. 41, and are fabricated, in whole or in part, by means of, through the use of, and/or through the execution of, any process, technique, protocol, methodology, and/or tool, including, but not limited to: 3D printing (e.g., of metal, plastic, and/or cement), the assembly of prefabricated parts, and/or a production line.

The scope of the present invention includes embodiments, and included PTOs, in which the PTOs are similar to the one illustrated in FIG. 41, and utilize, in whole or in part, any fluid and/or type of fluid, including, but not limited to: water, seawater, ammonia, liquid hydrogen, liquid air, liquid nitrogen, brine solution(s), carbon compounds, hydrocarbons, methanol, ethanol, propanol, butanol, gasoline, diesel, fossil fuel(s), and/or oil.

The scope of the present invention includes embodiments, and included PTOs, in which the PTOs are similar to the one illustrated in FIG. 41, and utilize, in whole or in part, any gas (through which the operational fluid, e.g. water, flows), including, but not limited to: air, nitrogen, hydrogen, methane, and/or ethane.

The scope of the present invention includes embodiments including any number of PTOs similar to the one illustrated in FIG. 41.

The scope of the present invention includes embodiments, containing one or more PTOs similar to the one illustrated in FIG. 41, that utilize, in whole or in part, any type, design, shape, size, volume, density, and/or number, of flotation modules, elements, components, and/or parts, including, but not limited to those that are, in whole or in part, at least approximately: spherical, cylindrical, ellipsoidal, puck shaped, cubical, rectangular, and/or spar buoys.

Figure 42:
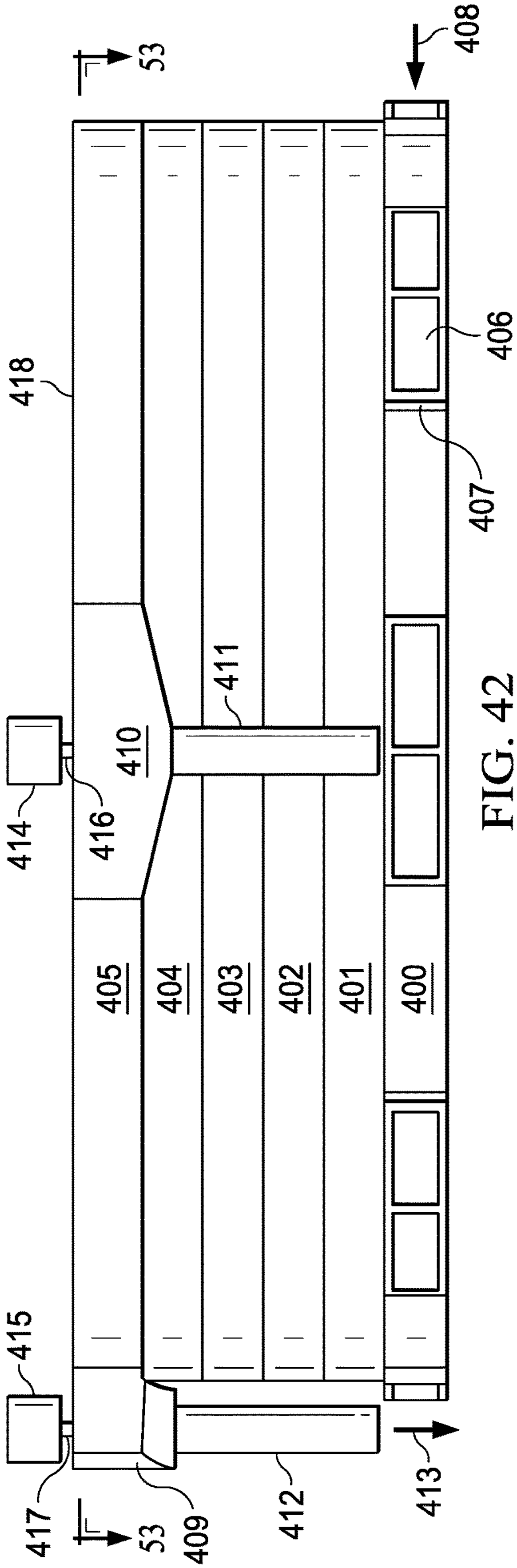
FIG. 42 is a front view of the embodiment of FIG. 41.

FIG. 42 shows a side view of the same power takeoff (PTO) illustrated in FIG. 41.

Figure 43:
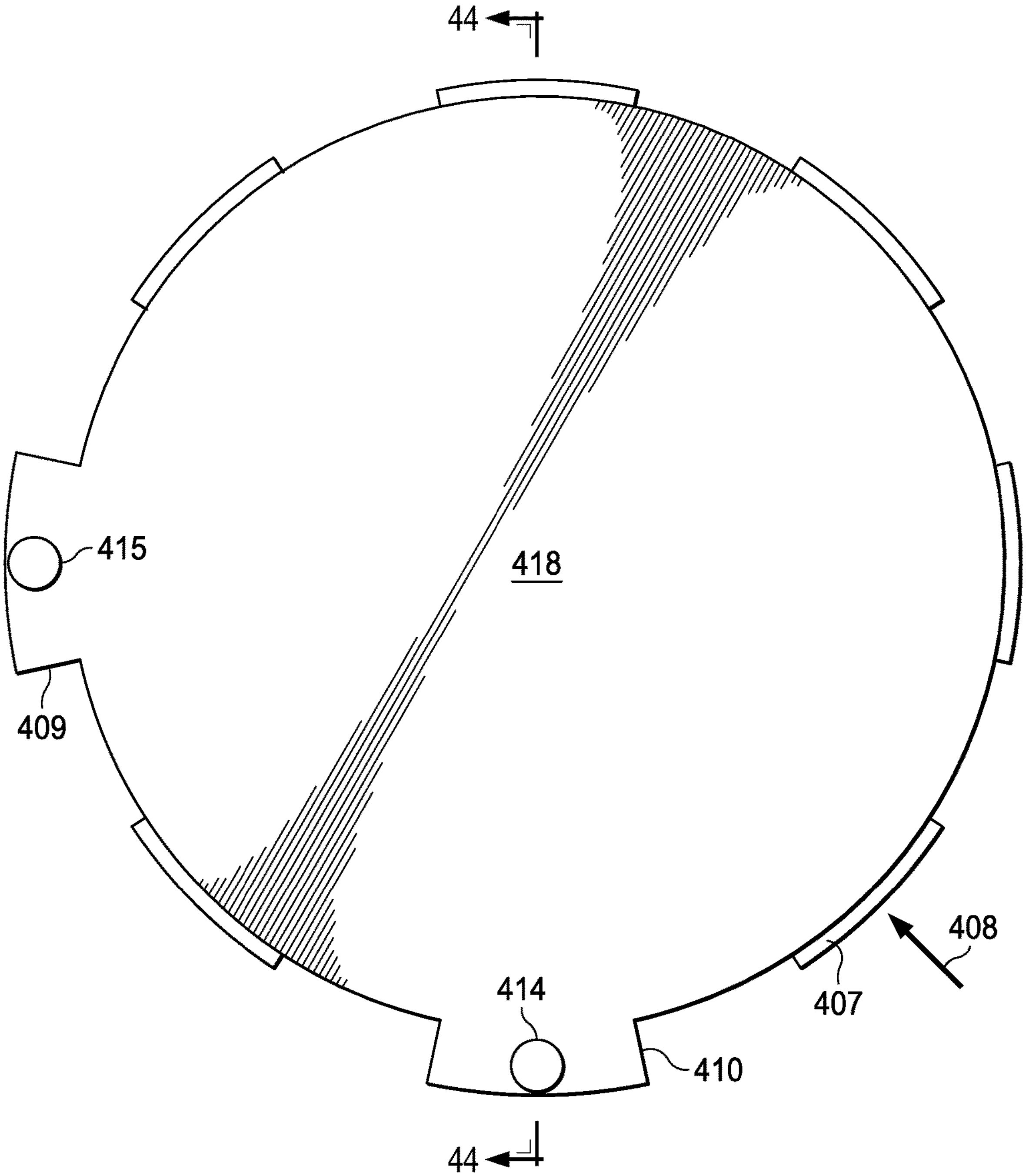
FIG. 43 is a top view of the embodiment of FIG. 41.

FIG. 43 shows a top-down view of the same power takeoff (PTO) illustrated in FIGS. 41 and 42.

Figure 44:
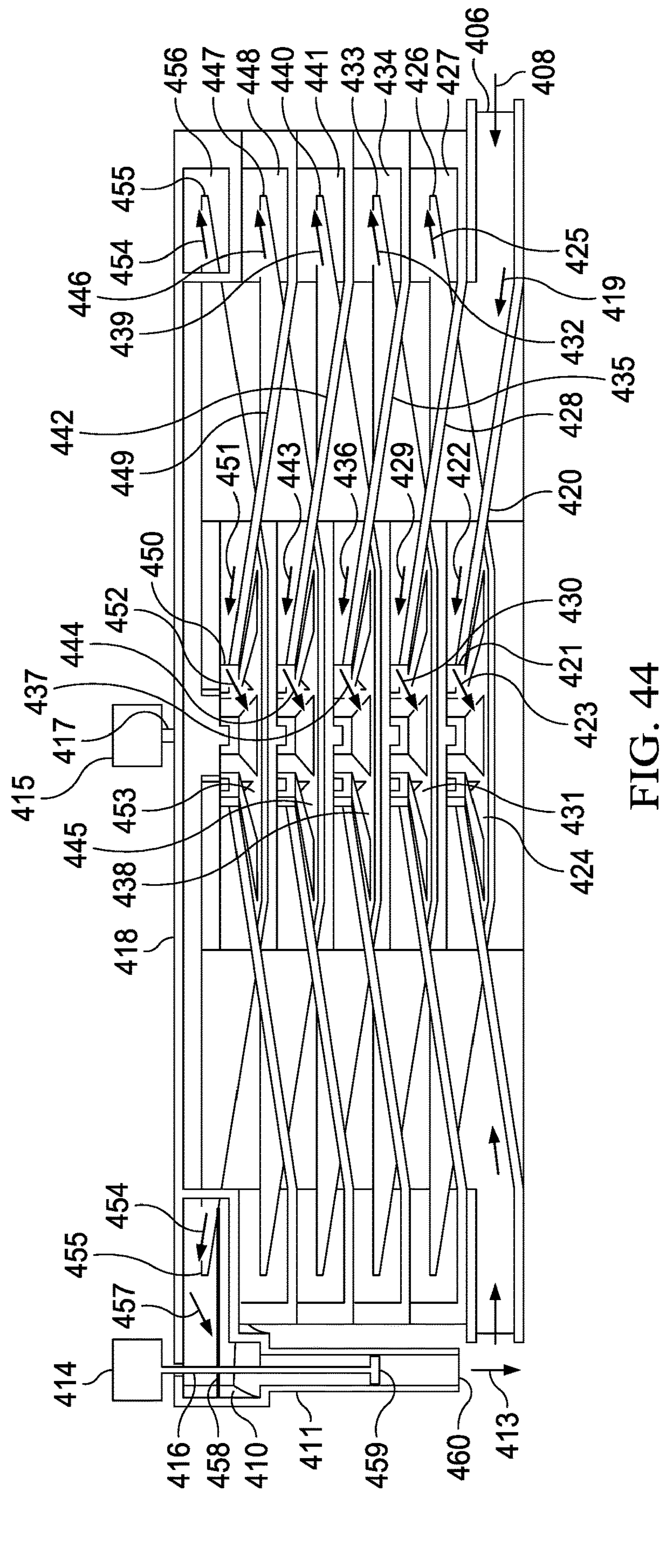
FIG. 44 is a cross sectional view of the embodiment of FIG. 41.

FIG. 44 shows a side sectional view of the same power takeoff (PTO) illustrated in FIGS. 41-43 wherein the vertical section plane is specified in FIG. 43 and the section is taken across line 44-44.

Water from outside the PTO enters 408 the PTO through one of the eight inlet apertures, e.g., 406, positioned near its base, and within its bottommost outer layer (400 in FIG. 41). In response to a tilt of the PTO of favorable direction, magnitude, and duration, water flowing 408 in through an inlet aperture, e.g., 406, flows 419 up one of the PTO's eight annular ramps, e.g., 420, each of which allows water to flow from the annular reservoir of an outer layer toward the center of the PTO. A "waterfall edge" (i.e., an edge of an upper surface, such as a ramp, that is raised relative to an adjacent lower surface, and/or void, such that a fluid flowing from the upper surface and over the waterfall edge will tend to fall and/or flow downward onto the lower surface) at the end of an annular ramp, e.g., 421, tends to cause water flowing, e.g., 422, toward the end 421 of the ramp to "fall over" the ramp's edge 421 and fall 423 into, and become trapped within, a reservoir 424 at the center of the bottommost inner layer. So, in response to a tilt of the PTO of favorable direction, magnitude, and duration, water flowing in through an inlet aperture tends to flow up and down into a reservoir at the center of the PTO, the elevation and/or height of which is greater than that of the inlet aperture.

In response to a tilt of the PTO of favorable direction, magnitude, and duration, water trapped within the central reservoir 424 of the bottommost inner layer flows, e.g., 425, up a ramp, e.g., 426, and over its waterfall edge, thereby falling into the annular reservoir, e.g., 427, of the next highest outer layer (401 in FIG. 41).

Likewise, and in serial fashion, in response to tilts of the PTO of favorable directions, magnitudes, and durations, water flows:

from annular reservoir 427 up ramp 428 toward the waterfall edge at its centermost edge until it approaches 429 and falls over 430 that edge into the central reservoir 431 of the second (from the bottom) inner layer;

from central reservoir 431 up 432 and over waterfall edge 433 thereby falling into the annular reservoir 434 of the third (from the bottom) outer layer (402 in FIG. 41);

from annular reservoir 434 up ramp 435 toward the waterfall edge at its centermost edge until it approaches 436 and falls over 437 that edge into the central reservoir 438 of the third (from the bottom) inner layer;

from central reservoir 438 up 439 and over waterfall edge 440 thereby falling into the annular reservoir 441 of the fourth (from the bottom) outer layer (403 in FIG. 41);

from annular reservoir 441 up ramp 442 toward the waterfall edge at its centermost edge until it approaches 443 and falls over 444 that edge into the central reservoir 445 of the fourth (from the bottom) inner layer;

from central reservoir 445 up 446 and over waterfall edge 447 thereby falling into the annular reservoir 448 of the fifth (from the bottom) outer layer (404 in FIG. 41);

from annular reservoir 448 up ramp 449 toward the waterfall edge 450 at its centermost edge until it approaches 451 and falls over 452 that edge into the central reservoir 453 of the fifth (from the bottom) inner layer; and, from central reservoir 453 up 454 and over waterfall edge 455 thereby falling 457 into the annular reservoir 456 of the sixth and uppermost outer layer (405 in FIG. 41).

Water deposited into, and/or trapped within, the annular reservoir 456 of the uppermost outer layer (405 in FIG. 41) is then directed into one of two turbine reservoirs, e.g., 410, where that water 458 then flows 413 into, and through, effluent tube 411 wherein it flows through, energizes, and causes to rotate, a water turbine 459, which, in turn, causes the operably connected generator 414 to generate electrical power. After passing through the water turbine 459, water flowing through effluent tube 411 exits 413 through a mouth 460 at the bottom end of the effluent tube 411.

Figure 45:
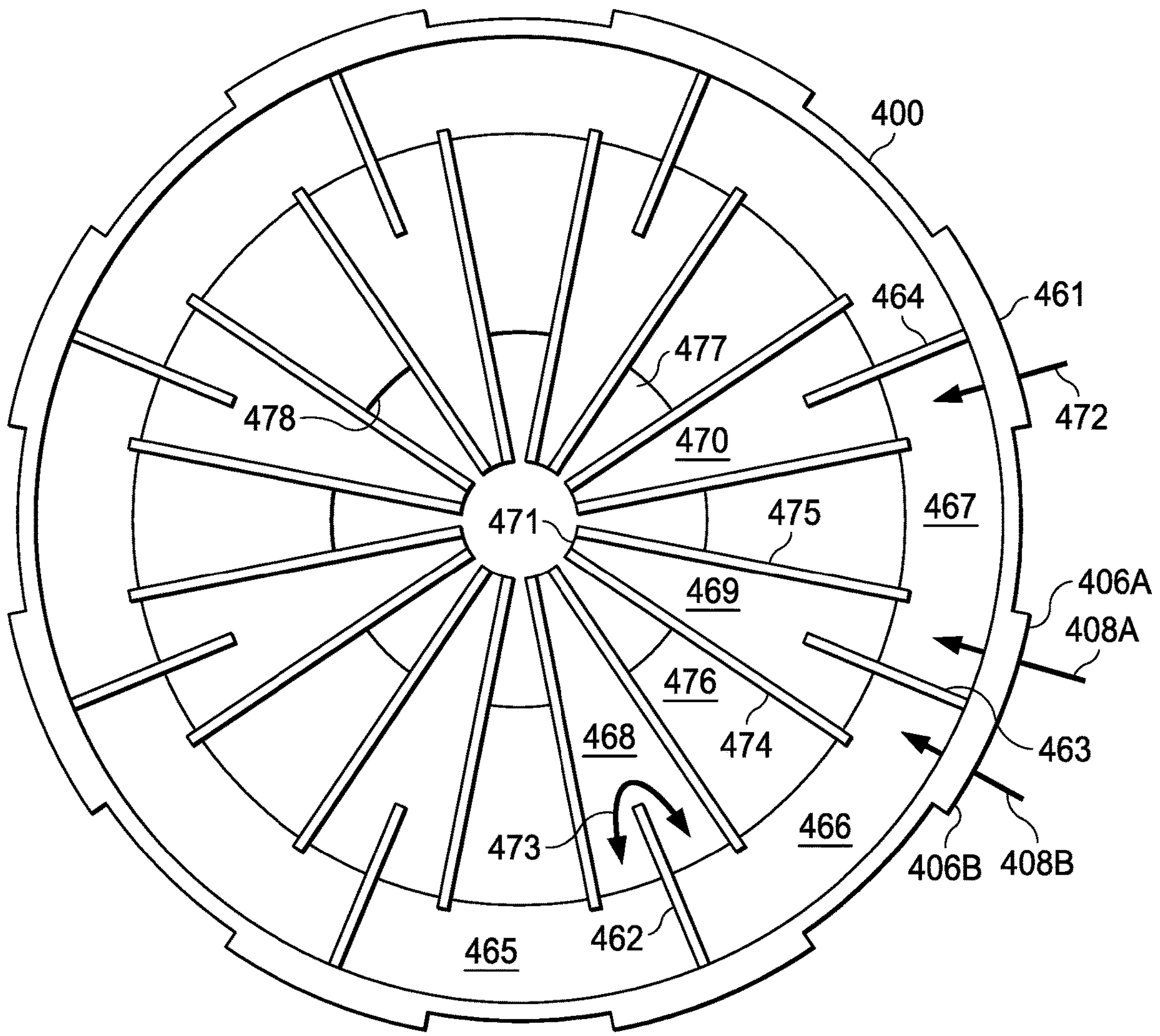
FIG. 45 is another cross sectional view of the embodiment of FIG. 41.

FIG. 45 shows a top-down view of the structure of which the bottommost outer layer (400 in FIG. 41) is comprised. The structural component illustrated in FIG. 45 is shown separate from the other inner and outer layers of the power takeoff (PTO) illustrated in FIGS. 41-44. The layer is comprised of eight inlet apertures, e.g., 406 and 461. A vertical inlet dividing wall, e.g., 462-464, divides the water entering each inlet aperture. Each inlet dividing wall likewise divides the layer's 400 annular reservoir into eight segments, e.g., 465-467. Water entering, e.g., 408A, the layer's annular reservoir to one side of an inlet aperture's dividing wall, e.g., 463, is added to one reservoir segment, e.g., 467, while water entering, e.g., 408B, to the other side of the inlet aperture's dividing wall, e.g., 463, is added to an adjacent reservoir segment, e.g., 466.

The layer's annular reservoir is fluidly connected to eight annular ramps, e.g., 468-470, that permit water within the annular reservoir's eight annular reservoir segments, e.g., 465-467, to flow up and into a central reservoir of an inner layer when that reservoir is positioned beneath the waterfall and/or centermost ends, e.g., 471, of the annular ramps. The water within any particular segment, e.g., 467, of the layer's annular reservoir is able to flow up either of two respective fluidly connected ramps, e.g., 469 and 470. For instance, water entering 472 inlet aperture 461 below inlet aperture dividing wall 464 will flow into annular reservoir segment 467 and from there will be able to flow up either of annular ramps 469 or 470. Likewise, water entering 408A inlet aperture 406A above inlet aperture dividing wall 463 will also flow into annular reservoir segment 467 and from there will also be able to flow up either of annular ramps 469 or 470.

Adjacent segments, e.g., 465 and 466, of the layer's annular reservoir are not completely separated. In response to a particular motion of the layer 400, the PTO of which it is a part, and/or the embodiment of which the PTO is a part, can send water from one segment, e.g., 466, up and around 473 an inlet aperture dividing wall, e.g., 462, and into an adjacent segment, e.g., 465, of the annular reservoir.

Each annular ramp, e.g., 469, is bounded, bordered, and/or constrained, by a respective pair of lateral walls, e.g., 474 and 475. Between each pair of adjacent annular ramps, e.g., 468 and 469, is a sloping bottom wall, e.g., 476, that shares the same up-tilted surface(s) of which the annular ramps are comprised. An open portion 477 of the bottom wall at the center of the layer provides space into which the central reservoir of an inner layer can fit and/or be placed. The bottom surface of such a positioned inner layer will block the centermost edge, e.g., 478, of each inter-annular-ramp portion of each segment of the annular reservoir.

Figure 46:
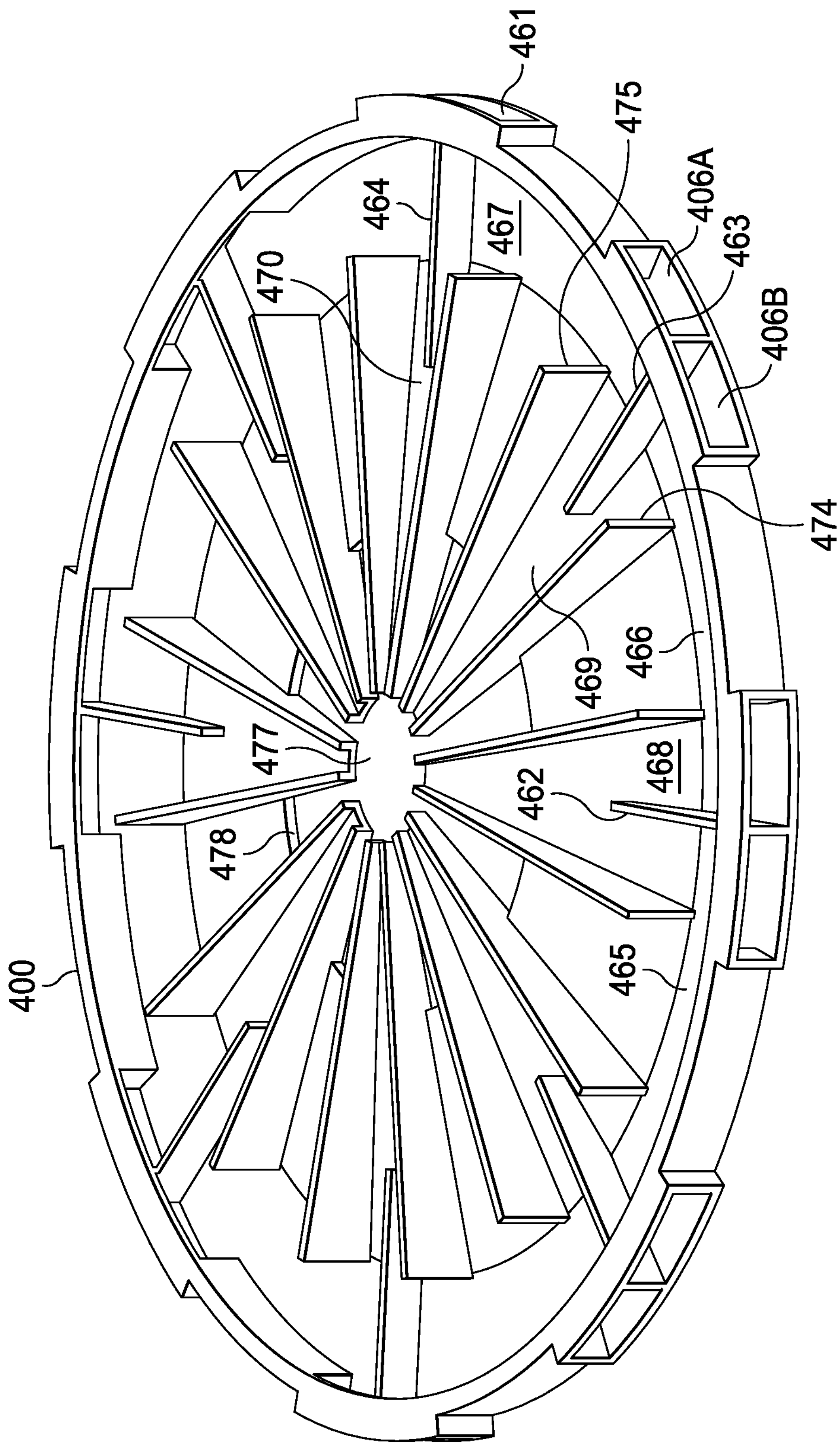
FIG. 46 is a perspective cross sectional view of the embodiment of FIG. 41.

FIG. 46 shows a perspective side view of the same bottommost outer layer (400 in FIG. 41) illustrated in FIG. 45.

Figure 47:
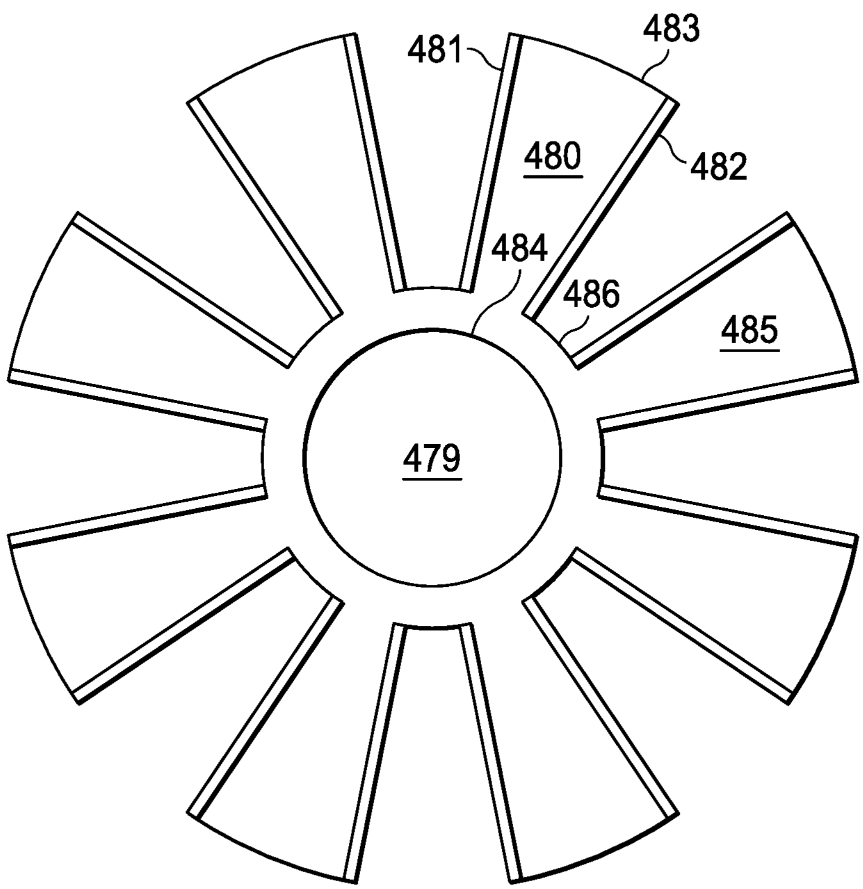
FIG. 47 is a top view of another embodiment of the invention of FIG. 41.

FIG. 47 shows a top-down view of the structure of which each of the power takeoff's (PTO's) five inner layers is comprised. The structural component illustrated in FIG. 47 is shown separate from the other inner and outer layers of the power takeoff (PTO) illustrated in FIGS. 41-46.

Each inner layer is comprised of an approximately flat central reservoir 479 at the base of an approximately frustoconical and/or upwardly inclined radial array of eight ramps, e.g., 480. Each central ramp, e.g., 480, is bounded, defined, and/or constrained, by a respective pair of lateral walls, e.g., 481 and 482. Water contained, constrained, and/or pooled, within the layer's central reservoir 479, can, e.g., in response to a tilt of favorable direction, and sufficient magnitude and duration, flow away from the reservoir's center and radially outward up one of the central ramps, e.g., 480. At the distal end of each central ramp, e.g., 480, is a "waterfall" edge, e.g., 483. When positioned within the complete, multi-layer PTO, water flowing over the distal waterfall edge of a central ramp, tends to fall into, and become trapped within, an annular reservoir, and/or a segment thereof (e.g., 467 in FIGS. 45 and 46).

Between the central reservoir 479 and the upwardly inclined surfaces of which the central ramps, e.g., 480, are in part comprised there may be a discernable bend and/or fold 484 that delineates their junction.

Between each pair of adjacent central ramps, e.g., 480 and 485, is an unwalled edge, e.g., 486. The bottom of an upwardly inclined annular ramp (e.g., 470 of FIGS. 45 and 46) of an outer layer abuts each inter-central-ramp edge, e.g., 486, thereby preventing the flow of water across those edges, and otherwise trapping water within the respective central reservoir 479.

In a similar embodiment, the central reservoir 479 is concave, e.g., with a downward depression, thereby comprising an approximately bowl-shaped cavity in which water may be held until induced to flow by a tilt of favorable direction and sufficient magnitude and duration.

Figure 48:
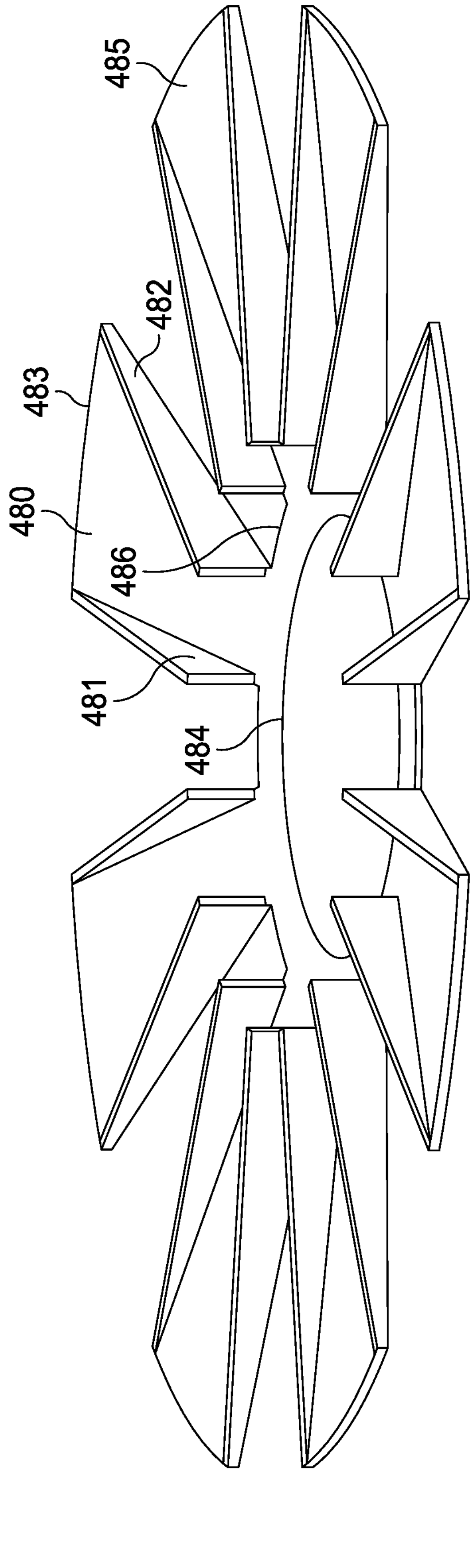
FIG. 48 is an elevated, perspective view of the layer of FIG. 47.

FIG. 48 shows a perspective side view of the same inner layer illustrated in FIG. 47.

Figure 49:
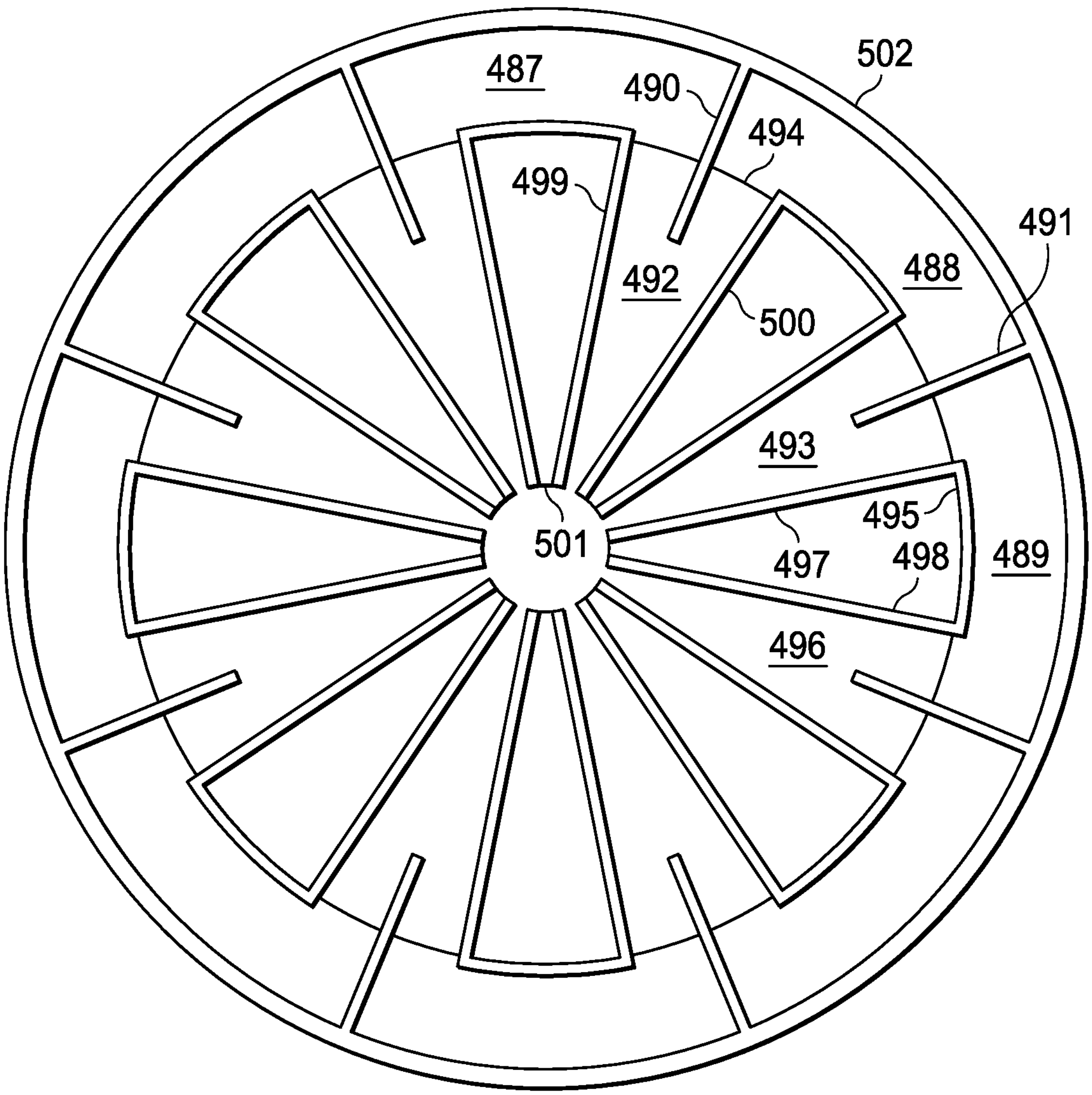
FIG. 49 is a top view of the embodiment of FIG. 41.

FIG. 49 shows a top-down view of the structure of which each of the power takeoff's (PTO's) four middle outer layers (401-404 in FIG. 41) is comprised. The structural component illustrated in FIG. 49 is shown separate from the other inner and outer layers of the power takeoff (PTO) illustrated in FIGS. 41-48. The illustrated outer layer structure differs from the bottommost outer layer (400 in FIG. 41), which is adapted to allow water to enter the PTO, and the uppermost outer layer (405 in FIG. 41), which is adapted to divert water from its annular reservoir into two turbine reservoirs.

An approximately flat-bottomed annular ring is divided into eight radial segments, e.g., 487-489, by eight interposed radially-oriented walls, e.g., 490 and 491. Straddling each dividing wall is an annular ramp, e.g., 492 and 493. Each of dividing wall, e.g., 491, extends up its respective annular ramp, e.g., 493, a short distance, however, in response to a tilt, especially an incomplete tilt, and/or an anomalous pattern of water flow within the annular reservoir, water can flow from one annular reservoir segment, e.g., from 488, to the neighboring segment, e.g., to 489, by flowing up and around the intervening dividing wall, e.g., 491. In general, each dividing wall, e.g., 491, directs water from each of the adjacent annular reservoir segments, e.g., 488 and 489, on either side to flow into and up the respective annular ramp, e.g., 493.

Each annular ramp has a bottom surface that is upwardly inclined. The seam and/or junction, e.g., 494, at which each upwardly inclined annular ramp, e.g., 492, is connected to its respective pair of approximately flat-bottomed annular reservoir segments, e.g., 487 and 488, is indicated by a circular line, e.g., 494, and/or fold at the distal end of each ramp. At the innermost edge, e.g., 495, of each annular reservoir segment, e.g., 489, and positioned between each segment's connected pair of annular ramps, e.g., 493 and 496, is a wall, e.g., 495, that is shorter than the lateral walls, e.g., 497 and 498, of the adjacent annular ramps, e.g., 493 and 496. The top of this shorter annular reservoir wall, e.g., 495, abuts with the bottom of a central ramp (e.g., 480 of FIGS. 47 and 48) of an inner layer immediately below the illustrated outer layer.

At the side of each annular ramp, e.g., 492, is a side wall, e.g., 499 and 500, that constrains and guides water flowing up (or, in response to a favorable tilt, down) the respective annular ramp, e.g., 492. At the centermost end of each annular ramp, e.g., 492, is a waterfall edge, e.g., 501, over which water flows off of the annular ramp and falls into the central reservoir of an inner layer immediately below the respective outer layer.

Around the outer perimeter of each outer layer is a circular wall 502 that prevents the leakage of water from the layer's annular reservoir, and/or the segments, e.g., 487-489, thereof.

Figure 50:
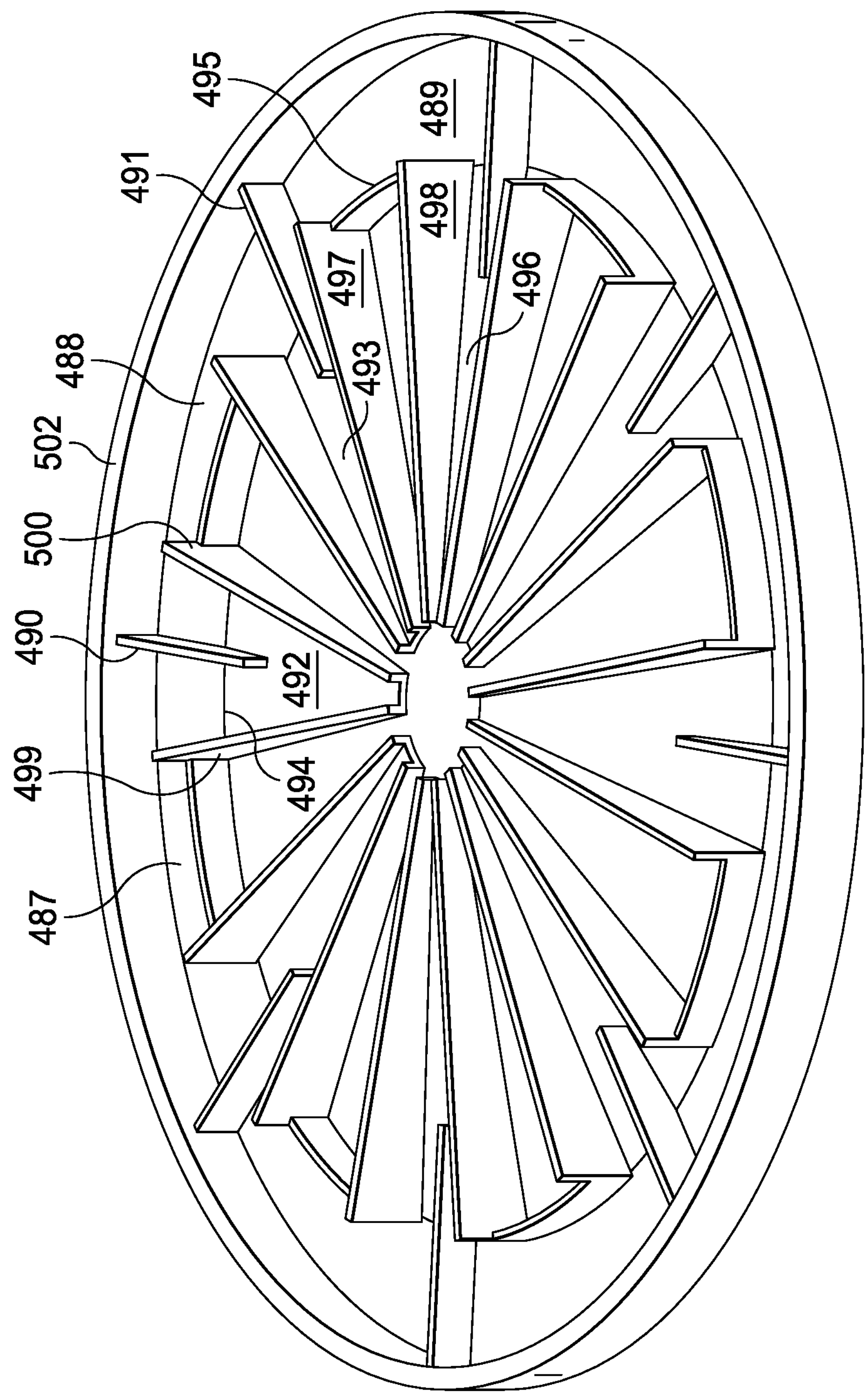
FIG. 50 is an elevated, perspective view of the layer of FIG. 49.

FIG. 50 shows a perspective side view of the same outer layer illustrated in FIG. 49.

Figure 51:
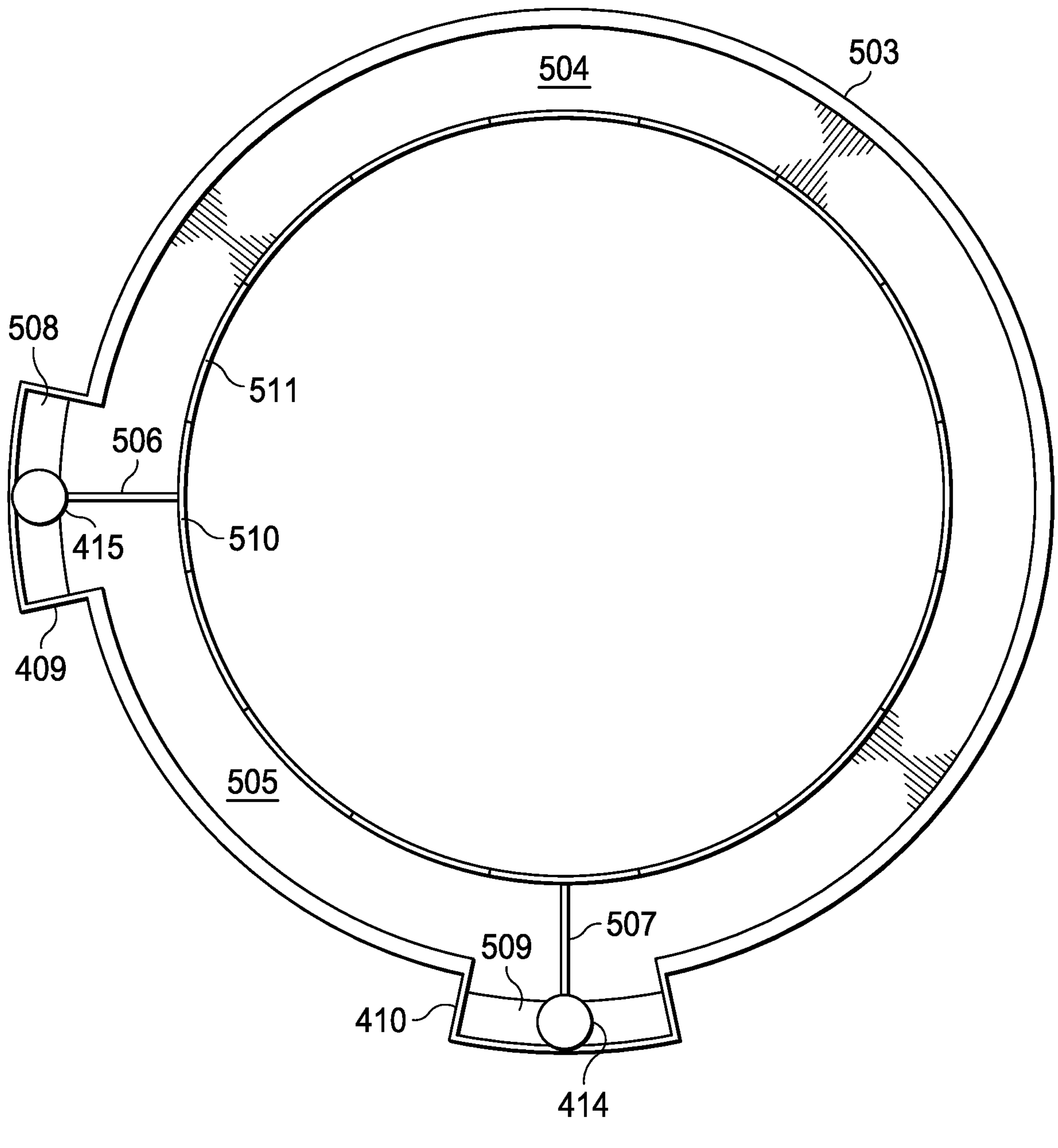
FIG. 51 is a top view of another layer of the embodiment of FIG. 41.

FIG. 51 shows a top-down view of the power takeoff's (PTO's) uppermost outer layer (405 in FIG. 41). The outer layer illustrated in FIG. 51 is shown separate from the other inner and outer layers of the power takeoff (PTO) illustrated in FIGS. 41-50. The illustrated uppermost outer layer structure differs from the intermediate outer layers (401-404 in FIG. 41), in that it is adapted to divert water from its annular reservoir, the last stage in the tilt-induced lifting of water within the PTO, into two turbine reservoirs 409 and 410.

The uppermost outer layer illustrated in FIG. 51 is, in order to promote understanding, shown without its upper surface, ceiling, wall, and/or top, which isolates, at least in part, the water within the PTO from the environment.

The uppermost outer layer's annular reservoir is defined, and water therein is trapped and/or constrained, in part by bottom surfaces 504/505, and a side wall 503. The uppermost outer layer's annular reservoir is divided into two segments, 504 and 505. These two annular reservoir segments are divided, and/or separated from one another, by two dividing walls 506 and 507.

Water deposited into either segment of the annular reservoir 504/505 is diverted, e.g., in response to a tilt-induced flow of water about the annular reservoir, into turbine reservoir 508, located within turbine reservoir enclosure 409, by dividing wall 506, and into turbine reservoir 509, located within turbine reservoir enclosure 410, by dividing wall 507.

Water within turbine reservoir 508 flows down through an effluent tube (not visible, 412 in FIG. 41) thereby engaging and energizing a water turbine (not visible) therein, and causing generator 415, which is operably connected to the water turbine, to generate electrical power. Likewise, water within turbine reservoir 509 flows down through an effluent tube (not visible, 411 in FIG. 41) thereby engaging and energizing a water turbine (not visible, 459 in FIG. 44) therein, and causing generator 414, which is operably connected to the water turbine, to generate electrical power.

Because it is the uppermost outer layer, the illustrated outer layer (405 in FIG. 41) does not have annular ramps to further elevate water within its annular reservoir 504/505. Instead it has innermost side walls, e.g., 510, that extend up to its upper and/or top wall (not shown). As is the case for the intermediate outer layers, the uppermost upper layer illustrated in FIG. 51, has short walls, e.g., 511 (and 495 in FIG. 49), at those portions of the inner edge of its annular reservoir that would otherwise be between annular ramps. The short inner walls of the annular reservoir abut the bottom surfaces of the corresponding central ramps that, within the PTO, lift water from the central reservoir of the inner layer within the PTO that is positioned immediately below the illustrated uppermost outer layer.

Figure 52:
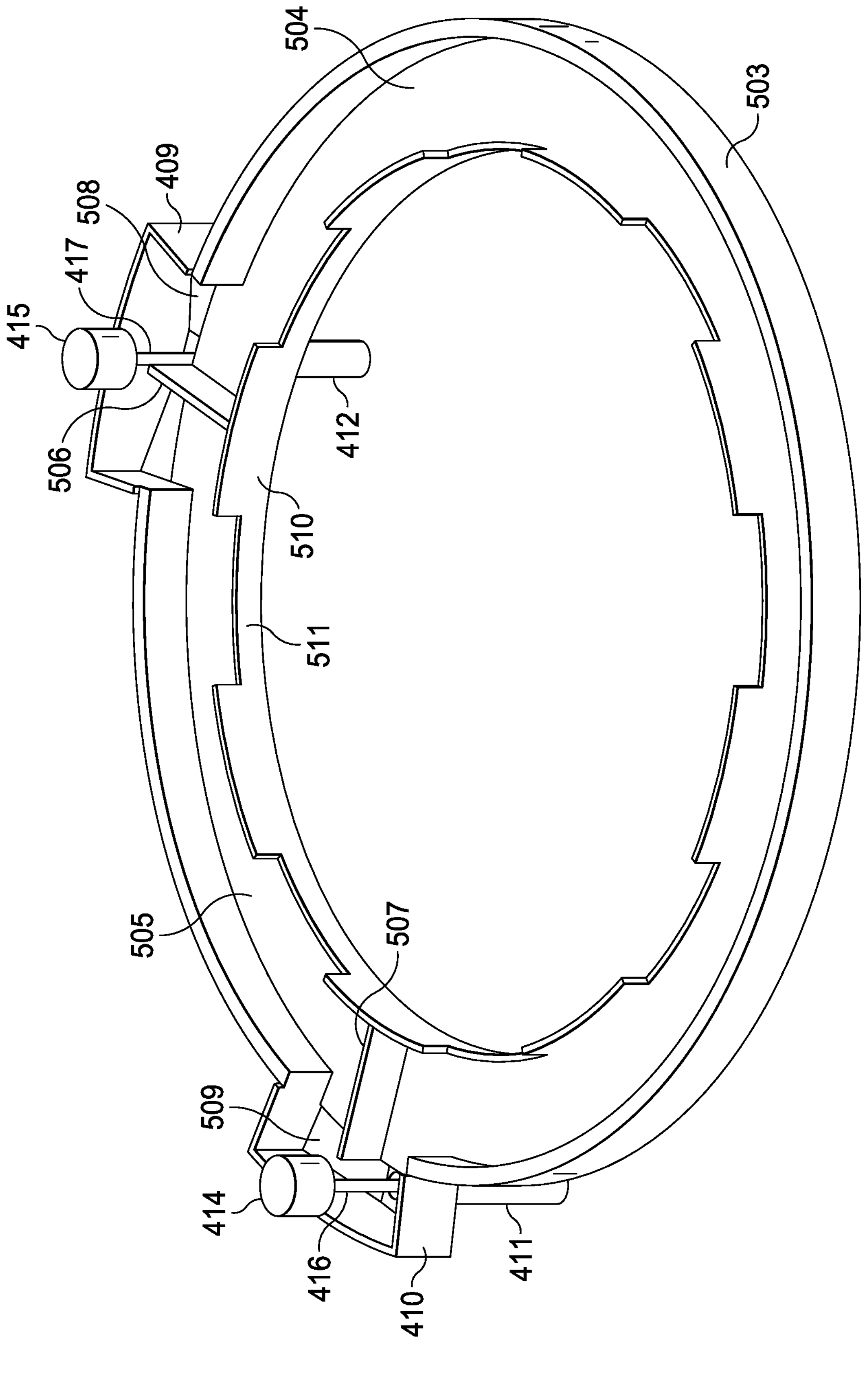
FIG. 52 is an elevated, perspective view of the layer of FIG. 51.

FIG. 52 shows a perspective top-down view of the same uppermost outer layer illustrated in FIG. 51.

Figure 53:
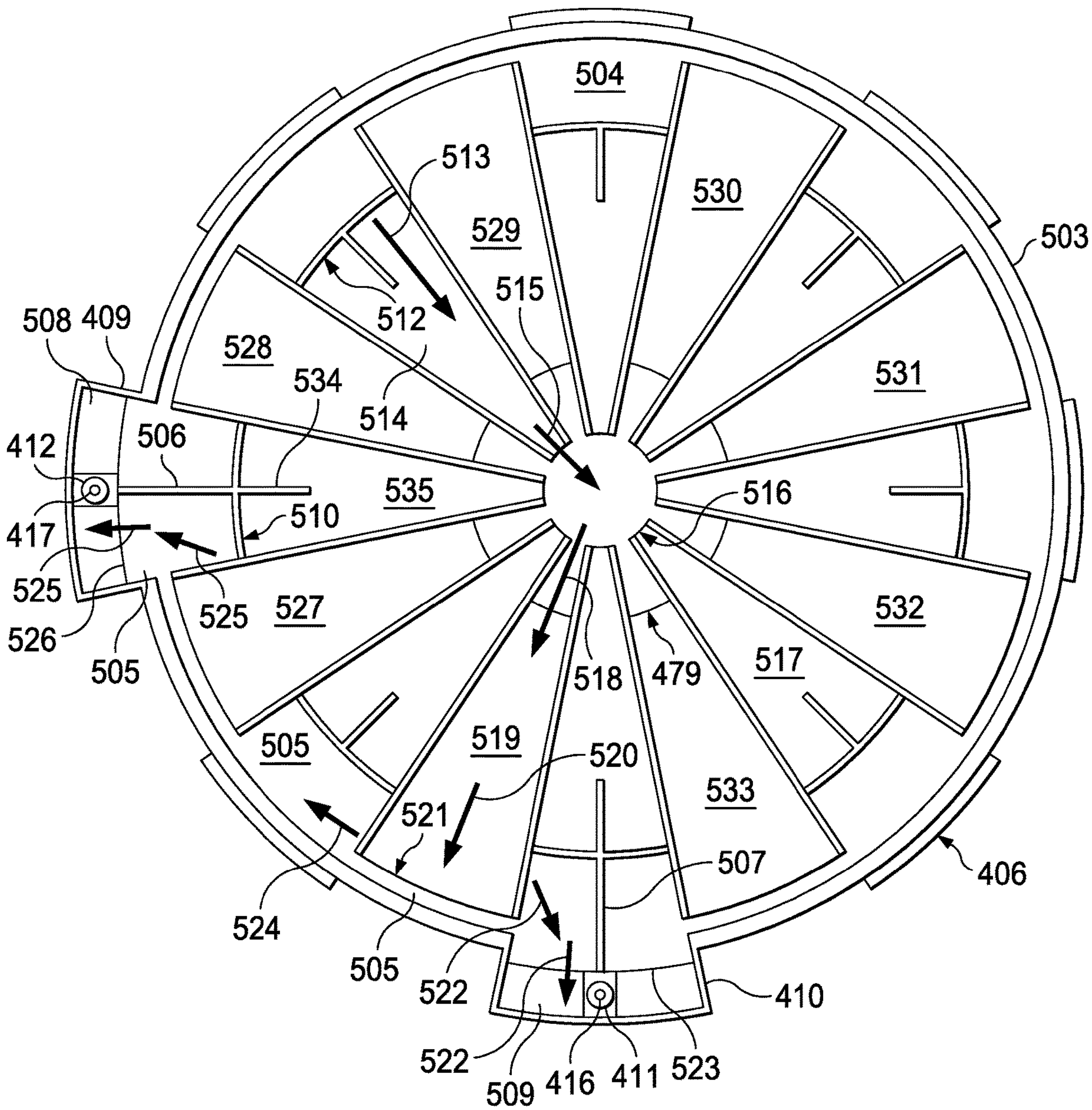
FIG. 53 is a cross sectional view of the embodiment of FIG. 41.
Figure 54:
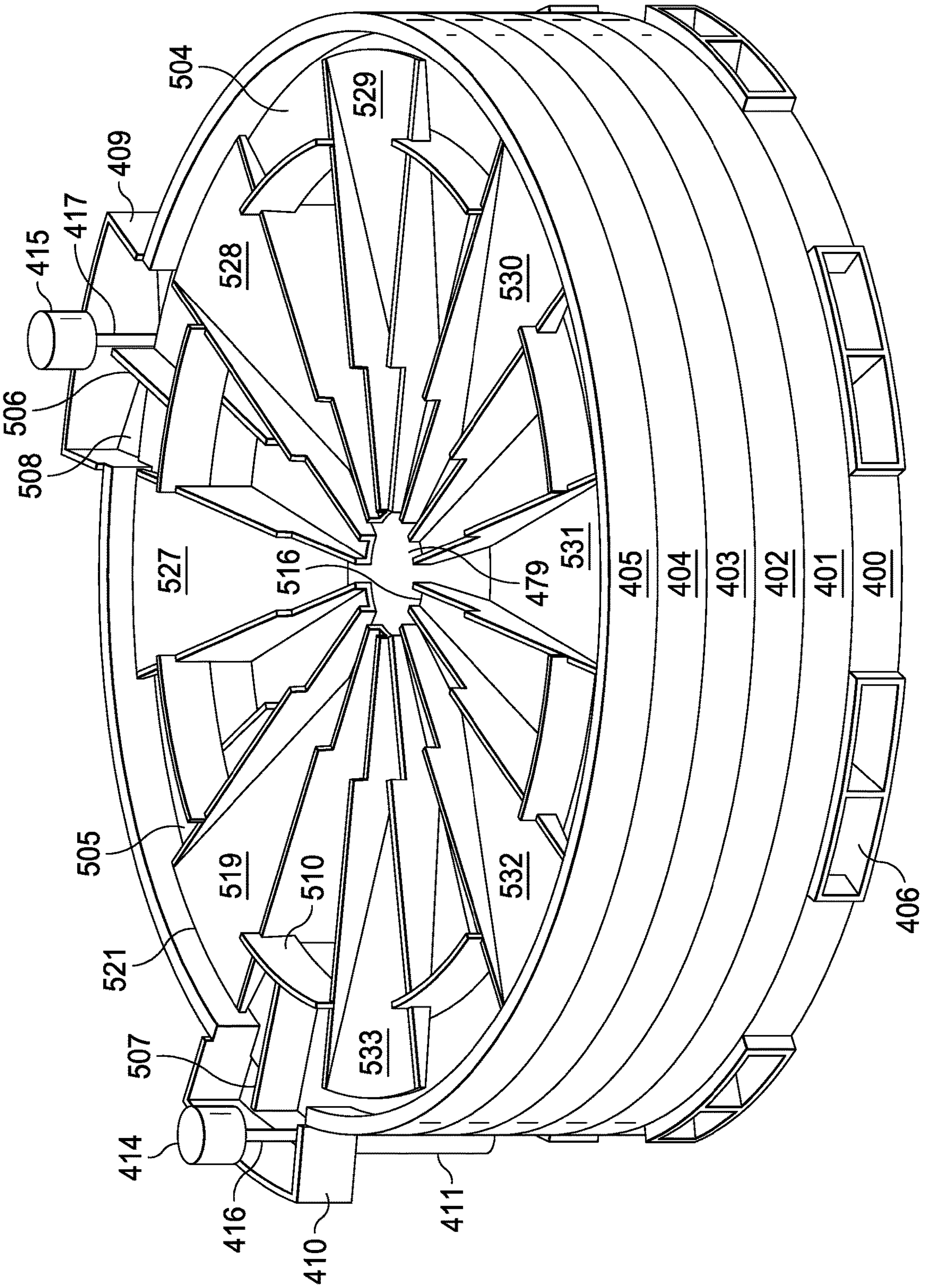
FIG. 54 is an elevated, perspective view of the embodiment of FIG. 41.

FIG. 53 shows a top-down sectional view of the same power takeoff (PTO) illustrated in FIGS. 41-44, wherein the horizontal section plane is specified in FIG. 42 and the section is taken across line 53-53.

The section illustrated in FIG. 53 shows the inside of the uppermost outer layer (405 in FIG. 41) as well as the inner layer immediately below. In response to a tilt of favorable direction, and sufficient magnitude and duration, water held in the annular reservoir 512 of the outer layer (404 in FIG. 41) immediately below and adjacent to the uppermost outer layer will flow 513 up (which because of the tilt is actually "down") annular ramp 514 until it flows 515 over the waterfall edge, e.g., 515 of annular ramp 516, at the central end of ramp 514, thereby falling down and into the central reservoir 479 of the uppermost inner layer that is positioned immediately above the outer layer (404 in FIG. 41) immediately below and adjacent to the uppermost outer layer, and immediately below the uppermost outer layer (405 in FIG. 41).

In response to a tilt of favorable direction, and sufficient magnitude and duration, water held in the central reservoir 479 of the uppermost inner layer flows 518 up (which because of the tilt is actually "down") central ramp 519 until it flows 520 over the waterfall edge 521 of that central ramp 519, thereby falling into the annular reservoir segment 505 of the uppermost outer layer (405 if FIG. 41). Likewise, in response to a tilt of favorable direction, and sufficient magnitude and duration, (perhaps the same favorable tilt causing water to flow up central ramp 519) water held in the central reservoir 479 of the uppermost inner layer flows up central ramp 527 until it flows over the waterfall edge at the distal and/or outermost end of that central ramp, thereby falling into the annular reservoir segment 505 of the uppermost outer layer (405 if FIG. 41).

In response to a tilt of favorable direction, and sufficient magnitude and duration, water deposited into annular reservoir segment 505 flows 522 in a counterclockwise direction (relative to the orientation of the illustration in FIG. 53), guided and/or constrained by the lateral reservoir walls 503 and 512, until it is obstructed by radial dividing wall 507 after which it flows 522 over a waterfall edge 523 into the turbine reservoir 509 within the turbine reservoir wall 410. Water within the turbine reservoir 509 flows into and down effluent pipe 411 thereby imparting rotational kinetic energy and/or a torque to the water turbine (459 in FIG. 44) therein, thereby causing the attached turbine shaft 416 to rotate, and thereby causing an operably connected generator (414 in FIG. 41) to generate electrical power.

In response to a tilt of favorable direction, and sufficient magnitude and duration, water deposited into annular reservoir segment 505 flows 524 in a clockwise direction (relative to the orientation of the illustration in FIG. 53), guided and/or constrained by the lateral reservoir walls 503 and 512, until it is obstructed by radial dividing wall 506 after which it flows 525 over a waterfall edge 526 into the turbine reservoir 508 within the turbine reservoir wall 409. Water within the turbine reservoir 508 flows into and down effluent pipe 412 thereby imparting rotational kinetic energy and/or a torque to a water turbine therein, thereby causing an attached turbine shaft 417 to rotate, and thereby causing an operably connected generator (415 in FIG. 41) to generate electrical power.

Similarly, in response to a tilt of favorable direction, and sufficient magnitude and duration, water held in the central reservoir 479 of the uppermost inner layer flows up at least one of central ramps 528-534 until it flows over the waterfall edges of those central ramps, thereby falling into the annular reservoir segment 504 of the uppermost outer layer (405 if FIG. 41). And, in response to a tilt of favorable direction, and sufficient magnitude and duration, water deposited into annular reservoir segment 504 flows within the annular reservoir segment 504, guided and/or constrained by the lateral reservoir walls 503 and 512, until it is obstructed by either or both radial dividing walls 506 and 507 after which it flows into one or both of the turbine reservoirs 508 and 509, thereby resulting in the generation of electrical power.

Vertically aligned with the annular reservoir dividing walls, e.g., 506, are the annular reservoir dividing walls, e.g., 534, of the outer layer (404 in FIG. 41) below and adjacent to the uppermost outer layer (405 in FIG. 41), that extend a distance up their respective annular ramps, e.g., 535.

Figure 55:
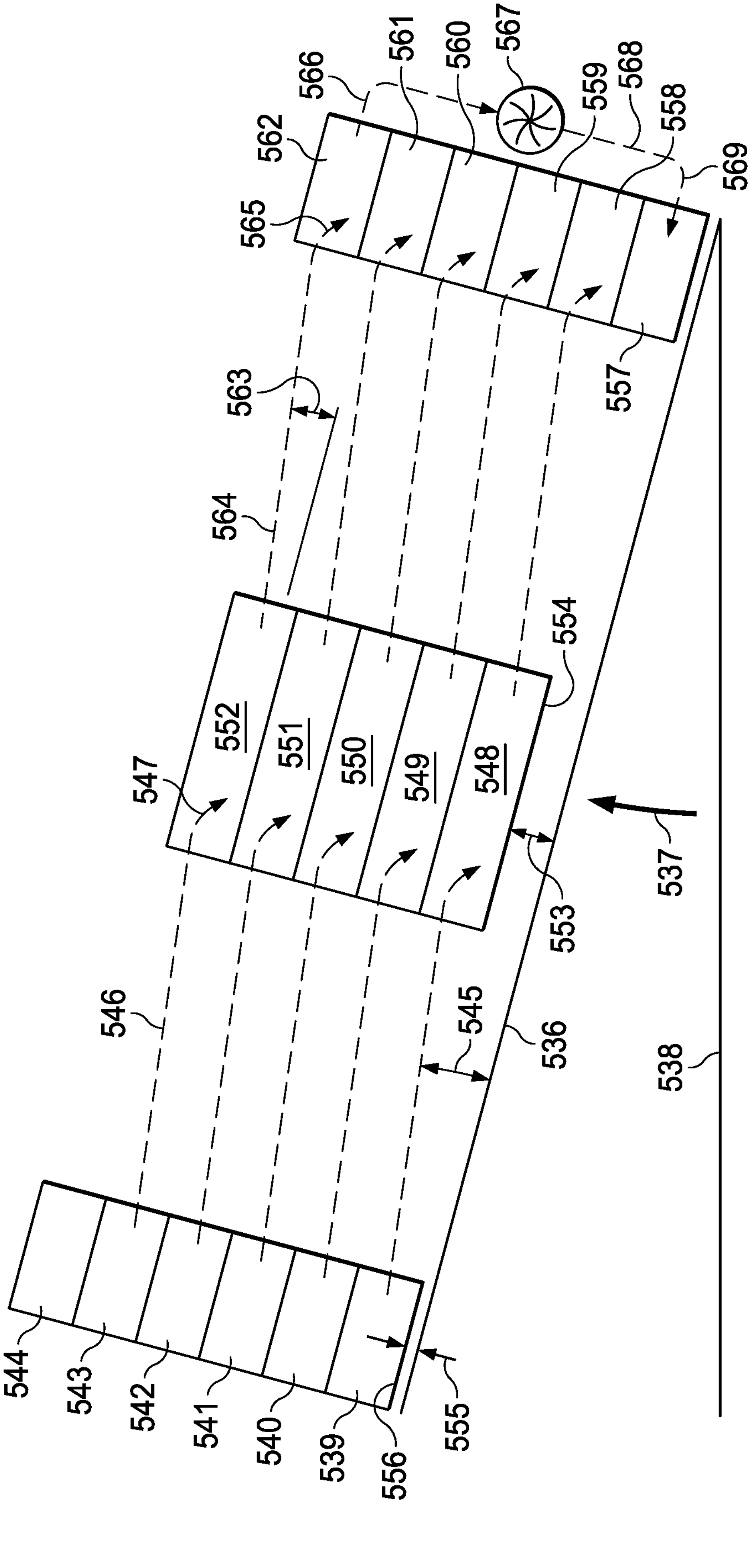
FIG. 55 is a side schematic view of the embodiment of FIG. 41.

FIG. 55 shows a side view of a schematic/functional illustration of the same power takeoff (PTO) illustrated in FIGS. 41-54. The full embodiment of which the illustrated PTO is a part includes a flotation platform (not shown) to which the illustrated PTO is attached and floats adjacent to an upper surface of a body of water over which waves pass.

The base and/or bottom surface 536 of the PTO corresponds to the bottom of the bottommost outer layer (400 in FIG. 41) of the PTO. When the PTO, and the floating embodiment to which it is attached, are tilted 537, in response to a wave passing across the surface of the body of water on which the embodiment (not shown) to which the PTO is attached, the orientation of the PTO is altered and rotated through an angle 537 from the horizontal (e.g., from the resting surface of the body of water) 538.

In response to the illustrated tilt of the PTO, the annular reservoir segments 539-544 of the PTO's six outer levels (400-405 in FIG. 41) are lifted and/or elevated relative to the central reservoirs 548-552. Because the angle 537 of the tilt exceeds the angle 545 of each annular ramp originating at each respective elevated annular reservoir segment 539-543, water held, deposited, and/or trapped, within each elevated annular segment 539-543 flows, e.g., 546, "up" (which, with respect to gravity is "down" due to the tilt 537) each segment's respective annular ramp, and over each annular ramp's respective waterfall edge, e.g., 547, thereby falling down and into the respective central reservoir 548-552 immediately adjacent to, and "above" (which, with respect to the tilt 537 is actually "below"), each respective outer layer's elevated annular reservoir segment 539-543.

Each of the boxes 548-552 at the center of the PTO illustration in FIG. 55 represents the central reservoir of each of the PTO's inner layers. Note that the height 553 of the bottom 554 of the bottommost central reservoir 548 (where "height" is relative to an axis normal to the bottom 536 of the bottommost outer layer, 400 in FIG. 41, of the PTO), is greater than the height 555 of the bottom 556 of the bottommost annular reservoir 539. And, for the purposes of illustration and explanation, the height of each annular reservoir is the same and is equal to the height of each central reservoir.

In response to the illustrated tilt of the PTO, the central reservoirs 548-552 of the PTO's five inner levels are lifted and/or elevated relative to the annular reservoir segments 557-562 of the PTO's six outer levels (400-405 in FIG. 41). Because the angle 537 of the tilt exceeds the angle 563 of each central ramp originating at each respective elevated central reservoir 548-552, water held, deposited, and/or trapped, within each elevated central reservoir 548-552 flows, e.g., 564, "up" (which, with respect to gravity is "down" due to the tilt 537) each central reservoir's respective central ramp, and over each central ramp's respective waterfall edge, e.g., 565, thereby falling down and into the respective annular reservoir segment 558-562 immediately adjacent to, and "above" (which, with respect to the tilt 537 is actually "below"), each respective inner layer's elevated central reservoir 548-552.

Water trapped, deposited, and/or held, within the annular reservoir segment 562 of the uppermost outer layer (405 in FIG. 41) flows 566 into and through a turbine reservoir and then into and/or through a water turbine 567 that is operably connected to a generator that generates electrical power in response to the flow. The water discharged from the water turbine flows 568 out through an effluent pipe.

In response to the illustrated tilt of the PTO, at least one inlet aperture is at least partially submerged, and water flows 569 into the at least partially submerged annular reservoir segment 557.

In one embodiment, the water discharged 568 from the effluent pipe flows back into the body of water on which the PTO's embodiment (not shown) floats, and water from the body of water enters 569 annular reservoir segment 557. In another embodiment, the water discharged 568 from the effluent pipe flows into a reservoir outside the PTO, and water from that reservoir enters 569 annular reservoir segment 557.

If the magnitude of the tilt, the duration the tilt, or a combination of both, is sufficient, then water flowing from the elevated annular reservoir segments, e.g., 539, will flow into a respective central reservoir, e.g., 548, and at least a portion of that water will continue flowing from that respective central reservoir into the lowered respective annular reservoir segment, e.g., 558.

In other words, in response to a minimally sufficient tilt, water will flow from an annular reservoir segment into a corresponding central reservoir, or, water will flow from a central reservoir into a corresponding annular reservoir segment, such that the water circulating within the PTO will tend to be elevated by one-half "step" (if a "step" is regarded as the height of each annular reservoir segment and each central reservoir) in response to the tilt. However, in response to an abundantly sufficient tilt, water will flow from an annular reservoir segment to an approximately opposing annular reservoir segment (by means of an intermediate central reservoir), such that the water circulating within the PTO will tend to be elevated by full "step" in response to the tilt.

Figure 56:
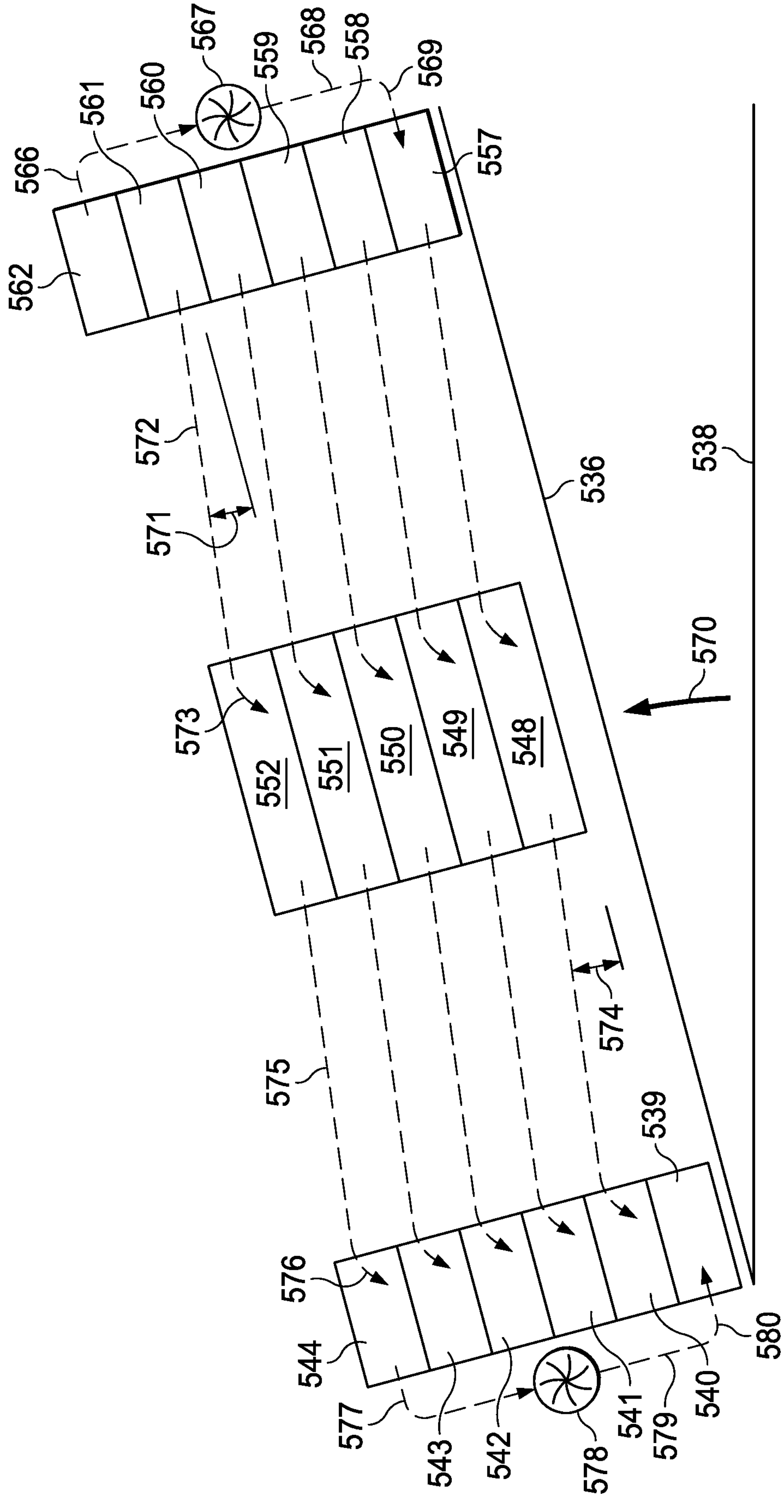
FIG. 56 is another side schematic view of the embodiment of FIG. 41.

FIG. 56 shows a side view of a schematic/functional illustration of the same power takeoff (PTO) illustrated in FIGS. 41-54, and the same schematic illustrated in FIG. 55. However, in FIG. 56, the direction of the tilt 570 is approximately opposite that of the tilt 537 illustrated in FIG. 55.

The base and/or bottom surface 536 of the PTO corresponds to the bottom of the bottommost outer layer (400 in FIG. 41) of the PTO. When the PTO, and the floating embodiment to which it is attached, are tilted 570, in response to a wave passing across the surface of the body of water on which the embodiment (not shown) to which the PTO is attached, the orientation of the PTO is altered and rotated through an angle 570 from the horizontal (e.g., from the resting surface of the body of water) 538.

In response to the illustrated tilt 570 of the PTO, the annular reservoir segments 557-562 of the PTO's six outer levels (400-405 in FIG. 41) are lifted and/or elevated relative to the central reservoirs 548-552. Because the angle 570 of the tilt exceeds the angle 571 of each annular ramp originating at each respective elevated annular reservoir segment 557-561, water held, deposited, and/or trapped, within each elevated annular segment 557-561 flows, e.g., 572, "up" (which, with respect to gravity is "down" due to the tilt 570) each segment's respective annular ramp, and over each annular ramp's respective waterfall edge, e.g., 573, thereby falling down and into the respective central reservoir 548-552 immediately adjacent to, and "above" (which, with respect to the tilt 570 is actually "below"), each respective outer layer's elevated annular reservoir segment 557-561.

In response to the illustrated tilt of the PTO, the central reservoirs 548-552 of the PTO's five inner levels are lifted and/or elevated relative to the annular reservoir segments 539-544 of the PTO's six outer levels (400-405 in FIG. 41). Because the angle 570 of the tilt exceeds the angle 574 of each central ramp originating at each respective elevated central reservoir 548-552, water held, deposited, and/or trapped, within each elevated central reservoir 548-552 flows, e.g., 575, "up" (which, with respect to gravity is "down" due to the tilt 570) each central reservoir's respective central ramp, and over each central ramp's respective waterfall edge, e.g., 576, thereby falling down and into the respective annular reservoir segment 540-544 immediately adjacent to, and "above" (which, with respect to the tilt 570 is actually "below"), each respective inner layer's elevated central reservoir 548-552.

Water trapped, deposited, and/or held, within the annular reservoir segment 544 of the uppermost outer layer (405 in FIG. 41) flows 577 into and through a turbine reservoir and then into and/or through a water turbine 578 that is operably connected to a generator that generates electrical power in response to the flow. The water discharged from the water turbine flows 579 out through an effluent pipe.

In response to the illustrated tilt of the PTO, at least one inlet aperture is at least partially submerged, and water flows 580 into the at least partially submerged annular reservoir segment 539.

In one embodiment, the water discharged 579 from the effluent pipe flows back into the body of water on which the PTO's embodiment (not shown) floats, and water from the body of water enters 580 annular reservoir segment 539. In another embodiment, the water discharged 579 from the effluent pipe flows into a reservoir outside the PTO, and water from that reservoir enters 580 annular reservoir segment 539.

If an embodiment similar to the one illustrated schematically in FIGS. 55 and 56 draws in water from the body of water on which the embodiment to which the PTO is attached, then in response to tilt 570 water would not flow 569 into annular reservoir segment 557 in response to that tilt. However, if an embodiment similar to the one illustrated schematically in FIGS. 55 and 53 draws in water from a reservoir outside and/or around the base of the PTO, then in response to tilt 570 water might still flow 569 into annular reservoir segment 557 from that reservoir.

If the magnitude of the tilt, the duration the tilt, or a combination of both, is sufficient, then water flowing from the elevated annular reservoir segments, e.g., 561, will flow into a respective central reservoir, e.g., 552, and at least a portion of that water will continue flowing from that respective central reservoir 552 into the lowered respective annular reservoir segment, e.g., 544.

In other words, in response to a minimally sufficient tilt, water will flow from an annular reservoir segment into a corresponding central reservoir, or, water will flow from a central reservoir into a corresponding annular reservoir segment, such that the water circulating within the PTO will tend to be elevated by one-half "step" (if a "step" is regarded as the height of each annular reservoir segment and each central reservoir) in response to the tilt. However, in response to an abundantly sufficient tilt, water will flow from an annular reservoir segment to an approximately opposing annular reservoir segment (by means of an intermediate central reservoir), such that the water circulating within the PTO will tend to be elevated by full "step" in response to the tilt.

Figure 57:
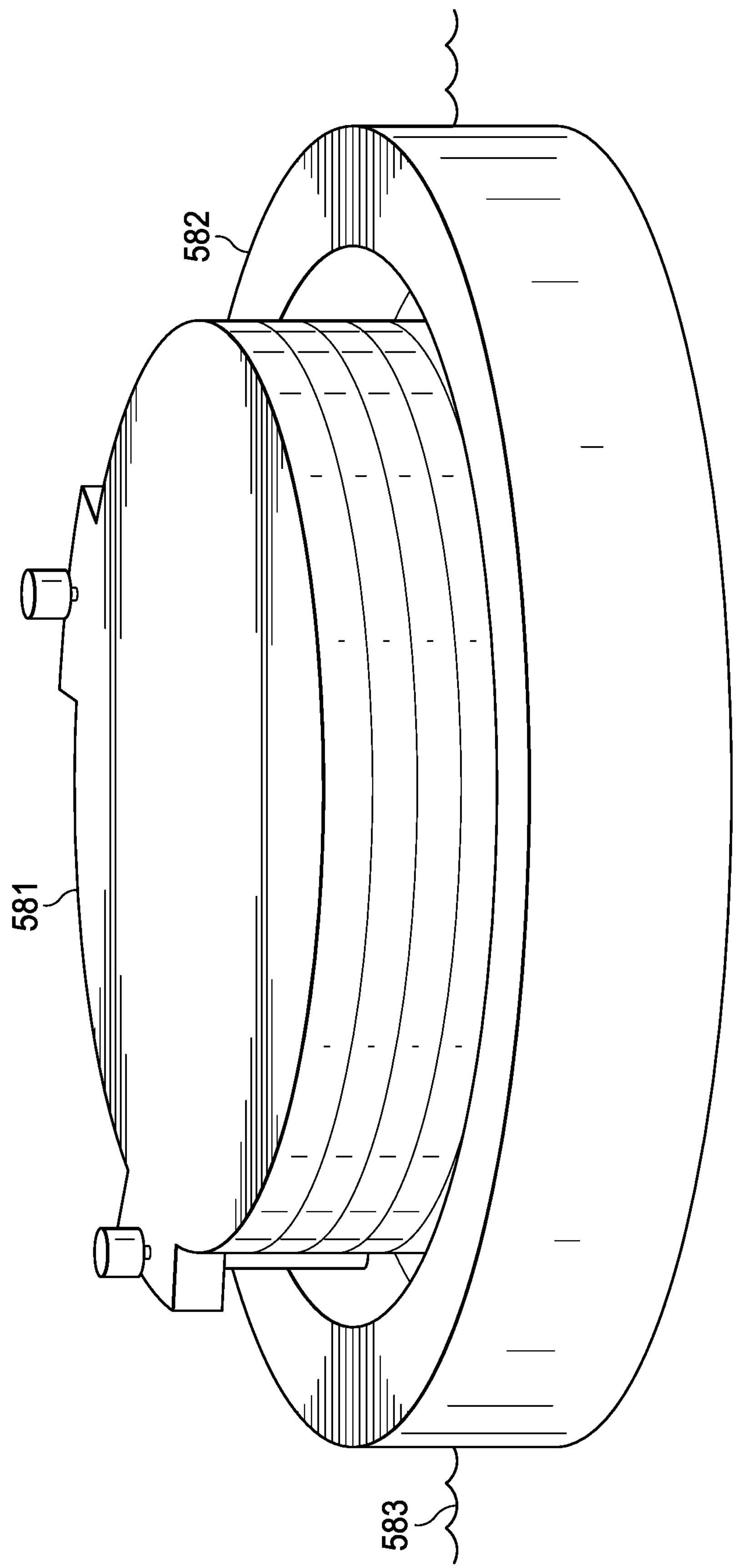
FIG. 57 is an elevated, perspective view of another embodiment of the present invention.

FIG. 57 shows a perspective side view of an embodiment of the present disclosure that incorporates the power takeoff (PTO) illustrated in FIGS. 41-54, and discussed in relation to FIGS. 55 and 56. The embodiment's PTO 581 is positioned at the center of a buoy 582, flotation module, buoyant structure, vessel, and/or float, and the embodiment floats adjacent to an upper surface 583 of a body of water over which waves tend to pass.

Figure 58:
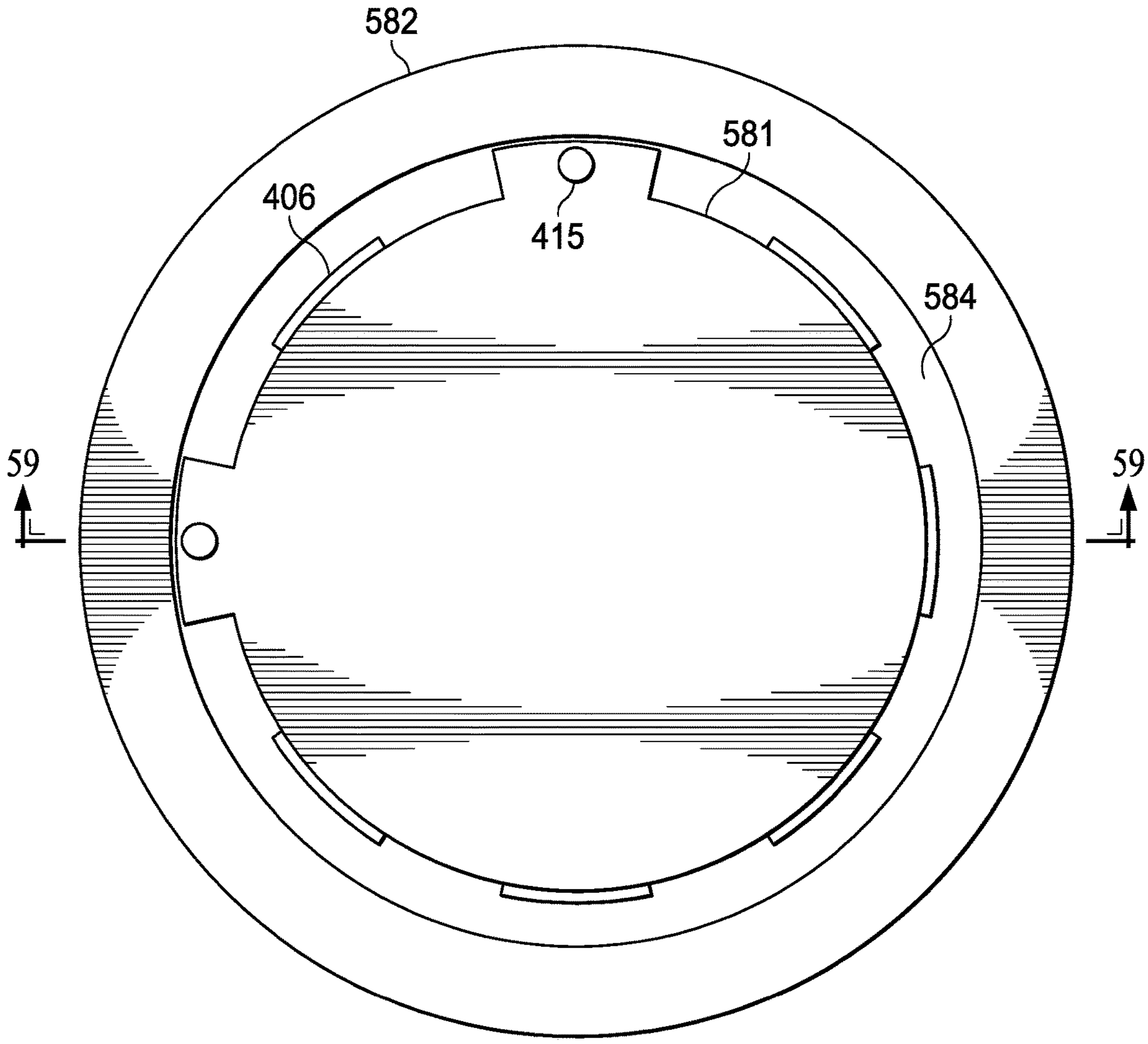
FIG. 58 is a top view of the embodiment of FIG. 57.

FIG. 58 shows a top-down view of the same embodiment of the present disclosure that is illustrated in FIG. 57.

A water reservoir 584 is positioned between the outer walls of the embodiment's power takeoff (PTO) 581 and the inner walls of a cavity, depression, enclosure, and/or hole, within the embodiment's buoy 582. Water flows into the PTO through the PTO's inlet apertures, e.g., 406, and is elevated through outer and inner layers of the PTO in response and/or as a consequence of wave-induced tilting. Water that has been raised to the highest annular reservoir within the PTO then flows into and through water turbines positioned below, and operably connected to, generators, e.g., 415, that generate electrical power in response to the water flowing through them. The water discharged from the water turbines flows back into the water reservoir 584 from which it was originally drawn, obtained, and/or taken.

The water (or other fluid) that flows through the PTO is repeatedly deposited into the embodiment's water reservoir 584 and therefrom repeatedly recycled and/or recirculated through the PTO.

Figure 59:
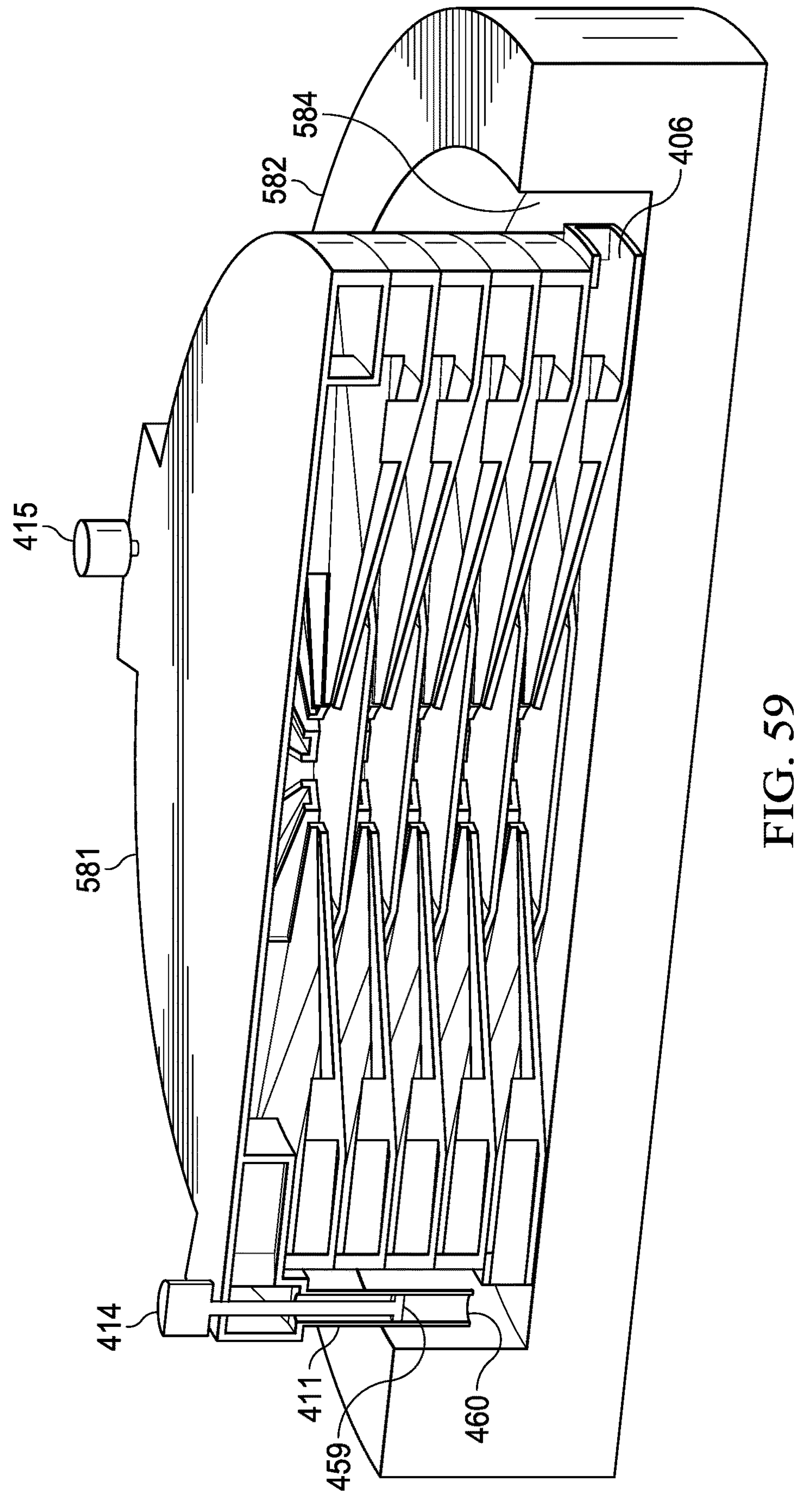
FIG. 59 is a cross sectional view of the embodiment of FIG. 57.

FIG. 59 shows a side perspective sectional view of the same embodiment of the present disclosure that is illustrated in FIGS. 57 and 58 wherein the vertical section plane is specified in FIG. 58 and the section is taken across line 59-59. Water at the highest annular reservoir of the embodiment's power takeoff (PTO) 581 flows through a turbine pipe, e.g., 411, and therethrough a water turbine, e.g., 459, that is operably connected to a generator, e.g., 414. After its discharge from the water turbine's effluent tube, e.g., at mouth 460, water is deposited into, accumulates and is stored within, the embodiment's water reservoir 584, until it again enters an inlet aperture, e.g., 406, and is again lifted within the PTO, and is again discharged from a water turbine's effluent tube.

Figure 60:
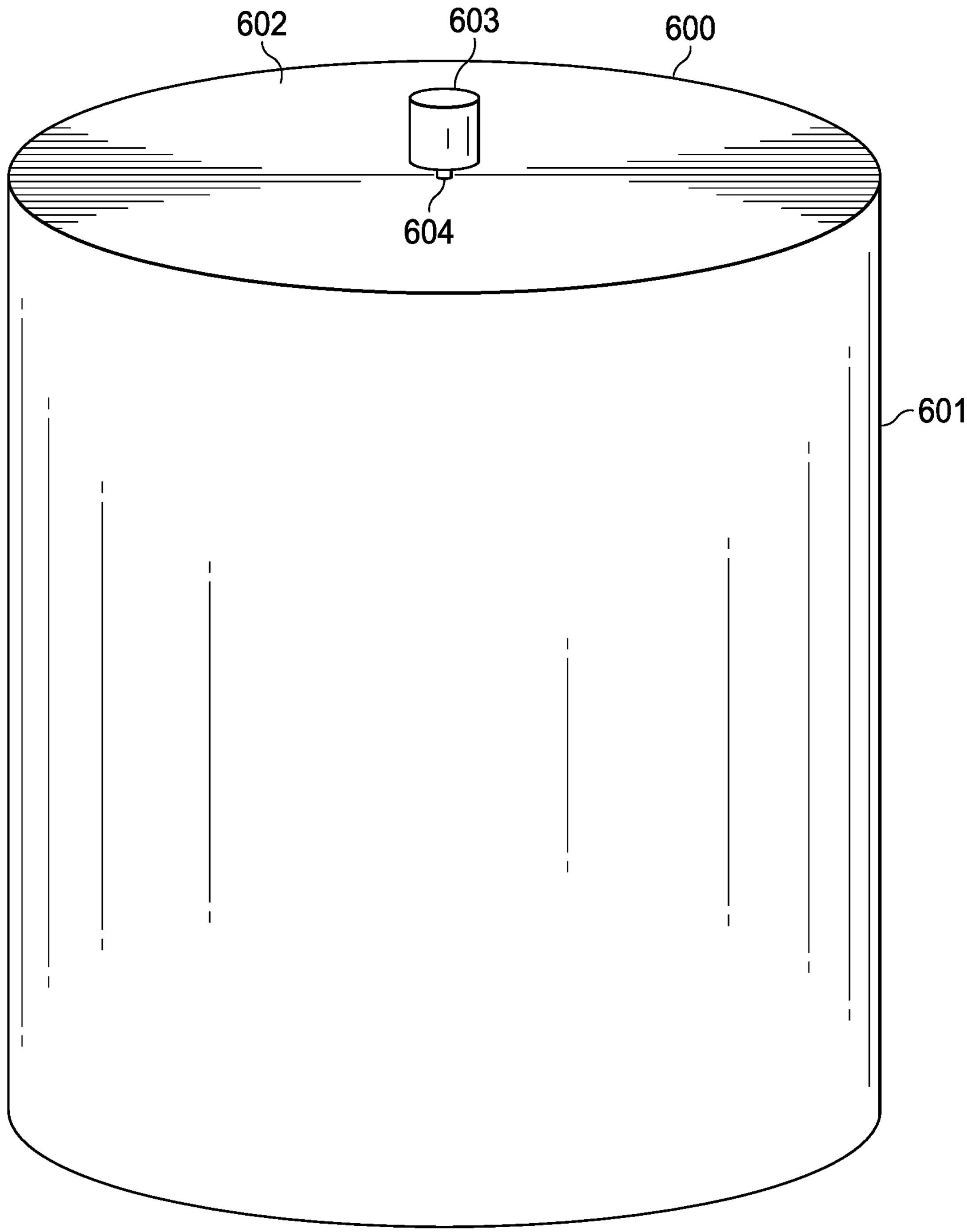
FIG. 60 is an elevated, perspective view of another embodiment of the present invention.

FIG. 60 shows a perspective side view of a power takeoff (PTO) characteristic of an embodiment of the present disclosure. The full embodiment of which the illustrated PTO is a part includes a flotation platform (not shown) to which the illustrated PTO is attached and the embodiment floats adjacent to an upper surface of a body of water over which waves pass.

The PTO 600 has a side cylindrically-shaped outer wall 601, a flat upper wall 602, and a flat bottom wall (not visible). Thus the PTO is sealed, enclosed, and/or contained within, an outer shell 601/602.

Wave-induced tilting of the illustrated PTO results in water (or another fluid) flowing from a reservoir inside the PTO up a spiral ramp (not visible) until it achieves a maximal elevation, height, and/or head pressure, relative to the reservoir from which it originated. The PTO's spiral ramp is partially partitioned by tangentially-oriented vertical walls (not visible) that tend to prevent the backflow of water. Water elevated to a height near the maximum possible height of the PTO's spiral water-lifting ramp falls into a turbine reservoir (not visible). And, water within the turbine reservoir flows through, energizes, and causes to rotate, a water turbine (not visible) which is operably connected to a generator 603 by a shaft 604, thereby causing the generator to generate electrical power.

Figure 61:
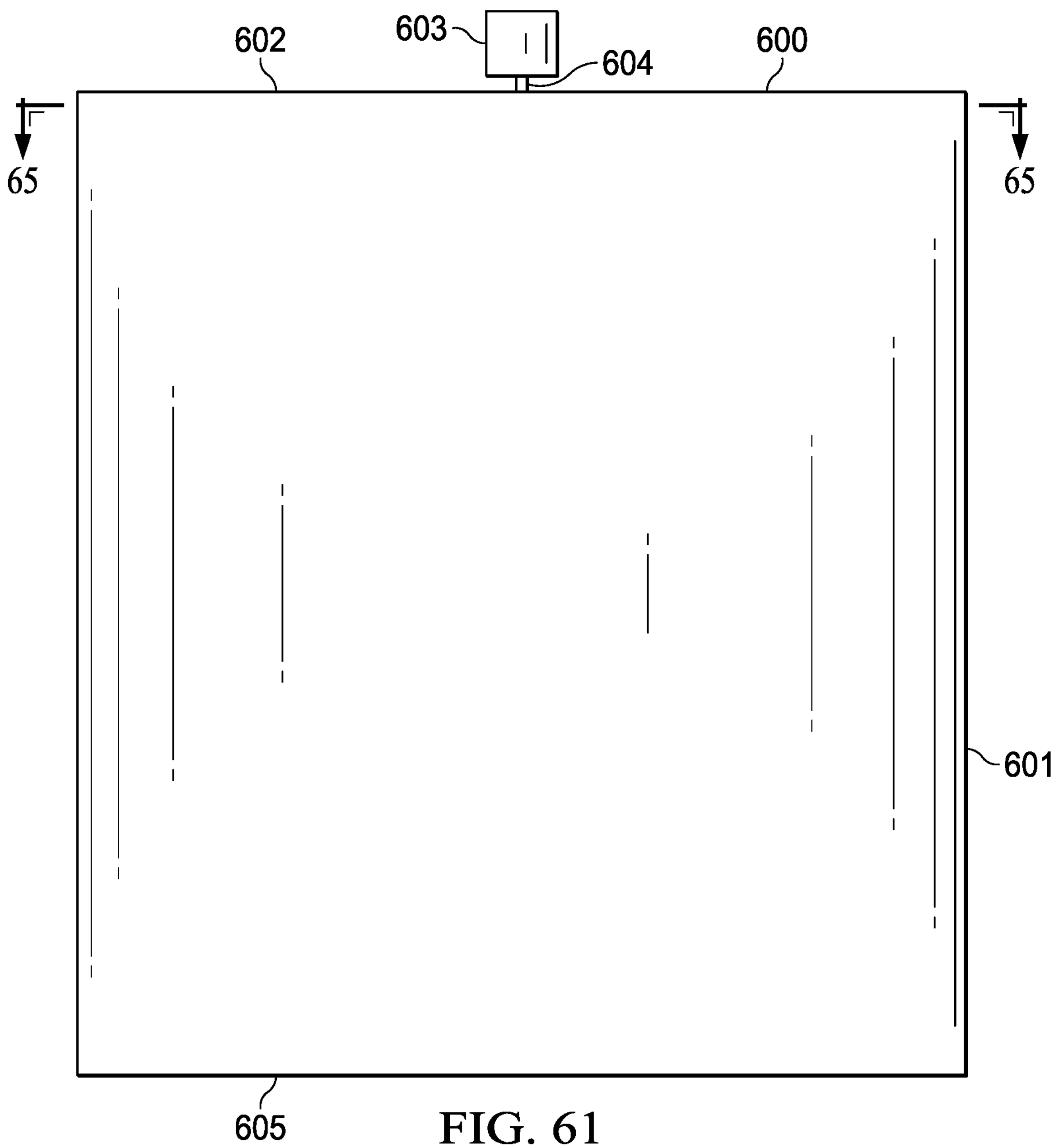
FIG. 61 is a side view of the embodiment of FIG. 60.

FIG. 61 shows a side view of the same power takeoff (PTO) illustrated in FIG. 60. The PTO 600 has a solid bottom wall 605.

Figure 62:
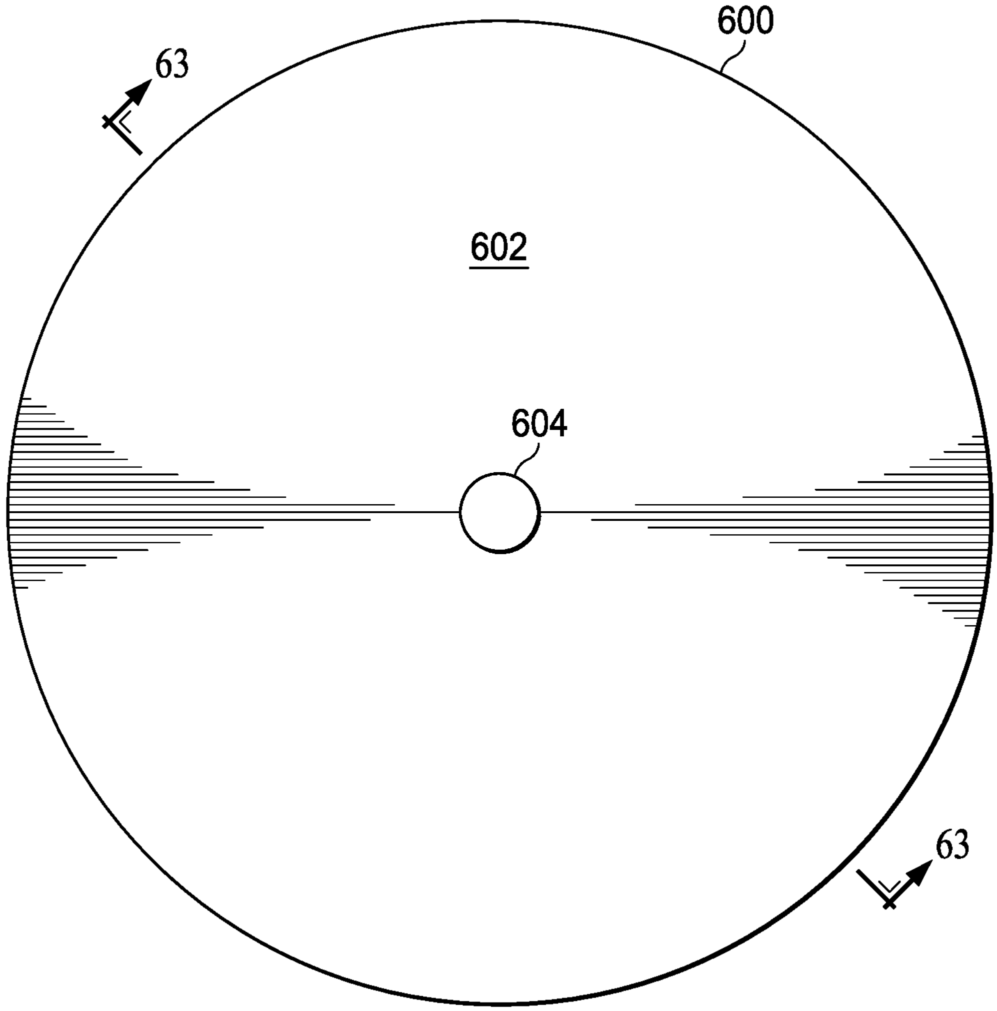
FIG. 62 is a top view of the embodiment of FIG. 60.

FIG. 62 shows a top-down view of the same power takeoff (PTO) illustrated in FIGS. 60 and 61.

Figure 63:
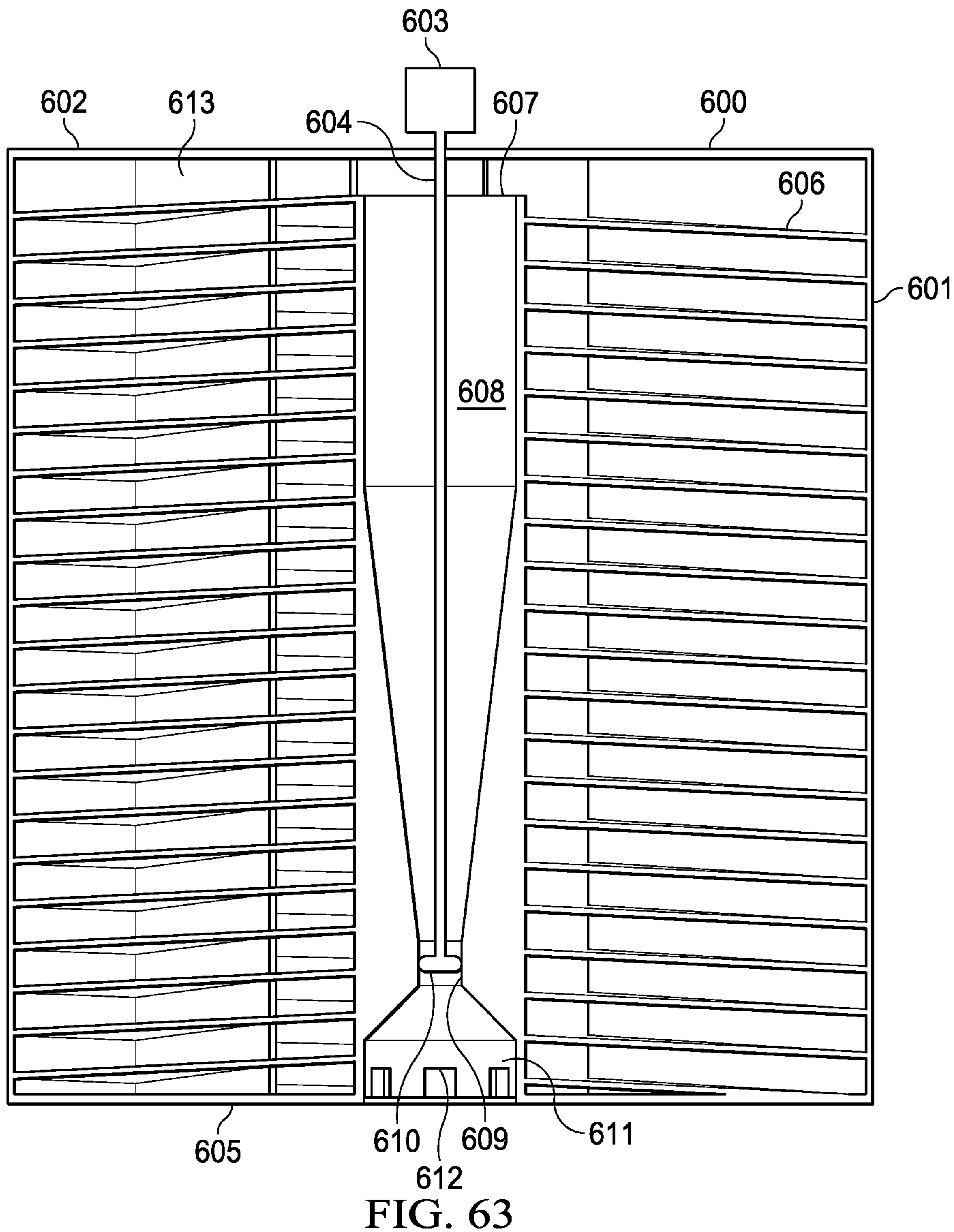
FIG. 63 is a cross sectional view of the embodiment of FIG. 60.

FIG. 63 shows a side sectional view of the same embodiment of the present disclosure that is illustrated in FIGS. 60-62 wherein the vertical section plane is specified in FIG. 62 and the section is taken across line 63-63.

Inside the PTO's 600 canister 601/602/605 is a continuous spiral ramp 606. When the PTO tilts, e.g., in response to wave motion buffeting the embodiment of which the PTO is a component, then water flows in an approximately circular motion and/or path and flows up the spiral, travelling from the spiral's bottom (near the bottom 605) to the top (near the top 607 of the PTO's central cylindrical tube 608). When water reaches the top of the spiral, it tends to spill over the edge of the upper mouth 607 of the PTO's central cylindrical tube 608, thereby tending to create a reservoir of water within that tube, a "turbine reservoir". Water accumulated within the PTO's turbine reservoir 608 flows down and into a constricted portion 609 and/or throat of the tube. Water flowing through the central tube's throat 609 flows through, energizes, and causes to rotate, a water turbine 610 positioned therein. Rotations of the water turbine 610 are communicated to the turbine's shaft 604 which is operably connected to a generator 603. Thus, water flowing down through the PTO's central cylindrical tube 608 causes generator 603 to generate electrical power.

A portion of the energy imparted by waves to the embodiment of which the PTO is a part is captured as an increase in the gravitational potential energy of water within the PTO as water is incrementally lifted through its motion about the PTO's spiral ramp 606. At the top of the PTO's spiral ramp, the raised water falls into the turbine reservoir 608, vessel, reservoir, and/or pool, after which its gravitational potential energy is manifested as head pressure that drives the water through water turbine 610 thereby converting the gravitational potential energy of the water in the turbine reservoir into electrical power.

Water discharged from the water turbine 610 flows into the base 611 of the PTO's central cylindrical tube 608 where apertures, e.g., 612, allow the discharged turbine water to flow back into the base of the spiral ramp, and thereby flow up the spiral ramp again as wave-induced tilting of the PTO, and the embodiment of which it is a part, incrementally lift the water higher and higher.

A set of vertical walls, e.g., 613, tend to trap water during those moments when tilting is not favorable to its further flow up the spiral ramp, and until favorable tilting resumes. In addition to vertical walls oriented approximately tangentially to the PTO's central cylindrical tube 608, the spiraling surface of which the spiral ramp 606 is comprised is lower at its outer edge than at the edge proximate to the central tube.

A vertical section through the longitudinal axis about which the spiral ramp is wound (as illustrated in FIG. 63) shows ramps for which the vertical ramp section is not normal to that longitudinal axis. Instead, the vertical ramp sections are oriented to the spiral ramps longitudinal axis at an angle away from normal such that the distal and/or outer end of each ramp section is closer to the PTO's base 605 than is the point at which each ramp section is connected to the PTO's central cylindrical tube 608. In the illustrated PTO the downward angle of each ramp is approximately 3 degrees relative to a normal from the vertical longitudinal axis about which the spiral ramp is wound.

The scope of the present invention includes PTOs with spiral ramps wherein a vertical section through the longitudinal axis about which the spiral ramp is wound would be characterized by ramps for which the vertical ramp section is normal to that longitudinal axis.

The scope of the present invention includes PTOs with spiral ramps characterized by any spiral ramp angle.

Figure 64:
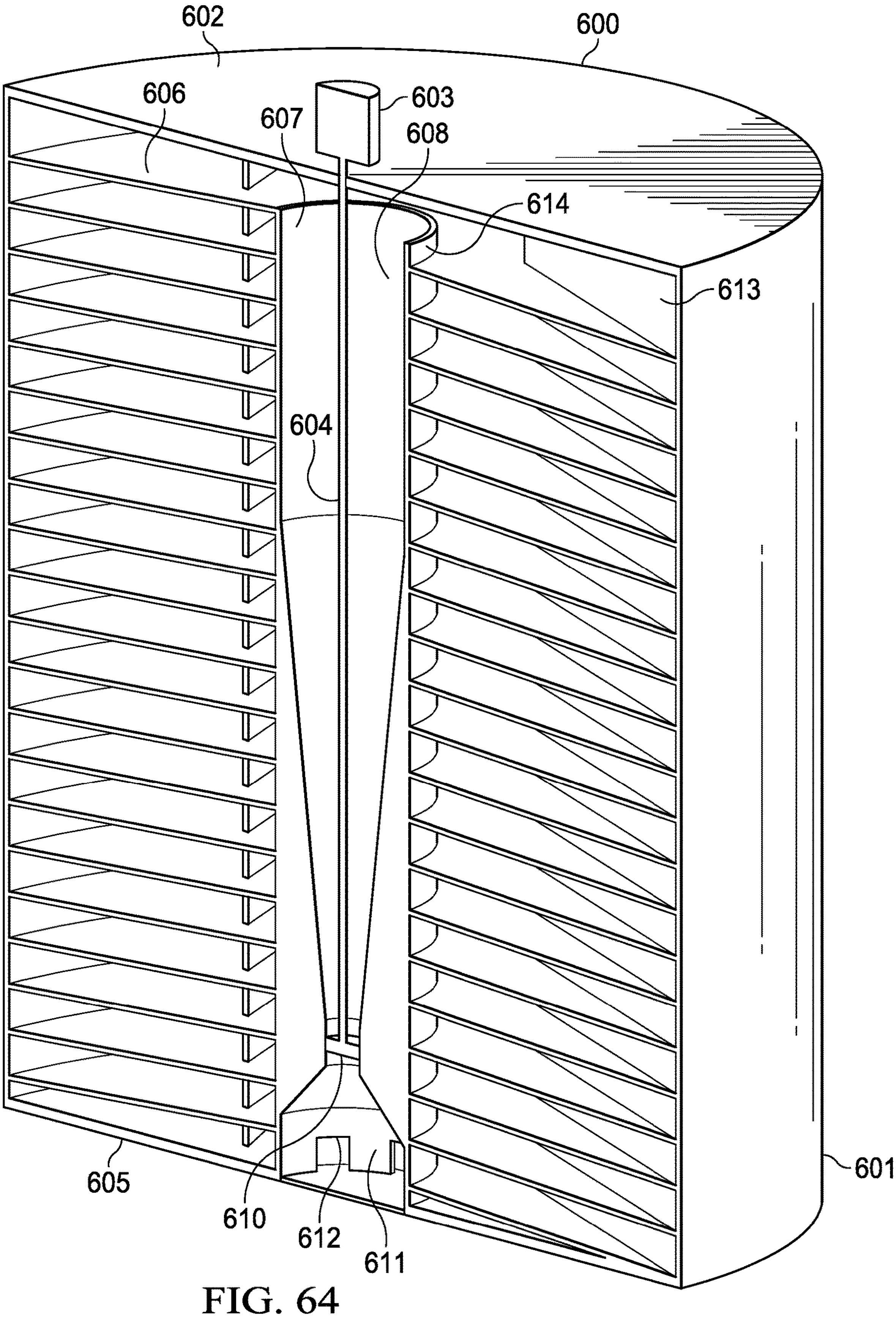
FIG. 64 is another cross sectional view of the embodiment of FIG. 60.

FIG. 64 shows the same side sectional view illustrated in FIG. 63 from a perspective view. If viewed from the top, water flows through the PTO in a counterclockwise direction. So, in response to a favorable tilting of the PTO, water flowing up the PTO's spiral ramp 606 will impact diverting wall 613 and thereby be directed further up the ramp. In the absence of such diverting walls, water would still flow up the spiral ramp 606, but would then tend to flow back down when the favorable tilt causing its flow changed direction or stopped. Theoretically, a tilt manifested as a precession of the PTO about a vertical axis normal to the resting surface of the body of water on which the PTO, and the embodiment of which it is a part, float could cause water to flow up the spiral ramp 606, and to be deposited within the turbine reservoir 608, without any diverting walls to prevent backflow.

Figure 65:
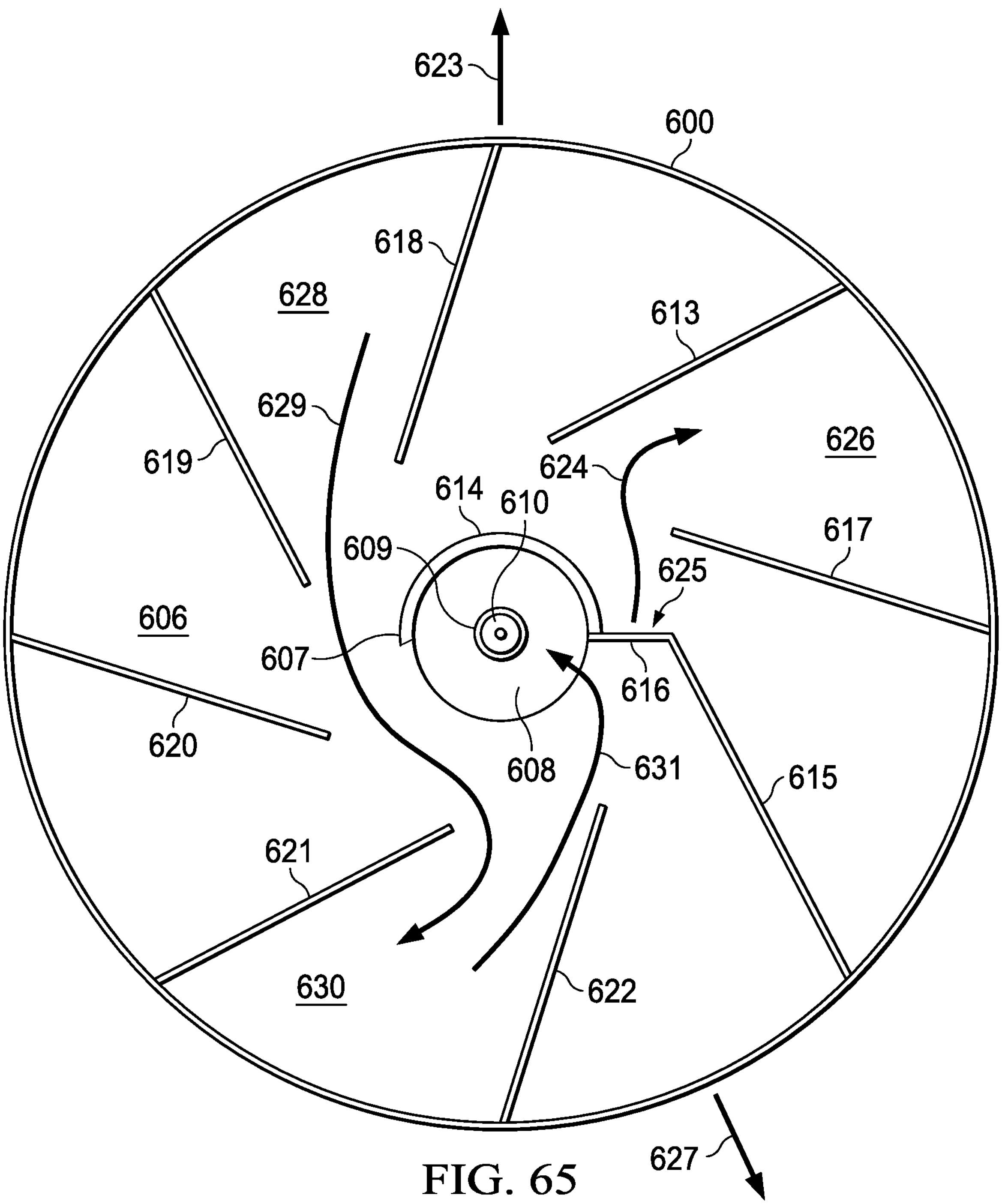
FIG. 65 is another cross sectional view of the embodiment of FIG. 60.

FIG. 65 shows a top-down sectional view of the same embodiment of the present disclosure that is illustrated in FIGS. 60-64 wherein the horizontal section plane is specified in FIG. 60 and the section is taken across line 65-65.

The spiral ramp ascends in a counterclockwise direction with respect to the orientation of the illustration in FIG. 65. The spiral ramp 606 ends at tangential diverting wall 615. Upward spiraling water that encounters diverting wall 615 is further obstructed by a radial wall 616. The eight tangential diverting walls 613, 615, and 617-622, extend from the bottom wall (605 in FIG. 61) of the PTO up to the top wall (602 in FIG. 61). However, radial wall 616 extends only from the uppermost end of the spiral to the top wall.

Water ascending the spiral ramp 606 must flow in a circular fashion between the innermost ends of the of the diverting walls and the outer wall of the central cylindrical tube 607.

In response to a favorable tilt, e.g., of direction 623, water flows 624 out from under the uppermost end 625 and/or level of the PTO's spiral ramp in the gap between the inner vertical edge of diverting wall 615 and the central tube 614. Because of the water's direction of flow (e.g., approximately parallel to the direction 623 of the tilt), and because the outer edges and/or ends of the spiral ramps are lower than the inner edges and/or ends, the water flowing in response to a favorable tilt of direction 623, will be diverted into spiral reservoir 626 where the downward radial angle of the ramp and the opposing diverting walls 617 and 613 will effectively if not perfectly trap the water until another tilt of favorable direction moves the water further up the spiral.

In response to a favorable tilt, e.g., of direction 627, water trapped within spiral reservoir 628 flows 629 out of the reservoir, around the central tube 607, and into spiral reservoir 630. Another favorable tilt, e.g. in the direction of 623, causes the water trapped within spiral reservoir 630 to flow 631 against the diverting wall 622, and in a direction tangential to the central tube 607, until the flowing water is obstructed by radial wall 616 which causes it to spill over and into the central cylindrical tube and turbine reservoir 608. Water within the turbine reservoir 608 then flows down to, and through, the water turbine 610 positioned within the constricted throat of the central tube 608, thereby causing the operably connected generator (603 in FIG. 61) to generate electrical power.

Figure 66:
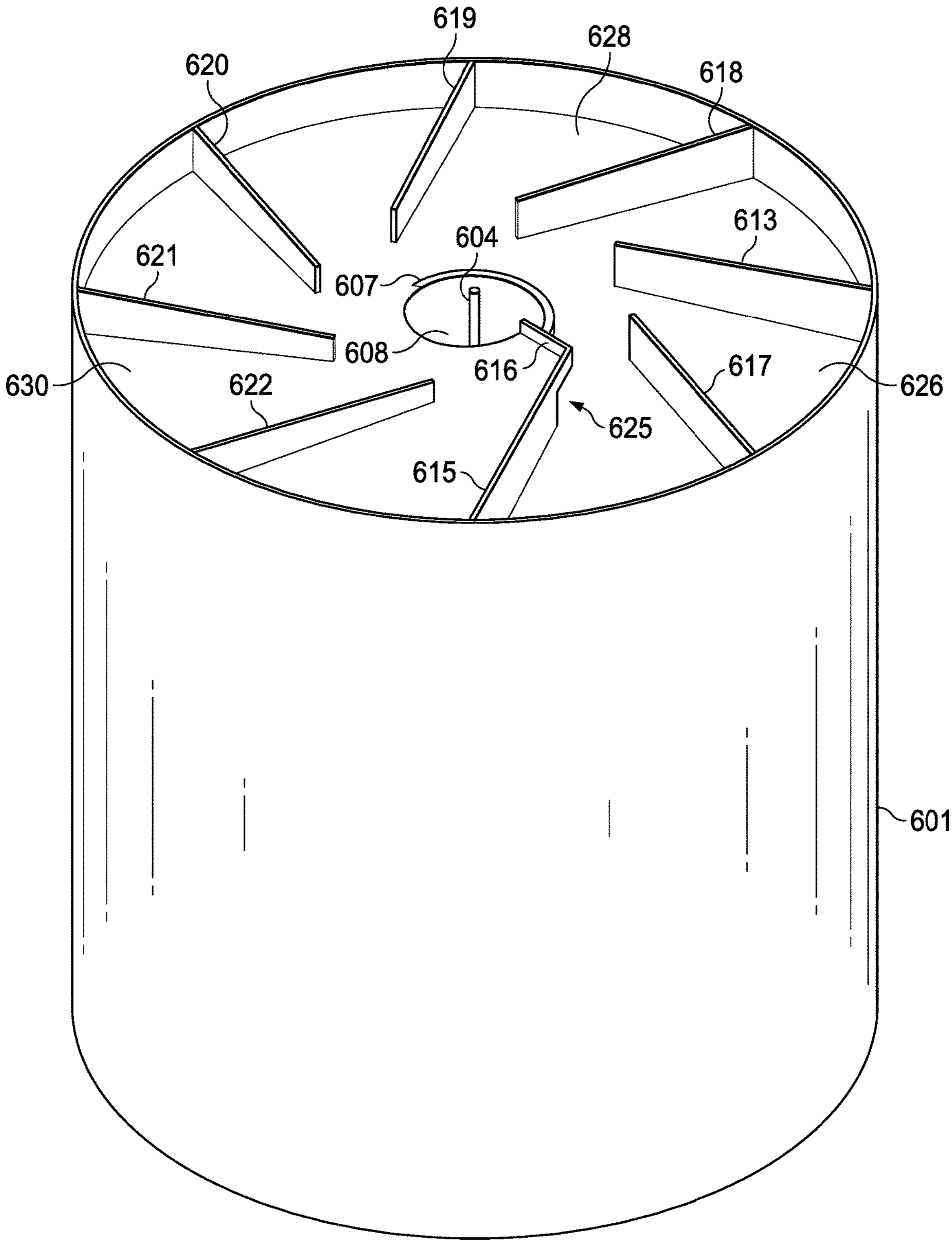
FIG. 66 is perspective cross sectional view of the embodiment of FIG. 60.

FIG. 66 shows the same top-down sectional view illustrated in FIG. 65 from a perspective view.

Figure 67:
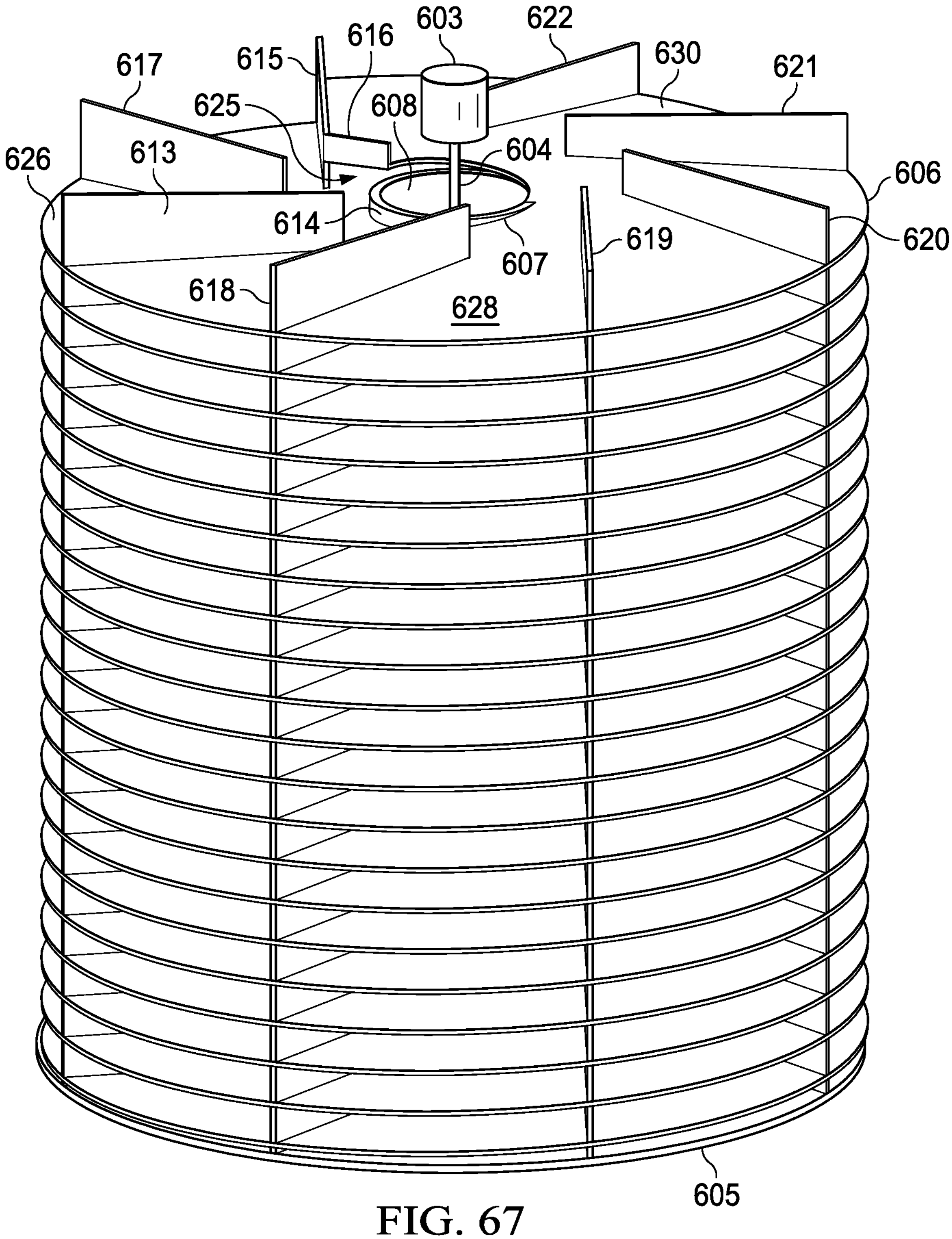
FIG. 67 is an elevated, perspective view of the embodiment of FIG. 60 with the outer wall removed.

FIG. 67 shows a perspective side view of the same embodiment of the present disclosure that is illustrated in FIGS. 60-66. In FIG. 67 the cylindrical side wall (601 in FIG. 60) and the top wall (602 in FIG. 60) have been removed and/or omitted for the purpose of illustration. Except for the removal of those walls, the configuration of the power takeoff (PTO) in FIG. 67 is identical to the one illustrated in FIG. 60.

Water discharged from the PTO's water turbine and/or turbine reservoir flows out and into the lowest level(s) of the PTO's spiral ramp 606, i.e., those portions of the ramp adjacent or near to the PTO's bottom wall 605.

As water is incrementally lifted up the spiral ramp through wave-induced tilting of the PTO, the water eventually flows out of aperture 625 and will thereafter either spontaneously spill over the ever shortening upper lip (e.g., the lip is relatively near the ramp surface at 614, but at 607 is approximately flush with the ramp surface) of the mouth at the top of the turbine reservoir 608, or it will be directed into that mouth by radial wall 616 if it completes another rotation about the spiral after emerging from aperture 625.

Figure 68:
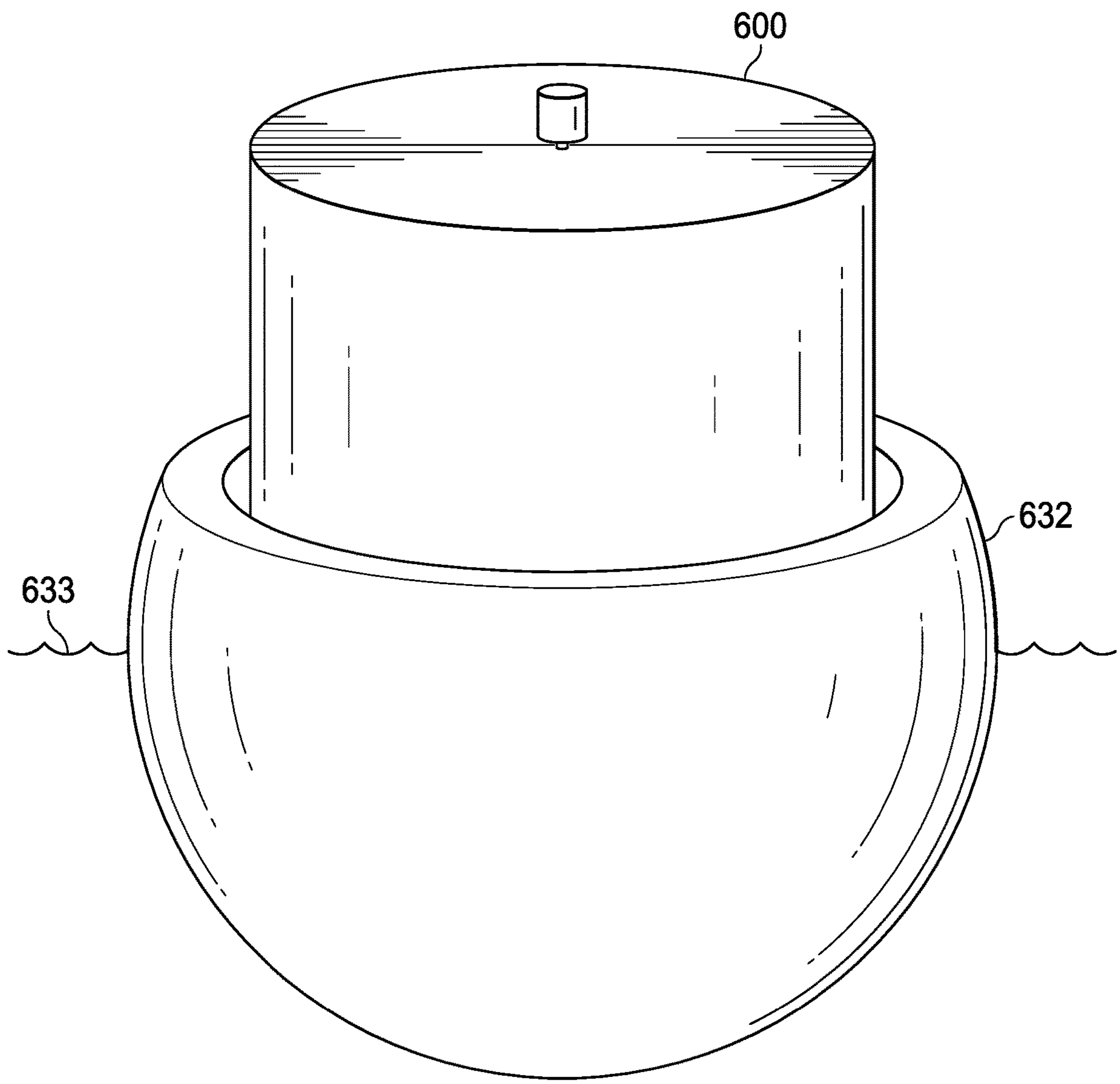
FIG. 68 is an elevated, perspective view of another embodiment of the present invention.

FIG. 68 shows a perspective side view of an embodiment of the present disclosure that incorporates the power takeoff (PTO) illustrated in FIGS. 60-67. The embodiment's PTO 600 is positioned at the center of a buoy 632, flotation module, buoyant structure, vessel, and/or float, and the embodiment floats adjacent to an upper surface 633 of a body of water over which waves tend to pass.

Figure 69:
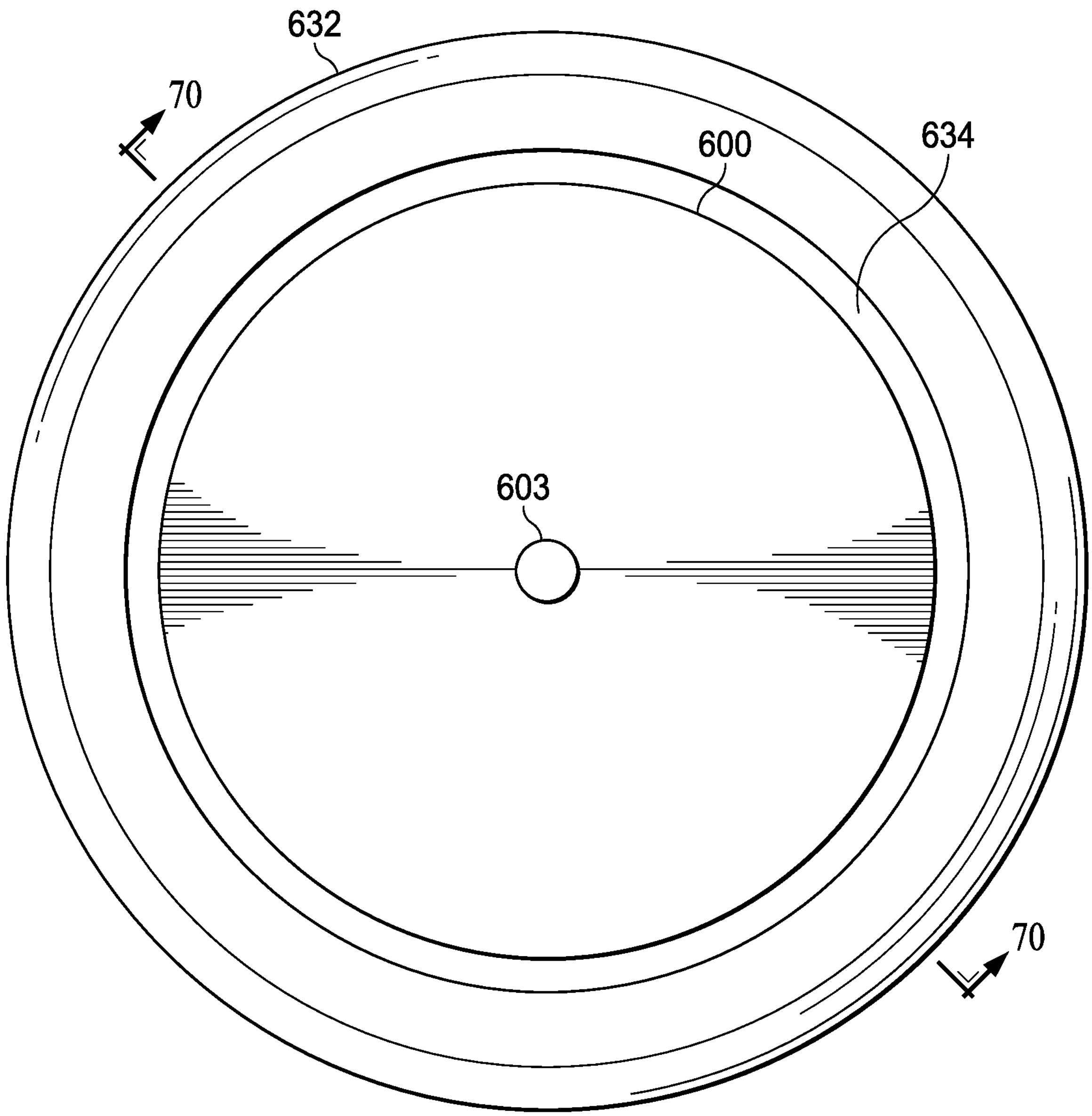
FIG. 69 is a top view of the embodiment of FIG. 69.

FIG. 69 shows a top-down view of the same embodiment of the present disclosure that is illustrated in FIG. 68. Between the power takeoff (PTO) 600 and the enclosing buoy 632 is a gap which exists primarily for the purpose of illustration. An embodiment similar to the one illustrated in FIG. 69 has no such gap.

Figure 70:
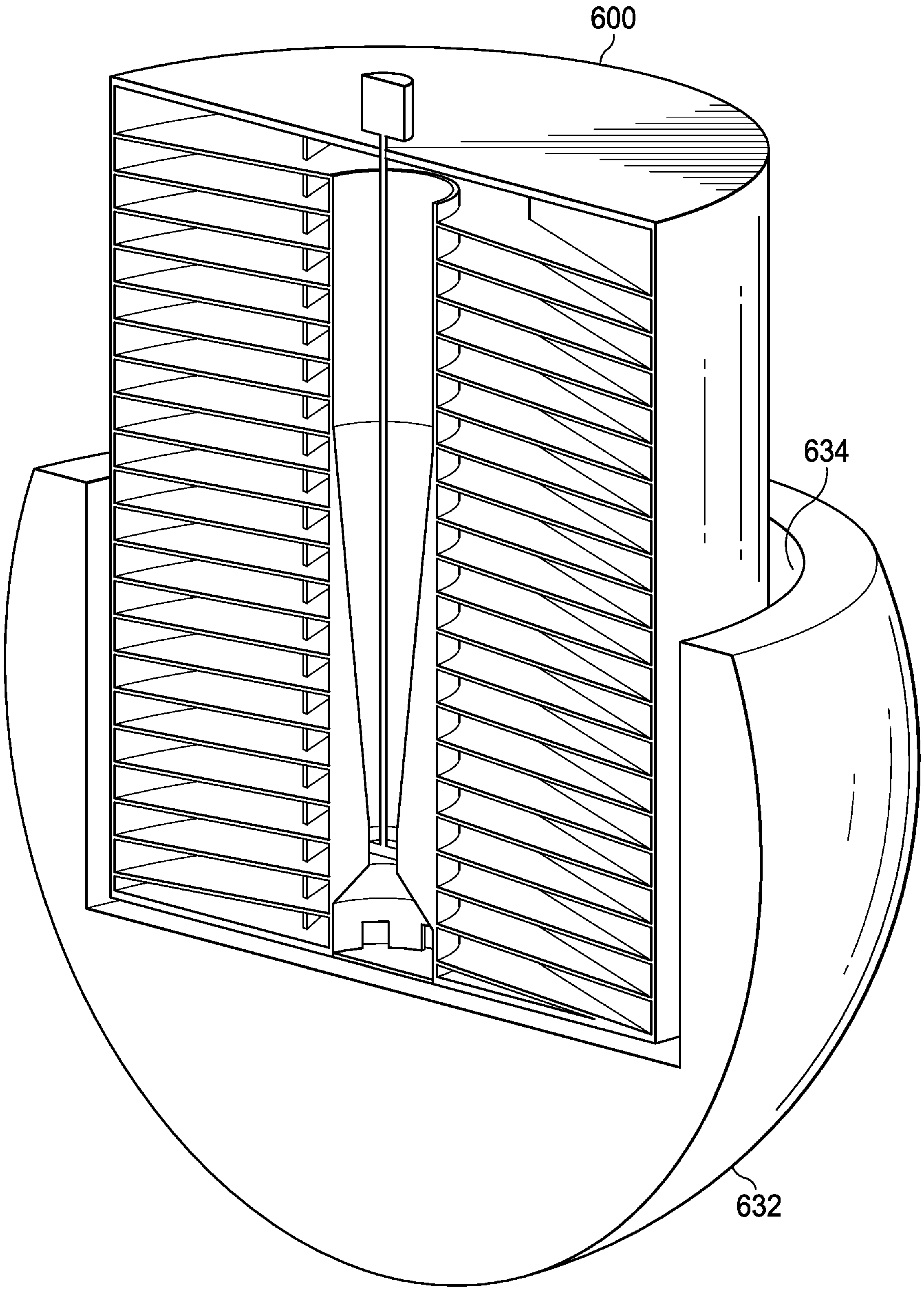
FIG. 70 is a cross sectional view of the embodiment of FIG. 69.

FIG. 70 shows a side perspective sectional view of the same embodiment of the present disclosure that is illustrated in FIGS. 68 and 69 wherein the vertical section plane is specified in FIG. 69 and the section is taken across line 70-70. Upon reaching the uppermost level of the spiral ramp of the PTO 600, water falls into the turbine reservoir within the PTO's central tube and thereafter flows down and through a water turbine therein. After being discharged by the water turbine, water flows down and back onto the lowest level(s) of the PTO's spiral ramp, after which it will again ascend to the top of the turbine reservoir—repeating this cycle endlessly.

In an embodiment similar to the one illustrated in FIGS. 68-70, a void, chamber, vessel, enclosure, and/or tank, of water ballast is positioned in a bottom portion of the embodiment's buoy 632.

Figure 71:
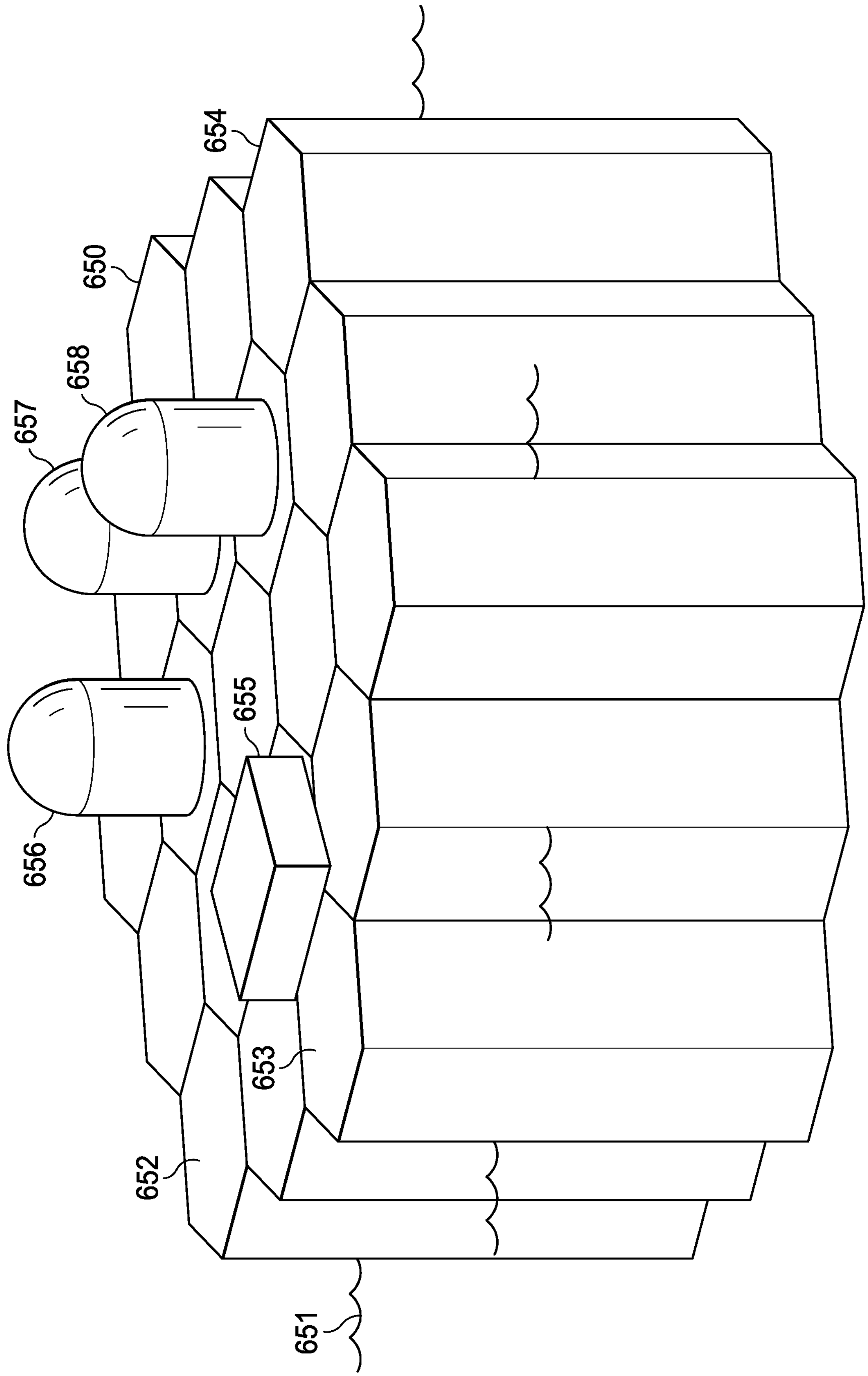
FIG. 71 an elevated, perspective view of another embodiment of the present invention.

FIG. 71 shows a perspective side view of an embodiment 650 of the present disclosure that incorporates a plurality of the type of power takeoff (PTO) disclosed herein. The embodiment floats adjacent to an upper surface 651 of a body of water over which waves tend to pass. Each hexagonal columnar structure, e.g., 652-654, is a PTO of one of the types disclosed herein. The embodiment may incorporate a variety of different PTOs, PTOs of different sizes, PTOs of different rated electrical power levels, PTOs fabricated of different materials, PTOs converting the energy of waves into electrical power by means of different operating fluids, PTOs which draw water from the body of water 651 and PTOs that recycle an operating fluid within a closed system.

The illustrated multi-PTO embodiment 650 incorporates an energy-consuming processing module 655, system, factory, mechanism, and/or device, and therein or therethrough utilizes at least a portion of the electrical power that it produces to process a material, extract a material, execute computations, generate an energy-storing chemical, and/or recharge an energy-storing material, system, battery, capacitor, or other energy-storage system.

The embodiment includes an input chamber 656, vessel, enclosure, and/or structure, within which raw materials, feedstock, ingredients, and/or other substances, are stored until needed by the processing module 655, after which they are transmitted, communicated, delivered, transferred, and/or provided, to the processing module.

The embodiment includes two output chambers 657 and 658, vessels, enclosures, and/or structures, within which are stored processed products produced, at least in part, by the processing module 655.

In one embodiment 650, at least one of the output vessels stores liquefied hydrogen, and the input vessel includes replacement electrolyzers to facilitate the generation of hydrogen from seawater.

In another embodiment 650, at least one of the output vessels stores liquefied ammonia, and the input vessel includes devices that separate atmospheric nitrogen from the air.

In another embodiment 650, at least one of the output vessels includes memory storage devices that store computational problems received by the embodiment from radio transmissions (or other sources), and/or the results of computations performed by the computational circuits within the processing module until the time that those results, or a portion thereof, can be transmitted to a remote computer by radio transmissions (or by other communications channels and/or methods).

In another embodiment 650, at least one of the PTOs, e.g., 652, does not convert the gravitational potential energy of the water it lifts into electrical energy. Instead it uses that potential energy to desalinate water.

In another embodiment 650, at least one of the PTOs, e.g., 652, does not convert the gravitational potential energy of the water it lifts into electrical energy. Instead it uses that potential energy to extract a mineral from the seawater on which the embodiment floats.

Figure 72:
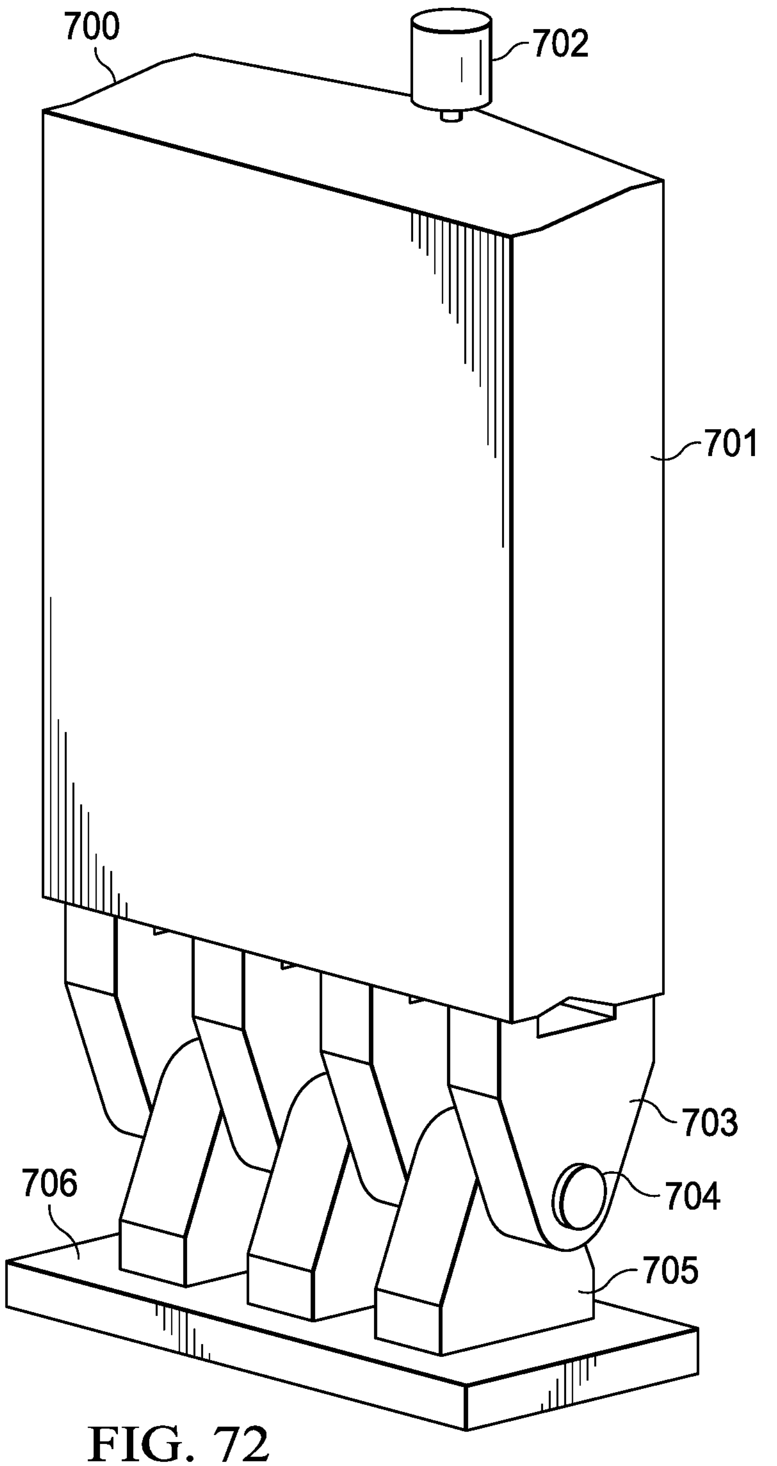
FIG. 72 is an elevated, perspective view of another embodiment of the present invention.

FIG. 72 shows a perspective side view of an embodiment 700 of the present disclosure. A compartment, enclosure, and/or chamber 701, contains a wave-energized diode pump similar to the one illustrated in FIGS. 15-19 which utilizes reservoirs connected to ramps, and/or inclined channels, over and/or through which, in response to wave-induced tilting of the diode pump, water flows back and forth between opposing reservoirs at ever increasing relative heights thereby progressively and/or incrementally gaining gravitational potential energy.

Water that has flowed through the diode pump and reached the top of the pump is thereafter directed into a channel (not visible) containing a water turbine (not visible) rotatably connected to a generator 702. The water flowing down through the turbine channel engages and/or energizes the water turbine thereby imparting rotational kinetic energy and/or rotational torque to the generator 702 and thereby generating electrical power.

The illustrated embodiment 700 is sealed and the water contained therein is lifted by wave action through the diode pump to a maximal height after which it flows through the embodiment's water turbine, thereby generating electrical power. After flowing through the water turbine, the water within the illustrated embodiment flows back into the diode pump and is again, and repeatedly, raised to the top of the pump in response to continued wave action.

The diode pump 701 of the illustrated embodiment is rigidly connected to a plurality of diode hinge elements, e.g., 703, which rotate about a shaft 704 and/or axle that rotatably connects the diode hinge elements, e.g., 703, to a corresponding and/or complementary plurality of base hinge elements, e.g., 705. The base hinge elements, e.g., 705, are rigidly attached to a base 706 and/or platform that is typically attached to, and/or resting upon, the ground, e.g., the seafloor, at the base of the body of water in which the embodiment 700 is typically deployed.

The illustrated embodiment 700 is a closed system and recycles and/or recirculates the water that its diode pump raises. Another embodiment similar to the one illustrated in FIG. 72 receives water from the body of water in which the embodiment is deployed, e.g., from the sea, and after that water has been raised and subsequently directed to flow through the embodiment's water turbine, is returned to that body of water, e.g., to the sea. Another embodiment similar to the one illustrated in FIG. 72 also receives water from the body of water in which it is deployed utilizes the gravitational potential energy of the water raised by the embodiment's diode pump in order to generate pressurized water that is subsequently desalinated, e.g., by a membrane assembly within the embodiment. And another embodiment similar to the one illustrated in FIG. 72 which receives water from the body of water in which it is deployed utilizes the gravitational potential energy of the water raised by the embodiment's diode pump in order to extract minerals from the water thereby pressurized.

An embodiment similar to the one illustrated in FIG. 72 also contains an apparatus that performs useful work using a portion of the electrical power generated by the embodiment's generator 702. One such embodiment contains computing devices that perform computational tasks it receives from a remote, e.g., a shore-based, computer and/or computing network, e.g., via a subsea cable or via satellite, and which return computational results to a remote computer and/or computing network, e.g., via a subsea cable or via satellite.

An embodiment similar to the one illustrated in FIG. 72 utilizes a working fluid of ammonia instead of water.

Because the diode pump 701 within the embodiment of FIG. 72 contains a working fluid and air (or other gas, e.g., nitrogen or ammonia), the embodiment tends to be buoyant. A buoyant embodiment similar to the one illustrated in FIG. 72 is connected to the ground, e.g., the seafloor, at the base of the body of water in which the embodiment 700 is deployed, by a plurality of flexible connectors, e.g., chains, ropes, steel cables, linkages, cables comprised of carbon fiber, etc., one end of which are connected to a bottom surface and/or portion of the diode pump 701, and the other end of which are connected to a base (such as 706), a platform, a plurality of pylons, and/or other connectors to the ground. The chains tend to keep the buoyant embodiment connected to the ground, e.g. to the seafloor, while allowing the diode pump 701 to tilt and/or rock back and forth in response to wave action.

The generator 702 of the illustrated embodiment 700 is positioned outside and above the enclosure 701 housing the embodiment's diode pump. However, the scope of the disclosure includes any number of generators, any type(s) of generator(s), any position of a generator within the embodiment, e.g., within the diode pump housing 701, any type, shape, design, and/or position of enclosure about the generator.

Figure 73:
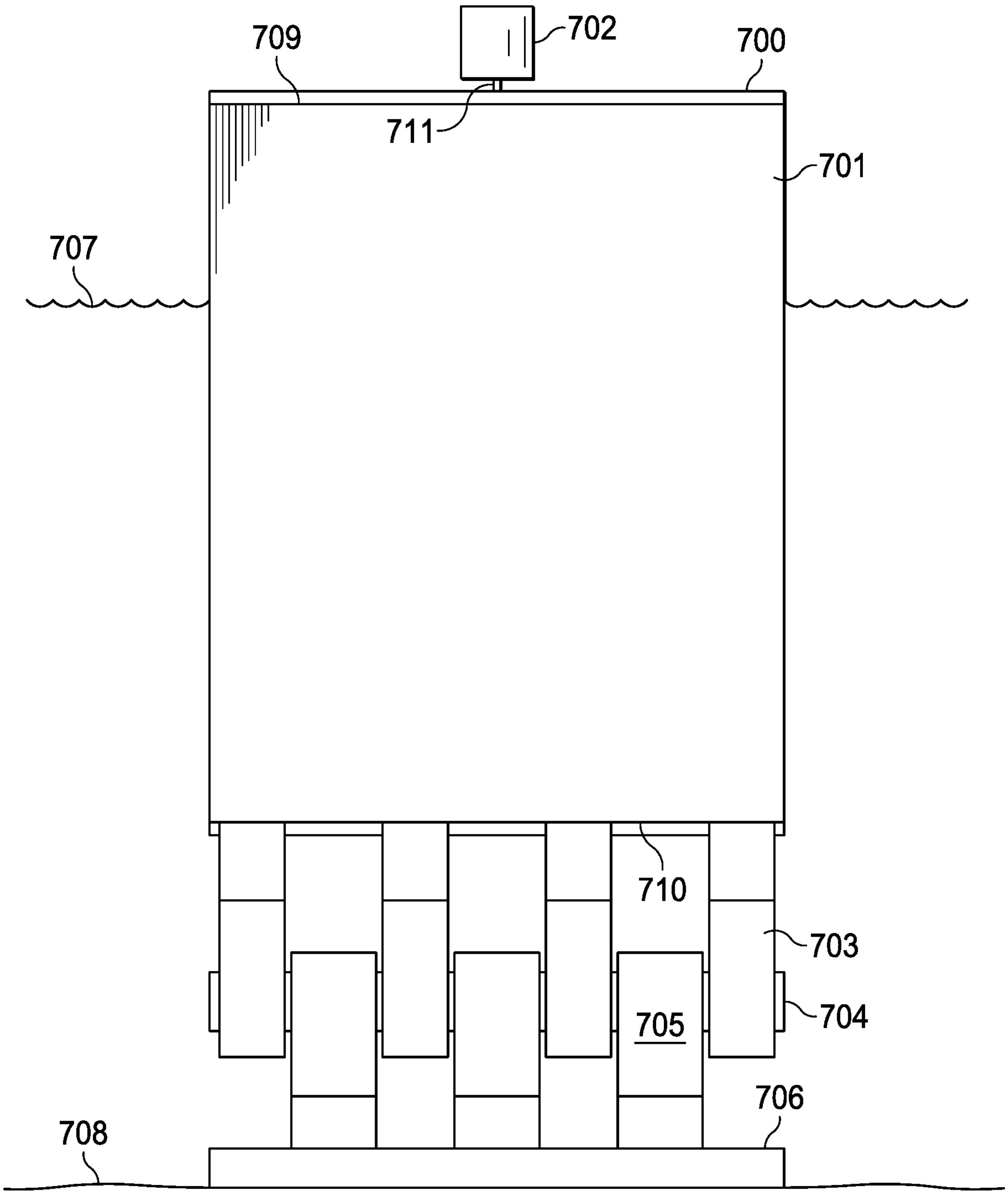
FIG. 73 is a front view of the embodiment of FIG. 72.

FIG. 73 shows a front side view of the same embodiment 700 of the present disclosure that is illustrated in FIG. 72.

The illustrated embodiment 700 is deployed within a body of water 707 and rests on the ground 708, e.g. the seafloor, beneath the body of water 707.

The diode pump 701 of the embodiment 700 is encased and/or enclosed within outer walls, including a topmost wall 709, a bottommost wall 710, and side walls 701. The generator 702 is rotatably connected to the water turbine (not visible) by a shaft 711.

Figure 74:
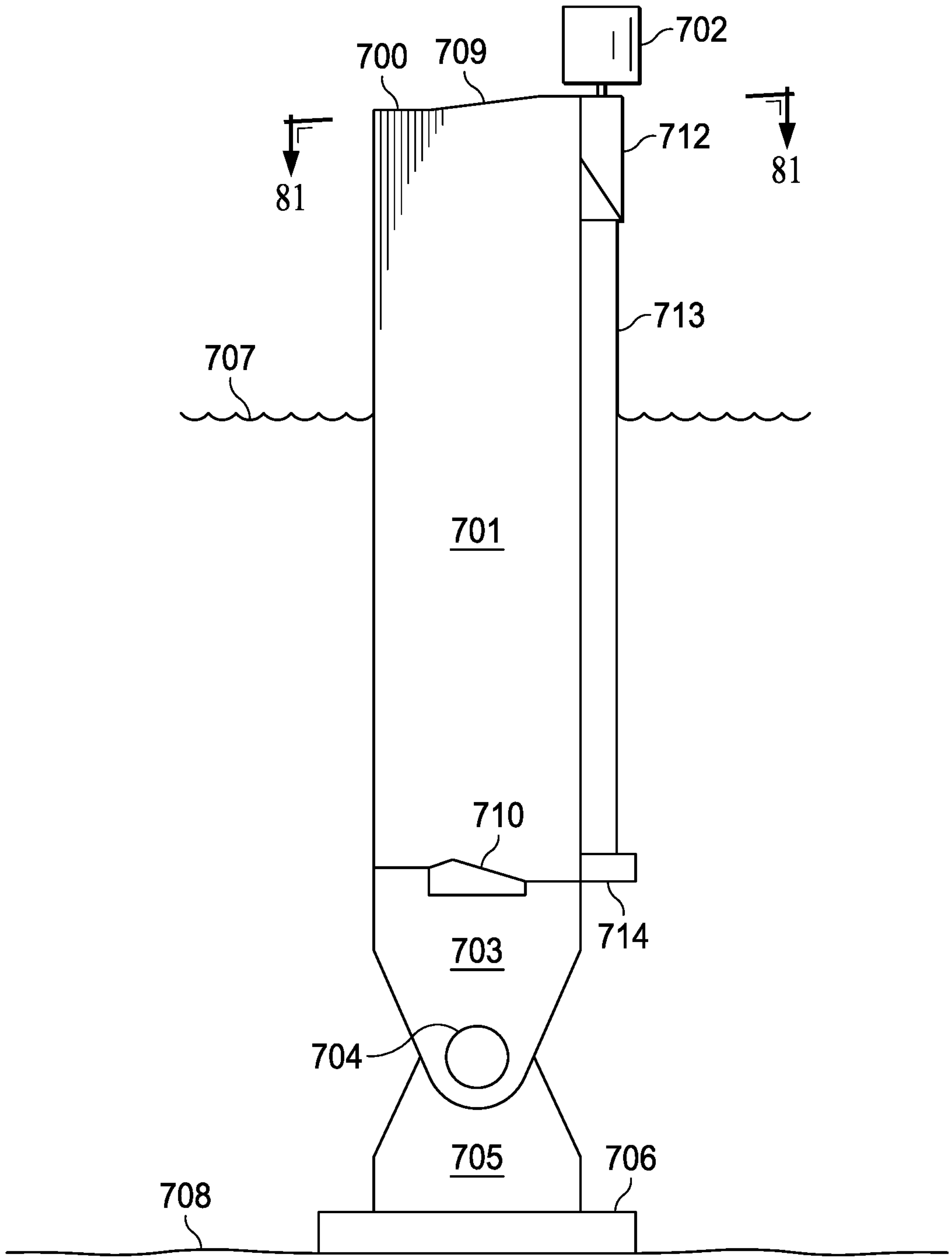
FIG. 74 is a side view of the embodiment of FIG. 72.

FIG. 74 shows a right-side view of the same embodiment 700 of the present disclosure that is illustrated in FIGS. 72 and 73.

At the back of the diode pump enclosure 701 is an upper receiving chamber 712 into which water flows after reaching and being deposited into the upper most reservoir of the diode pump. Water within the upper receiving chamber 712 flows into turbine tube 713 in which a water turbine (not visible) is positioned. Water flows down through the turbine tube 713, and through the water turbine therein, thereby imparting energy to the water turbine and therethrough to the rotatably connected generator 702, thereby generating electrical power. After flowing through the water turbine, water down through the turbine tube 713 flows into the lower receiving chamber 714 and then back into the lower most reservoir of the diode pump.

An embodiment is typically deployed in an orientation that places its hinge axle 704 parallel to the dominant and/or typical wave front, and/or normal to the dominant and/or typical wave direction. In such an orientation, the diode pump will tend to tilt with a maximal amplitude and/or degree and will therefore tend to operate with maximal efficiency, i.e., it will tend to lift water up through the diode at a maximal rate of flow.

Figure 75:
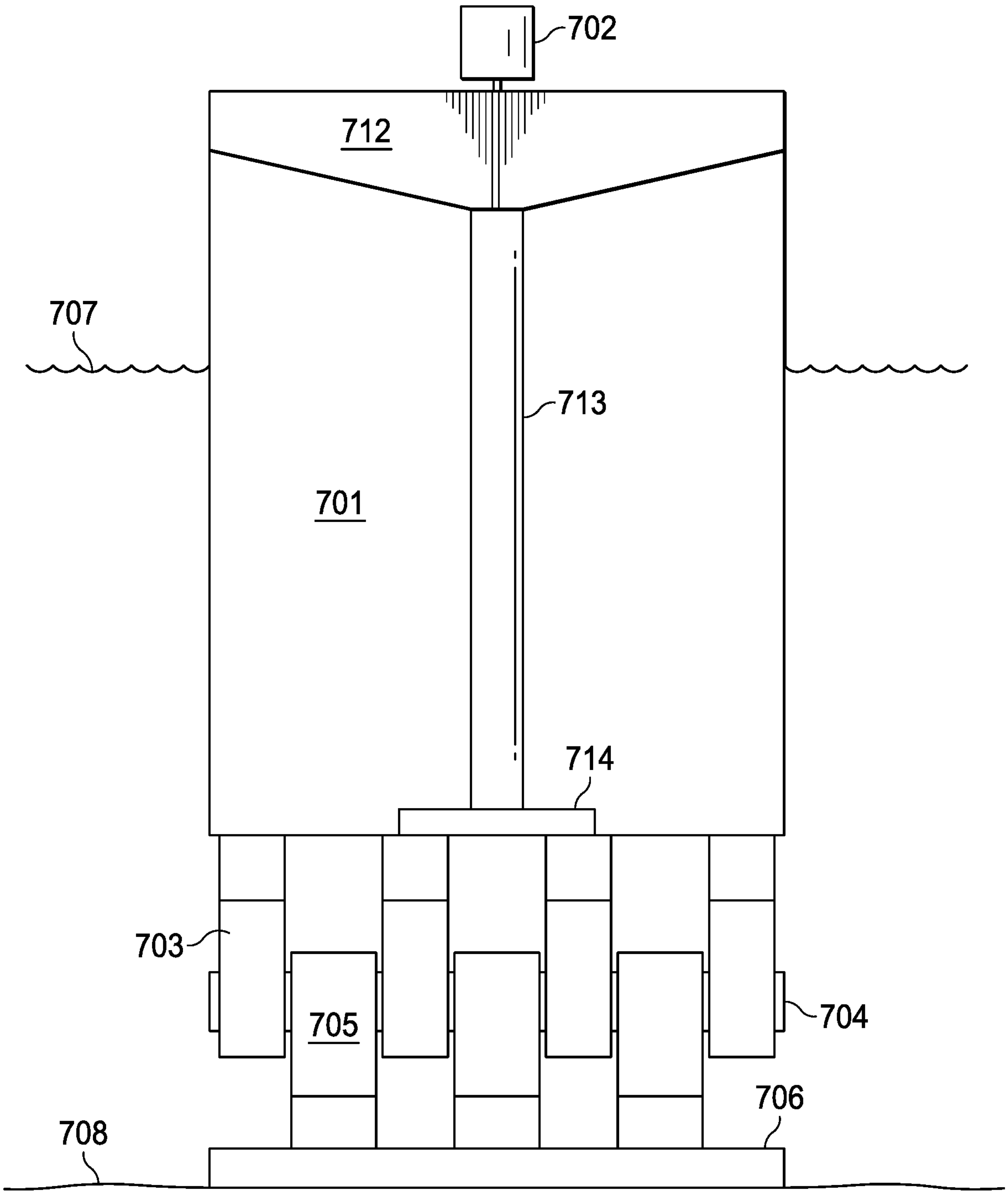
FIG. 75 is a cross sectional view of the embodiment of FIG. 72.

FIG. 75 shows a back-side view of the same embodiment 700 of the present disclosure that is illustrated in FIGS. 72-74.

Figure 76:
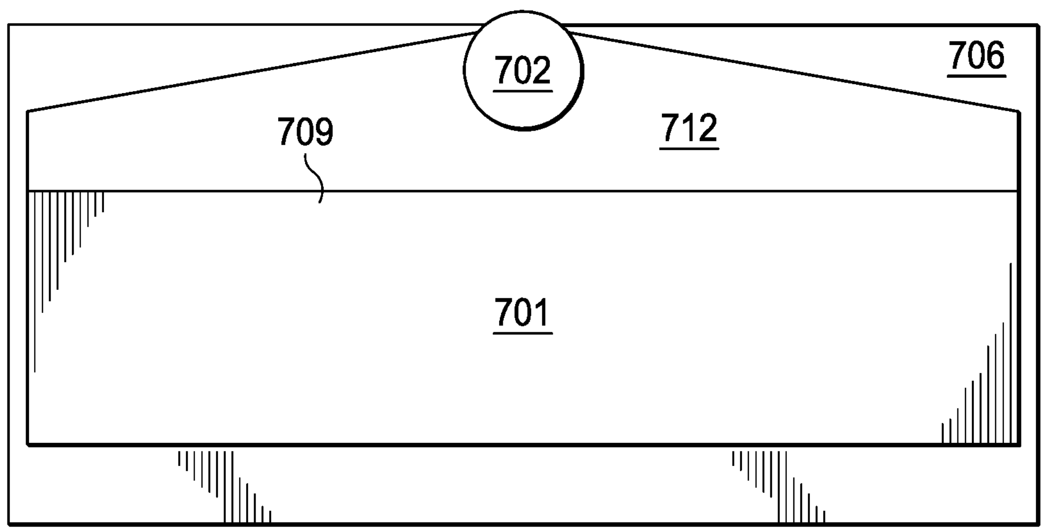
FIG. 76 is a top view of the embodiment of FIG. 72.

FIG. 76 shows a top-down view of the same embodiment 700 of the present disclosure that is illustrated in FIGS. 72-75. The diode pump enclosure 701 has an upper enclosure wall 709.

Figure 77:
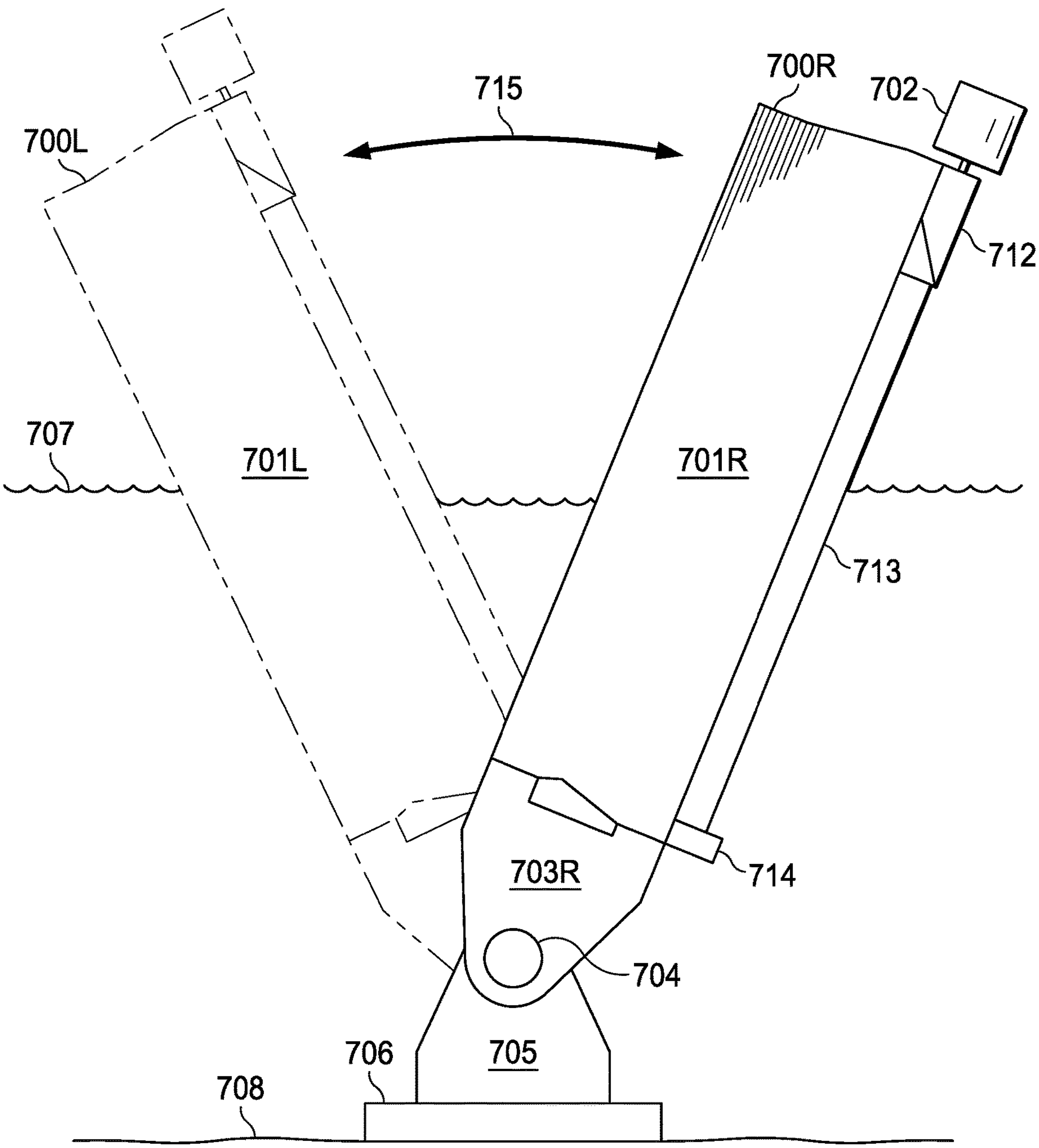
FIG. 77 is a side view, partially in shadow, of the embodiment of FIG. 72.

FIG. 77 shows a side view of the same embodiment 700 of the present disclosure that is illustrated in FIGS. 72-76. In the illustration of FIG. 77, the embodiment's upper portion (i.e., the diode hinge elements, e.g., 703, the pump diode 701, the turbine manifold 712-714, and the generator 702) responds to the passage of a wave across the surface 707 of the body of water in which it is deployed, by swaying, tilting, and/or rotating 715, about its rotational shaft 704 from an initial position and/or orientation at 700L, to a new position and/or orientation at 700R (i.e. the wave is traveling from left to right with respect to the illustration). As it rotates, water within the diode pump 701 flows from a plurality of leftmost reservoirs (not visible), up a plurality of ramps and/or inclined channels (not visible), and into corresponding and/or respective rightmost reservoirs (not visible).

In response to the wave's return stroke (i.e., when the direction of the wave's surge reverses), the embodiment's upper portion will respond by swaying, tilting, and/or rotating 715, about its rotational shaft 704 from an initial position and/or orientation at 700R, to a new position and/or orientation at 700L. And, the water that was lifted as a consequence of its left-to-right flow up the right-ascending ramps of the embodiment's diode pump 701, will be further lifted as a consequence of a right-to-left flow up the left-ascending ramps of the embodiment's diode pump.

With the passage of each wave of sufficient amplitude and period, the water within the embodiment's diode pump will be raised. And, with the passage of each wave of sufficient amplitude and period, a portion of the water within the diode pump will flow into the embodiment's upper receiving chamber 712, and therethrough into the embodiment's turbine tube 713, therein flowing through, and imparting energy to, the water turbine positioned therein.

Figure 78:
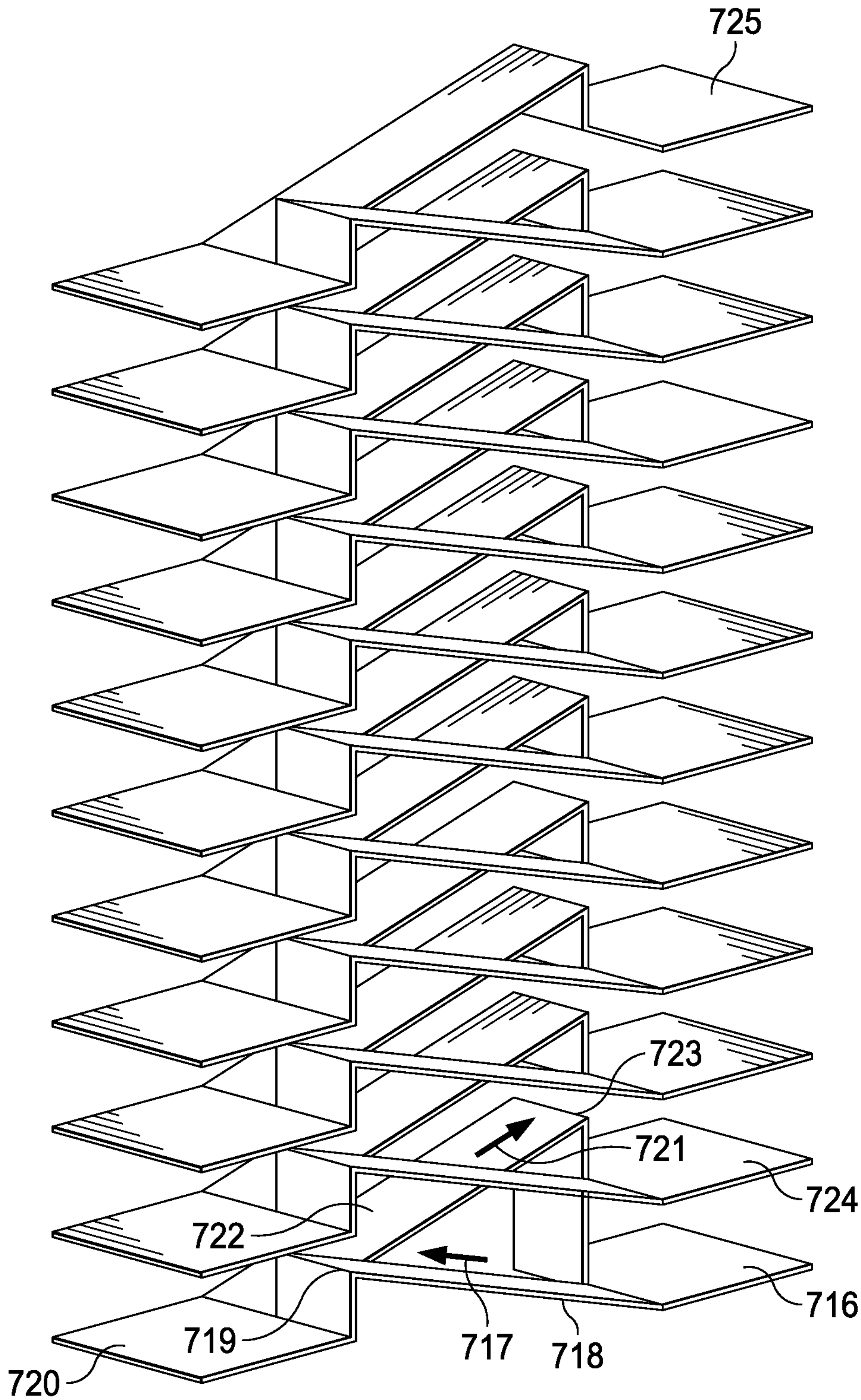
FIG. 78 is an elevated, perspective view of a ramp structure of the embodiment of FIG. 72.

FIG. 78 shows a side perspective view of a representative portion of the type of back-and-forth ramp structure of which the diode pump of the embodiment of the present disclosure that is illustrated in FIGS. 72-77 is comprised.

The actual diode pump of the embodiment illustrated in FIGS. 72-77 is surrounded by an enclosure (701 in FIG. 72) that encloses the water that is contained within the reservoirs of the diode, and that flows up the ramps of the diode in response to wave action. Moreover, vertical walls and/or barriers separate and/or isolate the individual ramps from one another within the actual diode pump. Because of the vertical side walls separating each ramp from its neighbors, and the ramp above, each ramp is a channel and/or pipe through which water may flow from an originating reservoir to a receiving reservoir, wherein the receiving reservoir is at a greater height above, and/or distance from, the lowest reservoir, e.g., 716.

The illustration of FIG. 78 omits the vertical walls that constrain the movement of the water within the embodiment's actual diode pump in order to better illustrate the path followed by water as it flows upward within the diode in response to wave action.

When a wave tilts the diode pump to the left (with respect to the illustration in FIG. 78) by a sufficient degree, amplitude, and/or magnitude, and for a sufficient duration and/or period, then water held within an originating reservoir 716 (which, in the absence of the nominal vertical walls is illustrated as the base, bottom wall, and/or floor, of that reservoir) tends to flow 717 through channel 718 (which, in the absence of the nominal vertical walls is illustrated as the base, bottom wall, and/or floor, of that ramp) and to thereafter fall over the "waterfall edge" 719 at the distal end of the ramp 718, and thereby fall into, and become trapped and/or entrained within receiving reservoir 720.

A "waterfall edge" is an edge of an upper surface of a ramp that is raised relative to an adjacent lower surface, reservoir, chamber, and/or void, such that a fluid flowing from the upper surface of the ramp, and over the waterfall edge, will tend to fall and/or flow downward into the receiving reservoir, and/or onto the lower surface. The waterfall edge at the end of a ramp, e.g., 719, tends to cause water flowing, e.g., 717, toward the end and/or edge of the ramp to "fall over" the ramp's edge 719 and fall into, and become trapped within, a receiving reservoir, e.g., 720.

When a wave, and/or wave surge, with an approximately opposite direction tilts the diode pump to the right (with respect to the illustration in FIG. 78) by a sufficient degree, amplitude, and/or magnitude, and for a sufficient duration and/or period, then the receiving reservoir 720 becomes the originating reservoir, and water held within the new originating reservoir 720 (which, in the absence of the nominal vertical walls is illustrated as the base, bottom wall, and/or floor, of that reservoir) tends to flow 721 through channel 722 (which, in the absence of the nominal vertical walls is illustrated as the base, bottom wall, and/or floor, of that ramp) and to thereafter fall over the "waterfall edge" 723 at the distal end of the ramp 722, and thereby fall into, and become trapped and/or entrained within receiving reservoir 724.

This pattern of tilt-induced water flow from originating reservoirs, e.g., 720, up and through ramps, and/or inclined channels, e.g., 722, over waterfall edges, e.g., 723, and into receiving reservoirs, e.g., 724, is repeated with each wave-induced tilt reversal of sufficient magnitude and period. Water that originates within the lowermost reservoir 716 eventually, incrementally, and progressively, rises from reservoir to reservoir, with each reservoir being positioned at a greater height above, and/or distance from, the lowermost reservoir 716, until it is deposited in an uppermost reservoir 725 after which the water will possess a substantial amount of gravitational potential energy. The raised water, held in the uppermost reservoir 725, may then be directed to flow through a water turbine that converts a portion of its gravitational potential energy into mechanical energy that may be used to energize a generator and generate electrical power. The raised water may be used to create a pressurized flow of water through desalination membranes thereby extracting relatively fresh water from relatively saline water, e.g., from seawater. The raised water may also be used to create a pressurized flow of water through mineral-extraction membranes, mats, and/or other porous structures, thereby extracting minerals from mineral-rich water, e.g., from seawater.

The example diode flow structure illustrated in FIG. 78 is comprised of 11 reservoirs on the left and 12 reservoirs on the right with one ramp and/or inclined channel originating from all but the uppermost reservoir 725 on the right. In the embodiment (700 in FIG. 72), the diode pump (701 in FIG. 72) is comprised of 30 reservoirs on the leading side (the side closest to approaching waves, and/or, with respect to a typical deployment, the side furthest from the shoreline) and 31 reservoirs on the trailing and/or opposite side. Each reservoir of the embodiment 700 spans the full width of the diode pump.

Each reservoir in the sample diode illustrated in FIG. 78 (other than the uppermost reservoir) is the originating reservoir for a single ramp. And, each reservoir in the sample diode illustrated in FIG. 78 (other than the lowermost reservoir) is the receiving reservoir for a single ramp. However, in the embodiment (700 in FIG. 72), each reservoir (other than the uppermost reservoir) is the originating reservoir for 12 ramps. And, each reservoir in the sample diode illustrated in FIG. 78 (other than the lowermost reservoir) is the receiving reservoir for 12 ramps.

Figure 79:
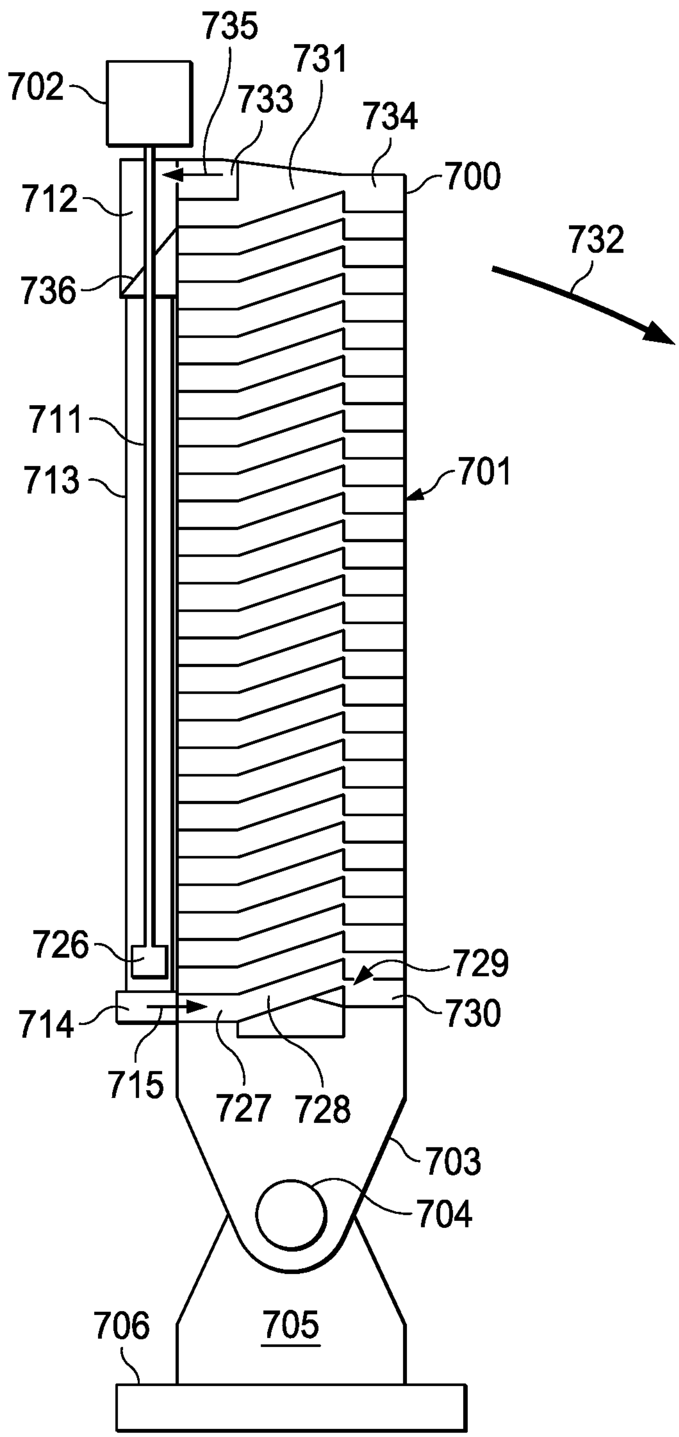
FIG. 79 is a cross sectional view of the ramp structure of FIG. 78.

FIG. 79 shows a side sectional view of the same embodiment 700 of the present disclosure that is illustrated in FIGS. 72-77 wherein the vertical section plane is specified in FIG. 76 and the section is taken across line 79-79.

Effluent from the water turbine 726 enters the lower receiving chamber 714 and then flows 715 into the lowermost reservoir 727 of the diode pump 701. In response to a sufficient and favorable wave-induced tilt of the diode 701, water in the lowermost reservoir 727 of the diode pump tends to flow "up" (which during a sufficient and favorable wave-induced tilt of the diode is actually "down" with respect to gravity) the ramp and/or inclined channel 728, over the waterfall edge 729 of the ramp 728, and down and into receiving reservoir 730.

Because of the vertical wall 731 that separates the reservoirs and ramps visible within the illustration of FIG. 79, the only reservoirs and ramps visible in the figure are those which lift water and/or cause water to flow up a ramp in response to a rightward tilting 732 of the diode 701. With respect to the reservoirs and ramps visible in the illustration of FIG. 79, each reservoir, e.g., 727, on the left side of the diode pump (with the exception of the uppermost reservoir 733) is an originating reservoir, each reservoir, e.g., 730, on the right side of the diode pump is a receiving reservoir, and each ramp is inclined so as to raise water flowing from left to right, i.e. in response to a rightward tilting 732 of the diode 701.

The reservoirs and ramps adjacent to the illustrated vertical assortment of reservoirs and ramps, i.e., the reservoirs and ramps in front of the section plane as well as those behind the vertical wall 731, are of an opposite arrangement. The reservoirs on the left and right are present across the entire width of the diode pump 701. However, the reservoirs and ramps adjacent to the illustrated vertical assortment of reservoirs and ramps differ from those illustrated in FIG. 79 in that with respect to those unseen adjacent reservoirs and ramps (e.g., those visible in FIG. 80), the reservoirs on the left are receiving reservoirs, the reservoirs on the right are originating reservoirs, and the ramps are inclined so as to raise water flowing from right to left, i.e. in response to a leftward tilting of the diode 701.

As a consequence of a series of sufficient and favorable wave-induced tilts of the diode, in alternating left and right directions of tilt, water ascends through the diode pump 701 in the manner explained in relation to the illustration and description associated with FIG. 78. Water deposited into receiving reservoir 734 will, in response to a sufficient and favorable wave-induced tilt of the diode in a leftward direction flow up and into receiving reservoir 733 after which it will tend to flow 735 out and into the upper receiving chamber 712. Slanted peripheral walls, e.g., 736, direct water so deposited into the upper receiving chamber 712 into the upper mouth, end, and/or aperture, of the turbine tube 713 wherein it eventually flows down and through water turbine 726, thereby imparting mechanical and/or rotational power to shaft 711 which is rigidly attached and/or connected to water turbine 726. And, the rotation of shaft 711 causes the operably connected generator 702 to generate electrical power.

After passing through the water turbine, water flowing down and through turbine tube 713 (i.e., the turbine's effluent) flows into the lower receiving chamber 714, and thereafter into the lowermost reservoir 727 of the diode pump 701. And, the cycle repeats . . . .

Figure 80:
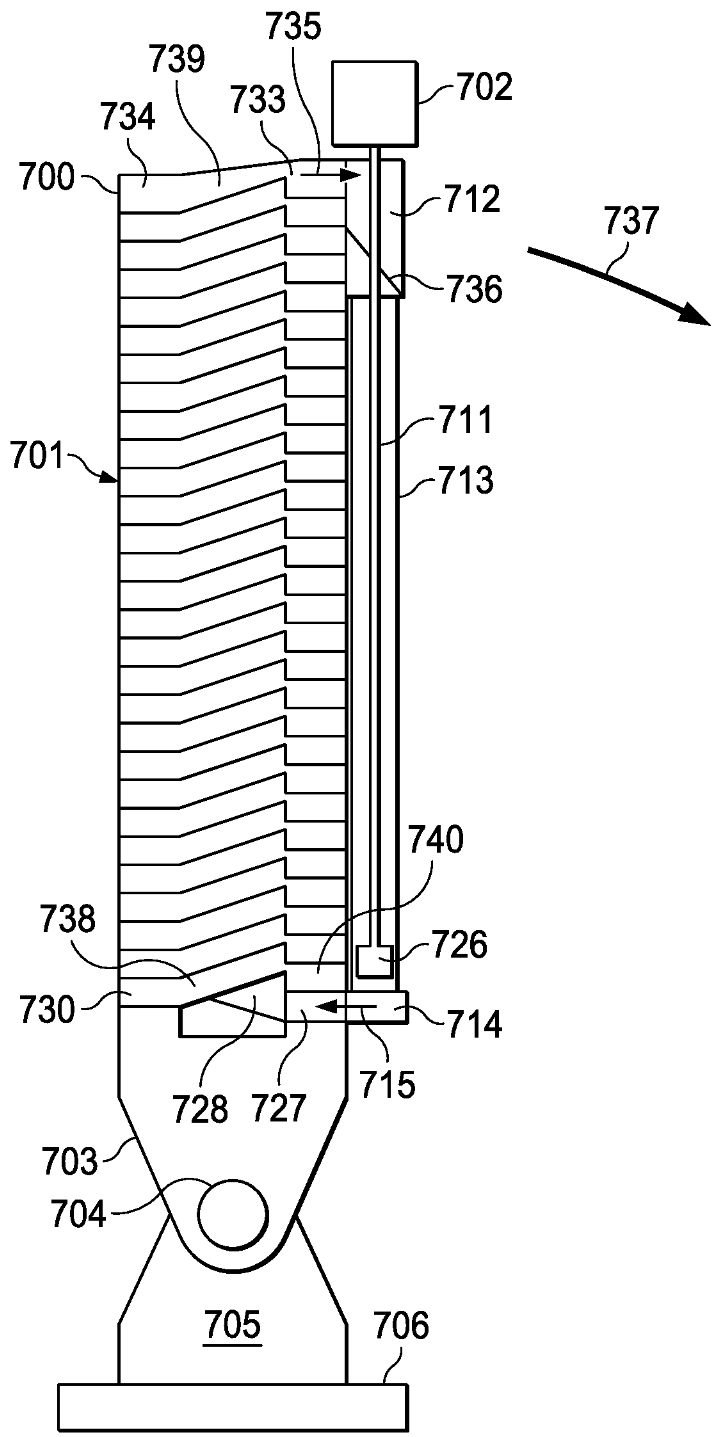
FIG. 80 is another cross sectional view of the ramp structure of FIG. 78.

FIG. 80 shows a side sectional view of the same embodiment 700 of the present disclosure that is illustrated in FIGS. 72-77 and 79 wherein the vertical section plane is specified in FIG. 76 and the section is taken across line 80-80.

The diode pump 701 of the embodiment 700 contains opposing sets of reservoirs that are interconnected by ramps and/or inclined channels. In the embodiment illustrated in FIGS. 72-77 and 79, the ramps and/or channels directly above and/or below one another, i.e., in a vertical segment of the diode, are characterized by a specific, particular, and consistent, angle of inclination. The cross-sectional view illustrated in FIG. 79 illustrates one such vertical diode segment wherein the ramps are characterized by a particular angle of inclination that ascends from the "back" of the diode (i.e., the side nearest the turbine 726) to the "front" (i.e., the side furthest from the diode). The cross-sectional view illustrated in FIG. 80 illustrates another such vertical diode segment wherein the ramps are characterized by a second particular angle of inclination that ascends from the "front" (i.e., the side furthest from the diode) of the diode to the "back" (i.e., the side nearest the turbine 726).

The diode pump 701 of the embodiment is comprised of 12 vertical diode segments in which the ramps are inclined such that they ascend from the "back" of the diode to the "front" (e.g., as illustrated in FIG. 79), and 12 vertical diode segments in which the ramps are inclined such that they ascend from the "front" of the diode to the "back" (e.g., as illustrated in FIG. 80). The back-to-front ascending vertical diode segments are interleaved with the front-to-back vertical diode segments. Each vertical diode segment is separated from its adjacent neighbors by vertical walls (e.g., 731 in FIG. 79).

Whereas water flows from the back of the diode to the front within the vertical diode segment illustrated in FIG. 79 (i.e., when the diode is appropriately tilted, e.g., 732 in FIG. 79), water flows from the front of the diode to the back within the vertical diode segment illustrated in FIG. 80. In the embodiment's diode pump 701, 12 pairs of complementary vertical diode segments (i.e., complementary in that one lifts water in response to tilts in one direction, and the other lifts water in response to tilts in an opposing direction) cooperate to raise water from the embodiment's lowest reservoir 727 to its highest reservoir 733 whereafter the water flows into the embodiment's turbine manifold 712-714 and therein flows through the embodiment's water turbine 726 thereby imparting power to the operably connected generator 702 and causing that generator to produce electrical power.

In response to a wave-induced tilt 737 of the embodiment's diode pump 701, that is of favorable direction and sufficient magnitude and period, water within a leftmost originating reservoir, e.g., 730 and 734, flows across a nominally upwardly-inclined ramp, and/or channel, e.g., 737 and 738, that directs the water to a receiving reservoir, e.g., 733 and 740, that is higher than, and/or further from, the bottom of the embodiment and/or from the ground, e.g., seafloor, on which the embodiment rests and/or is attached. Because of the wave-induced tilt 737 of the embodiment's diode pump 701 the nominally upwardly-inclined ramps, and/or channels, of the illustrated vertical diode segment are, with respect to the pull of gravity, actually downwardly-inclined.

Water flowing from reservoir 734, through channel 739, and into reservoir 733, thereafter flows 735 into the upper receiving chamber 712, and thereafter into the turbine tube 713, through the water turbine 726, into the lower receiving chamber 714, and it then flows 715 back into the bottommost reservoir 727 from which it will again be pumped to the top of the diode and back through the turbine 726 again and again.

Please note that the arrow 732 of FIG. 79 illustrates the pump diode 701 tilting and/or rotating toward its front and/or away from its turbine 726, whereas the arrow 737 of FIG. 80 illustrates the pump diode 701 tilting and/or rotating toward its turbine 726 and/or away from its front.

Figure 81:
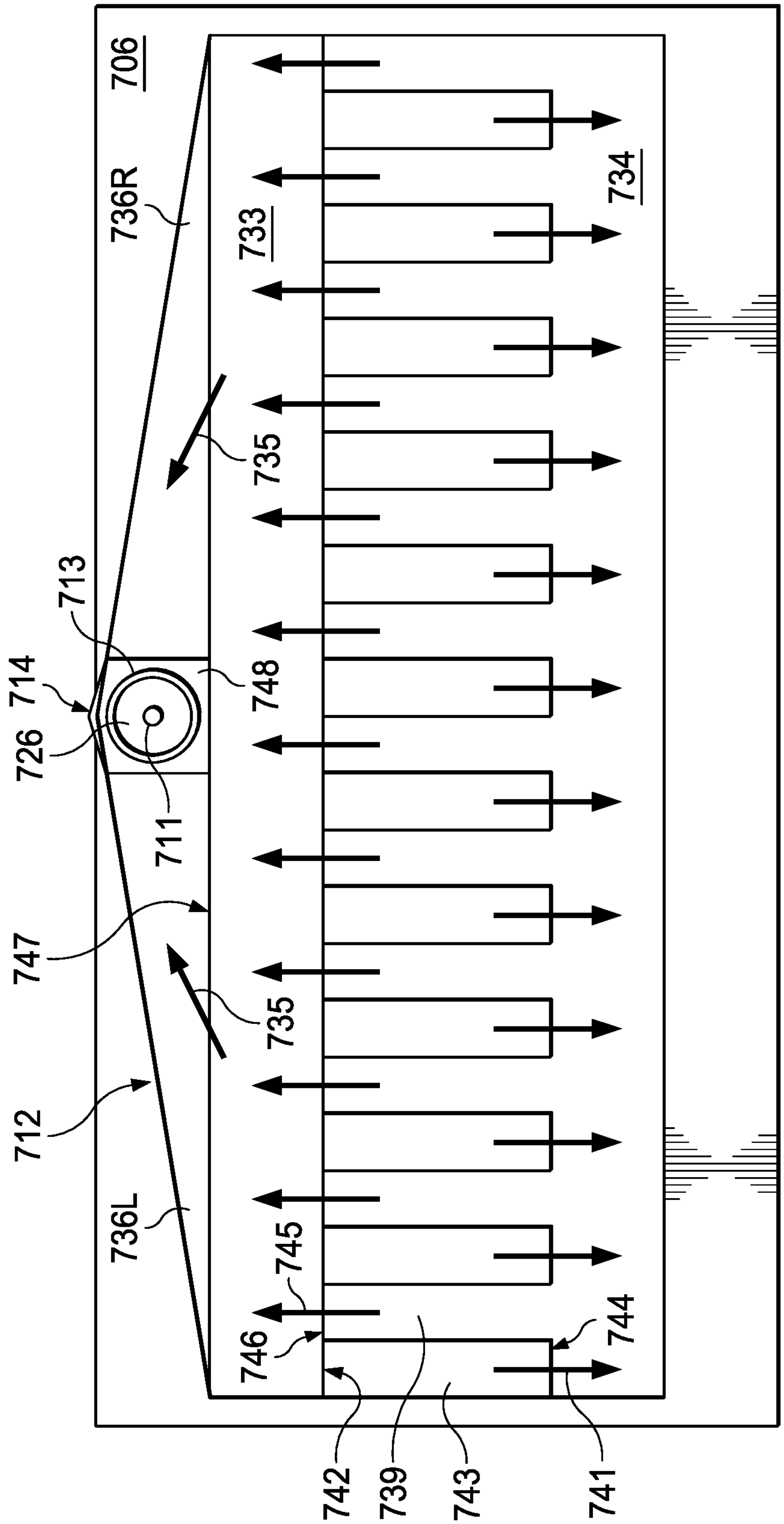
FIG. 81 a top down cross sectional view of the ramp structure of FIG. 78.

FIG. 81 shows a top-down sectional view of the same embodiment 700 of the present disclosure that is illustrated in FIGS. 72-77 and 79-80 wherein the horizontal section plane is specified in FIG. 74 and the section is taken across line 81-81.

In response to a favorable tilt (e.g., 732 in FIG. 79) toward the front of the embodiment's diode pump, i.e., away from the turbine (726 in FIG. 79), water flows, e.g., 741, from the reservoir immediately below, e.g., 742, the uppermost reservoir 733, up one, e.g., 743, of the 12 ramps leading from the reservoir immediately below, e.g., 742, the uppermost reservoir 733 at the back side of the diode pump (701 in FIG. 72), thereafter falling over the respective waterfall edge, e.g., 744, and down and into the uppermost reservoir 734 at the front side of the diode pump.

In response to a favorable tilt (e.g., 737 in FIG. 80) toward the back of the embodiment's diode pump, i.e., toward the turbine (726 in FIG. 80), water deposited into, and/or trapped within, reservoir 734, flows, e.g., 745, up one, e.g., 739, of the 12 ramps leading from the originating reservoir 734, thereafter falling over the respective waterfall edge, e.g., 746, and down and into the uppermost reservoir 733 at the back side of the diode pump. Water deposited into the uppermost reservoir 733 at the back side of the diode pump flows 735 over the backmost edge 747 of the uppermost reservoir 733 and thereover into the upper receiving chamber 712. Much of that water flows down one of the inclined floors 736L and 736R to the bottommost floor 748 of the upper receiving chamber 712 from which it flows into the lumen of the turbine tube 713 and therethrough through the water turbine 726 therein. The effluent flowing out of the water turbine flows into the lower receiving chamber 714 from which it flows into the lowermost reservoir (727 of FIG. 79) of the embodiment's diode pump (701 of FIG. 79).

Figure 82:
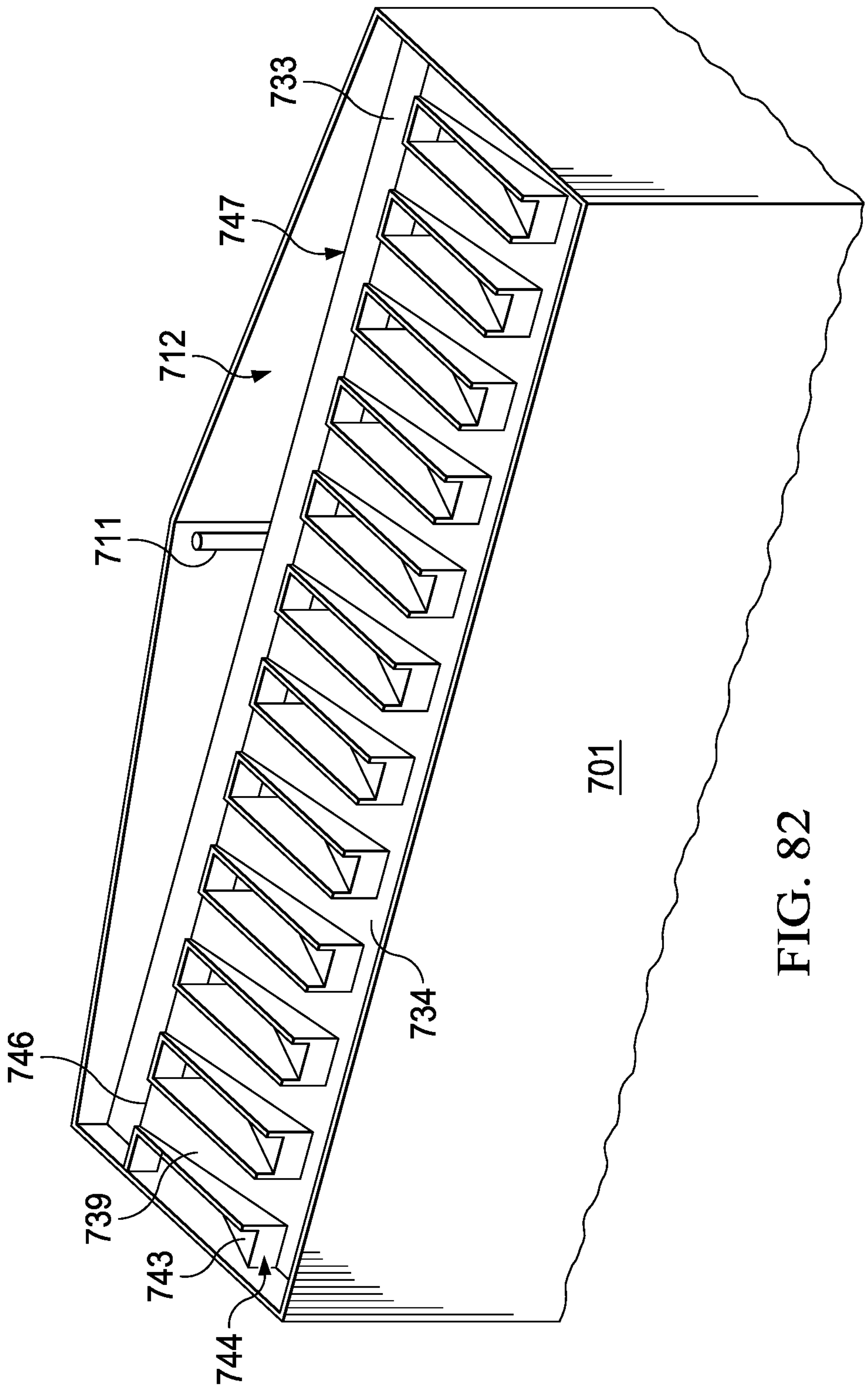
FIG. 82 is perspective view of the cross section of FIG. 81.

FIG. 82 shows a perspective top-down view of the sectional view illustrated in FIG. 81.

Figure 83:
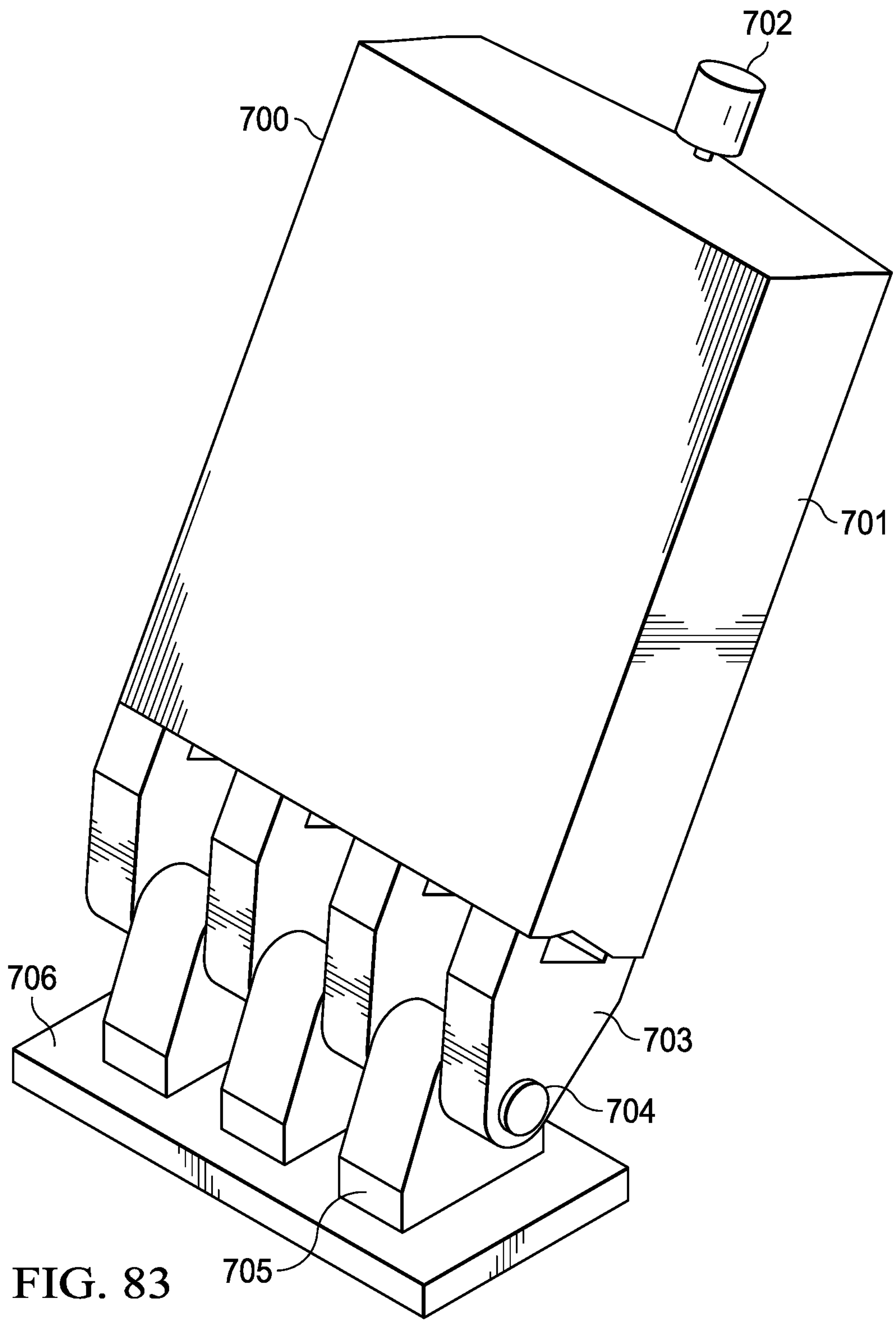
FIG. 83 is an elevated, perspective view of the embodiment of FIG. 78.

FIG. 83 shows a perspective front side view of the same embodiment 700 of the present disclosure that is illustrated in FIGS. 72-77 and 78-82. The tilted orientation of the embodiment is similar to the orientation of the embodiment 700R illustrated on the right side of FIG. 77.

Figure 84:
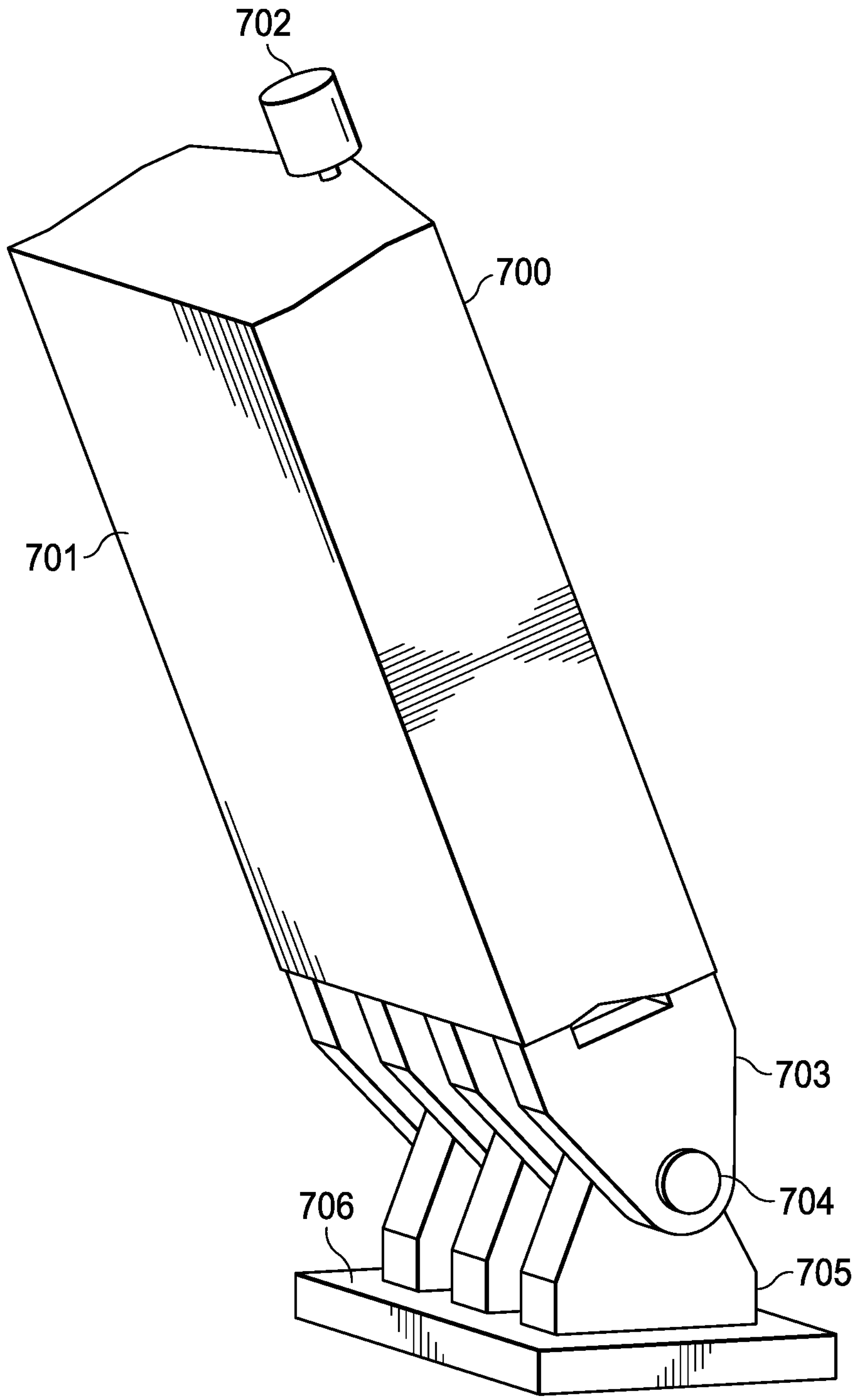
FIG. 84 is another elevated, perspective view of the embodiment of FIG. 78.

FIG. 84 shows a perspective front side view of the same embodiment 700 of the present disclosure that is illustrated in FIGS. 72-77 and 78-83. The tilted orientation of the embodiment is similar to the orientation of the embodiment 700L illustrated on the left side of FIG. 77.

Figure 85:
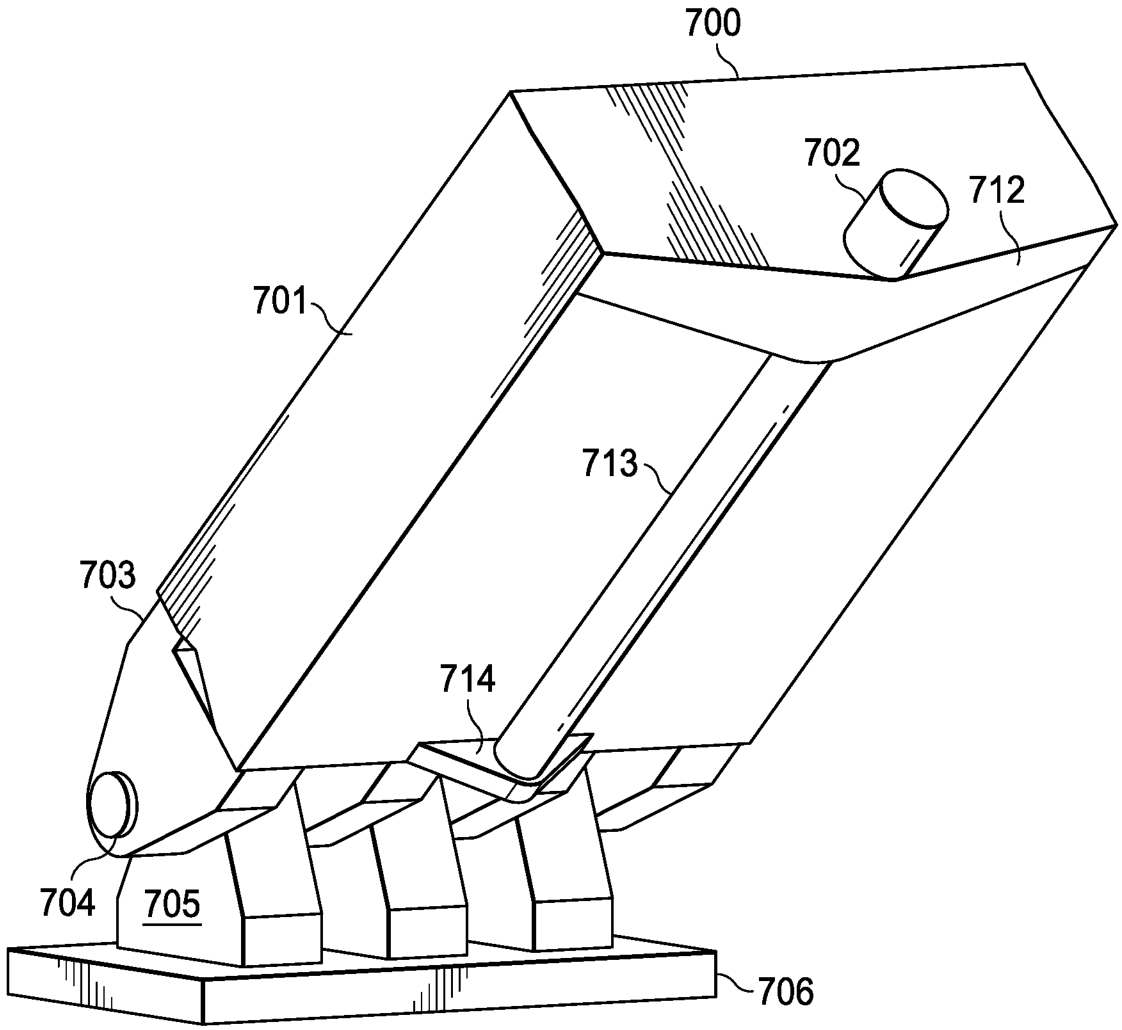
FIG. 85 is another elevated, perspective view of the embodiment of FIG. 78.

FIG. 85 shows a perspective back side view of the same embodiment 700 of the present disclosure that is illustrated in FIGS. 72-77 and 78-84. The tilted orientation of the embodiment is similar to the orientation of the embodiment 700R illustrated on the right side of FIG. 77.

Figure 86:
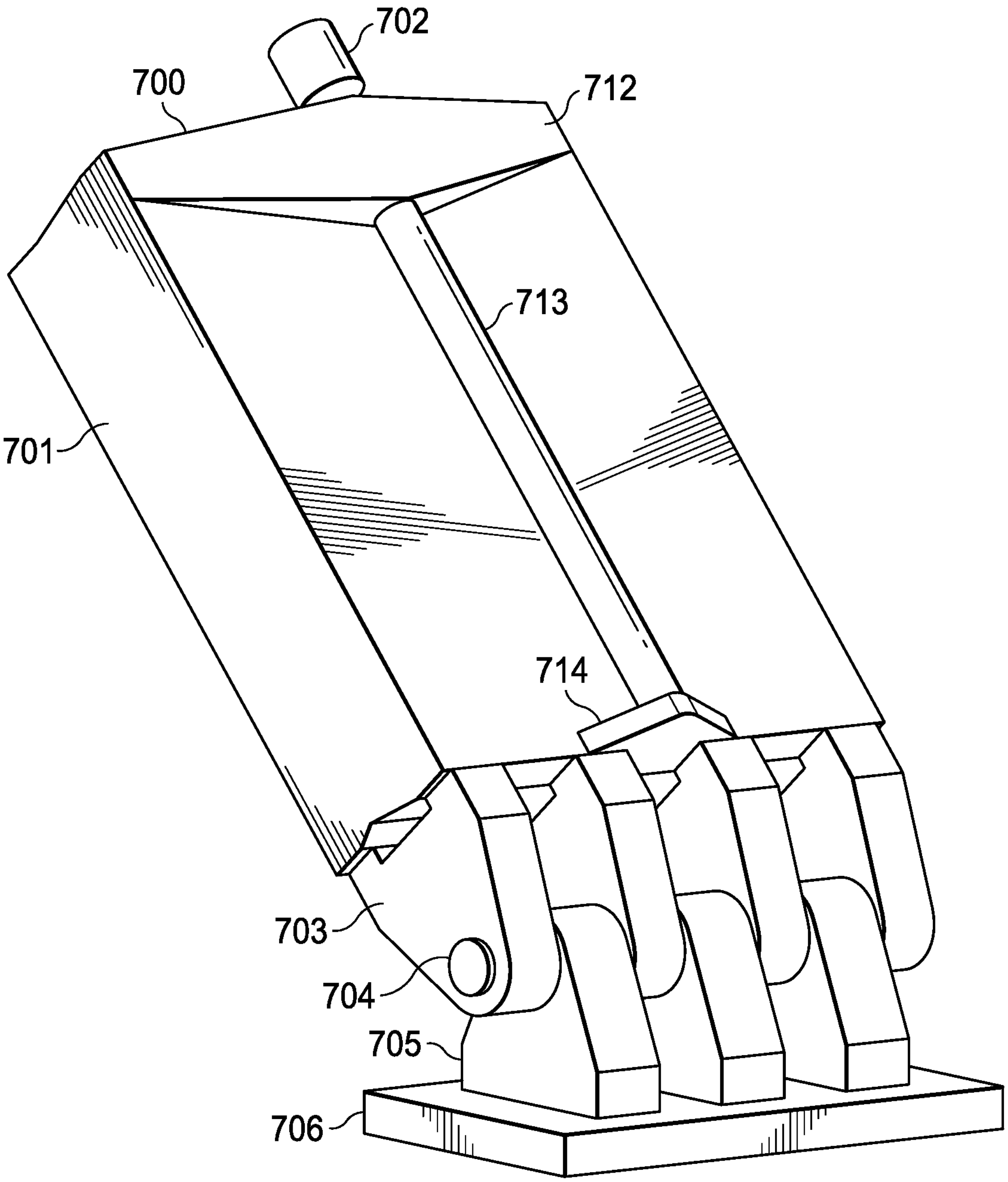
FIG. 86 is another elevated, perspective view of the embodiment of FIG. 78.

FIG. 86 shows a perspective back side view of the same embodiment 700 of the present disclosure that is illustrated in FIGS. 72-77 and 78-85. The tilted orientation of the embodiment is similar to the orientation of the embodiment 700L illustrated on the left side of FIG. 77.

Figure 87:
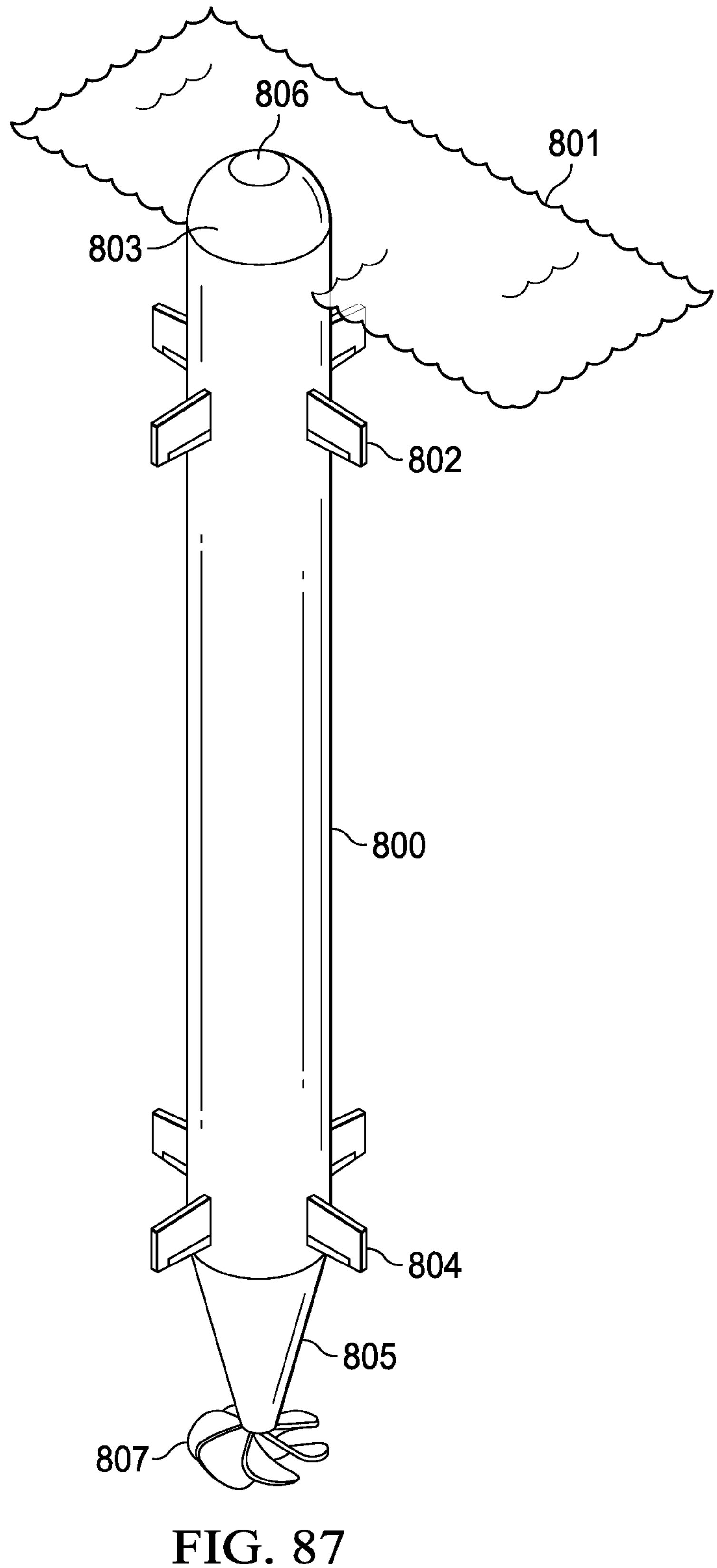
FIG. 87 is an elevated, perspective view of another embodiment of the present invention.

FIG. 87 shows a perspective side view of an embodiment 800 of the present disclosure. The illustrated embodiment is similar to an "autonomous underwater vehicle" (AUV) and is capable of cruising through a body of water below its surface. However, in FIG. 87 the embodiment is shown floating adjacent to an upper surface 801 of a body of water over which waves are passing. The embodiment incorporates, includes, and/or utilizes, four stabilizing and/or directional fins, e.g., 802, at a fore 803, forward, leading, and/or upper end, as well as four stabilizing and/or directional fins, e.g., 804, at an aft 805, stern, trailing, and/or lower end. In combination with a forward or backward thrust, the embodiment's fins, e.g., 802 and 804, enable and/or permit the embodiment to alter, adjust, control, regulate, change, and/or modify, its pitch, yaw, roll, course, direction, and/or movements.

The illustrated embodiment 800 has a hull, shape, form, and/or displacement, that is primarily cylindrical between its upper 803 and lower ends 805. The embodiment has an approximately torpedo-like shape. Mounted atop the upper end 803 is a radio transceiver 806, which in the embodiment illustrated in FIG. 87 is a phased-array antenna. Rotatably connected to its approximately frustoconical trailing end 805 is a propeller 807, the rotation of which tends to generate either a forward-pushing or backward-pulling thrust (depending on the direction in which the propeller is rotated).

The embodiment illustrated in FIG. 87 is floating, with an approximately vertical orientation, adjacent to an upper surface 801 of a body of water over which waves are passing and is thereby utilizing the rocking motions (e.g., surge) imparted to it by passing waves in order to energize a tilt-driven water ladder power take off (not visible) positioned within the cylindrical portion 800 of its hull.

Figure 88:
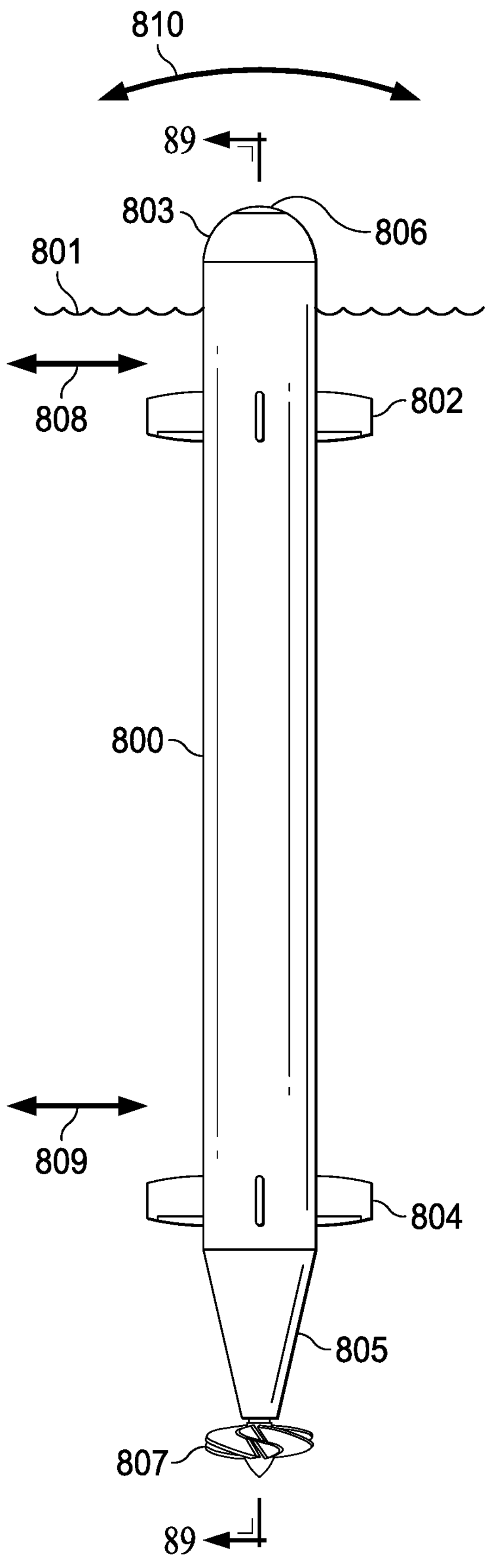
FIG. 88 is a side view of the embodiment of FIG. 87.

FIG. 88 shows a side view of the same embodiment 800 of the present disclosure that is illustrated in FIG. 87. As the embodiment 800 floats adjacent to an upper surface 801 of a body of water over which waves pass, the relatively substantial surge motion 808 near the surface 801 is greater than the relatively diminished, smaller, and/or more feeble, surge motion 809 further and/or far beneath the surface 801. This differential surge motion imparted to the embodiment tends to cause the embodiment to rock 810 back-and-forth approximately laterally and approximately within the plane of the surge and/or within a plane approximately normal to the wave front.

Figure 89:
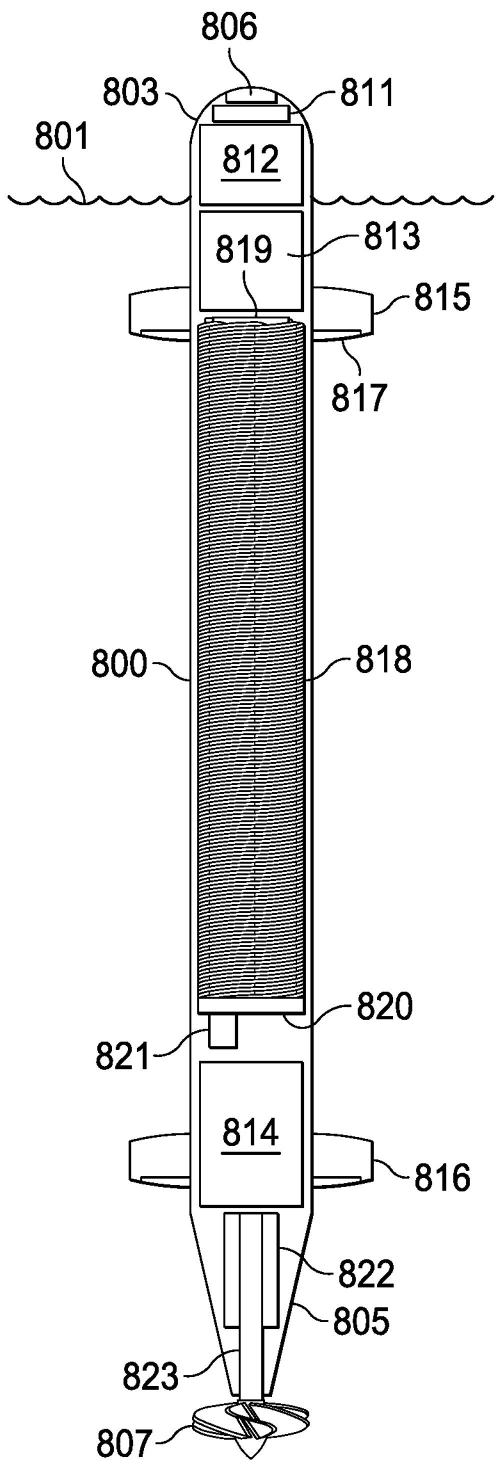
FIG. 89 is a cross sectional view of the embodiment of 87.

FIG. 89 shows a side sectional view of the same embodiment of the present disclosure that is illustrated in FIGS. 87 and 88 wherein the vertical section plane is specified in FIG. 88 and the section is taken across line 89-89. The sectional view of FIG. 89 has left two components (power take off 818, propeller shaft 823, and propeller 807) unsectioned to facilitate explanation of the structure and operation of the embodiment.

At an upper end 803 of the embodiment 800 is a phased-array antenna 806 which receives encoded electromagnetic signals from one or more remote antennas (e.g., such as from ships, satellites, and shore-based facilities), and which transmits to one or more remote antennas (e.g., such as to ships, satellites, and shore-based facilities) at one or more particular and/or specific frequencies encoded electromagnetic signals. Signals received by the phased array antenna are decoded and/or otherwise processed by the embodiment's control system 811. Signals transmitted are encoded and/or otherwise prepared by the embodiment's control system 811.

The embodiment 800 includes a computational module 812 which incorporates, includes, and/or utilizes, a plurality of computational circuits including, but not limited to: computer processing units (CPUs), graphics processing units (GPUs), application-specific integrated circuits (ASICs), tensor processing units (TPUs), quantum processing units (QPUs), and optical processing units. The computational module also incorporates, includes, and/or utilizes, a plurality of memory circuits, a plurality of power management circuits, a plurality of network circuits, encryption/decryption circuits, etc., in addition to other circuits useful for the execution, completion, and/or implementation, of computational tasks, and for the gathering, sorting, compression, and/or storage, of computational results. The computational module includes electronic circuits, optical circuits, and other types of circuits. Heat generated by the activity, energization, and/or operation, of the electronic and/or optical circuits is transmitted, at least in part, conductively to the body of water 801 in which the embodiment floats and/or operates.

The embodiment 800 includes a pair of buoyancy control and trim adjustment modules 813 and 814 with which the embodiment's control system 812 may alter the overall density of the embodiment as well as the distribution of buoyancy within the embodiment.

The embodiment 800 incorporates, includes, and/or utilizes, fixed-wing fins, e.g., 815 and 816, which incorporate, include, and/or utilize, flaps, e.g., 817, to alter, adjust, control, regulate, change, and/or modify, its pitch, yaw, roll, course, direction, and/or movements, when the embodiment is being propelled forward or backward in response to thrust produced by the propeller 807.

A portion of the embodiment's interior is occupied by a power take off 818. The power take off progressively, incrementally, and/or serially, lifts water about and/or within a spiral hollow tube, and/or series of fluidly connected tubes, in response to tilting (810 in FIG. 88), tipping, rocking, and/or pivoting, of the embodiment within a vertical plane (e.g., normal to the resting surface 801 of the body of water in which the embodiment floats) passing through, and/or including, a central longitudinal axis of approximate radial symmetry of the embodiment. In response to such tilting, water within the spiral tube is moved from a relatively lower end of a tubular segment (i.e., an end relatively closer to the lower end 805 of the embodiment) to a relatively higher end of a tubular segment (i.e., an end relatively closer to the upper end 803 of the embodiment). With every tilt of sufficient angular deflection away from vertical (i.e., away from normal to the resting surface 801 of the water over which waves pass), water will tend to move from one relatively lower tubular segment to another relatively higher tubular segment.

When water has reached an upper end of the spiral tubular water channel 818, it passes into an upper reservoir chamber 819 proximate to that upper end. Water within the upper reservoir chamber flows downward under the influence of gravity and/or with respect to a head pressure. Water within the upper reservoir chamber flows into a turbine pipe (not visible) and therethrough flows into a lower reservoir chamber, the bottom of which is established by a lower reservoir pan 820, and the lateral walls of which are established by the spiral tubular water channel.

Water flowing downward through the turbine pipe (not visible) flows through, causes to rotate, and/or energizes, a water turbine (not visible) positioned therein. Rotations of the water turbine and its rigidly connected turbine shaft (not visible) impart rotational kinetic energy to an operably connected generator 821, thereby causing the generator to produce electrical power. At least a portion of the electrical power produced by the generator is stored within an energy storage module comprising a plurality of batteries (not visible).

When activated by the embodiment's control system 811 and energized by the embodiment's energy storage module (not visible), an electrical motor 822 causes the propeller 807 and its connected propeller shaft 823 to rotate. The embodiment's control system 811 is able to cause the motor to rotate the propeller 807 in a direction that causes the propeller to push the embodiment in a forward direction, i.e., toward its upper end 803, as well as in a direction that causes the propeller to pull the embodiment in a backward direction, i.e., away from its upper end 803.

Figure 90:
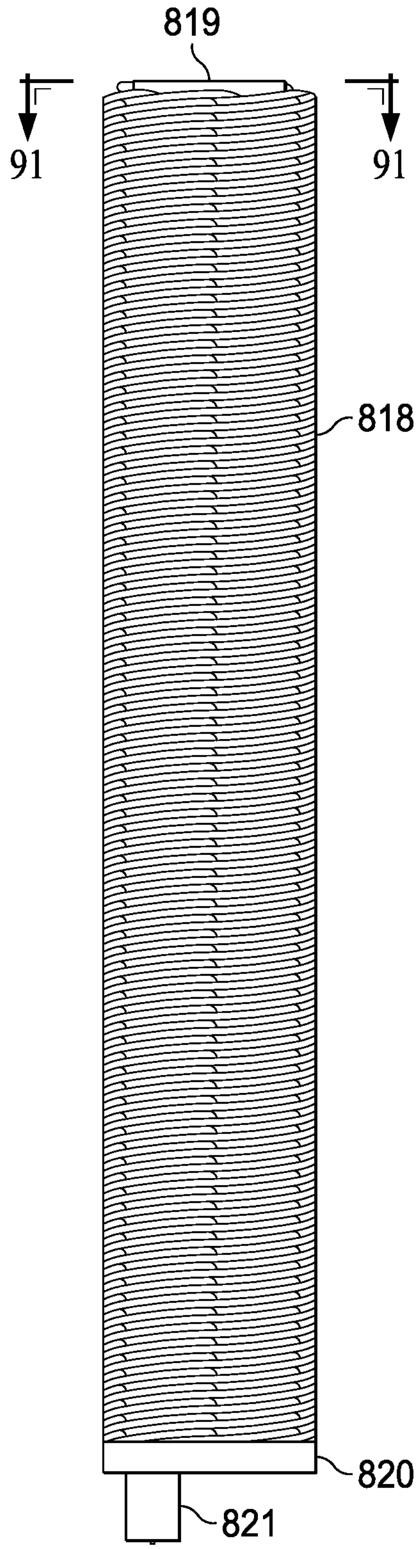
FIG. 90 is an enlarged, cross sectional view of the embodiment of FIG. 87.

FIG. 90 shows a side view of the power take off (PTO) of the same embodiment of the present disclosure that is illustrated in FIGS. 87-89.

An outer spiral tubular water channel 818 is comprised of fluidly-connected tubular segments through which water flows in a counter-clockwise direction (when viewed from above the upper end of the PTO proximal to the PTO's upper reservoir chamber 819). The outer spiral tubular water channel 818 surrounds an inner spiral tubular water channel (not visible) in which water flows in a clockwise direction (when viewed from above the upper end of the PTO proximal to the PTO's upper reservoir chamber 819).

In response to wave-induced tilting of the PTO relative to a nominally vertical longitudinal axis of approximate radial symmetry water in the outer spiral tubular water channel 818 moves incrementally through, around, and upward, within that channel in a counter-clockwise direction. In response to the same wave-induced tilting of the PTO relative to a nominally vertical longitudinal axis of approximate radial symmetry water in the inner spiral tubular water channel (not visible) moves incrementally through, around, and upward, within that channel in a clockwise direction.

Water trapped within the lower reservoir chamber (not visible) defined in part by the lower reservoir pan 820 enters a lowermost portion of each of the inner and outer spiral tubular water channels. Water enters each of the inner and outer spiral tubular water channels through a respective aperture in a respective channel-specific lowermost tubular segment. After passing through the respective lowermost tubular segment of each of the inner and outer spiral tubular water channels, water remains trapped within each of the inner and outer spiral tubular water channels as wave-induced tilting of the PTO incrementally causes that water to flow through, around, and upward, within each respective channel.

At the summit of each spiral flow of water, within each respective inner and outer spiral tubular water channel, the water within each channel is deposited within and/or into the upper reservoir chamber 819 through a channel-specific aperture in the uppermost tubular segment of each of the inner and outer spiral tubular water channels. Thus, water from the lower reservoir chamber enters each of the inner and outer spiral tubular water channels through a respective aperture at the base of each channel, and winds it way in respective clockwise and counter-clockwise directions through those respective spiral tubular water channels, after which the water from each channel is deposited into the upper reservoir chamber 819. Water within the upper reservoir chamber then flows, under gravitationally-induced head pressure, through a turbine pipe (not visible), and a water turbine (not visible) therein, which imparts rotational kinetic energy to a generator 821 operably-connected to the generator, thereby causing the generator to produce electrical power.

The PTO is a closed system. In other words, the water flowing upward within the inner and outer spiral tubular water channels, the water within the upper and lower reservoir chambers, and the water that flows through the turbine pipe to the water turbine, is the same water flowing cyclically through the PTO, over and over again. Because the PTO is a closed system, the gas within the PTO is trapped therein and neither flows out of the PTO, flows into the PTO, nor is exchanged with gases outside the PTO.

Figure 91:
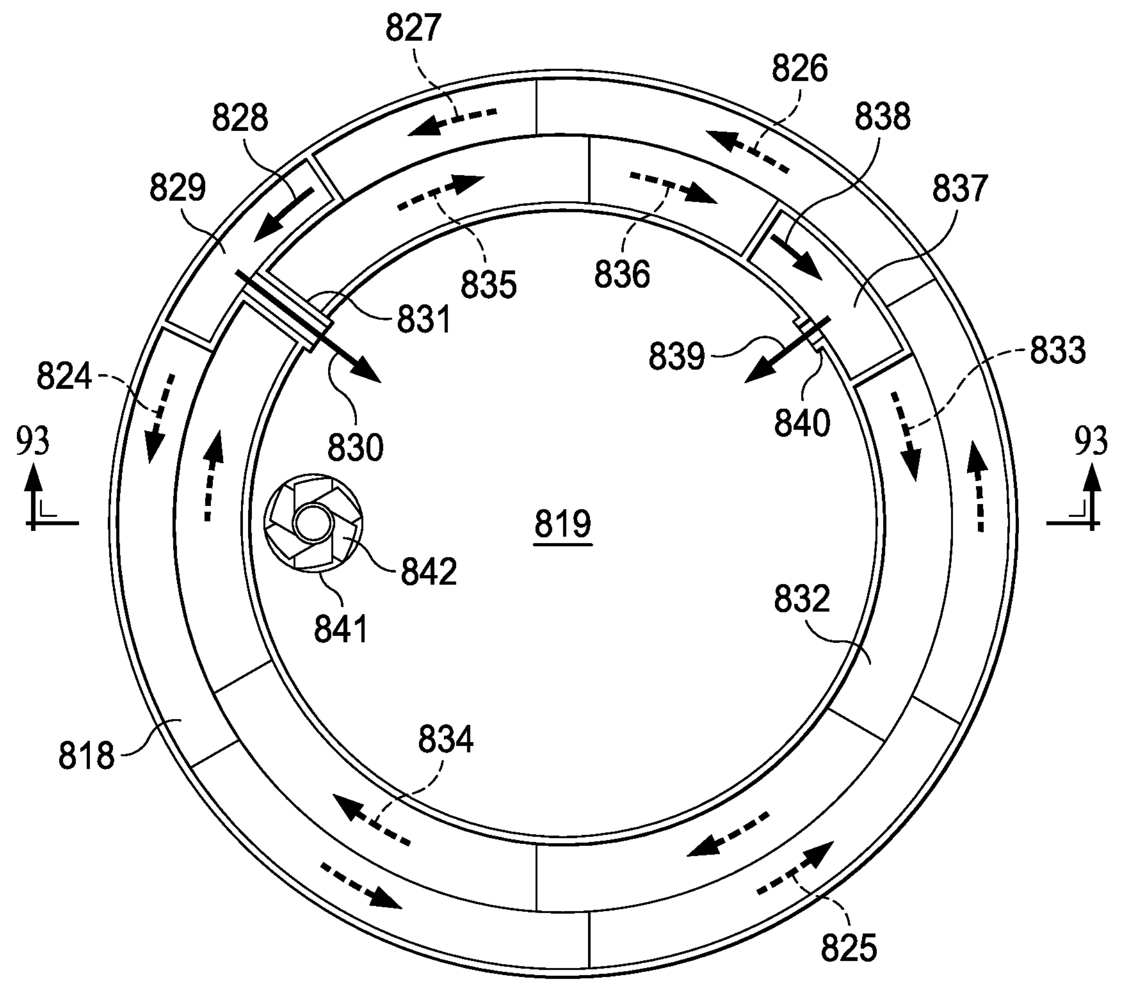
FIG. 91 is a cross sectional view of the embodiment of FIG. 87.

FIG. 91 shows a top-down sectional view of the power take off (PTO) of the same embodiment of the present disclosure that is illustrated in FIGS. 87-89, and/or of the same PTO illustrated in FIG. 90, wherein the horizontal section plane is specified in FIG. 90 and the section is taken across line 91-91.

In response to wave-induced tilting and/or rocking of the embodiment, when it floats in an approximately vertical orientation adjacent to an upper surface of a body of water over which waves pass, water flows in a counter-clockwise direction (when viewed from above its uppermost end as in the illustration of FIG. 91) through the outer spiral tubular water channel 818. After flowing up through most of the outer spiral tubular water channel, water flows 824 into and through the uppermost portion of the outer spiral tubular water channel. That water continues to flow from tubular segment to tubular segment, flowing 825 and 826 around the uppermost portion of the channel. Finally, the water flows 827 into the final, uppermost tubular segment 829, and that flow 828 becomes exposed beneath the section plane. Water that reaches the final, uppermost tubular segment then flows 830 out through outer spiral tubular water channel effluent pipe 831 and is deposited within the upper reservoir chamber 819.

Arrows shown in gray indicate flows of water within a portion of the respective spiral tubular water channel that is enclosed and/or below the section plane. Arrows shown in black indicated flows of water within a portion of the respective spiral tubular water channel that is exposed due to the section plane passing below its upper channel wall.

Similarly, in response to the same wave-induced tilting and/or rocking of the embodiment, when it floats in an approximately vertical orientation adjacent to an upper surface of a body of water over which waves pass, water flows in a clockwise direction (when viewed from above its uppermost end as in the illustration of FIG. 91) through the inner spiral tubular water channel 832. After flowing up through most of the inner spiral tubular water channel, water flows 833 into and through the uppermost portion of the inner spiral tubular water channel. That water continues to flow from tubular segment to tubular segment, flowing 834 and 835 around the uppermost portion of the channel. Finally, the water flows 836 into the final, uppermost tubular segment 837, and that flow 838 becomes exposed beneath the section plane. Water that reaches the final, uppermost tubular segment then flows 839 out through inner spiral tubular water channel effluent pipe 840 and is deposited within the upper reservoir chamber 819.

When the embodiment, and the illustrated embodiment PTO, floats in an approximately vertical orientation adjacent to an upper surface of a body of water over which waves pass, water within the upper reservoir chamber 819 is elevated relative to the lower reservoir chamber (not visible) and as such is imbued with a gravitationally-induced head pressure that tends to cause it to flow into turbine pipe 841, which is fluidly-connected to the turbine pipe. As water flows down, toward the lower reservoir chamber (not visible), it flows through, engages, energizes, and causes to rotate, a water turbine 842 positioned therein. Rotations of the water turbine impart rotational kinetic energy to a generator (821 in FIG. 90) through a turbine shaft (not visible), thereby causing the generator to produce electrical power.

Figure 92:
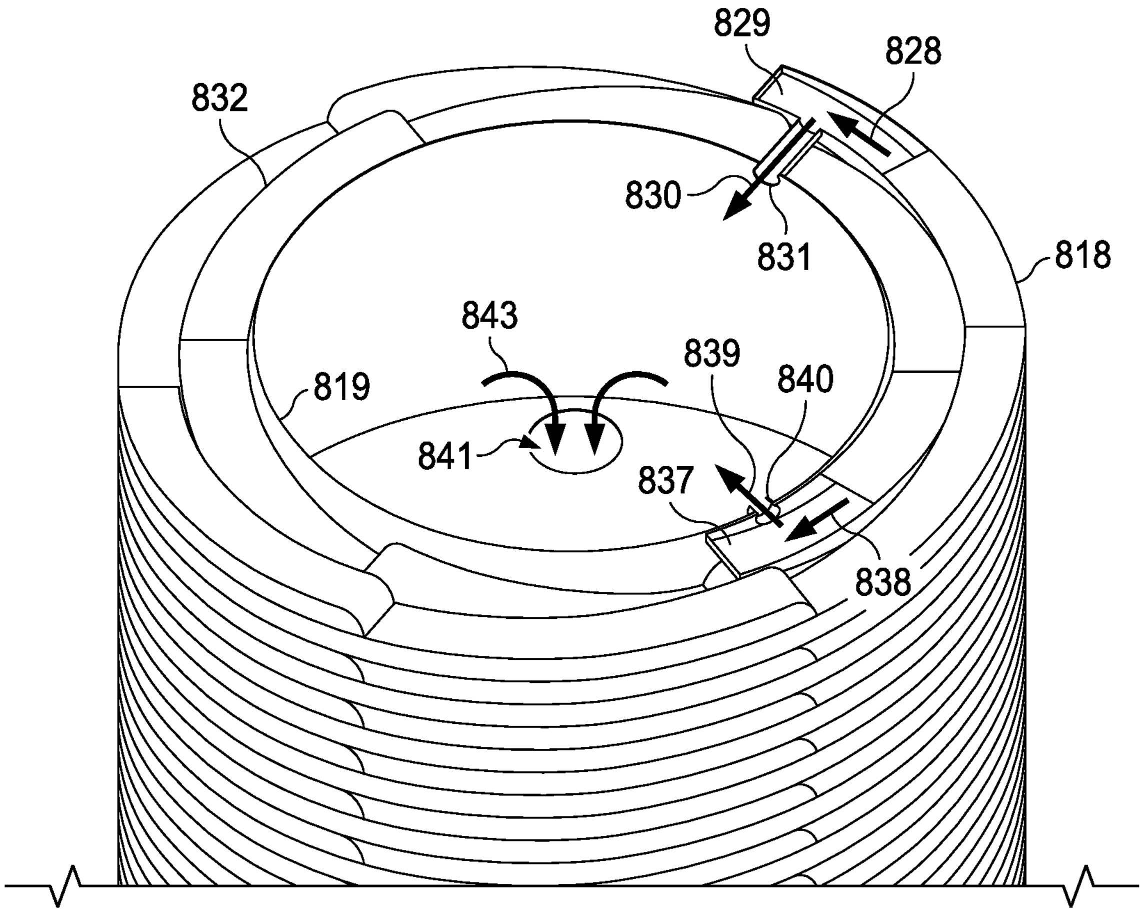
FIG. 92 is an enlarged, perspective sectional view of the embodiment of FIG. 87.

FIG. 92 shows a closeup perspective view of the same top-down sectional view of the power take off (PTO) illustrated in FIG. 90, which is a view of the PTO of the same embodiment of the present disclosure that is illustrated in FIGS. 87-89. The vertical section plane of FIGS. 91 and 92 is specified in FIG. 90 and the section is taken across line 91-91.

As water moves upward and through the outer spiral tubular water channel 818 it reaches, and/or flows 828 into, the final tubular segment 829 of that water channel, after which it flows 830 through outer spiral tubular water channel effluent pipe 831 into the upper reservoir chamber 819. Similarly, as water moves upward and through the inner spiral tubular water channel 832 it reaches, and/or flows 838 into, the final tubular segment 837 of that water channel, after which it flows 839 through inner spiral tubular water channel effluent pipe 840 into the upper reservoir chamber 819.

Water within the upper reservoir chamber 819 flows 843, under the influence of gravity, into the turbine pipe 841, and therethrough flows through the water turbine (not visible) imparting to it energy.

Figure 93:
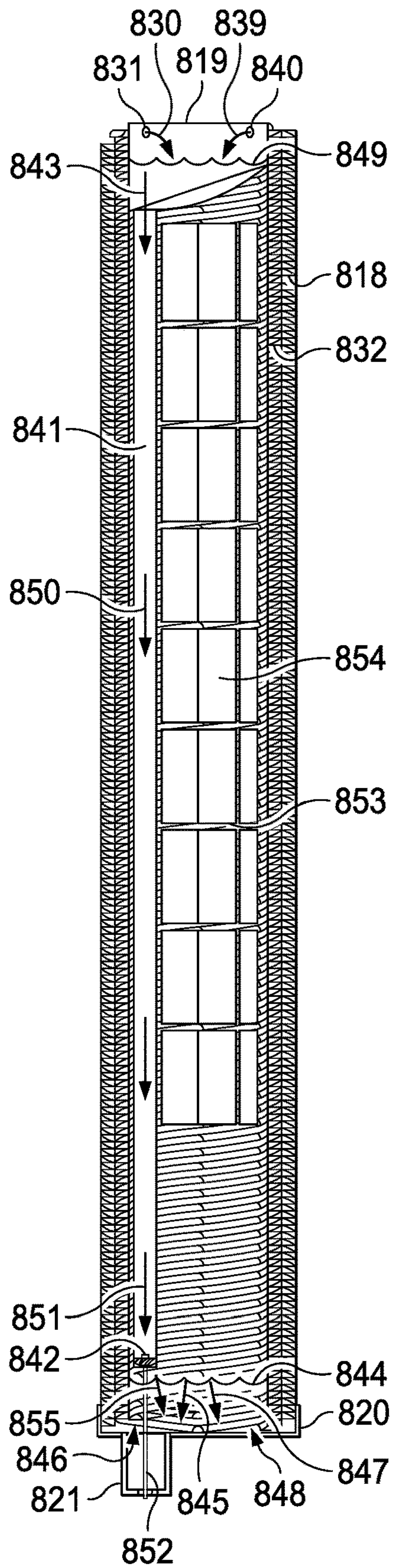
FIG. 93 is a side cross sectional view of the embodiment of FIG. 87.

FIG. 93 shows a side sectional view of the power take off (PTO) of the same embodiment of the present disclosure that is illustrated in FIGS. 87-89, and/or of the same PTO illustrated in FIGS. 90-92, wherein the vertical section plane is specified in FIG. 91 and the section is taken across line 93-93.

Water 844 trapped in the PTO's lower reservoir chamber, comprised of lateral walls formed by the inside surface of the inner and/or centermost surface and/or wall of the inner spiral tubular water channel 832, and the bottom wall formed by the lower reservoir pan 820, is drawn into the lowermost portions of the inner 832 and outer 818 spiral tubular water channels. Water 844 from the lower reservoir chamber flows 845 into the lowermost tubular segment 846 of the outer spiral tubular water channel 818 through an aperture (not visible) within that lowermost tubular segment. Water 844 from the lower reservoir chamber flows 847 into the lowermost tubular segment 848 of the inner spiral tubular water channel 832 through an aperture (not visible) within that lowermost tubular segment.

In response to wave-induced rocking of the embodiment, and of the PTO therein, relative to a nominally vertical longitudinal axis of approximate radial symmetry water in both the inner 832 and outer 818 spiral tubular water channels moves incrementally through, around, and upward, within each channel, eventually reaching the uppermost tubular segment of each spiral tubular water channel and thereafter flowing into the upper reservoir chamber 819 and increasing the mass and/or volume of water 849 therein. Water flows 830 and 839 into the upper reservoir chamber from the respective effluent pipes 831 and 840 of the respective inner and outer spiral tubular water channels.

Water 849 within the upper reservoir chamber 819 flows 843 into the turbine pipe 841, after which it flows 850 down through that pipe until it flows 851 into and through the water turbine 842, thereby transmitting rotational kinetic energy to its respective turbine shaft 852, which, in turn, transmits that energy to the operably-connected generator 821, thereby causing the generator to produce electrical power. A portion, if not all, of the electrical power produced by the generator 821 is transmitted to the energy storage module 853 and/or to the batteries, e.g., 854, therein.

Water flowing 855 out of the water turbine, and/or the turbine pipe 841, enters the pool of water collected within the lower reservoir chamber 844, and thereafter is drawn into one of the inner 832 or outer 818 spiral tubular water channels . . . to repeat the cycle of wave-induced flow and energy production.

Figure 94:
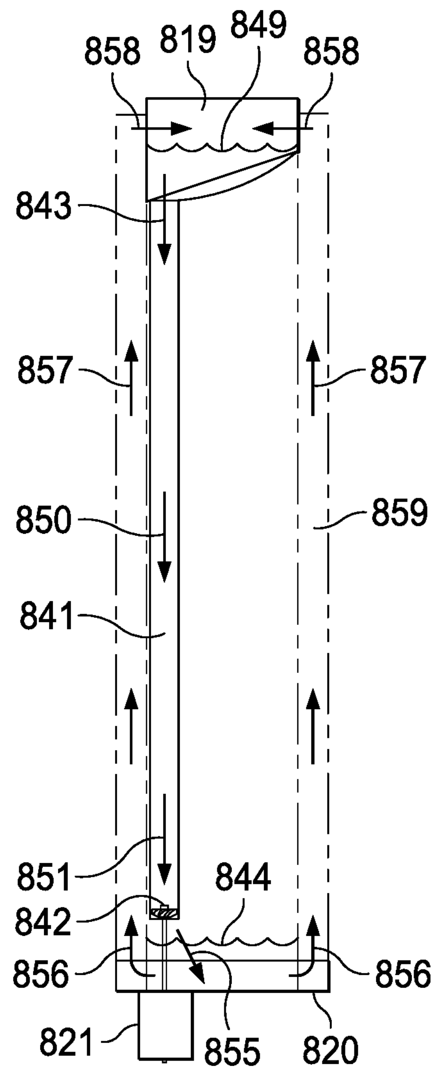
FIG. 94 is a side schematic view of the sectional view of FIG. 93.

FIG. 94 shows an abstracted, stylized, and/or schematized, version of the side sectional view of the power take off (PTO) that is illustrated in FIG. 93. The purpose of FIG. 94 is to better illustrate the cyclic process of using wave-induced motions of the PTO to lift water from a lower reservoir chamber 844 up to an upper reservoir chamber 819 from where its gravitational potential energy and head pressure are used to rotate a water turbine 842 and energize an operably-connected generator 821 so as to produce electrical power from the energy imparted to the PTO by the passing waves.

Water 844 within a lower reservoir chamber is drawn 856 into the lowermost ends of a pair of counter-rotating spiral tubular water channels, with the pair of channels representing in FIG. 94 as a dashed outline 859 of a cylindrical cross-section. Wave motion causes the water within the spiral tubular water channels to flow 857 upward through those water channels. And, at the uppermost ends of the counter-rotating spiral tubular water channels, the water flows 858 out of the water channels and into an upper reservoir chamber 819 where it is added to water 849 already entrained therein.

Water 849 within the upper reservoir chamber 819 flows 843 into and down 850 through the turbine pipe 841, eventually flowing 851 into the water turbine 842 positioned within the turbine pipe and causing that water turbine to rotate. Rotations of the water turbine are transmitted by a turbine shaft (852 in FIG. 93) to an operably-connected generator 821 thereby causing the generator to produce electrical power. After being discharged by the water turbine, the effluent water flows 855 back into the lower reservoir chamber, rejoining the body of water 844 from which it was originally drawn into the spiral tubular water channels.

Figure 95:
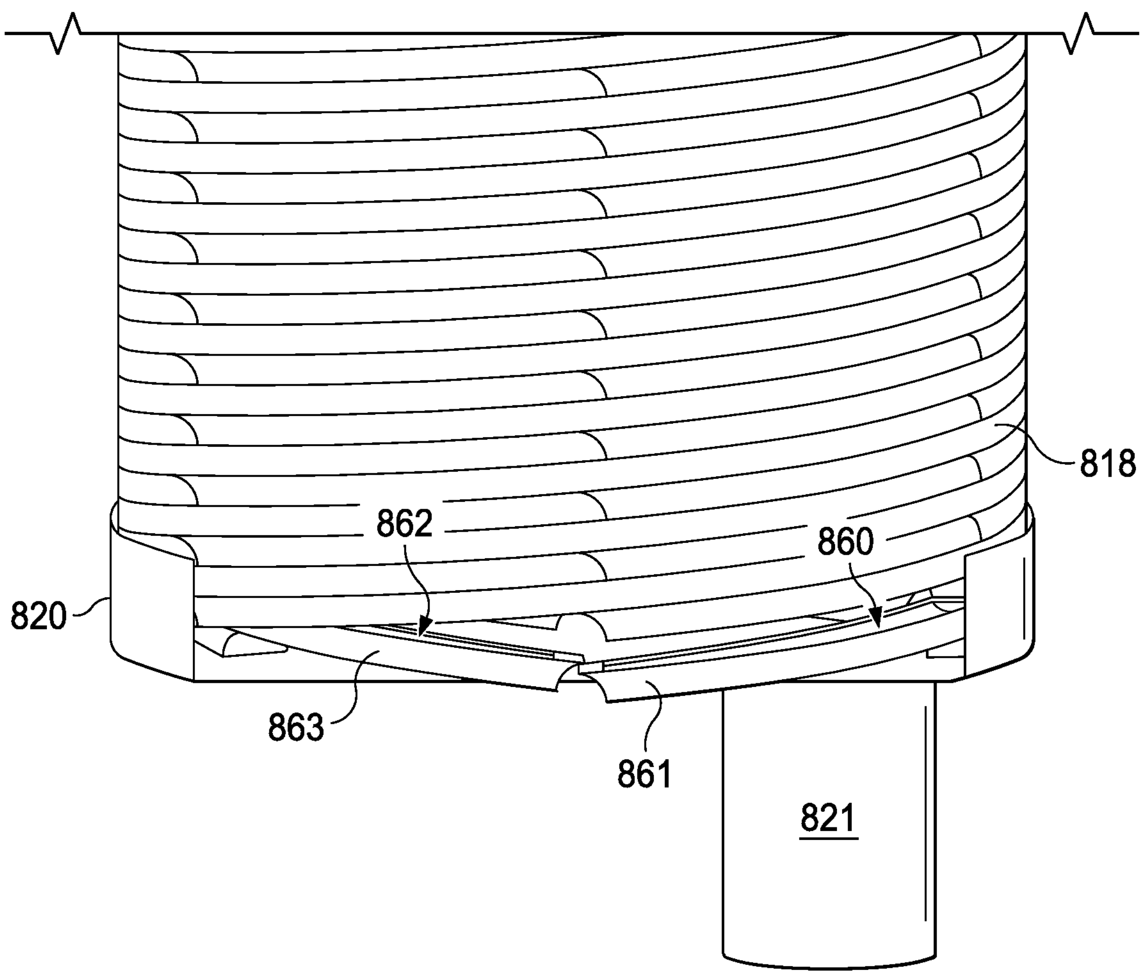
FIG. 95 is an enlarged, perspective view of the embodiment of FIG. 87.

FIG. 95 shows a closeup perspective sectional view of a lowermost portion and/or end of the power take off (PTO) illustrated in FIGS. 90-94, and of the embodiment illustrated in FIGS. 87-89. The illustration in FIG. 95 has a portion of the lower reservoir pan 820 cut away in order to permit the display and/or inspection of the spiral tubular water channels otherwise obscured by that pan.

Water collected within the lower reservoir chamber (844 in FIG. 93) enters the outer spiral tubular water channel 818 through an aperture 860 in the lowermost tubular segment 861 of that water channel. Water collected within the lower reservoir chamber (844 in FIG. 93) enters the inner spiral tubular water channel 832 through an aperture 862 in the lowermost tubular segment 863 of that water channel.

Figure 96:
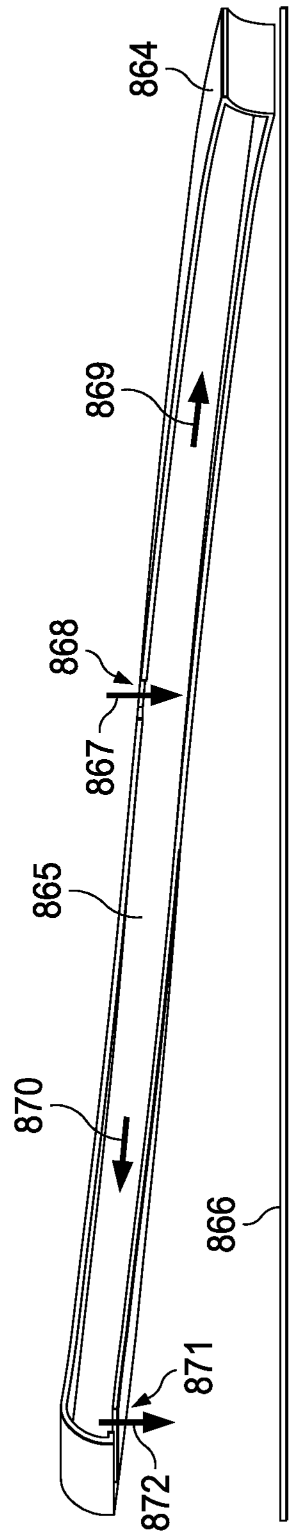
FIG. 96 is an enlarged, cross sectional view of the embodiment of FIG. 87.

FIG. 96 shows a closeup perspective sectional view of a typical tubular segment of which the inner (832 in FIGS. 91-93) and outer (818 in FIGS. 91-93) spiral tubular water channels of the power take off (PTO) illustrated in FIGS. 90-94, the PTO of the embodiment illustrated in FIGS. 87-89, is in part comprised. The inner wall (i.e., the vertical wall closest to the radial center about which the tubular segment bends) of the illustrated tubular segment 864 has been removed to permit examination and/or illustration of the interior of the channel 865 therein.

The illustrated tubular segment is a nominal tubular segment. The lowermost and uppermost tubular segments of each of the inner and outer spiral tubular water channels are different from the tubular segments between those lowermost and uppermost tubular segments, as they are from the medial tubular segment 864 illustrated in FIG. 96.

The tubular segment 864 defines a channel 865 that follows an upward spiraling path about a vertical longitudinal axis of rotation. The collection, set, and/or group, of interconnected tubular segments of which each spiraling tubular water channel is comprised approximately define the surface a cylinder. A reference line 866 is included in FIG. 96 to help illustrate the upward slope and curvature of the illustrated tubular segment.

When water flows through one of the embodiment's spiral tubular water channels, it tends to flow through each of the tubular segments of which that spiral tubular water channel is comprised as it incrementally flows through the upward spiraling water channel. When water flows through a tubular segment, water flows 867 into, and/or enters, the tubular segment through a medial aperture 868 in an upper wall of the tubular segment. Water flowing and/or entrained within the interior channel 865 of the tubular segment can flow 869 backward (i.e., in a direction of flow opposite that of the flow through the respective spiral tubular water channel) and/or accumulate at the back end (i.e., the rightmost end with respect to the orientation of the tubular segment illustrated in FIG. 96) of the tubular segment.

However, when the tilt angle of the PTO, and/or the embodiment in which the PTO is incorporated, is advantageous, e.g., resulting in a change in the orientation of the tubular segment 864 in which the back end becomes elevated to a relatively greater height than the nominally higher forward end, then water within the interior channel 865 of the tubular segment tends to flow 870 toward the forward end (i.e., "forward" with respect to the nominal direction of water flow through the spiral tubular water channel) of the tubular segment. If the water within the tubular segment flows far enough, then it reaches a forward aperture 871 and flows down and out of that aperture, nominally into and through the medial aperture 868 of the next tubular segment in the spiral tubular water channel, and/or of which the spiral tubular water channel is comprised. Similarly, it is water that has flowed to and out of the forward aperture 871 of the prior tubular segment in the spiral tubular water channel that flows 867 into the illustrated tubular segment.

The illustrated tubular segment 864 tends to keep water trapped within that tubular segment when the orientation, tilt, rocking, and/or angular offset from vertical, of the PTO and/or the respective embodiment are unfavorable. This prevents water within a spiral tubular water channel from flowing backward within the spiral tubular water channel when the orientation, tilt, rocking, and/or angular offset from vertical, of the PTO and/or the respective embodiment is not favorable. However, when the orientation, tilt, rocking, and/or angular offset from vertical, of the PTO and/or the respective embodiment becomes favorable, then the water within each tubular segment tends to flow 870 forward, thereby increasing its distance above the lower reservoir chamber and the water turbine.

Each wave-powered lifting of water within each of the embodiment's two spiral tubular water channels tends to increase the gravitational potential energy of the water within the spiral tubular water channel, and because the back flowing of that water is inhibited if not prevented, the potential energy imparted to the water is captured.

Figure 97:
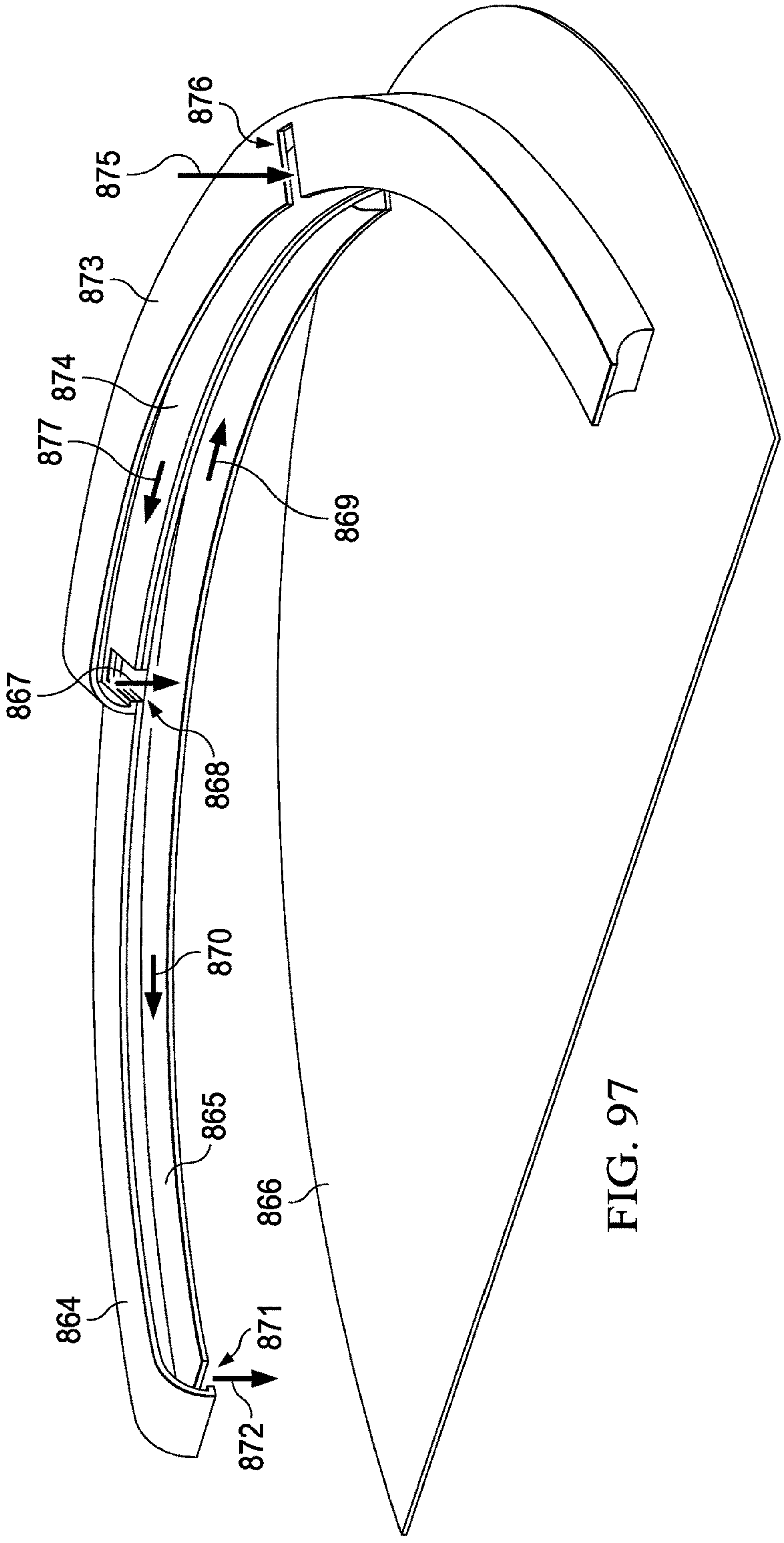
FIG. 97 is an elevated, perspective view of the section of FIG. 96.

FIG. 97 shows a closeup perspective sectional view of two typical tubular segments of which the inner (832 in FIGS. 91-93) and outer (818 in FIGS. 91-93) spiral tubular water channels of the power take off (PTO) illustrated in FIGS. 90-94, the PTO of the embodiment illustrated in FIGS. 87-89, are in part comprised. The inner wall (i.e., the vertical wall closest to the radial center about which the tubular segments bend) of the illustrated tubular segments 864 and 873 have been removed to permit examination and/or illustration of the interiors of the channels 865 and 874 therein. The illustration in FIG. 97 adds a precursor tubular segment 873 to the tubular segment 864 illustrated in FIG. 96.

A reference plane 866 is included in FIG. 97 to help illustrate the upward slope and curvature of the illustrated pair of fluidly-connected tubular segments 873 and 864.

Water flows 875 in to the hollow interior 874 of tubular segment 873 through that tubular segment's medial aperture 876. In response to favorable tilting of the array of tubular segments, i.e., of the respective spiral tubular water channel of the respective PTO, water within the interior water channel 874 of tubular segment 873 flows 877 forward within the tubular segment, reaching and flowing 867 down through that tubular segment's forward aperture, which is also the medial aperture 868 of tubular segment 864. Thus, the water within tubular segment 873 flows 867 into tubular segment 864, and, in response to favorable tilting of the array of tubular segments, flows 870 forward to that tubular segment's forward aperture 871, and then flows 872 down and through that forward aperture, nominally into the interior of the next tubular segment within the fluidly connected series, and/or chain, of such tubular segments of which the respective spiral tubular water channel is comprised.

Figure 98:
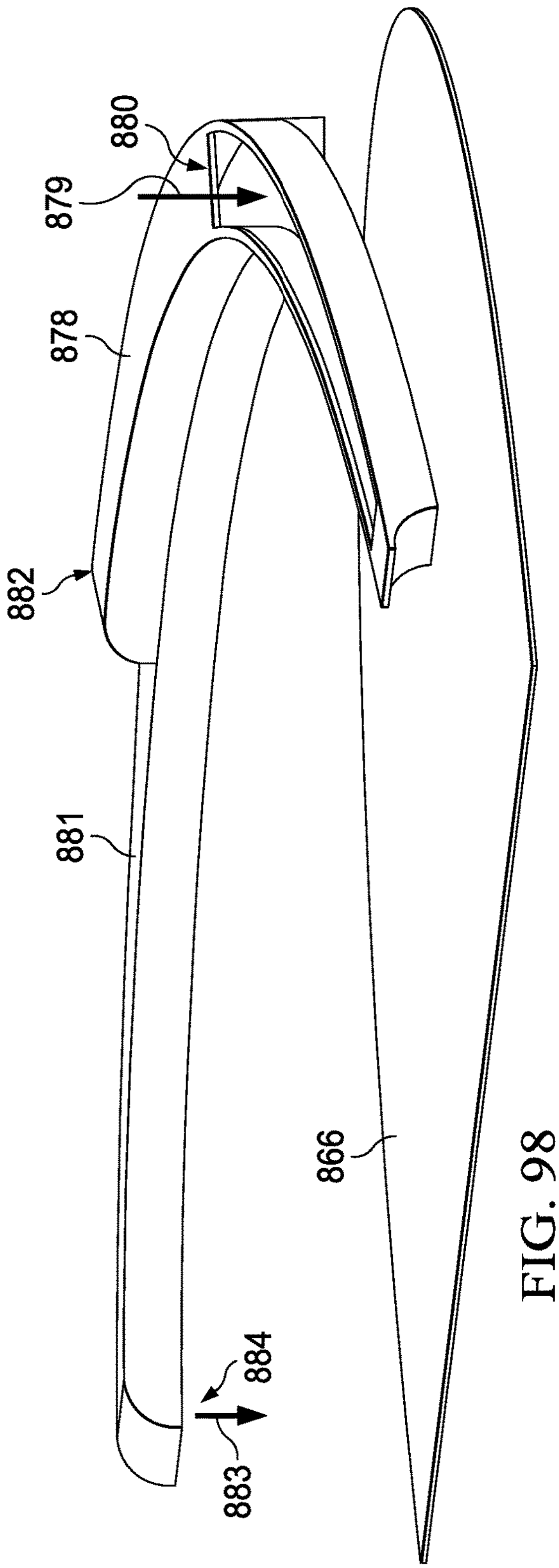
FIG. 98 is an enlarged, perspective sectional view of the embodiment of FIG. 87.

FIG. 98 shows a close up perspective view of two typical tubular segments of which the inner (832 in FIGS. 91-93) and outer (818 in FIGS. 91-93) spiral tubular water channels of the power take off (PTO) illustrated in FIGS. 90-94, the PTO of the embodiment illustrated in FIGS. 87-89, are in part comprised. However, in the illustration of FIG. 98, the lowermost tubular segment 878 is the first, initial, starting, and/or lowermost, tubular segment of its respective spiral tubular water channel.

Tubular segment 878 is the tubular segment through which water from the lower reservoir chamber enters the spiral tubular water channel in order to begin its ascension up the spiral water channel to the upper reservoir chamber (819 in FIG. 93). Water flows 879 into the hollow interior of tubular segment 878 through aperture 880. Thereafter it flows forward and flows into the next, following, subsequent, and/or downstream, tubular segment 881 through the forward aperture (not visible) positioned within the lower wall of tubular segment 878 at its forward end 882 which is coincident, and/or shared, with the medial aperture (not visible) of tubular segment 881. That water then flows forward within tubular segment 881 until it reaches and flows 883 down and through that tubular segment's forward aperture 884, nominally thereby entering, and/or flowing into, the next, following, subsequent, and/or downstream, tubular segment.

A reference plane 866 has been included in FIG. 98 to help illustrate the upward slope and curvature of the illustrated pair of fluidly-connected tubular segments 878 and 881.

Figure 99:
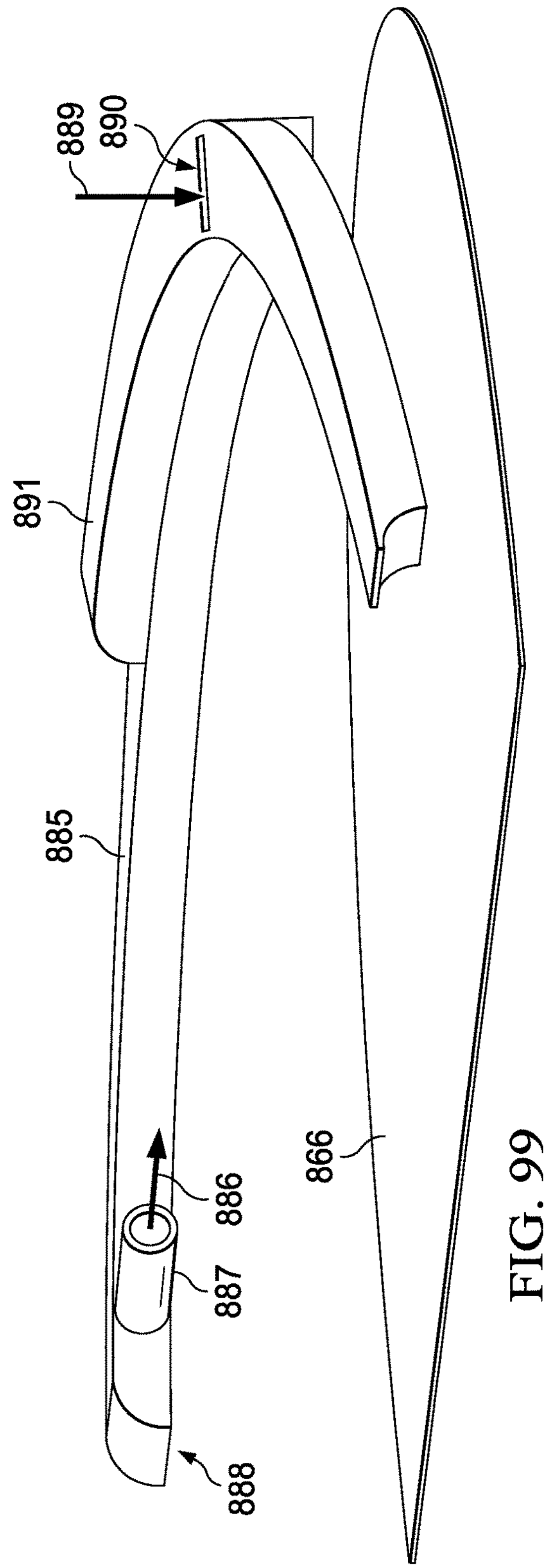
FIG. 99 is another enlarged, perspective sectional view of the embodiment of FIG. 87.

FIG. 99 shows a closeup perspective sectional view of two typical tubular segments of which the inner (832 in FIGS. 91-93) and outer (818 in FIGS. 91-93) spiral tubular water channels of the power take off (PTO) illustrated in FIGS. 90-94, the PTO of the embodiment illustrated in FIGS. 87-89, are in part comprised. However, in the illustration of FIG. 99, the uppermost tubular segment 885 is the last, final, ending, and/or uppermost, tubular segment of its respective spiral tubular water channel.

Tubular segment 885 is the tubular segment through which water pumped upward through wave action at the spiral tubular water channel flows out of the spiral tubular water channel and flows into its respective upper reservoir chamber (819 in FIGS. 91-93) prior to its descent down the respective turbine pipe (819 in FIG. 93). Water flows 886 out of the hollow interior of tubular segment 885 through respective spiral tubular water channel effluent pipe 887. Note that this final and/or uppermost tubular segment 885 lacks a forward aperture (that would typically be positioned at 888).

In the illustration of FIG. 99, water flows from a prior (not shown) tubular segment 889 into, down, and through, the medial aperture 890 of the penultimate tubular segment 891 of the respective (not shown) spiral tubular water channel. Then, when the orientation of the respective PTO is favorable, the water within the interior of tubular segment 891 flows forward and then flows into, down, and through, the forward aperture of tubular segment 891, thereby concomitantly flowing into, down, and through, the medial aperture of tubular segment 885 and entering the interior water channel of tubular segment 885. Then, when the orientation of the respective PTO is favorable, the water within the interior of tubular segment 885 flows forward and then flows 886 laterally out of spiral tubular water channel effluent pipe 887, thereby being deposited within the upper reservoir chamber (819 in FIG. 93).

A reference plane 866 has been included in FIG. 99 to help illustrate the upward slope and curvature of the illustrated pair of fluidly-connected tubular segments 891 and 885.

Figure 100:
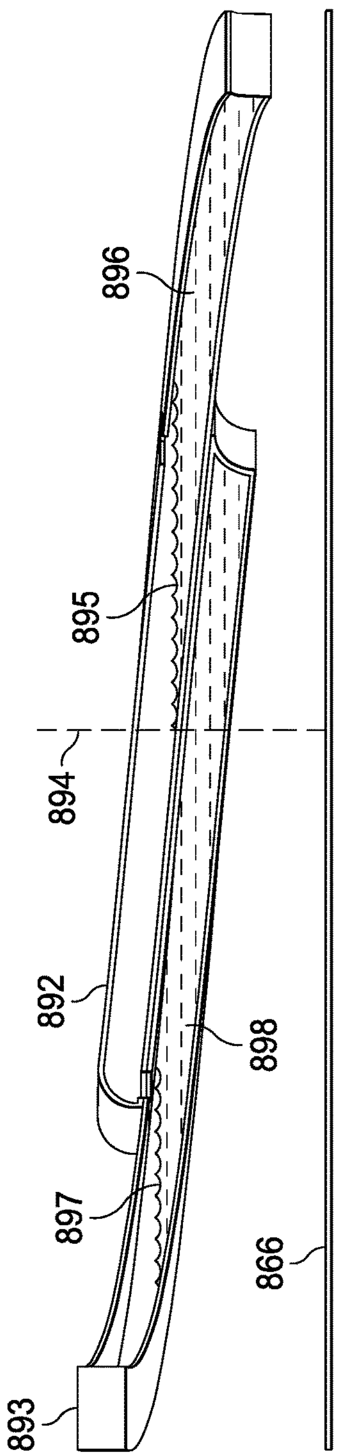
FIG. 100 is another enlarged, perspective sectional view of the embodiment of FIG. 87

FIG. 100 shows a closeup perspective sectional view of two typical tubular segments of which the inner (832 in FIGS. 91-93) and outer (818 in FIGS. 91-93) spiral tubular water channels of the power take off (PTO) illustrated in FIGS. 90-94, the PTO of the embodiment illustrated in FIGS. 87-89, are in part comprised. The inner wall (i.e., the vertical wall closest to the radial center and/or longitudinal axis 894 about which the tubular segments bend) of the illustrated tubular segments 892 and 893 have been removed to permit examination and/or illustration of the hollow interiors of those tubular segments.

A reference plane 866 is included in FIG. 100 to help illustrate the upward slope and curvature of the illustrated pair of fluidly-connected tubular segments 892 and 893.

The orientation of the two fluidly-connected tubular segments 892 and 893 illustrated in FIG. 100 is such that the longitudinal axis about they spiral is vertical as it would be when the PTO, and the respective embodiment, in which it is incorporated is resting in nominally vertical direction (as illustrated in FIG. 88) adjacent to the surface of a resting (i.e., wave-free) body of water. The alignment of the longitudinal axis of rotation of the tubular segments 892 and 893 with the gravitational force acting on those segments and the water within them is further illustrated in FIG. 100 by the surface 895 of the water 896 trapped and/or entrained within tubular segment 892, and by the surface 897 of the water 897 trapped and/or entrained within tubular segment 893. The surfaces 895 and 897 of both respective entrained bodies of water 896 and 898 are parallel with the reference plane 866 which is oriented within FIG. 100 to be horizontal and nominally parallel to the resting surface of the body of water at which the respective PTO and embodiment float.

In this non-tilted orientation, the water 896 and 898 within each tubular segment is sequestered, trapped, and/or entrained, at the back and/or lowermost end of the respective water channel within each tubular segment. That water is unable to flow back down the respective spiral tubular water channel of which the illustrated tubular segments are a part.

Figure 101:
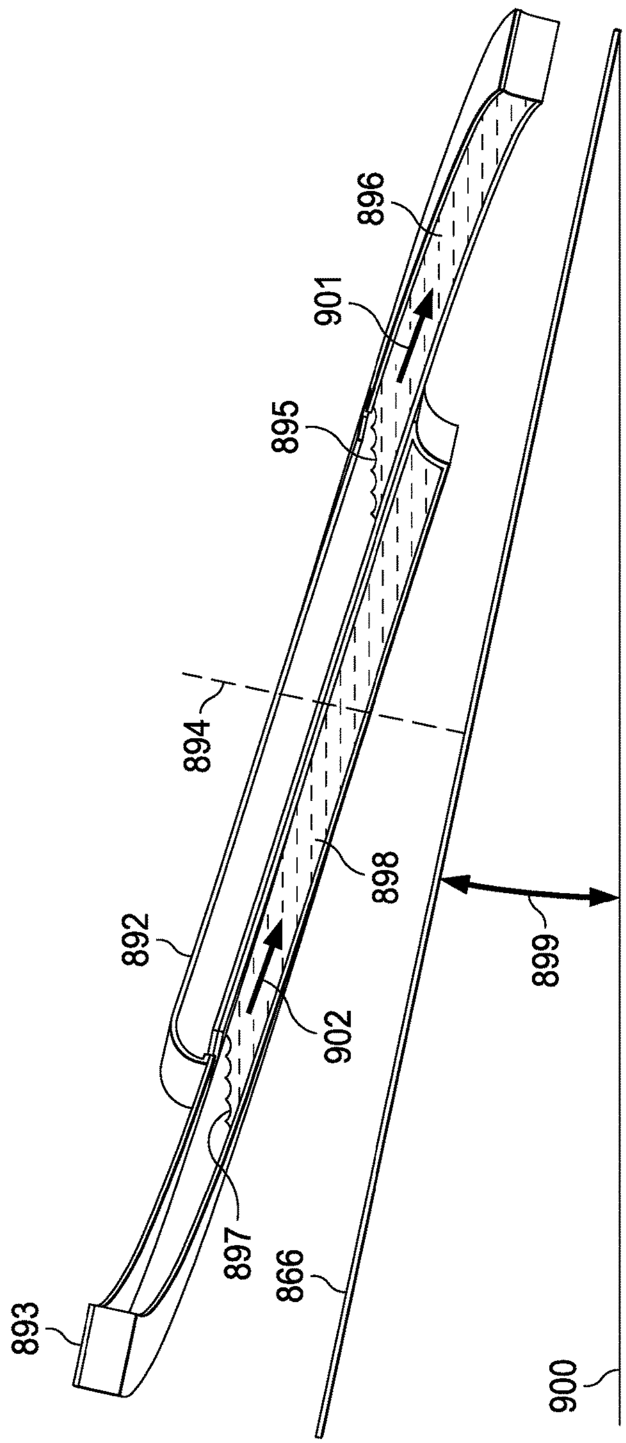
FIG. 101 another enlarged, perspective sectional view of the embodiment of FIG. 87

FIG. 101 shows a close up perspective sectional view of the same two tubular segments illustrated in FIG. 100. In FIG. 101 the orientation of the tubular segments, and/or the longitudinal axis about which they spiral, has been altered to illustrate the effect of tilting of the respective PTO and/or embodiment in an unfavorable direction.

And, as with the FIG. 100, the inner wall (i.e., the vertical wall closest to the radial center and/or longitudinal axis 894 about which the tubular segments bend) of the illustrated tubular segments 892 and 893 have been removed to permit examination and/or illustration of the hollow interiors of those tubular segments.

Unlike in the illustration of FIG. 100, where the longitudinal axis about which the fluidly-connected tubular segments spiraled was vertical and normal to the resting surface of a body of water on which the respective embodiment would float when oriented as illustrated in FIG. 88, the longitudinal axis about which the fluidly-connected tubular segments illustrated in FIG. 101 spiral is tilted, as if, and/or as it would be, if the respective PTO and embodiment of which they are a part is moved out of a purely vertical orientation by a passing wave, and into an unfavorable orientation, tilt, and/or angular offset. With respect to the orientation of the tubular segments illustrated in FIG. 101, the tilting would not be regarded as favorable since the water 896 and 898 within each of the respective fluidly-connected tubular segments is not induced to flow in a forward direction, i.e., toward their respective forward apertures, but is instead induced to flow 901 and 902, respectively, backward and be trapped and/or entrained at a back end of each tubular segment's respective hollow interior.

The illustration in FIG. 101 includes the reference plane 866 also included within the illustration of FIG. 100. However, that reference plane, as well as the longitudinal axis about which the tubular segments 892 and 893 spiral, have been tilted by an angle 899 with respect to the illustration, and/or illustrated orientation, of the tubular segments in FIG. 101. The nominal un-tilted and/or horizontal reference plane of FIG. 100 is included in FIG. 101 as plane 900.

In the unfavorably-tilted orientation of the tubular segments 892 and 893 illustrated in FIG. 101, the water 896 and 898 within each of those tubular segments is sequestered, trapped, and/or entrained, at the back and/or lowermost end of each of the respective interior water channels within each of those tubular segments. That water is unable to flow back down the respective spiral tubular water channel of which the illustrated tubular segments are a part.

The unfavorable tilting of the tubular segments 892 and 893 has resulted in a reduction in the area of each respective upper and/or free surface 895 and 897 of each respective body of water 896 and 898 entrained within each respective tubular segment (i.e., in comparison to the area of each respective upper and/or free surface 895 and 897 of each respective body of water 896 and 898 entrained within each respective tubular segment of the un-tilted orientation illustrated in FIG. 100.

Figure 102:
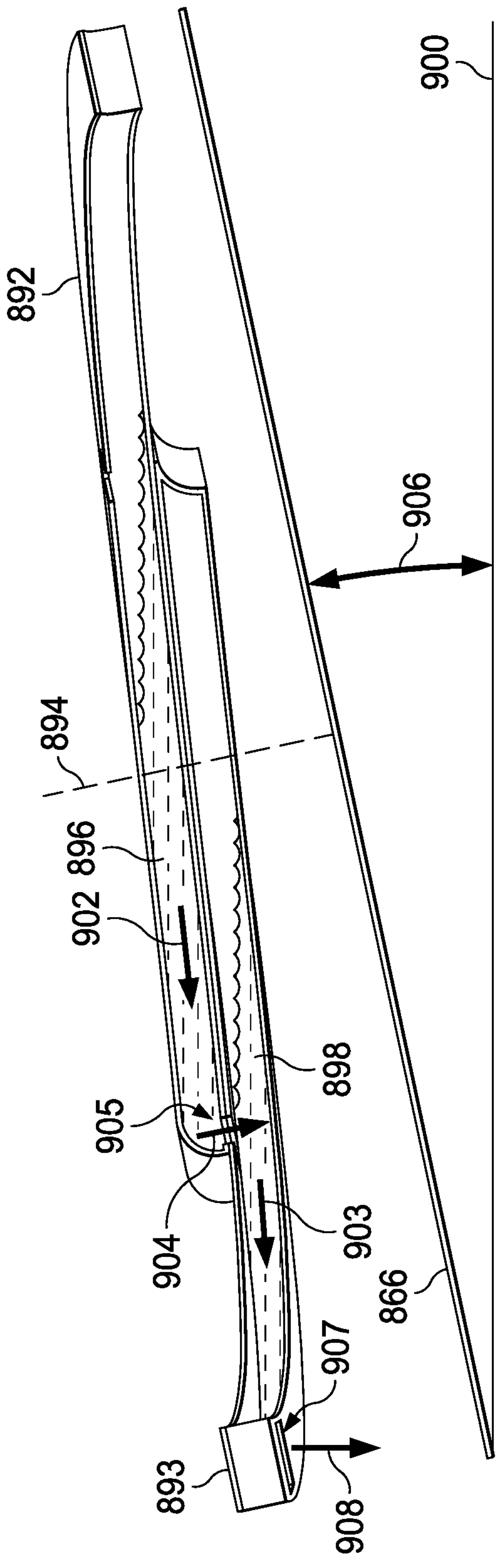
FIG. 102 is another enlarged, perspective sectional view of the embodiment of FIG. 87

FIG. 102 shows a closeup perspective sectional view of the same two tubular segments illustrated in FIGS. 100 and 101. In FIG. 102 the orientation of the tubular segments, and/or the orientation of the longitudinal axis about which they spiral, has been altered to illustrate the effect of tilting the respective PTO and/or embodiment in a favorable direction, i.e., a direction, orientation, and/or angular offset which promotes a forward flow of fluid within the hollow interiors of the tubular segments, e.g., in contrast to the unfavorable direction of tilt illustrated in FIG. 101.

And, as with the FIGS. 100 and 101, the inner wall (i.e., the vertical wall closest to the radial center and/or longitudinal axis 894 about which the tubular segments bend) of the illustrated tubular segments 892 and 893 have been removed to permit examination and/or illustration of the hollow interiors of those tubular segments.

The illustration in FIG. 102 includes the reference plane 866 also included within the illustrations of FIGS. 100 and 101. However, with respect to the orientation of the tubular segments illustrated in FIG. 102, the original, un-tilted reference plane (as illustrated in FIG. 100), as well as the longitudinal axis about which the tubular segments 892 and 893 spiral, have been tilted by an angle 906 with respect to the illustration, and/or illustrated orientation, of the tubular segments in FIG. 102. The nominal un-tilted and/or horizontal reference plane of FIG. 100 is included in FIG. 101 as plane 900.

Unlike in the illustration of FIG. 100, where the longitudinal axis about which the fluidly-connected tubular segments spiraled was vertical and normal to the resting surface of a body of water on which the respective embodiment would float when the embodiment is oriented as illustrated in FIG. 88, and unlike the illustration of FIG. 101, where the longitudinal axis about which the fluidly-connected tubular segments spiraled was tilted in an unfavorable direction, the longitudinal axis about which the fluidly-connected tubular segments illustrated in FIG. 102 spiral is tilted, as if, and/or as it would be, if the respective PTO and embodiment of which they are a part is moved out of a purely vertical orientation by a passing wave, and is in a favorable orientation, tilt, and/or angular offset. With respect to the orientation of the tubular segments illustrated in FIG. 102, the tilting is favorable since the water 896 and 898 within each of the respective fluidly-connected tubular segments 892 and 893 is induced and/or made to flow 902 and 903 in a forward direction, i.e., toward their respective forward apertures. In fact, because of their forward flows 902 and 903, the water 896 and 897, respectively, within each respective tubular segment 892 and 893 is flowing up to, down and through its respective forward aperture.

The water 896 within the hollow interior of tubular segment 892 is flowing 904 through, into, and/or out of, the forward aperture 905 of tubular segment 892, which is fluidly connected, and/or adjacent to the medial aperture of tubular segment 893. After flowing 904 from tubular segment 892 into tubular segment 893, the water originating from the interior of tubular segment 892 mixes with the water already flowing 903 forward within the interior of tubular segment 893. The mixed water 898 flows 903 forward toward the forward aperture 907, and subsequently flows down, through, and past, forward aperture 907, nominally into a succeeding tubular segment (not shown)

Figure 103:
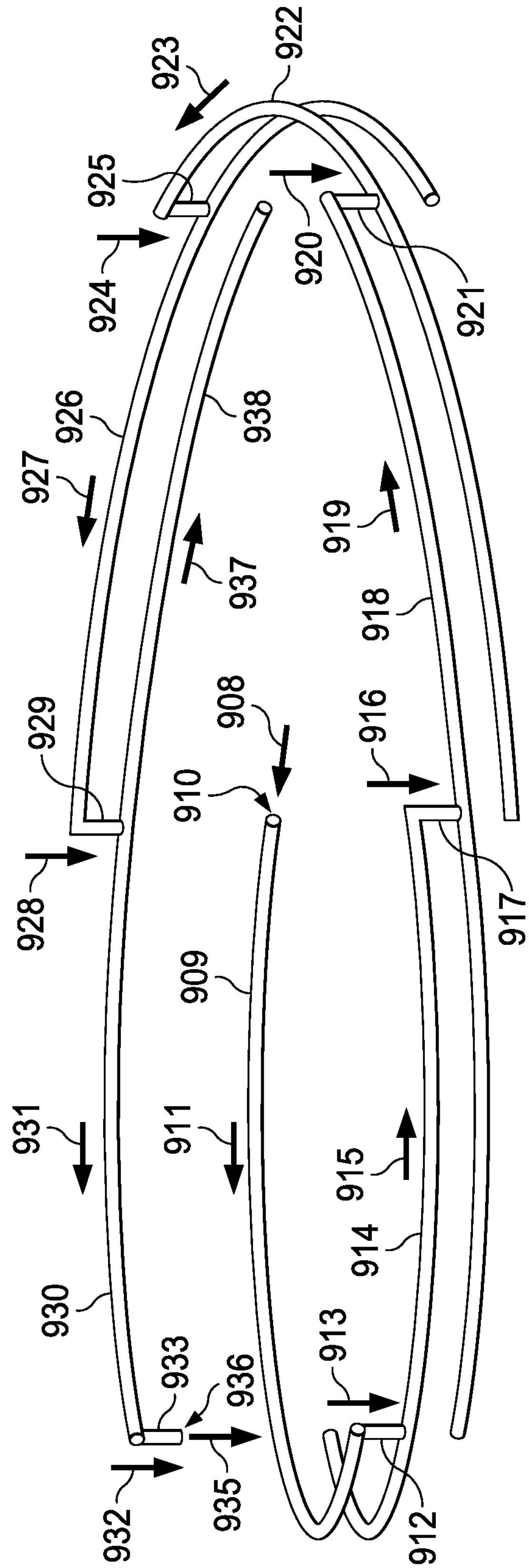
FIG. 103 is another enlarged, perspective sectional view of the embodiment of FIG. 87

FIG. 103 shows a tubular power take off (PTO) similar, analogous, and/or equivalent, to the PTO illustrated in FIGS. 89-102. This embodiment of the present disclosure illustrates some important characteristics of the embodiments of the present disclosure.

The embodiment of the power take off illustrated in FIG. 103 is simplified to facilitate explanation. However, it should be understood that longer, e.g., a much greater number of turns in the spiral water channel, and more complex embodiments are included within the scope of the present invention.

The embodiment illustrated in FIG. 103 is a single, continuous fluid channel through which a fluid (e.g., water) advances about a path of ever-increasing elevation, and/or distance from the origin of the fluid being advanced. The fluid flow occurs in response to favorable tilting, rocking, and/or angular deflections, that move the longitudinal, nominally vertical, axis about which the fluid flows and approximately parallel to the escalating vertical displacements of the fluid. Furthermore, in response to tilts of unfavorable direction and/or angle, the fluid remains trapped within the fluid channel at a height approximately equal to its greatest vertical displacement—the fluid does not flow backward and/or down the fluid channel toward to aperture through which it entered the fluid channel.

Please note that directions of fluid flow within the tubular channel of the illustrated PTO are indicated by arrows outside those tubular channels. The reader should interpret the arrows signified as indicators of fluid flow as indicating fluid flow within the adjacent part or portion of the tubular PTO.

With respect to the simplified PTO illustrated in FIG. 103, fluid flows 908, and/or enters the initial tubular segment 909 of the fluid channel through an aperture 910 at an end of the initial tubular segment 909. In response to favorable tilting of the PTO, water flows 911 forward through the spiral tubular segment 909. Water flowing 911 to the forward end of the tubular segment 909 falls and/or flows 912 through the approximately vertical connecting tube segment 913 thereby flowing into and/or entering the next tubular segment 914 in the tubular PTO.

In response to favorable tilting of the PTO, water within tubular segment 914 flows 915 forward through that spiral tubular segment. Water flowing 915 to the forward end of the tubular segment 914 falls and/or flows 916 through the approximately vertical connecting tube segment 917 thereby flowing into and/or entering the next tubular segment 918 in the tubular PTO.

In response to favorable tilting of the PTO, water within tubular segment 918 flows 919 forward through that spiral tubular segment. Water flowing 918 to the forward end of the tubular segment 919 falls and/or flows 920 through the approximately vertical connecting tube segment 921 thereby flowing into and/or entering the next tubular segment 922 in the tubular PTO.

In response to favorable tilting of the PTO, water within tubular segment 922 flows 923 forward through that spiral tubular segment. Water flowing 922 to the forward end of the tubular segment 923 falls and/or flows 924 through the approximately vertical connecting tube segment 925 thereby flowing into and/or entering the next tubular segment 926 in the tubular PTO.

In response to favorable tilting of the PTO, water within tubular segment 926 flows 927 forward through that spiral tubular segment. Water flowing 927 to the forward end of the tubular segment 926 falls and/or flows 928 through the approximately vertical connecting tube segment 929 thereby flowing into and/or entering the next tubular segment 930 in the tubular PTO.

In response to favorable tilting of the PTO, water within tubular segment 930 flows 931 forward through that spiral tubular segment. Water flowing 930 to the forward end of the tubular segment 931 flows 932 into the approximately vertical connecting tube segment 933 thereby flowing 935 out of an aperture 936 positioned at a nominally uppermost end of the last tubular segment 930 in the illustrated PTO.

In response to unfavorable tilting, water within any of the tubular segments, other than the initial tubular segment 909, will flow, e.g., 937, backward and become entrained and/or trapped in the closed, aperture-free backmost, and/or nominally lowermost, portion, e.g., 938, of each respective tubular segment.

The water exiting and/or flowing 935 out of the nominally uppermost end of the illustrated PTO is elevated with respect to the aperture 910 through which it entered the PTO. The illustrated PTO, and especially more extensive, longer, and/or PTOs with greater numbers of spiral windings, are capable of elevating fluids to significant heights when driven by waves of sufficient energy, period, and surge length. And the gravitational potential energy imparted to fluids so elevated may then be passed through a water- or fluid-turbine in order to energize an operably-connected generator, thereby producing electrical power. The resulting gravitational potential energy of the elevated water can be used for other purposes in which the head pressure of the water is utilized directly, or for other useful purposes still.

An embodiment of the present disclosure does not include, incorporate, and/or utilize, a generator. An embodiment of the present disclosure does not include, incorporate, and/or utilize, a water turbine. An embodiment of the present disclosure does not include, incorporate, and/or utilize, a turbine shaft, e.g., an embodiment utilizes a hubless water turbine which is itself a generator.

Figure 104:
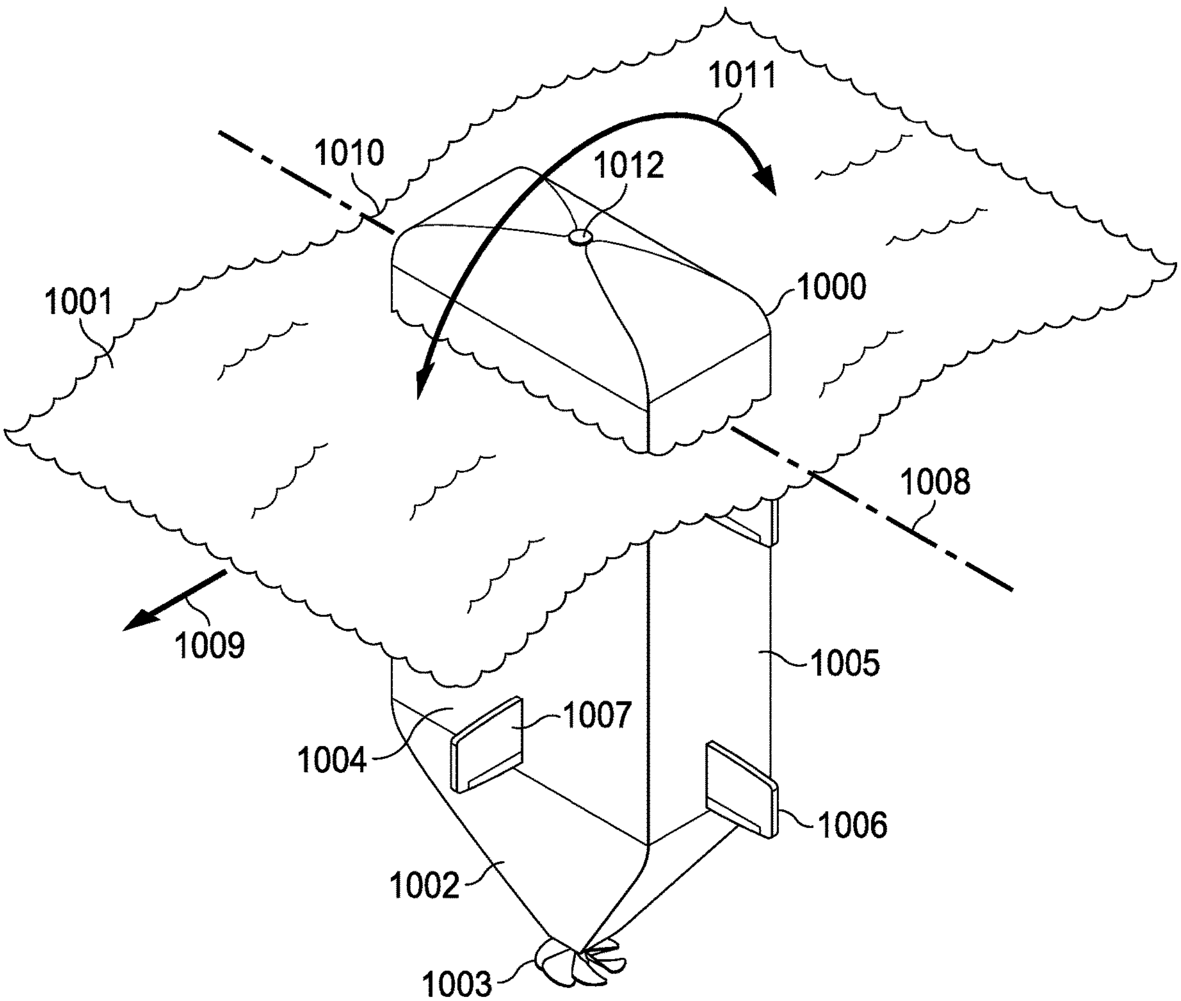
FIG. 104 is an elevated, perspective view of another embodiment of the present invention.

FIG. 104 shows a perspective side view of an embodiment 1000 of the present disclosure. The illustrated embodiment is similar to an "autonomous underwater vehicle" (AUV) and is capable of cruising through a body of water below its surface. However, in FIG. 104 the embodiment is shown floating adjacent to an upper surface 1001 of a body of water over which waves are passing. With respect to the orientation of the embodiment illustrated in FIG. 104, the "forward end" is at the top of the page (e.g., above the surface 1001 of the water), and the "back end" 1002 is at the bottom of the page, and the embodiment's propeller 1003 extends from the back end. The sides of the illustrated embodiment are referred to as "broad sides", e.g., 1004, and "narrow sides", e.g., 1005.

When cruising below the surface 1001 of a body of water, the embodiment's propeller 1003 typically pushes the embodiment toward its forward end. However, when the embodiment's propeller is rotated in an opposite direction, the propeller pulls the embodiment backward.

The embodiment incorporates, includes, and/or utilizes, two stabilizing and/or directional fins, e.g., 1006, along each of its narrow sides, as well as one stabilizing and/or directional fin, e.g., 1007, on each of its broad sides, positioned adjacent to the back end 1002 of the embodiment.

At least in part because of its oblong shape with respect to horizontal cross-sections when floating adjacent to a surface 1001 of a body of water over which waves are passing, the embodiment will tend to orient itself, and/or be driven to an orientation, in which its broad sides are approximately parallel to the wave front 1008, and/or normal to the direction of wave propagation 1009. The embodiment illustrated in FIG. 104 is oriented such that its broad sides are aligned with a wave trough 1010. Because of its tendency to adopt, and/or be driven to, this wave-front-aligned orientation, the embodiment tends to be rocked 1011 by waves within a plane of motion that is parallel to the direction of wave propagation 1009.

Mounted to the top of the embodiment is a phased array radio antenna 1012.

Figure 105:
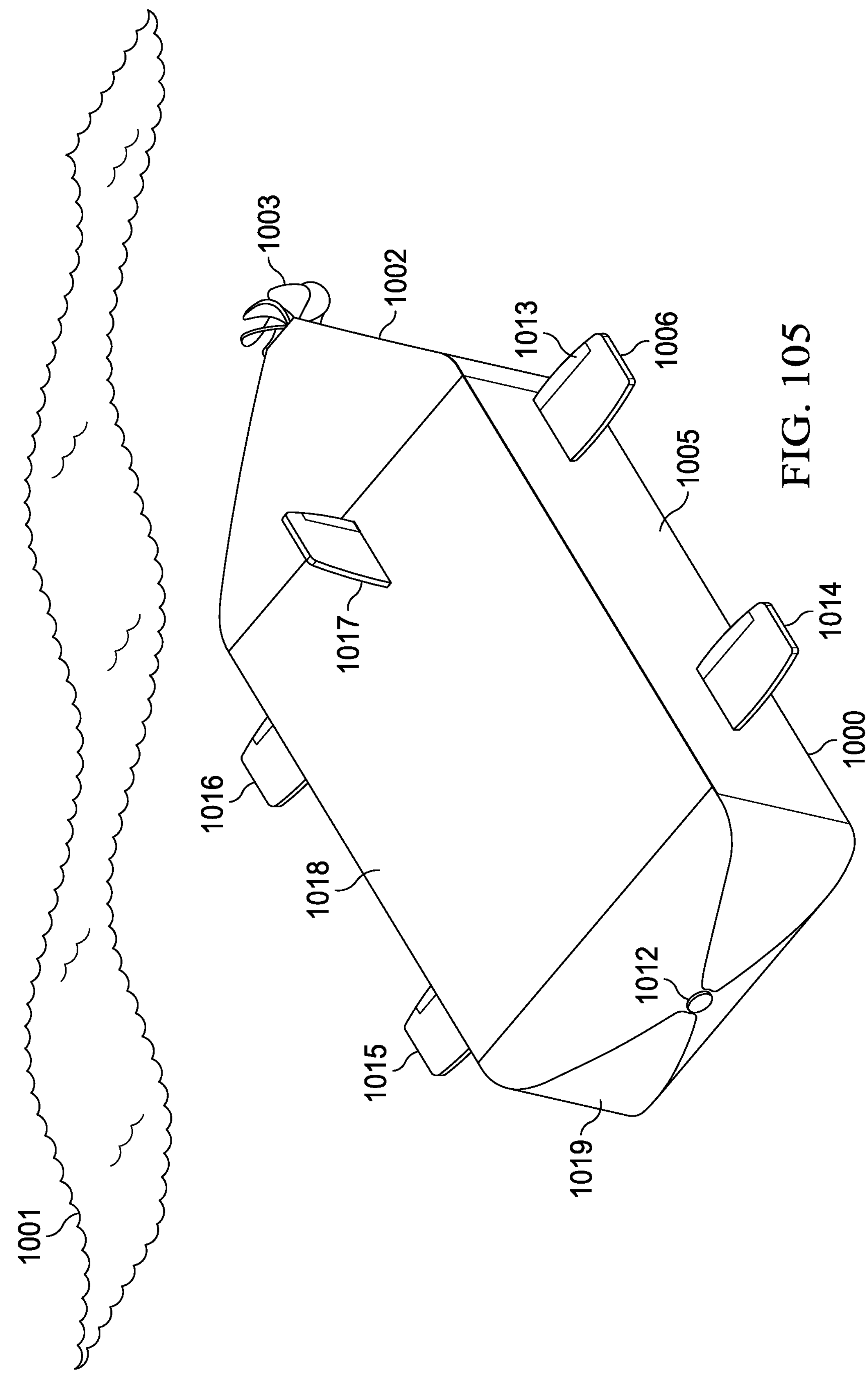
FIG. 105 is another perspective view of the embodiment of FIG. 104.

FIG. 105 shows a perspective top-down view of the same embodiment 1000 of the present disclosure that is illustrated in FIG. 104. In FIG. 104 the embodiment is shown cruising through a body of water below its surface 1001, as the result of thrust produced by its motor-driven propeller, where that motor is powered, at least in part, by electrical power generated by the embodiment's power take off (PTO) as it floated adjacent to the water's surface 1001 at some earlier time.

The embodiment's control system (not visible) steers the embodiment as it cruises through the articulation of flaps, e.g., 1013, incorporated within each of the four fins 1006 and 1014-1016 mounted and/or attached to its two narrow sides, e.g., 1005 (with two fins on each narrow side), and through the articulation of flaps incorporated within each fin 1017 and 1007 (see FIG. 104) mounted and/or attached to its two broad sides 1004 and 1018 (see FIG. 104). In the illustration of FIG. 105, the embodiment's propeller 1003 is pushing the embodiment in a forward direction, i.e., toward the forward end 1019 of the embodiment. However, the embodiment's control system can also use the flaps on the embodiment's six fins to steer the embodiment when the control system rotates the propeller 1003 in an opposite direction, thereby pulling the embodiment backward in a direction in which the forward end 1019 becomes the trailing end.

Figure 106:
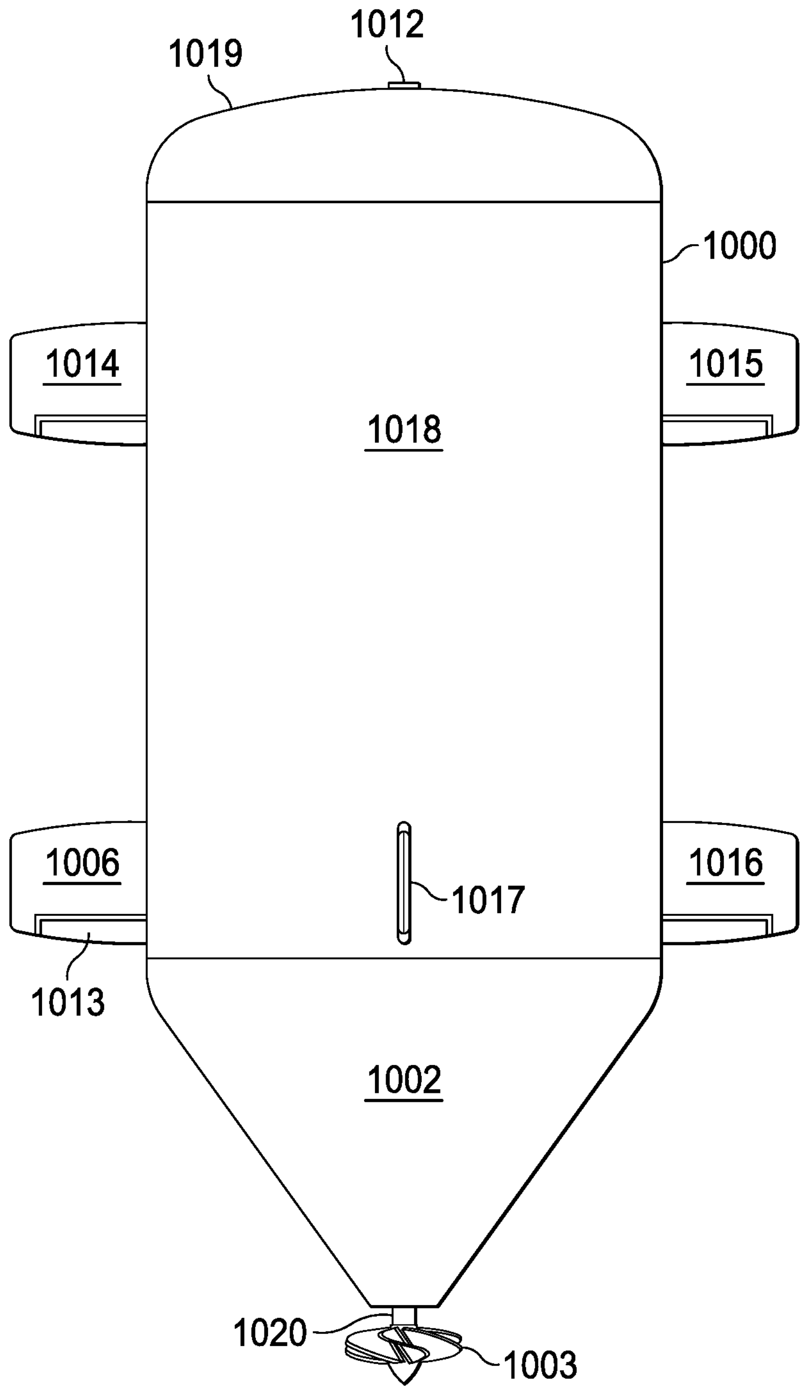
FIG. 106 is a side view of the embodiment of FIG. 104.

FIG. 106 shows a side view of the same embodiment 1000 of the present disclosure that is illustrated in FIGS. 104 and 105.

Propeller 1003 is operably-connected to propeller shaft 1020.

Figure 107:
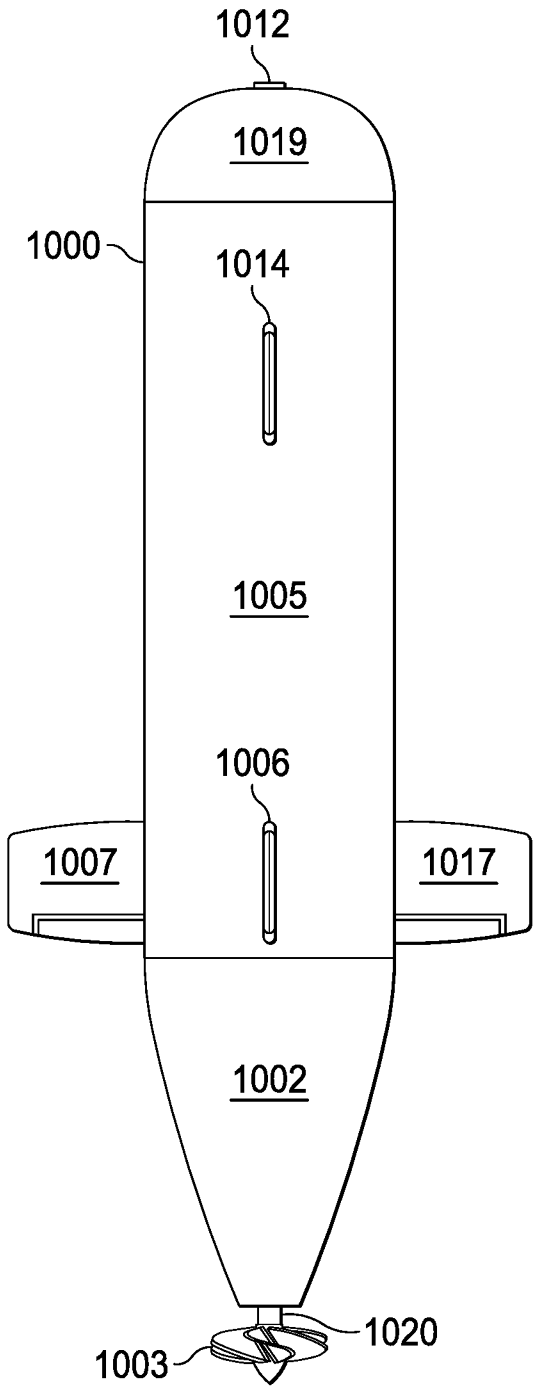
FIG. 107 is another side view of the embodiment of FIG. 104.

FIG. 107 shows a side view of the same embodiment 1000 of the present disclosure that is illustrated in FIGS. 104-106.

Figure 108:
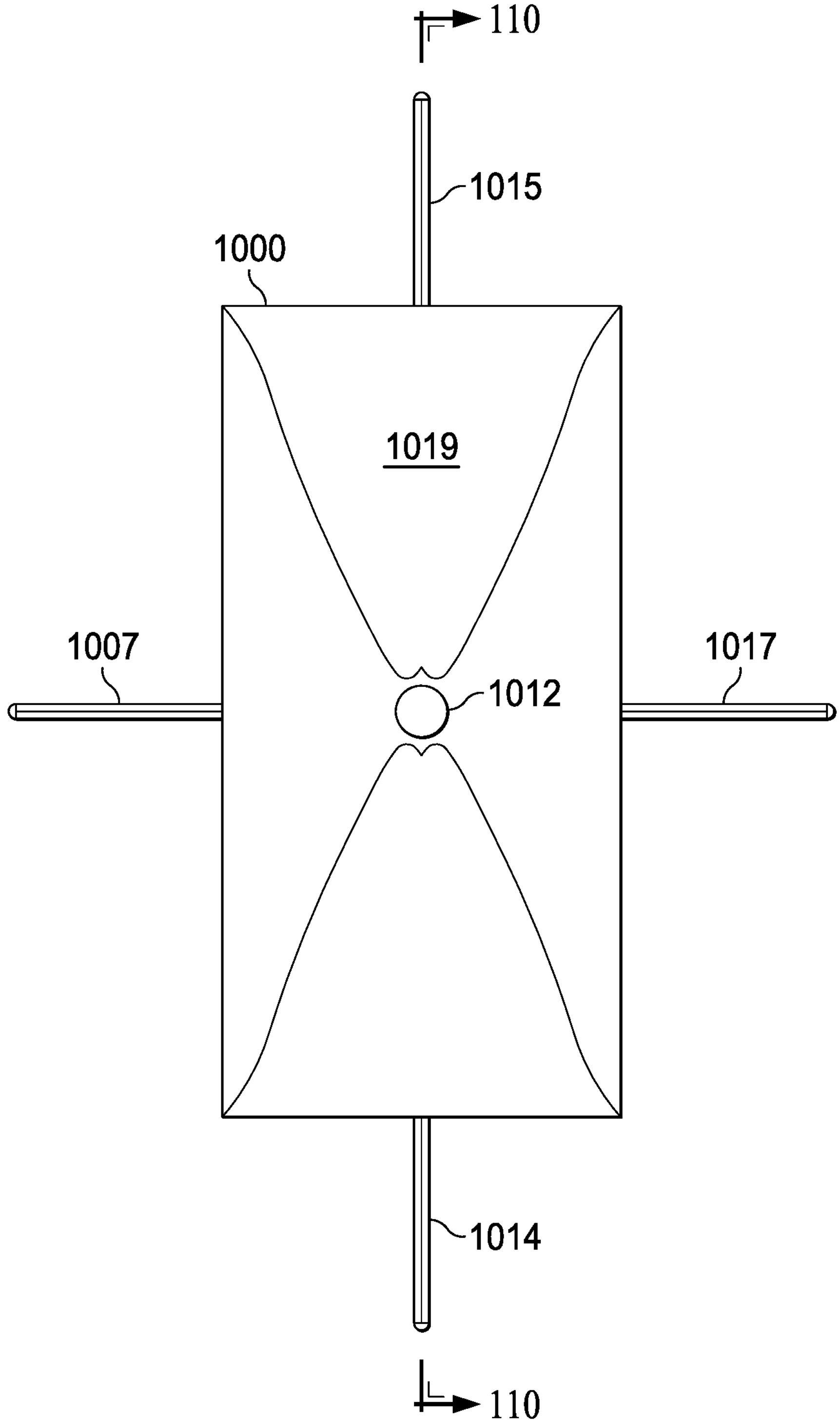
FIG. 108 is a top view of the embodiment of FIG. 104.

FIG. 108 shows a top-down view of the same embodiment 1000 of the present disclosure that is illustrated in FIGS. 104-107.

Figure 109:
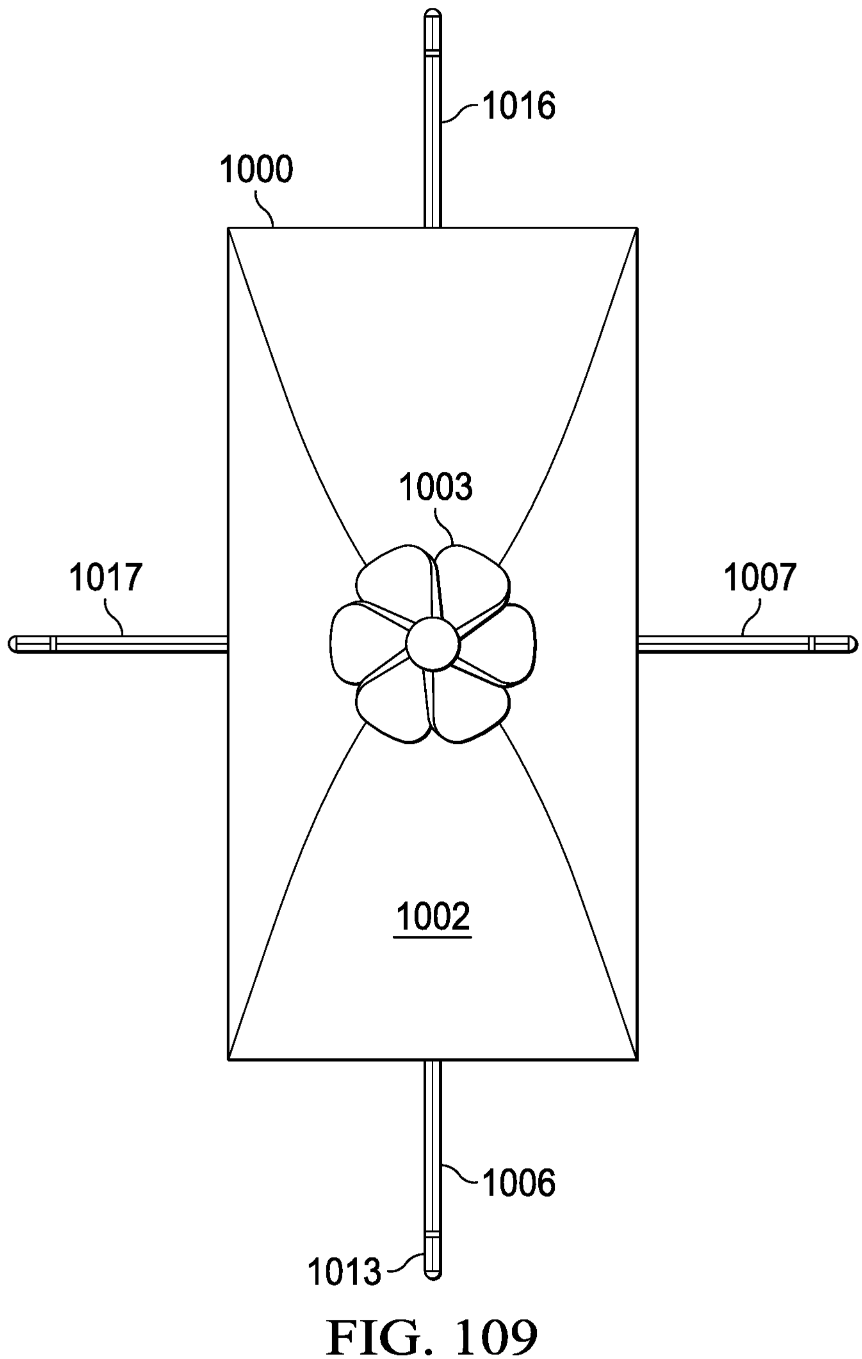
FIG. 109 is bottom view of the embodiment of FIG. 104.

FIG. 109 shows a bottom-up view of the same embodiment 1000 of the present disclosure that is illustrated in FIGS. 104-108.

Figure 110:
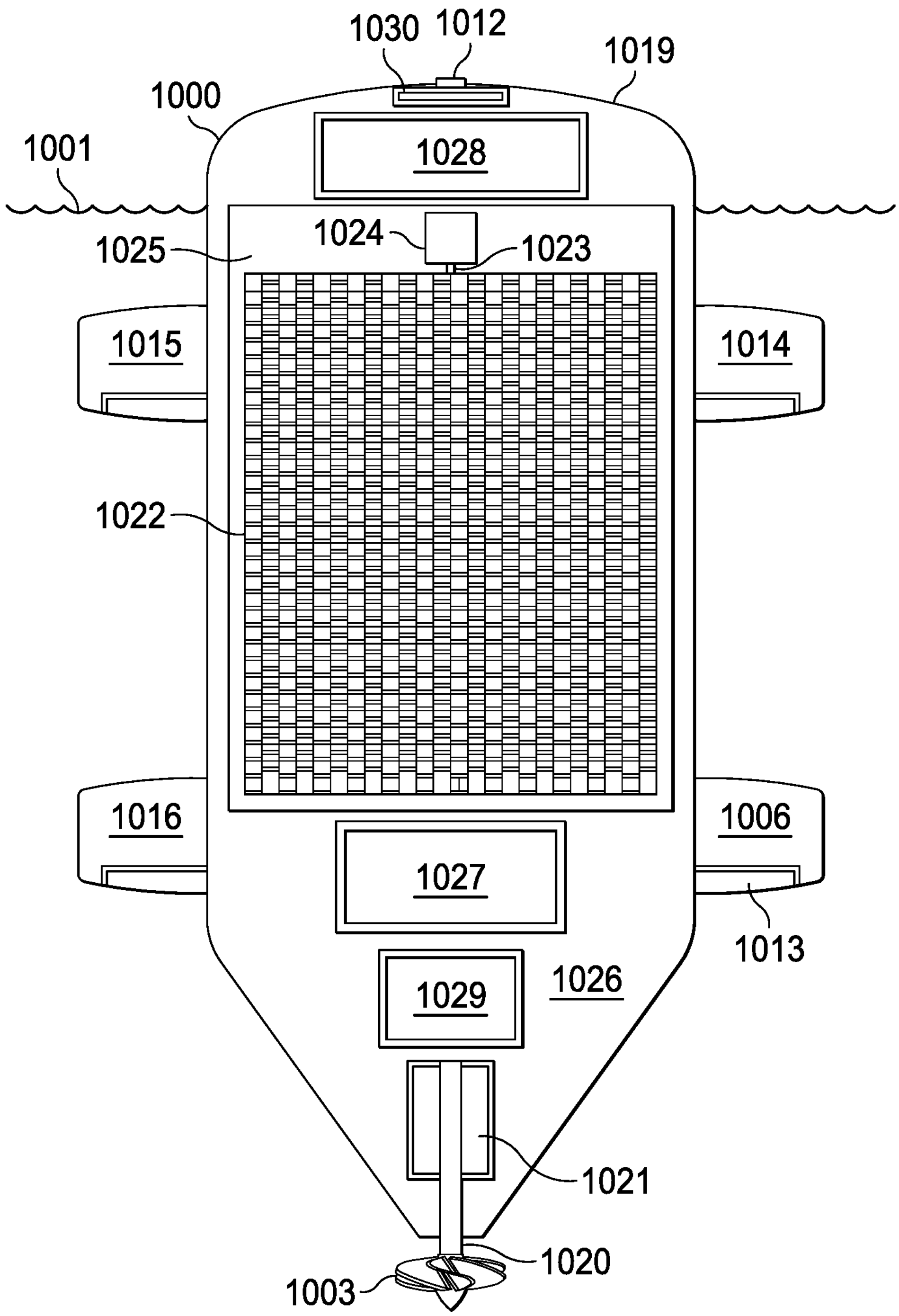
FIG. 110 is a cross sectional view of the embodiment of FIG. 104.

FIG. 110 shows a side sectional view of the same embodiment of the present disclosure that is illustrated in FIGS. 104-109 wherein the vertical section plane is specified in FIG. 108 and the section is taken across line 110-110.

Propeller 1003, and the turbine shaft 1020 operably-connected to the propeller, are rotated by motor 1021 in either of two directions. The first direction of rotation generates thrust that pushes and/or propels the embodiment in a forward direction (i.e., toward the top of the page with respect to the embodiment orientation illustrated in FIG. 110). The second direction of rotation generates thrust that pulls and/or propels the embodiment in a backward direction (i.e., toward the bottom of the page with respect to the embodiment orientation illustrated in FIG. 110). Motor 1021 is energized, at least in part, by electrical energy produced by the embodiment's power take off (PTO) 1022-1024 which is identical to the PTO illustrated and described in FIGS. 72-86. A portion of the electrical energy that is produced by the embodiment's PTO is stored within an energy storage and computing module 1027. And, a portion of the electrical energy that energizes motor 1021 is energy derived from, obtained from, and/or transmitted to the motor by, the embodiment's energy storage and computing module.

As illustrated and explained in relation to FIGS. 72-86, the PTO is comprised of adjacent columns of ramps and reservoirs (as illustrated in FIGS. 78-80) which raise water (i.e., toward generator 1024) in response to wave action at the embodiment when the embodiment is floating in an approximately vertical orientation adjacent to the surface of a body of water over which waves pass (as illustrated in FIG. 104). Turbine shaft 1023 (711 in FIGS. 79 and 80) operably connects generator 1024 (702 in FIGS. 79 and 80) to a water turbine (not visible in FIG. 110, see 726 in FIGS. 79 and 80).

PTO 1022-1024 is positioned within a compartment and/or space 1025 within the embodiment's interior. Much of the embodiment's interior 1026 is comprised of a buoyant material, which includes, but is not limited to, structural polyurethane foam.

The embodiment incorporates, includes, and/or utilizes, forward and back buoyancy and trim modules 1028 and 1029, respectively, with, and/or through, which the embodiment's control system 1030 controls the orientation of the embodiment, especially when it cruises beneath the surface of the body of water in which it floats (as illustrated in FIG. 105). A surplus of buoyancy, which the control system manifests through control of the forward and back buoyancy and trim modules helps position the embodiment while it floats in an approximately vertical orientation adjacent to the surface 1001 of a body of water in order to utilize the ambient wave action at the surface to energize its PTO by incrementally and/or successively driving water up the ramps (as illustrated in FIGS. 78-80).

Because the embodiment tends to adopt, and/or be driven to, an azimuthal and/or lateral-angular orientation that aligns its broad sides with the prevailing and/or dominant wave front, and/or aligns its broad sides such that they approximately normal to the prevailing and/or dominant direction of wave propagation. Therefore, the rocking imparted to, and/or induced in, the embodiment in response to wave action tends to be aligned so as to lift water at the greatest possible rate within the PTO, and/or to impart a maximal amount of wave energy to the embodiment's PTO.

Through its phased-array antenna 1012, the embodiment's control system 1030 receives encoded transmissions and/or signals of electromagnetic, radio, and/or optical, energy from remote sources and/or antennas. The control system decrypts, and/or interprets, those encoded signals and processes them. When appropriate, the control system transmits the data and/or computational tasks within an encoded signal to a network, collection, set, and/or plurality, of computing devices positioned and operating within the embodiment's energy storage and computing module 1027. At least a portion, and typically all, of the computing devices and other electronic, optical, networking, memory, and other devices within the energy storage and computing module are energized by energy transmitted to them by the energy storage and computing module.

At least one computer within the energy storage and computing module 1027 may transmit to the control system 1030 at least a portion of computational results obtained from, and/or generated by, the execution of a computational task transmitted to one or more computers within the energy storage and computing module by the control system. The control system encrypts, formats, and/or encodes, data and/or computational results obtained from the computers in the energy storage and computing module, as well as data and/or computational results that it produces, and then transmits encoded transmissions and/or signals of electromagnetic, radio, and/or optical, energy to remote receivers and/or antennas.

The circuits and/or components within the embodiment's energy storage and computing module 1027 includes, but is not limited to: a plurality of computational circuits including, but not limited to: computer processing units (CPUs), graphics processing units (GPUs), application-specific integrated circuits (ASICs), tensor processing units (TPUs), quantum processing units (QPUs), and optical processing units. The energy storage and computing module also incorporates, includes, and/or utilizes, a plurality of memory circuits, a plurality of power management circuits, a plurality of network circuits, encryption/decryption circuits, etc., in addition to other circuits useful for the execution, completion, and/or implementation, of computational tasks, and for the gathering, sorting, compression, and/or storage, of computational results. The energy storage and computing module includes electronic circuits, optical circuits, and other types of circuits.

Heat generated by the activity, energization, and/or operation, of the electronic and/or optical circuits is transmitted, at least in part, conductively to the body of water 1001 in which the embodiment floats and/or operates.

The energy storage and computing module 1027 includes, but is not limited to: batteries, capacitors, electrolyzers, hydrogen storage components, fuel cells.

Figure 111:
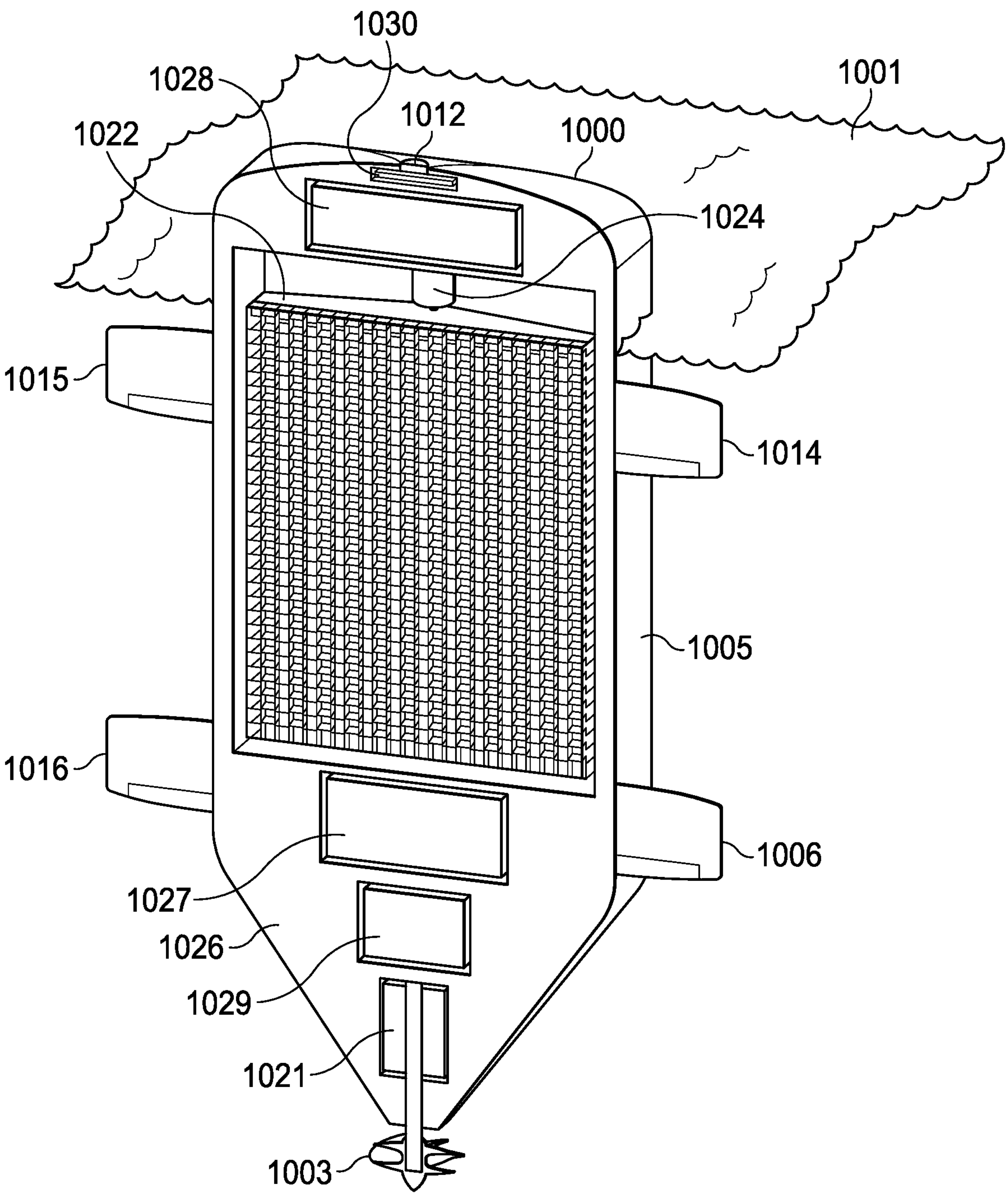
FIG. 111 a perspective view of the section of FIG. 110.

FIG. 111 shows a perspective view of the vertical sectional view illustrated in FIG. 110.

Figure 112:
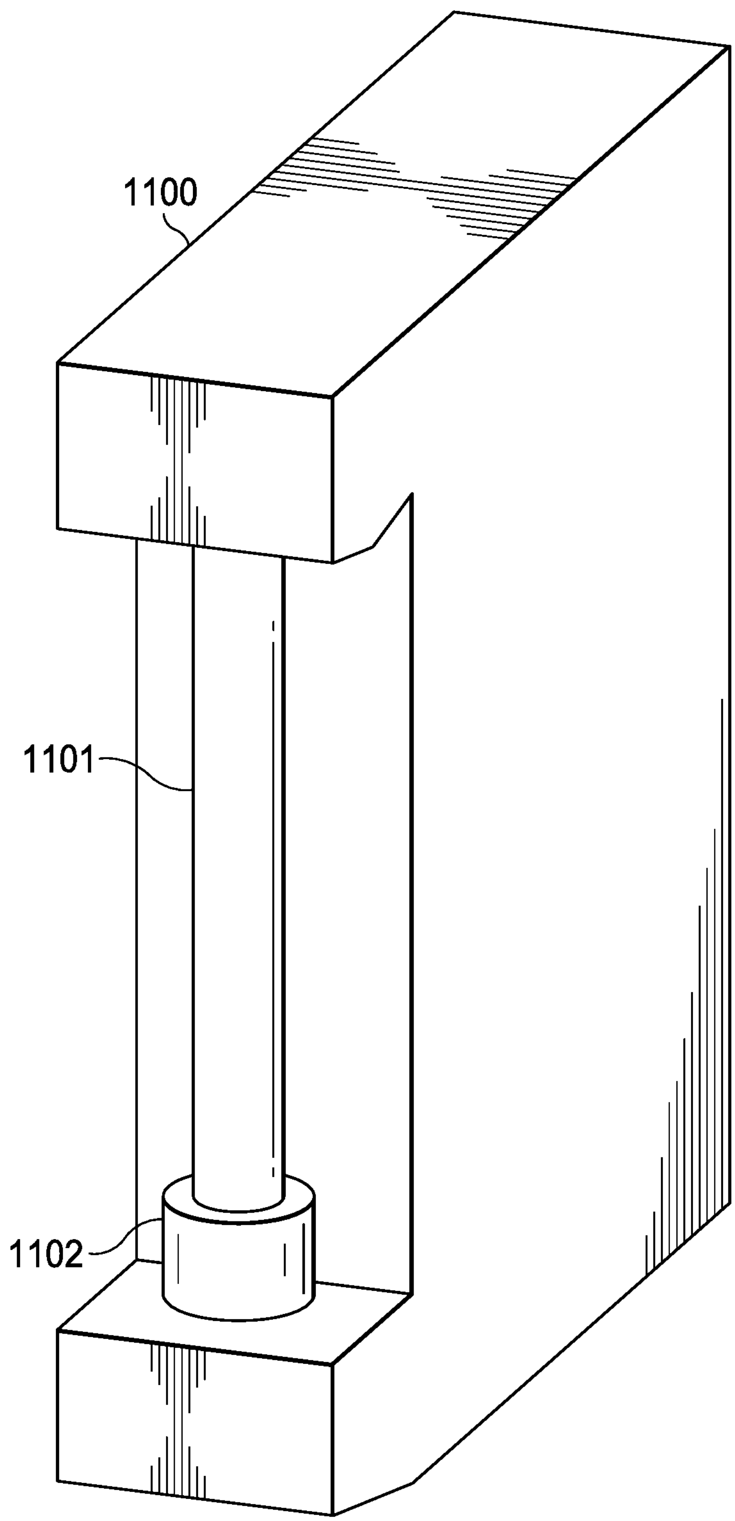
FIG. 112 is an elevated, perspective view of another embodiment of the present invention.

FIG. 112 shows a perspective side view of an embodiment 1100 of the present disclosure. The illustrated embodiment is a power take off (PTO) that elevates a fluid in response to rocking, and/or tilting, within a plane approximately parallel to the plane and/or wall about which stacks and/or arrays of ramps of opposing and/or complementary angles are separated. The illustrated PTO elevates its internal fluid in response to rocking within a plane parallel to a broad surface of a wall about which the embodiment's fluid flows, first flowing parallel and adjacent to a first side of the wall, then flowing around a vertical edge of the wall from the first side to a second side, then flowing parallel and adjacent to the second side of the wall, then flowing around a vertical edge of the wall from the first side to the second side, and then repeating such a pattern of flow until the fluid is discharged from the fluid-elevating ramps.

After being discharged from the fluid-elevating ramps, the fluid elevated by the embodiment in response to rocking, e.g., in response to wave action at a vessel to which the PTO is affixed or mounted, is directed into a high-energy fluid reservoir (not visible) and from there into an upper end of a turbine tube 1101 in which a hubless fluid turbine 1102 is positioned and rotated by the descending fluid within the turbine tube. The effluent from that fluid turbine is then collected within a low-energy fluid reservoir (not visible).

Fluid from the low-energy reservoir (not visible) is drawn into the lowest fluid-elevating ramp within the embodiment and is thereafter incrementally raised to ever increasing elevations within the embodiment until it is again discharged, and until it again imparts to the fluid turbine a portion of the gravitational potential energy imparted to it by the embodiment in response to rocking of the embodiment, e.g., in response to wave action.

Figure 113:
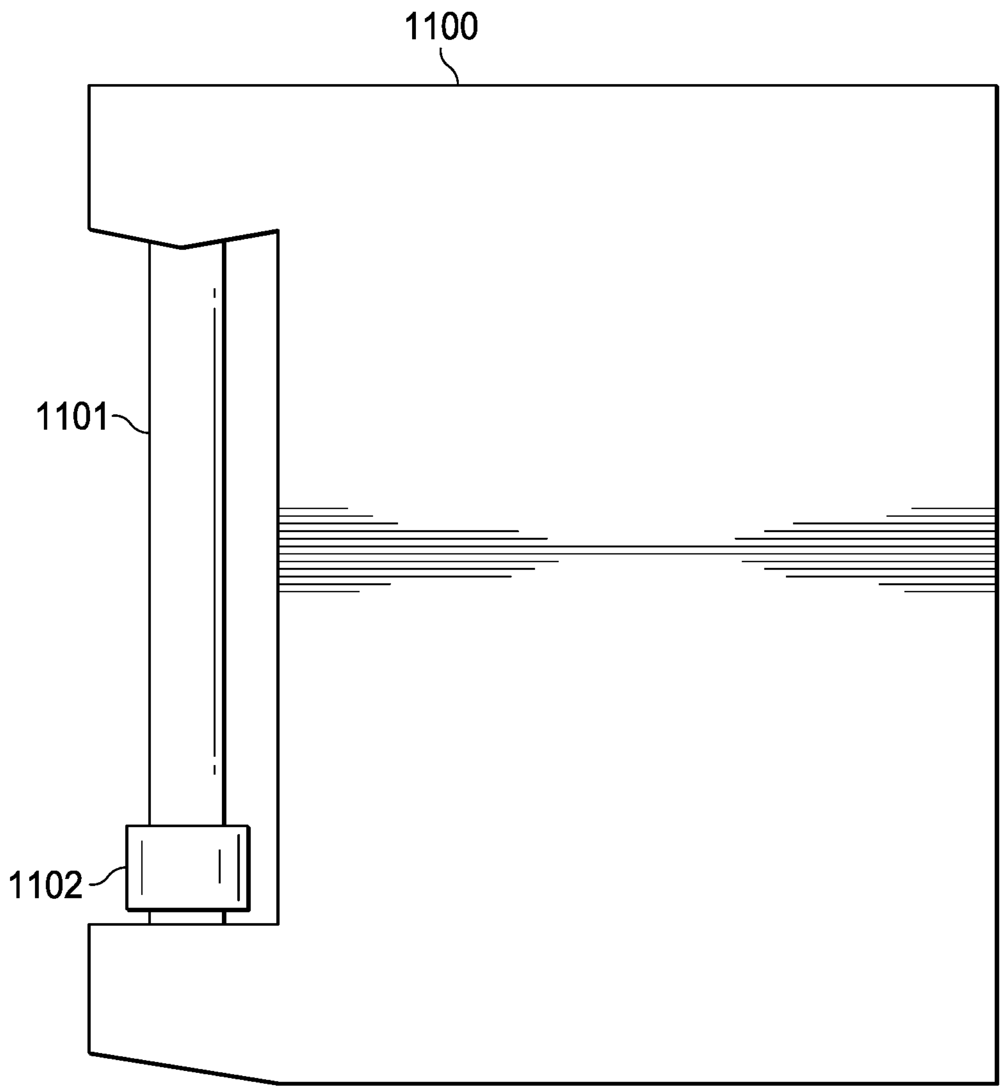
FIG. 113 is a side view of the embodiment of FIG. 112.

FIG. 113 shows a side view of the same embodiment 1100 of the present disclosure that is illustrated in FIG. 112.

Figure 114:
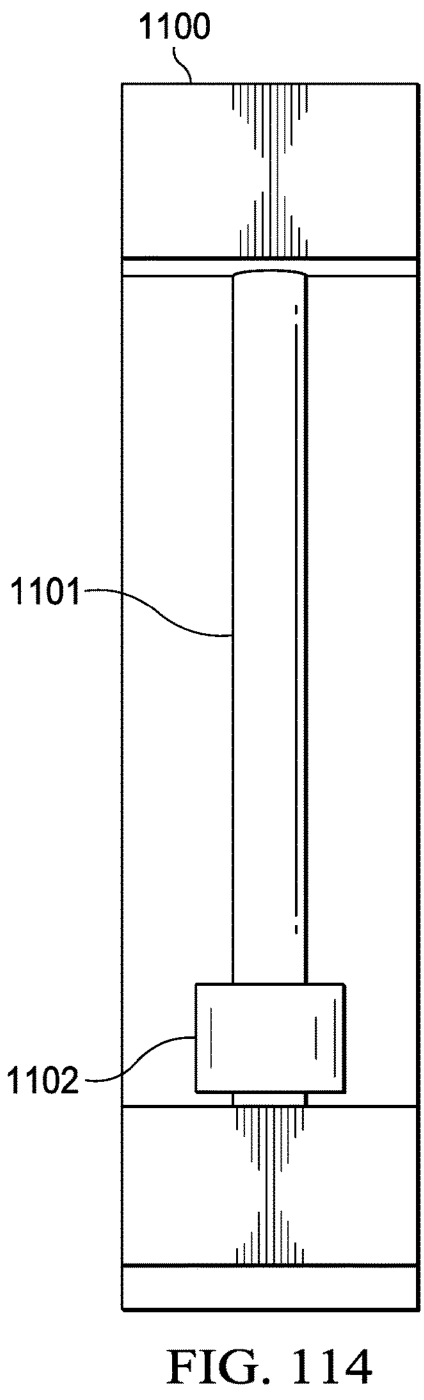
FIG. 114 is a front view of the embodiment of FIG. 112.

FIG. 114 shows a front side view of the same embodiment 1100 of the present disclosure that is illustrated in FIGS. 112 and 113.

Figure 115:
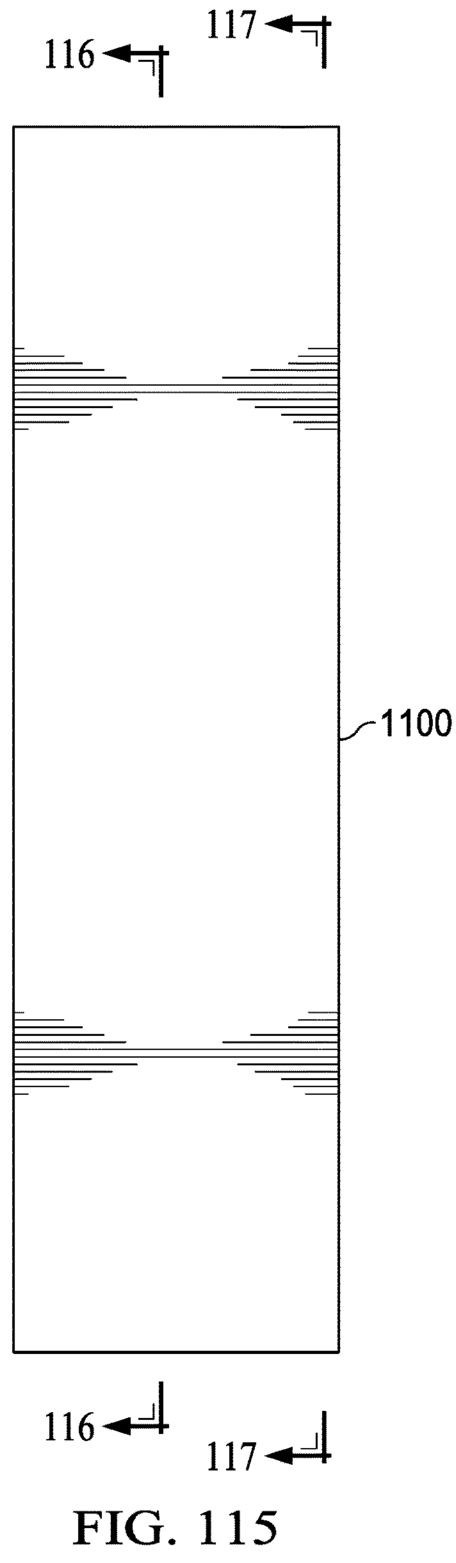
FIG. 115 is a top view of the embodiment of FIG. 112.

FIG. 115 shows a top-down view of the same embodiment 1100 of the present disclosure that is illustrated in FIGS. 112-114.

Figure 116:
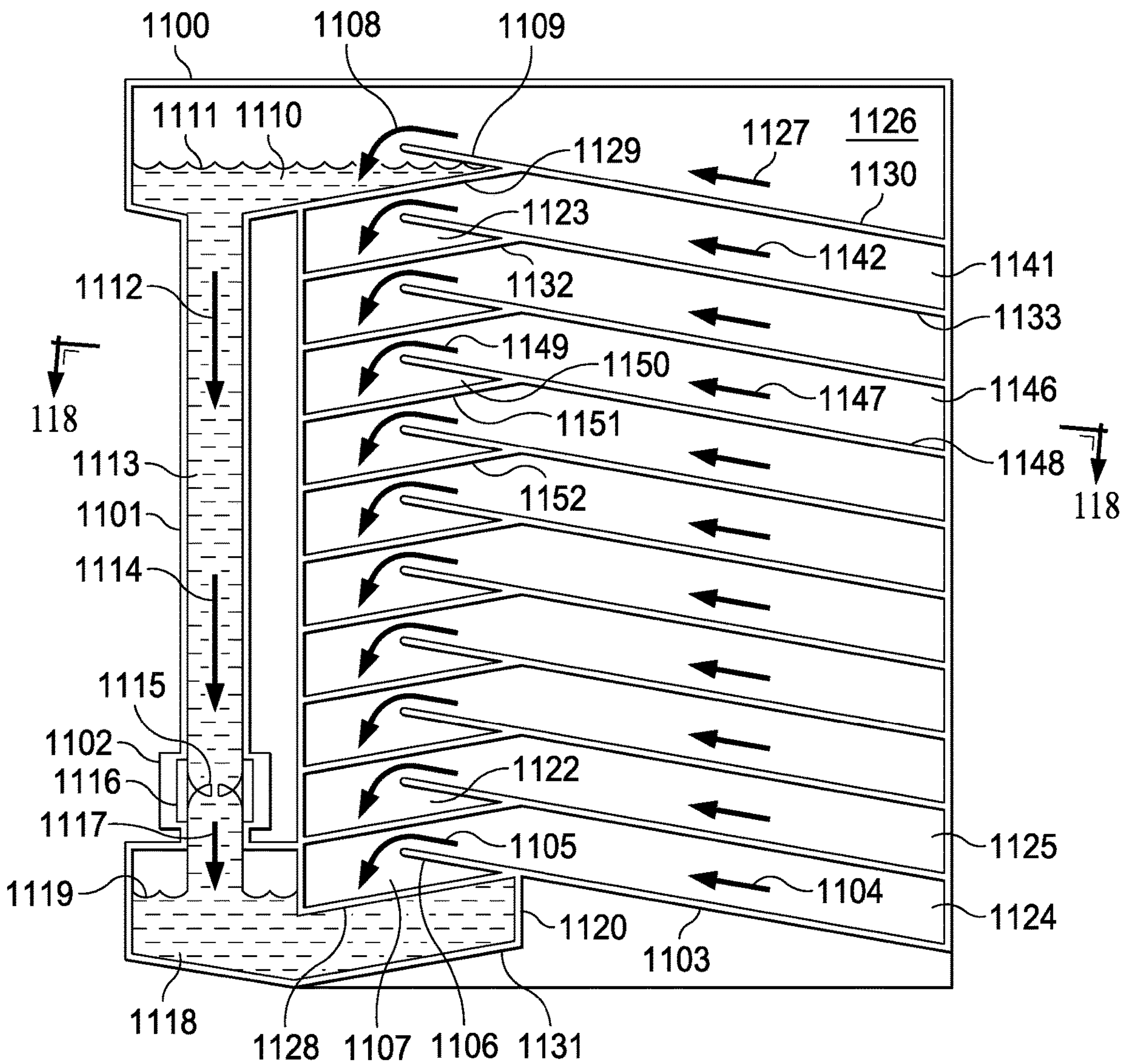
FIG. 116 is a cross sectional view of the embodiment of FIG. 112.

FIG. 116 shows a side sectional view of the same embodiment of the present disclosure that is illustrated in FIGS. 112-115 wherein the vertical section plane is specified in FIG. 115 and the section is taken across line 116-116.

The illustrated section discloses an approximately vertical first array of inclined ramps and/or flumes, e.g., 1103, of a first angularity, angle, and/or slope, up and over which a fluid, e.g., water, inside the embodiment is able to flow, e.g., 1104 from a respective basin, e.g., 1124. When the fluid flows, e.g., 1105, far enough along a flume, e.g., 1103, the fluid will tend to fall over a raised distal ramp edge and/or precipice, e.g., 1106, and become deposited, entrained, trapped, and/or captured, within a basin, spillway, and/or trough, e.g., 1107, positioned beneath each respective precipice and formed, instantiated, fabricated, and/or manifested, at least in part, by a floor, e.g., 1128. The fluid deposited into a spillway, e.g., 1107, is then able to flow up and over a complementary flume of a second angularity, angle, and/or slope, where the second slope is on opposite sign as the first slope with respect to a planar projection of the complementary ramps onto a Cartesian plot, i.e., if the ramps of the vertical array are ascending with respect to leftward flows (e.g. with respect to the orientation of the illustration in FIG. 116), then the respective complementary flumes will be ascending with respect to rightward flows (perhaps by the same or similar angle with respect to a longitudinal axis of the turbine pipe 1101, and perhaps by a different angle).

When fluid flowing 1127 from the uppermost basin 1126 on and/or over flume 1130 flows 1108 to and over the uppermost raised distal ramp edge and/or precipice 1109 is deposited, entrained, trapped, and/or captured, within the embodiment's high-energy fluid reservoir 1110, thereby tending to alter the height and/or level of that reservoir's surface 1111. A bottom wall of the high-energy fluid reservoir is comprised, at least in part, of a wall 1129. Fluid within the high-energy fluid reservoir is driven by gravity to flow 1112 downward within the interior channel 1113 of the turbine pipe 1101. Eventually, the fluid flows 1114 into and through hubless fluid turbine 1115 thereby imparting rotational energy to the generator 1116 of the fluid turbine assembly 1102, causing the generator to produce electrical power.

Effluent fluid flowing 1117 out of the hubless fluid turbine 1115 is deposited into the embodiment's low-energy fluid reservoir 1118 thereby tending to alter the height and/or level of that reservoir's surface 1119. The embodiment's low-energy fluid reservoir 1118 is held, entrained, trapped, and/or captured, within a basin 1120, comprised at least in part by a bottom wall 1131, from which fluid is again drawn into the embodiment's PTO by flowing up and over a lowermost inclined ramp of a second approximately vertical array of inclined ramps (not visible in the section due to the placement of the section plane).

Please note that the fluid flows specified in FIG. 116 do not occur unless the embodiment is to a sufficient degree and/or angle tilted (to the left, and/or in a counterclockwise direction, with respect to the embodiment orientation illustrated in FIG. 116, i.e., with the lower-right corner of the illustrated embodiment raised to an elevation and/or height sufficiently greater than the elevation and/or height of the lower-left corner). The flows indicated and discussed with respect to FIG. 116 are illustrative of the actual flows that would occur in response to a favorable tilting of the embodiment. The fluid in the high-energy and low-energy fluid reservoirs show horizontal and/or flat, resting and/or untilted surfaces. However, in the event of tilting, the surfaces of those reservoirs would altered to remain normal to the force of gravity and/or tangentially parallel to an average surface of the Earth.

Figure 117:
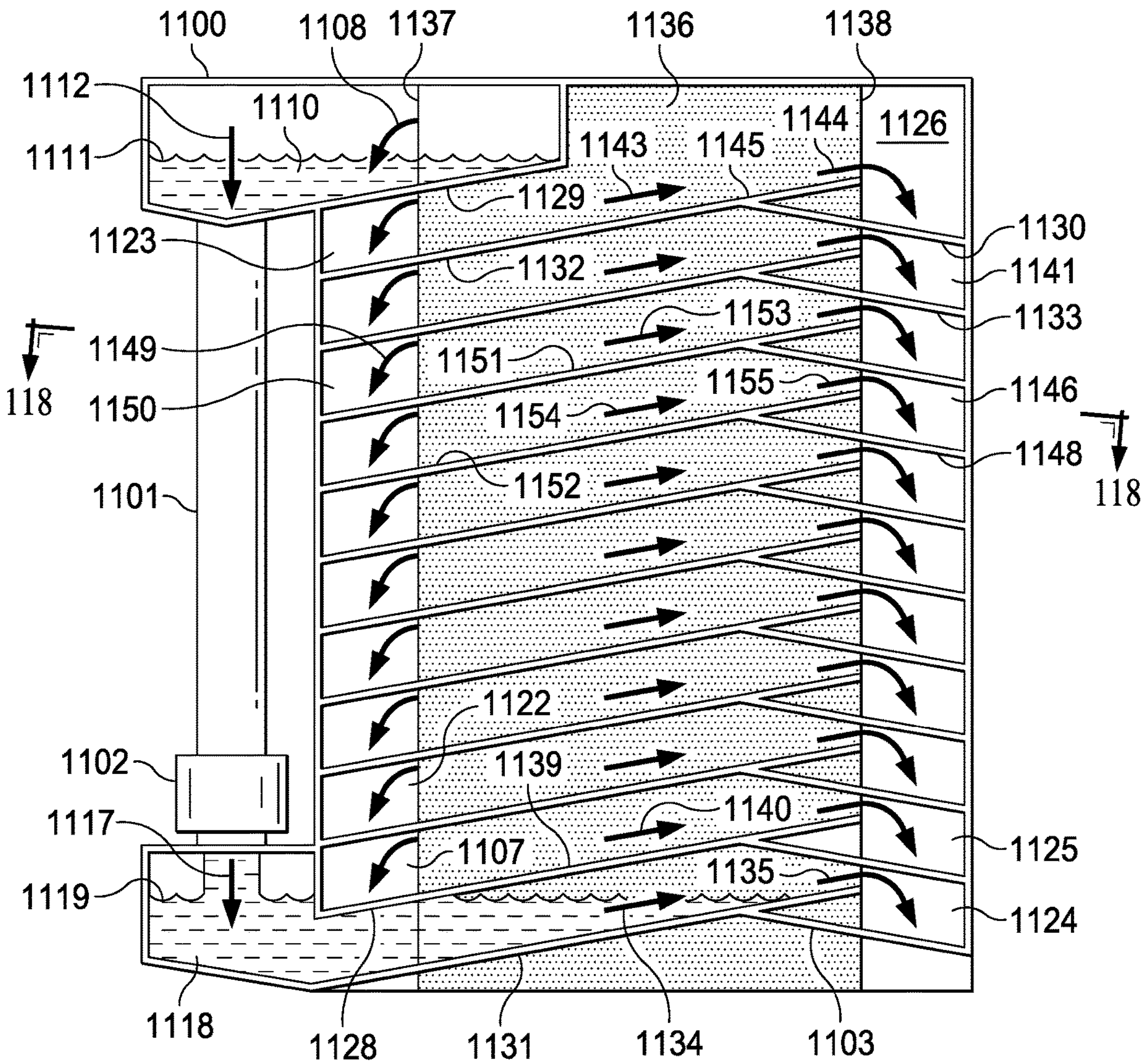
FIG. 117 is another cross sectional view of the embodiment of FIG. 112.

FIG. 117 shows a side sectional view of the same embodiment of the present disclosure that is illustrated in FIGS. 112-116 wherein the vertical section plane is specified in FIG. 115 and the section is taken across line 117-117. Please note that the sectional illustration of FIG. 117 reveals a portion of what was revealed by the sectional illustration of FIG. 116.

The sectional illustration of FIG. 117 includes virtually the entire interior of the embodiment (i.e., simply removing by section the foremost lateral wall) whereas the sectional illustration of FIG. 116 included only the backmost portion of the embodiment's interior. The sectional illustration of FIG. 116 removed by section the second array of inclined ramps and/or flumes, and a medial wall and/or barrier that separates the adjacent first and second arrays of inclined ramps. Thus the medial wall separating the first and second arrays of flumes may be seen in the sectional illustration of FIG. 117, as well as the second array of flumes in the foreground of that medial wall. A portion of the first array of flumes (revealed without obstruction in the sectional illustration of FIG. 116) may be seen behind the medial wall in the sectional illustration of FIG. 117.

In response to a favorable tilt of the embodiment 1100, fluid 1118 pooled within the embodiment's low-energy fluid reservoir 1118 flows 1134 up, and along, flume 1131 there after flowing 1135 over the precipice at the end of that flume, thereby falling into basin 1124. Fluid pooled, deposited, collected, and/or standing, in basin 1124, will, in response to a favorable tilt, then flow (1104 in FIG. 116) up flume 1103, positioned on the far side (with respect to the embodiment orientation illustrated in FIG. 117) of the medial wall 1136, with relative left 1137 and right 1138 edges, and flow 1105 into basin 1107. Fluid pooled, deposited, collected, and/or standing, in basin 1107, will, in response to a favorable tilt, then flow up a complementary flume 1139 and flow 1140 into basin 1125.

This process of fluid in the embodiment flowing up and over the precipice of one flume, and subsequently being depositing into a respective basin adjacent to a first vertical edge and/or side of the medial wall separating complementary flumes and/or arrays of flumes, and thereafter flowing up and over the precipice of a complementary (e.g., a flume of an opposite slope) flume, and subsequently being depositing into a respective basin adjacent to a second and/or opposite vertical edge and/or side of the medial wall, continues until the fluid is lifted, elevated, and/or flows into the embodiment's high-energy fluid reservoir 1110.

Fluid pooled, deposited, collected, and/or standing, in basin 1141, will, in response to a favorable tilt, flow (1142 in FIG. 116) up a flume 1133 and flow over that flume's precipice and be deposited into basin 1123. Fluid pooled, deposited, collected, and/or standing, in basin 1123, will, in response to a favorable tilt, flow 1143 up a complementary flume 1132 and flow 1144 over that flume's precipice 1145 and be deposited into basin 1126. Fluid pooled, deposited, collected, and/or standing, in basin 1126, will, in response to a favorable tilt, flow (1127 in FIG. 116) up a complementary flume 1130 and flow 1108 over that flume's precipice 1109 and be deposited into the embodiment's high-energy fluid reservoir 1110.

Fluid pooled, deposited, collected, and/or standing, in the embodiment's high-energy fluid reservoir 1110 flows, in response to the pull of gravity, into and through turbine pipe 1101 wherein it flows through, energizes, and causes to rotate a hubless fluid turbine (1115 in FIG. 116) thereby imparting rotational kinetic energy to the hubless fluid turbine's operably-connected generator (1116 in FIG. 116), thereby causing the generator to produce electrical power. The fluid effluent flowing 1117 out of the turbine pipe 1101 is deposited into the embodiment's low-energy fluid reservoir, and will, in response to a favorable tilt of the embodiment, flow up flume 1131 and into basin 1124, and begin the tilt-energized electrical power production cycle again.

Please note that the fluid flows specified in FIG. 117 do not occur unless the embodiment is to a sufficient degree and/or angle tilted (to the right, and/or in a clockwise direction, with respect to the embodiment orientation illustrated in FIG. 117, i.e., with the lower-left corner of the illustrated embodiment raised to an elevation and/or height sufficiently greater than the elevation and/or height of the lower-right corner). The flows indicated and discussed with respect to FIG. 117 are illustrative of the actual flows that would occur in response to a favorable tilting of the embodiment. The fluid in the high-energy and low-energy fluid reservoirs show horizontal and/or flat, resting and/or untilted surfaces. However, in the event of tilting, the surfaces of those reservoirs would altered to remain normal to the force of gravity and/or tangentially parallel to an average surface of the Earth.

The cyclic clockwise and counterclockwise tilting of the embodiment illustrated in FIGS. 112-117, when that tilting is of sufficient degree, angularity, and/or extent, and of sufficient duration, and/or period, will cause fluid to incrementally flow from basin to basin within the embodiment until that fluid is deposited within the high-energy fluid reservoir and imparts a portion of its energy, stored within the fluid as gravitational potential energy, to the fluid turbine within the turbine pipe, thereby enabling the generator operably-connected to the fluid turbine to produce electrical power.

Figure 118:
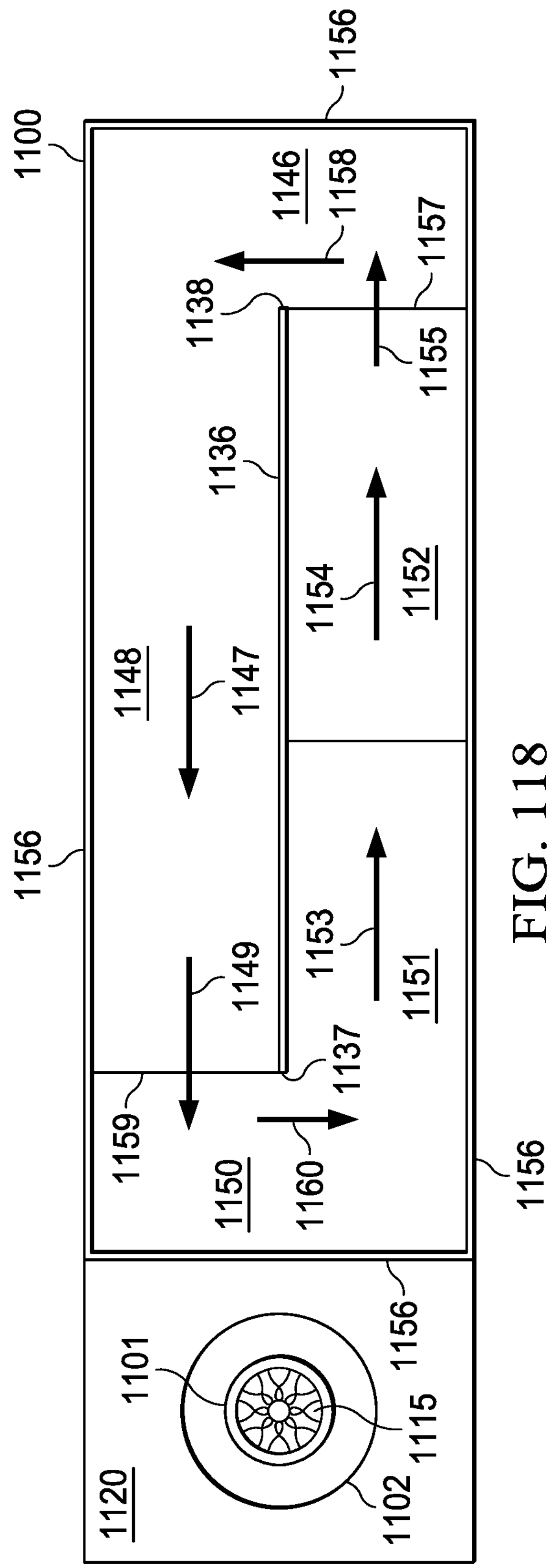
FIG. 118 is a top down cross sectional view of the embodiment of FIG. 112.

FIG. 118 shows a top-down sectional view of the same embodiment of the present disclosure that is illustrated in FIGS. 112-117 wherein the slanted, but approximately horizontal, section plane is specified in FIGS. 116 and 117 and the section is taken across line 118-118.

Chamber 1120 entrains, holds, stores, and/or encloses, the embodiment's low-energy fluid reservoir (1118 in FIGS. 116 and 117). The adjacent flume arrays are encased within four lateral outer walls 1156. The first array of flumes (e.g., 1103, 1130, 1133, and 1148 in FIG. 116) is separated from the second array of flumes (e.g., 1131, 1132, 1139, 1151, and 1152 in FIG. 117) by medial wall 1136, which is characterized by left 1137 and right 1138 vertical edges.

Fluid flowing 1154 up flume 1152 flows 1155 over precipice 1157 and is deposited into basin 1146. Fluid then flows 1158 laterally within basin 1146 from the side of that basin below (with respect to the illustration in FIG. 118) the medial wall 1136, and adjacent to medial wall edge 1138, to the side of that basin above the medial wall, after which it flows 1147 up flume 1148 until it flows 1149 over precipice 1159 and is deposited into basin 1150. Fluid then flows 1160 laterally within basin 1150 from the side of that basin above (with respect to the illustration in FIG. 118) the medial wall 1136, and adjacent to medial wall edge 1137, to the side of that basin below the medial wall, after which it flows 1153 up flume 1151 passing above the section plane and out of the illustration's field of view.

The embodiment illustrated in FIGS. 112-118 is an example and is not a limitation on the scope of the present invention. The angles of the flumes are arbitrary and embodiments with flumes of any angle, and any variety of angles, are included in the scope of the present invention.

The embodiment illustrated in FIGS. 112-118 may be mounted to a buoy, ship, vessel, autonomous surface vessel (ASV), autonomous underwater vehicle (AUV), unmanned underwater vehicle (UUV), and to any other vessel, vehicle, floating object, or anchored, tethered, or moored object. All combinations of the embodiment illustrated in FIGS. 112-118 are included within the scope of the present invention.

The embodiment illustrated in FIGS. 112-118 comprises only a single first, and a single second, array of flumes. However, other embodiments included within the scope of the present invention incorporate, include, and/or utilize, two or more complementary pairs of first and second flume arrays. All such embodiments are included within the scope of the present invention.

The embodiment illustrated in FIGS. 112-118 comprises a particular number of flumes per flume array. However, other embodiments included within the scope of the present invention incorporate, include, and/or utilize, one, two, three, and any number of flumes per flume array. All such embodiments are included within the scope of the present invention.

An embodiment similar to the one illustrated in FIGS. 112-118 utilizes water as its fluid, and air as the gas through which the water flows. However, other embodiments included within the scope of the present invention incorporate, include, and/or utilize, other types, kinds, and/or mixtures of fluids, both liquid and gaseous. All such embodiments are included within the scope of the present invention.

The embodiment illustrated in FIGS. 112-118 comprises flumes of particular widths and lengths. However, other embodiments included within the scope of the present invention incorporate, include, and/or utilize, flumes of different widths and/or different lengths. All such embodiments are included within the scope of the present invention.

The embodiment illustrated in FIGS. 112-118 incorporates, includes, and/or utilizes, a hubless fluid turbine and an operably-connected generator. However, other embodiments included within the scope of the present invention incorporate, include, and/or utilize, other types of fluid turbines and/or other types of generators. Some embodiments do not utilize a turbine and instead utilize the circulated fluid (e.g., stirring) and/or the fluids gravitational potential energy for another useful purpose. Some embodiments do not utilize an electrical generator and instead utilize the head pressure of their respective elevated fluids to create some other type of energy (e.g., compressed air, compressed hydraulic fluid) or to perform some type of useful work (e.g., raising a fluid out of a body of freshwater buffeted by waves to an elevated location on an adjacent shoreline).

The embodiment illustrated in FIGS. 112-118 is designed to be mounted to, and/or used in conjunction with, a wave-buffeted platform floating on a body of water. However, other embodiments included within the scope of the present invention are mounted to, and/or combined with, or used in conjunction with, other devices characterized by, and/or capable of imparting to an embodiment, the rocking and/or tilting motion required for it to operate. All such embodiments are included within the scope of the present invention.

The embodiment illustrated in FIGS. 112-118 may be combined with the seafloor-mounted, near-shore wave-driven apparatus illustrated in FIGS. 72-86. In fact, the embodiment of the present disclosure disclosed in FIGS. 112-118 is similar to the power take off (PTO) incorporated, included, and/or utilized, within the embodiment illustrated in FIGS. 72-86. A difference between the two PTOs is that the PTO of the embodiment illustrated in FIGS. 72-86 uses inclined ramps to deposit fluid into a basin that is characterized by a horizontal bottom and uses precipices that have a vertical wall beneath each precipice (e.g., similar to a "cliff"). Whereas the PTO of FIGS. 112-118 uses inclined ramps to deposit fluid into a basin that is an extension of the inclined ramp arising and/or ascending from it, and uses precipices that are extensions of the end of each inclined ramp so that the void beneath each precipice provides each respective basin with additional volume in which to entrain and/or hold fluid.

Embodiments of the present disclosure similar to the one illustrated in FIGS. 87-89 incorporate, include, and/or utilize, power take offs of the kinds illustrated in FIGS. 12-14, 25-37, 41-54, and 63-67. The scope of the present invention includes embodiments which incorporate, include, and/or utilize, other versions, alternatives, variations, modifications, and/or alterations of the wave- and/or tilt-induced water-lifting power take offs illustrated and explained herein as examples of the present disclosure. The scope of the present invention is not limited to the examples which have been provided for the purpose of explanation. The examples of the present disclosure included herein are not limitations in any respect on the scope of the present invention.

An embodiment of the present disclosure comprises a first set of basins out of which fluid can flow through respective first set of inclined channels in response to a tilt and/or a rotation of the embodiment in a first direction, and a second set of basins out of which fluid can flow through respective second set of inclined channels in response to a tilt and/or a rotation of the embodiment in a second direction, wherein fluid flows out of at least one of the first set of inclined channels so as to be deposited in at least one of the second set of basins that is further from the source of the fluid being elevated by the embodiment than was the basin from which fluid flowed into the at least one of the first set of inclined channels, wherein fluid flows out of at least one of the second set of inclined channels so as to be deposited in at least one of the first set of basins that is further from the source of the fluid being elevated by the embodiment than was the basin from which fluid flowed into the at least one of the second set of inclined channels, and wherein the first direction of tilt is opposite the second direction of tilt with respect to a plane through which the embodiment tilts and a gravitational unit vector about which the embodiment tilts within the plane.

An embodiment of the present disclosure incorporates, includes, and/or utilizes, Tesla valves within a plurality of channels through which fluid flows back and forth, thereby being raised to greater elevations, when the embodiment is tilted in favorable directions, to sufficient degrees of tilting, and for sufficient periods of time in tilted orientations.

Embodiments of the present disclosure incorporate, include, and/or utilize, as their working fluids, liquids that include, but are not limited to: water, seawater, salted water, aqueous solutions, oil, hydraulic fluid, petrochemicals, liquid nitrogen, liquified hydrogen, aqueous slurries, hydrocarbon slurries, and other types of slurries.

Embodiments of the present disclosure incorporate, include, and/or utilize, as the gaseous compliments to their working fluids, gases that include, but are not limited to: air, nitrogen, carbon dioxide, hydrogen, oxygen, water vapor, methane, and ammonia.

Embodiments of the present disclosure incorporate, include, and/or utilize, pairs of working fluids of differing densities, such that the fluid of greater density is the one elevated by the embodiment, and the fluid of lesser density is the one that tends to either not flow or flow in an opposite or complementary direction to the direction in which the fluid of greater density flows.

Embodiments of the present disclosure incorporate, include, and/or utilize, are operated in an inverted orientation to that shown in the figures herein. These embodiments utilize favorable tilting to move a gas downward, thereby tending to pressurize the gas as it is incrementally moved, and/or as it incrementally flows, downward. Such embodiments may use the pressurized air to drive an air turbine, or to perform some other useful work.

Embodiments of the present disclosure operate a variety of internal pressures. An embodiment utilizes favorable tilting to elevate fluids within a highly pressurized interior. Another embodiment utilizes favorable tilting to elevate fluids within an interior at low pressure, or near vacuum.

Many varieties of embodiments have been disclosed as examples and illustrations of the present disclosure, and some of those embodiments incorporate features, components, elements, designs, and/or attributes, that are illustrated only for a single or very few of the embodiments. The scope of the present invention includes any and all combinations, recombinations, arrangements, variations, permutations, and alterations, of the features, components, elements, designs, and/or attributes, of the illustrated embodiments regardless of the relative numbers of illustrated embodiments for which those features, components, elements, designs, and/or attributes, were included.

Figure 119:
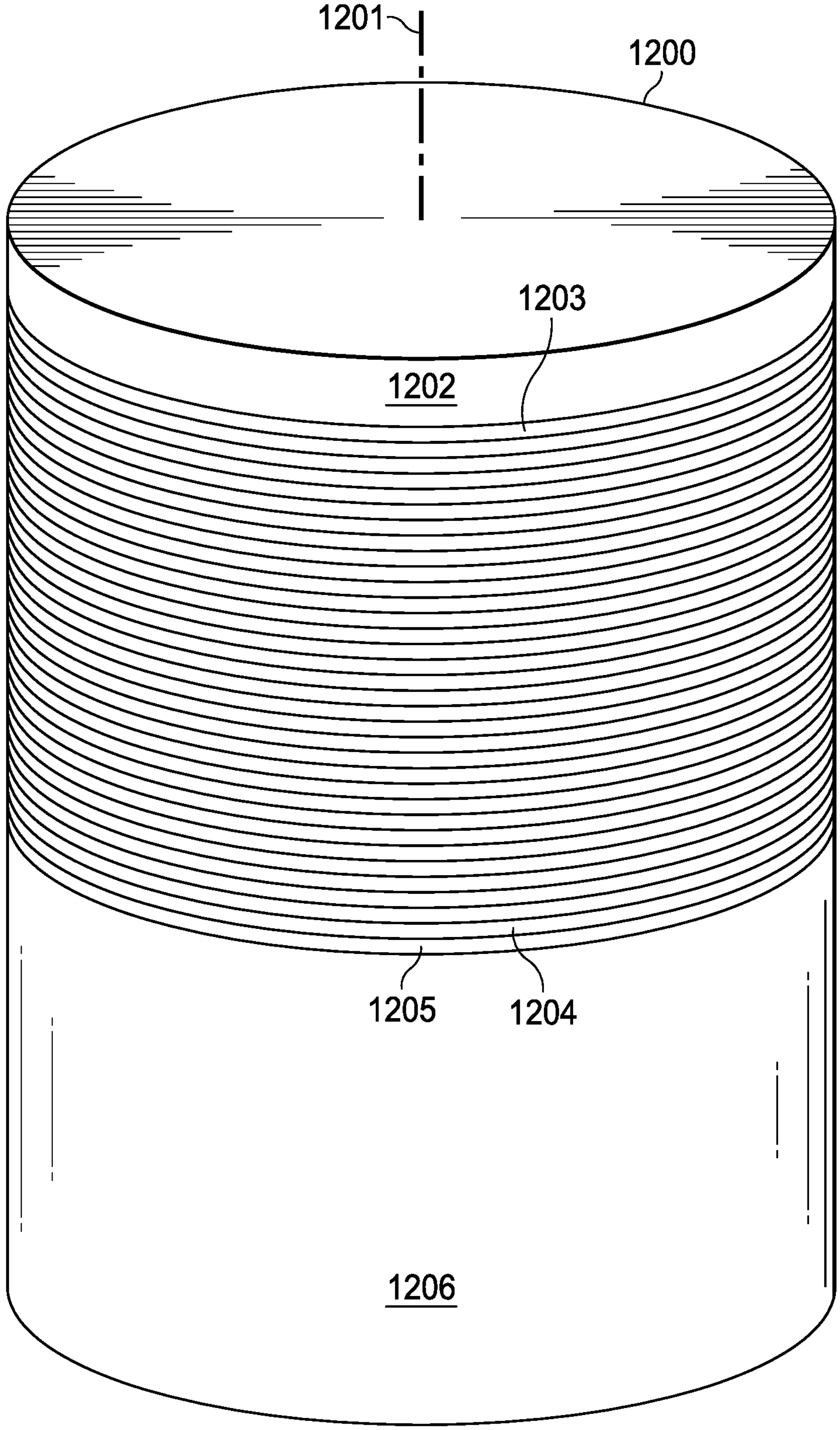
FIG. 119 is an elevated perspective view of another embodiment of present invention

FIG. 119 shows a side perspective view of an embodiment of the present disclosure.

In response to tilting of the embodiment 1200 about a longitudinal axis 1201 of the embodiment having approximate radial symmetry, nominally as a result of wave action at the embodiment while the embodiment floats and/or is suspended within and/or at the surface of a body of water, a fluid (nominally water) is gravitationally driven to flow up upwardly inclined ramps from respective source fluid reservoirs to be deposited within respective deposition fluid reservoirs. Fluid is first drawn and lifted from a base fluid reservoir (not visible) of minimal gravitational potential energy after which it is serially, incrementally, and/or successively, driven by repeated tilting of the relative orientation of gravitational force within the embodiment, to flow up from source fluid reservoirs to deposition fluid reservoirs, where the deposition fluid reservoirs are of greater and/or increased height above the embodiment's base fluid reservoir than are the source fluid reservoirs from which the fluid flowed, with each fluid deposition reservoir serving as the source fluid reservoir for a subsequent tilt, e.g., a tile in an approximately opposite direction to the tilt which drove fluid into it.

From an uppermost fluid reservoir, fluid drains and/or flows into one of a plurality of power-take-off pipes (not visible) and therethrough into and through one of a respective plurality of fluid turbines (not visible) each of which is operatively connected to a respective electrical generator (not visible). Each electrical generator produces electrical power in response to a flow of fluid down and through its respective power-take-off pipe.

The embodiment illustrated in FIG. 119 is marked by a plurality of coaxial cylindrical segments. At the top of the embodiment is an uppermost fluid reservoir encased by an outer casing 1202 comprising upper circular and lateral cylindrical casing walls. And below it, and fluidly connected to it, are 34 elevation levels, each encased within a lateral and/or circumferential outer casing wall, e.g. 1203-1205, each elevation level tending to raise fluid by a height equal to the height of each elevation level in response to a pair of complementary tilts (e.g. a tilt in one relative azimuthal direction followed by a tilt in an approximately opposite relative azimuthal direction). Finally, below the elevation levels is a base fluid reservoir, encased by an outer casing comprising lower circular (not visible) and lateral cylindrical casing walls 1206, from which fluid is raised by the favorable tilting of the embodiment, and to which fluid is returned from the uppermost fluid reservoir after having flowing through a fluid turbine and/or other flow governor.

While the illustrations in FIGS. 119 and 142, for the purpose of improved clarity of explanation, show the embodiment as though it were comprised of segmented and/or distinct functional units, and their respective segmented outer casings, an embodiment similar to the one illustrated in FIGS. 119-142 is an integrated assembly housed within an integrated and virtually seamless cylindrical casing.

In response to a plurality (e.g. at least 34) favorable tilts (i.e. tilts characterized by azimuthal angles, zenith angles, and durations sufficient to cause fluid to flow within the embodiment from one or more fluid reservoirs of respective first elevations to one or more complementary fluid reservoirs of respective second elevations where the second elevations are greater than the respective first elevations) the embodiment illustrated in FIG. 119 raises fluid from its base fluid reservoir (not visible within outer casing 1206) to its uppermost fluid reservoir (not visible within outer casing 1202), after which the raised fluid enters and descends through a power-take-off pipe (not visible) and therethrough flows through a fluid turbine and returns to the base fluid reservoir from which it was raised—generating electrical power in the process.

After a sufficient number of favorable tilts, fluid within the embodiment 1200 has been raised by height approximately equal to the height of each of the 34 elevation segments, and the total gravitational potential energy of the raised fluid is approximately equal to the total height of the 34 elevation segments. The embodiment illustrated in FIGS. 119-144 is characterized by particular inclination angles of ramps, vertical separation of fluid reservoirs (e.g. heights of elevation levels), numbers of elevation segments, diameter, fluid reservoir volumes, etc., all of which are to a degree arbitrary.

The scope of the present disclosure includes embodiments possessing unique, different, and/or all variety of inclination angles of ramps, vertical separation of fluid reservoirs (e.g. heights of elevation levels), numbers of elevation segments, diameter, fluid reservoir volumes, etc.; as well as those possessing unique, different, and/or all variety of horizontal cross-sectional shapes (e.g. circular, elliptical, hexagonal, square, rectangular, and irregular), vertical cross-sectional shapes (e.g. rectangular, square, elliptical, hourglass, and irregular), 3D shapes (e.g. cylindrical, cuboidal, prismatic, and irregular).

The scope of the present disclosure includes embodiments which raise, process, and/or act upon any and all types of fluids, including, but not limited to: water, seawater, salted water, ammonia, metallic slurries, fluidic suspensions, liquid metals, and mercury. The scope of the present disclosure includes embodiments which are otherwise filled with any and all types of gases (through which the respective fluids flow), including, but not limited to: air, nitrogen, ammonia, and carbon dioxide.

The scope of the present disclosure includes embodiments which operate in an orientation inverted with respect to the embodiment orientation illustrated in FIG. 119. These embodiments tend to raise, process, and/or act upon any and all types of gases and/or gaseous fluids (e.g. driving those gases downward toward the "uppermost fluid reservoir" which is in this context below the base fluid reservoir) after which the lowered gases flow upward through the power-take-off pipes and through air turbines (causing operatively connected electrical generators to produce electrical power) before returning to the air stored within the now-uppermost base fluid reservoir.

Figure 120:
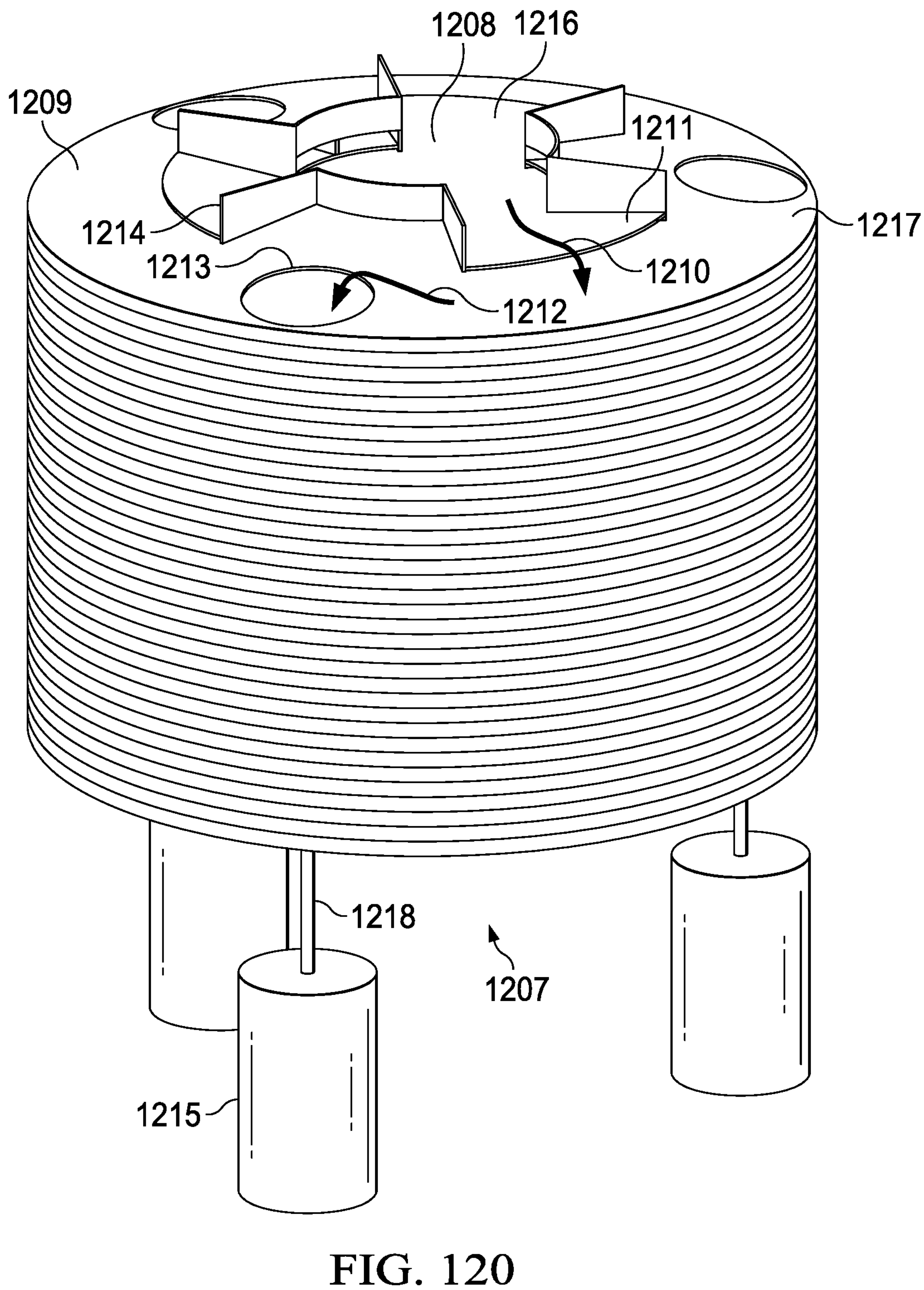
FIG. 120 is a perspective view of interior components of the embodiment of FIG. 119.

FIG. 120 shows a side perspective view of the same embodiment of the present disclosure that is illustrated in FIG. 119. The illustration in FIG. 120 omits the outer casing walls, e.g. 1202-1206, illustrated in FIG. 119, which together encapsulate and/or seal the embodiment's interior thereby preventing the passage of fluid out of that interior as well as preventing the passage of outside matter into that interior, in order to facilitate the reader's inspection of the internal components of which the embodiment is comprised.

Fluid present in the embodiment's base fluid reservoir 1207 tends to be of sufficient level and/or volume to cause a portion of the fluid to be present on and/or at the lowermost end of the embodiment's lowermost upwardly inclined ramps (not visible). In response to a favorable tilt of the embodiment a portion of the fluid at the lowermost end of at least one of the embodiment's lowermost upwardly inclined ramps will tend to flow up the inclined ramp(s) toward the center of the embodiment, and/or toward the longitudinal axis of the embodiment. If such a favorable tilt is of sufficient duration (e.g. with respect to the length(s) of the inclined ramp(s), the relative angle(s) between gravity and the flow axis(axes) of the inclined ramp(s), and the viscosity of the fluid) then a portion of the flowing fluid will tend to reach and be deposited within a lowermost central fluid reservoir (e.g. not visible and similar to the embodiment's uppermost central fluid reservoir 1208).

A continuation of that same favorable tilt will tend to result in fluid continuing to flow up one or more of the inclined ramp(s) of the central fluid reservoir away the center of the embodiment following its deposition therein into the lowermost central fluid reservoir (not visible). And, if this same favorable tilt is of sufficient duration then a portion of the still flowing fluid will tend to reach and be deposited within a lowermost peripheral fluid reservoir (e.g. not visible and similar to the embodiment's uppermost peripheral fluid reservoir 1209).

An end of the initial favorable tilt will tend to result in the fluid deposited into the lowermost central fluid reservoir (not visible) being trapped therein due to the increase in the gravitational potential energy that must be overcome in order for the fluid to continue flowing as a result of the reorientation of the relative alignment of gravity associated with the end of the favorable tilt.

A sufficient number of favorable tilts will tend to result in the raising and/or upward flowing of fluid from the base fluid reservoir 1207 to the uppermost central fluid reservoir 1208. A subsequent favorable tilt, or a continuation of the prior favorable tilt, will tend to drive fluid within the uppermost central fluid reservoir to flow 1210 up and off the end of at least one of the inclined ramps, e.g. 1211, radiating away from the uppermost central fluid reservoir thereby causing a portion of that fluid to be deposited into the embodiment's uppermost peripheral fluid reservoir 1209.

A portion of any fluid deposited into the embodiment's uppermost peripheral fluid reservoir 1209 will tend to flow 1212 into and down one of the embodiment's three power-take-off pipes, e.g. 1213. Fluid flowing down and through one of the embodiment's power-take-off pipes will encounter and engage a fluid turbine (e.g. water turbine, not visible) which will extract as mechanical energy a portion of the accumulated fluid head and/or gravitational potential energy of the descending fluid thereby causing an electrical generator, e.g. 1215, operatively connected to the fluid turbine by a turbine shaft, e.g. 1218, to generate electrical power. The effluent of each of the embodiment's fluid turbines flows back into the embodiment's base fluid reservoir 1207 from where it may again be raised by the embodiment's inclined ramps to the embodiment's uppermost peripheral fluid reservoir 1209.

Barrier walls, e.g. 1214, prevent fluid deposited within the embodiment's uppermost peripheral fluid reservoir 1209 from returning to, and/or flowing back down and into, the relatively lower uppermost central fluid reservoir 1208 from which it originated.

The lower surface which establishes and/or entrains the embodiment's uppermost central fluid reservoir 1208 is provided by a central circular structure primarily comprised of a conical plate 1216 characterized by cone that expands upwardly as one moves away from its center, i.e. the height of any annular section of the cone is positively correlated with the radial distance of that annular section from the cone's center, and one in which inclined ramps, e.g. 1211, are formed as upwardly projected radial extensions of the central conical plate.

Similarly, the lower surface which establishes and/or entrains the embodiment's uppermost peripheral fluid reservoir 1209 is provided by an annular structure primarily comprised of a frustoconical plate 1217 that expands upwardly as one moves toward its radial center, i.e. the height of any annular section of the frustoconical plate is inversely correlated with the radial distance of that annular section from the plate's center, and one in which inclined ramps, e.g. 1211, are formed as upwardly projected radial convergences originating near the periphery of the plate and extending, in an upward manner, toward the longitudinal axis at the center of the plate.

Figure 121:
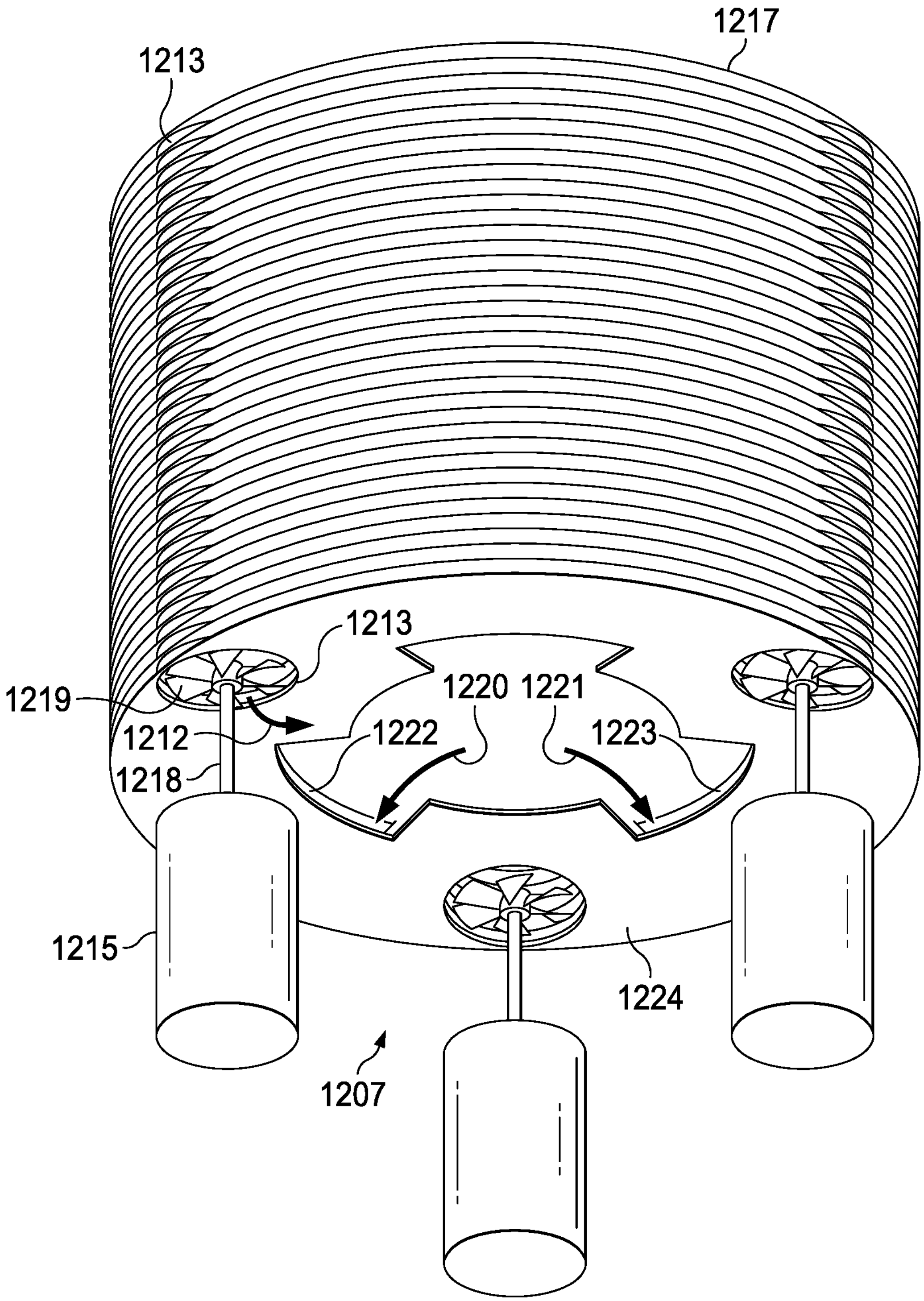
FIG. 121 is an upward perspective view of the embodiment of FIG. 120.

FIG. 121 shows a bottom-up perspective view of the same embodiment of the present disclosure that is illustrated in FIGS. 119 and 120. As does the illustration in FIG. 120, the illustration in FIG. 121 omits the outer casing walls, e.g. 1202-1206, illustrated in FIG. 119, which together encapsulate and/or seal the embodiment's interior thereby preventing the passage of fluid out of that interior as well as preventing the passage of outside matter into that interior, in order to facilitate the reader's inspection of the internal components of which the embodiment is comprised.

Fluid that has been raised to the uppermost peripheral fluid reservoir (1209 in FIG. 120) tends to flow into one of three power-take-off pipes, e.g. 1213, through which it tends to flow down and through a respective fluid turbine, e.g. 1219, thereby causing that fluid turbine to rotate thereby causing an operatively connected turbine shaft, e.g. 1218, to rotate. Rotations of the turbine shaft, e.g. 1218, tend to cause an operatively connected electrical generator, e.g. 1215, to produce electrical power (which is then transmitted to an electrical load, not shown, by electrical conductors, not shown). After flowing through a fluid turbine, e.g. 1219, fluid flowing down through a power-take-off pipe, e.g. 1213, is returned to the embodiment's base fluid reservoir 1207 nominally contained, entrained, held, and/or stored, within the base fluid reservoir outer casing (1206 in FIG. 119).

Fluid from the base fluid reservoir 1207 tends to flow, e.g. 1220 and 1221, into three ramp apertures, e.g. 1222 and 1223, which would accommodate the inclined ramps radiating outward and upward from a lower central fluid reservoir conical plate. However, the peripheral fluid reservoir frustoconical plate 1224 is the lowestmost peripheral or central fluid reservoir conical plate in the embodiment, so these ramp apertures are unobstructed by ramps and fluid from the base fluid reservoir is therefore able to flow on to and/or into the lowermost peripheral fluid reservoir through any and/or all of these apertures, and from that lowestmost peripheral fluid reservoir fluid may be incrementally raised, lifted, elevated, and/or driven upwards through a fluidly interconnected network of peripheral and central fluid reservoirs and the inclined ramps that fluidly connect them.

Figure 122:
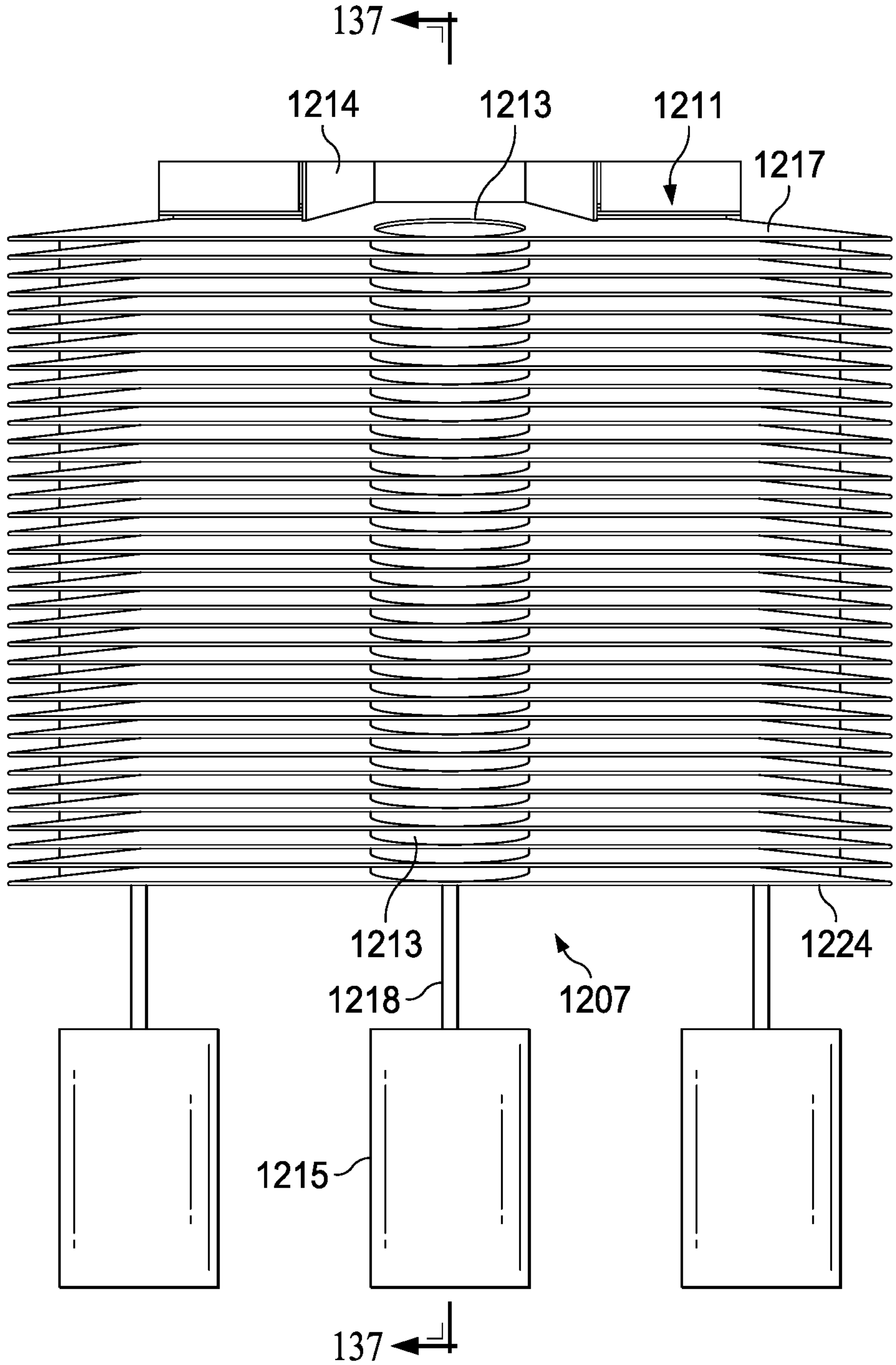

FIG. 122 shows a side view of the same embodiment of the present disclosure that is illustrated in FIGS. 119-121. As do the illustrations in FIGS. 120 and 121, the illustration in FIG. 122 omits the outer casing walls, e.g. 1202-1206, illustrated in FIG. 119, which together encapsulate and/or seal the embodiment's interior thereby preventing the passage of fluid out of that interior as well as preventing the passage of outside matter into that interior, in order to facilitate the reader's inspection of the internal components of which the embodiment is comprised.

Figure 123:
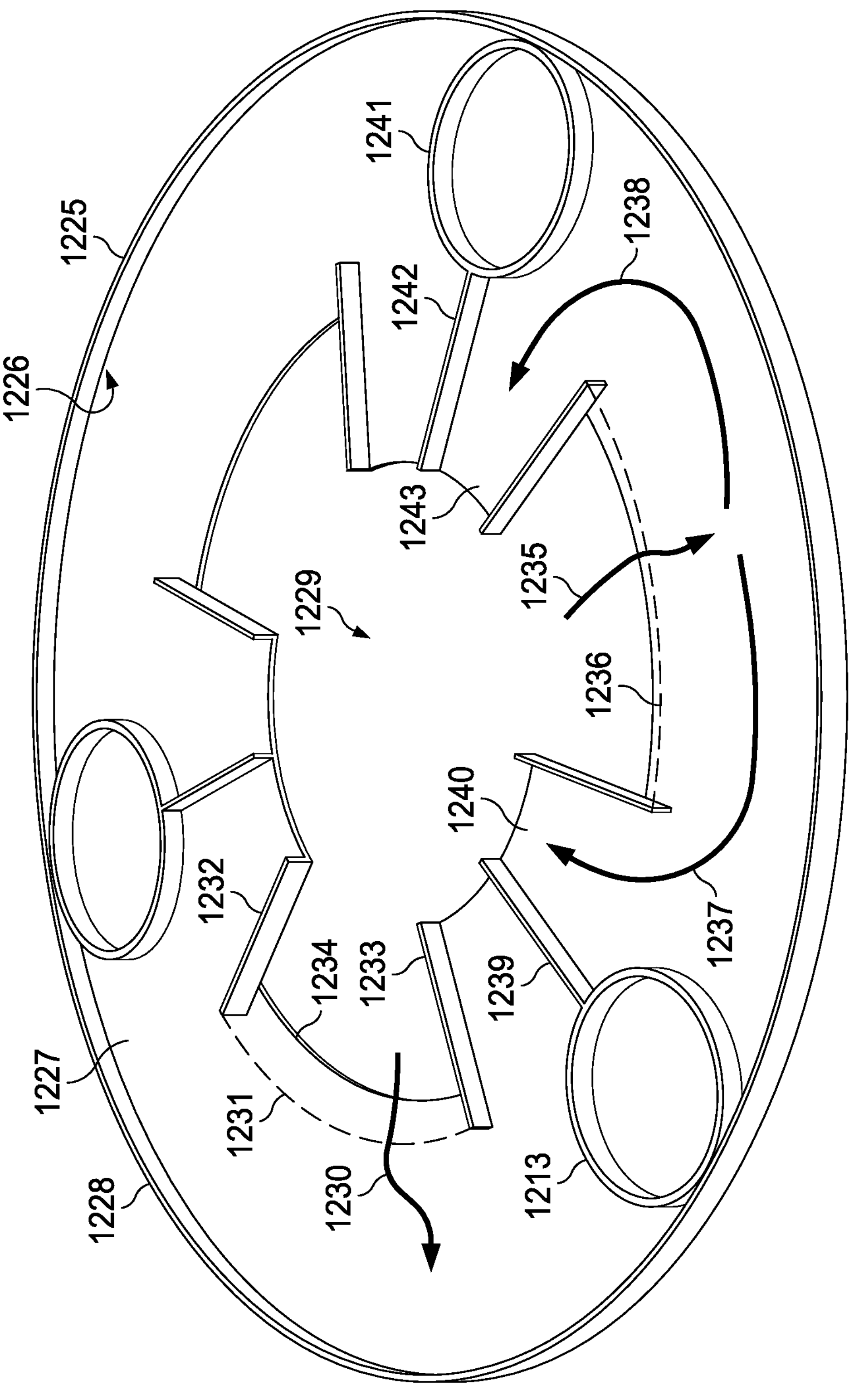

FIG. 123 shows a top-down perspective view of a typical and/or intermediary peripheral fluid reservoir frustoconical plate 1225, of which the embodiment illustrated in FIGS. 119-122 is in part comprised, and wherein only the uppermost peripheral fluid reservoir frustoconical plate (1217 in FIG. 120) of that embodiment is of a significantly altered design, configuration, and/or structure.

The circular junction 1226 and/or seam between the upper surface 1227 of a typical and/or intermediary peripheral fluid reservoir frustoconical plate 1225 and the inner surface of the cylindrical wall 1228 surrounding and/or defining the outer edge of that peripheral fluid reservoir frustoconical plate constitutes the lowest portion of a fluid reservoir entrained on and/or in a peripheral fluid reservoir frustoconical plate. By contrast, the upper surface at the lateral center of a typical and/or intermediary central fluid reservoir conical plate (not shown in FIG. 123) constitutes the lowest portion of a fluid reservoir entrained on and/or in a central fluid reservoir conical plate.

The diodic flow channel established and/or created within an embodiment of the present disclosure, such as the one illustrated in FIGS. 119-122, which successively raises, lifts, and/or elevates, a fluid is comprised, aside from its uppermost and lowermost ends, of a series of interleaved peripheral-frustoconical and central-conical fluid reservoir plates. In response to favorable tilting motions, the fluid within such an embodiment tends to flow toward, into, and through, the center of a central fluid reservoir, and then flow away that center of the central fluid reservoir and toward, and into, a peripheral fluid reservoir surrounding the central fluid reservoir.

The fluid tends to flow from a peripheral fluid reservoir to a central fluid reservoir and then back to a peripheral fluid reservoir, and then back to a central fluid reservoir, and so on . . . . Each time flowing into a fluid reservoir positioned so that its lowest reservoir boundary is at a greater height above and/or away from a respective base reservoir, than was the lowest reservoir boundary of the fluid reservoir from which it flowed, until the fluid eventually flows into a respective uppermost peripheral fluid reservoir, and then back to the respective base fluid reservoir from which it had been raised.

In order to accomplish, establish, define, and/or create this flow path the lowest portion of a peripheral fluid reservoir from which a fluid flows into and/or through an adjacent fluidly connected central fluid reservoir, is lower than the lowest portion of that fluidly connected central fluid reservoir. Likewise, the lowest portion of a central fluid reservoir from which a fluid flows out to and into an adjacent fluidly connected peripheral fluid reservoir, is lower than the lowest portion of that fluidly connected peripheral fluid reservoir. Each fluid reservoir (whether peripheral or central) into which a fluid flows has a lowest reservoir boundary that is higher than the lowest reservoir boundary of the fluid reservoir from which it flows.

The intermediary peripheral fluid reservoir frustoconical plate illustrated in FIG. 123 contains a central hole 1229 and/or cutout. Fluid flowing, e.g. 1230, out and over the distal edge, e.g. 1231, of an inclined ramp emanating from a central fluid reservoir conical plate having a lower reservoir than the illustrated peripheral fluid reservoir frustoconical plate will flow, e.g. 1230, down and into the higher peripheral fluid reservoir entrained by intermediary peripheral fluid reservoir frustoconical plate 1225. Such fluid cannot flow back into its respective underlying central fluid reservoir because of vertical ramp-separation walls, e.g. 1232 and 1233, as well as a seam, e.g. 1234, created by a bottom surface of the inclined ramp, e.g. 1231, of such a central fluid reservoir, and an upper surface 1227 of the intermediary peripheral fluid reservoir frustoconical plate.

Fluid that flows, e.g. 1235, out and over the distal edge, e.g. 1236, of an inclined ramp emanating from a central fluid reservoir conical plate having a lower reservoir than the illustrated peripheral fluid reservoir frustoconical plate will flow into, and/or create, a peripheral fluid reservoir on and/or within intermediary peripheral fluid reservoir frustoconical plate 1225. Subsequently, in response to a favorable tilt, a portion of that augmented peripheral fluid reservoir may flow circumferentially about and/or through the reservoir in a clockwise (from above) direction, e.g. flow 1237, or a portion of that augmented peripheral fluid reservoir may flow circumferentially about and/or through the reservoir in a counterclockwise (from above) direction, e.g. flow 1238.

Because of the bounding obstructions created by the power-take-off pipe 1213, and the mid-ramp separation wall 1239, to the left (with respect to FIG. 123) of the segment of the peripheral fluid reservoir into which fluid flowed 1235, a flow 1237 of fluid in a clockwise direction (from above) is prevented from further travel about and/or around the circumference of the peripheral fluid reservoir in that direction before being compelled to travel upward over, across, and/or through, the rightmost (from above) half 1240 of the respective inclined ramp, whereupon and/or whereafter it will flow into a central fluid reservoir conical plate having a higher reservoir than the illustrated peripheral fluid reservoir frustoconical plate.

Because of the bounding obstructions created by the power-take-off pipe 1241, and the mid-ramp separation wall 1242, to the right (with respect to FIG. 123) of the segment of the peripheral fluid reservoir into which fluid flowed 1235, a flow 1238 of fluid in a counterclockwise direction (from above) is prevented from further travel about and/or around the circumference of the peripheral fluid reservoir in that direction before being compelled to travel upward over, across, and/or through, the leftmost (from above) half 1243 of the respective inclined ramp, whereupon and/or whereafter it will flow into a central fluid reservoir conical plate having a higher reservoir than the illustrated peripheral fluid reservoir frustoconical plate.

FIG. 124 shows a top-down view of the same typical and/or intermediary peripheral fluid reservoir frustoconical plate illustrated in FIG. 123.

Figure 125:
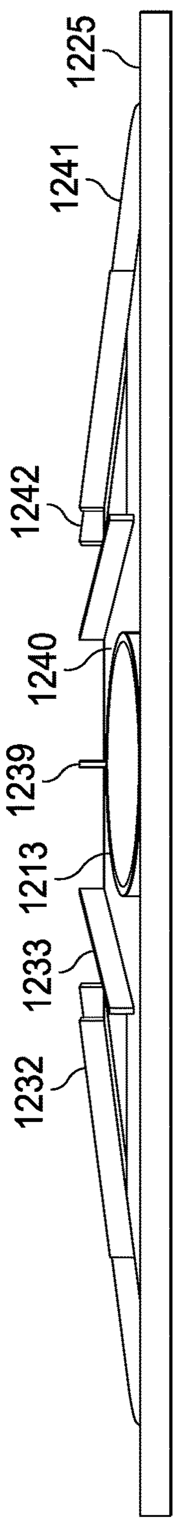

FIG. 125 shows a side view of the same typical and/or intermediary peripheral fluid reservoir frustoconical plate illustrated in FIGS. 123 and 124.

Figure 126:
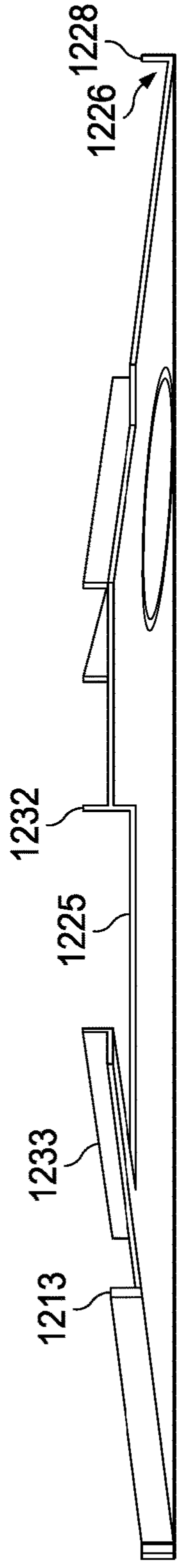

FIG. 126 shows a cross-sectional side view of the same typical and/or intermediary peripheral fluid reservoir frustoconical plate illustrated in FIGS. 123-125, wherein the vertical section plane is specified in FIG. 124 and the section is taken across line 126-126.

Figure 127:
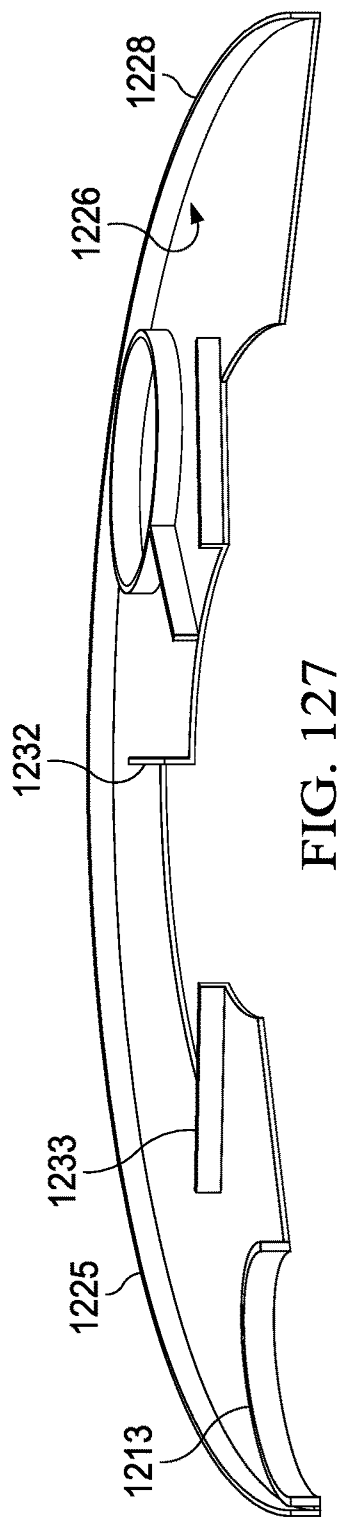

FIG. 127 shows a perspective view of the same cross-sectional side view of the typical and/or intermediary peripheral fluid reservoir frustoconical plate illustrated in FIG. 126, wherein the vertical section plane is specified in FIG. 124 and the section is taken across line 126-126.

Figure 128:
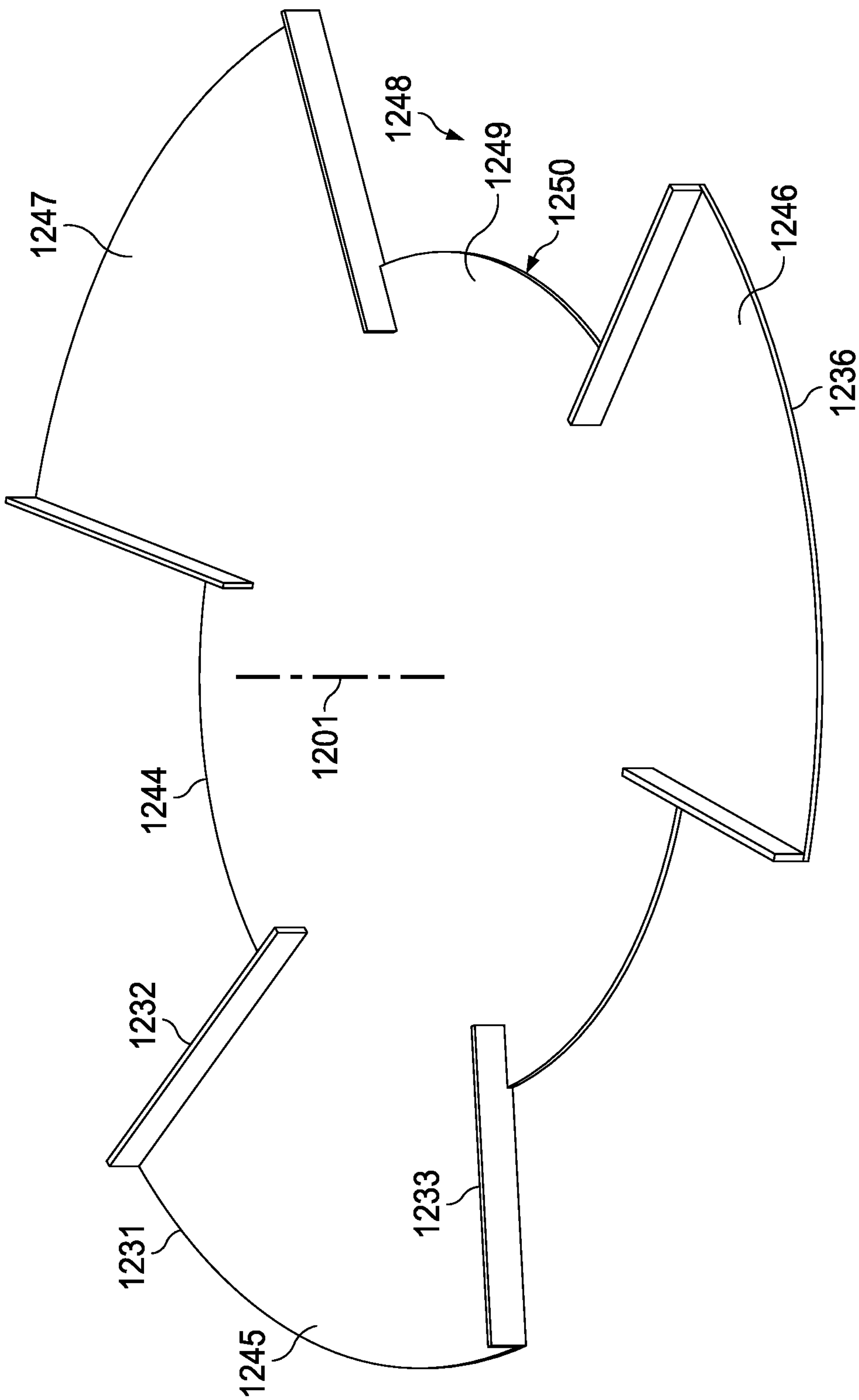

FIG. 128 shows a perspective top-down view of a typical and/or intermediary central fluid reservoir conical plate 1244. The longitudinal axis of the embodiment 1201 (and 1201 in FIG. 119) passes through the horizontal center of the central fluid reservoir conical plate 1244 when the plate is deployed within the embodiment illustrated in FIGS. 119-122. And, lower and higher adjacent peripheral fluid reservoir frustoconical plates are fluidly connected to each central fluid reservoir conical plate, and the horizontal center of each is on the same longitudinal axis 1201.

Each central fluid reservoir conical plate 1244 includes, incorporates, and/or utilizes three upwardly inclined radially extending ramps 1245-1247. And, each central fluid reservoir conical plate incorporates three ramp cutouts, e.g. 1248, into which complementary inclined ramps of adjacent peripheral fluid reservoir frustoconical plates fit and are therein positioned. Between a lower surface of each inclined ramp of a lower peripheral fluid reservoir frustoconical plate (not shown in FIG. 128) and an upper surface, e.g. 1249, of the central fluid reservoir conical plate, meet to form a seam along the edge, e.g. 1250, of each ramp cutout, e.g. 1248.

Vertical ramp-separation walls, e.g. 1232 and 1233, are continuous between adjacent peripheral frustoconical and central conical fluid reservoir plates, thereby directing water along the respective ramps, and preventing its falling back to a lower level and/or reservoir.

Figure 129:
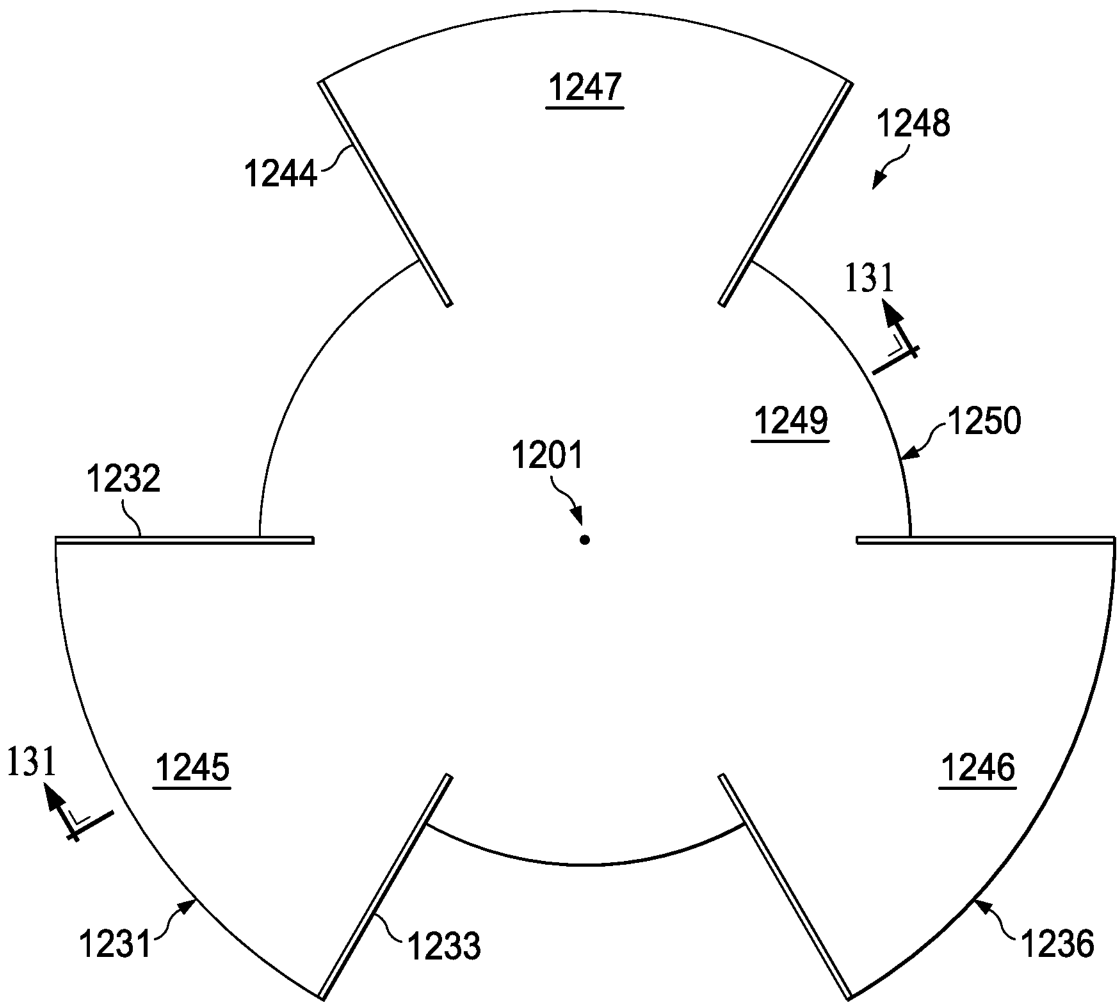

FIG. 129 shows a top-down view of the same typical and/or intermediary central fluid reservoir conical plate illustrated in FIG. 128.

Figure 130:
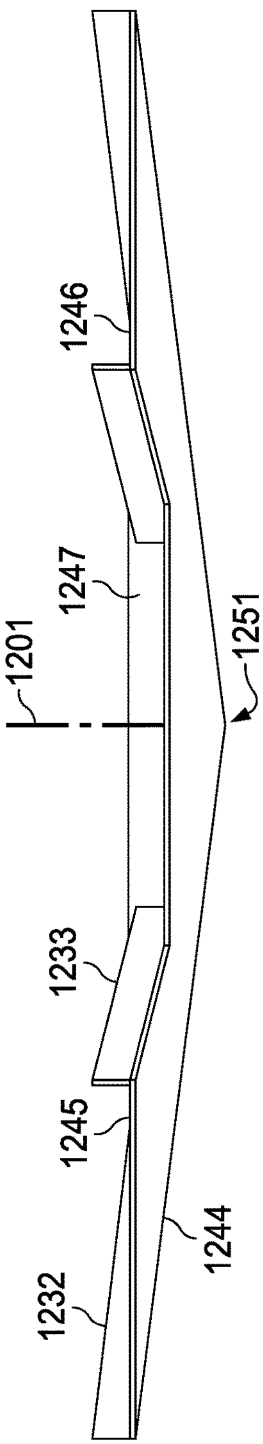

FIG. 130 shows a side view of the same typical and/or intermediary central fluid reservoir conical plate illustrated in FIGS. 128 and 129. The lowest point and/or portion of a central fluid reservoir that forms, and/or is created by fluid inflow, is inside the conical plate above the conical plate's vertex 1251.

Figure 131:
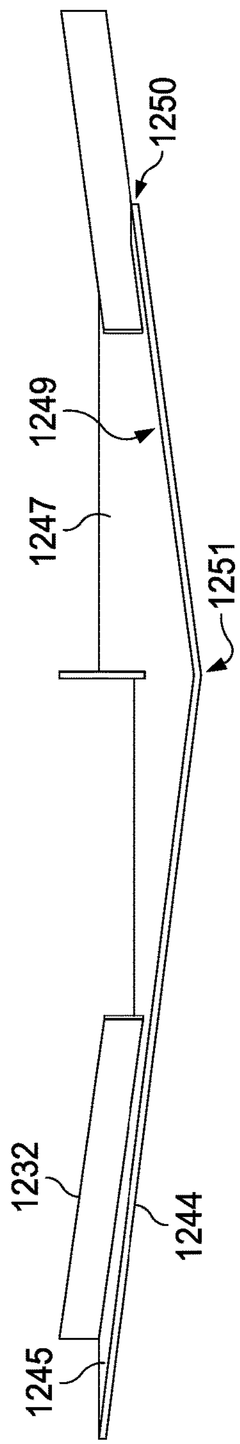

FIG. 131 shows a cross-sectional side view of the same typical and/or intermediary central fluid reservoir conical plate illustrated in FIGS. 128 and 129, wherein the vertical section plane is specified in FIG. 129 and the section is taken across line 131-131.

Figure 132:
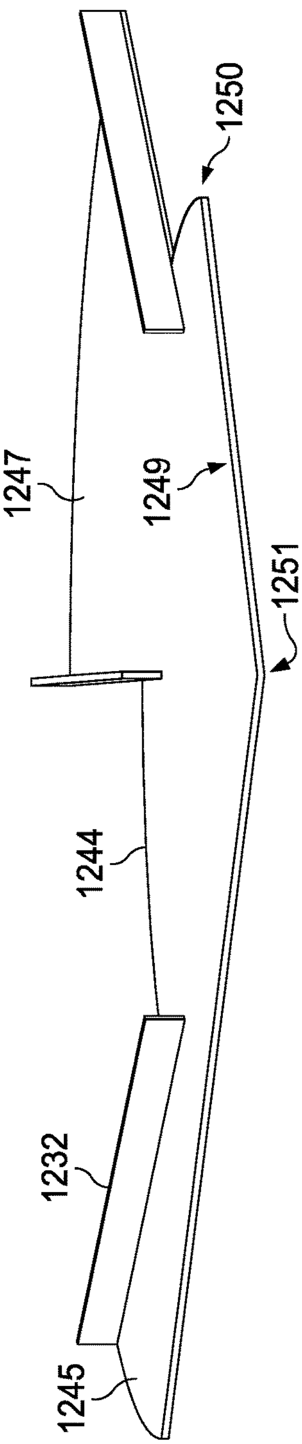

FIG. 132 shows a perspective view of the same cross-sectional side view of the typical and/or intermediary central fluid reservoir conical plate illustrated in FIG. 132, wherein the vertical section plane is specified in FIG. 129 and the section is taken across line 131-131.

Figure 133:
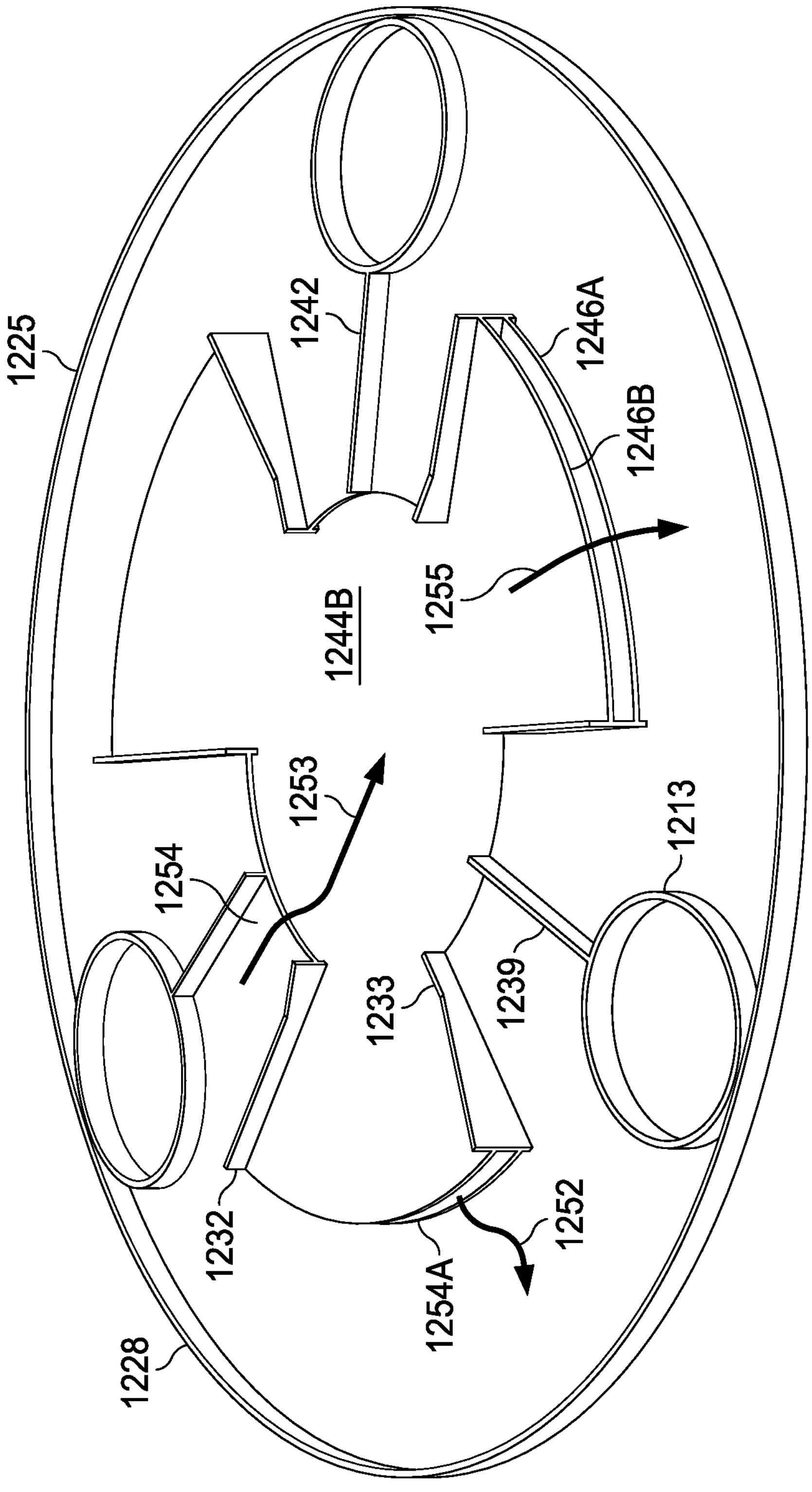

FIG. 133 shows a perspective top-down view of an assembly of a typical and/or intermediary peripheral fluid reservoir frustoconical plate 1225 which is fluidly connected to lower and upper 1244B central fluid reservoir conical plates.

In response to a favorable tilt, fluid from the lower central fluid reservoir flows 1252 from and over inclined ramp 1245A of the lower central fluid reservoir conical plate, and is deposited onto the surface of the peripheral fluid reservoir frustoconical plate 1225 where it tends to flow toward the lowest part of the peripheral fluid reservoir frustoconical plate which is adjacent to, and surrounds the junction between the upper surface of that plate and the circumferential wall and/or barrier 1228 which surrounds it.

In response to a favorable tilt, fluid flows 1253 from the peripheral fluid reservoir flows from and over inclined ramp 1254 of the peripheral fluid reservoir frustoconical plate 1225, and is deposited onto the surface of the upper central fluid reservoir conical plate 1244B where it tends to flow toward the lowest part of the central fluid reservoir conical plate which is at the horizontal center of that plate, at the intersection of that plate with the longitudinal axis (1201 of FIG. 128) of the embodiment.

In response to a favorable tilt, fluid from the upper central fluid reservoir flows 1255 from and over inclined ramp 1246B of the upper central fluid reservoir conical plate, and is deposited onto the surface of another peripheral fluid reservoir frustoconical plate (not shown).

In the fashion illustrated in FIG. 133, favorable tilting of the embodiment comprising such alternating stacks of peripheral-frustoconical and central-conical reservoir plates results in an upward migration and/or flow of fluid.

FIG. 134 shows a top-down view of the same assembly that is illustrated in FIG. 133 of a typical and/or intermediary peripheral fluid reservoir frustoconical plate 1225 which is fluidly connected to lower and upper 1244B central fluid reservoir conical plates. The assembly includes sections and/or segments of the embodiment's three power-take-off pipes 1213, 1241 and 1256.

FIG. 135 shows a cross-sectional side view of the same assembly that is illustrated in FIGS. 133 and 134 of a typical and/or intermediary peripheral fluid reservoir frustoconical plate 1225 which is fluidly connected to lower 1244A and upper 1244B central fluid reservoir conical plates, wherein the vertical section plane is specified in FIG. 134 and the section is taken across line 135-135.

In response to a favorable tilt, fluid flows 1253A out of a peripheral fluid reservoir (not shown) in the stack of peripheral and central fluid reservoirs of the which the illustrated assembly is a part and flows into and is deposited within a central fluid reservoir 1244A. In response to a subsequent favorable tilt, or in response to an extended duration of the original favorable tilt, fluid flows 1255A up, over, and off of, an inclined ramp 1246A of central fluid reservoir 1244A, and is deposited within a peripheral fluid reservoir 1225. Note that the lowest point 1258 and/or elevation of the peripheral fluid reservoir 1225 into which the fluid flowed is above the lowest point 1257 and/or elevation of the central fluid reservoir 1244A from which it flowed.

In response to a favorable tilt, fluid flows 1253B out of the peripheral fluid reservoir 1225 and flows into and is deposited within a central fluid reservoir 1244B. Note that the lowest point 1258 and/or elevation of the peripheral fluid reservoir 1225 from which the fluid flowed is below the lowest point 1259 and/or elevation of the central fluid reservoir 1244B into which it flowed. In response to a subsequent favorable tilt, or in response to an extended duration of the original favorable tilt, fluid flows 1255B up, over, and off of, an inclined ramp 1246B of central fluid reservoir 1244B, and is deposited within another peripheral fluid reservoir (not shown) in the stack of peripheral and central fluid reservoirs of the which the illustrated assembly is a part.

FIG. 136 shows a perspective view of the same cross-sectional side view of the same assembly that is illustrated in FIG. 135, wherein the vertical section plane is specified in FIG. 134 and the section is taken across line 135-135.

FIG. 137 shows a cross-sectional side view of the embodiment of the present disclosure that is illustrated in FIGS. 119-122, wherein the vertical section plane is specified in FIG. 122 and the section is taken across line 137-137. While the illustration of the embodiment presented in FIG. 122 omitted the outer casing(s) of the device, the sectional illustration in FIG. 137 includes that casing.

Either because the volume of fluid in the base fluid reservoir 1207 of the embodiment exceeds a minimum such volume, or in response to a favorable tilt, fluid from the base fluid reservoir flows 1221 into an aperture between the lowest peripheral frustoconical fluid reservoir plate 1224 and the lowest central conical fluid reservoir plate 1244. Thereafter, in response to a succession and/or series of favorable tilts of the embodiment, e.g. in response to wave action while the embodiment is suspended and/or floating in a body of water, the fluid that flows 1221 into the lowest peripheral fluid reservoir will flow from a peripheral fluid reservoir to a central fluid reservoir of greater elevation, and then to another peripheral fluid reservoir of even greater elevation, and so on . . . until a portion of that fluid flows 1210 from the highest central conical fluid reservoir plate 1216, over one of its inclined ramps, e.g. 1211, and down and into the highest peripheral fluid reservoir entrained on and/or within the highest peripheral frustoconical fluid reservoir plate 1217.

A portion of the fluid that flows into the highest peripheral fluid reservoir will then flow 1260 across, over, and/or within that highest peripheral fluid reservoir until it encounters and flows 1212A into one of the embodiment's three power-take-off pipes, e.g. 1213. After which the fluid will flow 1212B down through the respective power-take-off pipe and encounter, flow 1212C through, and cause to rotate, a respective fluid turbine, e.g. 1219. The resulting rotation of the fluid turbine, e.g. water turbine, will cause the fluid turbine's respective turbine shaft, e.g. 1218, to rotate, thereby transmitting rotational mechanical energy to a respective operatively connected electrical generator, e.g. 1215, causing that generator to produce electrical power.

An embodiment of the present disclosure similar to the one illustrated in FIGS. 119-136 connects its electrical generators to an electrical load (e.g. a cluster of computing devices) and utilizes the electrical power that it generates to energize the respective electrical load(s).

After flowing 1212C through a fluid turbine, e.g. 1219, fluid that has flowed down one of the embodiment's power-take-off pipes will flow back into the base fluid reservoir 1207 from which it originated. A portion of that fluid may again flow 1212D back into the stack of interleaved fluid reservoirs, and their respective interconnecting inclined ramps, and again flow to the highest fluid reservoir in the embodiment, and again impart a portion of its restored gravitational and/or head potential energy to one of the embodiment's fluid turbines and operatively connected electrical generators.

While the embodiment illustrated in FIGS. 119-122 and 137 have a stack comprising a peripheral fluid reservoir as its lowest and highest reservoirs, this is arbitrary and all arrangements, combinations, architectures, designs, and modifications are included within the scope of the present disclosure.

An embodiment of the present disclosure similar to the one illustrated in FIGS. 119-137 comprises a magnetohydrodynamic generator within a lower end of one of its power-take-off pipes, e.g. 1213, (instead of a fluid turbine and electrical generator). A similar embodiment utilizes a concentrated solution of salts in order to increase the efficiency and/or electrical power produced by its magnetohydrodynamic generator.

FIG. 138 illustrates an embodiment 1294 of the present disclosure. A tilt-powered energy generation module 1200 as illustrated in FIGS. 119-137 is flexibly connected by eyehook 1261 and cable 1262 to an anchor 1263 resting on a seafloor 1264. Because the interior of the tilt-powered energy generation device 1200 contains a substantial volume of gas (i.e. through which the fluid therein flows from a base fluid reservoir to an uppermost peripheral fluid reservoir), the tilt-powered energy generation device is buoyant and floats within a body of water 1265 over which waves pass. Waves buffeting the tilt-powered energy generation device as it floats tends to cause the tilt-powered energy generation device to tilt 1266 back-and-forth within a plane of motion approximately normal to the wave front. In response to wave action at the tilt-powered energy generation device, a longitudinal axis 1201 of the tilt-powered energy generation device tilts back and forth, causing fluid to flow upward within the tilt-powered energy generation device when the tilting is favorable.

A portion of the electrical power generated by the tilt-powered energy generation device 1200 is transmitted by an electrical power cable 1267 to an electrical power grid on a land mass.

FIG. 139 illustrates an embodiment 1268 of the present disclosure. A tilt-powered energy generation embodiment 1200 similar to the one illustrated in FIGS. 119-137, but comprising, containing, and/or incorporating hundreds of peripheral frustoconical fluid reservoir plates interleaved between hundreds of central conical fluid reservoir plates, is adapted to additionally comprise, include, and/or incorporate a water-filled spherical body 1269, i.e. an "inertial mass." Because of the gas contained, trapped, entrained, enclosed, and/or sealed within the tilt-powered energy generation embodiment, the embodiment illustrated in FIG. 139 is buoyant and tends to float adjacent to an upper surface of a body of water 1270 over which waves pass. The buoyant device has a waterline 1271.

Wave surge tends to push the upper portion 1200 of the device back and forth. And, because of the significant inertia of the device's inertial mass 1269, rather than causing the device to move up and down with passing waves, wave heave tends to instead move the waterline 1271 of the device thereby tending to add torque to the device. The combination of wave surge and heave at the device 1200 tends to result in the device, and its longitudinal axis 1201, to tilt 1272 back and forth, thereby energizing the fluid lifting within the tilt-powered energy generation embodiment 1200 and causing the tilt-powered energy generation embodiment to generate electrical power.

A portion of the electrical power produced by the device is consumed by an electronic messaging and/or relay module 1273, which uses a portion of the electrical power supplied by the tilt-powered energy generation embodiment 1200 to receive and transmit 1274 encoded electromagnet signals, e.g. between ships at sea.

FIG. 140 shows a cross-sectional side view of the embodiment of the present disclosure that is illustrated in FIG. 139, wherein the vertical section plane passes through the longitudinal axis (1201 in FIG. 139) of the embodiment. Fluid trapped, contained, stored, entrained, and/or enclosed within the base fluid reservoir 1207 of the tilt-powered energy generation module 1200 moves up within and/or among hundreds of interleaved peripheral and central fluid reservoirs 1278 in response to wave-induced tilting (1272 in FIG. 139) of the embodiment 1268. After reaching an approximately equilibrium condition (e.g. in which each of the peripheral and central fluid reservoirs contains fluid), tilts (e.g. a tilt in one direction followed by a tilt in a dissimilar direction) results in fluid entering the top 1275 (e.g. the uppermost peripheral fluid reservoir) and thereafter flowing 1212 into and down one of the power-take-off pipes, e.g. 1213, of the tilt-powered energy generation module and then flowing through a respective fluid turbine, e.g. 1219, thereby causing an operatively connected electrical generator, e.g. 1215, to produce electrical power.

A portion of the electrical power generated by the electrical generators of the tilt-powered energy generation module 1200 is transmitted to, and consumed by, an electronic messaging and/or relay module 1273, which receives and transmits 1274 encoded electromagnet signals, e.g. between ships at sea.

A fluid-filled inertial mass 1269, e.g. a water-filled, approximately spherical chamber, enclosure, tank, and/or vessel, contains a substantial amount, volume, and/or mass of fluid 1276, and a relatively small pocket, amount, volume, and/or mass of gas 1277. The inertial mass of a similar embodiment contains only liquid fluid, and does not contain any gas.

FIG. 141 shows a perspective side view of an embodiment 1279 of the present disclosure. Seven tilt-powered energy generation modules, e.g. 1200C, each one similar to the one illustrated in FIGS. 119-137, but comprising, containing, and/or incorporating hundreds of peripheral frustoconical fluid reservoir plates interleaved between hundreds of central conical fluid reservoir plates. The seven tilt-powered energy generation modules are fixedly attached to and/or within an approximately puck-shaped buoy 1280. The embodiment is configured and/or adapted to float adjacent to an upper surface 1281 of a body of water over which waves pass.

In response to, and/or as a consequence of, wave-induced tilting of the embodiment 1279, fluid within each of the embodiment's seven tilt-powered energy generation modules, e.g. 1200C, is raised from a respective base fluid reservoir to an uppermost peripheral fluid reservoir and then flows, under a head pressure and/or gravitational potential energy imparted to the fluid by the serial lifting of the fluid within each tilt-powered energy generation modules, into and/or through a respective fluid turbine causing a respective operatively connected electrical generator to produce electrical power.

FIG. 142 shows a top-down view of the same embodiment 1279 of the present disclosure that is illustrated in FIG. 141. The embodiment comprises a buoy 1280 and seven tilt-powered energy generation modules, e.g. 1200A-1200C.

FIG. 143 shows a cross-sectional side view of the same embodiment 1279 of the present disclosure that is illustrated in FIGS. 141 and 142, wherein the vertical section plane is specified in FIG. 142 and the section is taken across line 143-143.

As illustrated and explained in FIGS. 119-137 and FIG. 140, each of the embodiment's seven tilt-powered energy generation modules, e.g. 1200B, increases the elevation and gravitational potential energy of a fluid contained in a respective base fluid reservoir to a maximal height above that base fluid reservoir after which the raised fluid flows 1212 into and through a power-take-off pipe wherein it encounters and causes to rotate a fluid turbine, e.g. 1219, thereby causing an operatively connected electrical generator, e.g. 1215, to produce electrical power.

Similar to the tilt-powered energy generation module (1200 of FIGS. 139 and 140) of the embodiment illustrated in FIGS. 139 and 140, each of the seven tilt-powered energy generation modules, e.g. 1200A-1200C, of the embodiment illustrated in FIGS. 141-143 contains hundreds of interleaved peripheral and central fluid reservoirs 1278 which, in response to a sufficient number of favorable tilts, raise portions of the fluid within the respective base fluid reservoir a significant distance above the base fluid reservoir, and thereby impart to the fluid a substantial amount of gravitational potential energy and/or head pressure.

The buoy 1280 to and/or in which the seven tilt-powered energy generation modules, e.g. 1200A-1200C, of the embodiment 1279 are fixedly attached is comprised of, and/or divided into, two internal chambers separated by a horizontal wall 1282, barrier, and/or hull. The upper chamber 1283 contains a gas, e.g. nitrogen, which tends to provide the embodiment with buoyancy (in addition to the buoyancy provided by the gas contained within each of the seven tilt-powered energy generation modules). The lower chamber 1284 contains a fluid, e.g. water, which provides the embodiment with additional inertia, and, in conjunction with the gas in the upper chamber 1283, reduces the likelihood of the embodiment capsizing and/or assuming an inverted orientation.

FIG. 144 shows a perspective side view of an embodiment 1285 of the present disclosure. A tilt-powered energy generation module 1200 (1200 of FIGS. 119-137 and FIGS. 139-140) floats adjacent to an upper surface 1286 of a body of water over which waves pass. Fixedly attached to a bottom end of the embodiment is a weight 1287. The buoyancy provided by the gas enclosed within the tilt-powered energy generation module causes the embodiment to float. The weight at the bottom of the embodiment tends to keep the embodiment in an upright orientation that is approximately normal to the surface 1286 of the water on and/or in which it floats.

FIG. 145 shows a side view of the same embodiment 1285 of the present disclosure that is illustrated in FIG. 144.

FIG. 146 shows a top-down view of the same embodiment 1285 of the present disclosure that is illustrated in FIGS. 144 and 145. Unlike the views provided in FIGS. 144 and 145, the top-down view provided in FIG. 146 omits the upper circular casement, wall, and/or barrier of the outer casing of the embodiment in order to reveal the radial orientation of the embodiment about its vertical (i.e. normal to the page) longitudinal axis (1201 in FIG. 144).

The tilt-powered energy generation module of the embodiment 1285 has a similar design, architecture, and/or structure as does the (version of the) embodiment illustrated and discussed in FIGS. 119-137. In response to a favorable tilt of the embodiment, fluid flows from an uppermost central fluid reservoir 1208 into an even higher uppermost peripheral fluid reservoir 1209, and from there into and down one of three power-take-off pipes, e.g. 1213 and/or 1256. Within each respective power-take-off pipe is a respective fluid turbine, e.g. 1219 and 1288, which is made to rotate in response to the downward flow of fluid through its respective power-take-off pipe. And, rotation of each fluid turbine imparts rotational mechanical energy to a respective electrical generator thereby resulting in the production of electrical power.

FIG. 147 shows a cross-sectional side view of the same embodiment 1285 of the present disclosure that is illustrated in FIGS. 144-146, wherein the vertical section plane is specified in FIG. 146 and the section is taken across line 147-147.

The free-floating configuration 1285 of the tilt-powered energy generation embodiment, unlike the configuration of the embodiment 1200 illustrated in FIGS. 119-137, but similar to the embodiments illustrated in FIGS. 139-143, contains more than a hundred interleaved pairs 1278 of peripheral and central fluid reservoirs which, in response to a sufficient number of favorable tilts, raise portions of the fluid within the respective base fluid reservoir a significant distance above the base fluid reservoir, and thereby impart to the fluid a substantial amount of gravitational potential energy and/or head pressure. And, when the elevated fluids drain back to the base fluid reservoir 1207 through the embodiment's fluid turbines, e.g. 1219 and 1288, they result in transmission of a significant amount of mechanical energy to the embodiment's electrical generators, e.g. 1215 and 1289.

An embodiment similar to the one illustrated in FIGS. 144-147 incorporates, includes, and/or utilizes, a weight 1287 comprised of metal. Other embodiments similar to the one illustrated in FIGS. 144-147 incorporate, include, and/or utilize, weights 1287 comprised, at least in part, of negatively-buoyant materials including, but not limited to: sand, stone, cement, and/or cementitious materials. Aggregate and/or loose negatively-buoyant materials are encased within a chamber, resin, and/or another binding and/or trapping material and/or structure. Rigid negatively-buoyant materials may be directly attached to the embodiment.

The embodiment illustrated in FIGS. 144-147, as well as other embodiments disclosed herein, have a design wherein most of the internal volume of the embodiment, e.g. the percent of the volume within an envelope surrounding the embodiment, is almost entirely comprised of the interiors of fluid channels and the base fluid reservoirs from which fluid flows and to which it returns. Approximately 93% of the internal volume of the embodiment illustrated in FIGS. 144-147 is comprised of the interiors of fluid channels of which a base fluid reservoir is a part. Approximately 100% of the internal volume of the embodiment illustrated in FIGS. 119-137 is comprised of the interiors of fluid channels of which a base fluid reservoir is a part. Approximately 95% of the internal volume of the embodiment illustrated in FIGS. 112-118 is comprised of the interiors of fluid channels of which the base fluid reservoir is a part. Approximately 70% of the internal volume of the embodiment illustrated in FIGS. 104-111 is comprised of the interiors of fluid channels of which the base fluid reservoir is a part. Approximately 70% of the internal volume of the embodiment illustrated in FIGS. 60-70 is comprised of the interiors of fluid channels of which the base fluid reservoir is a part.

The scope of the present disclosure includes embodiments in which at least 99% of the volume within an envelope surrounding the embodiment, and/or of an internal volume of the embodiment, is comprised of the interiors of one or more fluid channels through which fluid is elevated in response to favorable tilts of the embodiment. The scope of the present disclosure includes, but is not limited to, embodiments in which the portion the volume within an envelope surrounding the embodiment, and/or of an internal volume of the embodiment, that is comprised of the interiors of one or more fluid channels through which fluid is elevated in response to favorable tilts of the embodiment is no less than: 95%, 90%, 85%, 80%, 70%, 60%, 50%, 40%, and 25%.

The fluid channel, including the base fluid reservoir 1207, through which fluid flows as it is elevated by the embodiment illustrated in FIG. 147 in response to favorable tilts of the embodiment has a total fluid channel height which equals the distance between the base fluid reservoir and the uppermost fluid reservoir from which elevated fluid flows back down to reenter the base fluid reservoir. With respect to the floating embodiment illustrated in FIG. 147, a portion of the fluid channel through which fluid flows as it is elevated by the embodiment is above the surface 1286 of the body of water on which the embodiment floats, and/or above the waterline of the embodiment as it floats. The portion, percentage, and/or part of the fluid channel, through which fluid flows as it is elevated by the embodiment, that is above the surface 1286 of the body of water on which it floats, is approximately 24%. Or, in other words, with respect to the floating embodiment illustrated in FIG. 147, approximately 24% of the total fluid channel height is above the surface 1286, of the body of water on which the embodiment floats.

The scope of the present disclosure includes embodiments in which as little as 0% (i.e. none) of the embodiment's fluid channel is above a resting and/or average surface level of the body of water on which the embodiment floats, with respect to the total fluid channel height of the respective embodiment. The scope of the present disclosure includes, but is not limited to, embodiments in which the portion, part, or percentage, of the respective embodiments' total fluid channel that is positioned, operates, and/or elevates fluid, above the surface of the body of water on which the respective embodiments' float, is no greater than: 5%, 10%, 15%, 20%, 25%, 30%, 35%, 40%, and 50%.

FIG. 148 shows a perspective side view of two embodiments of the present disclosure positioned at a seafloor 1290 and fully submerged beneath the surface 1291 of the body of water in which they operate.

An embodiment 700, illustrated in FIGS. 72-86, tilts 715 back and forth about a horizontal rotational axis positioned at the center of a hinge pin 704. A portion of the electrical power generated by the embodiment is transmitted through a subsea electrical and/or power cable 1292, e.g. to a terrestrial electrical power grid.

An embodiment 1294, illustrated in FIG. 138, tilts 1266 back and forth about an anchor 1263, at the end of a tether 1262. A portion of the electrical power generated by the embodiment is transmitted through a subsea electrical and/or power cable 12967, e.g. to a terrestrial electrical power grid.

FIG. 149 shows a side sectional view of an embodiment of the present disclosure that is similar to the one illustrated in FIGS. 87-89 wherein the vertical section plane is specified in FIG. 88 and the section is taken across line 89-89. The embodiment illustrated in FIG. 149 differs from the similar embodiment illustrated in FIGS. 87-89 in that it uses an alternate wave-driven fluid lifting power take-off (PTO) device, which, except for having a greater number of intermediary fluid reservoirs, is identical to the tilt-powered energy generation module 1200 illustrated in FIGS. 119-137.

In response to favorable tilts of the embodiment 1300 by waves moving across the surface 1301 of a body of water in which the embodiment floats and/or is suspended, fluid entrained, trapped, contained, and/or sealed within a chamber 1302, and stored within a base fluid reservoir 1303, flows from peripheral fluid reservoir, to central fluid reservoir, back to peripheral fluid reservoir, and so on upward through the PTO device's hundreds of such fluid reservoirs 1304, each time gaining elevation, and/or increasing its height above, the base fluid reservoir from which it originated. After a sufficient number of favorable tilts, fluid which originated in the base fluid reservoir of the PTO device, flows out and into the uppermost fluid reservoir 1305 of the PTO device.

Fluid that has flowed out and into the uppermost fluid reservoir 1305 of the PTO device thereafter flows 1306 down and into one of the power-take-off pipes, e.g. 1307, of the PTO device, wherein it encounters and flows through a respective fluid turbine, e.g. 1308, thereby energizing and/or imparting mechanical energy to a respective electrical generator, e.g. 1309, operatively connected to the fluid turbine, and thereby producing electrical power that the embodiment utilizes to charge and/or recharge its energy storage module 1320 comprising a plurality of batteries, to generate propulsion, and/or to energize its sensors, transmitters, and/or other electronics.

At an upper end 1310 of the embodiment 1300 is a phased-array antenna 1311 which receives encoded electromagnetic signals from one or more remote antennas (e.g., such as from ships, satellites, and shore-based facilities), and which transmits to one or more remote antennas (e.g., such as to ships, satellites, and shore-based facilities) at one or more particular and/or specific frequencies encoded electromagnetic signals. Signals received by the phased array antenna are decoded and/or otherwise processed by the embodiment's control system 1312. Signals transmitted are encoded and/or otherwise prepared by the embodiment's control system 1312.

The embodiment 1300 includes a computational module 1313 which incorporates, includes, and/or utilizes, a plurality of computational circuits including, but not limited to: computer processing units (CPUs), graphics processing units (GPUs), application-specific integrated circuits (ASICs), tensor processing units (TPUs), quantum processing units (QPUs), and optical processing units. The computational module also incorporates, includes, and/or utilizes, a plurality of memory circuits, a plurality of power management circuits, a plurality of network circuits, encryption/decryption circuits, etc., in addition to other circuits useful for the execution, completion, and/or implementation, of computational tasks, and for the gathering, sorting, compression, and/or storage, of computational results. The computational module includes electronic circuits, optical circuits, and other types of circuits. Heat generated by the activity, energization, and/or operation, of the electronic and/or optical circuits is transmitted, at least in part, conductively to the body of water 1301 in which the embodiment floats and/or operates.

The embodiment 1300 includes a pair of buoyancy control and trim adjustment modules 1314 and 1315 with which the embodiment's control system 1313 may alter the overall density of the embodiment as well as the distribution of buoyancy within the embodiment.

The embodiment 1300 incorporates, includes, and/or utilizes, fixed-wing fins, e.g., 1316 and 1317, which incorporate, include, and/or utilize, flaps, e.g., 1318, to alter, adjust, control, regulate, change, and/or modify, its pitch, yaw, roll, course, direction, and/or movements, when the embodiment is being propelled forward or backward in response to thrust produced by the propeller 1319.

Rotatably connected to its approximately frustoconical trailing end 1323 is a propeller 1319, the rotation of which tends to generate either a forward-pushing or backward-pulling thrust (depending on the direction in which the propeller is rotated). When activated by the embodiment's control system 1312 and energized by the embodiment's energy storage module 1320, an electrical motor 1321 causes the propeller 1319 and its connected propeller shaft 1322 to rotate. The embodiment's control system 1312 is able to cause the motor to rotate the propeller 1319 in a direction that causes the propeller to push the embodiment in a forward direction, i.e., toward its upper end 1310, as well as in a direction that causes the propeller to pull the embodiment in a backward direction, i.e., away from its upper end 1310.

FIG. 150 shows a perspective side view of an embodiment 1350 of the present disclosure. A plurality of central fluid reservoirs (not visible) are stacked in an approximately vertical column near the horizontal center 1351 of the embodiment. Inclined ramps arrayed radially, at approximate 60-degree intervals, about the central stack of central fluid reservoirs, facilitate the flow of fluid out of, and/or away from, each of the central fluid reservoirs, and toward, to, and/or into, six sets of stacked distal fluid reservoirs, each set of stacked distal fluid reservoirs being positioned at a distal end of a radial arm, e.g. 1352, of the embodiment. Complementary inclined ramps are likewise arrayed radially, also at approximate 60-degree intervals, about each central fluid reservoir, so as to receive with a central fluid reservoir fluid flowing from each distal fluid reservoir.

The central fluid reservoirs are vertically spaced, separated, and/or positioned, by an inter-reservoir distance. The distal fluid reservoirs are similarly are vertically spaced, separated, and/or positioned, by a inter-reservoir distance. However, the vertical positions, elevations, and/or heights (above a base fluid reservoir) of the distal fluid reservoirs are offset by a distance approximately equal to one-half of the inter-reservoir distance.

In response to favorable tilting of the embodiment, fluid flows up the inclined ramps and into central and distal fluid reservoirs of ever increasing height, and/or distance above a base fluid reservoir, eventually flowing into an uppermost fluid reservoir. Fluid within the uppermost fluid reservoir then flows into a power-take-off pipe (not visible) and therein flows through a hubless fluid turbine/generator (not visible) causing that hubless fluid turbine/generator to produce electrical power in response to the downflow through the power-take-off pipe.

Effluent from the hubless fluid turbine/generator flows into, rejoins, and/or returns to, a base fluid reservoir contained, stored, captured, and/or entrained, within a chamber comprised, in part, of an exterior wall 1353.

FIG. 151 shows a side view of the same embodiment 1350 of the present disclosure that is illustrated in FIG. 150. The base fluid reservoir is comprised of a vertical exterior wall 1353, and by a bottommost inclined wall 1354. The embodiment 1350 has a central longitudinal axis 1355 about which tilts of favorable direction, angular extent, and duration tend to result in the flow of fluid from one or more fluid reservoirs, to one or more other fluid reservoirs, with the destination fluid reservoirs being positioned at greater elevations, and/or heights, than those from which the fluid(s) flowed.

FIG. 152 shows a top-down view of the same embodiment 1350 of the present disclosure that is illustrated in FIGS. 150 and 151. The embodiment is comprised of a central vertical column positioned near the horizontal center 1351 of the embodiment, and in which are positioned a plurality of vertically spaced central fluid reservoirs. The embodiment is also comprised of six vertical columns, positioned at the distal ends of six respective radial arms 1352, 1356-1360, in which are positioned a plurality of vertically spaced distal fluid reservoirs, which each of six equally elevated distal fluid reservoirs being complementary to a single central fluid reservoir which is lower than the six distal fluid reservoirs by a height of approximately one-half the inter-reservoir distance.

FIG. 153 shows a bottom-up view of the same embodiment 1350 of the present disclosure that is illustrated in FIGS. 150-152. The chamber in which is stored the embodiment's base fluid reservoir (not visible) is comprised in part of an inclined, and/or angled, bottom wall 1354.

FIG. 154 is a perspective side view of an exemplary diodic fluid channel of the kind of which the embodiment illustrated in FIGS. 150-152 is comprised. Fluid pooled, trapped, contained, and/or entrained, within a central fluid reservoir 1362, in response to a favorable tilt, flows 1363 up an inclined ramp 1364, spilling over its distal and/or elevated end 1365 into a distal fluid reservoir 1366. Distal fluid reservoir 1366 is half an inter-reservoir distance 1367 above central fluid reservoir 1362.

Fluid pooled, trapped, contained, and/or entrained, within distal fluid reservoir 1366, in response to a favorable tilt, flows 1368 up an inclined ramp 1369, spilling over its distal and/or elevated end 1370 into a second central fluid reservoir that would typically be found at 1371. With respect to a second central fluid reservoir positioned at 1371, the distal fluid reservoir 1366 from which fluid would flow 1368 into such a central fluid reservoir would be half an inter-reservoir distance 1367 below that second central fluid reservoir 1371. And, with respect to the second central fluid reservoir positioned at 1371, the original and/or first central fluid reservoir 1362, from which fluid flowed 1363 into the distal fluid reservoir 1366, would be a full inter-reservoir distance 1372 below that second central fluid reservoir 1371.

Interleaved stacks of such central and distal fluid reservoirs, each fluid reservoir being connected to another adjacent fluid reservoir by an inclined ramp, comprise each arm of the embodiment illustrated in FIGS. 150-152. Thus, favorable tilts may occur in direct alignment (and/or within the vertical plane about which fluid flows) with respect to six different azimuthal directions, and indirectly aligned with any azimuthal direction.

FIG. 155 shows a cross-sectional top-down view of the same embodiment 1350 of the present disclosure that is illustrated in FIGS. 150-153, wherein the horizontal section plane is specified in FIG. 151 and the section is taken across line 155-155.

In response to favorable tilts, fluid flows, e.g. 1373, up an inclined ramp, e.g. 1385, from a central fluid reservoir (not visible below the uppermost central fluid reservoir 1374) located approximately one inter-reservoir below the uppermost central fluid reservoir 1374 in the vertical stack 1351 of central fluid reservoirs up and into one of the six uppermost distal fluid reservoirs, e.g. 1389, located within one 1356 of the six vertical stacks of distal fluid reservoirs, at a height between that of the uppermost central fluid reservoir 1374 and the central fluid reservoir positioned below it. And in response to additional favorable tilts, fluid flows, e.g. 1375, up an inclined ramp, e.g. 1386, from the uppermost distal fluid reservoirs, e.g. 1389, up and into the uppermost central fluid reservoir 1374. Adjacent inclined ramps, e.g. 1385 an 1386, are separated, and fluid is prevented from flowing directly between adjacent inclined ramps, by respective vertical walls, e.g. 1387.

The uppermost central fluid reservoir 1374 is surrounded by vertical barriers and/or walls. There is a vertical barrier, e.g. 1377, above and/or over each of the six apertures through which fluid flows on inclined ramps from the central fluid reservoir below the uppermost central fluid reservoir. There is also a vertical barrier, e.g. located beneath the checkered line at 1378, beneath each inclined ramp, e.g. 1385, over which flows fluid from each distal fluid reservoir, e.g. 1389, to the each central fluid reservoir.

At the level of the uppermost central fluid reservoir 1374, one barrier 1379 is offset and positioned further toward its corresponding distal fluid reservoir 1390 thereby creating a gap 1380 through which fluid deposited into, and/or pooled within, uppermost central fluid reservoir 1374 can flow 1376 out of the vertical column and/or projection wherein reside the embodiment's plurality of central fluid reservoirs, and can flow across and/or through an extension 1381 of the bottom wall and/or surface which defines and/or encloses the uppermost central fluid reservoir, and therefrom flow 1376 into and down a funnel 1382 leading to an upper aperture of a power-take-off pipe 1383. Within the power-take-off pipe is a hubless fluid turbine/generator 1384 which rotates in response to the flow of fluid through its blades, and causes an electrical generator embedded within the hub and rim of the fluid turbine to produce electrical power.

FIG. 156 shows a perspective side view of the cross-sectional top-down view of the embodiment 1350 of the present disclosure that is illustrated in FIG. 155, wherein the horizontal section plane is specified in FIG. 151 and the section is taken across line 155-155, and, in FIG. 156, the exterior and/or outer wall (1353 of FIG. 151) of the embodiment's base fluid reservoir 1394 is omitted to facilitate the reader's view of the interior of that base fluid reservoir.

Fluid flowing into the funnel 1382 and down and through the power-take-off pipe 1383 flows through and energizes a hubless fluid turbine/generator 1384, thereby causing the generator to produce electrical power. The effluent from the hubless fluid turbine/generator 1384 flows 1395 out of a bottommost aperture and/or mouth 1396 in the power-take-off pipe 1383, thereby flowing into, and/or returning to, the base fluid reservoir 1394 from which it originated. Fluid from the base fluid reservoir flows 1397 into and/or through a gap 1398 in one side wall 1399 of the arm of the embodiment at the end of which is positioned one 1358 of the six vertical stacks of distal fluid reservoirs. Fluid flowing through gap 1398 flows directly into and/or onto the lowermost central fluid reservoir (not visible), from which favorable tilts cause it to flow upward from distal fluid reservoir to central fluid reservoir to distal fluid reservoir and so on . . . .

FIG. 157 shows a perspective cross-sectional side view of the same embodiment 1350 of the present disclosure that is illustrated in FIGS. 150-153 and FIGS. 155-156, wherein the horizontal section plane is specified in FIG. 151 and the section is taken across line 157-157. The inclined ramps originating at the distal fluid reservoirs, e.g. 1400, and providing a channel through which fluid may flow, e.g. 1402, upwards and towards the horizontal center of the embodiment, have been retained within the illustration shown in FIG. 157, even though the upper ends of those inclined ramps pass through the specified horizontal sectional plane taken across line 157-157.

Fluid deposited into the base fluid reservoir (1394 in FIG. 156) and entrained from the bottom by a bottommost wall and/or barrier 1354, tends to flow 1397 toward the centermost side 1403 of the base fluid reservoir, and away from the outermost side 1404 of the base fluid reservoir, due to an incline in the bottommost wall and/or barrier 1354 which tapers from the higher outermost side 1404 toward the lower innermost side 1403. The innermost side 1403 of the base fluid reservoir is at approximately the same vertical height (with respect to the base of the embodiment 1350) as is the lowermost central fluid reservoir 1405 of the embodiment. Fluid flows 1397 from the base fluid reservoir and into and/or on to the lowermost central fluid reservoir 1405 through an aperture 1398 in a side wall 1399 adjacent to the base fluid reservoir.

Fluid flowing 1397 from the base fluid reservoir to the lowermost central fluid reservoir 1405 will then, in response to favorable tilts of the embodiment, tend to flow, e.g. 1406, up a fluidly connected inclined ramp, e.g. 1407, toward and into a fluid connected distal fluid reservoir, e.g. 1400. And a cycle of incremental upward flow between fluid reservoirs: distal to central, central to distal, and so on . . . will occur in response to a correlated series of favorable tilts of the embodiment.

FIG. 158 shows a perspective side view of an embodiment 1450 of the present disclosure. A buoyant structure 1451, with approximately flat top and bottom ends, floats adjacent to an upper surface 1452 of a body of water over which waves pass. The buoyant structures contains internal chambers, enclosures, and/or vessels (not visible), in which are positioned a variety of tilt-powered energy generation modules, which are themselves embodiments of the present disclosure. A portion of the electrical power generated by the tilt-powered energy generation modules is transmitted to a network of computing devices housed within an enclosure 1453. A phased-array antenna 1454 mounted atop the computing-device enclosure 1453 receives computational tasks from a remote server via encoded electromagnetic signals 1455. Computing devices (not shown) within the computing-device enclosure process, execute, and/or complete, the computational tasks received by the phased-array antenna and return corresponding computational results to a remote server via encoded electromagnetic signals 1455 transmitted by the phased-array antenna 1454.

FIG. 159 shows a side view of the same embodiment 1450 of the present disclosure that is illustrated in FIG. 158.

FIG. 160 shows a top-down cross-sectional view of the same embodiment 1450 of the present disclosure that is illustrated in FIGS. 158 and 159, wherein the horizontal section plane is specified in FIG. 159 and the section is taken across line 160-160. The embodiment's buoyant structure 1451 contains a plurality of hexagonal chambers, enclosures, and/or vessels 1456A-1456G which are defined, established, and/or created, at least in part, through the use of vertical walls and/or barriers, e.g. 1461, which together with the upper and lower walls of the rigid buoyant structure form water-tight enclosures, e.g. 1456A, which are used to house tilt-powered energy generation modules and provide additional buoyancy in addition to that provided by the gases within the respective tilt-powered energy generation modules. Positioned within each hexagonal chamber, is one or more of the tilt-powered energy generation modules which have already been disclosed.

Each of hexagonal chambers 1456A, 1456C, and 1456E contain a pair of the tilt-powered energy generation modules 1457 discussed and illustrated in FIGS. 72-86. Hexagonal chamber 1456B contains one of the tilt-powered energy generation modules 1458 discussed and illustrated in FIGS. 150-157. Each of hexagonal chambers 1456D and 1456F contains one of the tilt-powered energy generation modules 1459 discussed and illustrated in FIGS. 60-67. And, hexagonal chamber 1456G contains seven of the tilt-powered energy generation modules 1460 discussed and illustrated in FIGS. 119-137.

Because many of these individual tilt-powered energy generation modules is distributed across, over, and/or through, a common rigid buoyant structure 1451, the movement of fluid within each one, and the consequent movement of each tilt-powered energy generation module's center of gravity away from its respective nominal, and/or resting, vertical longitudinal axis of approximate radial symmetry, does little to alter the center of gravity of the assembly of tilt-powered energy generation modules, nor the center of gravity of the rigid buoyant structure on, in, and/or with, which they float. Thus, the rigid buoyant structure is less likely to capsize as a consequence of a fluid-flow-caused shift in and/or of its center of gravity and/or center of mass, than would be any one of the individual tilt-powered energy generation modules of which it is comprised. Furthermore, because of its greater, and/or enhanced, resistance to capsizing, the collection, and/or assembly of tilt-powered energy generation modules within a common rigid buoyant structure 1451 provides a relatively more stable platform on which to execute energy-consuming activities, such as executing computational tasks with a collection computing devices housed within a common enclosure.

FIG. 161 shows a perspective view of the same top-down cross-sectional view of the embodiment 1450 of the present disclosure that is illustrated in FIGS. 158 and 159, wherein the horizontal section plane is specified in FIG. 159 and the section is taken across line 160-160.

FIG. 162 shows a perspective side view of an embodiment 1500 of the present disclosure. A set, collection, array, and/or matrix of 19 tilt-powered energy generation modules, e.g. 1501, of the kind illustrated in FIGS. 119-137, are fixedly attached to one another so as to form a buoyant raft, vessel, platform, and/or buoy which floats adjacent to an upper surface 1502 of a body of water over which waves pass. The individual and/or constituent tilt-powered energy generation modules, e.g. 1501, of which the buoyant platform is comprised are secured, joined, fastened, and/or attached, to one another by means of interstitial connection frames, e.g. 1503.

In response to favorable tilts imparted to the buoyant platform through its interaction, and/or collision, with passing waves, the tilt-powered energy generation modules of which it is comprised produce electrical power. In one embodiment similar to the one illustrated in FIG. 162, a portion of the electrical power generated by the constituent tilt-powered energy generation modules is consumed by telecommunications equipment which receive and transmit encoded electromagnetic signals. In another embodiment similar to the one illustrated in FIG. 162, a portion of the electrical power generated by the constituent tilt-powered energy generation modules is consumed by a plurality of computing devices which process computational tasks received at the embodiment, and which produce computational results which are transmitted from the embodiment.

FIG. 163 shows a top-down view of the same embodiment 1500 of the present disclosure that is illustrated in FIG. 162. The buoyant electricity-producing platform is comprised of a set of tilt-powered energy generation modules, e.g. 1501A-1501E, which are affixedly and/or rigidly attached to one another and to a set of interstitial connection frames, e.g. 1503A-1503D.

FIG. 164 shows a side sectional view of the same embodiment of the present disclosure that is illustrated in FIGS. 162 and 163, wherein the vertical section plane is specified in FIG. 163 and the section is taken across line 164-164. Each of the 19 tilt-powered energy generation modules of which the embodiment is comprised are similar to the tilt-powered energy generation embodiment illustrated and discussed in relation to FIGS. 119-137.

FIG. 165 shows a perspective side view of an embodiment 1550 of the present disclosure. The embodiment illustrated in FIG. 165 is identical to the one illustrated in FIGS. 162-164, except that the embodiment illustrated in FIG. 165 comprises four additional interstitial connection frames, e.g. 1551, which are equipped with thrusters, e.g. 1552, mounted at lower ends of respective thruster shafts, e.g. 1553. Each thruster shaft may be rotated about a vertical longitudinal axis so as to permit the directing of each respective thruster's thrust in any azimuthal direction. Furthermore, a platform controller (not shown) is able to control the azimuthal orientation and magnitude of each thruster's thrust, thereby enabling the platform controller to steer the buoyant platform 1550 in any direction, along any course, and/or to any destination (on or at the surface 1502 of the body of water on which the buoyant platform floats).

The thrusters are energized with a portion of the electrical power generated by embodiment's 19 tilt-powered energy generation modules, e.g. 1501.

FIG. 166 shows a top-down view of a central fluid reservoir 479 of which the tilt-powered energy generation embodiment illustrated in FIGS. 41-54 is in part comprised. Emanating from the central reservoir are eight upwardly inclined central ramps, e.g., 485, over which fluid flows out of the central fluid reservoir and thereby flows into a more highly elevated respective flat-bottomed annular ring (e.g. 502 in FIG. 49) in response to a favorable tilt of the respective tilt-powered energy generation embodiment.

Fluid pooled, contained, trapped, stored, and/or entrained, within the fluid reservoir 1560 at the center of the central fluid reservoir 479 (as suggested by the broken-line bounding circle 1561) can flow out of any one of the eight upwardly inclined central ramps, e.g., 485, in response to a tilt. Because there are eight upwardly inclined central ramps, and they are equally distributed about the central fluid reservoir, and/or separated by equal azimuthal angles, fluid pooled in the central reservoir 1560 will tend to flow into, up, and over that inclined central ramp which is best aligned with the relative azimuthal direction of downward tilt of the respective tilt-powered energy generation embodiment.

For instance, if the embodiment of which the illustrated central fluid reservoir 479 is a part were to tilt down (relative to the center of the central reservoir) in a direction aligned with 1562, then fluid would tend to flow 1567 and 1568 out of the central fluid reservoir equally into both inclined central ramps 1563 and 485, respectively. However, if the direction of downward tilt is aligned with a radial vector originating at the center of the central fluid reservoir and falling between radial tilt-angle bounds 1564 and 1562, exclusive, then outward fluid flow 1567 from the central fluid reservoir will tend to be directed almost entirely up the respective inclined central ramp 1563.

Each inclined central ramp, e.g. 485, of the illustrated central fluid reservoir 479 tends to receive the greater portion of any fluid flow out of the central fluid reservoir when the direction of downward tilt corresponds to an angular interval radially centered about each respective inclined central ramp. And, each inclined central ramp corresponds to a particular range and/or interval of azimuthal directions of downward tilt of the respective tilt-powered energy generation embodiment.

Each inclined central ramp, e.g. 485, of the illustrated central fluid reservoir 479 is associated with a specific, and approximately 45-degree range of azimuthal directions of downward tilt of the respective embodiment of which it is a part. For example, inclined central ramp 1563 tends to be associated with fluid flow from the central fluid reservoir 1560 when the downward azimuthal tilt angle of the respective embodiment of which it is a part falls within the ranges of azimuthal tilt angles defined by 1565 and 1566.

FIG. 167 shows a top-down view of a central fluid reservoir conical plate 1244 of which the tilt-powered energy generation embodiment illustrated in FIGS. 119-137 is in part comprised. Emanating from the center portion 1570 of the central fluid reservoir conical plate (as suggested by broken-line bounding circle 1571) are three upwardly inclined radially extending ramps, e.g., 1247, over which fluid flows out of the central fluid reservoir 1570 and thereby flows into a more highly elevated peripheral fluid reservoir frustoconical plate (1225 in FIG. 133) in response to a favorable tilt of the respective tilt-powered energy generation embodiment.

Fluid pooled, contained, trapped, stored, and/or entrained, within the fluid reservoir 1570 at the center of the central fluid reservoir 1244 (as suggested by the broken-line bounding circle 1571) can flow out of any one of the three upwardly inclined ramps, e.g., 1247, in response to a tilt. Because there are three upwardly inclined ramps, and they are equally distributed about the central fluid reservoir, and/or separated by equal azimuthal angles, fluid pooled in the central reservoir 1570 will tend to flow into, up, and over that inclined ramp which is best aligned with the relative azimuthal direction of downward tilt of the respective tilt-powered energy generation embodiment.

For instance, if the embodiment of which the illustrated central fluid reservoir 1244 is a part were to tilt down (relative to the center 1570 of the central reservoir) in a direction aligned with 1572, then fluid would tend to flow 1576 and 1577 out of the central fluid reservoir 1570 equally into both inclined ramps 1247 and 1246, respectively. However, if the direction of downward tilt is aligned with a radial vector originating at the center of the central fluid reservoir and falling between radial tilt-angle bounds 1572 and 1573, exclusive, then outward fluid flow 1576 from the central fluid reservoir will tend to be directed almost entirely up the respective inclined central ramp 1247.

Each inclined ramp, e.g. 1247, of the illustrated central fluid reservoir 1244 tends to receive the greater portion of any fluid flow out of the central fluid reservoir when the direction of downward tilt corresponds to an angular interval radially centered about each respective inclined ramp. And, each inclined ramp corresponds to a particular range and/or interval of azimuthal directions of downward tilt of the respective tilt-powered energy generation embodiment.

Each inclined central ramp, e.g. 1247, of the illustrated central fluid reservoir 1244 is associated with a specific, and approximately 120-degree range of azimuthal directions of downward tilt of the respective embodiment of which it is a part. For example, inclined ramp 1247 tends to be associated with fluid flow from the central fluid reservoir 1570 when the downward azimuthal tilt angle of the respective embodiment of which it is a part falls within the ranges of azimuthal tilt angles defined by 1574 and 1575.

FIG. 168 shows a top-down view of an subassembly of a central fluid reservoir and six distal fluid reservoirs, wherein the central and distal fluid reservoirs are fluidly connected by inclined ramps, six inclined ramps carrying fluid upward from the central fluid reservoir to each of the respective six distal fluid reservoirs, and six inclined ramps carrying fluid upward from each of the six distal fluid reservoirs to where a second central fluid reservoir would be positioned above the central fluid reservoir visible in the illustration of FIG. 168. The tilt-powered energy generation embodiment illustrated in FIGS. 150-157 is comprised of subassemblies of the kind illustrated in FIG. 168.

Fluid pooled, contained, stored, and/or entrained, (as suggested by broken-line bounding circle 1581) within the central fluid reservoir 1580, flows, e.g. 1582, up one of the six inclined ramps, e.g. 1583, originating at that central fluid reservoir, and thereby flows into a more highly elevated distal fluid reservoir, e.g. 1391, in response to a favorable tilt of the respective tilt-powered energy generation embodiment of which the illustrated subassembly is a part.

Fluid pooled, contained, trapped, stored, and/or entrained, within the central fluid reservoir 1580 (as suggested by the broken-line bounding circle 1581) can flow out of any one of the six upwardly inclined ramps, e.g., 1583, in response to a tilt. Because there are six upwardly inclined ramps, and they are equally distributed about the central fluid reservoir, and/or separated by equal azimuthal angles, fluid pooled in the central reservoir 1580 will tend to flow into, up, and over that inclined ramp which is best aligned with the relative azimuthal direction of downward tilt of the respective tilt-powered energy generation embodiment.

For instance, if the embodiment of which the illustrated subassembly is a part were to tilt down (relative to the center of the central fluid reservoir 1580) in a direction aligned with 1584, then fluid would tend to flow 1582 and 1586 out of the central fluid reservoir 1580 equally into both inclined ramps 1583 and 1585, respectively. However, if the direction of downward tilt is aligned with a radial vector originating at the center of the central fluid reservoir and falling between radial tilt-angle bounds 1584 and 1586, exclusive, then outward fluid flow 1586 from the central fluid reservoir will tend to be directed almost entirely up the respective inclined ramp 1585.

Each inclined ramp, e.g. 1583 and 1585, originating from the illustrated central fluid reservoir 1580, tends to receive the greater portion of any fluid flow out of the central fluid reservoir when the direction of downward tilt corresponds to an angular interval radially centered about each respective inclined ramp. And, each inclined ramp corresponds to a particular range and/or interval of azimuthal directions of as suggested by the broken-line bounding circle.

Each inclined ramp, e.g. 1583 and 1585, originating from the illustrated central fluid reservoir 1580, is associated with a specific, and approximately 60-degree range of azimuthal directions of downward tilt of the respective embodiment of which the illustrated subassembly is a part. For example, inclined ramp 1585 tends to be associated with fluid flow 1586 from the central fluid reservoir 1580 when the downward azimuthal tilt angle of the respective embodiment of which it is a part falls within the ranges of azimuthal tilt angles defined by 1588 and 1589.

By contrast, each of the subassembly's six distal fluid reservoirs, e.g. 1391, is associated with, and/or gives rise to, only a single upwardly inclined ramp, e.g. 1600. Therefore, regardless of the azimuthal direction of a downward tilt of the respective embodiment of which the subassembly is a part, any fluid flow 1601 away from, and/or out of, a pool of fluid (e.g. as suggested by the broken-line bounding circle 1602) within a distal fluid reservoir, e.g. 1391, is limited to that single inclined ramp. Therefore, with respect to a distal fluid reservoir, e.g. 1391, the sole, single, and/or only, inclined ramp available to carry fluid upwards and away from the respective distal fluid reservoir conducts, carries, and/or channels, all of the fluid, if any, that flows from the respective distal fluid reservoir in response to downward tilts of the respective tilt-powered energy generation embodiment of any and all azimuthal directions. With respect to azimuthal downward tilt angles within the ranges of 1603 and 1604, the amount and/or rate of fluid flow in response to a downward tilt will depend on the zenith angle of the tilt, and the degree of angular inclination of the inclined ramp. However, with respect to azimuthal downward tilt angles aligned with 90-degree azimuthal angles (i.e. to the left and right of the inclined ramp, e.g. 1600) one would not expect any fluid to flow from the respective distal fluid reservoir, e.g. 1391. Moreover, from any downward tilt have a direction within the 180-degree range 1607, there should not be any fluid flow from the respective distal fluid reservoir, e.g. 1391, since a downward tilt in such a direction is actually an upward tilt with respect to the azimuthal angles adjacent to alignment of the respective inclined ramp (e.g. azimuthal angles within the ranges 1603 and 1604).

A fluid reservoir, such as the central fluid reservoir 1580 in the subassembly illustrated in FIG. 168, can realize and/or manifest an outward and upward flow of fluid from its reservoir with respect to a wide range of azimuthal angles, and a range of azimuthal angles which includes angles from every lateral direction (e.g. from 360 degrees) around a tilt-powered energy generation embodiment, e.g. a floating tilt-powered energy generation embodiment. Whereas, by contrast, a fluid reservoir, such as the distal fluid reservoir 1391 in the subassembly illustrated in FIG. 168, can realize and/or manifest an outward and upward flow of fluid from its reservoir with respect to only a single azimuthal angle, or with respect to only a relatively narrow range of azimuthal angles. Thus, despite an abundance of tilting of an embodiment of the present disclosure, a fluid reservoir within such an embodiment, may only give rise to an upward flow of fluid from it in response to a small percentage of those tilts.

The frequency with which fluid will tend to flow out of a fluid reservoir will tend to increase with the number of azimuthal-angularly-distributed inclined ramps which originate at the fluid reservoir and are available to carry fluid away from it in response to favorable tilting. Therefore, in general, greater numbers (especially of evenly-angularly-distributed) inclined ramps originating at a fluid reservoir will tend to give rise to more frequent upward flows of fluid, and shorter transit times of fluids between an embodiment's base fluid reservoir and its uppermost fluid reservoir (and subsequent power production).

If we assume that the tilt-powered energy generation embodiments, of which the fluid reservoirs and inclined ramps illustrated in FIGS. 166-168 are a part, are tilted in random azimuthal directions, random zenith angles, and for random tilt durations, e.g. and having distributions that might be expected in various random wave conditions, then fluid will tend to flow from the illustrated fluid reservoirs at frequencies, probabilities, and average rates of flow, that are related, if not correlated, with the number and breadth of azimuthal-angular ranges over which the respective fluid reservoirs include, incorporate, and/or possess, upwardly inclined ramps oriented so as to facilitate the flow of fluid with respect to downward tilts occurring with azimuthal angular orientations falling within those supported azimuthal-angular ranges. Fluid reservoirs with fewer upwardly inclined ramps oriented so as to facilitate fluid flow in response to correspondingly oriented downward tilts will tend to have lower frequencies, probabilities, and average rates of upward fluid flow. Fluid reservoirs with more upwardly inclined ramps oriented so as to facilitate fluid flow in response to correspondingly oriented downward tilts will tend to have greater frequencies, probabilities, and average rates of upward fluid flow. And, since greater frequencies, probabilities, and average rates of upward fluid flow will tend to increase the efficiencies, and power levels of embodiments of the present disclosure, preferred embodiments will be characterized by greater numbers, and greater relative angular orientations of, upwardly inclined ramps.

Some embodiments of the present disclosure are "closed-fluid systems." These embodiments cause fluids to flow upward until they reach a maximal height above a bottom-most base fluid reservoir from which the upward flow begins. After elevated fluids flow down and through a pressure-reduction mechanism, such as a fluid turbine operatively connected to an electrical generator, they flow back into their originating base fluid reservoir before repeating the tilt-induced cycle of elevation and descent. Because their internal fluid channels are closed, sealed, trapped, and/or compartmentalized, these embodiments enjoy the benefit of utilizing, and reusing, a non-corrosive fluid (such as pure water, or ethanol) and having that non-corrosive fluid flow within an atmosphere of a non-corrosive gas (such as nitrogen, or carbon dioxide).

Embodiments of the present disclosure which include, incorporate, and/or utilize, closed-fluid systems tend to also include, incorporate, and/or utilize, a bottommost and/or base fluid reservoir from which fluid is elevated and to which elevated fluids return. Such base fluid reservoirs tend to provide a benefit to floating embodiments when the respective base fluid reservoirs are positioned below the respective nominal waterplane associated with each such embodiment. Their position below the waterplane and/or below the waterline of the respective floating embodiments tends to favor and/or promote weight and balance attributes to the floating embodiments such that wave-induced tilting of the embodiments is less likely to result in a capsizing and/or orientational inversion of those embodiments.

By contrast, some other embodiments of the present disclosure are "open-fluid systems." These embodiments elevate fluids drawn from a body of fluid on which they float, which might include corrosive fluids such as seawater, and they elevate these corrosive fluids within an atmosphere and/or gas that is drawn from, or contaminated with, the atmosphere outside the embodiments.

Some embodiments of the present disclosure utilize spiral, and/or spiraling, fluid channels through which they elevate fluids. However, with respect to fluid pooled at any position, location, and/or spot, along such a spiral fluid channel, the fluid may only flow in a single direction which is tangential to the cylindrical spiraling fluid channel at each respective position, location, and/or spot. Therefore, spiral fluid elevation embodiments of the present disclosure lack the benefit of being responsive to downward tilts of a variety of relative azimuthal directions.

Each fluid-lifting embodiment of the present disclosure alternates between two states: one in which the device is oriented vertically with respect to gravity (manifesting no tilt); and one in which it is oriented in a tilted fashion characterized by a relative azimuthal direction of tilt, and a zenith angle of tilt. When oriented vertically with respect to gravity and/or not tilting, fluid trapped in reservoirs positioned throughout each device are stable and do not tend to flow due to the presence of at least one gravitational potential energy barrier to flow (e.g., an inclined ramp, tube, channel, and/or conduit). However, when tilted, the direction of gravity is altered relative to the local coordinate system of each embodiment. And, when the azimuthal direction, zenith angle, and duration of a tilt is sufficient, the gravitational potential energy barrier preventing the flow of fluid trapped in one or more of the gravity-well-defined reservoirs positioned throughout each embodiment is diminished to a sufficient degree (even becoming an inverted energy well drawing fluid through it) that fluid flows from one or more of the reservoirs to one or more of the other more elevated reservoirs, with the reservoirs into which the fluid flows being at greater elevation than the lowermost base fluid reservoir within each respective embodiment.

FIG. 169 schematically illustrates a cross-sectional view of a vessel or buoy 1700 within which is a tilt-powered energy generation module 1701. Approximately 20% of the internal volume of the tilt-powered energy generation module is filled with water, which, because the buoy is at rest and vertically and/or nominally oriented about a vertical longitudinal axis 1703 is likely to be equally distributed across the width of the tilt-powered energy generation module and is therefore represented by a box 1702 equal to 20% of the total internal volume of the tilt-powered energy generation module, and centered at and about the longitudinal axis 1703. A center of buoyancy is positioned at 1704 and is also centered about the longitudinal axis 1703.

Because of the vertical, upright, resting, and/or nominal, orientation of the buoy 1700, the buoy's center of mass (and/or center of gravity) is on the same vertical longitudinal axis 1703 which the buoy's center of buoyancy is on. Therefore, the buoy's upright orientation in the body of water 1705 is relatively stable.

FIG. 170 schematically illustrates the same cross-sectional view of a vessel or buoy 1700 and tilt-powered energy generation module 1701 that is illustrated in FIG. 169. However, in FIG. 170 the buoy's orientation has been altered and rotated approximately 30 degrees in a counterclockwise direction (about its center of buoyancy 1704), e.g. as a result of passing waves at the surface 1705 of the body of water on which the buoy floats. The rotation of the buoy has caused the fluid 1702 within the tilt-powered energy generation module to flow, shift, and/or move to the left and/or downward tilted side of the tilt-powered energy generation module. This leftward shift of the fluid 1702 within the buoy's tilt-powered energy generation module 1701, as well as the rotation of the buoy itself, have altered the position of the buoy's center of mass 1706 such that it is no longer aligned with the vertical longitudinal axis passing through the buoy's center of buoyancy 1704. The downward gravitational force 1707 applied by gravity to the buoy's center of mass 1706 is now offset, and not passing through, the buoy's center of buoyancy. In combination with the upward buoyancy force 1708 applied to the buoy's center of buoyancy 1704, the downward force 1707 applied by gravity to the buoy's center of mass 1706, creates a torque 1709 about the buoy's center of buoyancy 1704 which tends to roll the buoy in a counterclockwise direction and to thereby increase the lateral separation 1710 between the contrary gravitational and buoyant forces, thereby tending to increase and/or exacerbate the counterclockwise rolling motion which could capsize the buoy.

FIG. 171 schematically illustrates a cross-sectional view of a vessel or buoy 1800 which is also a tilt-powered energy generation module 1800 (buoy and tilt-powered energy generation module are the same structures) which is similar to the types illustrated in FIGS. 119-137 and 144-147. The buoy 1800 floats adjacent to an upper surface 1801 of a body of water.

Approximately 25% of the internal volume of the tilt-powered energy generation module 1800 is filled with water, a portion of the water is contained within elevational fluid reservoirs which elevate the water in response to favorable tilts of the buoy, and another portion of the water is contained within a base fluid reservoir 1805. Because the buoy is at rest and vertically and/or nominally oriented about a vertical longitudinal axis 1803 it is likely that the water within the elevational fluid reservoirs is equally distributed across the width of the tilt-powered energy generation module and is therefore represented by a box 1804 equal to 20% of the total internal volume of the tilt-powered energy generation module exclusive of the base fluid reservoir 1805, and centered at and about the longitudinal axis 1803. A center of buoyancy is positioned at 1806 and is also centered about the longitudinal axis 1803.

Because of the vertical, upright, resting, and/or nominal, orientation of the buoy 1800, the buoy's center of mass (and/or center of gravity) is on the same vertical longitudinal axis 1803 which the buoy's center of buoyancy is on.

Therefore, the buoy's upright orientation in the body of water 1801 is relatively stable.

FIG. 172 schematically illustrates the same cross-sectional view of a vessel or buoy 1800, which is also a tilt-powered energy generation module 1800, that is illustrated in FIG. 171. However, in FIG. 171 the buoy's orientation has been altered and rotated approximately 30 degrees in a counterclockwise direction (about its center of buoyancy 1806), e.g. as a result of passing waves at the surface 1801 of the body of water on which the buoy floats.

The rotation of the buoy has caused the fluid 1804 within the elevational fluid reservoirs of the tilt-powered energy generation module 1800 to flow, shift, and/or move to the left and/or downward tilted side of the tilt-powered energy generation module. This leftward shift of the fluid 1804 within the buoy's tilt-powered energy generation module 1800, as well as the rotation of the buoy itself, have altered the position of the buoy's center of mass 1807 such that it is no longer aligned with the vertical longitudinal axis 1803 passing through the buoy's center of buoyancy 1806. The downward gravitational force 1808 applied by gravity to the buoy's center of mass 1807 is now offset, and not passing through, the buoy's center of buoyancy, and is in fact to the right of that longitudinal axis (unlike the case with the buoy illustrated in FIGS. 169 and 170).

In combination with the upward buoyancy force 1809 applied to the buoy's center of buoyancy 1806, the downward force 1808 applied by gravity to the buoy's center of mass 1807, creates a torque 1810 about the buoy's center of buoyancy 1806. Unlike the problematic torque created by the shifting of water within the tilt-powered energy generation module (1701 of FIG. 170) of the buoy illustrated in FIGS. 169 and 170 (i.e. a counterclockwise torque which tends to exacerbate the buoy's tendency to capsize), the torque created by the counterclockwise roll of the buoy illustrated in FIGS. 171 and 172 is in a clockwise direction, which tends to counter, stall, correct, offset, and/or cancel the tendency of the buoy 1800 to capsize, and/or "over-roll", in response to a wave-induced roll and consequent flow the fluid within its tilt-powered energy generation module in the direction of a downward tilt of the buoy.

Unlike the buoy illustrated in FIGS. 169 and 170 which is dynamically unstable in its response to wave-induced tilting, the buoy illustrated in FIGS. 171 and 172 is dynamically stable in its response to wave-induced tilting.

We claim:

1. A vessel configured to elevate a working fluid by multiaxial tilting, comprising:

a deck enclosed by an outer hull;

first, second, third, and fourth water collecting chambers mounted on the deck;

fifth, sixth, seventh, and eighth water collecting chambers elevated above the deck, when said deck is parallel to a horizontal plane, and positioned across from the first, second, third, and fourth water collecting chambers, respectively;

ninth, tenth, eleventh, and twelfth water collecting chambers elevated above the fifth, sixth, seventh, and eighth water collecting chambers, respectively, when the deck is parallel to the horizontal plane, and positioned across from the fifth, sixth, seventh, and eighth water collecting chambers, respectively;

a first fluid conduit connecting said first and fifth water collecting chambers, the first fluid conduit forming an angle of inclination A1 with respect to the horizontal plane;

a second fluid conduit connecting said second and sixth water collecting chambers, the second fluid conduit forming an angle of inclination A2 with respect to the horizontal plane;

a third fluid conduit connecting said third and seventh water collecting chambers, the third fluid conduit forming an angle of inclination A3 with respect to the horizontal plane;

a fourth fluid conduit connecting said fourth and eighth water collecting chambers, the fourth fluid conduit forming an angle of inclination A4 with respect to the horizontal plane;

a fifth fluid conduit connecting said fifth and ninth water collecting chambers, the fifth fluid conduit forming an angle of inclination A5 with respect to the horizontal plane;

a sixth fluid conduit connecting said sixth and tenth water collecting chambers, the sixth fluid conduit forming an angle of inclination A6 with respect to the horizontal plane;

a seventh fluid conduit connecting said seventh and eleventh water collecting chambers, the seventh fluid conduit forming an angle of inclination A7 with respect to the horizontal plane;

an eighth fluid conduit connecting said eighth and twelfth water collecting chambers, the eighth fluid conduit forming an angle of inclination A8 with respect to the horizontal plane;

each water collecting chamber positioned furthest above said deck among a group of fluidly interconnected water collecting chambers includes a water return conduit configured to return water collected therein to an elevation at or below the deck; and first, second, third, and fourth water turbines connected to a respective water return conduit for converting kinetic energy of the water flowing therein to electricity;

wherein tilting the vessel about a first horizontal axis by a first tilt angle that is greater than angle A1 causes water to gravitationally flow from the first water collecting chamber to the fifth water collecting chamber;

wherein tilting the vessel about the first horizontal axis by a second tilt angle in the opposite direction to the first tilt angle and that is greater than angle A5 causes water to gravitationally flow from the fifth water collecting chamber to the ninth water collecting chamber;

wherein tilting the vessel about the first horizontal axis by a third tilt angle that is greater than angle A2 causes water to gravitationally flow from the second water collecting chamber to the sixth water collecting chamber;

wherein tilting the vessel about the first horizontal axis by a fourth tilt angle in the opposite direction to the third tilt angle and is greater than angle A6 causes water to gravitationally flow from the sixth water collecting chamber to the tenth water collecting chamber;

wherein tilting the vessel about a second horizontal axis, that is not parallel to said first horizontal axis, by a fifth tilt angle that is greater than angle A3 causes water to gravitationally flow from the third water collecting chamber to the seventh water collecting chamber;

wherein tilting the vessel about the second horizontal axis by a sixth tilt angle in the opposite direction to the fifth tilt angle and that is greater than angle A6 causes water to gravitationally flow from the sixth water collecting chamber to the tenth water collecting chamber;

wherein tilting the vessel about the second horizontal axis by a seventh tilt angle that is greater than angle A7 causes water to gravitationally flow from the seventh water collecting chamber to the eleventh water collecting chamber; and wherein tilting the vessel about the second horizontal axis by an eighth tilt angle in the opposite direction to the seventh tilt angle and is greater than angle A8 causes water to gravitationally flow from the eighth water collecting chamber to the twelfth water collecting chamber.

2. The vessel of claim 1, wherein the first, second, third, and fourth water collecting chambers are each mounted at a common elevation on the deck.

3. The vessel of claim 1, wherein the fifth, sixth, seventh, and eighth water collecting chambers are of a common elevation when the deck is parallel to the horizontal plane.

4. The vessel of claim 1, wherein the ninth, tenth, eleventh, and twelfth water collecting chambers are of a common elevation when the deck is parallel to the horizontal plane.

5. The vessel of claim 1, wherein each water return conduit extends outside of the vessel.

6. The vessel of claim 1, wherein the first horizontal axis is orthogonal to the second horizontal axis.

7. The vessel of claim 1, wherein the first horizontal axis and second horizontal axis are not orthogonal.

* * * * *